United States Patent
Engreitz et al.

(10) Patent No.: US 12,499,971 B2
(45) Date of Patent: Dec. 16, 2025

(54) SYSTEMATIC SCREENING AND MAPPING OF REGULATORY ELEMENTS IN NON-CODING GENOMIC REGIONS, METHODS, COMPOSITIONS, AND APPLICATIONS THEREOF

(71) Applicants: The Broad Institute, Inc., Cambridge, MA (US); President and Fellows of Harvard College, Cambridge, MA (US); Massachusetts Institute of Technology, Cambridge, MA (US)

(72) Inventors: Jesse Engreitz, Cambridge, MA (US); Eric S. Lander, Cambridge, MA (US); Charles Fulco, Cambridge, MA (US)

(73) Assignees: The Broad Institute, Inc., Cambridge, MA (US); Massachusetts Institute of Technology, Cambridge, MA (US); President and Fellows of Harvard College, Cambridge, MA (US)

( * ) Notice: Subject to any disclaimer, the term of this patent is extended or adjusted under 35 U.S.C. 154(b) by 1384 days.

(21) Appl. No.: 16/337,846

(22) PCT Filed: Sep. 27, 2017

(86) PCT No.: PCT/US2017/053795
§ 371 (c)(1),
(2) Date: Mar. 28, 2019

(87) PCT Pub. No.: WO2018/064208
PCT Pub. Date: Apr. 5, 2018

(65) Prior Publication Data
US 2020/0143907 A1 May 7, 2020

Related U.S. Application Data

(60) Provisional application No. 62/463,559, filed on Feb. 24, 2017, provisional application No. 62/401,594, (Continued)

(51) Int. Cl.
*G16B 25/10* (2019.01)
*C12N 15/10* (2006.01)
(Continued)

(52) U.S. Cl.
CPC ......... *G16B 25/10* (2019.02); *C12N 15/1072* (2013.01); *C12N 15/1079* (2013.01); (Continued)

(58) Field of Classification Search
CPC .... G16B 25/10; G16B 20/00; C12N 15/1079; C12N 15/1089; C12N 15/1034; C12Q 2521/301
See application file for complete search history.

(56) References Cited

U.S. PATENT DOCUMENTS

| 4,769,061 | A | 9/1988 | Comai |
| 4,810,648 | A | 3/1989 | Stalker |

(Continued)

FOREIGN PATENT DOCUMENTS

| CN | 104004782 A | 8/2014 |
| EP | 0 333 033 A1 | 9/1989 |

(Continued)

OTHER PUBLICATIONS

Ran, F. Ann, et al. "Double nicking by RNA-guided CRISPR Cas9 for enhanced genome editing specificity." Cell 154.6 (2013): 1380-1389. (Year: 2013).*

(Continued)

*Primary Examiner* — Larry D Riggs, II
*Assistant Examiner* — Guozhen Liu
(74) *Attorney, Agent, or Firm* — Wenderoth, Lind & Ponack, L.L.P.

(57) ABSTRACT

The application relates to methods for identifying putative regulatory elements that regulates a gene, comprising: obtaining a measure of intrinsic activity of a plurality of genomic elements; obtaining a measure of proximity between each of the genomic elements and the gene; scoring a predicted impact of each of the genomic elements on the gene as a function of the measure of intrinsic activity and the measure of proximity, wherein a plurality of predicted impacts scored are ranked to identify at least one genomic element as a putative regulatory element that regulates the gene; and optionally, training, optimizing, and/or validating the scoring of predicted impact using experimental or com- (Continued)

putational data describing functional interactions between the genomic elements and the gene. The application also relates to methods for identification of transcriptional enhancers and repressors regulating a gene associated with an agricultural trait of interest in plants or a disease phenotype in mammalians.

46 Claims, 41 Drawing Sheets

Specification includes a Sequence Listing.

Related U.S. Application Data filed on Sep. 29, 2016, provisional application No. 62/401,149, filed on Sep. 28, 2016.

(51) Int. Cl.
  *G16B 20/00* (2019.01)
  *G16H 50/30* (2018.01)
(52) U.S. Cl.
  CPC ......... *C12N 15/1089* (2013.01); *G16B 20/00* (2019.02); *G16H 50/30* (2018.01)

(56) References Cited

U.S. PATENT DOCUMENTS

| | | | |
|---|---|---|---|
| 4,940,835 A | 7/1990 | Shah et al. |
| 4,975,374 A | 12/1990 | Goodman et al. |
| 5,266,317 A | 11/1993 | Tomalski et al. |
| 5,273,894 A | 12/1993 | Strauch et al. |
| 5,276,268 A | 1/1994 | Strauch et al. |
| 5,543,158 A | 8/1996 | Gref et al. |
| 5,561,236 A | 10/1996 | Leemans et al. |
| 5,563,055 A | 10/1996 | Townsend et al. |
| 5,580,859 A | 12/1996 | Felgner et al. |
| 5,589,466 A | 12/1996 | Felgner et al. |
| 5,593,972 A | 1/1997 | Weiner et al. |
| 5,637,489 A | 6/1997 | Strauch et al. |
| 5,646,024 A | 7/1997 | Leemans et al. |
| 5,648,477 A | 7/1997 | Leemans et al. |
| 5,686,281 A | 11/1997 | Roberts |
| 5,712,107 A | 1/1998 | Nichols |
| 5,739,082 A | 4/1998 | Donn |
| 5,789,156 A | 8/1998 | Bujard et al. |
| 5,814,618 A | 9/1998 | Bujard et al. |
| 5,824,790 A | 10/1998 | Keeling et al. |
| 5,843,728 A | 12/1998 | Seed et al. |
| 5,846,946 A | 12/1998 | Huebner et al. |
| 5,851,828 A | 12/1998 | Seed et al. |
| 5,855,913 A | 1/1999 | Hanes et al. |
| 5,858,358 A | 1/1999 | June et al. |
| 5,883,223 A | 3/1999 | Gray |
| 5,906,936 A | 5/1999 | Eshhar et al. |
| 5,908,810 A | 6/1999 | Donn |
| 5,908,975 A | 6/1999 | Caimi et al. |
| 5,912,170 A | 6/1999 | Seed et al. |
| 5,912,172 A | 6/1999 | Eshhar et al. |
| 5,985,309 A | 11/1999 | Edwards et al. |
| 6,004,811 A | 12/1999 | Seed et al. |
| 6,007,845 A | 12/1999 | Domb et al. |
| 6,013,861 A | 1/2000 | Bird et al. |
| 6,248,876 B1 | 6/2001 | Barry et al. |
| 6,284,240 B1 | 9/2001 | Seed et al. |
| 6,284,479 B1 | 9/2001 | Nichols |
| 6,352,694 B1 | 3/2002 | June et al. |
| 6,392,013 B1 | 5/2002 | Seed et al. |
| 6,410,014 B1 | 6/2002 | Seed et al. |
| 6,479,626 B1 | 11/2002 | Kim et al. |
| 6,489,458 B2 | 12/2002 | Hackett et al. |
| 6,534,055 B1 | 3/2003 | June et al. |
| 6,534,261 B1 | 3/2003 | Cox et al. |
| 6,607,882 B1 | 8/2003 | Cox et al. |
| 6,734,341 B2 | 5/2004 | Singletary et al. |
| 6,746,838 B1 | 6/2004 | Choo et al. |
| 6,753,162 B1 | 6/2004 | Seed et al. |
| 6,768,044 B1 | 7/2004 | Boudec et al. |
| 6,794,136 B1 | 9/2004 | Eisenberg et al. |
| 6,797,514 B2 | 9/2004 | Berenson et al. |
| 6,824,978 B1 | 11/2004 | Cox et al. |
| 6,866,997 B1 | 3/2005 | Choo et al. |
| 6,867,041 B2 | 3/2005 | Berenson et al. |
| 6,887,466 B2 | 5/2005 | June et al. |
| 6,903,185 B2 | 6/2005 | Kim et al. |
| 6,905,680 B2 | 6/2005 | June et al. |
| 6,905,681 B1 | 6/2005 | June et al. |
| 6,905,874 B2 | 6/2005 | Berenson et al. |
| 6,933,113 B2 | 8/2005 | Case et al. |
| 6,979,539 B2 | 12/2005 | Cox et al. |
| 7,013,219 B2 | 3/2006 | Case et al. |
| 7,030,215 B2 | 4/2006 | Liu et al. |
| 7,112,665 B1 | 9/2006 | Leemans et al. |
| 7,144,575 B2 | 12/2006 | June et al. |
| 7,148,203 B2 | 12/2006 | Hackett et al. |
| 7,160,682 B2 | 1/2007 | Hackett et al. |
| 7,175,843 B2 | 2/2007 | June et al. |
| 7,220,719 B2 | 5/2007 | Case et al. |
| 7,232,566 B2 | 6/2007 | June et al. |
| 7,241,573 B2 | 7/2007 | Choo et al. |
| 7,241,574 B2 | 7/2007 | Choo et al. |
| 7,259,015 B2 | 8/2007 | Kingsman et al. |
| 7,303,910 B2 | 12/2007 | Bebbington et al. |
| 7,351,585 B2 | 4/2008 | Mitrophanous et al. |
| 7,572,631 B2 | 8/2009 | Berenson et al. |
| 7,585,849 B2 | 9/2009 | Liu et al. |
| 7,595,376 B2 | 9/2009 | Kim et al. |
| 7,741,465 B1 | 6/2010 | Eshhar et al. |
| 7,745,651 B2 | 6/2010 | Heyes et al. |
| 7,799,565 B2 | 9/2010 | Maclachlan et al. |
| 7,803,397 B2 | 9/2010 | Heyes et al. |
| 7,838,658 B2 | 11/2010 | Maclachlan et al. |
| 7,901,708 B2 | 3/2011 | Maclachlan et al. |
| 7,910,805 B2 | 3/2011 | Duck et al. |
| 7,915,399 B2 | 3/2011 | Maclachlan et al. |
| 7,982,027 B2 | 7/2011 | Maclachlan et al. |
| 7,985,739 B2 | 7/2011 | Kay et al. |
| 8,021,867 B2 | 9/2011 | Smith et al. |
| 8,044,019 B2 | 10/2011 | Uno et al. |
| 8,058,069 B2 | 11/2011 | Yaworski et al. |
| 8,088,379 B2 | 1/2012 | Robbins et al. |
| 8,101,741 B2 | 1/2012 | Maclachlan et al. |
| 8,119,361 B2 | 2/2012 | Smith et al. |
| 8,119,381 B2 | 2/2012 | Smith et al. |
| 8,124,369 B2 | 2/2012 | Smith et al. |
| 8,129,134 B2 | 3/2012 | Smith et al. |
| 8,133,697 B2 | 3/2012 | Smith et al. |
| 8,163,514 B2 | 4/2012 | Smith et al. |
| 8,188,263 B2 | 5/2012 | Maclachlan et al. |
| 8,211,422 B2 | 7/2012 | Eshhar et al. |
| 8,227,432 B2 | 7/2012 | Hackett et al. |
| 8,236,943 B2 | 8/2012 | Lee et al. |
| 8,283,333 B2 | 10/2012 | Yaworski et al. |
| 8,372,951 B2 | 2/2013 | Chang et al. |
| 8,399,645 B2 | 3/2013 | Campana et al. |
| 8,404,658 B2 | 3/2013 | Hajjar et al. |
| 8,440,431 B2 | 5/2013 | Voytas et al. |
| 8,440,432 B2 | 5/2013 | Voytas et al. |
| 8,450,471 B2 | 5/2013 | Voytas et al. |
| 8,454,972 B2 | 6/2013 | Nabel et al. |
| 8,507,272 B2 | 8/2013 | Zhang et al. |
| 8,575,305 B2 | 11/2013 | Gait et al. |
| 8,614,194 B1 | 12/2013 | Chen et al. |
| 8,642,295 B2 | 2/2014 | De Laat et al. |
| 8,697,359 B1 | 4/2014 | Zhang |
| 8,697,854 B2 | 4/2014 | Schendel et al. |
| 8,709,843 B2 | 4/2014 | Shakuda |
| 8,771,945 B1 | 7/2014 | Zhang |
| 8,795,965 B2 | 8/2014 | Zhang |
| 8,865,406 B2 | 10/2014 | Zhang et al. |
| 8,871,445 B2 | 10/2014 | Cong et al. |
| 8,889,356 B2 | 11/2014 | Zhang |
| 8,889,418 B2 | 11/2014 | Zhang et al. |

(56) References Cited

U.S. PATENT DOCUMENTS

| | | |
|---|---|---|
| 8,895,308 B1 | 11/2014 | Zhang et al. |
| 8,906,616 B2 | 12/2014 | Zhang et al. |
| 8,906,682 B2 | 12/2014 | June et al. |
| 8,911,993 B2 | 12/2014 | June et al. |
| 8,916,381 B1 | 12/2014 | June et al. |
| 8,932,814 B2 | 1/2015 | Cong et al. |
| 8,945,839 B2 | 2/2015 | Zhang |
| 8,975,071 B1 | 3/2015 | June et al. |
| 8,993,233 B2 | 3/2015 | Zhang et al. |
| 8,999,641 B2 | 4/2015 | Zhang et al. |
| 9,101,584 B2 | 8/2015 | June et al. |
| 9,102,760 B2 | 8/2015 | June et al. |
| 9,102,761 B2 | 8/2015 | June et al. |
| 2002/0031826 A1 | 3/2002 | Nichols |
| 2004/0013648 A1 | 1/2004 | Kingsman et al. |
| 2004/0142476 A1 | 7/2004 | Evans et al. |
| 2004/0171156 A1 | 9/2004 | Hartley et al. |
| 2005/0019923 A1 | 1/2005 | Uchegbu et al. |
| 2006/0281180 A1 | 12/2006 | Radcliffe et al. |
| 2007/0025970 A1 | 2/2007 | Kingsman et al. |
| 2007/0054961 A1 | 3/2007 | Maden et al. |
| 2007/0266453 A1 | 11/2007 | Anderson et al. |
| 2008/0267903 A1 | 10/2008 | Uchegbu et al. |
| 2009/0007284 A1 | 1/2009 | Radcliffe et al. |
| 2009/0017543 A1 | 1/2009 | Wilkes et al. |
| 2009/0111106 A1 | 4/2009 | Mitrophanous et al. |
| 2009/0144526 A1 | 6/2009 | Van et al. |
| 2010/0317109 A1 | 12/2010 | Maden et al. |
| 2011/0117189 A1 | 5/2011 | Mazzone et al. |
| 2011/0195123 A1 | 8/2011 | Shemi |
| 2011/0293571 A1 | 12/2011 | Widdowson et al. |
| 2011/0293703 A1 | 12/2011 | Mahon et al. |
| 2012/0251560 A1 | 10/2012 | Dahlman et al. |
| 2012/0251618 A1 | 10/2012 | Schrum et al. |
| 2012/0295960 A1 | 11/2012 | Palfi et al. |
| 2013/0071414 A1 | 3/2013 | Dotti et al. |
| 2013/0185823 A1 | 7/2013 | Kuang et al. |
| 2013/0244279 A1 | 9/2013 | De Fougerolles et al. |
| 2013/0245107 A1 | 9/2013 | De Fougerolles et al. |
| 2013/0252281 A1 | 9/2013 | De Fougerolles et al. |
| 2013/0302401 A1 | 11/2013 | Ma et al. |
| 2014/0170753 A1 | 6/2014 | Zhang |
| 2014/0179006 A1 | 6/2014 | Zhang |
| 2014/0179770 A1 | 6/2014 | Zhang et al. |
| 2014/0186843 A1 | 7/2014 | Zhang et al. |
| 2014/0186919 A1 | 7/2014 | Zhang et al. |
| 2014/0186958 A1 | 7/2014 | Zhang et al. |
| 2014/0189896 A1 | 7/2014 | Zhang et al. |
| 2014/0227787 A1 | 8/2014 | Zhang |
| 2014/0234972 A1 | 8/2014 | Zhang |
| 2014/0242664 A1 | 8/2014 | Zhang et al. |
| 2014/0242699 A1 | 8/2014 | Zhang |
| 2014/0242700 A1 | 8/2014 | Zhang et al. |
| 2014/0248702 A1 | 9/2014 | Zhang et al. |
| 2014/0256046 A1 | 9/2014 | Zhang et al. |
| 2014/0273231 A1 | 9/2014 | Zhang et al. |
| 2014/0273232 A1 | 9/2014 | Zhang et al. |
| 2014/0273234 A1 | 9/2014 | Zhang et al. |
| 2014/0287938 A1 | 9/2014 | Zhang et al. |
| 2014/0310830 A1 | 10/2014 | Zhang et al. |
| 2014/0342456 A1 | 11/2014 | Mali et al. |
| 2014/0356959 A1 | 12/2014 | Church et al. |
| 2015/0031132 A1 | 1/2015 | Church et al. |
| 2015/0184139 A1 | 7/2015 | Zhang et al. |

FOREIGN PATENT DOCUMENTS

| | | |
|---|---|---|
| EP | 0 242 246 B1 | 11/1992 |
| EP | 0 719 338 B1 | 6/2003 |
| EP | 0 571 427 B1 | 10/2003 |
| EP | 0 728 213 B1 | 1/2004 |
| EP | 0 663 956 B1 | 6/2005 |
| EP | 1 664 316 A1 | 6/2006 |
| EP | 1 766 035 A1 | 3/2007 |
| EP | 1 781 593 A2 | 5/2007 |
| EP | 1 887 079 A1 | 2/2008 |
| EP | 1 999 263 A1 | 12/2008 |
| EP | 2 175 026 A1 | 4/2010 |
| EP | 1 519 714 B1 | 10/2010 |
| EP | 2 099 915 B1 | 9/2011 |
| EP | 2 771 468 B1 | 2/2015 |
| EP | 2 784 162 B1 | 4/2015 |
| EP | 2 764 103 B1 | 8/2015 |
| EP | 2 970 997 A1 | 1/2016 |
| EP | 2 099 905 B1 | 6/2017 |
| JP | 2006-304779 A | 11/2006 |
| WO | 92/15322 A1 | 9/1992 |
| WO | 93/01294 A1 | 1/1993 |
| WO | 93/02197 A1 | 2/1993 |
| WO | 93/19181 A1 | 9/1993 |
| WO | 94/00992 A1 | 1/1994 |
| WO | 94/04693 A2 | 3/1994 |
| WO | 94/09144 A1 | 4/1994 |
| WO | 94/11520 A2 | 5/1994 |
| WO | 95/04826 A1 | 2/1995 |
| WO | 95/26407 A1 | 10/1995 |
| WO | 95/31553 A1 | 11/1995 |
| WO | 95/35026 A1 | 12/1995 |
| WO | 96/01904 A1 | 1/1996 |
| WO | 96/15248 A1 | 5/1996 |
| WO | 96/19581 A1 | 6/1996 |
| WO | 96/21023 A1 | 7/1996 |
| WO | 96/27674 A1 | 9/1996 |
| WO | 96/30517 A1 | 10/1996 |
| WO | 96/34968 A2 | 11/1996 |
| WO | 96/38567 A2 | 12/1996 |
| WO | 97/11188 A1 | 3/1997 |
| WO | 97/20936 A1 | 6/1997 |
| WO | 97/26362 A1 | 7/1997 |
| WO | 97/32985 A1 | 9/1997 |
| WO | 97/42328 A1 | 11/1997 |
| WO | 97/44472 A1 | 11/1997 |
| WO | 97/45545 A1 | 12/1997 |
| WO | 97/47806 A1 | 12/1997 |
| WO | 97/47807 A1 | 12/1997 |
| WO | 97/47808 A1 | 12/1997 |
| WO | 98/20145 A2 | 5/1998 |
| WO | 98/22604 A1 | 5/1998 |
| WO | 98/27212 A1 | 6/1998 |
| WO | 98/39460 A1 | 9/1998 |
| WO | 98/40503 A1 | 9/1998 |
| WO | 99/12950 A2 | 3/1999 |
| WO | 99/24585 A1 | 5/1999 |
| WO | 99/24586 A1 | 5/1999 |
| WO | 99/24593 A1 | 5/1999 |
| WO | 99/53072 A1 | 10/1999 |
| WO | 99/58654 A2 | 11/1999 |
| WO | 99/58688 A2 | 11/1999 |
| WO | 99/58690 A2 | 11/1999 |
| WO | 98/32326 A3 | 12/1999 |
| WO | 99/66050 A1 | 12/1999 |
| WO | 00/04173 A1 | 1/2000 |
| WO | 00/08175 A2 | 2/2000 |
| WO | 00/08184 A1 | 2/2000 |
| WO | 00/08185 A1 | 2/2000 |
| WO | 00/11192 A2 | 3/2000 |
| WO | 00/14249 A1 | 3/2000 |
| WO | 00/22140 A1 | 4/2000 |
| WO | 00/28052 A2 | 5/2000 |
| WO | 00/47727 A2 | 8/2000 |
| WO | 00/73422 A1 | 12/2000 |
| WO | 00/77229 A2 | 12/2000 |
| WO | 01/12782 A2 | 2/2001 |
| WO | 01/12826 A2 | 2/2001 |
| WO | 01/14569 A2 | 3/2001 |
| WO | 01/19975 A2 | 3/2001 |
| WO | 01/98509 A2 | 12/2001 |
| WO | 02/08391 A2 | 1/2002 |
| WO | 02/34923 A2 | 5/2002 |
| WO | 02/46387 A2 | 6/2002 |
| WO | 02/079410 A2 | 10/2002 |
| WO | 02/083911 A1 | 10/2002 |
| WO | 02/101059 A2 | 12/2002 |
| WO | 03/020763 A2 | 3/2003 |

(56) References Cited

FOREIGN PATENT DOCUMENTS

| | | |
|---|---|---|
| WO | 03/033540 A2 | 4/2003 |
| WO | 03/071860 A2 | 9/2003 |
| WO | 2004/015075 A2 | 2/2004 |
| WO | 2004/033685 A1 | 4/2004 |
| WO | 2004/044004 A2 | 5/2004 |
| WO | 2004/056999 A1 | 7/2004 |
| WO | 2004/074322 A1 | 9/2004 |
| WO | 2004/078983 A2 | 9/2004 |
| WO | 2004/090140 A2 | 10/2004 |
| WO | 2005/002359 A2 | 1/2005 |
| WO | 2005/012515 A2 | 2/2005 |
| WO | 2005/012529 A1 | 2/2005 |
| WO | 2005/030941 A1 | 4/2005 |
| WO | 2005/030942 A1 | 4/2005 |
| WO | 2005/095617 A2 | 10/2005 |
| WO | 2005/095618 A2 | 10/2005 |
| WO | 2005/095619 A1 | 10/2005 |
| WO | 2005/095632 A2 | 10/2005 |
| WO | 2005/107437 A2 | 11/2005 |
| WO | 2005/113595 A2 | 12/2005 |
| WO | 2005/114215 A2 | 12/2005 |
| WO | 2005/123927 A1 | 12/2005 |
| WO | 2006/000830 A2 | 1/2006 |
| WO | 2006/018319 A1 | 2/2006 |
| WO | 2006/032538 A1 | 3/2006 |
| WO | 2006/045633 A1 | 5/2006 |
| WO | 2006/063862 A1 | 6/2006 |
| WO | 2006/072603 A2 | 7/2006 |
| WO | 2006/103107 A1 | 10/2006 |
| WO | 2006/108702 A1 | 10/2006 |
| WO | 2006/125962 A2 | 11/2006 |
| WO | 2006/133827 A2 | 12/2006 |
| WO | 2007/009823 A1 | 1/2007 |
| WO | 2007/039314 A2 | 4/2007 |
| WO | 2007/039315 A1 | 4/2007 |
| WO | 2007/039316 A1 | 4/2007 |
| WO | 2007/107326 A1 | 9/2007 |
| WO | 2008/038002 A2 | 4/2008 |
| WO | 2008/039818 A2 | 4/2008 |
| WO | 2008/042156 A1 | 4/2008 |
| WO | 2008/064289 A2 | 5/2008 |
| WO | 2009/144079 A1 | 12/2009 |
| WO | 2010/061186 A2 | 6/2010 |
| WO | 2010/096488 A1 | 8/2010 |
| WO | 2011/008730 A2 | 1/2011 |
| WO | 2011/146862 A1 | 11/2011 |
| WO | 2012/079000 A1 | 6/2012 |
| WO | 2012/135025 A2 | 10/2012 |
| WO | 2013/039889 A1 | 3/2013 |
| WO | 2013/040371 A2 | 3/2013 |
| WO | 2013/046247 A1 | 4/2013 |
| WO | 2013/122472 A1 | 8/2013 |
| WO | 2013/166321 A1 | 11/2013 |
| WO | 2013/176915 A1 | 11/2013 |
| WO | 2014/011987 A1 | 1/2014 |
| WO | 2014/018423 A2 | 1/2014 |
| WO | 2014/018863 A1 | 1/2014 |
| WO | 2014/028921 A1 | 2/2014 |
| WO | 2014/059173 A2 | 4/2014 |
| WO | 2014/083173 A1 | 6/2014 |
| WO | 2014/093595 A1 | 6/2014 |
| WO | 2014/093622 A2 | 6/2014 |
| WO | 2014/093635 A1 | 6/2014 |
| WO | 2014/093655 A2 | 6/2014 |
| WO | 2014/093661 A2 | 6/2014 |
| WO | 2014/093694 A1 | 6/2014 |
| WO | 2014/093701 A1 | 6/2014 |
| WO | 2014/093709 A1 | 6/2014 |
| WO | 2014/093712 A1 | 6/2014 |
| WO | 2014/093718 A1 | 6/2014 |
| WO | 2014/134165 A1 | 9/2014 |
| WO | 2014/172606 A1 | 10/2014 |
| WO | 2014/184744 A1 | 11/2014 |
| WO | 2014/191128 A1 | 12/2014 |
| WO | 2014/204723 A1 | 12/2014 |
| WO | 2014/204724 A1 | 12/2014 |
| WO | 2014/204725 A1 | 12/2014 |
| WO | 2014/204726 A1 | 12/2014 |
| WO | 2014/204727 A1 | 12/2014 |
| WO | 2014/204728 A1 | 12/2014 |
| WO | 2014/204729 A1 | 12/2014 |
| WO | 2015/058052 A1 | 4/2015 |
| WO | 2015/070083 A1 | 5/2015 |
| WO | 2015/086795 A1 | 6/2015 |
| WO | 2015/089351 A1 | 6/2015 |
| WO | 2015/089354 A1 | 6/2015 |
| WO | 2015/089364 A1 | 6/2015 |
| WO | 2015/089419 A2 | 6/2015 |
| WO | 2015/089427 A1 | 6/2015 |
| WO | 2015/089462 A1 | 6/2015 |
| WO | 2015/089465 A1 | 6/2015 |
| WO | 2015/089473 A1 | 6/2015 |
| WO | 2015/089486 A2 | 6/2015 |
| WO | 2015/109752 A1 | 7/2015 |
| WO | 2015/138855 A1 | 9/2015 |
| WO | 2016/025131 A1 | 2/2016 |
| WO | 2016/049258 A2 | 3/2016 |
| WO | 2016/073433 A1 | 5/2016 |
| WO | 2016/089920 A1 | 6/2016 |
| WO | 2016/094867 A1 | 6/2016 |
| WO | 2016/094872 A1 | 6/2016 |
| WO | 2016/094874 A1 | 6/2016 |
| WO | 2016/099887 A1 | 6/2016 |
| WO | 2016/100272 A1 | 6/2016 |
| WO | 2016/100562 A1 | 6/2016 |
| WO | 2016/100568 A1 | 6/2016 |
| WO | 2016/100571 A1 | 6/2016 |
| WO | 2016/106244 A1 | 6/2016 |
| WO | 2016/186745 A1 | 11/2016 |
| WO | 2016/205613 A1 | 12/2016 |
| WO | 2017/019867 A1 | 2/2017 |
| WO | 2017/066175 A1 | 4/2017 |
| WO | 2017/100158 A1 | 6/2017 |
| WO | 2017/105991 A1 | 6/2017 |
| WO | 2017/106414 A1 | 6/2017 |
| WO | 2018/035387 A1 | 2/2018 |
| WO | 2018/035388 A1 | 2/2018 |
| WO | 2018/064208 A1 | 4/2018 |

OTHER PUBLICATIONS

Thakore, Pratiksha I., et al. "Highly specific epigenome editing by CRISPR-Cas9 repressors for silencing of distal regulatory elements." Nature methods 12.12 (2015): 1143-1149. (Year: 2015).*
Zalatan, Jesse G., et al. "Engineering complex synthetic transcriptional programs with CRISPR RNA scaffolds." Cell 160.1 (2015): 339-350. Regarding claim 29, (Year: 2015).*
Ernst, J. et al., "Mapping and analysis of chromatin state dynamics in nine human cell types," Nature, vol. 473, No. 7345, Mar. 23, 2011, pp. 43-49, "Methods" pp. 7-8 (9 pages).
Fulco, C. P. et al., "Systematic mapping of functional enhancer-promoter connections with CRISPR interference," Science, vol. 354, No. 6313, Sep. 15, 2016, pp. 769-773 (5 pages).
He, B. et al., "Global view of enhancer-promoter interactome in human cells," Proceedings National Academy of Sciences, vol. 111, No. 21, May 12, 2014, pp. E2191-E2199 (9 pages).
Hirai-Yuki, A. et al., "MAVS-dependent host species range and pathogenicity of human hepatitis A virus," Science, vol. 353, No. 6307, Sep. 15, 2016, pp. 1541-1545 (6 pages).
Joung, J. et al., "Genome-scale activation screen identifies a lncRNA locus regulating a gene neighbourhood," Nature, vol. 548, No. 7667, pp. 343-346 (18 pages).
Rajagopal, N. et al., "High-throughput mapping of regulatory DNA," Nature Biotechnology, vol. 34, No. 2, Jan. 25, 2016, pp. 167-174 (10 pages).
Sahlen, P. et al., "Genome-wide mapping of promoter-anchored interactions with close to single-enhancer resolution," Genome Biology, vol. 31, No. 1, Aug. 3, 2015, pp. 1-13 (13 pages).
Zhu, S. et al., "Genome-scale deletion screening of human long non-coding RNAs using a paired-guide RNA CRISPR-Cas9 library," Nature Biotechnology, vol. 34, No. 12, Oct. 31, 2016, pp. 1279-1286 (10 pages).

(56) References Cited

OTHER PUBLICATIONS

The Broad Institute, Inc., "International Preliminary Report on Patentability, PCT International Application No. PCT/US2017/053795", mailed on Apr. 11, 2019, 14 pages.
The Broad Institute, Inc., "International Search Report on Patentability, PCT International Application No. PCT/US2017/053795", mailed on Mar. 8, 2018, 20 pages.
The Broad Institute, Inc., "Invitation to Pay Additional Fees PCT International Application No. PCT/US2017/053795", mailed on Jan. 12, 2018, 11 pages.
Fulco et al., "Systematic mapping of functional enhancer-promoter connections with CRISPR interference", Science 354,769-773, 2016.

\* cited by examiner

1. Given an enhancer: Test effects of one enhancer on all genes

2. Given a gene: Find all enhancers that regulate that gene

3. Given a cell phenotype: Find all genes and all enhancers that affect phenotype 1. Unstained without Amp mix
2. Unstained with label probes- As per protocol
3. Unstained with label probes with 3, 6 and 9 additional wash
4. Stained with RPL13A Type 1

| Sample | Fold difference |
|---|---|
| Unstained cells | 1 |
| Unstained with probe mix | 13.2 |
| Unstained with probe mix 3 additional washes | 7.5 |

SEQUENCE LISTING

```
<160> NUMBER OF SEQ ID NOS: 167

<210> SEQ ID NO 1
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 1

Gly Gly Gly Ser
1

<210> SEQ ID NO 2
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 2

Gly Gly Gly Ser Gly Gly Gly Ser Gly Gly Gly Ser
1               5                   10

<210> SEQ ID NO 3
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
```

```
<400> SEQUENCE: 3

Ala Glu Ala Ala Ala Lys Ala
1               5

<210> SEQ ID NO 4
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 4

Gly Gly Gly Gly Ser Gly Gly Gly Gly Ser Gly Gly Gly Gly Ser
1               5                   10                  15

<210> SEQ ID NO 5
<211> LENGTH: 30
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 5

Gly Gly Gly Gly Ser Gly Gly Gly Gly Ser Gly Gly Gly Gly Ser Gly
1               5                   10                  15

Gly Gly Gly Ser Gly Gly Gly Gly Ser Gly Gly Gly Gly Ser
            20                  25                  30

<210> SEQ ID NO 6
<211> LENGTH: 45
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 6

Gly Gly Gly Gly Ser Gly Gly Gly Gly Ser Gly Gly Gly Gly Ser Gly
1               5                   10                  15

Gly Gly Gly Ser Gly Gly Gly Gly Ser Gly Gly Gly Gly Ser Gly Gly
            20                  25                  30

Gly Gly Ser Gly Gly Gly Gly Ser Gly Gly Gly Gly Ser
        35                  40                  45

<210> SEQ ID NO 7
<211> LENGTH: 60
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 7

Gly Gly Gly Gly Ser Gly Gly Gly Gly Ser Gly Gly Gly Gly Ser Gly
1               5                   10                  15

Gly Gly Gly Ser Gly Gly Gly Gly Ser Gly Gly Gly Gly Ser Gly Gly
            20                  25                  30

Gly Gly Ser Gly Gly Gly Gly Ser Gly Gly Gly Gly Ser Gly Gly Gly
```

```
                35                  40                  45
Gly Ser Gly Gly Gly Gly Ser Gly Gly Gly Ser
    50                  55                  60

<210> SEQ ID NO 8
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 8

Gly Gly Gly Gly Ser
1               5

<210> SEQ ID NO 9
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 9

Gly Gly Gly Gly Ser Gly Gly Gly Gly Ser
1               5                  10

<210> SEQ ID NO 10
<211> LENGTH: 20
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 10

Gly Gly Gly Gly Ser Gly Gly Gly Gly Ser Gly Gly Gly Gly Ser Gly
1               5                  10                  15

Gly Gly Gly Ser
        20

<210> SEQ ID NO 11
<211> LENGTH: 25
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 11

Gly Gly Gly Gly Ser Gly Gly Gly Gly Ser Gly Gly Gly Gly Ser Gly
1               5                  10                  15

Gly Gly Gly Ser Gly Gly Gly Gly Ser
        20                  25

<210> SEQ ID NO 12
<211> LENGTH: 35
<212> TYPE: PRT
<213> ORGANISM: Artificial Sequence
<220> FEATURE:
<221> NAME/KEY: source
<223> OTHER INFORMATION: /note="Description of Artificial Sequence:
```

Synthetic polypeptide"

<400> SEQUENCE: 12

Gly Gly Gly Gly Ser Gly Gly Gly Gly Ser Gly Gly Gly Gly Ser Gly
1               5                   10                  15

Gly Gly Gly Ser Gly Gly Gly Gly Ser Gly Gly Gly Gly Ser Gly Gly
            20                  25                  30

Gly Gly Ser
        35

<210> SEQ ID NO 13
<211> LENGTH: 40
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 13

Gly Gly Gly Gly Ser Gly Gly Gly Gly Ser Gly Gly Gly Gly Ser Gly
1               5                   10                  15

Gly Gly Gly Ser Gly Gly Gly Gly Ser Gly Gly Gly Gly Ser Gly Gly
            20                  25                  30

Gly Gly Ser Gly Gly Gly Gly Ser
        35                  40

<210> SEQ ID NO 14
<211> LENGTH: 50
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 14

Gly Gly Gly Gly Ser Gly Gly Gly Gly Ser Gly Gly Gly Gly Ser Gly
1               5                   10                  15

Gly Gly Gly Ser Gly Gly Gly Gly Ser Gly Gly Gly Gly Ser Gly Gly
            20                  25                  30

Gly Gly Ser Gly Gly Gly Gly Ser Gly Gly Gly Gly Ser Gly Gly Gly
        35                  40                  45

Gly Ser
    50

<210> SEQ ID NO 15
<211> LENGTH: 55
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 15

Gly Gly Gly Gly Ser Gly Gly Gly Gly Ser Gly Gly Gly Gly Ser Gly
1               5                   10                  15

Gly Gly Gly Ser Gly Gly Gly Gly Ser Gly Gly Gly Gly Ser Gly Gly
            20                  25                  30

Gly Gly Ser Gly Gly Gly Gly Ser Gly Gly Gly Gly Ser Gly Gly Gly
        35                  40                  45

```
Gly Ser Gly Gly Gly Gly Ser
    50              55

<210> SEQ ID NO 16
<211> LENGTH: 7
<212> TYPE: PRT
<213> ORGANISM: Simian virus 40

<400> SEQUENCE: 16

Pro Lys Lys Lys Arg Lys Val
1               5

<210> SEQ ID NO 17
<211> LENGTH: 16
<212> TYPE: PRT
<213> ORGANISM: Unknown
<220> FEATURE:
<223> OTHER INFORMATION: Description of Unknown:
      Nucleoplasmin bipartite NLS sequence

<400> SEQUENCE: 17

Lys Arg Pro Ala Ala Thr Lys Lys Ala Gly Gln Ala Lys Lys Lys Lys
1               5                   10                  15

<210> SEQ ID NO 18
<211> LENGTH: 9
<212> TYPE: PRT
<213> ORGANISM: Unknown
<220> FEATURE:
<223> OTHER INFORMATION: Description of Unknown:
      C-myc NLS sequence

<400> SEQUENCE: 18

Pro Ala Ala Lys Arg Val Lys Leu Asp
1               5

<210> SEQ ID NO 19
<211> LENGTH: 11
<212> TYPE: PRT
<213> ORGANISM: Unknown
<220> FEATURE:
<223> OTHER INFORMATION: Description of Unknown:
      C-myc NLS sequence

<400> SEQUENCE: 19

Arg Gln Arg Arg Asn Glu Leu Lys Arg Ser Pro
1               5                   10

<210> SEQ ID NO 20
<211> LENGTH: 38
<212> TYPE: PRT
<213> ORGANISM: Homo sapiens

<400> SEQUENCE: 20

Asn Gln Ser Ser Asn Phe Gly Pro Met Lys Gly Gly Asn Phe Gly Gly
1               5                   10                  15

Arg Ser Ser Gly Pro Tyr Gly Gly Gly Gly Gln Tyr Phe Ala Lys Pro
            20                  25                  30

Arg Asn Gln Gly Gly Tyr
        35

<210> SEQ ID NO 21
<211> LENGTH: 42
<212> TYPE: PRT
<213> ORGANISM: Unknown
<220> FEATURE:
```

<223> OTHER INFORMATION: Description of Unknown:
      IBB domain from importin-alpha sequence

<400> SEQUENCE: 21

Arg Met Arg Ile Glx Phe Lys Asn Lys Gly Lys Asp Thr Ala Glu Leu
1               5                   10                  15

Arg Arg Arg Arg Val Glu Val Ser Val Glu Leu Arg Lys Ala Lys Lys
            20                  25                  30

Asp Glu Gln Ile Leu Lys Arg Arg Asn Val
        35                  40

<210> SEQ ID NO 22
<211> LENGTH: 8
<212> TYPE: PRT
<213> ORGANISM: Unknown
<220> FEATURE:
<223> OTHER INFORMATION: Description of Unknown:
      Myoma T protein sequence

<400> SEQUENCE: 22

Val Ser Arg Lys Arg Pro Arg Pro
1               5

<210> SEQ ID NO 23
<211> LENGTH: 8
<212> TYPE: PRT
<213> ORGANISM: Unknown
<220> FEATURE:
<223> OTHER INFORMATION: Description of Unknown:
      Myoma T protein sequence

<400> SEQUENCE: 23

Pro Pro Lys Lys Ala Arg Glu Asp
1               5

<210> SEQ ID NO 24
<211> LENGTH: 8
<212> TYPE: PRT
<213> ORGANISM: Homo sapiens

<400> SEQUENCE: 24

Pro Gln Pro Lys Lys Lys Pro Leu
1               5

<210> SEQ ID NO 25
<211> LENGTH: 12
<212> TYPE: PRT
<213> ORGANISM: Mus musculus

<400> SEQUENCE: 25

Ser Ala Leu Ile Lys Lys Lys Lys Lys Met Ala Pro
1               5                   10

<210> SEQ ID NO 26
<211> LENGTH: 5
<212> TYPE: PRT
<213> ORGANISM: Influenza virus

<400> SEQUENCE: 26

Asp Arg Leu Arg Arg
1               5

<210> SEQ ID NO 27
<211> LENGTH: 7
<212> TYPE: PRT

<213> ORGANISM: Influenza virus

<400> SEQUENCE: 27

Pro Lys Gln Lys Lys Arg Lys
1               5

<210> SEQ ID NO 28
<211> LENGTH: 10
<212> TYPE: PRT
<213> ORGANISM: Hepatitus delta virus

<400> SEQUENCE: 28

Arg Lys Leu Lys Lys Ile Lys Lys Leu
1               5                   10

<210> SEQ ID NO 29
<211> LENGTH: 10
<212> TYPE: PRT
<213> ORGANISM: Mus musculus

<400> SEQUENCE: 29

Arg Glu Lys Lys Lys Phe Leu Lys Arg Arg
1               5                   10

<210> SEQ ID NO 30
<211> LENGTH: 20
<212> TYPE: PRT
<213> ORGANISM: Homo sapiens

<400> SEQUENCE: 30

Lys Arg Lys Gly Asp Glu Val Asp Gly Val Asp Glu Val Ala Lys Lys
1               5                   10                  15

Lys Ser Lys Lys
            20

<210> SEQ ID NO 31
<211> LENGTH: 17
<212> TYPE: PRT
<213> ORGANISM: Homo sapiens

<400> SEQUENCE: 31

Arg Lys Cys Leu Gln Ala Gly Met Asn Leu Glu Ala Arg Lys Thr Lys
1               5                   10                  15

Lys

<210> SEQ ID NO 32
<211> LENGTH: 12
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 32
acttgtttaa gt                                                           12

<210> SEQ ID NO 33
<211> LENGTH: 12
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

```
<220> FEATURE:
<221> NAME/KEY: modified_base
<222> LOCATION: (1)..(4)
<223> OTHER INFORMATION: a, c, t, g, unknown or other
<220> FEATURE:
<221> NAME/KEY: modified_base
<222> LOCATION: (9)..(12)
<223> OTHER INFORMATION: a, c, t, g, unknown or other
<220> FEATURE:
<221> NAME/KEY: source
<223> OTHER INFORMATION: /note="See specification as filed for detailed
      description of substitutions and preferred embodiments"

<400> SEQUENCE: 33
nnnngtttnn nn                                                           12

<210> SEQ ID NO 34
<211> LENGTH: 16
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 34
ggcaccgagt cggtgc                                                       16

<210> SEQ ID NO 35
<211> LENGTH: 30
<212> TYPE: RNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (8)..(20)
<223> OTHER INFORMATION: a, c, u, g, unknown or other
<220> FEATURE:
<221> NAME/KEY: modified_base
<222> LOCATION: (23)..(23)
<223> OTHER INFORMATION: a, c, u, g, unknown or other
<220> FEATURE:
<221> NAME/KEY: source
<223> OTHER INFORMATION: /note="See specification as filed for detailed
      description of substitutions and preferred embodiments"

<400> SEQUENCE: 35
gyyyyagnnn nnnnnnnnnn aanuurrrru                                        30

<210> SEQ ID NO 36
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: MOD_RES
<222> LOCATION: (2)..(2)
<223> OTHER INFORMATION: Aminohexanoyl
<220> FEATURE:
<221> NAME/KEY: MOD_RES
<222> LOCATION: (5)..(5)
<223> OTHER INFORMATION: Aminohexanoyl
<220> FEATURE:
<221> NAME/KEY: MOD_RES
<222> LOCATION: (8)..(8)
<223> OTHER INFORMATION: Aminohexanoyl
<220> FEATURE:
```

<221> NAME/KEY: MOD_RES
<222> LOCATION: (11)..(11)
<223> OTHER INFORMATION: Aminohexanoyl

<400> SEQUENCE: 36

Arg Xaa Arg Arg Xaa Arg Arg Xaa Arg Xaa Arg
1               5                   10

<210> SEQ ID NO 37
<211> LENGTH: 20
<212> TYPE: DNA
<213> ORGANISM: Homo sapiens

<400> SEQUENCE: 37
gagtccgagc agaagaagaa        20

<210> SEQ ID NO 38
<211> LENGTH: 20
<212> TYPE: DNA
<213> ORGANISM: Homo sapiens

<400> SEQUENCE: 38
gagtcctagc aggagaagaa        20

<210> SEQ ID NO 39
<211> LENGTH: 20
<212> TYPE: DNA
<213> ORGANISM: Homo sapiens

<400> SEQUENCE: 39
gagtctaagc agaagaagaa        20

<210> SEQ ID NO 40
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 40
tgggggtact ggacagaaag        20

<210> SEQ ID NO 41
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 41
ttcggttgga gccagataag        20

<210> SEQ ID NO 42
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 42
cccttcctgg aaagacaaca                                          20

<210> SEQ ID NO 43
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 43
cgcccagcct tatctgtaat                                          20

<210> SEQ ID NO 44
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 44
aacccaatgc tttttccaca                                          20

<210> SEQ ID NO 45
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 45
ccctggatca ctgcttttgt                                          20

<210> SEQ ID NO 46
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 46
gctctgcaag gctttctcat                                          20

<210> SEQ ID NO 47
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 47
cccgtctcct tgtttctctg                                          20

<210> SEQ ID NO 48
<211> LENGTH: 20
<212> TYPE: DNA
<213> ORGANISM: Artificial Sequence
<220> FEATURE:
<221> NAME/KEY: source

```
<223> OTHER INFORMATION: /note="Description of Artificial Sequence:
      Synthetic primer"

<400> SEQUENCE: 48
aaccggtttt gcggataagt                                              20

<210> SEQ ID NO 49
<211> LENGTH: 19
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 49
accagagtgg gtgggaaag                                               19

<210> SEQ ID NO 50
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 50
tactgaccca tgagcacagc                                              20

<210> SEQ ID NO 51
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 51
ccccactgcc atcctactta                                              20

<210> SEQ ID NO 52
<211> LENGTH: 17
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 52
caaaccgagt tctccag                                                 17

<210> SEQ ID NO 53
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 53
gtcttgaggc cttcgctaat                                              20

<210> SEQ ID NO 54
```

```
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 54
ggtttgaggg acgtcgtagt                                                     20

<210> SEQ ID NO 55
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 55
cctttctcct tcccttcttt                                                     20

<210> SEQ ID NO 56
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 56
gagggtcggg acaaagttta                                                     20

<210> SEQ ID NO 57
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 57
cgaaagagcg gaagagaaac                                                     20

<210> SEQ ID NO 58
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 58
gggggtacaa ctggttgatg                                                     20

<210> SEQ ID NO 59
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 59
```
gacctctgac ccatgaggaa                                               20

<210> SEQ ID NO 60
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 60
attcaacccc gaggagttct                                               20

<210> SEQ ID NO 61
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 61
ggatgtccgt cttcacaagg                                               20

<210> SEQ ID NO 62
<211> LENGTH: 19
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 62
tccctccact cggaaggac                                                19

<210> SEQ ID NO 63
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 63
ctggtgcatt ttcggttgtt g                                             21

<210> SEQ ID NO 64
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 64
ggcttgtacc ccacaacatc                                               20

<210> SEQ ID NO 65
<211> LENGTH: 20
<212> TYPE: DNA
<213> ORGANISM: Artificial Sequence
<220> FEATURE:

```
<221> NAME/KEY: source
<223> OTHER INFORMATION: /note="Description of Artificial Sequence:
      Synthetic primer"

<400> SEQUENCE: 65
gggtagatgc agctcctcag                                              20

<210> SEQ ID NO 66
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 66
tgcggcctct atcacaagat g                                            21

<210> SEQ ID NO 67
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 67
ctgcccgttt actgacaatc a                                            21

<210> SEQ ID NO 68
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 68
acacagttca ccttcgacca g                                            21

<210> SEQ ID NO 69
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 69
ctgtggtgga ccagttagag g                                            21

<210> SEQ ID NO 70
<211> LENGTH: 18
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 70
agcacatcgc tcagacac                                                18
```

```
<210> SEQ ID NO 71
<211> LENGTH: 19
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 71
gcccaatacg accaaatcc                                                   19

<210> SEQ ID NO 72
<211> LENGTH: 16
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 72
ttcacaagcc ccacca                                                      16

<210> SEQ ID NO 73
<211> LENGTH: 17
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 73
ctgggtcttc atcctga                                                     17

<210> SEQ ID NO 74
<211> LENGTH: 18
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 74
gcttatttaa cgggccac                                                    18

<210> SEQ ID NO 75
<211> LENGTH: 16
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 75
tgcaaacatg ggcagt                                                      16

<210> SEQ ID NO 76
<211> LENGTH: 22
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
```

<400> SEQUENCE: 76
gatcgcgagg acccgttccg cc                                              22

<210> SEQ ID NO 77
<211> LENGTH: 22
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic oligonucleotide"

<400> SEQUENCE: 77
gactcgtcac atggggttgc ga                                              22

<210> SEQ ID NO 78
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic oligonucleotide"

<400> SEQUENCE: 78
gacggaggaa gtacacagct                                                 20

<210> SEQ ID NO 79
<211> LENGTH: 19
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic oligonucleotide"

<400> SEQUENCE: 79
ggagaggccc ctgtcgcgt                                                  19

<210> SEQ ID NO 80
<211> LENGTH: 22
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic oligonucleotide"

<400> SEQUENCE: 80
gattggttag gagagtgtgt at                                              22

<210> SEQ ID NO 81
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic oligonucleotide"

<400> SEQUENCE: 81
gggcagataa gggaatcagt                                                 20

<210> SEQ ID NO 82
<211> LENGTH: 20
<212> TYPE: DNA
<213> ORGANISM: Artificial Sequence -continued

```
<220> FEATURE:
<221> NAME/KEY: source
<223> OTHER INFORMATION: /note="Description of Artificial Sequence:
      Synthetic oligonucleotide"

<400> SEQUENCE: 82
gcgctcagga agagaagcca                                                    20

<210> SEQ ID NO 83
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 83
gcggagagat aagcagtccg g                                                  21

<210> SEQ ID NO 84
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 84
gtatagcccg gtaggaaatg g                                                  21

<210> SEQ ID NO 85
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 85
gggtaggggc agcaggccca                                                    20

<210> SEQ ID NO 86
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 86
ggttcggccg ccttggggat g                                                  21

<210> SEQ ID NO 87
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 87
gagtcccctg aggagcgggg c                                                  21
```

<210> SEQ ID NO 88
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 88
gtggagtcga aaccggggtc                                           20

<210> SEQ ID NO 89
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 89
ggagccagat aagtcaacgg                                           20

<210> SEQ ID NO 90
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 90
gtgtgtccca cctgattact                                           20

<210> SEQ ID NO 91
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 91
ggaatcgacc ttccttgagg                                           20

<210> SEQ ID NO 92
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 92
gcctggaaag acaacagctt g                                         21

<210> SEQ ID NO 93
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

```
<400> SEQUENCE: 93
gaccacggca gcctgctctg a                                          21

<210> SEQ ID NO 94
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 94
gacaaccgag ctgccctgta                                            20

<210> SEQ ID NO 95
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 95
gagcttccgt gggcccctcc                                            20

<210> SEQ ID NO 96
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 96
gccttgccct gcttctatca g                                          21

<210> SEQ ID NO 97
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 97
gcccattggg gtagaggctg                                            20

<210> SEQ ID NO 98
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 98
gtggaaaacc accgtaaagg a                                          21

<210> SEQ ID NO 99
<211> LENGTH: 20
<212> TYPE: DNA
```

<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 99
gctggtgtca gcctcacaac                                              20

<210> SEQ ID NO 100
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 100
gcttggtgca gaccgagacc a                                            21

<210> SEQ ID NO 101
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 101
gcgcccatga atgtatagca g                                            21

<210> SEQ ID NO 102
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 102
gctggagttg aacttagctg a                                            21

<210> SEQ ID NO 103
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 103
gctgtagtaa ttccagcgag                                              20

<210> SEQ ID NO 104
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 104
gcgctgcggg cgtcctggga a                                            21

<210> SEQ ID NO 105
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 105
gacaagctgc aaggtgtaaa t                                            21

<210> SEQ ID NO 106
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 106
gcagctgatg gtatccacta g                                            21

<210> SEQ ID NO 107
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 107
gacgggccac tcttattagg a                                            21

<210> SEQ ID NO 108
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 108
gatgacaaaa ctacgacgta c                                            21

<210> SEQ ID NO 109
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 109
gttgtcatct tcaggcaacc c                                            21

<210> SEQ ID NO 110
<211> LENGTH: 19
<212> TYPE: DNA
<213> ORGANISM: Artificial Sequence
<220> FEATURE:
<221> NAME/KEY: source
<223> OTHER INFORMATION: /note="Description of Artificial Sequence:

Synthetic oligonucleotide"

<400> SEQUENCE: 110
ggggcgggcg ggcacgaat                                                19

<210> SEQ ID NO 111
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 111
gctggggaca cagggtgcca t                                             21

<210> SEQ ID NO 112
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 112
gaaggctcac tccgcaccct c                                             21

<210> SEQ ID NO 113
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 113
ggtacaagat tgtaggaatg c                                             21

<210> SEQ ID NO 114
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 114
gagggcagct cggttgtcac a                                             21

<210> SEQ ID NO 115
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 115
gcgctcctca ttacgcctta c                                             21

<210> SEQ ID NO 116
<211> LENGTH: 21

```
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 116
ggagagcagt gagtgacctc a                                              21

<210> SEQ ID NO 117
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 117
ggctctcctg ggtactatcc c                                              21

<210> SEQ ID NO 118
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 118
gcagcattca gggcaaatga g                                              21

<210> SEQ ID NO 119
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 119
ggacactgct gtatccctg a                                               21

<210> SEQ ID NO 120
<211> LENGTH: 109
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"
<220> FEATURE:
<221> NAME/KEY: modified_base
<222> LOCATION: (44)..(63)
<223> OTHER INFORMATION: a, c, t, g, unknown or other

<400> SEQUENCE: 120
tccaatgtcc cacgacgtat cttgtggaaa ggacgaaaca ccgnnnnnnn nnnnnnnnnn    60
nnngtttaag agctatgctg gaaacagcat aggccaaaac cctccgatg               109

<210> SEQ ID NO 121
<211> LENGTH: 35
<212> TYPE: DNA
<213> ORGANISM: Artificial Sequence
<220> FEATURE:
```

<221> NAME/KEY: source
<223> OTHER INFORMATION: /note="Description of Artificial Sequence:
      Synthetic oligonucleotide"

<400> SEQUENCE: 121
ggctttatat atcttgtgga aaggacgaaa caccg                         35

<210> SEQ ID NO 122
<211> LENGTH: 43
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 122
cttatttaaa cttgctatgc tgtttccagc atagctctta aac                43

<210> SEQ ID NO 123
<211> LENGTH: 60
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (30)..(33)
<223> OTHER INFORMATION: a, c, t, g, unknown or other

<400> SEQUENCE: 123
aatgatacgg cgaccaccga gatctacacn nnncgatttc ttggctttat atatcttgtg    60

<210> SEQ ID NO 124
<211> LENGTH: 53
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (25)..(32)
<223> OTHER INFORMATION: a, c, t, g, unknown or other

<400> SEQUENCE: 124
caagcagaag acggcatacg agatnnnnnn nncggtgcca cttttcaag ttg            53

<210> SEQ ID NO 125
<211> LENGTH: 44
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 125
cgatttcttg gctttatata tcttgtggaa aggacgaaac accg                44

<210> SEQ ID NO 126
<211> LENGTH: 37
<212> TYPE: DNA
<213> ORGANISM: Artificial Sequence
<220> FEATURE:
<221> NAME/KEY: source

```
<223> OTHER INFORMATION: /note="Description of Artificial Sequence:
      Synthetic oligonucleotide"

<400> SEQUENCE: 126
aaggctagtc cgttatcaac ttgaaaaagt ggcaccg                              37

<210> SEQ ID NO 127
<211> LENGTH: 50
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 127
caatgtatct tatcatgtct gtggaaaacg tttgtttctg agggcaaacg               50

<210> SEQ ID NO 128
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 128
gctggccacg acgggcgttc cttgccctgc tggcacacca taaat                    45

<210> SEQ ID NO 129
<211> LENGTH: 50
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 129
caatgtatct tatcatgtct gtggaaaacg caacagaaaa atgggccttg               50

<210> SEQ ID NO 130
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 130
gctggccacg acgggcgttc cttgccagga aacactggcc gaata                    45

<210> SEQ ID NO 131
<211> LENGTH: 50
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 131
caatgtatct tatcatgtct gtggaaaacg tcctttggac ctgagtggtg               50

<210> SEQ ID NO 132
```

```
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 132
gctggccacg acgggcgttc cttgcaatcc ttgggtggga atacg            45

<210> SEQ ID NO 133
<211> LENGTH: 50
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 133
caatgtatct tatcatgtct gtggaaaacg aagggggtct cctgtacgtc       50

<210> SEQ ID NO 134
<211> LENGTH: 48
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 134
gctggccacg acgggcgttc cttgccatct aaattcctcc cctattcg         48

<210> SEQ ID NO 135
<211> LENGTH: 50
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 135
caatgtatct tatcatgtct gtggaaaacg tgtccccttg gtttcctctt       50

<210> SEQ ID NO 136
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 136
gctggccacg acgggcgttc cttgcaccaa gtatggtgcc tgtgc            45

<210> SEQ ID NO 137
<211> LENGTH: 50
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 137
```
caatgtatct tatcatgtct gtggaaaacg ggacagggac atggtcagaa    50

<210> SEQ ID NO 138
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 138
gctggccacg acgggcgttc cttgcggcac acaataggct ttcca    45

<210> SEQ ID NO 139
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 139
tatcttatca tgtctgtgga aaacgagtgg ggacatgatt ccaaa    45

<210> SEQ ID NO 140
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 140
gctggccacg acgggcgttc cttgcgccat gacggtgttt atcgt    45

<210> SEQ ID NO 141
<211> LENGTH: 50
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 141
caatgtatct tatcatgtct gtggaaaacg ccttgccatg ctccaagtta    50

<210> SEQ ID NO 142
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 142
gctggccacg acgggcgttc cttgcccaga aacctccacc ctagc    45

<210> SEQ ID NO 143
<211> LENGTH: 50
<212> TYPE: DNA
<213> ORGANISM: Artificial Sequence
<220> FEATURE:

<221> NAME/KEY: source
<223> OTHER INFORMATION: /note="Description of Artificial Sequence:
      Synthetic primer"

<400> SEQUENCE: 143
caatgtatct tatcatgtct gtggaaaacg gtgcctgtca ccttctgcat           50

<210> SEQ ID NO 144
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 144
gctggccacg acgggcgttc cttgcgtttc acagcatgtg ctcca               45

<210> SEQ ID NO 145
<211> LENGTH: 40
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 145
gacgtgtgct cttccgatct ggctggatac ctttcccatt                     40

<210> SEQ ID NO 146
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 146
cacgacgctc ttccgatctc tgcaaacatg ggcagtcta                      39

<210> SEQ ID NO 147
<211> LENGTH: 163
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"
<220> FEATURE:
<221> NAME/KEY: modified_base
<222> LOCATION: (92)..(95)
<223> OTHER INFORMATION: a, c, t, g, unknown or other

<400> SEQUENCE: 147
gcagtctaag gggaagggat gggaggaaac gctaaagccc aaggtttcag aggtgatgag    60
ctcccaaatc tctccagatc tgctatctct cnnnnctaat aagagtggcc cgttaaataa   120
gctgccaatg aaaatgggaa aggtatccag ccgcccactt ttg                    163

<210> SEQ ID NO 148
<211> LENGTH: 20
<212> TYPE: DNA
<213> ORGANISM: Artificial Sequence
<220> FEATURE:
<221> NAME/KEY: source

```
<223> OTHER INFORMATION: /note="Description of Artificial Sequence:
      Synthetic primer"

<400> SEQUENCE: 148
atccctaatg cctgccttt                                                    20

<210> SEQ ID NO 149
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 149
ctctcttggg tctccagtgc                                                   20

<210> SEQ ID NO 150
<211> LENGTH: 40
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 150
gacgtgtgct cttccgatct atccctaatg cctgccttt                              40

<210> SEQ ID NO 151
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 151
cacgacgctc ttccgatcta aactccttcc ttccctga                               39

<210> SEQ ID NO 152
<211> LENGTH: 22
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 152
tcaatttcct ggacacttca aa                                                22

<210> SEQ ID NO 153
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 153
ggaaaggagg caggaaacag                                                   20

<210> SEQ ID NO 154
```

```
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 154
accaagtatg gtgcctgtgc                                                    20

<210> SEQ ID NO 155
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 155
tgtccccttg gtttcctctt                                                    20

<210> SEQ ID NO 156
<211> LENGTH: 44
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 156
gacgtgtgct cttccgatct ccacttgttt gccctactta tctt                         44

<210> SEQ ID NO 157
<211> LENGTH: 41
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 157
cacgacgctc ttccgatctg agcagctatg aatctgagca a                            41

<210> SEQ ID NO 158
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 158
ggcacacaat aggctttcca                                                    20

<210> SEQ ID NO 159
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 159
```

```
ggacagggac atggtcagaa                                               20

<210> SEQ ID NO 160
<211> LENGTH: 40
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 160
gacgtgtgct cttccgatct ttgagcatat gaggctggaa                         40

<210> SEQ ID NO 161
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic primer"

<400> SEQUENCE: 161
cacgacgctc ttccgatcta tcatcggtca tctccttgc                          39

<210> SEQ ID NO 162
<211> LENGTH: 16
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 162
tcaccccagg aacgct                                                   16

<210> SEQ ID NO 163
<211> LENGTH: 18
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 163
atcaccccag gaatgctt                                                 18

<210> SEQ ID NO 164
<211> LENGTH: 22
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 164
cttattagct aagagagata gc                                            22

<210> SEQ ID NO 165
<211> LENGTH: 19
<212> TYPE: DNA
<213> ORGANISM: Artificial Sequence
<220> FEATURE:
```

```
<221> NAME/KEY: source
<223> OTHER INFORMATION: /note="Description of Artificial Sequence:
      Synthetic probe"

<400> SEQUENCE: 165
tattagcccg gagagatag                                                  19

<210> SEQ ID NO 166
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 166
ttattagatc ggagagatag c                                               21

<210> SEQ ID NO 167
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 167
acgggccact cttattagga agg                                             23
```

SYSTEMATIC SCREENING AND MAPPING OF REGULATORY ELEMENTS IN NON-CODING GENOMIC REGIONS, METHODS, COMPOSITIONS, AND APPLICATIONS THEREOF

CROSS REFERENCE TO RELATED APPLICATIONS

This application is a U.S. National Stage Application of PCT/US2017/053795 filed on Sep. 27, 2017, which claims priority to U.S. Provisional Application No. 62/401,149 filed Sep. 28, 2016, U.S. Provisional Application No. 62/401,594 filed Sep. 29, 2016, and U.S. Provisional Application No. 62/463,559 filed Feb. 24, 2017, each of which is incorporated herein by reference in its entirety.

SEQUENCE LISTING

The instant application contains a Sequence Listing which has been submitted electronically in ASCII format and is hereby incorporated by reference in its entirety. Said ASCII copy, created on Dec. 12, 2017, is named 114203-0198_SL.txt and is 45,603 bytes in size.

FIELD OF THE INVENTION

The invention relates to methods and compositions for identifying regulatory elements in non-coding genomic regions. The regulatory elements encompass transcriptional enhancers and repressors of genes associated with disease phenotypes in mammalian or agricultural trait of interest in plants.

BACKGROUND OF THE INVENTION

Ninety percent of the genetic variations that affect human disease are in the non-coding regions. Accordingly, a fundamental goal in modern biology is to identify and characterize the non-coding regulatory elements that control gene expression in development and disease. Studies of individual regulatory elements have revealed principles of their function, such as the ability of enhancers to recruit activating transcription factors, modify chromatin state, and physically interact with target genes (1, 2). From these insights, systematic mapping of chromatin state and chromosome conformation across cell types has been used to identify putative regulatory elements (3-6). However, these measurements do not determine which genes are regulated or assess the quantitative effects on gene expression. Indeed, the rules that connect regulatory elements with their target genes in the genome are complex. Regulatory elements do not necessarily affect the closest gene, but instead may act across long distances (7, 8). A need exists to assess which regulatory element controls a given gene and which gene is regulated by a given regulatory element (2, 3, 8).

Citation or identification of any document in this application is not an admission that such document is available as prior art to the present invention.

SUMMARY OF THE INVENTION

Preferred statements (features) and embodiments of this invention are set herein below. Each statements and embodiments of the invention so defined may be combined with any other statement and/or embodiments unless clearly indicated to the contrary. In particular, any feature indicated as being preferred or advantageous may be combined with any other feature or features or statements indicated as being preferred or advantageous. Hereto, the invention is in particular captured by any one or any combination of one or more of the below statements and embodiments, with any other statement and/or embodiments.

In one aspect, the invention provides for a method for identifying a putative regulatory element that regulates a gene (e.g., a gene associated with a disease phenotype in mammalians or a gene associated with an agricultural trait of interest in plants), comprising:
  obtaining a measure of intrinsic activity of a plurality of genomic elements;
  obtaining a measure of proximity between each of the genomic elements and the gene;
  scoring a predicted impact of each of the genomic elements on the gene as a function of the measure of intrinsic activity and the measure of proximity, wherein a plurality of predicted impacts scored are ranked to identify at least one genomic element as a putative regulatory element that regulates the gene.

In another aspect, the invention provides for a method for identifying a gene (e.g., a gene associated with a disease phenotype in mammalians or a gene associated with an agricultural trait of interest in plants) as regulated by a putative regulatory element, comprising:
  obtaining a measure of intrinsic activity of the putative regulatory element;
  obtaining a measure of proximity between the putative regulatory element and a plurality of genes; and
  scoring a predicted impact of the putative regulatory element on each of the genes as a function of the measure of intrinsic activity and the measure of proximity, wherein a plurality of predicted impacts scored are ranked to identify at least one gene as regulated by the putative regulatory element.

In a further aspect, the invention provides for a method for providing perturbation data for use in training, optimizing, and/or validating the scoring of predicted impact, comprising:
  introducing a library of guide RNAs into a population of cells, said cells either expressing an RNA-guided DNA binding protein or having the RNA-guided DNA binding protein or a coding sequence thereof introduced simultaneously or sequentially with the guide RNAs, wherein the guide RNAs target different non-coding genomic sequences within at least one genomic region;
  selecting cells based on a phenotype; and
  determining (i) relative representation of the guide RNAs present in the selected cells or (ii) deletion of genomic sequence targeted by pairs of the guide RNAs from the selected cells, wherein (i) the relative representation of the guide RNAs or (ii) the deletion of genomic sequence indicates the targeted genomic sequence as a regulatory element of a gene associated with the phenotype.

In a further aspect, the invention provides for a method for identifying an enhancer or repressor for a gene, comprising:
  introducing a library of guide RNAs into a population of cells, said cells either expressing an RNA-guided DNA binding protein or having the RNA-guided DNA binding protein or a coding sequence thereof introduced simultaneously or sequentially with the guide RNAs, wherein the guide RNAs target different non-coding genomic sequences within at least one genomic region;
  selecting cells based on a phenotype associated with reduced or increased expression of the gene; and determining (i) relative representation of the guide RNAs present in the selected cells or (ii) deletion of genomic sequence targeted by pairs of the guide RNAs from the selected cells, wherein (i) the relative representation of the guide RNAs or (ii) the deletion of genomic sequence indicates the targeted genomic sequence as an enhancer or repressor for the gene.

In an additional aspect, the invention provides for a composition comprising a population of cells obtainable or obtained by:
(a) introducing a library of guide RNAs into cells at an average ratio of no more than one guide RNA per cell, said cells either expressing a modified CRISPR effector protein that is not catalytically competent or having the modified CRISPR effector protein or a coding sequence thereof introduced simultaneously or sequentially with the guide RNAs, wherein the guide RNAs target different non-coding genomic sequences within at least one genomic region for transcriptional repression, or
(b) introducing a library of pairs of guide RNAs into cells at an average ratio of no more than one pair of guide RNAs per cell, said cells either expressing a catalytically active CRISPR effector protein or having the catalytically active CRISPR effector protein or a coding sequence thereof introduced simultaneously or sequentially with the guide RNAs, wherein the pairs of guide RNAs target different non-coding genomic sequences located in one or more genomic regions for deletion.

In yet a further aspect, the invention provides for a method for adoptive T cell therapy, comprising administering to a subject in need thereof an engineered T cell in which one or more enhancers listed in Table 3 have been mutated, deleted, repressed or inhibited through genome or epigenome editing.

In yet a further aspect, the invention provides for a method for treating cancer, comprising administering to a subject in need thereof a chimeric antigen receptor (CAR) or T-cell receptor (TCR) modified T cell, in which one or more enhancers listed in Table 3 have been mutated, deleted, repressed or inhibited through genome or epigenome editing.

In yet a further aspect, the invention provides for a method for treating inflammatory bowel disease, comprising reducing expression of a gene selected from IL6R, IL23R, IL12RB1, IL12RB2, and SMAD7 in a subject in need thereof, by mutating, deleting, repressing or inhibiting one or more enhancers listed in Table 4.

In yet a further aspect, the invention provides for a method for reducing risk of coronary artery disease, comprising modulating expression of a gene selected from ABCG5, ABCG8, APOA1, APOA1BP, APOA4, APOA5, APOB, APOBEC3B, APOBEC3C, APOBEC3F, APOC3, APOE, ANGPTL4, LIPA, LDLR, LDLRAP1, LPA, LPAR6, PCSK9, RILPL1, RILPL2, SORT1, TRIB1, and VLDLR in a subject in need thereof, by genome or epigenome editing of one or more enhancers listed in Table 2.

In yet an additional aspect, the invention provides for identifying a transcriptional enhancer or repressor associated with a desirable plant genotype or phenotype, comprising:
introducing a library of guide RNAs into a population of cells, wherein the cells are plant cells or plant protoplasts and either expressing an RNA-guided DNA binding protein or having the RNA-guided DNA binding protein or a coding sequence thereof introduced simultaneously or sequentially with the guide RNAs, wherein the guide RNAs target different non-coding genomic sequences within at least one genomic region;
selecting cells based on a desirable plant genotype or phenotype; and
determining (i) relative representation of the guide RNAs present in the selected cells or (ii) deletion of genomic sequence targeted by pairs of the guide RNAs from the selected cells, wherein (i) the relative representation of the guide RNAs or (ii) the deletion of genomic sequence indicates the targeted genomic sequence as a transcriptional enhancer or repressor for the gene.

In some embodiments, the method comprises exposing the plant cells, plant protoplasts, or tissues or plants derived therefrom to a stress condition selected from the group consisting of abiotic stress, drought stress, flood stress, heat stress, cold and frost stress, salt stress, heavy metal stress, low-nitrogen stress, disease stress, pest stress, herbicide stress, or a combination thereof, and selecting plant cells, plant protoplasts, or tissues or plants derived therefrom based on increased tolerance or resistance to the stress condition. In some embodiments, the method comprises quantitatively labeling single cells using fluorescence in situ hybridization (FISH) according to expression of an mRNA of interest and sorting labeled cells into a plurality of bins based on the expression of the mRNA of interest, and determining in each of the bins (i) relative representation of the guide RNAs present in the labeled cells or (ii) deletion of genomic sequence targeted by pairs of the guide RNAs from the labeled cells to identify a transcriptional enhancer or repressor regulating the gene encoding the mRNA of interest.

It is an object of the invention to not encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention. Nothing herein is intended as a promise.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings.

DETAILED DESCRIPTION OF THE INVENTION

Figure 1:
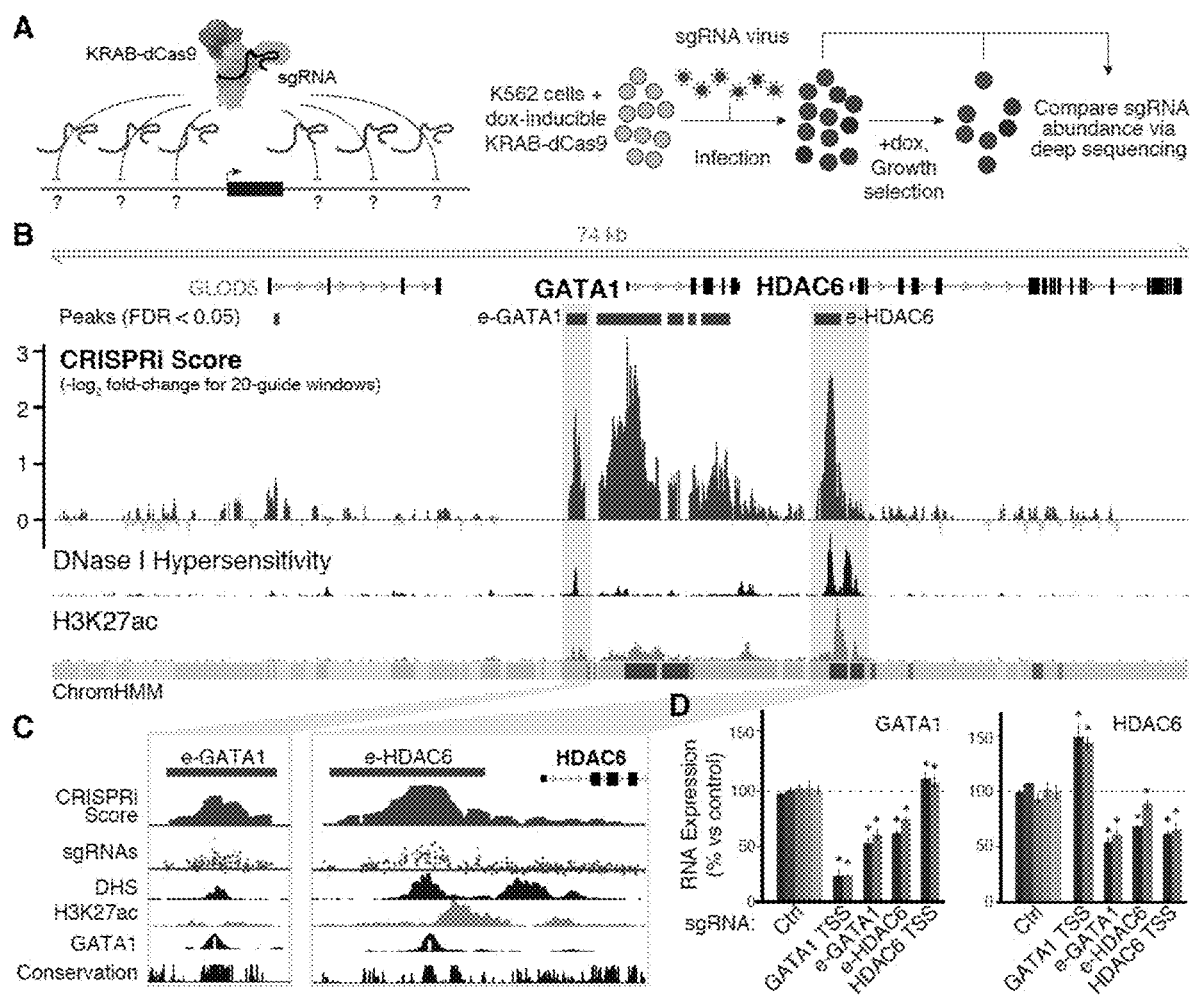
FIG. 1 shows systematic mapping of non-coding elements that regulate GATA1. (A) CRISPRi method for identifying gene regulatory elements. Cells expressing KRAB-dCas9 from a dox-inducible promoter are infected with a pool of single guide RNAs (sgRNAs) targeting every possible site across a region of interest. In a proliferation-based screen, cells expressing sgRNAs that target essential regulatory elements will be depleted in the final population. (B) CRISPRi screen results in the GATA1 locus. A high CRISPRi score indicates strong depletion over the course of the screen. Red boxes: Windows showing significant depletion compared to negative control sgRNAs (13). DNase I hypersensitivity, H3K27ac ChIP-Seq, and histone modification annotations (ChromHMM) in K562 cells are from ENCODE (4). (C) Close-up of e-GATA1 and e-HDAC6. sgRNA track shows CRISPRi scores for each individual sgRNA in the region. White bar in GATA1 ChIP-seq track represents the GATA1 motif. (D) qPCR for GATA1 and HDAC6 mRNA in cells expressing individual sgRNAs. KRAB-dCas9 expression was activated for 24 hours before measurement. Gray bars: different sgRNAs for each target. Ctrl: negative control sgRNAs without a genomic target. Error bars: 95% confidence intervals (CI) for the mean of 3 biological replicates (13). *: $p<0.05$ in T-test versus Ctrl.

The methods and tools described herein relate to the identification of relevant regulatory elements which can be of interest for genome editing, as well as the systematically interrogation of genomic regions in order to allow such identification.

According, one aspect of the invention relates to methods for identifying a putative regulatory element that regulates a gene, comprising:
obtaining a measure of intrinsic activity of a plurality of genomic elements;
obtaining a measure of proximity between each of the genomic elements and the gene;
scoring a predicted impact of each of the genomic elements on the gene as a function of the measure of intrinsic activity and the measure of proximity, wherein a plurality of predicted impacts scored are ranked to identify at least one genomic element as a putative regulatory element that regulates the gene.

Another aspect of the invention relates to methods for identifying a gene as regulated by a putative regulatory element, comprising:
obtaining a measure of intrinsic activity of the putative regulatory element;
obtaining a measure of proximity between the putative regulatory element and a plurality of genes; and
scoring a predicted impact of the putative regulatory element on each of the genes as a function of the measure of intrinsic activity and the measure of proximity, wherein a plurality of predicted impacts scored are ranked to identify at least one gene as regulated by the putative regulatory element.

In some embodiments, the method may further comprise training, optimizing, and/or validating the scoring of predicted impact using experimental or computational data describing functional interactions between the putative regulatory element and the genes. Source of such experimental or computational data can include perturbation data and association data.

Perturbation data can be obtained from, for example, perturbation-based screening such as those carried our using a DNA binding protein, aggregating data from previous studies that delete or inhibit regulatory elements one or a few at a time and observe the effects on gene expression, and any other method that allows for determining the effects of a non-coding region on gene expression.

Association data can include, for example, eQTL data in which specific genetic variants of known location are associated with changes in the expression of a gene, data of gene expression and chromatin state (DNase I hypersensitivity, ATAC-Seq, H3K27ac ChIP-Seq, Hi-C, etc.) across different cell types or cell contexts that allows drawing correlations in these features with changes in gene expression, and any other method that allows drawing associations between chromatin state and gene expression.

In some embodiments, the method may further comprise training, optimizing, and/or validating the scoring of predicted impact using perturbation data obtained from perturbation-based screening carried out by a DNA binding protein. The DNA binding protein can be, for example, a Cas protein, a zinc finger, a zinc finger nuclease (ZFN), a transcription activator-like effector (TALE), a transcription activator-like effector nuclease (TALEN), a meganuclease, or a modified version thereof.

In some embodiments, the measure of activity comprises DNase I hypersensitivity data. In some embodiments, the measure of activity comprises H3K27ac ChIP-Seq data. In some embodiments, the measure of activity comprises histone modification ChIP-seq data. In some embodiments, the measure of activity comprises transcription factor ChIP-seq data. In some embodiments, the measure of activity comprises p300 ChIP-Seq data. In some embodiments, the measure of activity comprises transcription factor binding motifs.

In some embodiments, the measure of proximity is determined using a nucleic acid proximity ligation assay. In some embodiments, the measure of proximity comprises Hi-C data. In some embodiments, the measure of proximity comprises in situ Hi-C data. In some embodiments, the measure of proximity comprises CHIA-PET data. In some embodiments, the measure of proximity comprises chromosome conformation capture derivatives. In some embodiments, the measure of proximity comprises predicted Hi-C maps.

In some embodiments, the measure of intrinsic activity and the measure of proximity are assigned the same weight in scoring the predicted impact. In some embodiments, the measure of intrinsic activity is assigned more weight than the measure of proximity. In some embodiments, the measure of proximity is assigned more weight than the measure of intrinsic activity.

In some embodiments, the predicted impact is scored as a function of one or more quantitative DNase I hypersensitivity, H3K27ac, and Hi-C values.

In some embodiments, the predicted impact is scored as $\log_2$ (H3K27ac RPM×DHS RPM×Hi-C contact×Hi-C contact).

In some embodiments, the predicted impact is further weighted by factors related to the local regulatory landscape, including features related to gene density, enhancer density, the presence of promoter-proximal regulatory elements, and/or the rank thereof.

In some embodiments, the method further comprises normalizing the predicted impact of an enhancer by the sum of the predicted impacts of all enhancers in the genomic region. In one specific embodiment, the normalized model can be represented by:

$$\% \text{ Effect } \Delta X_{e,g} = \frac{A_e \times P_{e,g}}{\sum_k A_e \times P_{e,g}}$$

$$\text{Activity } A_e = \left(^{i+R}\sqrt{H3K27ac_e \times DHS_e^R}\right)^y$$

$$\text{Proximity } P_{e,g} = (\max(HiC_{e,g}, HiC\text{Max}) + HiCPseudoCount)^s$$

In some embodiments, the method may further comprise identifying a regulatory element as a transcriptional enhancer based on the scoring and/or ranking of predicted impact. The identification can be based on the ranking of the predicted impact scored and/or comparison to the impact score of a control.

In some embodiments, the method may further comprise identifying a regulatory element as a transcriptional repressor based on the scoring and/or ranking of predicted impact. The identification can be based on the ranking of the predicted impact scored and/or comparison to the impact score of a control.

A further aspect of the invention relates to methods for providing perturbation data for use in training, optimizing, and/or validating the scoring of predicted impact, comprising:
  introducing a library of guide RNAs into a population of cells, said cells either expressing an RNA-guided DNA binding protein or having the RNA-guided DNA binding protein or a coding sequence thereof introduced simultaneously or sequentially with the guide RNAs, wherein the guide RNAs target different non-coding genomic sequences within at least one genomic region;
  selecting cells based on a phenotype; and
  determining (i) relative representation of the guide RNAs present in the selected cells or (ii) deletion of genomic sequence targeted by pairs of the guide RNAs from the selected cells, wherein (i) the relative representation of the guide RNAs or (ii) the deletion of genomic sequence indicates the targeted genomic sequence as a regulatory element of a gene associated with the phenotype.

A further aspect of the invention relates to methods for identifying an enhancer or repressor for a gene, comprising:
  introducing a library of guide RNAs into a population of cells, said cells either expressing an RNA-guided DNA binding protein or having the RNA-guided DNA binding protein or a coding sequence thereof introduced simultaneously or sequentially with the guide RNAs, wherein the guide RNAs target different non-coding genomic sequences within at least one genomic region;
  selecting cells based on a phenotype associated with reduced or increased expression of the gene; and
  determining (i) relative representation of the guide RNAs present in the selected cells or (ii) deletion of genomic sequence targeted by pairs of the guide RNAs from the selected cells, wherein (i) the relative representation of the guide RNAs or (ii) the deletion of genomic sequence indicates the targeted genomic sequence as an enhancer or repressor for the gene.

In some embodiments, the gene is involved in a metabolic or signal transduction pathway.

In some embodiments, the gene is associated with a disease phenotype, and the population of cells are relevant for the disease phenotype.

In some embodiments, the gene is a regulatory gene involved in coronary artery disease, and the population of cells are endothelial cells or adipocytes.

In some embodiments, the gene is a gene of monocyte, and the population of cells are monocytes.

In some embodiments, the gene is an immune regulatory gene involved in T cell dysfunction, and the population of cells are T cells. In some embodiments, the method further comprises identifying a transcriptional enhancer or repressor that regulates the immune regulatory gene in tumor-filtrating T cell but not in circulating T cells based on chromatin state profiles of in vivo T cell subpopulations.

In some embodiments, the RNA-guided DNA binding protein is a CRISPR effector protein.

In some embodiments, the CRISPR effector protein is a catalytically active Cas protein, and wherein the guide RNAs are introduced as pairs of guide RNAs, each pair designed for targeted deletion of the non-coding genomic sequence.

In some embodiments, each pair of guide RNAs target 20-5,000 bp of genomic sequence for deletion. In some embodiments, each pair of guide RNAs target 50-2,000 bp of genomic sequence for deletion. In some embodiments, each pair of guide RNAs target 100-1,000 bp of genomic sequence for deletion.

In some embodiments, the CRISPR effector protein is a modified Cas protein. In some embodiments, the modified Cas protein is a modified Cas9, Cpf1, C2c1 or C2c3.

In some embodiments, the modified Cas protein is not catalytically competent. In some embodiments, the modified Cas protein comprises one or more mutations compared to a wild type Cas protein.

In some embodiments, the guide RNAs are introduced using a vector encoding two or more guide RNAs, wherein each of said guide RNAs targets a different non-coding genomic sequence for multiplex perturbation.

In some embodiments, the modified Cas is fused to a transcription repression domain. In some embodiments, the modified Cas is fused to a KRAB domain. In some embodiments, the modified Cas is fused to a NuE domain, an NcoR domain, a SID domain, or a SID4X domain.

In some embodiments, the modified Cas is fused to a transcription activation domain. In some embodiments, the modified Cas is fused to a VP64 domain, a P65 domain, a MyoD1 domain, or a HSF1 domain.

In some embodiments, the modified Cas is not fused to another domain.

In some embodiments, at least one of the guide RNAs comprises a loop modified by insertion of at least one distinct aptamer RNA sequence adapted to bind to an adaptor protein.

In some embodiments, the aptamer RNA sequence is adapted to bind to an adaptor protein comprising a transcription repression domain. In some embodiments, the aptamer RNA sequence is adapted to bind to an adaptor protein comprising a KRAB domain. In some embodiments, the aptamer RNA sequence is adapted to bind to an adaptor protein comprising a NuE domain, an NcoR domain, a SID domain, or a SID4X domain.

In some embodiments, the aptamer RNA sequence is adapted to bind to an adaptor protein comprising a transcription activation domain. In some embodiments, the aptamer RNA sequence is adapted to bind to an adaptor protein comprising a VP64 domain, a P65 domain, a MyoD1 domain, or a HSF1 domain.

In some embodiments, the population of cells are introduced with an average of no more than one guide RNA per cell. In some embodiments, the population of cells are introduced with an average of more than one guide RNA per cell.

In some embodiments, the library introduced into the population of cells comprises at least 100 guide RNAs or guide RNA pairs targeting at least 100 different non-coding genomic sequences. In some embodiments, the library introduced into the population of cells comprises at least 200 guide RNAs or guide RNA pairs targeting at least 200 different non-coding genomic sequences. In some embodiments, the library introduced into the population of cells comprises at least 500 guide RNAs or guide RNA pairs targeting at least 500 different non-coding genomic sequences. In some embodiments, the library introduced into the population of cells comprises at least 1,000 guide RNAs or guide RNA pairs targeting at least 1,000 different non-coding genomic sequences. In some embodiments, the library introduced into the population of cells comprises at least 2,000 guide RNAs or guide RNA pairs targeting at least 2,000 different non-coding genomic sequences. In some embodiments, the library introduced into the population of cells comprises at least 5,000 guide RNAs or guide RNA pairs targeting at least 5,000 different non-coding genomic sequences. In some embodiments, the library introduced into the population of cells comprises at least 10,000 guide RNAs or guide RNA pairs targeting at least 10,000 different non-coding genomic sequences.

It is envisaged that the guide RNAs of the library should target a representative number of genomic sequences in one genomic region. For instance the guide RNAs can target at least 50, more particularly at least 100, genomic sequences within one genomic region.

In some embodiments, the library of guide RNAs target at least one genomic region of at least 10 kb. In some embodiments, the library of guide RNAs target at least one genomic region of at least 20 kb. In some embodiments, the library of guide RNAs target at least one genomic region of at least 50 kb. In some embodiments, the library of guide RNAs target at least one genomic region of at least 100 kb. In some embodiments, the library of guide RNAs target at least one genomic region of at least 200 kb.

In some embodiments, the genomic region being perturbed comprises at least one transcription factor binding site. In some embodiments, the genomic region comprises at least one putative enhancer element. In some embodiments, the genomic region comprises at least one putative repressor element.

In some embodiments, the genomic region being perturbed comprises at least one site enriched for an epigenetic signature. The epigenetic signature can be selected from histone acetylation, histone methylation, histone ubiquitination, histone phosphorylation, DNA methylation, or a lack thereof.

In some embodiments, the genomic region comprises at least one DNase I hypersensitivity site. In some embodiments, the genomic region comprises at least one H3K27ac site.

In some embodiments, the population of cells are eukaryotic cells or prokaryotic cells. In some embodiments, the eukaryotic cells selected from embryonic stem (ES) cells, neuronal cells, epithelial cells, immune cells, endocrine cells, muscle cells, erythrocytes, lymphocytes, plant cells, and yeast cells.

In some embodiments, the population of cells are T cells. In some embodiments, the population of cells are monocytes. In some embodiments, the population of cells are adipocytes or endothelial cells.

In some embodiments, the screening for genomic sites is associated with a change in a phenotype. The change in phenotype can be detectable at one or more levels including at DNA, RNA, protein and/or functional level of the cell. In particular embodiments, the change is detectable as a change in gene expression in the cell. Indeed, where the genomic region of interest is selected as a region which is 5' or 3' of a gene of interest, the phenotypic change can be determined based on expression of the gene of interest.

The cells can be sorted based on the observed phenotype, and the genomic sites associate with a change in phenotype are identified based on whether or not they give rise to a change in phenotype in the cells. Typically, the methods involve sorting the cells into at least two groups based on the phenotype and determining relative representation of the guide RNAs present in each group, and genomic sites associated with the change in phenotype are determined by the representation of guide RNAs present in each group. In particular embodiments, the different groups will correspond to different expression levels of the gene of interest, such as a high expression group and a low expression group.

In some embodiments, the phenotype for selecting/sorting the cells is proliferation of the cells.

In some embodiments, the phenotype for selecting/sorting the cells is drug resistance.

In some embodiments, the phenotype for selecting/sorting the cells is expression level of a gene.

In some embodiments, the method may further comprise tagging the transcript of the gene with a florescent probe, wherein the cells are selected/sorted based on fluorescence signal level.

In some embodiments, the method may further comprise tagging an expression product of the gene with an antibody, wherein the cells are selected/sorted based on a quantitative measure of antibody binding.

In some embodiments, the method may further comprise tagging a gene in its endogenous genomic locus with a fluorescent protein.

In some embodiments, the method may further comprise sequencing the guide RNAs to determine relative representation of the guide RNAs in the selected cells.

In some embodiments, the method may further comprise scoring a plurality of non-coding genomic sites for depletion or enrichment of the corresponding guide RNAs in the selected cells, wherein each non-coding genomic site comprises at least 3, at least 5, at least 10, at least 20, or at least 50, consecutive targets of the guide RNAs within a span of 1,000 bp or less.

In some embodiments, the method may further comprise identifying at least one non-coding genomic site as a regulatory element for a gene associated with a change in the phenotype based on depletion or enrichment of the corresponding guide RNAs in the selected cells.

In some embodiments, the method may further comprise identifying at least one non-coding genomic site as an enhancer for a gene associated with a change in the phenotype based on depletion or enrichment of the corresponding guide RNAs in the selected cells.

In some embodiments, the method may further comprise identifying at least one non-coding genomic site as a repressor for a gene associated with the phenotype based on depletion or enrichment of the corresponding guide RNAs in the selected cells.

In some embodiments, the methods may further comprise confirming the alteration of the genomic site in a cell by sequencing the region comprising the genomic site or by whole genome sequencing. The methods provided herein may additionally comprise further validating the genomic site by specifically altering the genomic site and checking whether the phenotypic change is confirmed. Specific alteration of a genomic site can be achieved by different methods such as by CRISPR/Cas system mediated editing.

Also described are screening methods for identifying regulatory elements in the non-coding genome, more particularly using the libraries described herein, whereby the genomic region of interest is a region of the non-coding genome. Accordingly, the methods envisage targeting Cas protein to intergenic regions surrounding single genes. In particular embodiments the method will comprise generating a library which flanks upstream and downstream of target gene with sgRNAs. Optionally off-target scoring can be used to minimize sequences with many off-targets. Optionally on-target scoring can be used to minimize sequences with low predicted on-target activity Yet another aspect of the invention relates to methods for identifying regulatory elements in a genomic region by CRISPR interference, comprising:
  introducing a library of guide RNAs into a population of cells, said cells either expressing a fusion protein or having the fusion protein or a coding sequence thereof introduced simultaneously or sequentially with the guide RNAs, wherein the fusion protein comprises a modified Cas protein that is not catalytically active (e.g., dCas9) fused to a transcription repression domain (e.g., KRAB), wherein the guide RNAs target different non-coding genomic sequences within the genomic region;
  selecting/sorting cells based on a phenotype associated with reduced or increased expression of a gene; and
  sequencing guide RNAs present in the selected cells, wherein the depletion or enrichment of guide RNAs are quantified and/or ranked to identify a targeted genomic sequence as part of a regulatory element for the gene.

Yet another aspect of the invention relates to methods for identifying transcriptional enhancers or repressors for an immune regulatory gene involved in T cell dysfunction, comprising:
  introducing a library of guide RNAs into a population of T cells, said T cells either expressing a fusion protein or having the fusion protein or a coding sequence thereof introduced simultaneously or sequentially with the guide RNAs, wherein the fusion protein comprises a modified Cas protein that is not catalytically active (e.g., dCas9) fused to a transcription repression domain (e.g., KRAB), wherein the guide RNAs target different non-coding genomic sequences within the genomic region spatially close to the immune regulatory gene;
  selecting/sorting T cells based on a phenotype associated with reduced or increased expression of the immune regulatory gene; and
  sequencing guide RNAs present in the selected T cells, wherein the depletion or enrichment of guide RNAs are quantified and/or ranked to identify a targeted genomic sequence as part of a transcriptional enhancer or repressor element for the immune regulatory gene.

In some embodiments, the immune regulatory gene is selected from PD1, CTLA4, other co-inhibitory receptors, GATA3, IKZF2, and other transcription factors involved in T cell dysfunction.

In some embodiments, the method may further comprise identifying an enhancer or repressor that regulates the immune regulatory gene in tumor-filtrating T cell but not circulating T cells based on different chromatin state profiles of in vivo T cell subpopulations.

Yet another aspect of the invention relates to methods for identifying transcriptional enhancers or repressors for a gene involved in coronary artery disease, comprising:
  introducing a library of guide RNAs into a population of endothelial cells or adipocytes, said endothelial cells or adipocytes either expressing a fusion protein or having the fusion protein or a coding sequence thereof introduced simultaneously or sequentially with the guide RNAs, wherein the fusion protein comprises a modified Cas protein that is not catalytically active (e.g., dCas9) fused to a transcription repression domain (e.g., KRAB), wherein the guide RNAs target different non-coding genomic sequences within the genomic region spatially close to the gene;
  selecting/sorting endothelial cells or adipocytes based on a phenotype associated with reduced or increased expression of the gene; and
  sequencing guide RNAs present in the selected endothelial cells or adipocytes, wherein the depletion or enrichment of guide RNAs are quantified and/or ranked to identify a targeted genomic sequence as part of a transcriptional enhancer or repressor element for the gene.

Yet another aspect of the invention relates to methods for identifying transcriptional enhancers or repressors for a gene of monocyte, comprising:
  introducing a library of guide RNAs into a population of monocytes, said monocytes either expressing a fusion protein or having the fusion protein or a coding sequence thereof introduced simultaneously or sequentially with the guide RNAs, wherein the fusion protein comprises a modified Cas protein that is not catalytically active (e.g., dCas9) fused to a transcription repression domain (e.g., KRAB), wherein the guide RNAs target different non-coding genomic sequences within the genomic region spatially close to the gene;
  selecting/sorting monocytes based on a phenotype associated with reduced or increased expression of the gene; and
  sequencing guide RNAs present in the selected monocytes, wherein the depletion or enrichment of guide RNAs are quantified and/or ranked to identify a targeted genomic sequence as part of a transcriptional enhancer or repressor element for the gene.

Yet a further aspect of the invention relates to methods for identifying regulatory elements in a genomic region by targeted deletion of genomic sequence, comprising:
introducing a library of pairs of guide RNAs into a population of cells, said cells either expressing a catalytically active Cas protein or having the catalytically active Cas protein or a coding sequence thereof introduced simultaneously or sequentially with the guide RNAs, wherein the pairs of guide RNAs target different non-coding genomic sequences within the genomic region;
selecting/sorting cells based on a phenotype associated with reduced or increased expression of the gene; and
sequencing guide RNAs present in the selected cells, wherein the depletion or enrichment of the pairs of guide RNAs are quantified and/or ranked to identify a targeted genomic sequence as part of a regulatory element for the gene.

Yet a further aspect of the invention relates to methods for identifying regulatory elements in a genomic region by targeted deletion of genomic sequence, comprising:
introducing a library of pairs of guide RNAs into a population of cells, said cells either expressing a catalytically active Cas protein or having the catalytically active Cas protein or a coding sequence thereof introduced simultaneously or sequentially with the guide RNAs, wherein the pairs of guide RNAs target different non-coding genomic sequences within the genomic region;
selecting/sorting cells based on a phenotype associated with reduced or increased expression of the gene; and
determining deletion of genomic sequence targeted by the pairs of the guide RNAs from the selected cells to identify a targeted genomic sequence as part of a regulatory element for the gene.

An additional aspect of the invention relates to a composition comprising a population of cells obtainable or obtained by introducing a library of guide RNAs into cells at an average ratio of no more than one guide RNA per cell, said cells either expressing a modified CRISPR effector protein that is not catalytically competent or having the modified CRISPR effector protein or a coding sequence thereof introduced simultaneously or sequentially with the guide RNAs, wherein the guide RNAs target different non-coding genomic sequences within at least one genomic region to induce transcriptional repression.

An additional aspect of the invention relates to a composition comprising a population of cells obtainable or obtained by introducing a library of pairs of guide RNAs into cells at an average ratio of no more than one pair of guide RNAs per cell, said cells either expressing a catalytically active CRISPR effector protein or having the catalytically active CRISPR effector protein or a coding sequence thereof introduced simultaneously or sequentially with the guide RNAs, wherein the pairs of guide RNAs target different non-coding genomic sequences located in one or more genomic regions to induce deletion of genomic sequence.

An additional aspect of the invention relates to a method for identifying a transcriptional enhancer or repressor for a gene, comprising:
introducing a library of guide RNAs into a population of cells, said cells either expressing an RNA-guided DNA binding protein or having the RNA-guided DNA binding protein or a coding sequence thereof introduced simultaneously or sequentially with the guide RNAs, wherein the guide RNAs target different non-coding genomic sequences within at least one genomic region;
using fluorescence in situ hybridization (FISH) to quantitatively label single cells according to expression of an RNA of interest and sorting labeled cells into a plurality of bins based on the expression of the RNA of interest; and
determining in each of the bins (i) relative representation of the guide RNAs present in the labeled cells or (ii) deletion of genomic sequence targeted by pairs of the guide RNAs from the labeled cells, wherein (i) the relative representation of the guide RNAs or (ii) the deletion of genomic sequence indicates the targeted genomic sequence as a transcriptional enhancer or repressor for the gene encoding the RNA of interest.

Another aspect of the invention relates to a method for modulating expression of a gene selected from ABCG5, ABCG8, APOA1, APOA1BP, APOA4, APOA5, APOB, APOBEC3B, APOBEC3C, APOBEC3F, APOC3, APOE, ANGPTL4, LIPA, LDLR, LDLRAP1, LPA, LPAR6, PCSK9, RILPL1, RILPL2, SORT1, TRIB1, and VLDLR, comprising genetically or epigenetically editing one or more of the corresponding enhancers described in Table 2 (Enhancer Nos. 1-218).

Another aspect of the invention relates to a method for reducing expression of a gene selected from ABCG5, ABCG8, APOA1, APOA1BP, APOA4, APOA5, APOB, APOBEC3B, APOBEC3C, APOBEC3F, APOC3, APOE, ANGPTL4, LIPA, LDLR, LDLRAP1, LPA, LPAR6, PCSK9, RILPL1, RILPL2, SORT1, TRIB1, and VLDLR, comprising mutating, deleting, repressing or inhibiting one or more of the corresponding enhancers described in Table 2.

Another aspect of the invention relates to a method for enhancing expression of a gene selected from ABCG5, ABCG8, APOA1, APOA1BP, APOA4, APOA5, APOB, APOBEC3B, APOBEC3C, APOBEC3F, APOC3, APOE, ANGPTL4, LIPA, LDLR, LDLRAP1, LPA, LPAR6, PCSK9, RILPL1, RILPL2, SORT1, TRIB1, and VLDLR, comprising correcting a mutation in, or introducing a functional copy of, one or more of the corresponding enhancers described in Table 2.

Another aspect of the invention relates to a method for modulating lipid phenotype and/or lipid level in a subject in need thereof, comprising modulating expression of a gene selected from ABCG5, ABCG8, APOA1, APOA1BP, APOA4, APOA5, APOB, APOBEC3B, APOBEC3C, APOBEC3F, APOC3, APOE, ANGPTL4, LIPA, LDLR, LDLRAP1, LPA, LPAR6, PCSK9, RILPL1, RILPL2, SORT1, TRIB1, and VLDLR, by genetically or epigenetically editing one or more of the corresponding enhancers described in Table 2.

Another aspect of the invention relates to a method for reducing coronary artery disease risk in a subject in need thereof, comprising modulating expression of a gene selected from ABCG5, ABCG8, APOA1, APOA1BP, APOA4, APOA5, APOB, APOBEC3B, APOBEC3C, APOBEC3F, APOC3, APOE, ANGPTL4, LIPA, LDLR, LDLRAP1, LPA, LPAR6, PCSK9, RILPL1, RILPL2, SORT1, TRIB1, and VLDLR, by genetically or epigenetically editing one or more of the corresponding enhancers described in Table 2.

Another aspect of the invention relates to a method for modulating expression of a gene selected from CTLA4, CMTM6, CMTM4, LAG3, BTLA, PTGER2, CD160, KLRG1, BCL2, IL7R, and KLRC1, comprising genetically or epigenetically editing one or more of the corresponding enhancers described in Table 3 (Enhancer Nos. 219-299).

Another aspect of the invention relates to a method for reducing expression of a gene selected from CTLA4, CMTM6, CMTM4, LAG3, BTLA, PTGER2, CD160, KLRG1, BCL2, IL7R, and KLRC1, comprising mutating, deleting, repressing or inhibiting one or more of the corresponding enhancers described in Table 3.

Another aspect of the invention relates to a method for inhibiting T cell dysfunction in a subject in need thereof, comprising reducing expression of a gene selected from CTLA4, CMTM6, CMTM4, LAG3, BTLA, PTGER2, CD160, KLRG1, BCL2, IL7R, and KLRC1, by mutating, deleting, repressing or inhibiting one or more of the corresponding enhancers described in Table 3. Another aspect of the invention relates to a method for cancer immunotherapy in a subject in need thereof, comprising reducing expression of a gene selected from CTLA4, CMTM6, CMTM4, LAG3, BTLA, PTGER2, CD160, KLRG1, BCL2, IL7R, and KLRC1, by mutating, deleting, repressing or inhibiting one or more of the corresponding enhancers described in Table 3.

Another aspect of the invention relates to a method for adoptive T cell therapy in a subject in need thereof, comprising administering to the subject a T cell, such as a chimeric antigen receptor (CAR) or T-cell receptor (TCR) modified T cell, in which one or more of the enhancers listed in Table 3 have been mutated, deleted, inhibited or repressed through genome or epigenome editing (e.g., using CRISPR, TALEN or ZFN). Another aspect of the invention relates to a composition for adoptive T cell therapy, comprising a T cell, such as a chimeric antigen receptor (CAR) or T-cell receptor (TCR) modified T cell, in which one or more of the enhancers listed in Table 3 have been mutated, deleted, inhibited or repressed through genome or epigenome editing (e.g., using CRISPR, TALEN or ZFN).

Another aspect of the invention relates to a method for modulating expression of a gene selected from IL6R, IL23R, IL12RB1, IL12RB2, and SMAD7, comprising genetically or epigenetically editing one or more of the corresponding enhancers described in Table 4 (Enhancer Nos. 300-348).

Another aspect of the invention relates to a method for reducing expression of a gene selected from IL6R, IL23R, IL12RB1, IL12RB2, and SMAD7, comprising mutating, deleting, repressing or inhibiting one or more of the corresponding enhancers described in Table 4.

Another aspect of the invention relates to a method for inhibiting T cell activation in a subject in need thereof, comprising reducing expression of a gene selected from IL6R, IL23R, IL12RB1, IL12RB2, and SMAD7, by mutating, deleting, repressing or inhibiting one or more of the corresponding enhancers described in Table 4. Another aspect of the invention relates to a method for treating inflammatory bowel disease in a subject in need thereof, comprising reducing expression of a gene selected from IL6R, IL23R, IL12RB1, IL12RB2, and SMAD7, by mutating, deleting, repressing or inhibiting one or more of the corresponding enhancers described in Table 4.

Genome-wide association studies have identified hundreds of genetic loci associated with common diseases, including diabetes, coronary artery disease, autoimmune diseases, and many more. These studies identify sets of genetic variants that contain one or more "causal" variants that mechanistically predispose to disease. Many such variants may impact the functions of non-coding regulatory elements that control gene expression, but it is not known which variants impact RE function or which genes they control. The present invention thus provides screening techniques to determine which regulatory elements control which genes, and thus help to determine which variants are causal. The invention provides for different approaches:

Starting from a given enhancer, the methods provided herein can be used to determine which genes this enhancer regulates. In particular embodiments, RNA sequencing can be used to determine effects on gene expression.

Given a gene, find all enhancers that regulate that gene. In particular embodiments, the methods are used to target all genes within the same 3D domain as disease variants, the methods of the invention are used to screen all enhancers/genetic variants in the region to find all of the elements that regulate each of the genes. In these embodiments, a screenable phenotype is required, which can include tagging of the gene or gene product as described herein.

Screen genes for all elements. Given an appropriate screenable cellular phenotype (e.g., proliferation of T cells in response to stimulation, cellular resistance to a cancer therapeutic, expression of a biomarker, etc.), sgRNAs targeting many genes, regulatory elements, and/or genetic variants are designed to determine in parallel how all of these elements regulate the gene of interest.

In addition, in combination with these screening approaches, computational prediction algorithms are used to map the enhancers regulating these genes across different cell types that are relevant for the disease phenotype (e.g., adipocytes, endothelial cells, smooth muscle cells for coronary artery disease).

In particular embodiments, the methods described herein can be used to identify genes that underlie genetic associations for diseases such as diabetes, coronary artery disease and autoimmune diseases. In particular embodiments, the methods comprise applying prediction algorithms as described herein to nominate genes that are likely to be regulated by enhancers overlapping GWAS variants of the disease and optionally, apply one or more of the strategies described herein to identify which variants overlap enhancers that regulate genes nearby (e.g., using cellular systems known to be involved in the disease). At the same time the results of these methods can be used to refine the prediction algorithms to identify other enhancers in the region that would be predicted to regulate these genes in other cellular contexts, including cell types that were not directly mapped experimentally.

In particular embodiments, the methods further comprise using traditional approaches such as homologous recombination to knock in the specific variants identified in the methods described above and confirm that these genetic variants confer the same regulatory effect on gene expression and cellular function in appropriate cellular assays. The genes identified in this way can be potential therapeutic targets to treat the disease, and might provide key insights into the gene pathways and biology leading to the disease.

The methods and tools provided herein are particularly advantageous for interrogating a continuous genomic region. Such a continuous genomic region may comprise up to the entire genome, but particularly advantageous are methods wherein a putative regulatory element of the genome is interrogated, which typically encompasses a limited region of the genome, such as a region of 10-500 kb, 20-200 kb or 50-100 kb of genomic DNA. Of particular interest is the use of the methods for the interrogation of non-coding genomic regions, such as regions 5' and 3' of the coding region of a gene of interest. Indeed, the methods allow the identification of targets in the 5' and 3' region of a gene which may affect a phenotypic change only under particular circumstances or only for particular cells or tissues in an organism. In particular embodiments, the genomic region of interest comprises a transcription factor binding site, a region of DNase I hypersensitivity, a region marked by H3K27ac, or a transcription enhancer or repressor element. In particular embodiments, the genomic region of interest comprises an epigenetic signature for a particular disease or disorder. Additionally or alternatively the genomic region of interest may comprise an epigenetic insulator. In particular embodiments, the guide RNA library is directed to a genomic region which comprises two or more continuous genomic regions that physically interact. In particular embodiments, the genomic region of interest comprises one or more sites susceptible to one or more of histone acetylation, histone methylation, histone ubiquitination, histone phosphorylation, DNA methylation, or a lack thereof.

Examples of genomic regions of interest include regions comprising or 5' or 3' of a gene associated with a signaling biochemical pathway, e.g., a signaling biochemical pathway-associated gene or polynucleotide. Examples of genomic regions include regions comprising or 5' or 3' of a disease-associated gene or polynucleotide. A "disease-associated" gene or polynucleotide refers to any gene or polynucleotide which is yielding transcription or translation products at an abnormal level or in an abnormal form in cells derived from a disease-affected tissues compared with tissues or cells of a non-disease control. It may be a gene that becomes expressed at an abnormally high level; it may be a gene that becomes expressed at an abnormally low level, where the altered expression correlates with the occurrence and/or progression of the disease. The transcribed or translated products may be known or unknown, and may be at a normal or abnormal level. Sites of DNA hypersensitivity and transcription factor binding sites and epigenetic markers of a gene of interest can be determined by accessing publicly available data bases.

Certain embodiments of the invention require the use of a DNA binding protein to facilitate either transcriptional repression or deletion of a genomic sequence. In some embodiments, the DNA binding protein is a (endo)nuclease or a variant thereof having altered or modified activity (i.e. a modified nuclease, as described herein elsewhere). In certain embodiments, said nuclease is a targeted or site-specific or homing nuclease or a variant thereof having altered or modified activity. In certain embodiments, said nuclease or targeted/site-specific/homing nuclease is, comprises, consists essentially of, or consists of a (modified) CRISPR/Cas system or complex, a (modified) Cas protein, a (modified) zinc finger, a (modified) zinc finger nuclease (ZFN), a (modified) transcription factor-like effector (TALE), a (modified) transcription factor-like effector nuclease (TALEN), or a (modified) meganuclease. In certain embodiments, said (modified) nuclease or targeted/site-specific/homing nuclease is, comprises, consists essentially of, or consists of a (modified) RNA-guided nuclease. As used herein, the term "Cas" generally refers to a (modified) effector protein of the CRISPR/Cas system or complex, and can be without limitation a (modified) Cas9, or other enzymes such as Cpf1, The term "Cas" may be used herein interchangeably with the terms "CRISPR" protein, "CRISPR/Cas protein", "CRISPR effector", "CRISPR/Cas effector", "CRISPR enzyme", "CRISPR/Cas enzyme" and the like, unless otherwise apparent, such as by specific and exclusive reference to Cas9. It is to be understood that the term "CRISPR protein" may be used interchangeably with "CRISPR enzyme", irrespective of whether the CRISPR protein has altered, such as increased or decreased (or no) enzymatic activity, compared to the wild type CRISPR protein. Likewise, as used herein, in certain embodiments, where appropriate and which will be apparent to the skilled person, the term "nuclease" may refer to a modified nuclease wherein catalytic activity has been altered, such as having increased or decreased nuclease activity, or no nuclease activity at all, as well as nickase activity, as well as otherwise modified nuclease as defined herein elsewhere, unless otherwise apparent, such as by specific and exclusive reference to unmodified nuclease.

As used herein, the term "targeting" of a selected nucleic acid sequence means that a nuclease or nuclease complex is acting in a nucleotide sequence-specific manner. For instance, in the context of the CRISPR/Cas system, the guide RNA is capable of hybridizing with a selected nucleic acid sequence. As uses herein, "hybridization" or "hybridizing" refers to a reaction in which one or more polynucleotides react to form a complex that is stabilized via hydrogen bonding between the bases of the nucleotide residues. The hydrogen bonding may occur by Watson Crick base pairing, Hoogstein binding, or in any other sequence-specific manner. The complex may comprise two strands forming a duplex structure, three or more strands forming a multi stranded complex, a single self-hybridizing strand, or any combination of these. A hybridization reaction may constitute a step in a more extensive process, such as the initiation of PGR, or the cleavage of a polynucleotide by an enzyme. A sequence capable of hybridizing with a given sequence is referred to as the "complement" of the given sequence.

In certain embodiments, the DNA binding protein is a (modified) transcription activator-like effector nuclease (TALEN) system. Transcription activator-like effectors (TALEs) can be engineered to bind practically any desired DNA sequence. Exemplary methods of genome editing using the TALEN system can be found for example in Cermak T. Doyle E L. Christian M. Wang L. Zhang Y. Schmidt C, et al. Efficient design and assembly of custom TALEN and other TAL effector-based constructs for DNA targeting. Nucleic Acids Res. 2011; 39:e82; Zhang F. Cong L. Lodato S. Kosuri S. Church G M. Arlotta P Efficient construction of sequence-specific TAL effectors for modulating mammalian transcription. Nat Biotechnol. 2011; 29:149-153 and U.S. Pat. Nos. 8,450,471, 8,440,431 and 8,440,432, all of which are specifically incorporated by reference. By means of further guidance, and without limitation, naturally occurring TALEs or "wild type TALEs" are nucleic acid binding proteins secreted by numerous species of proteobacteria. TALE polypeptides contain a nucleic acid binding domain composed of tandem repeats of highly conserved monomer polypeptides that are predominantly 33, 34 or 35 amino acids in length and that differ from each other mainly in amino acid positions 12 and 13. In advantageous embodiments the nucleic acid is DNA. As used herein, the term "polypeptide monomers", or "TALE monomers" will be used to refer to the highly conserved repetitive polypeptide sequences within the TALE nucleic acid binding domain and the term "repeat variable di-residues" or "RVD" will be used to refer to the highly variable amino acids at positions 12 and 13 of the polypeptide monomers. As provided throughout the disclosure, the amino acid residues of the RVD are depicted using the IUPAC single letter code for amino acids. A general representation of a TALE monomer which is comprised within the DNA binding domain is $X_{1-11}$-($X_{12}X_{13}$)-$X_{14-33}$ or 34 or 35, where the subscript indicates the amino acid position and X represents any amino acid. X12X13 indicate the RVDs. In some polypeptide monomers, the variable amino acid at position 13 is missing or absent and in such polypeptide monomers, the RVD consists of a single amino acid. In such cases the RVD may be alternatively represented as X*, where X represents X12 and (*) indicates that X13 is absent. The DNA binding domain comprises several repeats of TALE monomers and this may be represented as (X1-11-(X12X13)-X14-33 or 34 or 35)z, where in an advantageous embodiment, z is at least 5 to 40. In a further advantageous embodiment, z is at least 10 to 26. The TALE monomers have a nucleotide binding affinity that is determined by the identity of the amino acids in its RVD. For example, polypeptide monomers with an RVD of NI preferentially bind to adenine (A), polypeptide monomers with an RVD of NG preferentially bind to thymine (T), polypeptide monomers with an RVD of HD preferentially bind to cytosine (C) and polypeptide monomers with an RVD of NN preferentially bind to both adenine (A) and guanine (G). In yet another embodiment of the invention, polypeptide monomers with an RVD of IG preferentially bind to T. Thus, the number and order of the polypeptide monomer repeats in the nucleic acid binding domain of a TALE determines its nucleic acid target specificity. In still further embodiments of the invention, polypeptide monomers with an RVD of NS recognize all four base pairs and may bind to A, T, G or C. The structure and function of TALEs is further described in, for example, Moscou et al., Science 326:1501 (2009); Boch et al., Science 326:1509-1512 (2009); and Zhang et al., Nature Biotechnology 29:149-153 (2011), each of which is incorporated by reference in its entirety.

In certain embodiments, the nucleic acid modification is effected by a (modified) zinc finger nuclease (ZFN) system. The ZFN system uses artificial restriction enzymes generated by fusing a zinc finger DNA binding domain to a DNA cleavage domain that can be engineered to target desired DNA sequences. Exemplary methods of genome editing using ZFNs can be found for example in U.S. Pat. Nos. 6,534,261, 6,607,882, 6,746,838, 6,794,136, 6,824,978, 6,866,997, 6,933,113, 6,979,539, 7,013,219, 7,030,215, 7,220,719, 7,241,573, 7,241,574, 7,585,849, 7,595,376, 6,903,185, and 6,479,626, all of which are specifically incorporated by reference. By means of further guidance, and without limitation, artificial zinc finger (ZF) technology involves arrays of ZF modules to target new DNA binding sites in the genome. Each finger module in a ZF array targets three DNA bases. A customized array of individual zinc finger domains is assembled into a ZF protein (ZFP). ZFPs can comprise a functional domain. The first synthetic zinc finger nucleases (ZFNs) were developed by fusing a ZF protein to the catalytic domain of the Type IIS restriction enzyme FokI. (Kim, Y. G. et al., 1994, Chimeric restriction endonuclease, Proc. Natl. Acad. Sci. U.S.A. 91, 883-887; Kim, Y. G. et al., 1996, Hybrid restriction enzymes: zinc finger fusions to Fok I cleavage domain. Proc. Natl. Acad. Sci. U.S.A. 93, 1156-1160). Increased cleavage specificity can be attained with decreased off-target activity by use of paired ZFN heterodimers, each targeting different nucleotide sequences separated by a short spacer. (Doyon, Y. et al., 2011, Enhancing zinc finger-nuclease activity with improved obligate heterodimeric architectures. Nat. Methods 8, 74-79). ZFPs can also be designed as transcription activators and repressors and have been used to target many genes in a wide variety of organisms.

In certain embodiments, the nucleic acid modification is effected by a (modified) meganuclease, which are endodeoxyribonucleases characterized by a large recognition site (double-stranded DNA sequences of 12 to 40 base pairs). Exemplary method for using meganucleases can be found in U.S. Pat. Nos. 8,163,514; 8,133,697; 8,021,867; 8,119,361; 8,119,381; 8,124,369; and 8,129,134, which are specifically incorporated by reference.

In certain embodiments, the nucleic acid modification is effected by a (modified) CRISPR/Cas complex or system. With respect to general information on CRISPR/Cas Systems, components thereof, and delivery of such components, including methods, materials, delivery vehicles, vectors, particles, and making and using thereof, including as to amounts and formulations, as well as Cas9CRISPR/Cas-expressing eukaryotic cells, Cas-9 CRISPR/Cas expressing eukaryotes, such as a mouse, reference is made to: U.S. Pat. Nos. 8,999,641, 8,993,233, 8,697,359, 8,771,945, 8,795, 965, 8,865,406, 8,871,445, 8,889,356, 8,889,418, 8,895,308, 8,906,616, 8,932,814, 8,945,839, 8,993,233 and 8,999,641; US Patent Publications US 2014-0310830 (U.S. application Ser. No. 14/105,031), US 2014-0287938 A1 (U.S. application Ser. No. 14/213,991), US 2014-0273234 A1 (U.S. application Ser. No. 14/293,674), US2014-0273232 A1 (U.S. application Ser. No. 14/290,575), US 2014-0273231 (U.S. application Ser. No. 14/259,420), US 2014-0256046 A1 (U.S. application Ser. No. 14/226,274), US 2014-0248702 A1 (U.S. application Ser. No. 14/258,458), US 2014-0242700 A1 (U.S. application Ser. No. 14/222,930), US 2014-0242699 A1 (U.S. application Ser. No. 14/183, 512), US 2014-0242664 A1 (U.S. application Ser. No. 14/104,990), US 2014-0234972 A1 (U.S. application Ser. No. 14/183,471), US 2014-0227787 A1 (U.S. application Ser. No. 14/256,912), US 2014-0189896 A1 (U.S. application Ser. No. 14/105,035), US 2014-0186958 (U.S. application Ser. No. 14/105,017), US 2014-0186919 A1 (U.S. application Ser. No. 14/104,977), US 2014-0186843 A1 (U.S. application Ser. No. 14/104,900), US 2014-0179770 A1 (U.S. application Ser. No. 14/104,837) and US 2014-0179006 A1 (U.S. application Ser. No. 14/183,486), US 2014-0170753 (U.S. application Ser. No. 14/183,429); US 2015-0184139 (U.S. application Ser. Nos. 14/324,960); 14/054,414 European Patent Applications EP 2 771 468 (EP13818570.7), EP 2 764 103 (EP13824232.6), and EP 2 784 162 (EP14170383.5); and PCT Patent Publications WO2014/093661 (PCT/US2013/074743), WO2014/093694 (PCT/US2013/074790), WO2014/093595 (PCT/US2013/074611), WO2014/093718 (PCT/US2013/074825), WO2014/093709 (PCT/US2013/074812), WO2014/093622 (PCT/US2013/074667), WO2014/093635 (PCT/US2013/074691), WO2014/093655 (PCT/US2013/074736), WO2014/093712 (PCT/US2013/074819), WO2014/093701 (PCT/US2013/074800), WO2014/018423 (PCT/US2013/051418), WO2014/204723 (PCT/US2014/041790), WO2014/204724 (PCT/US2014/041800), WO2014/204725 (PCT/US2014/041803), WO2014/204726 (PCT/US2014/041804), WO2014/204727 (PCT/US2014/041806), WO2014/204728 (PCT/US2014/041808), WO2014/204729 (PCT/US2014/041809), WO2015/089351 (PCT/US2014/069897), WO2015/089354 (PCT/US2014/069902), WO2015/089364 (PCT/US2014/069925), WO2015/089427 (PCT/US2014/070068), WO2015/089462 (PCT/US2014/070127), WO2015/089419 (PCT/US2014/070057), WO2015/089465 (PCT/US2014/070135), WO 2015/089486 (PCT/US2014/070175), WO2015/058052 (PCT/US2014/061077), WO2015070083 (PCT/US2014/064663), WO2015/089354 (PCT/US2014/069902), WO2015/089351 (PCT/US2014/069897), WO2015/089364 (PCT/US2014/069925), WO2015/089427 (PCT/US2014/070068), WO2015/089473 (PCT/US2014/070152), WO2015/089486

(PCT/US2014/070175), WO/2016/04925 (PCT/US2015/051830), WO/2016/094867 (PCT/US2015/065385), WO/2016/094872 (PCT/US2015/065393), WO/2016/094874 (PCT/US2015/065396), WO/2016/106244 (PCT/US2015/067177).

Each of these patents, patent publications, and applications, and all documents cited therein or during their prosecution ("appln cited documents") and all documents cited or referenced in the appln cited documents, together with any instructions, descriptions, product specifications, and product sheets for any products mentioned therein or in any document therein and incorporated by reference herein, are hereby incorporated herein by reference, and may be employed in the practice of the invention. All documents (e.g., these patents, patent publications and applications and the appln cited documents) are incorporated herein by reference to the same extent as if each individual document was specifically and individually indicated to be incorporated by reference.

Also with respect to general information on CRISPR-Cas Systems, mention is made of the following (also hereby incorporated herein by reference):

Multiplex genome engineering using CRISPR/Cas systems. Cong, L., Ran, F. A., Cox, D., Lin, S., Barretto, R., Habib, N., Hsu, P. D., Wu, X., Jiang, W., Marraffini, L. A., & Zhang, F. Science February 15; 339(6121): 819-23 (2013);

RNA-guided editing of bacterial genomes using CRISPR-Cas systems. Jiang W., Bikard D., Cox D., Zhang F, Marraffini L A. Nat Biotechnol March; 31(3):233-9 (2013);

One-Step Generation of Mice Carrying Mutations in Multiple Genes by CRISPR/Cas-Mediated Genome Engineering. Wang H., Yang H., Shivalila C S., Dawlaty M M., Cheng A W., Zhang F., Jaenisch R. Cell May 9; 153(4):910-8 (2013);

Optical control of mammalian endogenous transcription and epigenetic states. Konermann S, Brigham M D, Trevino A E, Hsu P D, Heidenreich M, Cong L, Platt R J, Scott D A, Church G M, Zhang F. Nature. August 22; 500(7463):472-6. doi: 10.1038/Nature12466. Epub 2013 Aug. 23 (2013);

Double Nicking by RNA-Guided CRISPR Cas9 for Enhanced Genome Editing Specificity. Ran, F A., Hsu, P D., Lin, C Y., Gootenberg, J S., Konermann, S., Trevino, A E., Scott, D A., Inoue, A., Matoba, S., Zhang, Y., & Zhang, F. Cell August 28. pii: S0092-8674(13)01015-5 (2013-A);

DNA targeting specificity of RNA-guided Cas9 nucleases. Hsu, P., Scott, D., Weinstein, J., Ran, F A., Konermann, S., Agarwala, V., Li, Y., Fine, E., Wu, X., Shalem, O., Cradick, T J., Marraffini, L A., Bao, G., & Zhang, F. Nat Biotechnol doi:10.1038/nbt.2647 (2013);

Genome engineering using the CRISPR-Cas9 system. Ran, F A., Hsu, P D., Wright, J., Agarwala, V., Scott, D A., Zhang, F. Nature Protocols November; 8(11):2281-308 (2013-B);

Genome-Scale CRISPR-Cas9 Knockout Screening in Human Cells. Shalem, O., Sanjana, N E., Hartenian, E., Shi, X., Scott, D A., Mikkelson, T., Heckl, D., Ebert, B L., Root, D E., Doench, J G., Zhang, F. Science December 12. (2013);

Crystal structure of cas9 in complex with guide RNA and target DNA. Nishimasu, H., Ran, F A., Hsu, P D., Konermann, S., Shehata, S I., Dohmae, N., Ishitani, R., Zhang, F., Nureki, O. Cell February 27, 156(5):935-49 (2014);

Genome-wide binding of the CRISPR endonuclease Cas9 in mammalian cells. Wu X., Scott D A., Kriz A J., Chiu A C., Hsu P D., Dadon D B., Cheng A W., Trevino A E., Konermann S., Chen S., Jaenisch R., Zhang F., Sharp P A. Nat Biotechnol. April 20. doi: 10.1038/nbt.2889 (2014);

CRISPR-Cas9 Knockin Mice for Genome Editing and Cancer Modeling. Platt R J, Chen S, Zhou Y, Yim M J, Swiech L, Kempton H R, Dahlman J E, Parnas O, Eisenhaure T M, Jovanovic M, Graham D B, Jhunjhunwala S, Heidenreich M, Xavier R J, Langer R, Anderson D G, Hacohen N, Regev A, Feng G, Sharp P A, Zhang F. Cell 159(2): 440-455 DOI: 10.1016/j.cell.2014.09.014(2014);

Development and Applications of CRISPR-Cas9 for Genome Engineering, Hsu P D, Lander E S, Zhang F., Cell. June 5; 157(6):1262-78 (2014);

Genetic screens in human cells using the CRISPR/Cas9 system, Wang T, Wei J J, Sabatini D M, Lander E S., Science. January 3; 343(6166): 80-84. doi:10.1126/science.1246981 (2014);

Rational design of highly active sgRNAs for CRISPR-Cas9-mediated gene inactivation, Doench J G, Hartenian E, Graham D B, Tothova Z, Hegde M, Smith I, Sullender M, Ebert B L, Xavier R J, Root D E., (published online 3 Sep. 2014) Nat Biotechnol. December; 32(12):1262-7 (2014);

In vivo interrogation of gene function in the mammalian brain using CRISPR-Cas9, Swiech L, Heidenreich M, Banerjee A, Habib N, Li Y, Trombetta J, Sur M, Zhang F., (published online 19 Oct. 2014) Nat Biotechnol. January; 33(1):102-6 (2015);

Genome-scale transcriptional activation by an engineered CRISPR-Cas9 complex, Konermann S, Brigham M D, Trevino A E, Joung J, Abudayyeh O O, Barcena C, Hsu P D, Habib N, Gootenberg J S, Nishimasu H, Nureki O, Zhang F., Nature. January 29; 517(7536):583-8 (2015);

A split-Cas9 architecture for inducible genome editing and transcription modulation, Zetsche B, Volz S E, Zhang F., (published online 2 Feb. 2015) Nat Biotechnol. February; 33(2):139-42 (2015);

Genome-wide CRISPR Screen in a Mouse Model of Tumor Growth and Metastasis, Chen S, Sanjana N E, Zheng K, Shalem O, Lee K, Shi X, Scott D A, Song J, Pan J Q, Weissleder R, Lee H, Zhang F, Sharp P A. Cell 160, 1246-1260, Mar. 12, 2015 (multiplex screen in mouse), and In vivo genome editing using *Staphylococcus aureus* Cas9, Ran F A, Cong L, Yan W X, Scott D A, Gootenberg J S, Kriz A J, Zetsche B, Shalem O, Wu X, Makarova K S, Koonin E V, Sharp P A, Zhang F., (published online 1 Apr. 2015), Nature. April 9; 520 (7546):186-91(2015).

Shalem et al., "High-throughput functional genomics using CRISPR-Cas9," Nature Reviews Genetics 16, 299-311 (May 2015).

Xu et al., "Sequence determinants of improved CRISPR sgRNA design," Genome Research 25, 1147-1157 (August 2015).

Parnas et al., "A Genome-wide CRISPR Screen in Primary Immune Cells to Dissect Regulatory Networks," Cell 162, 675-686 (Jul. 30, 2015).

Ramanan et al., CRISPR/Cas9 cleavage of viral DNA efficiently suppresses hepatitis B virus," Scientific Reports 5:10833. doi: 10.1038/srep10833 (Jun. 2, 2015).

Nishimasu et al., Crystal Structure of *Staphylococcus aureus* Cas9," Cell 162, 1113-1126 (Aug. 27, 2015).

Zetsche et al., "Cpf1 Is a Single RNA-Guided Endonuclease of a Class 2 CRISPR-Cas System," Cell 163, 1-13 (Oct. 22, 2015).

Shmakov et al., "Discovery and Functional Characterization of Diverse Class 2 CRISPR-Cas Systems," Molecular Cell 60, 1-13 (Available online Oct. 22, 2015).

Each of these publications is incorporated herein by reference, may be considered in the practice of the instant invention, and discussed briefly below:

Cong et al. engineered type II CRISPR-Cas systems for use in eukaryotic cells based on both *Streptococcus thermophilus* Cas9 and also *Streptococcus pyogenes* Cas9 and demonstrated that Cas9 nucleases can be directed by short RNAs to induce precise cleavage of DNA in human and mouse cells. Their study further showed that Cas9 as converted into a nicking enzyme can be used to facilitate homology-directed repair in eukaryotic cells with minimal mutagenic activity. Additionally, their study demonstrated that multiple guide sequences can be encoded into a single CRISPR array to enable simultaneous editing of several at endogenous genomic loci sites within the mammalian genome, demonstrating easy programmability and wide applicability of the RNA-guided nuclease technology. This ability to use RNA to program sequence-specific DNA cleavage in cells defined a new class of genome engineering tools. These studies further showed that other CRISPR loci are likely to be transplantable into mammalian cells and can also mediate mammalian genome cleavage. Importantly, it can be envisaged that several aspects of the CRISPR-Cas system can be further improved to increase its efficiency and versatility.

Jiang et al. used the clustered, regularly interspaced, short palindromic repeats (CRISPR)-associated Cas9 endonuclease complexed with dual-RNAs to introduce precise mutations in the genomes of *Streptococcus pneumoniae* and *Escherichia coli*. The approach relied on dual-RNA:Cas9-directed cleavage at the targeted genomic site to kill unmutated cells and circumvents the need for selectable markers or counter-selection systems. The study reported reprogramming dual-RNA:Cas9 specificity by changing the sequence of short CRISPR RNA (crRNA) to make single- and multinucleotide changes carried on editing templates. The study showed that simultaneous use of two crRNAs enabled multiplex mutagenesis. Furthermore, when the approach was used in combination with recombineering, in *S. pneumoniae*, nearly 100% of cells that were recovered using the described approach contained the desired mutation, and in *E. coli*, 65% that were recovered contained the mutation.

Wang et al. (2013) used the CRISPR/Cas system for the one-step generation of mice carrying mutations in multiple genes which were traditionally generated in multiple steps by sequential recombination in embryonic stem cells and/or time-consuming intercrossing of mice with a single mutation. The CRISPR/Cas system will greatly accelerate the in vivo study of functionally redundant genes and of epistatic gene interactions.

Konermann et al. (2013) addressed the need in the art for versatile and robust technologies that enable optical and chemical modulation of DNA binding domains based CRISPR Cas9 enzyme and also Transcriptional Activator Like Effectors.

Ran et al. (2013-A) described an approach that combined a Cas9 nickase mutant with paired guide RNAs to introduce targeted double-strand breaks. This addresses the issue of the Cas9 nuclease from the microbial CRISPR-Cas system being targeted to specific genomic loci by a guide sequence, which can tolerate certain mismatches to the DNA target and thereby promote undesired off-target mutagenesis. Because individual nicks in the genome are repaired with high fidelity, simultaneous nicking via appropriately offset guide RNAs is required for double-stranded breaks and extends the number of specifically recognized bases for target cleavage. The authors demonstrated that using paired nicking can reduce off-target activity by 50- to 1,500-fold in cell lines and to facilitate gene knockout in mouse zygotes without sacrificing on-target cleavage efficiency. This versatile strategy enables a wide variety of genome editing applications that require high specificity.

Hsu et al. (2013) characterized SpCas9 targeting specificity in human cells to inform the selection of target sites and avoid off-target effects. The study evaluated >700 guide RNA variants and SpCas9-induced indel mutation levels at >100 predicted genomic off-target loci in 293T and 293FT cells. The authors that SpCas9 tolerates mismatches between guide RNA and target DNA at different positions in a sequence-dependent manner, sensitive to the number, position and distribution of mismatches. The authors further showed that SpCas9-mediated cleavage is unaffected by DNA methylation and that the dosage of SpCas9 and sgRNA can be titrated to minimize off-target modification. Additionally, to facilitate mammalian genome engineering applications, the authors reported providing a web-based software tool to guide the selection and validation of target sequences as well as off-target analyses.

Ran et al. (2013-B) described a set of tools for Cas9-mediated genome editing via non-homologous end joining (NHEJ) or homology-directed repair (HDR) in mammalian cells, as well as generation of modified cell lines for downstream functional studies. To minimize off-target cleavage, the authors further described a double-nicking strategy using the Cas9 nickase mutant with paired guide RNAs. The protocol provided by the authors experimentally derived guidelines for the selection of target sites, evaluation of cleavage efficiency and analysis of off-target activity. The studies showed that beginning with target design, gene modifications can be achieved within as little as 1-2 weeks, and modified clonal cell lines can be derived within 2-3 weeks.

Shalem et al. described a new way to interrogate gene function on a genome-wide scale. Their studies showed that delivery of a genome-scale CRISPR-Cas9 knock-out (GeCKO) library targeted 18,080 genes with 64,751 unique guide sequences enabled both negative and positive selection screening in human cells. First, the authors showed use of the GeCKO library to identify genes essential for cell viability in cancer and pluripotent stem cells. Next, in a melanoma model, the authors screened for genes whose loss is involved in resistance to vemurafenib, a therapeutic that inhibits mutant protein kinase BRAF. Their studies showed that the highest-ranking candidates included previously validated genes NF1 and MED12 as well as novel hits NF2, CUL3, TADA2B, and TADA1. The authors observed a high level of consistency between independent guide RNAs targeting the same gene and a high rate of hit confirmation, and thus demonstrated the promise of genome-scale screening with Cas9.

Nishimasu et al. reported the crystal structure of *Streptococcus pyogenes* Cas9 in complex with sgRNA and its target DNA at 2.5 A° resolution. The structure revealed a bilobed architecture composed of target recognition and nuclease lobes, accommodating the sgRNA:DNA heteroduplex in a positively charged groove at their interface. Whereas the recognition lobe is essential for binding sgRNA and DNA, the nuclease lobe contains the HNH and RuvC nuclease domains, which are properly positioned for cleavage of the complementary and non-complementary strands of the target DNA, respectively. The nuclease lobe also contains a carboxyl-terminal domain responsible for the interaction with the protospacer adjacent motif (PAM). This high-resolution structure and accompanying functional analyses have revealed the molecular mechanism of RNA-guided DNA targeting by Cas9, thus paving the way for the rational design of new, versatile genome-editing technologies.

Wu et al. mapped genome-wide binding sites of a catalytically inactive Cas9 (dCas9) from *Streptococcus pyogenes* loaded with single guide RNAs (sgRNAs) in mouse embryonic stem cells (mESCs). The authors showed that each of the four sgRNAs tested targets dCas9 to between tens and thousands of genomic sites, frequently characterized by a 5-nucleotide seed region in the sgRNA and an NGG protospacer adjacent motif (PAM). Chromatin inaccessibility decreases dCas9 binding to other sites with matching seed sequences; thus 70% of off-target sites are associated with genes. The authors showed that targeted sequencing of 295 dCas9 binding sites in mESCs transfected with catalytically active Cas9 identified only one site mutated above background levels. The authors proposed a two-state model for Cas9 binding and cleavage, in which a seed match triggers binding but extensive pairing with target DNA is required for cleavage.

Platt et al. established a Cre-dependent Cas9 knockin mouse. The authors demonstrated in vivo as well as ex vivo genome editing using adeno-associated virus (AAV)-, lentivirus-, or particle-mediated delivery of guide RNA in neurons, immune cells, and endothelial cells.

Hsu et al. (2014) is a review article that discusses generally CRISPR-Cas9 history from yogurt to genome editing, including genetic screening of cells.

Wang et al. (2014) relates to a pooled, loss-of-function genetic screening approach suitable for both positive and negative selection that uses a genome-scale lentiviral single guide RNA (sgRNA) library.

Doench et al. created a pool of sgRNAs, tiling across all possible target sites of a panel of six endogenous mouse and three endogenous human genes and quantitatively assessed their ability to produce null alleles of their target gene by antibody staining and flow cytometry. The authors showed that optimization of the PAM improved activity and also provided an on-line tool for designing sgRNAs.

Swiech et al. demonstrate that AAV-mediated SpCas9 genome editing can enable reverse genetic studies of gene function in the brain.

Konermann et al. (2015) discusses the ability to attach multiple effector domains, e.g., transcriptional activator, functional and epigenomic regulators at appropriate positions on the guide such as stem or tetraloop with and without linkers.

Zetsche et al. demonstrates that the Cas9 enzyme can be split into two and hence the assembly of Cas9 for activation can be controlled.

Chen et al. relates to multiplex screening by demonstrating that a genome-wide in vivo CRISPR-Cas9 screen in mice reveals genes regulating lung metastasis.

Ran et al. (2015) relates to SaCas9 and its ability to edit genomes and demonstrates that one cannot extrapolate from biochemical assays. Shalem et al. (2015) described ways in which catalytically inactive Cas9 (dCas9) fusions are used to synthetically repress (CRISPRi) or activate (CRISPRa) expression, showing advances using Cas9 for genome-scale screens, including arrayed and pooled screens, knockout approaches that inactivate genomic loci and strategies that modulate transcriptional activity.

Shalem et al. (2015) described ways in which catalytically inactive Cas9 (dCas9) fusions are used to synthetically repress (CRISPRi) or activate (CRISPRa) expression, showing advances using Cas9 for genome-scale screens, including arrayed and pooled screens, knockout approaches that inactivate genomic loci and strategies that modulate transcriptional activity.

Xu et al. (2015) assessed the DNA sequence features that contribute to single guide RNA (sgRNA) efficiency in CRISPR-based screens. The authors explored efficiency of CRISPR/Cas9 knockout and nucleotide preference at the cleavage site. The authors also found that the sequence preference for CRISPRi/a is substantially different from that for CRISPR/Cas9 knockout.

Parnas et al. (2015) introduced genome-wide pooled CRISPR-Cas9 libraries into dendritic cells (DCs) to identify genes that control the induction of tumor necrosis factor (Tnf) by bacterial lipopolysaccharide (LPS). Known regulators of Tlr4 signaling and previously unknown candidates were identified and classified into three functional modules with distinct effects on the canonical responses to LPS.

Ramanan et al (2015) demonstrated cleavage of viral episomal DNA (cccDNA) in infected cells. The HBV genome exists in the nuclei of infected hepatocytes as a 3.2 kb double-stranded episomal DNA species called covalently closed circular DNA (cccDNA), which is a key component in the HBV life cycle whose replication is not inhibited by current therapies. The authors showed that sgRNAs specifically targeting highly conserved regions of HBV robustly suppresses viral replication and depleted cccDNA.

Nishimasu et al. (2015) reported the crystal structures of SaCas9 in complex with a single guide RNA (sgRNA) and its double-stranded DNA targets, containing the 5'-TTGAAT-3' PAM and the 5'-TTGGGT-3' PAM. A structural comparison of SaCas9 with SpCas9 highlighted both structural conservation and divergence, explaining their distinct PAM specificities and orthologous sgRNA recognition.

Zetsche et al. (2015) reported the characterization of Cpf1, a putative class 2 CRISPR effector. It was demonstrated that Cpf1 mediates robust DNA interference with features distinct from Cas9. Identifying this mechanism of interference broadens our understanding of CRISPR-Cas systems and advances their genome editing applications.

Shmakov et al. (2015) reported the characterization of three distinct Class 2 CRISPR-Cas systems. The effectors of two of the identified systems, C2c1 and C2c3, contain RuvC like endonuclease domains distantly related to Cpf1. The third system, C2c2, contains an effector with two predicted HEPN RNase domains.

Also, "Dimeric CRISPR RNA-guided FokI nucleases for highly specific genome editing", Shengdar Q. Tsai, Nicolas Wyvekens, Cyd Khayter, Jennifer A. Foden, Vishal Thapar, Deepak Reyon, Mathew J. Goodwin, Martin J. Aryee, J. Keith Joung Nature Biotechnology 32(6): 569-77 (2014), relates to dimeric RNA-guided FokI Nucleases that recognize extended sequences and can edit endogenous genes with high efficiencies in human cells.

With respect to use of the CRISPR-Cas system in plants, mention is made of the University of Arizona website "CRISPR-PLANT" (supported by Penn State and AGI). Embodiments of the invention can be used in genome editing in plants or where RNAi or similar genome editing techniques have been used previously; see, e.g., Nekrasov, "Plant genome editing made easy: targeted mutagenesis in model and crop plants using the CRISPR/Cas system," Plant Methods 2013, 9:39 (doi:10.1186/1746-4811-9-39); Brooks, "Efficient gene editing in tomato in the first generation using the CRISPR/Cas9 system," Plant Physiology September 2014 pp 114.247577; Shan, "Targeted genome modification of crop plants using a CRISPR-Cas system," Nature Biotechnology 31, 686-688 (2013); Feng, "Efficient genome editing in plants using a CRISPR/Cas system," Cell Research (2013) 23:1229-1232. doi:10.1038/cr.2013.114; published online 20 Aug. 2013; Xie, "RNA-guided genome editing in plants using a CRISPR-Cas system," Mol Plant. 2013 November; 6(6):1975-83. doi: 10.1093/mp/sst119. Epub 2013 Aug. 17; Xu, "Gene targeting using the *Agrobacterium tumefaciens*-mediated CRISPR-Cas system in rice," Rice 2014, 7:5 (2014), Zhou et al., "Exploiting SNPs for biallelic CRISPR mutations in the outcrossing woody perennial *Populus* reveals 4-coumarate: CoA ligase specificity and Redundancy," New Phytologist (2015) (Forum) 1-4.

Preferred DNA binding proteins are CRISPR/Cas enzymes or variants thereof. In certain embodiments, the CRISPR/Cas protein is a class 2 CRISPR/Cas protein. In certain embodiments, said CRISPR/Cas protein is a type II, type V, or type VI CRISPR/Cas protein. The CRISPR/Cas system does not require the generation of customized proteins to target specific sequences but rather a single Cas protein can be programmed by an RNA guide (gRNA) to recognize a specific nucleic acid target, in other words the Cas enzyme protein can be recruited to a specific nucleic acid target locus (which may comprise or consist of RNA and/or DNA) of interest using said short RNA guide.

In general, the CRISPR/Cas or CRISPR system is as used herein foregoing documents refers collectively to elements involved in the expression of or directing the activity of CRISPR-associated ("Cas") proteins or genes, including sequences encoding a Cas protein and a guide RNA. In this context of the guide RNA this may include one or more of, a tracr (trans-activating CRISPR) sequence (e.g. tracrRNA or an active partial tracrRNA), a tracr-mate sequence (encompassing a "direct repeat" and a tracrRNA-processed partial direct repeat in the context of an endogenous CRISPR system), a guide sequence (also referred to as a "spacer" in the context of an endogenous CRISPR system). In general, a CRISPR system is characterized by elements that promote the formation of a CRISPR complex at the site of a target sequence. In the context of formation of a CRISPR complex, "target sequence" refers to a sequence to which a guide sequence is designed to have complementarity, where hybridization between a target DNA sequence and a guide sequence promotes the formation of a CRISPR complex.

In certain embodiments, the gRNA comprises a guide sequence fused to a tracr mate sequence (or direct repeat), and a tracr sequence. In particular embodiments, the guide sequence fused to the tracr mate and the tracr sequence are provided or expressed as discrete RNA sequences. In preferred embodiments, the gRNA is a chimeric guide RNA or single guide RNA (sgRNA), comprising a guide sequence fused to the tracr mate which is itself linked to the tracr sequence. In particular embodiments, the CRISPR/Cas system or complex as described herein does not comprise and/or does not rely on the presence of a tracr sequence (e.g. if the Cas protein is Cpf1).

As used herein, the term "guide sequence" in the context of a CRISPR/Cas system, comprises any polynucleotide sequence having sufficient complementarity with a target nucleic acid sequence to hybridize with the target nucleic acid sequence and direct sequence-specific binding of a nucleic acid-targeting complex to the target nucleic acid sequence. In some embodiments, the degree of complementarity, when optimally aligned using a suitable alignment algorithm, is about or more than about 50%, 60%, 75%, 80%, 85%, 90%, 95%, 97.5%, 99%, or more. Optimal alignment may be determined with the use of any suitable algorithm for aligning sequences, non-limiting example of which include the Smith-Waterman algorithm, the Needleman-Wunsch algorithm, algorithms based on the Burrows-Wheeler Transform (e.g., the Burrows Wheeler Aligner), ClustalW, Clustal X, BLAT, Novoalign (Novocraft Technologies; available at www.novocraft.com), ELAND (Illumina, San Diego, CA), SOAP (available at soap.genomics.org.cn), and Maq (available at maq.sourceforge.net). The ability of a guide sequence (within a nucleic acid-targeting guide RNA) to direct sequence-specific binding of a nucleic acid-targeting complex to a target nucleic acid sequence may be assessed by any suitable assay.

A guide sequence, and hence a nucleic acid-targeting guide RNA may be selected to target any target nucleic acid sequence. The target sequence may be DNA. The target sequence may be genomic DNA. The target sequence may be mitochondrial DNA.

In certain embodiments, the gRNA comprises a stem-loop, preferably a single stem-loop. In certain embodiments, the direct repeat sequence forms a stem-loop, preferably a single stem-loop. In certain embodiments, the spacer length of the guide RNA is from 15 to 35 nt. In certain embodiments, the spacer length of the guide RNA is at least 15 nucleotides. In certain embodiments, the spacer length is from 15 to 17 nt, e.g., 15, 16, or 17 nt, from 17 to 20 nt, e.g., 17, 18, 19, or 20 nt, from 20 to 24 nt, e.g., 20, 21, 22, 23, or 24 nt, from 23 to 25 nt, e.g., 23, 24, or 25 nt, from 24 to 27 nt, e.g., 24, 25, 26, or 27 nt, from 27-30 nt, e.g., 27, 28, 29, or 30 nt, from 30-35 nt, e.g., 30, 31, 32, 33, 34, or 35 nt, or 35 nt or longer. In particular embodiments, the CRISPR/Cas system requires a tracrRNA. The "tracrRNA" sequence or analogous terms includes any polynucleotide sequence that has sufficient complementarity with a crRNA sequence to hybridize. In some embodiments, the degree of complementarity between the tracrRNA sequence and crRNA sequence along the length of the shorter of the two when optimally aligned is about or more than about 25%, 30%, 40%, 50%, 60%, 70%, 80%, 90%, 95%, 97.5%, 99%, or higher. In some embodiments, the tracr sequence is about or more than about 5, 6, 7, 8, 9, 10, 11, 12, 13, 14, 15, 16, 17, 18, 19, 20, 25, 30, 40, 50, or more nucleotides in length. In some embodiments, the tracr sequence and gRNA sequence are contained within a single transcript, such that hybridization between the two produces a transcript having a secondary structure, such as a hairpin. In an embodiment of the invention, the transcript or transcribed polynucleotide sequence has at least two or more hairpins. In preferred embodiments, the transcript has two, three, four or five hairpins. In a further embodiment of the invention, the transcript has at most five hairpins. In a hairpin structure the portion of the sequence 5' of the final "N" and upstream of the loop may correspond to the tracr mate sequence, and the portion of the sequence 3' of the loop then corresponds to the tracr sequence. In a hairpin structure the portion of the sequence 5' of the final "N" and upstream of the loop may alternatively correspond to the tracr sequence, and the portion of the sequence 3' of the loop corresponds to the tracr mate sequence. In alternative embodiments, the CRISPR/Cas system does not require a tracrRNA, as is known by the skilled person.

In certain embodiments, the guide RNA (capable of guiding Cas to a target locus) may comprise (1) a guide sequence capable of hybridizing to a target locus and (2) a tracr mate or direct repeat sequence (in 5' to 3' orientation, or alternatively in 3' to 5' orientation, depending on the type of Cas protein, as is known by the skilled person). In particular embodiments, the CRISPR/Cas protein is characterized in that it makes use of a guide RNA comprising a guide sequence capable of hybridizing to a target locus and a direct repeat sequence, and does not require a tracrRNA. In particular embodiments, where the CRISPR/Cas protein is characterized in that it makes use of a tracrRNA, the guide sequence, tracr mate, and tracr sequence may reside in a single RNA, i.e. an sgRNA (arranged in a 5' to 3' orientation or alternatively arranged in a 3' to 5' orientation), or the tracr RNA may be a different RNA than the RNA containing the guide and tracr mate sequence. In these embodiments, the tracr hybridizes to the tracr mate sequence and directs the CRISPR/Cas complex to the target sequence.

In particular embodiments, the DNA binding protein is a catalytically active protein. In these embodiments, the formation of a nucleic acid-targeting complex (comprising a guide RNA hybridized to a target sequence results in modification (such as cleavage) of one or both DNA or RNA strands in or near (e.g., within 1, 2, 3, 4, 5, 6, 7, 8, 9, 10, 20, 50, or more base pairs from) the target sequence. As used herein the term "sequence(s) associated with a target locus of interest" refers to sequences near the vicinity of the target sequence (e.g. within 1, 2, 3, 4, 5, 6, 7, 8, 9, 10, 20, 50, or more base pairs from the target sequence, wherein the target sequence is comprised within a target locus of interest). The skilled person will be aware of specific cut sites for selected CRISPR/Cas systems, relative to the target sequence, which as is known in the art may be within the target sequence or alternatively 3' or 5' of the target sequence.

Accordingly, in particular embodiments, the DNA binding protein has nucleic acid cleavage activity. In some embodiments, the nuclease as described herein may direct cleavage of one or both nucleic acid (DNA, RNA, or hybrids, which may be single or double stranded) strands at the location of or near a target sequence, such as within the target sequence and/or within the complement of the target sequence or at sequences associated with the target sequence. In some embodiments, the nucleic acid-targeting effector protein may direct cleavage of one or both DNA or RNA strands within about 1, 2, 3, 4, 5, 6, 7, 8, 9, 10, 15, 20, 25, 50, 100, 200, 500, or more base pairs from the first or last nucleotide of a target sequence. In some embodiments, the cleavage may be blunt (e.g. for Cas9, such as SaCas9 or SpCas9). In some embodiments, the cleavage may be staggered (e.g. for Cpf1), i.e. generating sticky ends. In some embodiments, the cleavage is a staggered cut with a 5' overhang. In some embodiments, the cleavage is a staggered cut with a 5' overhang of 1 to 5 nucleotides, preferably of 4 or 5 nucleotides. In some embodiments, the cleavage site is upstream of the PAM. In some embodiments, the cleavage site is downstream of the PAM.

In certain embodiments, the target sequence should be associated with a PAM (protospacer adjacent motif) or PFS (protospacer flanking sequence or site); that is, a short sequence recognized by the CRISPR complex. The precise sequence and length requirements for the PAM differ depending on the CRISPR enzyme used, but PAMs are typically 2-5 base pair sequences adjacent the protospacer (that is, the target sequence). Examples of PAM sequences are given in the examples section below, and the skilled person will be able to identify further PAM sequences for use with a given CRISPR enzyme. Further, engineering of the PAM Interacting (PI) domain may allow programing of PAM specificity, improve target site recognition fidelity, and increase the versatility of the Cas, e.g. Cas9, genome engineering platform. Cas proteins, such as Cas9 proteins may be engineered to alter their PAM specificity, for example as described in Kleinstiver B P et al. Engineered CRISPR-Cas9 nucleases with altered PAM specificities. Nature. 2015 Jul. 23; 523(7561):481-5. doi: 10.1038/nature14592. In some embodiments, the method comprises allowing a CRISPR complex to bind to the target polynucleotide to effect cleavage of said target polynucleotide thereby modifying the target polynucleotide, wherein the CRISPR complex comprises a CRISPR enzyme complexed with a guide sequence hybridized to a target sequence within said target polynucleotide, wherein said guide sequence is linked to a tracr mate sequence which in turn hybridizes to a tracr sequence. The skilled person will understand that other Cas proteins may be modified analogously.

In some embodiments, the nucleic acid-targeting effector protein may be mutated with respect to a corresponding wild type enzyme such that the mutated nucleic acid-targeting effector protein lacks the ability to cleave one or both DNA strands of a target polynucleotide containing a target sequence. As a further example, two or more catalytic domains of a Cas protein (e.g. RuvC I, RuvC II, and RuvC III or the HNH domain of a Cas9 protein) may be mutated to produce a mutated Cas protein which cleaves only one DNA strand of a target sequence.

In particular embodiments, the nucleic acid-targeting effector protein may be mutated with respect to a corresponding wild type enzyme such that the mutated nucleic acid-targeting effector protein lacks substantially all DNA cleavage activity. In some embodiments, a nucleic acid-targeting effector protein may be considered to substantially lack all DNA and/or RNA cleavage activity when the cleavage activity of the mutated enzyme is about no more than 25%, 10%, 5%, 1%, 0.1%, 0.01%, or less of the nucleic acid cleavage activity of the non-mutated form of the enzyme; an example can be when the nucleic acid cleavage activity of the mutated form is nil or negligible as compared with the non-mutated form.

As used herein, the term "modified" Cas generally refers to a Cas protein having one or more modifications or mutations (including point mutations, truncations, insertions, deletions, chimeras, fusion proteins, etc.) compared to the wild type Cas protein from which it is derived. By derived is meant that the derived enzyme is largely based, in the sense of having a high degree of sequence homology with, a wildtype enzyme, but that it has been mutated (modified) in some way as known in the art or as described herein.

As detailed above, in certain embodiments, the nuclease as referred to herein is modified. As used herein, the term "modified" refers to which may or may not have an altered functionality. By means of example, and in particular with reference to Cas proteins, modifications which do not result in an altered functionality include for instance codon optimization for expression into a particular host, or providing the nuclease with a particular marker (e.g. for visualization). Modifications with may result in altered functionality may also include mutations, including point mutations, insertions, deletions, truncations (including split nucleases), etc., as well as chimeric nucleases (e.g. comprising domains from different orthologues or homologues) or fusion proteins. Fusion proteins may without limitation include for instance fusions with heterologous domains or functional domains (e.g. localization signals, catalytic domains, etc.). Accordingly, in certain embodiments, the modified nuclease may be used as a generic nucleic acid binding protein with fusion to or being operably linked to a functional domain. In certain embodiments, various different modifications may be combined (e.g. a mutated nuclease which is catalytically inactive and which further is fused to a functional domain, such as for instance to induce DNA methylation or another nucleic acid modification, such as including without limitation a break (e.g. by a different nuclease (domain)), a mutation, a deletion, an insertion, a replacement, a ligation, a digestion, a break or a recombination). As used herein, "altered functionality" includes without limitation an altered specificity (e.g. altered target recognition, increased (e.g. "enhanced" Cas proteins) or decreased specificity, or altered PAM recognition), altered activity (e.g. increased or decreased catalytic activity, including catalytically inactive nucleases or nickases), and/or altered stability (e.g. fusions with destabilization domains). Suitable heterologous domains include without limitation a nuclease, aligase, a repair protein, a methyltransferase, (viral) integrase, a recombinase, a transposase, anargonaute, a cytidine deaminase, a retron, a group II intron, a phosphatase, a phosphorylase, a sulfurylase, a kinase, a polymerase, an exonuclease, etc. Examples of all these modifications are known in the art. It will be understood that a "modified" nuclease as referred to herein, and in particular a "modified" Cas or "modified" CRISPR/Cas system or complex preferably still has the capacity to interact with or bind to the polynucleic acid (e.g. in complex with the gRNA).

By means of further guidance and without limitation, in certain embodiments, the nuclease may be modified as detailed below. As already indicated, more than one of the indicated modifications may be combined. For instance, codon optimization may be combined with NLS or NES fusions, catalytically inactive nuclease modifications or nickase mutants may be combined with fusions to functional (heterologous) domains, etc.

In certain embodiments, the nuclease, and in particular the Cas proteins of prokaryotic origin, may be codon-optimized for expression into a particular host (cell). An example of a codon-optimized sequence, is in this instance a sequence optimized for expression in a eukaryote, e.g., humans (i.e. being optimized for expression in humans), or for another eukaryote, animal or mammal as herein discussed; see, e.g., SaCas9 human codon-optimized sequence in WO 2014/093622 (PCT/US2013/074667). Whilst this is preferred, it will be appreciated that other examples are possible and codon optimization for a host species other than human, or for codon optimization for specific organs is known. In some embodiments, an enzyme coding sequence encoding a Cas is codon-optimized for expression in particular cells, such as eukaryotic cells. The eukaryotic cells may be those of or derived from a particular organism, such as a mammal, including but not limited to human, or non-human eukaryote or animal or mammal as herein discussed, e.g., mouse, rat, rabbit, dog, livestock, or non-human mammal or primate. In some embodiments, processes for modifying the germ line genetic identity of human beings and/or processes for modifying the genetic identity of animals which are likely to cause them suffering without any substantial medical benefit to man or animal, and also animals resulting from such processes, may be excluded. In general, codon optimization refers to a process of modifying a nucleic acid sequence for enhanced expression in the host cells of interest by replacing at least one codon (e.g. about or more than about 1, 2, 3, 4, 5, 10, 15, 20, 25, 50, or more codons) of the native sequence with codons that are more frequently or most frequently used in the genes of that host cell while maintaining the native amino acid sequence. Various species exhibit particular bias for certain codons of a particular amino acid. Codon bias (differences in codon usage between organisms) often correlates with the efficiency of translation of messenger RNA (mRNA), which is in turn believed to be dependent on, among other things, the properties of the codons being translated and the availability of particular transfer RNA (tRNA) molecules. The predominance of selected tRNAs in a cell is generally a reflection of the codons used most frequently in peptide synthesis. Accordingly, genes can be tailored for optimal gene expression in a given organism based on codon optimization. Codon usage tables are readily available, for example, at the "Codon Usage Database" available at www.kazusa.or.jp/codon/ and these tables can be adapted in a number of ways. See Nakamura, Y., et al. "Codon usage tabulated from the international DNA sequence databases: status for the year 2000" Nucl. Acids Res. 28:292 (2000). Computer algorithms for codon optimizing a particular sequence for expression in a particular host cell are also available, such as Gene Forge (Aptagen; Jacobus, PA), are also available. In some embodiments, one or more codons (e.g. 1, 2, 3, 4, 5, 10, 15, 20, 25, 50, or more, or all codons) in a sequence encoding a Cas correspond to the most frequently used codon for a particular amino acid. Codon optimization may be for expression into any desired host (cell), including mammalian, plant, algae, or yeast.

In certain embodiments, the nuclease, in particular the Cas protein, may comprise one or more modifications resulting in enhanced activity and/or specificity, such as including mutating residues that stabilize the targeted or non-targeted strand (e.g. eCas9; "Rationally engineered Cas9 nucleases with improved specificity", Slaymaker et al. (2016), Science, 351(6268):84-88, incorporated herewith in its entirety by reference). In certain embodiments, the altered or modified activity of the engineered CRISPR protein comprises increased targeting efficiency or decreased off-target binding. In certain embodiments, the altered activity of the engineered CRISPR protein comprises modified cleavage activity. In certain embodiments, the altered activity comprises increased cleavage activity as to the target polynucleotide loci. In certain embodiments, the altered activity comprises decreased cleavage activity as to the target polynucleotide loci. In certain embodiments, the altered activity comprises decreased cleavage activity as to off-target polynucleotide loci. In certain embodiments, the altered or modified activity of the modified nuclease comprises altered helicase kinetics. In certain embodiments, the modified nuclease comprises a modification that alters association of the protein with the nucleic acid molecule comprising RNA (in the case of a Cas protein), or a strand of the target polynucleotide loci, or a strand of off-target polynucleotide loci. In an aspect of the invention, the engineered CRISPR protein comprises a modification that alters formation of the CRISPR complex. In certain embodiments, the altered activity comprises increased cleavage activity as to off-target polynucleotide loci. Accordingly, in certain embodiments, there is increased specificity for target polynucleotide loci as compared to off-target polynucleotide loci. In other embodiments, there is reduced specificity for target polynucleotide loci as compared to off-target polynucleotide loci. In certain embodiments, the mutations result in decreased off-target effects (e.g. cleavage or binding properties, activity, or kinetics), such as in case for Cas proteins for instance resulting in a lower tolerance for mismatches between target and gRNA. Other mutations may lead to increased off-target effects (e.g. cleavage or binding properties, activity, or kinetics). Other mutations may lead to increased or decreased on-target effects (e.g. cleavage or binding properties, activity, or kinetics). In certain embodiments, the mutations result in altered (e.g. increased or decreased) helicase activity, association or formation of the functional nuclease complex (e.g. CRISPR/Cas complex). In certain embodiments, the mutations result in an altered PAM recognition, i.e. a different PAM may be (in addition or in the alternative) be recognized, compared to the unmodified Cas protein (see e.g. "Engineered CRISPR-Cas9 nucleases with altered PAM specificities", Kleinstiver et al. (2015), Nature, 523(7561):481-485, incorporated herein by reference in its entirety). Particularly preferred mutations include positively charged residues and/or (evolutionary) conserved residues, such as conserved positively charged residues, in order to enhance specificity. In certain embodiments, such residues may be mutated to uncharged residues, such as alanine.

In certain embodiments, the nuclease, in particular the Cas protein, may comprise one or more modifications resulting in a nuclease that has reduced or no catalytic activity, or alternatively (in case of nucleases that target double stranded nucleic acids) resulting in a nuclease that only cleaves one strand, i.e. a nickase. By means of further guidance, and without limitation, for example, an aspartate-to-alanine substitution (D10A) in the RuvC I catalytic domain of Cas9 from S. pyogenes converts Cas9 from a nuclease that cleaves both strands to a nickase (cleaves a single strand). Other examples of mutations that render Cas9 a nickase include, without limitation, H840A, N854A, and N863A. As further guidance, where the enzyme is not SpCas9, mutations may be made at any or all residues corresponding to positions 10, 762, 840, 854, 863 and/or 986 of SpCas9 (which may be ascertained for instance by standard sequence comparison tools). In particular, any or all of the following mutations are preferred in SpCas9: D10A, E762A, H840A, N854A, N863A and/or D986A; as well as conservative substitution for any of the replacement amino acids is also envisaged. As a further example, two or more catalytic domains of Cas9 (RuvC I, RuvC II, and RuvC III or the HNH domain) may be mutated to produce a mutated Cas9 substantially lacking all DNA cleavage activity. In some embodiments, a D10A mutation is combined with one or more of H840A, N854A, or N863A mutations to produce a Cas9 enzyme substantially lacking all DNA cleavage activity. In some embodiments, a Cas is considered to substantially lack all DNA cleavage activity when the DNA cleavage activity of the mutated enzyme is about no more than 25%, 10%, 5%, 1%, 0.1%, 0.01%, or less of the DNA cleavage activity of the non-mutated form of the enzyme; an example can be when the DNA cleavage activity of the mutated form is nil or negligible as compared with the non-mutated form. Thus, the Cas may comprise one or more mutations and may be used as a generic DNA binding protein with or without fusion to a functional domain. The mutations may be artificially introduced mutations or gain- or loss-of-function mutations. The mutations may include but are not limited to mutations in one of the catalytic domains (e.g., D10 and H840) in the RuvC and HNH catalytic domains respectively; or the CRISPR enzyme can comprise one or more mutations selected from the group consisting of D10A, E762A, H840A, N854A, N863A or D986A with reference to the positions in SpCas9. In particular embodiments, the catalytically inactive Cas9 comprises the D10A and H840A mutation.

In certain embodiments, the nuclease is a split nuclease (see e.g. "A split-Cas9 architecture for inducible genome editing and transcription modulation", Zetsche et al. (2015), Nat Biotechnol. 33(2):139-42, incorporated herein by reference in its entirety). In a split nuclease, the activity (which may be a modified activity, as described herein elsewhere), relies on the two halves of the split nuclease to be joined, i.e. each half of the split nuclease does not possess the required activity, until joined. As further guidance, and without limitation, with specific reference to Cas9, a split-Cas9 may result from splitting the Cas9 at any one of the following split points, according or with reference to SpCas9: a split position between 202A/203S; a split position between 255F/256D; a split position between 310E/311I; a split position between 534R/535K; a split position between 572E/573C; a split position between 713S/714G; a split position between 1003L/104E; a split position between 1054G/1055E; a split position between 1114N/1115S; a split position between 1152K/1153S; a split position between 1245K/1246G; or a split between 1098 and 1099. Identifying potential split sides is most simply done with the help of a crystal structure. For Sp mutants, it should be readily apparent what the corresponding position for, for example, a sequence alignment. For non-Sp enzymes one can use the crystal structure of an ortholog if a relatively high degree of homology exists between the ortholog and the intended Cas9. Ideally, the split position should be located within a region or loop. Preferably, the split position occurs where an interruption of the amino acid sequence does not result in the partial or full destruction of a structural feature (e.g. alpha-helixes or beta-sheets). Unstructured regions (regions that did not show up in the crystal structure because these regions are not structured enough to be "frozen" in a crystal) are often preferred options. In certain embodiments, a functional domain may be provided on each of the split halves, thereby allowing the formation of homodimers or heterodimers. The functional domains may be (inducible) interact, thereby joining the split halves, and reconstituting (modified) nuclease activity. By means of example, an inducer energy source may inducibly allow dimerization of the split halves, through appropriate fusion partners. An inducer energy source may be considered to be simply an inducer or a dimerizing agent. The term 'inducer energy source' is used herein throughout for consistency. The inducer energy source (or inducer) acts to reconstitute the Cas9. In some embodiments, the inducer energy source brings the two parts of the Cas9 together through the action of the two halves of the inducible dimer. The two halves of the inducible dimer therefore are brought tougher in the presence of the inducer energy source. The two halves of the dimer will not form into the dimer (dimerize) without the inducer energy source. Thus, the two halves of the inducible dimer cooperate with the inducer energy source to dimerize the dimer. This in turn reconstitutes the Cas9 by bringing the first and second parts of the Cas9 together. The CRISPR enzyme fusion constructs each comprise one part of the split-Cas9. These are fused, preferably via a linker such as a GlySer linker described herein, to one of the two halves of the dimer. The two halves of the dimer may be substantially the same two monomers that together that form the homodimer, or they may be different monomers that together form the heterodimer. As such, the two monomers can be thought of as one half of the full dimer. The Cas9 is split in the sense that the two parts of the Cas9 enzyme substantially comprise a functioning Cas9. That Cas9 may function as a genome editing enzyme (when forming a complex with the target DNA and the guide), such as a nickase or a nuclease (cleaving both strands of the DNA), or it may be a deadCas9 which is essentially a DNA binding protein with very little or no catalytic activity, due to typically two or more mutations in its catalytic domains as described herein further.

In certain embodiments, the nuclease may comprise one or more additional (heterologous) functional domains, i.e. the modified nuclease is a fusion protein comprising the nuclease itself and one or more additional domains, which may be fused C-terminally or N-terminally to the nuclease, or alternatively inserted at suitable and appropriate sited internally within the nuclease (preferably without perturbing its function, which may be an otherwise modified function, such as including reduced or absent catalytic activity, nickase activity, etc.). any type of functional domain may suitably be used, such as without limitation including functional domains having one or more of the following activities: (DNA or RNA) methyltransferase activity, methylase activity, demethylase activity, DNA hydroxylmethylase domain, histone acetylase domain, histone deacetylases domain, transcription or translation activation activity, transcription or translation repression activity, transcription or translation release factor activity, histone modification activity, nuclease activity, single-strand RNA cleavage activity, double-strand RNA cleavage activity, single-strand DNA cleavage activity, double-strand DNA cleavage activity, nucleic acid binding activity, a protein acetyltransferase, a protein deacetylase, a protein methyltransferase, a protein deaminase, a protein kinase, a protein phosphatase, transposase domain, integrase domain, recombinase domain, resolvase domain, invertase domain, protease domain, repressor domain, activator domain, nuclear-localization signal domains, transcription-regulatory protein (or transcription complex recruiting) domain, cellular uptake activity associated domain, nucleic acid binding domain, antibody presentation domain, histone modifying enzymes, recruiter of histone modifying enzymes; inhibitor of histone modifying enzymes, histone methyltransferase, histone demethylase, histone kinase, histone phosphatase, histone ribosylase, histone deribosylase, histone ubiquitinase, histone deubiquitinase, histone biotinidase, histone tail protease, HDACs, histone methyltransferases (HMTs), and histone acetyltransferase (HAT) inhibitors, as well as HDAC and HMT recruiting proteins, HDAC Effector Domains, HDAC Recruiter Effector Domains, Histone Methyltransferase (HMT) Effector Domains, Histone Methyltransferase (HMT) Recruiter Effector Domains, or Histone Acetyltransferase Inhibitor Effector Domains. In some embodiments, the functional domain is an epigenetic regulator; see, e.g., Zhang et al., U.S. Pat. No. 8,507,272 (incorporated herein by reference in its entirety). In some embodiments, the functional domain is a transcriptional activation domain, such as VP64, p65, MyoD1, HSF1, RTA, SET7/9 or a histone acetyltransferase. In some embodiments, the functional domain is a transcription repression domain, such as KRAB. In some embodiments, the transcription repression domain is SID, or concatemers of SID (e.g., SID4X), NuE, or NcoR. In some embodiments, the functional domain is an epigenetic modifying domain, such that an epigenetic modifying enzyme is provided. In some embodiments, the functional domain is an activation domain, which may be the P65 activation domain. In some embodiments, the functional domain comprises nuclease activity. In one such embodiment, the functional domain may comprise Fok1. Mention is made of U.S. Pat. Pub. 2014/0356959, U.S. Pat. Pub. 2014/0342456, U.S. Pat. Pub. 2015/0031132, and Mali, P. et al., 2013, Science 339(6121):823-6, doi: 10.1126/science.1232033, published online 3 Jan. 2013 and through the teachings herein the invention comprehends methods and materials of these documents applied in conjunction with the teachings herein. It is to be understood that also destabilization domains or localization domains as described herein elsewhere are encompassed by the generic term "functional domain". In certain embodiments, one or more functional domains are associated with the nuclease itself. In some embodiments, one or more functional domains are associated with an adaptor protein, for example as used with the modified guides of Konnerman et al. (Nature 517(7536): 583-588, 2015; incorporated herein by reference in its entirety), and hence form part of a Synergistic activator mediator (SAM) complex. The adaptor proteins may include but are not limited to orthogonal RNA-binding protein/aptamer combinations that exist within the diversity of bacteriophage coat proteins. A list of such coat proteins includes, but is not limited to: Qβ, F2, GA, fr, JP501, M12, R17, BZ13, JP34, JP500, KU1, M11, MX1, TW18, VK, SP, FI, ID2, NL95, TW19, AP205, φCb5, φCb8r, φCb12r, φCb23r, 7s and PRR1. These adaptor proteins or orthogonal RNA binding proteins can further recruit effector proteins or fusions which comprise one or more functional domains.

In certain embodiments, the nuclease, in particular the Cas protein, may comprise one or more modifications resulting in a destabilized nuclease when expressed in a host (cell). Such may be achieved by fusion of the nuclease with a destabilization domain (DD). Destabilizing domains have general utility to confer instability to a wide range of proteins; see, e.g., Miyazaki, J Am Chem Soc. Mar. 7, 2012; 134(9): 3942-3945, incorporated herein by reference. CMP8 or 4-hydroxytamoxifen can be destabilizing domains. More generally, A temperature-sensitive mutant of mammalian DHFR (DHFRts), a destabilizing residue by the N-end rule, was found to be stable at a permissive temperature but unstable at 37° C. The addition of methotrexate, a high-affinity ligand for mammalian DHFR, to cells expressing DHFRts inhibited degradation of the protein partially. This was an important demonstration that a small molecule ligand can stabilize a protein otherwise targeted for degradation in cells. A rapamycin derivative was used to stabilize an unstable mutant of the FRB domain of mTOR (FRB*) and restore the function of the fused kinase, GSK-3β.6,7 This system demonstrated that ligand-dependent stability represented an attractive strategy to regulate the function of a specific protein in a complex biological environment. A system to control protein activity can involve the DD becoming functional when the ubiquitin complementation occurs by rapamycin induced dimerization of FK506-binding protein and FKBP12. Mutants of human FKBP12 or ecDHFR protein can be engineered to be metabolically unstable in the absence of their high-affinity ligands, Shield-1 or trimethoprim (TMP), respectively. These mutants are some of the possible destabilizing domains (DDs) useful in the practice of the invention and instability of a DD as a fusion with a CRISPR enzyme confers to the CRISPR protein degradation of the entire fusion protein by the proteasome. Shield-1 and TMP bind to and stabilize the DD in a dose-dependent manner. The estrogen receptor ligand binding domain (ERLBD, residues 305-549 of ERS1) can also be engineered as a destabilizing domain. Since the estrogen receptor signaling pathway is involved in a variety of diseases such as breast cancer, the pathway has been widely studied and numerous agonist and antagonists of estrogen receptor have been developed. Thus, compatible pairs of ERLBD and drugs are known. There are ligands that bind to mutant but not wild type forms of the ERLBD. By using one of these mutant domains encoding three mutations (L384M, M421G, G521R)12, it is possible to regulate the stability of an ERLBD-derived DD using a ligand that does not perturbendogenous estrogen-sensitive networks. An additional mutation (Y537S) can be introduced to further destabilize the ERLBD and to configure it as a potential DD candidate. This tetra-mutant is an advantageous DD development. The mutant ERLBD can be fused to a CRISPR enzyme and its stability can be regulated or perturbed using a ligand, whereby the CRISPR enzyme has a DD. Another DD can be a 12-kDa (107-amino-acid) tag based on a mutated FKBP protein, stabilized by Shield1 ligand; see, e.g., Nature Methods 5, (2008). For instance a DD can be a modified FK506 binding protein 12 (FKBP12) that binds to and is reversibly stabilized by a synthetic, biologically inert small molecule, Shield-1; see, e.g., Banaszynski L A, Chen L C, Maynard-Smith L A, Ooi A G, Wandless T J. A rapid, reversible, and tunable method to regulate protein function in living cells using synthetic small molecules. Cell. 2006; 126:995-1004; Banaszynski L A, Sellmyer M A, Contag C H, Wandless T J, Thorne S H. Chemical control of protein stability and function in living mice. Nat Med. 2008; 14:1123-1127; Maynard-Smith L A, Chen L C, Banaszynski L A, Ooi A G, Wandless T J. A directed approach for engineering conditional protein stability using biologically silent small molecules. The Journal of biological chemistry. 2007; 282:24866-24872; and Rodriguez, Chem Biol. Mar. 23, 2012; 19(3): 391-398—all of which are incorporated herein by reference and may be employed in the practice of the invention in selected a DD to associate with a CRISPR enzyme in the practice of this invention. As can be seen, the knowledge in the art includes a number of DDs, and the DD can be associated with, e.g., fused to, advantageously with a linker, to a CRISPR enzyme, whereby the DD can be stabilized in the presence of a ligand and when there is the absence thereof the DD can become destabilized, whereby the CRISPR enzyme is entirely destabilized, or the DD can be stabilized in the absence of a ligand and when the ligand is present the DD can become destabilized; the DD allows the CRISPR enzyme and hence the CRISPR-Cas complex or system to be regulated or controlled—turned on or off so to speak, to thereby provide means for regulation or control of the system, e.g., in an in vivo or in vitro environment. For instance, when a protein of interest is expressed as a fusion with the DD tag, it is destabilized and rapidly degraded in the cell, e.g., by proteasomes. Thus, absence of stabilizing ligand leads to a D associated Cas being degraded. When a new DD is fused to a protein of interest, its instability is conferred to the protein of interest, resulting in the rapid degradation of the entire fusion protein. Peak activity for Cas is sometimes beneficial to reduce off-target effects. Thus, short bursts of high activity are preferred. The invention is able to provide such peaks. In some senses the system is inducible. In some other senses, the system repressed in the absence of stabilizing ligand and de-repressed in the presence of stabilizing ligand. By means of example, and without limitation, in some embodiments, the DD is ER50. A corresponding stabilizing ligand for this DD is, in some embodiments, 4HT. As such, in some embodiments, one of the at least one DDs is ER50 and a stabilizing ligand therefor is 4HT or CMP8. In some embodiments, the DD is DHFR50. A corresponding stabilizing ligand for this DD is, in some embodiments, TMP. As such, in some embodiments, one of the at least one DDs is DHFR50 and a stabilizing ligand therefor is TMP. In some embodiments, the DD is ER50. A corresponding stabilizing ligand for this DD is, in some embodiments, CMP8. CMP8 may therefore be an alternative stabilizing ligand to 4HT in the ER50 system. While it may be possible that CMP8 and 4HT can/should be used in a competitive matter, some cell types may be more susceptible to one or the other of these two ligands, and from this disclosure and the knowledge in the art the skilled person can use CMP8 and/or 4HT. More than one (the same or different) DD may be present, and may be fused for instance C-terminally, or N-terminally, or even internally at suitable locations. Having two or more DDs which are heterologous may be advantageous as it would provide a greater level of degradation control.

In some embodiments, the fusion protein as described herein may comprise a linker between the nuclease and the fusion partner (e.g. functional domain). In some embodiments, the linker is a GlySer linker. Attachment of a functional domain or fusion protein can be via a linker, e.g., a flexible glycine-serine (GlyGlyGlySer) (SEQ ID NO: 1) or (GGGS)3 (SEQ ID NO: 2) or a rigid alpha-helical linker such as (Ala(GluAlaAlaAlaLys)Ala) (SEQ ID NO: 3). Linkers such as (GGGGS)3 (SEQ ID NO: 4) are preferably used herein to separate protein or peptide domains. (GGGGS)3 (SEQ ID NO: 4) is preferable because it is a relatively long linker (15 amino acids). The glycine residues are the most flexible and the serine residues enhance the chance that the linker is on the outside of the protein. (GGGGS)6 (SEQ ID NO: 5) (GGGGS)9 (SEQ ID NO: 6) or (GGGGS)12 (SEQ ID NO: 7) may preferably be used as alternatives. Other preferred alternatives are (GGGGS)1 (SEQ ID NO: 8), (GGGGS)2 (SEQ ID NO: 9), (GGGGS)4 (SEQ ID NO: 10), (GGGGS)5 (SEQ ID NO: 11), (GGGGS)7 (SEQ ID NO: 12), (GGGGS)8 (SEQ ID NO: 13), (GGGGS)10 (SEQ ID NO: 14), or (GGGGS)11 (SEQ ID NO: 15). Alternative linkers are available, but highly flexible linkers are thought to work best to allow for maximum opportunity for the 2 parts of the Cas9 to come together and thus reconstitute Cas9 activity. One alternative is that the NLS of nucleoplasmin can be used as a linker. For example, a linker can also be used between the Cas9 and any functional domain. Again, a (GGGGS)3 (SEQ ID NO: 4) linker may be used here (or the 6 (SEQ ID NO: 5), 9 (SEQ ID NO: 6), or 12 (SEQ ID NO: 7) repeat versions therefore) or the NLS of nucleoplasmin can be used as a linker between Cas9 and the functional domain.

In some embodiments, the nuclease is fused to one or more localization signals, such as nuclear localization sequences (NLSs), such as about or more than about 1, 2, 3, 4, 5, 6, 7, 8, 9, 10, or more NLSs. In some embodiments, the nuclease comprises about or more than about 1, 2, 3, 4, 5, 6, 7, 8, 9, 10, or more NLSs at or near the amino-terminus, about or more than about 1, 2, 3, 4, 5, 6, 7, 8, 9, 10, or more NLSs at or near the carboxy-terminus, or a combination of these (e.g. zero or at least one or more NLS at the amino-terminus and zero or at least one or more NLS at the carboxy terminus). When more than one NLS is present, each may be selected independently of the others, such that a single NLS may be present in more than one copy and/or in combination with one or more other NLSs present in one or more copies. In a preferred embodiment of the invention, the nuclease comprises at most 6 NLSs. In some embodiments, an NLS is considered near the N- or C-terminus when the nearest amino acid of the NLS is within about 1, 2, 3, 4, 5, 10, 15, 20, 25, 30, 40, 50, or more amino acids along the polypeptide chain from the N- or C-terminus. Non-limiting examples of NLSs include an NLS sequence derived from: the NLS of the SV40 virus large T-antigen, having the amino acid sequence PKKKRKV (SEQ ID NO: 16); the NLS from nucleoplasmin (e.g. the nucleoplasmin bipartite NLS with the sequence KRPAATKKAGQAKKKK (SEQ ID NO: 17)); the c-myc NLS having the amino acid sequence PAAKRVKLD (SEQ ID NO: 18) or RQRRNELKRSP (SEQ ID NO: 19); the hnRNPA1M9 NLS having the sequence NQSSNFGPMKGGNFGGRSSGPYGGGGQYFAK-PRNQGGY (SEQ ID NO: 20); the sequence RMRIZFKNKGKDTAELRRRRVEVSVELRKAKKD-EQILKRRNV (SEQ ID NO: 21) of the IBB domain from importin-alpha; the sequences VSRKRPRP (SEQ ID NO: 22) and PPKKARED (SEQ ID NO: 23) of the myoma T protein; the sequence PQPKKKPL (SEQ ID NO: 24) of human p53; the sequence SALIKKKKKMAP (SEQ ID NO: 25) of mouse c-abl IV; the sequences DRLRR (SEQ ID NO: 26) and PKQKKRK (SEQ ID NO: 27) of the influenza virus NS1; the sequence RKLKKKIKKL (SEQ ID NO: 28) of the Hepatitis virus delta antigen; the sequence REKKKFLKRR (SEQ ID NO: 29) of the mouse Mx1 protein; the sequence KRKGDEVDGVDEVAKKKSKK (SEQ ID NO: 30) of the human poly(ADP-ribose) polymerase; and the sequence RKCLQAGMNLEARKTKK (SEQ ID NO: 31) of the steroid hormone receptors (human) glucocorticoid.

In certain aspects the invention involves vectors, e.g. for delivering or introducing in a cell Cas and/or RNA capable of guiding Cas to a target locus (i.e. guide RNA), but also for propagating these components (e.g. in prokaryotic cells). A used herein, a "vector" is a tool that allows or facilitates the transfer of an entity from one environment to another. It is a replicon, such as a plasmid, phage, or cosmid, into which another DNA segment may be inserted so as to bring about the replication of the inserted segment. Generally, a vector is capable of replication when associated with the proper control elements. In general, the term "vector" refers to a nucleic acid molecule capable of transporting another nucleic acid to which it has been linked. Vectors include, but are not limited to, nucleic acid molecules that are single-stranded, double-stranded, or partially double-stranded; nucleic acid molecules that comprise one or more free ends, no free ends (e.g. circular); nucleic acid molecules that comprise DNA, RNA, or both; and other varieties of polynucleotides known in the art. One type of vector is a "plasmid," which refers to a circular double stranded DNA loop into which additional DNA segments can be inserted, such as by standard molecular cloning techniques. Another type of vector is a viral vector, wherein virally-derived DNA or RNA sequences are present in the vector for packaging into a virus (e.g. retroviruses, replication defective retroviruses, adenoviruses, replication defective adenoviruses, and adeno-associated viruses (AAVs)). Viral vectors also include polynucleotides carried by a virus for transfection into a host cell. Certain vectors are capable of autonomous replication in a host cell into which they are introduced (e.g. bacterial vectors having a bacterial origin of replication and episomal mammalian vectors). Other vectors (e.g., non-episomal mammalian vectors) are integrated into the genome of a host cell upon introduction into the host cell, and thereby are replicated along with the host genome. Moreover, certain vectors are capable of directing the expression of genes to which they are operatively-linked. Such vectors are referred to herein as "expression vectors." Common expression vectors of utility in recombinant DNA techniques are often in the form of plasmids.

Recombinant expression vectors can comprise a nucleic acid of the invention in a form suitable for expression of the nucleic acid in a host cell, which means that the recombinant expression vectors include one or more regulatory elements, which may be selected on the basis of the host cells to be used for expression, that is operatively-linked to the nucleic acid sequence to be expressed. Within a recombinant expression vector, "operably linked" is intended to mean that the nucleotide sequence of interest is linked to the regulatory element(s) in a manner that allows for expression of the nucleotide sequence (e.g. in an in vitro transcription/translation system or in a host cell when the vector is introduced into the host cell). With regards to recombination and cloning methods, mention is made of U.S. patent application Ser. No. 10/815,730, published Sep. 2, 2004 as US 2004-0171156 A1, the contents of which are herein incorporated by reference in their entirety.

The vector(s) can include the regulatory element(s), e.g., promoter(s). The vector(s) can comprise Cas encoding sequences, and/or a single, but possibly also can comprise at least 3 or 8 or 16 or 32 or 48 or 50 guide RNA(s) (e.g., sgRNAs) encoding sequences, such as 1-2, 1-3, 1-4 1-5, 3-6, 3-7, 3-8, 3-9, 3-10, 3-8, 3-16, 3-30, 3-32, 3-48, 3-50 RNA(s) (e.g., sgRNAs). In a single vector there can be a promoter for each RNA (e.g., sgRNA), advantageously when there are up to about 16 RNA(s); and, when a single vector provides for more than 16 RNA(s), one or more promoter(s) can drive expression of more than one of the RNA(s), e.g., when there are 32 RNA(s), each promoter can drive expression of two RNA(s), and when there are 48 RNA(s), each promoter can drive expression of three RNA(s). By simple arithmetic and well established cloning protocols and the teachings in this disclosure one skilled in the art can readily practice the invention as to the RNA(s) for a suitable exemplary vector such as AAV, and a suitable promoter such as the U6 promoter. For example, the packaging limit of AAV is ~4.7 kb. The length of a single U6-gRNA (plus restriction sites for cloning) is 361 bp. Therefore, the skilled person can readily fit about 12-16, e.g., 13 U6-gRNA cassettes in a single vector. This can be assembled by any suitable means, such as a golden gate strategy used for TALE assembly (www.genome-engineering.org/taleffectors/). The skilled person can also use a tandem guide strategy to increase the number of U6-gRNAs by approximately 1.5 times, e.g., to increase from 12-16, e.g., 13 to approximately 18-24, e.g., about 19 U6-gRNAs. Therefore, one skilled in the art can readily reach approximately 18-24, e.g., about 19 promoter-RNAs, e.g., U6-gRNAs in a single vector, e.g., an AAV vector. A further means for increasing the number of promoters and RNAs in a vector is to use a single promoter (e.g., U6) to express an array of RNAs separated by cleavable sequences. And an even further means for increasing the number of promoter-RNAs in a vector, is to express an array of promoter-RNAs separated by cleavable sequences in the intron of a coding sequence or gene; and, in this instance it is advantageous to use a polymerase II promoter, which can have increased expression and enable the transcription of long RNA in a tissue specific manner. (see, e.g., nar.oxfordjournals.org/content/34/7/e53.short, www.nature.com/mt/journal/v16/n9/abs/mt2008144a.html). In an advantageous embodiment, AAV may package U6 tandem gRNA targeting up to about 50 genes. Accordingly, from the knowledge in the art and the teachings in this disclosure the skilled person can readily make and use vector(s), e.g., a single vector, expressing multiple RNAs or guides under the control or operatively or functionally linked to one or more promoters-especially as to the numbers of RNAs or guides discussed herein, without any undue experimentation.

The guide RNA(s) encoding sequences and/or Cas encoding sequences, can be functionally or operatively linked to regulatory element(s) and hence the regulatory element(s) drive expression. The promoter(s) can be constitutive promoter(s) and/or conditional promoter(s) and/or inducible promoter(s) and/or tissue specific promoter(s). The promoter can be selected from the group consisting of RNA polymerases, pol I, pol II, pol III, T7, U6, H1, retroviral Rous sarcoma virus (RSV) LTR promoter, the cytomegalovirus (CMV) promoter, the SV40 promoter, the dihydrofolate reductase promoter, the β-actin promoter, the phosphoglycerol kinase (PGK) promoter, and the EFI1α promoter. An advantageous promoter is the promoter is U6.

Orthologs of Cas9

The CRISPR-Cas9 system is described in detail in international patent application no. PCT/US2017/047458, titled "NOVEL CRISPR ENZYMES AND SYSTEMS" and filed Aug. 17, 2017, which is incorporated by reference in its entirety. The terms "orthologue" (also referred to as "ortholog" herein) and "homologue" (also referred to as "homolog" herein) are well known in the art. By means of further guidance, a "homologue" of a protein as used herein is a protein of the same species which performs the same or a similar function as the protein it is a homologue of Homologous proteins may but need not be structurally related, or are only partially structurally related. An "orthologue" of a protein as used herein is a protein of a different species which performs the same or a similar function as the protein it is an orthologue of. Orthologous proteins may but need not be structurally related, or are only partially structurally related. Homologs and orthologs may be identified by homology modelling (see, e.g., Greer, Science vol. 228 (1985) 1055, and Blundell et al. Eur J Biochem vol 172 (1988), 513) or "structural BLAST" (Dey F, Cliff Zhang Q, Petrey D, Honig B. Toward a "structural BLAST": using structural relationships to infer function. Protein Sci. 2013 April; 22(4):359-66. doi: 10.1002/pro.2225.). See also Shmakov et al. (2015) for application in the field of CRISPR-Cas loci. Homologous proteins may but need not be structurally related, or are only partially structurally related.

The Cas9 gene is found in several diverse bacterial genomes, typically in the same locus with cas1, cas2, and cas4 genes and a CRISPR cassette. Furthermore, the Cas9 protein contains a readily identifiable C-terminal region that is homologous to the transposon ORF-B and includes an active RuvC-like nuclease, an arginine-rich region.

In particular embodiments, the effector protein is a Cas9 effector protein from an organism from a genus comprising *Streptococcus, Campylobacter, Nitratifractor, Staphylococcus, Parvibaculum, Roseburia, Neisseria, Gluconacetobacter, Azospirillum, Sphaerochaeta, Lactobacillus, Eubacterium*, or *Corynebacterium*.

In particular embodiments, the effector protein is a Cas9 effector protein from an organism from a genus comprising *Carnobacterium, Rhodobacter, Listeria, Paludibacter, Clostridium, Lachnospiraceae, Clostridiaridium, Leptotrichia, Francisella, Legionella, Alicyclobacillus, Methanomethylophilus, Porphyromonas, Prevotella, Bacteroidetes, Helcococcus, Leptospira, Desulfovibrio, Desulfonatronum, Opitutaceae, Tuberibacillus, Bacillus, Brevibacillus, Methylobacterium* or *Acidaminococcus*.

In further particular embodiments, the Cas9 effector protein is from an organism selected from *S. mutans, S. agalactiae, S. equisimilis, S. sanguinis, S. pneumonia; C. jejuni, C. coli; N. salsuginis, N. tergarcus; S. auricularis, S. carnosus; N. meningitides, N. gonorrhoeae; L. monocytogenes, L. ivanovii; C. botulinum, C. difficile, C. tetani, C. sordellii*. In particular embodiments, the effector protein is a Cas9 effector protein from an organism from *Streptococcus pyogenes, Staphylococcus aureus*, or *Streptococcus thermophilus* Cas9.

The effector protein may comprise a chimeric effector protein comprising a first fragment from a first effector protein (e.g., a Cas9) ortholog and a second fragment from a second effector (e.g., a Cas9) protein ortholog, and wherein the first and second effector protein orthologs are different. At least one of the first and second effector protein (e.g., a Cas9) orthologs may comprise an effector protein (e.g., a Cas9) from an organism comprising *Streptococcus, Campylobacter, Nitratifractor, Staphylococcus, Parvibaculum, Roseburia, Neisseria, Gluconacetobacter, Azospirillum, Sphaerochaeta, Lactobacillus, Eubacterium, Corynebacterium, Carnobacterium, Rhodobacter, Listeria, Paludibacter, Clostridium, Lachnospiraceae, Clostridiaridium, Leptotrichia, Francisella, Legionella, Alicyclobacillus, Methanomethylophilus, Porphyromonas, Prevotella, Bacteroidetes, Helcococcus, Leptospira, Desulfovibrio, Desulfonatronum, Opitutaceae, Tuberibacillus, Bacillus, Brevibacillus, Methylobacterium* or *Acidaminococcus*; e.g., a chimeric effector protein comprising a first fragment and a second fragment wherein each of the first and second fragments is selected from a Cas9 of an organism comprising *Streptococcus, Campylobacter, Nitratifractor, Staphylococcus, Parvibaculum, Roseburia, Neisseria, Gluconacetobacter, Azospirillum, Sphaerochaeta, Lactobacillus, Eubacterium, Corynebacterium, Carnobacterium, Rhodobacter, Listeria, Paludibacter, Clostridium, Lachnospiraceae, Clostridiaridium, Leptotrichia, Francisella, Legionella, Alicyclobacillus, Methanomethylophilus, Porphyromonas, Prevotella, Bacteroidetes, Helcococcus, Leptospira, Desulfovibrio, Desulfonatronum, Opitutaceae, Tuberibacillus, Bacillus, Brevibacillus, Methylobacterium* or *Acidaminococcus* wherein the first and second fragments are not from the same bacteria; for instance a chimeric effector protein comprising a first fragment and a second fragment wherein each of the first and second fragments is selected from a Cas9 of *S. mutans, S. agalactiae, S. equisimilis, S. sanguinis, S. pneumonia; C. jejuni, C. coli; N. salsuginis, N. tergarcus; S. auricularis, S. carnosus; N. meningitides, N. gonorrhoeae; L. monocytogenes, L. ivanovii; C. botulinum, C. difficile, C. tetani, C. sordellii; Francisella tularensis* 1, *Prevotella albensis*, Lachnospiraceae bacterium MC2017 1, *Butyrivibrio proteoclasticus*, Peregrinibacteria bacterium GW2011_GWA2_33_10, Parcubacteria bacterium GW2011_GWC2_44_17, Smithella sp. SCADC, *Acidaminococcus* sp. BV3L6, Lachnospiraceae bacterium MA2020, *Candidatus Methanoplasma termitum, Eubacterium eligens, Moraxella bovoculi* 237, *Leptospira inadai*, Lachnospiraceae bacterium ND2006, *Porphyromonas crevioricanis*

3, *Prevotella disiens* and *Porphyromonas macacae*, wherein the first and second fragments are not from the same bacteria.

In a more preferred embodiment, the Cas9 is derived from a bacterial species selected from *Streptococcus pyogenes*, *Staphylococcus aureus*, or *Streptococcus thermophilus* Cas9. In certain embodiments, the Cas9p is derived from a bacterial species selected from *Francisella tularensis* 1, *Prevotella albensis*, Lachnospiraceae bacterium MC2017 1, *Butyrivibrio proteoclasticus*, Peregrinibacteria bacterium GW2011_GWA2_33_10, Parcubacteria bacterium GW2011_GWC2_44_17, Smithella sp. SCADC, *Acidaminococcus* sp. BV3L6, Lachnospiraceae bacterium MA2020, *Candidatus Methanoplasma termitum*, *Eubacterium eligens*, *Moraxella bovoculi* 237, *Leptospira inadai*, Lachnospiraceae bacterium ND2006, *Porphyromonas crevioricanis* 3, *Prevotella disiens* and *Porphyromonas macacae*. In certain embodiments, the Cas9p is derived from a bacterial species selected from *Acidaminococcus* sp. BV3L6, Lachnospiraceae bacterium MA2020. In certain embodiments, the effector protein is derived from a subspecies of *Francisella tularensis* 1, including but not limited to *Francisella tularensis* subsp. *Novicida*.

The nucleic acid-targeting system may be derived advantageously from a Type VI CRISPR system. In some embodiments, one or more elements of a nucleic acid-targeting system is derived from a particular organism comprising an endogenous RNA-targeting system. In particular embodiments, the Type VI RNA-targeting Cas enzyme is C2c2. In an embodiment of the invention, there is provided a effector protein which comprises an amino acid sequence having at least 80% sequence homology to the wild type sequence of any of *Leptotrichia shahii* C2c2, Lachnospiraceae bacterium MA2020 C2c2, Lachnospiraceae bacterium NK4A179 C2c2, *Clostridium aminophilum* (DSM 10710) C2c2, *Carnobacterium gallinarum* (DSM 4847) C2c2, *Paludibacter propionicigenes* (WB4) C2c2, *Listeria weihenstephanensis* (FSL R9-0317) C2c2, Listeriaceae bacterium (FSL M6-0635) C2c2, *Listeria newyorkensis* (FSL M6-0635) C2c2, *Leptotrichia wadei* (F0279) C2c2, *Rhodobacter capsulatus* (SB 1003) C2c2, *Rhodobacter capsulatus* (R121) C2c2, *Rhodobacter capsulatus* (DE442) C2c2, *Leptotrichia wadei* (Lw2) C2c2, or *Listeria seeligeri* C2c2.

In particular embodiments, the homologue or orthologue of Cas9 as referred to herein has a sequence homology or identity of at least 80%, more preferably at least 85%, even more preferably at least 90%, such as for instance at least 95% with Cas9. In further embodiments, the homologue or orthologue of Cas9 as referred to herein has a sequence identity of at least 80%, more preferably at least 85%, even more preferably at least 90%, such as for instance at least 95% with the wild type Cas9. Where the Cas9 has one or more mutations (mutated), the homologue or orthologue of said Cas9 as referred to herein has a sequence identity of at least 80%, more preferably at least 85%, even more preferably at least 90%, such as for instance at least 95% with the mutated Cas9.

In an embodiment, the Cas9 protein may be an ortholog of an organism of a genus which includes, but is not limited to *Streptococcus* sp. or *Staphylococcus* sp.; in particular embodiments, Cas9 protein may be an ortholog of an organism of a species which includes, but is not limited to *Streptococcus pyogenes*, *Staphylococcus aureus*, or *Streptococcus thermophilus* Cas9. In particular embodiments, the homologue or orthologue of Cas9p as referred to herein has a sequence homology or identity of at least 80%, more preferably at least 85%, even more preferably at least 90%, such as for instance at least 95% with one or more of the Cas9 sequences disclosed herein. In further embodiments, the homologue or orthologue of Cas9 as referred to herein has a sequence identity of at least 80%, more preferably at least 85%, even more preferably at least 90%, such as for instance at least 95% with the wild type SpCas9, SaCas9 or StCas9.

In particular embodiments, the Cas9 protein of the invention has a sequence homology or identity of at least 60%, more particularly at least 70, such as at least 80%, more preferably at least 85%, even more preferably at least 90%, such as for instance at least 95% with SpCas9, SaCas9 or StCas9. In further embodiments, the Cas9 protein as referred to herein has a sequence identity of at least 60%, such as at least 70%, more particularly at least 80%, more preferably at least 85%, even more preferably at least 90%, such as for instance at least 95% with the wild type SpCas9, SaCas9 or StCas9. The skilled person will understand that this includes truncated forms of the Cas9 protein whereby the sequence identity is determined over the length of the truncated form.

In an embodiment of the invention, the effector protein comprises at least one HEPN domain, including but not limited to HEPN domains described herein, HEPN domains known in the art, and domains recognized to be HEPN domains by comparison to consensus sequences and motifs.

Determination of Cas9 PAM

Determination of PAM can be ensured as follows. This experiment closely parallels similar work in *E. coli* for the heterologous expression of StCas9 (Sapranauskas, R. et al. Nucleic Acids Res 39, 9275-9282 (2011)). Applicants introduce a plasmid containing both a PAM and a resistance gene into the heterologous *E. coli*, and then plate on the corresponding antibiotic. If there is DNA cleavage of the plasmid, Applicants observe no viable colonies.

In further detail, the assay is as follows for a DNA target. Two *E. coli* strains are used in this assay. One carries a plasmid that encodes the endogenous effector protein locus from the bacterial strain. The other strain carries an empty plasmid (e.g. pACYC184, control strain). All possible 7 or 8 bp PAM sequences are presented on an antibiotic resistance plasmid (pUC19 with ampicillin resistance gene). The PAM is located next to the sequence of protospacer 1 (the DNA target to the first spacer in the endogenous effector protein locus). Two PAM libraries were cloned. One has a 8 random bp 5' of the protospacer (e.g. total of 65536 different PAM sequences=complexity). The other library has 7 random bp 3' of the protospacer (e.g. total complexity is 16384 different PAMs). Both libraries were cloned to have in average 500 plasmids per possible PAM. Test strain and control strain were transformed with 5'PAM and 3'PAM library in separate transformations and transformed cells were plated separately on ampicillin plates. Recognition and subsequent cutting/interference with the plasmid renders a cell vulnerable to ampicillin and prevents growth. Approximately 12 h after transformation, all colonies formed by the test and control strains where harvested and plasmid DNA was isolated. Plasmid DNA was used as template for PCR amplification and subsequent deep sequencing. Representation of all PAMs in the untransfomed libraries showed the expected representation of PAMs in transformed cells. Representation of all PAMs found in control strains showed the actual representation. Representation of all PAMs in test strain showed which PAMs are not recognized by the enzyme and comparison to the control strain allows extracting the sequence of the depleted PAM.

Codon-Optimized Cas9

Where the effector protein is to be administered as a nucleic acid, the application envisages the use of codon-optimized Cas9 sequences. An example of a codon-optimized sequence, is in this instance a sequence optimized for expression in a eukaryote, e.g., humans (i.e. being optimized for expression in humans), or for another eukaryote, animal or mammal as herein discussed; see, e.g., SaCas9 human codon-optimized sequence in WO 2014/093622 (PCT/US2013/074667) as an example of a codon-optimized sequence (from knowledge in the art and this disclosure, codon optimizing coding nucleic acid molecule(s), especially as to effector protein (e.g., Cas9) is within the ambit of the skilled artisan). Whilst this is preferred, it will be appreciated that other examples are possible and codon optimization for a host species other than human, or for codon optimization for specific organs is known. In some embodiments, an enzyme coding sequence encoding a DNA/RNA-targeting Cas protein is codon-optimized for expression in particular cells, such as eukaryotic cells. The eukaryotic cells may be those of or derived from a particular organism, such as a plant or a mammal, including but not limited to human, or non-human eukaryote or animal or mammal as herein discussed, e.g., mouse, rat, rabbit, dog, livestock, or non-human mammal or primate. In some embodiments, processes for modifying the germ line genetic identity of human beings and/or processes for modifying the genetic identity of animals which are likely to cause them suffering without any substantial medical benefit to man or animal, and also animals resulting from such processes, may be excluded. In general, codon optimization refers to a process of modifying a nucleic acid sequence for enhanced expression in the host cells of interest by replacing at least one codon (e.g., about or more than about 1, 2, 3, 4, 5, 10, 15, 20, 25, 50, or more codons) of the native sequence with codons that are more frequently or most frequently used in the genes of that host cell while maintaining the native amino acid sequence. Various species exhibit particular bias for certain codons of a particular amino acid. Codon bias (differences in codon usage between organisms) often correlates with the efficiency of translation of messenger RNA (mRNA), which is in turn believed to be dependent on, among other things, the properties of the codons being translated and the availability of particular transfer RNA (tRNA) molecules. The predominance of selected tRNAs in a cell is generally a reflection of the codons used most frequently in peptide synthesis. Accordingly, genes can be tailored for optimal gene expression in a given organism based on codon optimization. Codon usage tables are readily available, for example, at the "Codon Usage Database" available at www.kazusa.or.jp/codon/ and these tables can be adapted in a number of ways. See Nakamura, Y., et al. "Codon usage tabulated from the international DNA sequence databases: status for the year 2000" Nucl. Acids Res. 28:292 (2000). Computer algorithms for codon optimizing a particular sequence for expression in a particular host cell are also available, such as Gene Forge (Aptagen; Jacobus, PA), are also available. In some embodiments, one or more codons (e.g., 1, 2, 3, 4, 5, 10, 15, 20, 25, 50, or more, or all codons) in a sequence encoding a DNA/RNA-targeting Cas protein corresponds to the most frequently used codon for a particular amino acid. As to codon usage in yeast, reference is made to the online Yeast Genome database available at www.yeastgenome.org/community/codon_usage.shtml, or Codon selection in yeast, Bennetzen and Hall, J Biol Chem. 1982 Mar. 25; 257(6):3026-31. As to codon usage in plants including algae, reference is made to Codon usage in higher plants, green algae, and cyanobacteria, Campbell and Gowri, Plant Physiol. 1990 January; 92(1): 1-11.; as well as Codon usage in plant genes, Murray et al, Nucleic Acids Res. 1989 Jan. 25; 17(2):477-98; or Selection on the codon bias of chloroplast and cyanelle genes in different plant and algal lineages, Morton B R, J Mol Evol. 1998 April; 46(4):449-59.

Modified Cas9 Protein

In particular embodiments, it is of interest to make us of an engineered Cas9 protein as defined herein, such as Cas9, wherein the protein complexes with a nucleic acid molecule comprising RNA to form a CRISPR complex, wherein when in the CRISPR complex, the nucleic acid molecule targets one or more target polynucleotide loci, the protein comprises at least one modification compared to unmodified Cas9 protein, and wherein the CRISPR complex comprising the modified protein has altered activity as compared to the complex comprising the unmodified Cas9 protein. It is to be understood that when referring herein to CRISPR "protein", the Cas9 protein preferably is a modified CRISPR enzyme (e.g. having increased or decreased (or no) enzymatic activity, such as without limitation including Cas9. The term "CRISPR protein" may be used interchangeably with "CRISPR enzyme", irrespective of whether the CRISPR protein has altered, such as increased or decreased (or no) enzymatic activity, compared to the wild type CRISPR protein.

Several small stretches of unstructured regions are predicted within the Cas9 primary structure. Unstructured regions, which are exposed to the solvent and not conserved within different Cas9 orthologs, are preferred sides for splits and insertions of small protein sequences. In addition, these sides can be used to generate chimeric proteins between Cas9 orthologs.

Based on the above information, mutants can be generated which lead to inactivation of the enzyme or which modify the double strand nuclease to nickase activity. In alternative embodiments, this information is used to develop enzymes with reduced off-target effects (described elsewhere herein). In certain example embodiments, the information is used to develop enzymes with altered editing preferences as compared to wild type.

In one example embodiment, a modified Cas9 protein comprises at least one modification that alters editing preference as composed to wild type. In certain example embodiments, the editing preference is for a specific insert or deletion within the target region. In certain example embodiments, the at least one modification increases formation of one or more specific indels. In one example embodiment, the at least on modification is in the binding region including the targeting region and/or the PAM interacting region. In another example embodiment, the at least one modification is not in the binding region including the targeting region and/or the PAM interacting region. In one example embodiment, the one or more modification are located in or proximate to a RuvC domain. In another example embodiment, the one or more modification are located in or proximate to a HNH or Nuc domain. In another example embodiment, the one or more modification are in or proximate to a bridge helix. In another example embodiment, the one or more modifications are in or proximate to a recognition lobe. In another example embodiment, the at least one modification is present or proximate to a D10 active site residue. In another example embodiment, the at least one modification is present in or proximate to a linker region. The linker region may form a linker from a RuvC domain to the bridge helix. In certain example embodiments, the one or more modifications are located at residues 6-19, 51-60, 690-696, 698-700, 725-734, 764-786, 802-811, 837-871, 902-929, 976-982, 998-1007, or a combination thereof, of SpCas9 or a residue in an ortholog corresponding or functionally equivalent thereto.

In certain example embodiments, the at least one modification increases formation of one or more specific insertions. In certain example embodiments, the at least one modification results in an insertion of an A adjacent to an A, T, G, or C in the target region. In another example embodiment, the at least one modification results in insertion of a T adjacent to an A, T, G, or C in the target region. In another example embodiment, the at least one modification results in insertion of a G adjacent to an A, T, G, or C in the target region. In another example embodiment, the at least one modification results in insertion of a C adjacent to an A, T, C, or G in the target region. The insertion may be 5' or 3' to the adjacent nucleotide. In one example embodiment, the one or more modification direct insertion of a T adjacent to an existing T. In certain example embodiments, the existing T corresponds to the 4th position in the binding region of a guide sequence. In certain example embodiments, the one or more modifications result in an enzyme which ensures more precise one-base insertions or deletions, such as those described above. More particularly, the one or more modifications may reduce the formations of other types of indels by the enzyme. The ability to generate one-base insertions or deletions can be of interest in a number of applications, such as correction of genetic mutants in diseases caused by small deletions, more particularly where HDR is not possible. For example correction of the F508del mutation in CFTR via delivery of three sRNA directing insertion of three T's, which is the most common genotype of cystic fibrosis, or correction of Alia Jafar's single nucleotide deletion in CDKL5 in the brain. As the editing method only requires NHEJ, the editing would be possible in post-mitotic cells such as the brain. The ability to generate one-base pair insertions/deletions may also be useful in genome-wide CRISPR-Cas negative selection screens. In certain example embodiments, the at least one modification, is a mutation. In certain other example embodiment, the one or more modification may be combined with one or more additional modifications or mutations described below including modifications to increase binding specificity and/or decrease off-target effects.

In certain example embodiments, the engineered CRISPR-cas effector comprising at least one modification that alters editing preference as compared to wild type may further comprise one or more additional modifications that alters the binding property as to the nucleic acid molecule comprising RNA or the target polypeptide loci, altering binding kinetics as to the nucleic acid molecule or target molecule or target polynucleotide or alters binding specificity as to the nucleic acid molecule. Example of such modifications are summarized in the following paragraph.

Suitable Cas9 enzyme modifications which enhance specificity in particular by reducing off-target effects, are described for instance in PCT/US2016/038034, which is incorporated herein by reference in its entirety. In particular embodiments, a reduction of off-target cleavage is ensured by destabilizing strand separation, more particularly by introducing mutations in the Cas9 enzyme decreasing the positive charge in the DNA interacting regions (as described herein and further exemplified for Cas9 by Slaymaker et al. 2016 (Science, 1; 351(6268):84-8). In further embodiments, a reduction of off-target cleavage is ensured by introducing mutations into Cas9 enzyme which affect the interaction between the target strand and the guide RNA sequence, more particularly disrupting interactions between Cas9 and the phosphate backbone of the target DNA strand in such a way as to retain target specific activity but reduce off-target activity (as described for Cas9 by Kleinstiver et al. 2016, Nature, 28; 529(7587):490-5). In particular embodiments, the off-target activity is reduced by way of a modified Cas9 wherein both interaction with target strand and non-target strand are modified compared to wild type Cas9.

The methods and mutations which can be employed in various combinations to increase or decrease activity and/or specificity of on-target vs. off-target activity, or increase or decrease binding and/or specificity of on-target vs. off-target binding, can be used to compensate or enhance mutations or modifications made to promote other effects. Such mutations or modifications made to promote other effects include mutations or modification to the Cas9 effector protein and/or mutation or modification made to a guide RNA.

With a similar strategy used to improve Cas9 specificity (Slaymaker et al. 2015 "Rationally engineered Cas9 nucleases with improved specificity"), specificity of Cas9 can be further improved by mutating residues that stabilize the non-targeted DNA strand. This may be accomplished without a crystal structure by using linear structure alignments to predict 1) which domain of Cas9 binds to which strand of DNA and 2) which residues within these domains contact DNA.

However, this approach may be limited due to poor conservation of Cas9 with known proteins. Thus it may be desirable to probe the function of all likely DNA interacting amino acids (lysine, histidine and arginine).

Without being bound by theory, in an aspect of the invention, the methods and mutations described provide for enhancing conformational rearrangement of Cas9 domains to positions that results in cleavage at on-target sits and avoidance of those conformational states at off-target sites. Cas9 cleaves target DNA in a series of coordinated steps. First, the PAM-interacting domain recognizes the PAM sequence 5' of the target DNA. After PAM binding, the first 10-12 nucleotides of the target sequence (seed sequence) are sampled for sgRNA:DNA complementarity, a process dependent on DNA duplex separation. If the seed sequence nucleotides complement the sgRNA, the remainder of DNA is unwound and the full length of sgRNA hybridizes with the target DNA strand. The nt-groove between the RuvC and HNH domains stabilizes the non-targeted DNA strand and facilitates unwinding through non-specific interactions with positive charges of the DNA phosphate backbone. RNA:cDNA and Cas9:ncDNA interactions drive DNA unwinding in competition against cDNA:ncDNA rehybridization. Other cas9 domains affect the conformation of nuclease domains as well, for example linkers connecting HNH with RuvCII and RuvCIII. Accordingly, the methods and mutations provided encompass, without limitation, RuvCI, RuvCII, RuvCIII and HNH domains and linkers. Conformational changes in Cas9 brought about by target DNA binding, including seed sequence interaction, and interactions with the target and non-target DNA strand determine whether the domains are positioned to trigger nuclease activity. Thus, the mutations and methods provided herein demonstrate and enable modifications that go beyond PAM recognition and RNA-DNA base pairing. In an aspect, the invention provides Cas9 nucleases that comprise an improved equilibrium towards conformations associated with cleavage activity when involved in on-target interactions and/or improved equilibrium away from conformations associated with cleavage activity when involved in off-target interactions. In one aspect, the invention provides Cas9 nucleases with improved proof-reading function, i.e. a Cas9 nuclease which adopts a conformation comprising nuclease activity at an on-target site, and which conformation has increased unfavorability at an off-target site. Sternberg et al., Nature 527(7576):110-3, doi: 10.1038/nature15544, published online 28 Oct. 2015. Epub 2015 Oct. 28, used Forster resonance energy transfer FRET) experiments to detect relative orientations of the Cas9 catalytic domains when associated with on- and off-target DNA.

For SpCas9, the single and combination mutants listed herein including in the foregoing Examples are presently considered advantageous as having demonstrated preferred specificity enhancement SpCas9 and SaCas9 mutants, including those tested and those otherwise within this disclosure are listed below in Tables A1-A7.

TABLE A1

List of SpCas9 quadruple mutants

| Mutant | Residue | Residue | Residue | Residue |
|---|---|---|---|---|
| QM1 | R63A | K855A | R1060A | E610G |
| QM2 | R63A | H982A | K1003A | K1129E |
| QM3 | R63A | K810A | K1003A | R1060A |

TABLE A2

List of SpCas9 single mutants

| Mutant | Residue and substitution |
|---|---|
| 1 | R63A |
| 2 | H415A |
| 3 | H447A |
| 4 | R778A |
| 5 | R780A |
| 6 | R783A |
| 7 | Q807A |
| 8 | K810A |
| 9 | R832A |
| 10 | K848A |
| 11 | K855A |
| 12 | K968A |
| 13 | R976A |
| 14 | H982A |
| 15 | K1000A |
| 16 | K1003A |
| 17 | K1047A |
| 18 | R1060A |
| 19 | K1107A |
| 20 | R1114A |
| 21 | K1118A |
| 22 | R403A |
| 23 | K1200A |

TABLE A3

List of SpCas9 double and triple mutants

| Mutant | Residue and substitution | | |
|---|---|---|---|
| 1 | R780A | R1060A | |
| 2 | R780A | K1003A | |
| 3 | K810A | K848A | |
| 4 | K810A | K855A | |
| 5 | K848A | K855A | |
| 6 | K855A | R1060A | |
| 7 | R780A | K1003A | R1060A |
| 8 | K855A | K1003A | R1060A |
| 9 | H982A | K1003A | K1129E |
| 10 | K810A | K1003A | R1060A |

TABLE A4

List of SaCas9 single mutants

| Mutant | Residue |
|---|---|
| 1 | H700 |
| 2 | R694 |
| 3 | K692 |
| 4 | R686 |
| 5 | K687 |
| 6 | K751 |
| 7 | R561 |
| 8 | H557 |
| 9 | K572 |
| 10 | K523 |
| 11 | K518 |
| 12 | K525 |

TABLE A5

List of SaCas9 single mutants

| Mutant | Residue |
|---|---|
| 2 | R245 |
| 3 | R480 |
| 4 | R497 |
| 5 | R499 |
| 6 | R617 |
| 7 | R630 |
| 8 | R634 |
| 9 | R644 |
| 10 | R650 |
| 11 | R654 |
| 12 | K736 |

TABLE A6

List of SpCas9 single mutants

| Mutant | Residue and substitution |
|---|---|
| 1 | N14K |
| 2 | N776L |
| 3 | E781L |
| 4 | E809K |
| 5 | L813R |
| 6 | S845K |
| 7 | L847R |
| 8 | D849A |
| 9 | I852K |
| 10 | D859A |
| 11 | S964K |
| 12 | V975K |
| 13 | E977K |
| 14 | N978K |

Table A7, below, provides exemplary mutants within this disclosure, including those exemplified.

TABLE 7

Representative Mutants Within This Disclosure
Single Mutants

| Mutant | Residue | Region |
|---|---|---|
| SM1 | K775A | Groove |
| SM2 | R780A | Groove |
| SM3 | R780A | Groove |
| SM4 | K810A | Groove |
| SM5 | R832A | Groove |
| SM6 | K848A | Groove |
| SM7 | K855A | Groove |
| SM8 | R859A | Groove |
| SM9 | K862A | Groove |
| SM10 | K866A | Groove |
| SM11 | K961A | Groove |
| SM12 | K968A | Groove |
| SM13 | K974A | Groove |
| SM14 | R976A | Groove |
| SM15 | H982A | Groove |
| SM16 | H983A | Groove |
| SM17 | K1014A | Groove |
| SM18 | K1047A | Groove |
| SM19 | K1059A | Groove |
| SM20 | R1060A | Groove |
| SM21 | K1003A | Groove |
| SM22 | H1240A | Groove |
| SM23 | K1244A | Groove |
| SM24 | K1289A | Groove |
| SM25 | K1296A | Groove |
| SM26 | H1297A | Groove |
| SM27 | R1298A | Groove |
| SM28 | K1300A | Groove |
| SM29 | R1303A | Groove |
| SM30 | H1311A | Groove |
| SM31 | K1325A | Groove |
| SM32 | K1107A | PL |
| SM33 | E1108A | PL |
| SM34 | S1109A | PL |
| SM35 | ΔK1107 | PL |
| SM36 | ΔE1108 | PL |
| SM37 | ΔS1109 | PL |
| SM38 | ES_G | PL |
| SM39 | KES_GG | PL |
| SM40 | R778A | DNA |
| SM41 | K782A | DNA |
| SM42 | R783A | DNA |
| SM43 | K789A | DNA |
| SM44 | K797A | DNA |
| SM45 | K890A | DNA |
| SM46 | R1114A | cDNA |
| SM47 | K1118A | cDNA |
| SM48 | K1200A | cDNA |
| SM49 | R63A | sgRNA |
| SM50 | K163A | sgRNA |
| SM51 | R165A | sgRNA |
| SM52 | R403A | sgRNA |
| SM53 | H415A | sgRNA |
| SM54 | R447A | sgRNA |
| SM55 | K1000A | Groove |

Double Mutants

| Mutant | | |
|---|---|---|
| DM1 | R780A | K810A |
| DM2 | R780A | K848A |
| DM3 | R780A | K855A |
| DM4 | R780A | R976A |
| DM5 | K810A | K848A |
| DM6 | K810A | K855A |
| DM7 | K810A | R976A |
| DM8 | K848A | K855A |
| DM9 | K848A | R976A |
| DM10 | K855A | R976A |
| DM11 | H982A | R1060A |
| DM12 | H982A | K1003A |
| DM13 | K1003A | R1060A |
| DM14 | R780A | H982A |
| DM15 | K810A | H982A |
| DM16 | K848A | H982A |
| DM17 | K855A | H982A |
| DM18 | R780A | K1003A |
| DM19 | K810A | K1003A |
| DM20 | K848A | K1003A |
| DM21 | K855A | K1003A |
| DM22 | R780A | R1060A |
| DM23 | K810A | R1060A |
| DM24 | K848A | R1060A |
| DM25 | K855A | R1060A |
| DM26 | R63A | R780A |
| DM27 | R63A | K810A |
| DM28 | R63A | K848A |
| DM29 | R63A | K855A |
| DM30 | R63A | H982A |
| DM31 | R63A | R1060A |
| DM32 | H415A | R780A |
| DM33 | H415A | K848A |
| DM34 | R1114A | R780A |
| DM35 | R1114A | K848A |
| DM36 | K1107A | R780A |
| DM37 | K1107A | K848A |
| DM38 | E1108A | R780A |
| DM39 | E1108A | K848A |

Triple Mutants

| | | | |
|---|---|---|---|
| TM1 | R780A | K810A | K848A |
| TM2 | R780A | K810A | K855A |
| TM3 | R780A | K810A | R976A |
| TM4 | R780A | K848A | K855A |
| TM5 | R780A | K848A | R976A |
| TM6 | R780A | K855A | R976A |
| TM7 | K810A | K848A | K855A |
| TM8 | K810A | K848A | R976A |
| TM9 | K810A | K855A | R976A |
| TM10 | K848A | K855A | R976A |
| TM11 | H982A | K1003A | R1060A |
| TM12 | H982A | K1003A | K1129E |
| TM13 | R780A | K1003A | R1060A |
| TM14 | K810A | K1003A | R1060A |
| TM15 | K848A | K1003A | R1060A |
| TM16 | K855A | K1003A | R1060A |
| TM17 | R63A | H982A | R1060A |
| TM18 | R63A | K1003A | R1060A |
| TM19 | R63A | K848A | R1060A |

Multiple Mutants

| | | | | | | |
|---|---|---|---|---|---|---|
| 6x | R780A | K810A | K848A | K855A | R976A | H982A |
| QM1 | R63A | K855A | R1060A | E610G | | |
| QM2 | R63A | H982A | K1003A | K1129E | | |
| QM3 | R63A | K810A | K1003A | R1060A | | |

In certain embodiments, the modification or mutation comprises a mutation in a RuvCI, RuvCII, RuvCIII or HNH domain. In certain embodiments, the modification or mutation comprises an amino acid substitution at one or more of positions 12, 13, 63, 415, 610, 775, 779, 780, 810, 832, 848, 855, 861, 862, 866, 961, 968, 974, 976, 982, 983, 1000, 1003, 1014, 1047, 1060, 1107, 1108, 1109, 1114, 1129, 1240, 1289, 1296, 1297, 1300, 1311, and 1325; preferably 855; 810, 1003, and 1060; or 848, 1003 with reference to amino acid position numbering of SpCas9. In certain embodiments, the modification or mutation at position 63, 415, 775, 779, 780, 810, 832, 848, 855, 861, 862, 866, 961, 968, 974, 976, 982, 983, 1000, 1003, 1014, 1047, 1060, 1107, 1108, 1109, 1114, 1129, 1240, 1289, 1296, 1297, 1300, 1311, or 1325; preferably 855; 810, 1003, and 1060; 848, 1003, and 1060; or 497, 661, 695, and 926 comprises an alanine substitution. In certain embodiments, the modification comprises K855A; K810A, K1003A, and R1060A; or K848A, K1003A (with reference to SpCas9), and R1060A. in certain embodiments, in certain embodiments, the modification comprises N497A, R661A, Q695A, and Q926A (with reference to SpCas9).

Other mutations may include N692A, M694A, Q695A, H698A or combinations thereof and as otherwise described in Kleinstiver et al. "High-fidelity CRISP-Cas9 nucleases with no detectable genome-wide off-target effects" Nature 529, 590-607 (2016). In addition mutations and/or modifications within the REC3 domain (with reference to SpCas9-HF1 and eSpCas9(1.1)) may also be targeted for increased target specificity and as further described in Chen et al. "Enhanced proofreading governs CRISPR-Cas9 targeting accuracy" bioRxiv Jul. 6, 2017 doi: /dx.doi.org/10.1101/160036. Other mutations may be located in an HNH nuclease domain as further described in Sternberg et al. Nature 2015 doi:10.1038/nature15544.

In some embodiments, a vector encodes a Cas that is mutated to with respect to a corresponding wild type enzyme such that the mutated Cas lacks the ability to cleave one or both strands of a target polynucleotide containing a target sequence. For example, an aspartate-to-alanine substitution (D10A) in the RuvC I catalytic domain of Cas9 from S. pyogenes converts Cas9 from a nuclease that cleaves both strands to a nickase (cleaves a single strand). Other examples of mutations that render Cas9 a nickase include, without limitation, H840A, N854A, and N863A. As a further example, two or more catalytic domains of Cas9 (RuvC I, RuvC II, and RuvC III or the HNH domain) may be mutated to produce a mutated Cas9 substantially lacking all DNA cleavage activity. In some embodiments, a D10A mutation is combined with one or more of H840A, N854A, or N863A mutations to produce a Cas9 enzyme substantially lacking all DNA cleavage activity.

In certain of the above-described Cas9 enzymes, the enzyme is modified by mutation of one or more residues including but not limited to positions D10, E762, H840, N854, N863, or D986 according to SpCas9 protein or any corresponding ortholog. In an aspect the invention provides a herein discussed composition wherein the Cas9 enzyme is an inactivated enzyme which comprises one or more mutations selected from the group consisting D10A, E762A, H840A, N854A, N863A and/or D986A as to SpCas9 or corresponding positions in a Cas9 ortholog. In an aspect the invention provides a herein discussed composition, wherein the CRISPR enzyme comprises H840A, or D10A and H840A, or D10A and N863A, according to SpCas9 protein or a corresponding position in a Cas9 ortholog.

Deactivated/Inactivated Cas9 Protein

Where the Cas9 protein has nuclease activity, the Cas9 protein may be modified to have diminished nuclease activity e.g., nuclease inactivation of at least 70%, at least 80%, at least 90%, at least 95%, at least 97%, or 100% as compared with the wild type enzyme; or to put in another way, a Cas9 enzyme having advantageously about 0% of the nuclease activity of the non-mutated or wild type Cas9 enzyme or CRISPR enzyme, or no more than about 3% or about 5% or about 10% of the nuclease activity of the non-mutated or wild type Cas9 enzyme. This is possible by introducing mutations into the nuclease domains of the Cas9 and orthologs thereof.

In certain embodiments, the CRISPR enzyme is engineered and can comprise one or more mutations that reduce or eliminate a nuclease activity. When the enzyme is not SpCas9, mutations may be made at any or all residues corresponding to positions 10, 762, 840, 854, 863 and/or 986 of SpCas9 (which may be ascertained for instance by standard sequence comparison tools). In particular, any or all of the following mutations are preferred in SpCas9: D10, E762, H840, N854, N863, or D986; as well as conservative substitution for any of the replacement amino acids is also envisaged. The point mutations to be generated to substantially reduce nuclease activity include but are not limited to D10A, E762A, H840A, N854A, N863A and/or D986A. In an aspect the invention provides a herein discussed composition, wherein the CRISPR enzyme comprises two or more mutations wherein two or more of D10, E762, H840, N854, N863, or D986 according to SpCas9 protein or any corresponding or N580 according to SaCas9 protein ortholog are mutated, or the CRISPR enzyme comprises at least one mutation wherein at least H840 is mutated. In an aspect the invention provides a herein discussed composition wherein the CRISPR enzyme comprises two or more mutations comprising D10A, E762A, H840A, N854A, N863A or D986A according to SpCas9 protein or any corresponding ortholog, or N580A according to SaCas9 protein, or at least one mutation comprising H840A, or, optionally wherein the CRISPR enzyme comprises: N580A according to SaCas9 protein or any corresponding ortholog; or D10A according to SpCas9 protein, or any corresponding ortholog, and N580A according to SaCas9 protein. In an aspect the invention provides a herein discussed composition, wherein the CRISPR enzyme comprises H840A, or D10A and H840A, or D10A and N863A, according to SpCas9 protein or any corresponding ortholog.

Mutations can also be made at neighboring residues, e.g., at amino acids near those indicated above that participate in the nuclease activity. In some embodiments, only the RuvC domain is inactivated, and in other embodiments, another putative nuclease domain is inactivated, wherein the effector protein complex functions as a nickase and cleaves only one DNA strand. In a preferred embodiment, the other putative nuclease domain is a HincII-like endonuclease domain. In some embodiments, two Cas9 variants (each a different nickase) are used to increase specificity, two nickase variants are used to cleave DNA at a target (where both nickases cleave a DNA strand, while minimizing or eliminating off-target modifications where only one DNA strand is cleaved and subsequently repaired). In preferred embodiments the Cas9 effector protein cleaves sequences associated with or at a target locus of interest as a homodimer comprising two Cas9 effector protein molecules. In a preferred embodiment the homodimer may comprise two Cas9 effector protein molecules comprising a different mutation in their respective RuvC domains.

The inactivated Cas9 CRISPR enzyme may have associated (e.g., via fusion protein) one or more functional domains, including for example, one or more domains from the group comprising, consisting essentially of, or consisting of methylase activity, demethylase activity, transcription activation activity, transcription repression activity, transcription release factor activity, histone modification activity, RNA cleavage activity, DNA cleavage activity, nucleic acid binding activity, and molecular switches (e.g., light inducible). Preferred domains are Fok1, VP64, P65, HSF1, MyoD1. In the event that Fok1 is provided, it is advantageous that multiple Fok1 functional domains are provided to allow for a functional dimer and that gRNAs are designed to provide proper spacing for functional use (Fok1) as specifically described in Tsai et al. Nature Biotechnology, Vol. 32, Number 6, June 2014). The adaptor protein may utilize known linkers to attach such functional domains. In some cases it is advantageous that additionally at least one NLS is provided. In some instances, it is advantageous to position the NLS at the N terminus. When more than one functional domain is included, the functional domains may be the same or different.

In general, the positioning of the one or more functional domain on the inactivated Cas9 enzyme is one which allows for correct spatial orientation for the functional domain to affect the target with the attributed functional effect. For example, if the functional domain is a transcription activator (e.g., VP64 or p65), the transcription activator is placed in a spatial orientation which allows it to affect the transcription of the target. Likewise, a transcription repressor will be advantageously positioned to affect the transcription of the target, and a nuclease (e.g., Fok1) will be advantageously positioned to cleave or partially cleave the target. This may include positions other than the N-/C-terminus of the CRISPR enzyme.

Chemically-Modified Cas9 Guide

In certain embodiments, the Cas9 guide molecule comprises non-naturally occurring nucleic acids and/or non-naturally occurring nucleotides and/or nucleotide analogs, and/or chemically modifications. Preferably, these non-naturally occurring nucleic acids and non-naturally occurring nucleotides are located outside the guide sequence. Non-naturally occurring nucleic acids can include, for example, mixtures of naturally and non-naturally occurring nucleotides. Non-naturally occurring nucleotides and/or nucleotide analogs may be modified at the ribose, phosphate, and/or base moiety. In an embodiment of the invention, a guide nucleic acid comprises ribonucleotides and non-ribonucleotides. In one such embodiment, a guide comprises one or more ribonucleotides and one or more deoxyribonucleotides. In an embodiment of the invention, the guide comprises one or more non-naturally occurring nucleotide or nucleotide analog such as a nucleotide with phosphorothioate linkage, a locked nucleic acid (LNA) nucleotides comprising a methylene bridge between the 2' and 4' carbons of the ribose ring, or bridged nucleic acids (BNA). Other examples of modified nucleotides include 2'-O-methyl analogs, 2'-deoxy analogs, or 2'-fluoro analogs. Further examples of modified bases include, but are not limited to, 2-aminopurine, 5-bromo-uridine, pseudouridine, inosine, 7-methylguanosine. Examples of guide RNA chemical modifications include, without limitation, incorporation of 2'-O-methyl (M), 2'-O-methyl 3'phosphorothioate (MS), S-constrained ethyl(cEt), or 2'-O-methyl 3'thioPACE (MSP) at one or more terminal nucleotides. Such chemically modified guides can comprise increased stability and increased activity as compared to unmodified guides, though on-target vs. off-target specificity is not predictable. (See, Hendel, 2015, Nat Biotechnol. 33(9):985-9, doi: 10.1038/nbt.3290, published online 29 Jun. 2015 Ragdarm et al., 0215, PNAS, E7110-E7111; Allerson et al., J. Med. Chem. 2005, 48:901-904; Bramsen et al., Front. Genet., 2012, 3:154; Deng et al., PNAS, 2015, 112:11870-11875; Sharma et al., MedChemComm., 2014, 5:1454-1471; Hendel et al., Nat. Biotechnol. (2015) 33(9): 985-989; Li et al., Nature Biomedical Engineering, 2017, 1, 0066 DOI:10.1038/s41551-017-0066). In some embodiments, the 5' and/or 3' end of a guide RNA is modified by a variety of functional moieties including fluorescent dyes, polyethylene glycol, cholesterol, proteins, or detection tags. (See Kelly et al., 2016, J. Biotech. 233: 74-83). In certain embodiments, a guide comprises ribonucleotides in a region that binds to a target DNA and one or more deoxyribonucleotides and/or nucleotide analogs in a region that binds to Cas9. In an embodiment of the invention, deoxyribonucleotides and/or nucleotide analogs are incorporated in engineered guide structures, such as, without limitation, stem-loop regions, and the seed region. In certain embodiments, at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, or 75 nucleotides of a guide is chemically modified. In some embodiments, 3-5 nucleotides at either the 3' or the 5' end of a guide is chemically modified. In some embodiments, only minor modifications are introduced in the seed region, such as 2'-F modifications. In some embodiments, 2'-F modification is introduced at the 3' end of a guide. In certain embodiments, three to five nucleotides at the 5' and/or the 3' end of the guide are chemically modified with 2'-O-methyl (M), 2'-O-methyl 3' phosphorothioate (MS), S-constrained ethyl(cEt), or 2'-O-methyl 3' thioPACE (MSP). Such modification can enhance genome editing efficiency (see Hendel et al., Nat. Biotechnol. (2015) 33(9): 985-989). In certain embodiments, all of the phosphodiester bonds of a guide are substituted with phosphorothioates (PS) for enhancing levels of gene disruption. In certain embodiments, more than five nucleotides at the 5' and/or the 3' end of the guide are chemically modified with 2'-O-Me, 2'-F or S-constrained ethyl(cEt). Such chemically modified guide can mediate enhanced levels of gene disruption (see Ragdarm et al., 0215, PNAS, E7110-E7111). In an embodiment of the invention, a guide is modified to comprise a chemical moiety at its 3' and/or 5' end. Such moieties include, but are not limited to amine, azide, alkyne, thio, dibenzocyclooctyne (DBCO), or Rhodamine. In certain embodiment, the chemical moiety is conjugated to the guide by a linker, such as an alkyl chain. In certain embodiments, the chemical moiety of the modified guide can be used to attach the guide to another molecule, such as DNA, RNA, protein, or nanoparticles. Such chemically modified guide can be used to identify or enrich cells generically edited by a CRISPR system (see Lee et al., eLife, 2017, 6:e25312, DOI:10.7554). In certain embodiments, a guide comprises ribonucleotides in a region that binds to a target DNA and one or more deoxyribonucleotides and/or nucleotide analogs in a region that binds Cas9. In an embodiment of the invention, deoxyribonucleotides and/or nucleotide analogs are incorporated in engineered guide structures, such as, without limitation, stem-loop regions.

In some embodiments, the guide molecule comprises a tracr sequence and a tracr mate sequence that are chemically linked or conjugated via a non-phosphodiester bond. In one aspect, the guide comprises a tracr sequence and a tracr mate sequence that are chemically linked or conjugated via a non-nucleotide loop. In some embodiments, the tracr and tracr mate sequences are joined via a non-phosphodiester covalent linker. Examples of the covalent linker include but are not limited to a chemical moiety selected from the group consisting of carbamates, ethers, esters, amides, imines, amidines, aminotriazines, hydrozone, disulfides, thioethers, thioesters, phosphorothioates, phosphorodithioates, sulfonamides, sulfonates, sulfones, sulfoxides, ureas, thioureas, hydrazide, oxime, triazole, photolabile linkages, C—C bond forming groups such as Diels-Alder cyclo-addition pairs or ring-closing metathesis pairs, and Michael reaction pairs.

In some embodiments, the tracr and tracr mate sequences are first synthesized using the standard phosphoramidite synthetic protocol (Herdewijn, P., ed., Methods in Molecular Biology Col 288, Oligonucleotide Synthesis: Methods and Applications, Humana Press, New Jersey (2012)). In some embodiments, the tracr or tracr mate sequences can be functionalized to contain an appropriate functional group for ligation using the standard protocol known in the art (Hermanson, G. T., Bioconjugate Techniques, Academic Press (2013)). Examples of functional groups include, but are not limited to, hydroxyl, amine, carboxylic acid, carboxylic acid halide, carboxylic acid active ester, aldehyde, carbonyl, chlorocarbonyl, imidazolylcarbonyl, hydrozide, semicarbazide, thio semicarbazide, thiol, maleimide, haloalkyl, sulfonyl, ally, propargyl, diene, alkyne, and azide. Once the tracr and the tracr mate sequences are functionalized, a covalent chemical bond or linkage can be formed between the two oligonucleotides. Examples of chemical bonds include, but are not limited to, those based on carbamates, ethers, esters, amides, imines, amidines, aminotriazines, hydrozone, disulfides, thioethers, thioesters, phosphorothioates, phosphorodithioates, sulfonamides, sulfonates, sulfones, sulfoxides, ureas, thioureas, hydrazide, oxime, triazole, photolabile linkages, C—C bond forming groups such as Diels-Alder cyclo-addition pairs or ring-closing metathesis pairs, and Michael reaction pairs.

In some embodiments, the tracr and tracr mate sequences can be chemically synthesized. In some embodiments, the chemical synthesis uses automated, solid-phase oligonucleotide synthesis machines with 2'-acetoxyethyl orthoester (2'-ACE) (Scaringe et al., J. Am. Chem. Soc. (1998) 120: 11820-11821; Scaringe, Methods Enzymol. (2000) 317: 3-18) or 2'-thionocarbamate (2'-TC) chemistry (Dellinger et al., J. Am. Chem. Soc. (2011) 133: 11540-11546; Hendel et al., Nat. Biotechnol. (2015) 33:985-989).

In some embodiments, the tracr and tracr mate sequences can be covalently linked using various bioconjugation reactions, loops, bridges, and non-nucleotide links via modifications of sugar, internucleotide phosphodiester bonds, purine and pyrimidine residues. Sletten et al., Angew. Chem. Int. Ed. (2009) 48:6974-6998; Manoharan, M. Curr. Opin. Chem. Biol. (2004) 8: 570-9; Behlke et al., Oligonucleotides (2008) 18: 305-19; Watts, et al., Drug.
Discov. Today (2008) 13: 842-55; Shukla, et al., ChemMedChem (2010) 5: 328-49.

In some embodiments, the tracr and tracr mate sequences can be covalently linked using click chemistry. In some embodiments, the tracr and tracr mate sequences can be covalently linked using a triazole linker. In some embodiments, the tracr and tracr mate sequences can be covalently linked using Huisgen 1,3-dipolar cycloaddition reaction involving an alkyne and azide to yield a highly stable triazole linker (He et al., ChemBioChem (2015) 17: 1809-1812; WO 2016/186745). In some embodiments, the tracr and tracr mate sequences are covalently linked by ligating a 5'-hexyne tracrRNA and a 3'-azide crRNA. In some embodiments, either or both of the 5'-hexyne tracrRNA and a 3'-azide crRNA can be protected with 2'-acetoxyethyl orthoester (2'-ACE) group, which can be subsequently removed using Dharmacon protocol (Scaringe et al., J. Am. Chem. Soc. (1998) 120: 11820-11821; Scaringe, Methods Enzymol. (2000) 317: 3-18).

In some embodiments, the tracr and tracr mate sequences can be covalently linked via a linker (e.g., a non-nucleotide loop) that comprises a moiety such as spacers, attachments, bioconjugates, chromophores, reporter groups, dye labeled RNAs, and non-naturally occurring nucleotide analogues. More specifically, suitable spacers for purposes of this invention include, but are not limited to, polyethers (e.g., polyethylene glycols, polyalcohols, polypropylene glycol or mixtures of ethylene and propylene glycols), polyamines group (e.g., spennine, spermidine and polymeric derivatives thereof), polyesters (e.g., poly(ethyl acrylate)), polyphosphodiesters, alkylenes, and combinations thereof. Suitable attachments include any moiety that can be added to the linker to add additional properties to the linker, such as but not limited to, fluorescent labels. Suitable bioconjugates include, but are not limited to, peptides, glycosides, lipids, cholesterol, phospholipids, diacyl glycerols and dialkyl glycerols, fatty acids, hydrocarbons, enzyme substrates, steroids, biotin, digoxigenin, carbohydrates, polysaccharides. Suitable chromophores, reporter groups, and dye-labeled RNAs include, but are not limited to, fluorescent dyes such as fluorescein and rhodamine, chemiluminescent, electrochemiluminescent, and bioluminescent marker compounds. The design of example linkers conjugating two RNA components are also described in WO 2004/015075.

The linker (e.g., a non-nucleotide loop) can be of any length. In some embodiments, the linker has a length equivalent to about 0-16 nucleotides. In some embodiments, the linker has a length equivalent to about 0-8 nucleotides. In some embodiments, the linker has a length equivalent to about 0-4 nucleotides. In some embodiments, the linker has a length equivalent to about 2 nucleotides. Example linker design is also described in WO2011/008730.

In certain embodiments, the Cas9 protein uses of a tracrRNA, the guide sequence, tracr mate, and tracr sequence may reside in a single RNA, i.e. an sgRNA (arranged in a 5' to 3' orientation or alternatively arranged in a 3' to 5' orientation), or the tracr RNA may be a different RNA than the RNA containing the guide and tracr mate sequence. In these embodiments, the tracr hybridizes to the tracr mate sequence and directs the CRISPR-Cas9 complex to the target sequence. A typical Type II Cas9 sgRNA comprises (in 5' to 3' direction):a guide sequence, a poly U tract, a first complimentary stretch (the "repeat"), a loop (tetraloop), a second complimentary stretch (the "anti-repeat" being complimentary to the repeat), a stem, and further stem-loops and stems and a poly A (often poly U in RNA) tail (terminator). In preferred embodiments, certain aspects of guide architecture are retained, certain aspect of guide architecture cam be modified, for example by addition, subtraction, or substitution of features, whereas certain other aspects of guide architecture are maintained. Preferred locations for engineered sgRNA modifications, including but not limited to insertions, deletions, and substitutions include guide termini and regions of the sgRNA that are exposed when complexed with CRISPR protein and/or target, for example the tetraloop and/or loop2.

In some embodiments, the guide molecule forms a stemloop with a separate non-covalently linked sequence, which can be DNA or RNA. In particular embodiments, the sequences forming the guide are first synthesized using the standard phosphoramidite synthetic protocol (Herdewijn, P., ed., Methods in Molecular Biology Col 288, Oligonucleotide Synthesis: Methods and Applications, Humana Press, New Jersey (2012)). In some embodiments, these sequences can be functionalized to contain an appropriate functional group for ligation using the standard protocol known in the art (Hermanson, G. T., Bioconjugate Techniques, Academic Press (2013)). Examples of functional groups include, but are not limited to, hydroxyl, amine, carboxylic acid, carboxylic acid halide, carboxylic acid active ester, aldehyde, carbonyl, chlorocarbonyl, imidazolylcarbonyl, hydrazide, semicarbazide, thio semicarbazide, thiol, maleimide, haloalkyl, sulfonyl ally, propargyl, diene, alkyne, and azide. Once this sequence is functionalized, a covalent chemical bond or linkage can be formed between this sequence and the direct repeat sequence. Examples of chemical bonds include, but are not limited to, those based on carbamates, ethers, esters, amides, imines, amidines, aminotriazines, hydrozone, disulfides, thioethers, thioesters, phosphorothioates, phosphorodithioates, sulfonamides, sulfonates, sulfones, sulfoxides, ureas, thioureas, hydrazide, oxime, triazole, photolabile linkages, C—C bond forming groups such as Diels-Alder cyclo-addition pairs or ring-closing metathesis pairs, and Michael reaction pairs.

In some embodiments, these stem-loop forming sequences can be chemically synthesized. In some embodiments, the chemical synthesis uses automated, solid-phase oligonucleotide synthesis machines with 2'-acetoxyethyl orthoester (2'-ACE) (Scaringe et al., J. Am. Chem. Soc. (1998) 120: 11820-11821; Scaringe, Methods Enzymol. (2000) 317: 3-18) or 2'-thionocarbamate (2'-TC) chemistry (Dellinger et al., J. Am. Chem. Soc. (2011) 133: 11540-11546; Hendel et al., Nat. Biotechnol. (2015) 33:985-989).

In particular embodiments, such as where the CRISPR-Cas protein is a Cas9 protein, the "tracrRNA" sequence or analogous terms includes any polynucleotide sequence that has sufficient complementarity with a crRNA sequence to hybridize. In some embodiments, the degree of complementarity between the tracrRNA sequence and crRNA sequence along the length of the shorter of the two when optimally aligned is about or more than about 25%, 30%, 40%, 50%, 60%, 70%, 80%, 90%, 95%, 97.5%, 99%, or higher. In some embodiments, the tracr sequence is about or more than about 5, 6, 7, 8, 9, 10, 11, 12, 13, 14, 15, 16, 17, 18, 19, 20, 25, 30, 40, 50, or more nucleotides in length. In some embodiments, the tracr sequence and guide sequence are contained within a single transcript, such that hybridization between the two produces a transcript having a secondary structure, such as a hairpin. In an embodiment of the invention, the transcript or transcribed polynucleotide sequence has at least two or more hairpins. In preferred embodiments, the transcript has two, three, four or five hairpins. In a further embodiment of the invention, the transcript has at most five hairpins. In a hairpin structure the portion of the sequence 5' of the final "N" and upstream of the loop may correspond to the tracr mate sequence, and the portion of the sequence 3' of the loop then corresponds to the tracr sequence. In a hairpin structure the portion of the sequence 5' of the final "N" and upstream of the loop may alternatively correspond to the tracr sequence, and the portion of the sequence 3' of the loop corresponds to the tracr mate sequence.

In a particular embodiment the guide molecule comprises a guide sequence linked to a direct repeat sequence, wherein the direct repeat sequence comprises one or more stem-loops or optimized secondary structures. In particular embodiments, the direct repeat has a minimum length of 16 nts and a single stem-loop. In further embodiments the direct repeat has a length longer than 16 nts, preferably more than 17 nts, and has more than one stem-loops or optimized secondary structures. In particular embodiments the guide molecule comprises or consists of the guide sequence linked to all or part of the natural direct repeat sequence. In particular embodiments, certain aspects of the guide architecture can be modified, for example by addition, subtraction, or substitution of features, whereas certain other aspects of guide architecture are maintained. Preferred locations for engineered guide molecule modifications, including but not limited to insertions, deletions, and substitutions include guide termini and regions of the guide molecule that are exposed when complexed with CRISPR protein and/or target, for example the tetraloop and/or loop2.

The repeat:anti repeat duplex will be apparent from the secondary structure of the sgRNA. It may be typically a first complimentary stretch after (in 5' to 3' direction) the poly U tract and before the tetraloop; and a second complimentary stretch after (in 5' to 3' direction) the tetraloop and before the poly A tract. The first complimentary stretch (the "repeat") is complimentary to the second complimentary stretch (the "anti-repeat"). As such, they Watson-Crick base pair to form a duplex of dsRNA when folded back on one another. As such, the anti-repeat sequence is the complimentary sequence of the repeat and in terms to A-U or C-G base pairing, but also in terms of the fact that the anti-repeat is in the reverse orientation due to the tetraloop.

In an embodiment of the invention, modification of guide architecture comprises replacing bases in stemloop 2. For example, in some embodiments, "actt" ("acuu" in RNA) and "aagt" ("aagu" in RNA) bases in stemloop2 are replaced with "cgcc" and "gcgg". In some embodiments, "actt" and "aagt" bases in stemloop2 are replaced with complimentary GC-rich regions of 4 nucleotides. In some embodiments, the complimentary GC-rich regions of 4 nucleotides are "cgcc" and "gcgg" (both in 5' to 3' direction). In some embodiments, the complimentary GC-rich regions of 4 nucleotides are "gcgg" and "cgcc" (both in 5' to 3' direction). Other combination of C and G in the complimentary GC-rich regions of 4 nucleotides will be apparent including CCCC and GGGG.

In one aspect, the stemloop 2, e.g., "ACTTgtttAAGT" (SEQ ID NO: 32) can be replaced by any "XXXXgtttYYYY" (SEQ ID NO: 33), e.g., where XXXX and YYYY represent any complementary sets of nucleotides that together will base pair to each other to create a stem.

In one aspect, the stem comprises at least about 4 bp comprising complementary X and Y sequences, although stems of more, e.g., 5, 6, 7, 8, 9, 10, 11 or 12 or fewer, e.g., 3, 2, base pairs are also contemplated. Thus, for example X2-12 and Y2-12 (wherein X and Y represent any complementary set of nucleotides) may be contemplated. In one aspect, the stem made of the X and Y nucleotides, together with the "gttt," will form a complete hairpin in the overall secondary structure; and, this may be advantageous and the amount of base pairs can be any amount that forms a complete hairpin. In one aspect, any complementary X:Y basepairing sequence (e.g., as to length) is tolerated, so long as the secondary structure of the entire sgRNA is preserved. In one aspect, the stem can be a form of X:Y basepairing that does not disrupt the secondary structure of the whole sgRNA in that it has a DR:tracr duplex, and 3 stemloops. In one aspect, the "gttt" tetraloop that connects ACTT and AAGT (or any alternative stem made of X:Y basepairs) can be any sequence of the same length (e.g., 4 basepair) or longer that does not interrupt the overall secondary structure of the sgRNA. In one aspect, the stemloop can be something that further lengthens stemloop2, e.g. can be MS2 aptamer. In one aspect, the stemloop3 "GGCACCGagtCGGTGC" (SEQ ID NO: 34) can likewise take on a "XXXXXXX-agtYYYYYYY" form, e.g., wherein X7 and Y7 represent any complementary sets of nucleotides that together will base pair to each other to create a stem. In one aspect, the stem comprises about 7 bp comprising complementary X and Y sequences, although stems of more or fewer basepairs are also contemplated. In one aspect, the stem made of the X and Y nucleotides, together with the "agt", will form a complete hairpin in the overall secondary structure. In one aspect, any complementary X:Y basepairing sequence is tolerated, so long as the secondary structure of the entire sgRNA is preserved. In one aspect, the stem can be a form of X:Y basepairing that doesn't disrupt the secondary structure of the whole sgRNA in that it has a DR:tracr duplex, and 3 stemloops. In one aspect, the "agt" sequence of the stemloop 3 can be extended or be replaced by an aptamer, e.g., a MS2 aptamer or sequence that otherwise generally preserves the architecture of stemloop3. In one aspect for alternative Stemloops 2 and/or 3, each X and Y pair can refer to any basepair. In one aspect, non-Watson Crick basepairing is contemplated, where such pairing otherwise generally preserves the architecture of the stemloop at that position.

In one aspect, the DR:tracrRNA duplex can be replaced with the form: gYYYYag(N)NNNNxxxxNNNN(AAN) uuRRRRu (SEQ ID NO: 35) (using standard IUPAC nomenclature for nucleotides), wherein (N) and (AAN) represent part of the bulge in the duplex, and "xxxx" represents a linker sequence. NNNN on the direct repeat can be anything so long as it basepairs with the corresponding NNNN portion of the tracrRNA. In one aspect, the DR:tracrRNA duplex can be connected by a linker of any length (xxxx . . . ), any base composition, as long as it doesn't alter the overall structure.

In one aspect, the sgRNA structural requirement is to have a duplex and 3 stemloops. In most aspects, the actual sequence requirement for many of the particular base requirements are lax, in that the architecture of the DR:tracrRNA duplex should be preserved, but the sequence that creates the architecture, i.e., the stems, loops, bulges, etc., may be altered.

Orthologs of Cpf1

The CRISPR-Cas9 system is described in detail in international patent application no. PCT/US2017/047459, titled "NOVEL CRISPR ENZYMES AND SYSTEMS" and filed Aug. 17, 2017, which is incorporated by reference in its entirety. The terms "orthologue" (also referred to as "ortholog" herein) and "homologue" (also referred to as "homolog" herein) are well known in the art. By means of further guidance, a "homologue" of a protein as used herein is a protein of the same species which performs the same or a similar function as the protein it is a homologue of. Homologous proteins may but need not be structurally related, or are only partially structurally related. An "orthologue" of a protein as used herein is a protein of a different species which performs the same or a similar function as the protein it is an orthologue of Orthologous proteins may but need not be structurally related, or are only partially structurally related. Homologs and orthologs may be identified by homology modelling (see, e.g., Greer, Science vol. 228 (1985) 1055, and Blundell et al. Eur J Biochem vol 172 (1988), 513) or "structural BLAST" (Dey F, Cliff Zhang Q, Petrey D, Honig B. Toward a "structural BLAST": using structural relationships to infer function. Protein Sci. 2013 April; 22(4):359-66. doi: 10.1002/pro.2225.). See also Shmakov et al. (2015) for application in the field of CRISPR-Cas loci. Homologous proteins may but need not be structurally related, or are only partially structurally related.

The Cpf1 gene is found in several diverse bacterial genomes, typically in the same locus with cas1, cas2, and cas4 genes and a CRISPR cassette (for example, FNFX1_1431-FNFX1_1428 of *Francisella* cf. *novicida* Fx1). Thus, the layout of this putative novel CRISPR-Cas system appears to be similar to that of type II-B. Furthermore, similar to Cas9, the Cpf1 protein contains a readily identifiable C-terminal region that is homologous to the transposon ORF-B and includes an active RuvC-like nuclease, an arginine-rich region, and a Zn finger (absent in Cas9). However, unlike Cas9, Cpf1 is also present in several genomes without a CRISPR-Cas context and its relatively high similarity with ORF-B suggests that it might be a transposon component. It was suggested that if this was a genuine CRISPR-Cas system and Cpf1 is a functional analog of Cas9 it would be a novel CRISPR-Cas type, namely type V (See Annotation and Classification of CRISPR-Cas Systems. Makarova K S, Koonin E V. Methods Mol Biol. 2015; 1311:47-75). However, as described herein, Cpf1 is denoted to be in subtype V-A to distinguish it from C2c1p which does not have an identical domain structure and is hence denoted to be in subtype V-B.

In particular embodiments, the effector protein is a Cpf1 effector protein from an organism from a genus comprising *Streptococcus, Campylobacter, Nitratifractor, Staphylococcus, Parvibaculum, Roseburia, Neisseria, Gluconacetobacter, Azospirillum, Sphaerochaeta, Lactobacillus, Eubacterium, Corynebacterium, Carnobacterium, Rhodobacter, Listeria, Paludibacter, Clostridium, Lachnospiraceae, Clostridiaridium, Leptotrichia, Francisella, Legionella, Alicyclobacillus, Methanomethylophilus, Porphyromonas, Prevotella, Bacteroidetes, Helcococcus, Leptospira, Desulfovibrio, Desulfonatronum, Opitutaceae, Tuberibacillus, Bacillus, Brevibacillus, Methylobacterium* or *Acidaminococcus*.

In further particular embodiments, the Cpf1 effector protein is from an organism selected from *S. mutans, S. agalactiae, S. equisimilis, S. sanguinis, S. pneumonia; C. jejuni, C. coli; N. salsuginis, N. tergarcus; S. auricularis, S. carnosus; N. meningitides, N. gonorrhoeae; L. monocytogenes, L. ivanovii; C. botulinum, C. difficile, C. tetani, C. sordellii*.

The effector protein may comprise a chimeric effector protein comprising a first fragment from a first effector protein (e.g., a Cpf1) ortholog and a second fragment from a second effector (e.g., a Cpf1) protein ortholog, and wherein the first and second effector protein orthologs are different. At least one of the first and second effector protein (e.g., a Cpf1) orthologs may comprise an effector protein (e.g., a Cpf1) from an organism comprising *Streptococcus, Campylobacter, Nitratifractor, Staphylococcus, Parvibaculum, Roseburia, Neisseria, Gluconacetobacter, Azospirillum, Sphaerochaeta, Lactobacillus, Eubacterium, Corynebacterium, Carnobacterium, Rhodobacter, Listeria, Paludibacter, Clostridium, Lachnospiraceae, Clostridiaridium, Leptotrichia, Francisella, Legionella, Alicyclobacillus, Methanomethylophilus, Porphyromonas, Prevotella, Bacteroidetes, Helcococcus, Leptospira, Desulfovibrio, Desulfonatronum, Opitutaceae, Tuberibacillus, Bacillus, Brevibacillus, Methylobacterium* or *Acidaminococcus*; e.g., a chimeric effector protein comprising a first fragment and a second fragment wherein each of the first and second fragments is selected from a Cpf1 of an organism comprising *Streptococcus, Campylobacter, Nitratifractor, Staphylococcus, Parvibaculum, Roseburia, Neisseria, Gluconacetobacter, Azospirillum, Sphaerochaeta, Lactobacillus, Eubacterium, Corynebacterium, Carnobacterium, Rhodobacter, Listeria, Paludibacter, Clostridium, Lachnospiraceae, Clostridiaridium, Leptotrichia, Francisella, Legionella, Alicyclobacillus, Methanomethylophilus, Porphyromonas, Prevotella, Bacteroidetes, Helcococcus, Leptospira, Desulfovibrio, Desulfonatronum, Opitutaceae, Tuberibacillus, Bacillus, Brevibacillus, Methylobacterium* or *Acidaminococcus* wherein the first and second fragments are not from the same bacteria; for instance a chimeric effector protein comprising a first fragment and a second fragment wherein each of the first and second fragments is selected from a Cpf1 of *S. mutans, S. agalactiae, S. equisimilis, S. sanguinis, S. pneumonia; C. jejuni, C. coli; N. salsuginis, N. tergarcus; S. auricularis, S. carnosus; N. meningitides, N. gonorrhoeae; L. monocytogenes, L. ivanovii; C. botulinum, C. difficile, C. tetani, C. sordellii; Francisella tularensis* 1, *Prevotella albensis*, Lachnospiraceae bacterium MC2017 1, *Butyrivibrio proteoclasticus*, Peregrinibacteria bacterium GW2011_GWA2_33_10, Parcubacteria bacterium GW2011_GWC2_44_17, *Smithella* sp. SCADC, *Acidami-* nococcus sp. BV3L6, Lachnospiraceae bacterium MA2020, Candidatus Methanoplasma termitum, Eubacterium eligens, Moraxella bovoculi 237, Leptospira inadai, Lachnospiraceae bacterium ND2006, Porphyromonas crevioricanis 3, Prevotella disiens and Porphyromonas macacae, wherein the first and second fragments are not from the same bacteria.

In a more preferred embodiment, the Cpf1p is derived from a bacterial species selected from Francisella tularensis 1, Prevotella albensis, Lachnospiraceae bacterium MC2017 1, Butyrivibrio proteoclasticus, Peregrinibacteria bacterium GW2011_GWA2_33_10, Parcubacteria bacterium GW2011_GWC2_44_17, Smithella sp. SCADC, Acidaminococcus sp. BV3L6, Lachnospiraceae bacterium MA2020, Candidatus Methanoplasma termitum, Eubacterium eligens, Moraxella bovoculi 237, Leptospira inadai, Lachnospiraceae bacterium ND2006, Porphyromonas crevioricanis 3, Prevotella disiens and Porphyromonas macacae. In certain embodiments, the Cpf1p is derived from a bacterial species selected from Acidaminococcus sp. BV3L6, Lachnospiraceae bacterium MA2020. In certain embodiments, the effector protein is derived from a subspecies of Francisella tularensis 1, including but not limited to Francisella tularensis subsp. Novicida.

In particular embodiments, the homologue or orthologue of Cpf1 as referred to herein has a sequence homology or identity of at least 80%, more preferably at least 85%, even more preferably at least 90%, such as for instance at least 95% with Cpf1. In further embodiments, the homologue or orthologue of Cpf1 as referred to herein has a sequence identity of at least 80%, more preferably at least 85%, even more preferably at least 90%, such as for instance at least 95% with the wild type Cpf1. Where the Cpf1 has one or more mutations (mutated), the homologue or orthologue of said Cpf1 as referred to herein has a sequence identity of at least 80%, more preferably at least 85%, even more preferably at least 90%, such as for instance at least 95% with the mutated Cpf1.

In an embodiment, the Cpf1 protein may be an ortholog of an organism of a genus which includes, but is not limited to Acidaminococcus sp, Lachnospiraceae bacterium or Moraxella bovoculi; in particular embodiments, the type V Cas protein may be an ortholog of an organism of a species which includes, but is not limited to Acidaminococcus sp. BV3L6; Lachnospiraceae bacterium ND2006 (LbCpf1) or Moraxella bovoculi 237. In particular embodiments, the homologue or orthologue of Cpf1 as referred to herein has a sequence homology or identity of at least 80%, more preferably at least 85%, even more preferably at least 90%, such as for instance at least 95% with one or more of the Cpf1 sequences disclosed herein. In further embodiments, the homologue or orthologue of Cpf as referred to herein has a sequence identity of at least 80%, more preferably at least 85%, even more preferably at least 90%, such as for instance at least 95% with the wild type FnCpf1, AsCpf1 or LbCpf1.

In particular embodiments, the Cpf1 protein of the invention has a sequence homology or identity of at least 60%, more particularly at least 70, such as at least 80%, more preferably at least 85%, even more preferably at least 90%, such as for instance at least 95% with FnCpf1, AsCpf1 or LbCpf1. In further embodiments, the Cpf1 protein as referred to herein has a sequence identity of at least 60%, such as at least 70%, more particularly at least 80%, more preferably at least 85%, even more preferably at least 90%, such as for instance at least 95% with the wild type AsCpf1 or LbCpf1. In particular embodiments, the Cpf1 protein of the present invention has less than 60% sequence identity with FnCpf1. The skilled person will understand that this includes truncated forms of the Cpf1 protein whereby the sequence identity is determined over the length of the truncated form.

In an embodiment of the invention, the effector protein comprises at least one HEPN domain, including but not limited to HEPN domains described herein, HEPN domains known in the art, and domains recognized to be HEPN domains by comparison to consensus sequences and motifs.

Determination of Cpf1 PAM

Determination of PAM can be ensured as follows. This experiment closely parallels similar work in E. coli for the heterologous expression of StCas9 (Sapranauskas, R. et al. Nucleic Acids Res 39, 9275-9282 (2011)). Applicants introduce a plasmid containing both a PAM and a resistance gene into the heterologous E. coli, and then plate on the corresponding antibiotic. If there is DNA cleavage of the plasmid, Applicants observe no viable colonies.

In further detail, the assay is as follows for a DNA target. Two E. coli strains are used in this assay. One carries a plasmid that encodes the endogenous effector protein locus from the bacterial strain. The other strain carries an empty plasmid (e.g. pACYC184, control strain). All possible 7 or 8 bp PAM sequences are presented on an antibiotic resistance plasmid (pUC19 with ampicillin resistance gene). The PAM is located next to the sequence of protospacer 1 (the DNA target to the first spacer in the endogenous effector protein locus). Two PAM libraries were cloned. One has a 8 random bp 5' of the protospacer (e.g. total of 65536 different PAM sequences=complexity). The other library has 7 random bp 3' of the protospacer (e.g. total complexity is 16384 different PAMs). Both libraries were cloned to have in average 500 plasmids per possible PAM. Test strain and control strain were transformed with 5'PAM and 3'PAM library in separate transformations and transformed cells were plated separately on ampicillin plates. Recognition and subsequent cutting/interference with the plasmid renders a cell vulnerable to ampicillin and prevents growth. Approximately 12 h after transformation, all colonies formed by the test and control strains where harvested and plasmid DNA was isolated. Plasmid DNA was used as template for PCR amplification and subsequent deep sequencing. Representation of all PAMs in the untransfomed libraries showed the expected representation of PAMs in transformed cells. Representation of all PAMs found in control strains showed the actual representation. Representation of all PAMs in test strain showed which PAMs are not recognized by the enzyme and comparison to the control strain allows extracting the sequence of the depleted PAM.

For the Cpf1 orthologues identified to date, the following PAMs have been identified: the Acidaminococcus sp. BV3L6 Cpf1 (AsCpf1) and Lachnospiraceae bacterium ND2006 Cpf1 (LbCpf1) can cleave target sites preceded by a TTTV PAM, FnCpf1p, can cleave sites preceded by TTN, where N is A/C/G or T.

Codon-Optimized Cpf1 Sequences

Where the effector protein is to be administered as a nucleic acid, the application envisages the use of codon-optimized Cpf1 sequences. An example of a codon-optimized sequence, is in this instance a sequence optimized for expression in a eukaryote, e.g., humans (i.e. being optimized for expression in humans), or for another eukaryote, animal or mammal as herein discussed; see, e.g., SaCas9 human codon-optimized sequence in WO 2014/093622 (PCT/US2013/074667) as an example of a codon-optimized sequence (from knowledge in the art and this disclosure, codon optimizing coding nucleic acid molecule(s), especially as to effector protein (e.g., Cpf1) is within the ambit of the skilled artisan). Whilst this is preferred, it will be appreciated that other examples are possible and codon optimization for a host species other than human, or for codon optimization for specific organs is known. In some embodiments, an enzyme coding sequence encoding a DNA/RNA-targeting Cas protein is codon-optimized for expression in particular cells, such as eukaryotic cells. The eukaryotic cells may be those of or derived from a particular organism, such as a plant or a mammal, including but not limited to human, or non-human eukaryote or animal or mammal as herein discussed, e.g., mouse, rat, rabbit, dog, livestock, or non-human mammal or primate. In some embodiments, processes for modifying the germ line genetic identity of human beings and/or processes for modifying the genetic identity of animals which are likely to cause them suffering without any substantial medical benefit to man or animal, and also animals resulting from such processes, may be excluded. In general, codon optimization refers to a process of modifying a nucleic acid sequence for enhanced expression in the host cells of interest by replacing at least one codon (e.g., about or more than about 1, 2, 3, 4, 5, 10, 15, 20, 25, 50, or more codons) of the native sequence with codons that are more frequently or most frequently used in the genes of that host cell while maintaining the native amino acid sequence. Various species exhibit particular bias for certain codons of a particular amino acid. Codon bias (differences in codon usage between organisms) often correlates with the efficiency of translation of messenger RNA (mRNA), which is in turn believed to be dependent on, among other things, the properties of the codons being translated and the availability of particular transfer RNA (tRNA) molecules. The predominance of selected tRNAs in a cell is generally a reflection of the codons used most frequently in peptide synthesis. Accordingly, genes can be tailored for optimal gene expression in a given organism based on codon optimization. Codon usage tables are readily available, for example, at the "Codon Usage Database" available at www.kazusa.or.jp/codon/ and these tables can be adapted in a number of ways. See Nakamura, Y., et al. "Codon usage tabulated from the international DNA sequence databases: status for the year 2000" Nucl. Acids Res. 28:292 (2000). Computer algorithms for codon optimizing a particular sequence for expression in a particular host cell are also available, such as Gene Forge (Aptagen; Jacobus, PA), are also available. In some embodiments, one or more codons (e.g., 1, 2, 3, 4, 5, 10, 15, 20, 25, 50, or more, or all codons) in a sequence encoding a DNA/RNA-targeting Cas protein corresponds to the most frequently used codon for a particular amino acid. As to codon usage in yeast, reference is made to the online Yeast Genome database available at /www.yeastgenome.org/community/codon_usage.shtml, or Codon selection in yeast, Bennetzen and Hall, J Biol Chem. 1982 Mar. 25; 257(6):3026-31. As to codon usage in plants including algae, reference is made to Codon usage in higher plants, green algae, and cyanobacteria, Campbell and Gowri, Plant Physiol. 1990 January; 92(1): 1-11; as well as Codon usage in plant genes, Murray et al, Nucleic Acids Res. 1989 Jan. 25; 17(2):477-98; or Selection on the codon bias of chloroplast and cyanelle genes in different plant and algal lineages, Morton B R, J Mol Evol. 1998 April; 46(4):449-59.

Modified Cpf1 Enzymes

In particular embodiments, it is of interest to make us of an engineered Cpf1 protein as defined herein, such as Cpf1, wherein the protein complexes with a nucleic acid molecule comprising RNA to form a CRISPR complex, wherein when in the CRISPR complex, the nucleic acid molecule targets one or more target polynucleotide loci, the protein comprises at least one modification compared to unmodified Cpf1 protein, and wherein the CRISPR complex comprising the modified protein has altered activity as compared to the complex comprising the unmodified Cpf1 protein. It is to be understood that when referring herein to CRISPR "protein", the Cpf1 protein preferably is a modified CRISPR enzyme (e.g. having increased or decreased (or no) enzymatic activity, such as without limitation including Cpf1. The term "CRISPR protein" may be used interchangeably with "CRISPR enzyme", irrespective of whether the CRISPR protein has altered, such as increased or decreased (or no) enzymatic activity, compared to the wild type CRISPR protein.

Computational analysis of the primary structure of Cpf1 nucleases reveals three distinct regions. First a C-terminal RuvC like domain, which is the only functional characterized domain. Second a N-terminal alpha-helical region and third a mixed alpha and beta region, located between the RuvC like domain and the alpha-helical region.

Several small stretches of unstructured regions are predicted within the Cpf1 primary structure. Unstructured regions, which are exposed to the solvent and not conserved within different Cpf1 orthologs, are preferred sides for splits and insertions of small protein sequences. In addition, these sides can be used to generate chimeric proteins between Cpf1 orthologs.

In certain example embodiments, a modified Cpf1 protein comprises at least one modification that alters editing preference as compared to wild type. In certain example embodiments, the editing preference is for a specific insert or deletion within the target region. In certain example embodiments, the at least one modification increases formation of one or more specific indels. In certain example embodiments, the at least one modification is in a C-terminal RuvC like domain, the N-terminal alpha-helical region, the mixed alpha and beta region, or a combination thereof. In certain example embodiments the altered editing preference is indel formation. In certain example embodiments, the at least one modification increases formation of one or more specific insertions.

In certain example embodiments, the at least one modification increases formation of one or more specific insertions. In certain example embodiments, the at least one modification results in an insertion of an A adjacent to an A, T, G, or C in the target region. In another example embodiment, the at least one modification results in insertion of a T adjacent to an A, T, G, or C in the target region. In another example embodiment, the at least one modification results in insertion of a G adjacent to an A, T, G, or C in the target region. In another example embodiment, the at least one modification results in insertion of a C adjacent to an A, T, C, or G in the target region. The insertion may be 5' or 3' to the adjacent nucleotide. In one example embodiment, the one or more modification direct insertion of a T adjacent to an existing T. In certain example embodiments, the existing T corresponds to the 4th position in the binding region of a guide sequence. In certain example embodiments, the one or more modifications result in an enzyme which ensures more precise one-base insertions or deletions, such as those described above. More particularly, the one or more modifications may reduce the formations of other types of indels by the enzyme. The ability to generate one-base insertions or deletions can be of interest in a number of applications, such as correction of genetic mutants in diseases caused by small deletions, more particularly where HDR is not possible. For example correction of the F508del mutation in CFTR via delivery of three sRNA directing insertion of three T's, which is the most common genotype of cystic fibrosis, or correction of Alia Jafar's single nucleotide deletion in CDKL5 in the brain. As the editing method only requires NHEJ, the editing would be possible in post-mitotic cells such as the brain. The ability to generate one-base pair insertions/deletions may also be useful in genome-wide CRISPR-Cas negative selection screens. In certain example embodiments, the at least one modification, is a mutation. In certain other example embodiment, the one or more modification may be combined with one or more additional modifications or mutations described below including modifications to increase binding specificity and/or decrease off-target effects.

In certain example embodiments, the engineered CRISPR-cas effector comprising at least one modification that alters editing preference as compared to wild type may further comprise one or more additional modifications that alters the binding property as to the nucleic acid molecule comprising RNA or the target polypeptide loci, altering binding kinetics as to the nucleic acid molecule or target molecule or target polynucleotide or alters binding specificity as to the nucleic acid molecule. Example of such modifications are summarized in the following paragraph. Based on the above information, mutants can be generated which lead to inactivation of the enzyme or which modify the double strand nuclease to nickase activity. In alternative embodiments, this information is used to develop enzymes with reduced off-target effects (described elsewhere herein).

In certain of the above-described Cpf1 enzymes, the enzyme is modified by mutation of one or more residues including but not limited to positions D917, E1006, E1028, D1227, D1255A, N1257, according to FnCpf1 protein or any corresponding ortholog. In an aspect the invention provides a herein discussed composition wherein the Cpf1 enzyme is an inactivated enzyme which comprises one or more mutations selected from the group consisting of D917A, E1006A, E1028A, D1227A, D1255A, N1257A, D917A, E1006A, E1028A, D1227A, D1255A and N1257A according to FnCpf1 protein or corresponding positions in a Cpf1 ortholog. In an aspect the invention provides a herein discussed composition, wherein the CRISPR enzyme comprises D917, or E1006 and D917, or D917 and D1255, according to FnCpf1 protein or a corresponding position in a Cpf1 ortholog.

In certain of the above-described Cpf1 enzymes, the enzyme is modified by mutation of one or more residues (in the RuvC domain) including but not limited to positions R909, R912, R930, R947, K949, R951, R955, K965, K968, K1000, K1002, R1003, K1009, K1017, K1022, K1029, K1035, K1054, K1072, K1086, R1094, K1095, K1109, K1118, K1142, K1150, K1158, K1159, R1220, R1226, R1242, and/or R1252 with reference to amino acid position numbering of AsCpf1 (*Acidaminococcus* sp. BV3L6).

In certain of the above-described non-naturally-occurring CRISPR enzymes, the enzyme is modified by mutation of one or more residues (in the RAD50) domain including but not limited positions K324, K335, K337, R331, K369, K370, R386, R392, R393, K400, K404, K406, K408, K414, K429, K436, K438, K459, K460, K464, R670, K675, R681, K686, K689, R699, K705, R725, K729, K739, K748, and/or K752 with reference to amino acid position numbering of AsCpf1 (*Acidaminococcus* sp. BV3L6).

In certain of the Cpf1 enzymes, the enzyme is modified by mutation of one or more residues including but not limited positions R912, T923, R947, K949, R951, R955, K965, K968, K1000, R1003, K1009, K1017, K1022, K1029, K1072, K1086, F1103, R1226, and/or R1252 with reference to amino acid position numbering of AsCpf1 (*Acidaminococcus* sp. BV3L6).

In certain embodiments, the Cpf1 enzyme is modified by mutation of one or more residues including but not limited positions R833, R836, K847, K879, K881, R883, R887, K897, K900, K932, R935, K940, K948, K953, K960, K984, K1003, K1017, R1033, R1138, R1165, and/or R1252 with reference to amino acid position numbering of LbCpf1 (Lachnospiraceae bacterium ND2006).

In certain embodiments, the Cpf1 enzyme is modified by mutation of one or more residues including but not limited positions K15, R18, K26, Q34, R43, K48, K51, R56, R84, K85, K87, N93, R103, N104, T118, K123, K134, R176, K177, R192, K200, K226, K273, K275, T291, R301, K307, K369, S404, V409, K414, K436, K438, K468, D482, K516, R518, K524, K530, K532, K548, K559, K570, R574, K592, D596, K603, K607, K613, C647, R681, K686, H720, K739, K748, K757, T766, K780, R790, P791, K796, K809, K815, T816, K860, R862, R863, K868, K897, R909, R912, T923, R947, K949, R951, R955, K965, K968, K1000, R1003, K1009, K1017, K1022, K1029, A1053, K1072, K1086, F1103, S1209, R1226, R1252, K1273, K1282, and/or K1288 with reference to amino acid position numbering of AsCpf1 (*Acidaminococcus* sp. BV3L6).

In certain embodiments, the enzyme is modified by mutation of one or more residues including but not limited positions K15, R18, K26, R34, R43, K48, K51, K56, K87, K88, D90, K96, K106, K107, K120, Q125, K143, R186, K187, R202, K210, K235, K296, K298, K314, K320, K326, K397, K444, K449, E454, A483, E491, K527, K541, K581, R583, K589, K595, K597, K613, K624, K635, K639, K656, K660, K667, K671, K677, K719, K725, K730, K763, K782, K791, R800, K809, K823, K833, K834, K839, K852, K858, K859, K869, K871, R872, K877, K905, R918, R921, K932, I960, K962, R964, R968, K978, K981, K1013, R1016, K1021, K1029, K1034, K1041, K1065, K1084, and/or K1098 with reference to amino acid position numbering of FnCpf1 (*Francisella novicida* U112).

In certain embodiments, the enzyme is modified by mutation of one or more residues including but not limited positions K15, R18, K26, R34, R43, K48, K51, R56, K83, K84, R86, K92, R102, K103, K116, K121, R158, E159, R174, R182, K206, K251, K253, K269, K271, K278, P342, K380, R385, K390, K415, K421, K457, K471, A506, R508, K514, K520, K522, K538, Y548, K560, K564, K580, K584, K591, K595, K601, K634, K640, R645, K679, K689, K707, T716, K725, R737, R747, K748, K753, K768, K774, K775, K785, K787, R788, Q793, K821, R833, R836, K847, K879, K881, R883, R887, K897, K900, K932, R935, K940, K948, K953, K960, K984, K1003, K1017, R1033, K1121, R1138, R1165, K1190, K1199, and/or K1208 with reference to amino acid position numbering of LbCpf1 (Lachnospiraceae bacterium ND2006).

In certain embodiments, the enzyme is modified by mutation of one or more residues including but not limited positions K14, R17, K25, K33, M42, Q47, K50, D55, K85, N86, K88, K94, R104, K105, K118, K123, K131, R174, K175, R190, R198, I221, K267, Q269, K285, K291, K297, K357, K403, K409, K414, K448, K460, K501, K515, K550, R552, K558, K564, K566, K582, K593, K604, K608, K623, K627, K633, K637, E643, K780, Y787, K792, K830, Q846, K858, K867, K876, K890, R900, K901, M906, K921, K927, K928, K937, K939, R940, K945, Q975, R987, R990, K1001, R1034, I1036, R1038, R1042, K1052, K1055, K1087, R1090, K1095, N1103, K1108, K1115, K1139, K1158, R1172, K1188, K1276, R1293, A1319, K1340, K1349, and/or K1356 with reference to amino acid position numbering of MbCpf1 (*Moraxella bovoculi* 237).

Recently a method was described for the generation of Cas9 orthologs with enhanced specificity (Slaymaker et al. 2015). This strategy can be used to enhance the specificity of Cpf1 orthologs. The following modifications are presently considered to provide enhanced Cpf1 specificity.

TABLE B1

Conserved Lysine and Arginine residues within RuvC.

| AsCpf1 | LbCpf1 |
|---|---|
| R912 | R833 |
| T923 | R836 |
| R947 | K847 |
| K949 | K879 |
| R951 | K881 |
| R955 | R883 |
| K965 | R887 |
| K968 | K897 |
| K1000 | K900 |
| R1003 | K932 |
| K1009 | R935 |
| K1017 | K940 |
| K1022 | K948 |
| K1029 | K953 |
| K1072 | K960 |
| K1086 | K984 |
| F1103 | K1003 |
| R1226 | K1017 |
| R1252 | R1033 |
|  | R1138 |
|  | R1165 |

Additional candidates are positive charged residues that are conserved between different orthologs (Table B2).

TABLE B2

Conserved Lysine and Arginine residues

| Residue | AsCpf1 | FnCpf1 | LbCpf1 | MbCpf1 |
|---|---|---|---|---|
| Lys | K15 | K15 | K15 | K14 |
| Arg | R18 | R18 | R18 | R17 |
| Lys/Arg | K26 | K26 | K26 | R25 |
| Lys/Arg | Q34 | R34 | K34 | K33 |
| Arg | R43 | R43 | R43 | M42 |
| Lys | K48 | K48 | K48 | Q47 |
| Lys | K51 | K51 | K51 | K50 |
| Lys/Arg | R56 | K56 | R56 | D55 |
| Lys/Arg | R84 | K87 | K83 | K85 |
| Lys/Arg | K85 | K88 | K84 | N86 |
| Lys/Arg | K87 | D90 | R86 | K88 |
| Arg | N93 | K96 | K92 | K94 |
| Lys/Arg | R103 | K106 | R102 | R104 |
| Lys | N104 | K107 | K103 | K105 |
| Lys | T118 | K120 | K116 | K118 |
| Lys/Arg | K123 | Q125 | K121 | K123 |
| Lys | K134 | K143 | - | K131 |
| Arg | R176 | R186 | R158 | R174 |
| Lys | K177 | K187 | E159 | K175 |
| Arg | R192 | R202 | R174 | R190 |
| Lys/Arg | K200 | K210 | R182 | R198 |
| Lys | K226 | K235 | K206 | 1221 |
| Lys | K273 | K296 | K251 | K267 |
| Lys | K275 | K298 | K253 | Q269 |
| Lys | T291 | K314 | K269 | K285 |
| Lys/Arg | R301 | K320 | K271 | K291 |
| Lys | K307 | K326 | K278 | K297 |
| Lys | K369 | K397 | P342 | K357 |
| Lys | S404 | K444 | K380 | K403 |
| Lys/Arg | V409 | K449 | R385 | K409 |
| Lys | K414 | E454 | K390 | K414 |
| Lys | K436 | A483 | K415 | K448 |

TABLE B2-continued

Conserved Lysine and Arginine residues

| Residue | AsCpf1 | FnCpf1 | LbCpf1 | MbCpf1 |
|---|---|---|---|---|
| Lys | K438 | E491 | K421 | K460 |
| Lys | K468 | K527 | K457 | K501 |
| Lys | D482 | K541 | K471 | K515 |
| Lys | K516 | K581 | A506 | K550 |
| Arg | R518 | R583 | R508 | R552 |
| Lys | K524 | K589 | K514 | K558 |
| Lys | K530 | K595 | K520 | K564 |
| Lys | K532 | K597 | K522 | K566 |
| Lys | K548 | K613 | K538 | K582 |
| Lys | K559 | K624 | Y548 | K593 |
| Lys | K570 | K635 | K560 | K604 |
| Lys/Arg | R574 | K639 | K564 | K608 |
| Lys | K592 | K656 | K580 | K623 |
| Lys | D596 | K660 | K584 | K627 |
| Lys | K603 | K667 | K591 | K633 |
| Lys | K607 | K671 | K595 | K637 |
| Lys | K613 | K677 | K601 | E643 |
| Lys | C647 | K719 | K634 | K780 |
| Lys/Arg | R681 | K725 | K640 | Y787 |
| Lys/Arg | K686 | K730 | R645 | K792 |
| Lys | H720 | K763 | K679 | K830 |
| Lys | K739 | K782 | K689 | Q846 |
| Lys | K748 | K791 | K707 | K858 |
| Lys/Arg | K757 | R800 | T716 | K867 |
| Lys/Arg | T766 | K809 | K725 | K876 |
| Lys/Arg | K780 | K823 | R737 | K890 |
| Arg | R790 | R833 | R747 | R900 |
| Lys/Arg | P791 | K834 | R748 | K901 |
| Lys | K796 | K839 | K753 | M906 |
| Lys | K809 | K852 | K768 | K921 |
| Lys | K815 | K858 | K774 | K927 |
| Lys | T816 | K859 | K775 | K928 |
| Lys | K860 | K869 | K785 | K937 |
| Lys/Arg | R862 | K871 | K787 | K939 |
| Arg | R863 | R872 | R788 | R940 |
| Lys | K868 | K877 | Q793 | K945 |
| Lys | K897 | K905 | K821 | Q975 |
| Arg | R909 | R918 | R833 | R987 |
| Arg | R912 | R921 | R836 | R990 |
| Lys | T923 | K932 | K847 | K1001 |
| Lys/Arg | R947 | 1960 | K879 | R1034 |
| Lys | K949 | K962 | K881 | 11036 |
| Arg | R951 | R964 | R883 | R1038 |
| Arg | R955 | R968 | R887 | R1042 |
| Lys | K965 | K978 | K897 | K1052 |
| Lys | K968 | K981 | K900 | K1055 |
| Lys | K1000 | K1013 | K932 | K1087 |
| Arg | R1003 | R1016 | R935 | R1090 |
| Lys | K1009 | K1021 | K940 | K1095 |
| Lys | K1017 | K1029 | K948 | N1103 |
| Lys | K1022 | K1034 | K953 | K1108 |
| Lys | K1029 | K1041 | K960 | K1115 |
| Lys | A1053 | K1065 | K984 | K1139 |
| Lys | K1072 | K1084 | K1003 | K1158 |
| Lys/Arg | K1086 | K1098 | K1017 | R1172 |
| Lys/Arg | F1103 | K1114 | R1033 | K1188 |
| Lys | S1209 | K1201 | K1121 | K1276 |
| Arg | R1226 | R1218 | R1138 | R1293 |
| Arg | R1252 | R1244 | R1165 | A1319 |
| Lys | K1273 | K1265 | K1190 | K1340 |
| Lys | K1282 | K1274 | K1199 | K1349 |
| Lys | K1288 | K1281 | K1208 | K1356 |

Table B2 provides the positions of conserved Lysine and Arginine residues in an alignment of Cpf1 nuclease from *Francisella novicida* U112 (FnCpf1), *Acidaminococcus* sp. BV3L6 (AsCpf1), Lachnospiraceae bacterium ND2006 (LbCpf1) and *Moraxella bovoculi* 237 (MbCpf1). These can be used to generate Cpf1 mutants with enhanced specificity.

With a similar strategy used to improve Cas9 specificity, specificity of Cpf1 can be improved by mutating residues that stabilize the non-targeted DNA strand. This may be accomplished without a crystal structure by using linear structure alignments to predict 1) which domain of Cpf1 binds to which strand of DNA and 2) which residues within these domains contact DNA.

However, this approach may be limited due to poor conservation of Cpf1 with known proteins. Thus it may be desirable to probe the function of all likely DNA interacting amino acids (lysine, histidine and arginine).

Positively charged residues in the RuvC domain are more conserved throughout Cpf1s than those in the Rad50 domain indicating that RuvC residues are less evolutionarily flexible. This suggests that rigid control of nucleic acid binding is needed in this domain (relative to the Rad50 domain). Therefore, it is possible this domain cuts the targeted DNA strand because of the requirement for RNA:DNA duplex stabilization (precedent in Cas9). Furthermore, more arginines are present in the RuvC domain (5% of RuvC residues 904 to 1307 vs 3.8% in the proposed Rad50 domains) suggesting again that RuvC targets the DNA strand complexed with the guide RNA. Arginines are more involved in binding nucleic acid major and minor grooves (Rohs et al. Nature (2009): Vol 461: 1248-1254). Major/minor grooves would only be present in a duplex (such as DNA:RNA targeting duplex), further suggesting that RuvC cuts the "targeted strand".

From these specific observations about AsCpf1 we can identify similar residues in Cpf1 from other species by sequence alignments. Example includes alignment of AsCpf1 and FnCpf1, identifying Rad50 binding domains and the Arginines and Lysines within.

Crystal structures of two similar domains as those found in Cpf1 (RuvC holiday junction resolvase and Rad50 DNA repair protein) are available. Based on these structures, it can be deduced what the relevant domains look like in Cpf1, and infer which regions and residues may contact DNA. In each structure residues are highlighted that contact DNA. In the alignments the regions of AsCpf1 that correspond to these DNA binding regions can be annotated. The list of residues in Table B4 are those found in the two binding domains.

TABLE B4 list of probabl DNA interacting residues

| RuvC domain probable DNA interacting residues: | Rad50 domain probable DNA interacting residues: |
|---|---|
| AsCpf1 | AsCpf1 |
| R909 | K324 |
| R912 | K335 |
| R930 | K337 |
| R947 | R331 |
| K949 | K369 |
| R951 | K370 |
| R955 | R386 |
| K965 | R392 |
| K968 | R393 |
| K1000 | K400 |
| K1002 | K404 |
| R1003 | K406 |
| K1009 | K408 |
| K1017 | K414 |
| K1022 | K429 |
| K1029 | K436 |
| K1035 | K438 |
| K1054 | K459 |
| K1072 | K460 |
| K1086 | K464 |
| R1094 | R670 |
| K1095 | K675 |
| K1109 | R681 |
| K1118 | K686 |

TABLE B4-continued list of probabl DNA interacting residues

| RuvC domain probable DNA interacting residues: | Rad50 domain probable DNA interacting residues: |
|---|---|
| K1142 | K689 |
| K1150 | R699 |
| K1158 | K705 |
| K1159 | R725 |
| R1220 | K729 |
| R1226 | K739 |
| R1242 | K748 |
| R1252 | K752 |
|  | R670 |

Deactivated/Inactivated Cpf1 Protein

Where the Cpf1 protein has nuclease activity, the Cpf1 protein may be modified to have diminished nuclease activity e.g., nuclease inactivation of at least 70%, at least 80%, at least 90%, at least 95%, at least 97%, or 100% as compared with the wild type enzyme; or to put in another way, a Cpf1 enzyme having advantageously about 0% of the nuclease activity of the non-mutated or wild type Cpf1 enzyme or CRISPR enzyme, or no more than about 3% or about 5% or about 10% of the nuclease activity of the non-mutated or wild type Cpf1 enzyme, e.g. of the non-mutated or wild type Francisella novicida U112 (FnCpf1), Acidaminococcus sp. BV3L6 (AsCpf1), Lachnospiraceae bacterium ND2006 (LbCpf1) or Moraxella bovoculi 237 (MbCpf1 Cpf1 enzyme or CRISPR enzyme. This is possible by introducing mutations into the nuclease domains of the Cpf1 and orthologs thereof.

In certain embodiments, the CRISPR enzyme is engineered and can comprise one or more mutations that reduce or eliminate a nuclease activity. The amino acid positions in the FnCpf1p RuvC domain include but are not limited to D917A, E1006A, E1028A, D1227A, D1255A, N1257A, D917A, E1006A, E1028A, D1227A, D1255A and N1257A. Applicants have also identified a putative second nuclease domain which is most similar to PD-(D/E)XK nuclease superfamily and HincII endonuclease like. The point mutations to be generated in this putative nuclease domain to substantially reduce nuclease activity include but are not limited to N580A, N584A, T587A, W609A, D610A, K613A, E614A, D616A, K624A, D625A, K627A and Y629A. In a preferred embodiment, the mutation in the FnCpf1p RuvC domain is D917A or E1006A, wherein the D917A or E1006A mutation completely inactivates the DNA cleavage activity of the FnCpf1 effector protein. In another embodiment, the mutation in the FnCpf1p RuvC domain is D1255A, wherein the mutated FnCpf1 effector protein has significantly reduced nucleolytic activity.

More particularly, the inactivated Cpf1 enzymes include enzymes mutated in amino acid positions As908, As993, As1263 of AsCpf1 or corresponding positions in Cpf1 orthologs. Additionally, the inactivated Cpf1 enzymes include enzymes mutated in amino acid position Lb832, 925, 947 or 1180 of LbCpf1 or corresponding positions in Cpf1 orthologs. More particularly, the inactivated Cpf1 enzymes include enzymes comprising one or more of mutations AsD908A, AsE993A, AsD1263A of AsCpf1 or corresponding mutations in Cpf1 orthologs. Additionally, the inactivated Cpf1 enzymes include enzymes comprising one or more of mutations LbD832A, E925A, D947A or D1180A of LbCpf1 or corresponding mutations in Cpf1 orthologs.

Mutations can also be made at neighboring residues, e.g., at amino acids near those indicated above that participate in the nuclease activity. In some embodiments, only the RuvC domain is inactivated, and in other embodiments, another putative nuclease domain is inactivated, wherein the effector protein complex functions as a nickase and cleaves only one DNA strand. In a preferred embodiment, the other putative nuclease domain is a HincII-like endonuclease domain. In some embodiments, two FnCpf1, AsCpf1 or LbCpf1 variants (each a different nickase) are used to increase specificity, two nickase variants are used to cleave DNA at a target (where both nickases cleave a DNA strand, while minimizing or eliminating off-target modifications where only one DNA strand is cleaved and subsequently repaired). In preferred embodiments the Cpf1 effector protein cleaves sequences associated with or at a target locus of interest as a homodimer comprising two Cpf1 effector protein molecules. In a preferred embodiment the homodimer may comprise two Cpf1 effector protein molecules comprising a different mutation in their respective RuvC domains.

The inactivated Cpf1 CRISPR enzyme may have associated (e.g., via fusion protein) one or more functional domains, including for example, one or more domains from the group comprising, consisting essentially of, or consisting of methylase activity, demethylase activity, transcription activation activity, transcription repression activity, transcription release factor activity, histone modification activity, RNA cleavage activity, DNA cleavage activity, nucleic acid binding activity, and molecular switches (e.g., light inducible). Preferred domains are Fok1, VP64, P65, HSF1, MyoD1. In the event that Fok1 is provided, it is advantageous that multiple Fok1 functional domains are provided to allow for a functional dimer and that gRNAs are designed to provide proper spacing for functional use (Fok1) as specifically described in Tsai et al. Nature Biotechnology, Vol. 32, Number 6, June 2014). The adaptor protein may utilize known linkers to attach such functional domains. In some cases it is advantageous that additionally at least one NLS is provided. In some instances, it is advantageous to position the NLS at the N terminus. When more than one functional domain is included, the functional domains may be the same or different.

In general, the positioning of the one or more functional domain on the inactivated Cpf1 enzyme is one which allows for correct spatial orientation for the functional domain to affect the target with the attributed functional effect. For example, if the functional domain is a transcription activator (e.g., VP64 or p65), the transcription activator is placed in a spatial orientation which allows it to affect the transcription of the target. Likewise, a transcription repressor will be advantageously positioned to affect the transcription of the target, and a nuclease (e.g., Fok1) will be advantageously positioned to cleave or partially cleave the target. This may include positions other than the N-/C-terminus of the CRISPR enzyme.

Chemically-Modified Cas9 Guide

In certain embodiments, the Cpf1 guide molecule comprises non-naturally occurring nucleic acids and/or non-naturally occurring nucleotides and/or nucleotide analogs, and/or chemically modifications. Preferably, these non-naturally occurring nucleic acids and non-naturally occurring nucleotides are located outside the guide sequence. Non-naturally occurring nucleic acids can include, for example, mixtures of naturally and non-naturally occurring nucleotides. Non-naturally occurring nucleotides and/or nucleotide analogs may be modified at the ribose, phosphate, and/or base moiety. In an embodiment of the invention, a guide nucleic acid comprises ribonucleotides and non-ribonucleotides. In one such embodiment, a guide comprises one or more ribonucleotides and one or more deoxyribonucleotides. In an embodiment of the invention, the guide comprises one or more non-naturally occurring nucleotide or nucleotide analog such as a nucleotide with phosphorothioate linkage, a locked nucleic acid (LNA) nucleotides comprising a methylene bridge between the 2' and 4' carbons of the ribose ring, or bridged nucleic acids (BNA). Other examples of modified nucleotides include 2'-O-methyl analogs, 2'-deoxy analogs, or 2'-fluoro analogs. Further examples of modified bases include, but are not limited to, 2-aminopurine, 5-bromo-uridine, pseudouridine, inosine, 7-methylguanosine. Examples of guide RNA chemical modifications include, without limitation, incorporation of 2'-O-methyl (M), 2'-O-methyl 3'phosphorothioate (MS), S-constrained ethyl(cEt), or 2'-O-methyl 3'thioPACE (MSP) at one or more terminal nucleotides. Such chemically modified guides can comprise increased stability and increased activity as compared to unmodified guides, though on-target vs. off-target specificity is not predictable. (See, Hendel, 2015, Nat Biotechnol. 33(9):985-9, doi: 10.1038/nbt.3290, published online 29 Jun. 2015 Ragdarm et al., 0215, PNAS, E7110-E7111; Allerson et al., J. Med. Chem. 2005, 48:901-904; Bramsen et al., Front. Genet., 2012, 3:154; Deng et al., PNAS, 2015, 112:11870-11875; Sharma et al., MedChemComm., 2014, 5:1454-1471; Hendel et al., Nat. Biotechnol. (2015) 33(9): 985-989; Li et al., Nature Biomedical Engineering, 2017, 1, 0066 DOI:10.1038/s41551-017-0066). In some embodiments, the 5' and/or 3' end of a guide RNA is modified by a variety of functional moieties including fluorescent dyes, polyethylene glycol, cholesterol, proteins, or detection tags. (See Kelly et al., 2016, J. Biotech. 233: 74-83). In certain embodiments, a guide comprises ribonucleotides in a region that binds to a target DNA and one or more deoxyribonucleotides and/or nucleotide analogs in a region that binds to Cpf1. In an embodiment of the invention, deoxyribonucleotides and/or nucleotide analogs are incorporated in engineered guide structures, such as, without limitation, stem-loop regions, and the seed region. For Cpf1 guide, in certain embodiments, the modification is not in the 5'-handle of the stem-loop regions. Chemical modification in the 5'-handle of the stem-loop region of a guide may abolish its function (see Li, et al., Nature Biomedical Engineering, 2017, 1:0066). In certain embodiments, at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, or 75 nucleotides of a guide is chemically modified. In some embodiments, 3-5 nucleotides at either the 3' or the 5' end of a guide is chemically modified. In some embodiments, only minor modifications are introduced in the seed region, such as 2'-F modifications. In some embodiments, 2'-F modification is introduced at the 3' end of a guide. In certain embodiments, three to five nucleotides at the 5' and/or the 3' end of the guide are chemically modified with 2'-O-methyl (M), 2'-O-methyl 3' phosphorothioate (MS), S-constrained ethyl(cEt), or 2'-O-methyl 3' thioPACE (MSP). Such modification can enhance genome editing efficiency (see Hendel et al., Nat. Biotechnol. (2015) 33(9): 985-989). In certain embodiments, all of the phosphodiester bonds of a guide are substituted with phosphorothioates (PS) for enhancing levels of gene disruption. In certain embodiments, more than five nucleotides at the 5' and/or the 3' end of the guide are chemically modified with 2'-O-Me, 2'-F or S-constrained ethyl(cEt). Such chemically modified guide can mediate enhanced levels of gene disruption (see Ragdarm et al., 0215, PNAS, E7110-E7111). In an embodiment of the invention, a guide is modified to comprise a chemical moiety at its 3' and/or 5' end. Such moieties include, but are not limited to amine, azide, alkyne, thio, dibenzocyclooctyne (DBCO), or Rhodamine. In certain embodiment, the chemical moiety is conjugated to the guide by a linker, such as an alkyl chain. In certain embodiments, the chemical moiety of the modified guide can be used to attach the guide to another molecule, such as DNA, RNA, protein, or nanoparticles. Such chemically modified guide can be used to identify or enrich cells generically edited by a CRISPR system (see Lee et al., eLife, 2017, 6:e25312, DOI.10.7554). In certain embodiments, a guide comprises ribonucleotides in a region that binds to a target DNA and one or more deoxyribonucleotides and/or nucleotide analogs in a region that binds Cpf1. In an embodiment of the invention, deoxyribonucleotides and/or nucleotide analogs are incorporated in engineered guide structures, such as, without limitation, stem-loop regions.

In some embodiments, the guide comprises a modified Cpf1 crRNA, having a 5'-handle and a guide segment further comprising a seed region and a 3'-terminus. In some embodiments, the modified guide can be used with a Cpf1 of any one of *Acidaminococcus* sp. BV3L6 Cpf1 (AsCpf1); *Francisella tularensis* subsp. *Novicida* U112 Cpf1 (FnCpf1); *L. bacterium* MC2017 Cpf1 (Lb3Cpf1); *Butyrivibrio proteoclasticus* Cpf1 (BpCpf1); Parcubacteria bacterium GWC2011_GWC2_44_17 Cpf1 (PbCpf1); Peregrinibacteria bacterium GW2011_GWA_33_10 Cpf1 (PeCpf1); *Leptospira inadai* Cpf1 (LiCpf1); *Smithella* sp. SC_K08D17 Cpf1 (SsCpf1); L. bacterium MA2020 Cpf1 (Lb2Cpf1); *Porphyromonas crevioricanis* Cpf1 (PcCpf1); *Porphyromonas macacae* Cpf1 (PmCpf1); *Candidatus Methanoplasma termitum* Cpf1 (CMtCpf1); *Eubacterium* eligens Cpf1 (EeCpf1); *Moraxella bovoculi* 237 Cpf1 (MbCpf1); *Prevotella disiens* Cpf1 (PdCpf1); or L. bacterium ND2006 Cpf1 (LbCpf1).

In some embodiments, the modification to the guide is a chemical modification, an insertion, a deletion or a split. In some embodiments, the chemical modification includes, but is not limited to, incorporation of 2'-O-methyl (M) analogs, 2'-deoxy analogs, 2-thiouridine analogs, N6-methyladenosine analogs, 2'-fluoro analogs, 2-aminopurine, 5-bromouridine, pseudouridine ($\Psi$), N1-methylpseudouridine (me1$\Psi$), 5-methoxyuridine (5moU), inosine, 7-methylguanosine, 2'-O-methyl 3'phosphorothioate (MS), S-constrained ethyl(cEt), phosphorothioate (PS), or 2'-O-methyl 3'thioPACE (MSP). In some embodiments, the guide comprises one or more of phosphorothioate modifications. In certain embodiments, at least 1, 2, 3, 4, 5, 6, 7, 8, 9, 10, 11, 12, 13, 14, 15, 16, 17, 18, 19, 20, or 25 nucleotides of the guide are chemically modified. In certain embodiments, one or more nucleotides in the seed region are chemically modified. In certain embodiments, one or more nucleotides in the 3'-terminus are chemically modified. In certain embodiments, none of the nucleotides in the 5'-handle is chemically modified. In some embodiments, the chemical modification in the seed region is a minor modification, such as incorporation of a 2'-fluoro analog. In a specific embodiment, one nucleotide of the seed region is replaced with a 2'-fluoro analog. In some embodiments, 5 to 10 nucleotides in the 3'-terminus are chemically modified. Such chemical modifications at the 3'-terminus of the Cpf1 CrRNA may improve Cpf1 activity (see Li, et al., Nature Biomedical Engineering, 2017, 1:0066). In a specific embodiment, 1, 2, 3, 4, 5, 6, 7, 8, 9 or 10 nucleotides in the 3'-terminus are replaced with 2'-fluoro analogues. In a specific embodiment, 1, 2, 3, 4, 5, 6, 7, 8, 9 or 10 nucleotides in the 3'-terminus are replaced with 2'-O-methyl (M) analogs.

In some embodiments, the loop of the 5'-handle of the guide is modified. In some embodiments, the loop of the 5'-handle of the guide is modified to have a deletion, an insertion, a split, or chemical modifications. In certain embodiments, the modified loop comprises 3, 4, or 5 nucleotides. In certain embodiments, the loop comprises the sequence of UCUU, UUUU, UAUU, or UGUU.

In some embodiments, the guide molecule forms a stem-loop with a separate non-covalently linked sequence, which can be DNA or RNA. In particular embodiments, the sequences forming the guide are first synthesized using the standard phosphoramidite synthetic protocol (Herdewijn, P., ed., Methods in Molecular Biology Col 288, Oligonucleotide Synthesis: Methods and Applications, Humana Press, New Jersey (2012)). In some embodiments, these sequences can be functionalized to contain an appropriate functional group for ligation using the standard protocol known in the art (Hermanson, G. T., Bioconjugate Techniques, Academic Press (2013)). Examples of functional groups include, but are not limited to, hydroxyl, amine, carboxylic acid, carboxylic acid halide, carboxylic acid active ester, aldehyde, carbonyl, chlorocarbonyl, imidazolylcarbonyl, hydrazide, semicarbazide, thio semicarbazide, thiol, maleimide, haloalkyl, sulfonyl, ally, propargyl, diene, alkyne, and azide. Once this sequence is functionalized, a covalent chemical bond or linkage can be formed between this sequence and the direct repeat sequence. Examples of chemical bonds include, but are not limited to, those based on carbamates, ethers, esters, amides, imines, amidines, aminotriazines, hydrozone, disulfides, thioethers, thioesters, phosphorothioates, phosphorodithioates, sulfonamides, sulfonates, sulfones, sulfoxides, ureas, thioureas, hydrazide, oxime, triazole, photolabile linkages, C—C bond forming groups such as Diels-Alder cyclo-addition pairs or ring-closing metathesis pairs, and Michael reaction pairs.

In some embodiments, these stem-loop forming sequences can be chemically synthesized. In some embodiments, the chemical synthesis uses automated, solid-phase oligonucleotide synthesis machines with 2'-acetoxyethyl orthoester (2'-ACE) (Scaringe et al., J. Am. Chem. Soc. (1998) 120: 11820-11821; Scaringe, Methods Enzymol. (2000) 317: 3-18) or 2'-thionocarbamate (2'-TC) chemistry (Dellinger et al., J. Am. Chem. Soc. (2011) 133: 11540-11546; Hendel et al., Nat. Biotechnol. (2015) 33:985-989).

In certain embodiments, the guide molecule (capable of guiding Cpf1 to a target locus) comprises (1) a guide sequence capable of hybridizing to a target locus and (2) a tracr mate or direct repeat sequence whereby the direct repeat sequence is located upstream (i.e., 5') from the guide sequence. In a particular embodiment the seed sequence (i.e. the sequence essential critical for recognition and/or hybridization to the sequence at the target locus) of the Cpf1 guide sequence is approximately within the first 10 nucleotides of the guide sequence. In particular embodiments, the Cpf1 is FnCpf1 and the seed sequence is approximately within the first 5 nt on the 5' end of the guide sequence.

In a particular embodiment the guide molecule comprises a guide sequence linked to a direct repeat sequence, wherein the direct repeat sequence comprises one or more stem-loops or optimized secondary structures. In particular embodiments, the direct repeat has a minimum length of 16 nts and a single stem-loop. In further embodiments the direct repeat has a length longer than 16 nts preferably more than 17 nts, and has more than one stem-loops or optimized secondary structures. In particular embodiments the guide molecule comprises or consists of the guide sequence linked to all or part of the natural direct repeat sequence. A typical Type V Cpf1 guide molecule comprises (in 3' to 5' direction): a guide sequence a first complimentary stretch (the "repeat"), a loop (which is typically 4 or 5 nucleotides long), a second complimentary stretch (the "anti-repeat" being complimentary to the repeat), and a poly A (often poly U in RNA) tail (terminator). In certain embodiments, the direct repeat sequence retains its natural architecture and forms a single stem-loop. In particular embodiments, certain aspects of the guide architecture can be modified, for example by addition, subtraction, or substitution of features, whereas certain other aspects of guide architecture are maintained. Preferred locations for engineered guide molecule modifications, including but not limited to insertions, deletions, and substitutions include guide termini and regions of the guide molecule that are exposed when complexed with the Cpf1 protein and/or target, for example the stemloop of the direct repeat sequence.

In particular embodiments, the stem comprises at least about 4 bp comprising complementary X and Y sequences, although stems of more, e.g., 5, 6, 7, 8, 9, 10, 11 or 12 or fewer, e.g., 3, 2, base pairs are also contemplated. Thus, for example X2-10 and Y2-10 (wherein X and Y represent any complementary set of nucleotides) may be contemplated. In one aspect, the stem made of the X and Y nucleotides, together with the loop will form a complete hairpin in the overall secondary structure; and, this may be advantageous and the amount of base pairs can be any amount that forms a complete hairpin. In one aspect, any complementary X:Y basepairing sequence (e.g., as to length) is tolerated, so long as the secondary structure of the entire guide molecule is preserved. In one aspect, the loop that connects the stem made of X:Y basepairs can be any sequence of the same length (e.g., 4 or 5 nucleotides) or longer that does not interrupt the overall secondary structure of the guide molecule. In one aspect, the stemloop can further comprise, e.g. an MS2 aptamer. In one aspect, the stem comprises about 5-7 bp comprising complementary X and Y sequences, although stems of more or fewer basepairs are also contemplated. In one aspect, non-Watson Crick basepairing is contemplated, where such pairing otherwise generally preserves the architecture of the stemloop at that position.

Additional Guide Modifications

With particular reference to the CRISPR/Cas system as described herein, besides the Cas protein, in addition or in the alternative, the gRNA and/or tracr (where applicable) and/or tracr mate (or direct repeat) may be modified. Suitable modifications include, without limitation dead guides, escorted guides, protected guides, or guides provided with aptamers, suitable for ligating to, binding or recruiting functional domains (see e.g. also elsewhere herein the reference to synergistic activator mediators (SAM)). Mention is also made of WO/2016/049258 (FUNCTIONAL SCREENING WITH OPTIMIZED FUNCTIONAL CRISPR-CAS SYSTEMS (SAM)), WO/2016/094867 (PROTECTED GUIDE RNAS (PGRNAS); WO/2016/094872 (DEAD GUIDES FOR CRISPR TRANSCRIPTION FACTORS); WO/2016/094874 (ESCORTED AND FUNCTIONALIZED GUIDES FOR CRISPR-CAS SYSTEMS); all incorporated herein by reference. In certain embodiments, the tracr sequence (where appropriate) and/or tracr mate sequence (direct repeat), may comprise one or more protein-interacting RNA aptamers. The one or more aptamers may be located in the tetraloop and/or stemloop 2 of the tracr sequence. The one or more aptamers may be capable of binding MS2 bacteriophage coat protein. In certain embodiments, the gRNA (or trace or tracr mate) is modified by truncations, and/or incorporation of one or more mismatches vis-à-vis the intended target sequence or sequence to hybridize with.

By means of further guidance, and without limitation, in certain embodiments, the gRNA is a dead gRNA (dgRNA), which are guide sequences which are modified in a manner which allows for formation of the CRISPR complex and successful binding to the target, while at the same time, not allowing for successful nuclease activity (i.e. without nuclease activity/without indel activity). These dead guides or dead guide sequences can be thought of as catalytically inactive or conformationally inactive with regard to nuclease activity. Several structural parameters allow for a proper framework to arrive at such dead guides. Dead guide sequences are shorter than respective guide sequences which result in active Cas-specific indel formation. Dead guides are 5%, 10%, 20%, 30%, 40%, 50%, shorter than respective guides directed to the same Cas protein leading to active Cas-specific indel formation. Guide RNA comprising a dead guide may be modified to further include elements in a manner which allow for activation or repression of gene activity, in particular protein adaptors (e.g. aptamers) as described herein elsewhere allowing for functional placement of gene effectors (e.g. activators or repressors of gene activity). One example is the incorporation of aptamers, as explained herein and in the state of the art. By engineering the gRNA comprising a dead guide to incorporate protein-interacting aptamers (Konermann et al., "Genome-scale transcription activation by an engineered CRISPR-Cas9 complex," doi:10.1038/nature14136, incorporated herein by reference), one may assemble a synthetic transcription activation complex consisting of multiple distinct effector domains. Such may be modeled after natural transcription activation processes. For example, an aptamer, which selectively binds an effector (e.g. an activator or repressor; dimerized MS2 bacteriophage coat proteins as fusion proteins with an activator or repressor), or a protein which itself binds an effector (e.g. activator or repressor) may be appended to a dead gRNA tetraloop and/or a stem-loop 2. In the case of MS2, the fusion protein MS2-VP64 binds to the tetraloop and/or stem-loop 2 and in turn mediates transcriptional up-regulation, for example for Neurog2. Other transcriptional activators are, for example, VP64. P65, HSF1, and MyoD1. By mere example of this concept, replacement of the MS2 stem-loops with PP7-interacting stem-loops may be used to recruit repressive elements.

By means of further guidance, and without limitation, in certain embodiments, the gRNA is an escorted gRNA (egRNA). By "escorted" is meant that the CRISPR-Cas system or complex or guide is delivered to a selected time or place within a cell, so that activity of the CRISPR-Cas system or complex or guide is spatially or temporally controlled. For example, the activity and destination of the CRISPR-Cas system or complex or guide may be controlled by an escort RNA aptamer sequence that has binding affinity for an aptamer ligand, such as a cell surface protein or other localized cellular component. Alternatively, the escort aptamer may for example be responsive to an aptamer effector on or in the cell, such as a transient effector, such as an external energy source that is applied to the cell at a particular time. The escorted Cpf1 CRISPR-Cas systems or complexes have a gRNA with a functional structure designed to improve gRNA structure, architecture, stability, genetic expression, or any combination thereof. Such a structure can include an aptamer. Aptamers are biomolecules that can be designed or selected to bind tightly to other ligands, for example using a technique called systematic evolution of ligands by exponential enrichment (SELEX; Tuerk C, Gold L: "Systematic evolution of ligands by exponential enrichment: RNA ligands to bacteriophage T4 DNA polymerase." Science 1990, 249:505-510). Nucleic acid aptamers can for example be selected from pools of random-sequence oligonucleotides, with high binding affinities and specificities for a wide range of biomedically relevant targets, suggesting a wide range of therapeutic utilities for aptamers (Keefe, Anthony D., Supriya Pai, and Andrew Ellington. "Aptamers as therapeutics." Nature Reviews Drug Discovery 9.7 (2010): 537-550). These characteristics also suggest a wide range of uses for aptamers as drug delivery vehicles (Levy-Nissenbaum, Etgar, et al. "Nanotechnology and aptamers: applications in drug delivery." Trends in biotechnology 26.8 (2008): 442-449; and, Hicke B J, Stephens A W. "Escort aptamers: a delivery service for diagnosis and therapy." J Clin Invest 2000, 106:923-928.). Aptamers may also be constructed that function as molecular switches, responding to a que by changing properties, such as RNA aptamers that bind fluorophores to mimic the activity of green fluorescent protein (Paige, Jeremy S., Karen Y. Wu, and Samie R. Jaffrey. "RNA mimics of green fluorescent protein." Science 333.6042 (2011): 642-646). It has also been suggested that aptamers may be used as components of targeted siRNA therapeutic delivery systems, for example targeting cell surface proteins (Zhou, Jiehua, and John J. Rossi. "Aptamer-targeted cell-specific RNA interference." Silence 1.1 (2010): 4).

By means of further guidance, and without limitation, in certain embodiments, the gRNA is a protected guide. Protected guides are designed to enhance the specificity of a Cas protein given individual guide RNAs through thermodynamic tuning of the binding specificity of the guide RNA to target nucleic acid. This is a general approach of introducing mismatches, elongation or truncation of the guide sequence to increase/decrease the number of complimentary bases vs. mismatched bases shared between a target and its potential off-target loci, in order to give thermodynamic advantage to targeted genomic loci over genomic off-targets. In certain embodiments, the guide sequence is modified by secondary structure to increase the specificity of the CRISPR-Cas system and whereby the secondary structure can protect against exonuclease activity and allow for 3' additions to the guide sequence. In certain embodiments, a "protector RNA" is hybridized to a guide sequence, wherein the "protector RNA" is an RNA strand complementary to the 5' end of the guide RNA (gRNA), to thereby generate a partially double-stranded gRNA. In an embodiment of the invention, protecting the mismatched bases with a perfectly complementary protector sequence decreases the likelihood of target binding to the mismatched basepairs at the 3' end. In certain embodiments, additional sequences comprising an extended length may also be present. Guide RNA (gRNA) extensions matching the genomic target provide gRNA protection and enhance specificity. Extension of the gRNA with matching sequence distal to the end of the spacer seed for individual genomic targets is envisaged to provide enhanced specificity. Matching gRNA extensions that enhance specificity have been observed in cells without truncation. Prediction of gRNA structure accompanying these stable length extensions has shown that stable forms arise from protective states, where the extension forms a closed loop with the gRNA seed due to complimentary sequences in the spacer extension and the spacer seed. These results demonstrate that the protected guide concept also includes sequences matching the genomic target sequence distal of the 20 mer spacer-binding region. Thermodynamic prediction can be used to predict completely matching or partially matching guide extensions that result in protected gRNA states. This extends the concept of protected gRNAs to interaction between X and Z, where X will generally be of length 17-20nt and Z is of length 1-30nt. Thermodynamic prediction can be used to determine the optimal extension state for Z, potentially introducing small numbers of mismatches in Z to promote the formation of protected conformations between X and Z. Throughout the present application, the terms "X" and seed length (SL) are used interchangeably with the term exposed length (EpL) which denotes the number of nucleotides available for target DNA to bind; the terms "Y" and protector length (PL) are used interchangeably to represent the length of the protector; and the terms "Z", "E", "E'" and EL are used interchangeably to correspond to the term extended length (ExL) which represents the number of nucleotides by which the target sequence is extended. An extension sequence which corresponds to the extended length (ExL) may optionally be attached directly to the guide sequence at the 3' end of the protected guide sequence. The extension sequence may be 2 to 12 nucleotides in length. Preferably ExL may be denoted as 0, 2, 4, 6, 8, 10 or 12 nucleotides in length. In a preferred embodiment the ExL is denoted as 0 or 4 nucleotides in length. In a more preferred embodiment the ExL is 4 nucleotides in length. The extension sequence may or may not be complementary to the target sequence. An extension sequence may further optionally be attached directly to the guide sequence at the 5' end of the protected guide sequence as well as to the 3' end of a protecting sequence. As a result, the extension sequence serves as a linking sequence between the protected sequence and the protecting sequence. Without wishing to be bound by theory, such a link may position the protecting sequence near the protected sequence for improved binding of the protecting sequence to the protected sequence. Addition of gRNA mismatches to the distal end of the gRNA can demonstrate enhanced specificity. The introduction of unprotected distal mismatches in Y or extension of the gRNA with distal mismatches (Z) can demonstrate enhanced specificity. This concept as mentioned is tied to X, Y, and Z components used in protected gRNAs. The unprotected mismatch concept may be further generalized to the concepts of X, Y, and Z described for protected guide RNAs.

In certain embodiments, any of the nucleases, including the modified nucleases as described herein, may be used in the methods, compositions, and kits according to the invention. In particular embodiments, nuclease activity of an unmodified nuclease may be compared with nuclease activity of any of the modified nucleases as described herein, e.g. to compare for instance off-target or on-target effects. Alternatively, nuclease activity (or a modified activity as described herein) of different modified nucleases may be compared, e.g. to compare for instance off-target or on-target effects.

Aspects of the invention also relate to synthesizing different unique 20 bp spacer or guide RNA sequences with which different genomic locations can be targeted. It is this easy programmability that makes CRISPR an attractive targeted screening system. Array oligonucleotide synthesis technologies allow for parallel synthesis of thousands of targeting sequences that can be cloned en masse into a vector, e.g. a viral vector such as an AAV vector or a lentiviral vector, and produced as virus in a pool. This allows for targeting of the RNA-guided DNA binding protein by modification of a 20 nt RNA guide sequence and genetic perturbation on the level of the genome itself.

In one aspect, the invention provides a library comprising a plurality of unique CRISPR-Cas system guide sequences that are capable of targeting a plurality of target sequences in one or more given genomic regions. In particular embodiments, the library is a tilled library spanning a given intergenic region. Aspects of the invention, including libraries, methods and kits also expressly include the library and guide sequences as described in "Genome-scale CRISPR-Cas9 knockout screening in human cells", Shalem O, Sanjana N E, Hartenian E, Shi X, Scott D A, Mikkelsen T S, Heckl D, Ebert B L, Root D E, Doench J G, Zhang F., Science. 2014 January 3; 343(6166):84-7, including all and any disclosure thereof and all and any disclosure from the corresponding Supplementary materials available from the publisher, including Supplementary materials made available online.

In one aspect, the invention provides a CRISPR library for use in a method of perturbing in parallel different sequences in the genome. In one aspect, the library or libraries consist of specific gRNA sequences for perturbing specified genomic regions.

In one aspect, the library is packaged in a viral vector. In one aspect, the library is packaged in a lentivirus vector. In one aspect, the packaged library is transduced at an MOI (multiplicity of infection) of about 10, of about 5, of about 3, of about 1 or of about less than 1, about less than 0.75, about less than 0.5, about less than 0.4, about less than 0.3, about less than 0.2 or about less than 0.1. In a further embodiment the cell is transduced with a multiplicity of infection (MOI) of 0.3-0.75, preferably, the MOI has a value close to 0.4, more preferably the MOI is 0.3 or 0.4. In one aspect, the MOI is about 0.3 or 0.4, thereby creating a panel of cells comprising about 1 CRISPR-Cas system guide RNAs per cell, after appropriate selection for successfully transfected/transduced cells, thereby providing a panel of cells comprising a cellular library with parallel knock outs of the different target sequences.

Also provided herein are compositions for use in carrying out the methods of the invention. More particularly, non-naturally occurring or engineered compositions are provided which comprise one or more of the elements required to ensure genomic perturbation. In particular embodiments, the compositions comprise one or more of the (modified) DNA binding protein, and/or a guide RNA. In particular embodiments, the composition comprises a vector. In further particular embodiments, the vector comprises a polynucleotide encoding a gRNA targeting a non-coding genomic sequence. In particular embodiments, the vector comprises two or more guide RNAs. Said two or more guide RNAs may target a different target (so as to ensure multiplex targeting) or the same target, in which case two different guide RNAs are used which target different sequences within the same target sequence or targeted non-coding genomic sequences. In particular embodiments, where deletion of a target sequence is envisaged, the guide RNAs used have target sequences which are less than 500 nts apart, more particularly less than 200 nts apart, such as less than 100 nts apart. Where provided in a vector the different guide RNAs may be under common control of the same promotor, or may be each be under control of the same or different promoters, generating separate expression cassettes for each guide RNA. In particular embodiments, the vector comprises two expression cassettes for RNAs in tandem, wherein the first guide RNA under the control of a first promoter and the second guide RNA is under the control of a second promoter. In particular embodiments, the first and second promoter are selected from a U6 and an 7SK promoter. In particular embodiments both the first and the second promoter are the U6 promoter. In particular embodiments, each of the expression cassettes comprises a transcription termination signal, such as a Polymerase II terminator. In particular embodiments, the first and second expression cassette are separated by a buffer sequence. Such a sequence is typically between 10-500 nucleotides, such as between 100-200 nucleotides.

Additionally or alternatively, compositions provided herein comprise a DNA binding protein or a sequence encoding said DNA binding protein. In particular embodiments the DNA binding protein is a CRISPR effector protein, more particularly a modified CRISPR effector protein as described herein. In particular embodiments, the composition comprises a catalytically inactive Cas protein or a fusion protein thereof with a transcription repression domain, such as dCas9-KRAB.

The CRISPR/Cas system is used in the invention to specifically target a multitude of sequences within a continuous genomic region of interest. The targeting typically comprises introducing into each cell of a population of cells a vector system of one or more vectors comprising an engineered, non-naturally occurring CRISPR-Cas system comprising: at least one Cas protein, and one or more guide RNAs of the guide RNA library described herein. In these methods, the Cas protein and the one or more guide RNAs may be on the same or on different vectors of the system and are integrated into each cell, whereby each guide sequence targets a sequence within the continuous genomic region in each cell in the population of cells. The Cas protein is operably linked to a regulatory element to ensure expression in said cell, more particularly a promoter suitable for expression in the cell of the cell population. In particular embodiments, the promoter is an inducible promoter, such as a doxycycline inducible promoter. When transcribed within the cells of the cell population, the guide RNA comprising the guide sequence directs sequence-specific binding of a CRISPR-Cas system to a target sequence in the continuous genomic region. Binding of the CRISPR-Cas system induces cleavage of the continuous genomic region when a catalytically active the Cas protein is used, or induces transcriptional repression when a catalytically inactive Cas protein or a fusion protein thereof with a transcription repression domain such as dCas-KRAB is used.

The application provides methods of screening for genomic sites associated with a change in a phenotype. The change in phenotype can be detectable at one or more levels including at DNA, RNA, protein and/or functional level of the cell. In particular embodiments, the change is detectable as a change in gene expression in the cell. Indeed, where the genomic region of interest is selected as a region which is e.g. 5' or 3' of a gene of interest, the phenotypic change can be determined based on expression of the gene of interest.

The methods of screening for genomic sites associated with a change in phenotype comprise introducing the library of guide RNAs targeting the genomic region of interest as envisaged herein into a population of cells. Typically the cells are adapted to contain a Cas protein. However, in particular embodiments, the Cas protein may also be introduced simultaneously with the guide RNA. In some embodiments, the introduction of the library into the cell population in the methods envisage herein is such that each cell of the population contains no more than one guide RNA. Hereafter, the cells are typically sorted based on the observed phenotype and the genomic sites associate with a change in phenotype are identified based on whether or not they give rise to a change in phenotype in the cells. Typically, the methods involve sorting the cells into at least two groups based on the phenotype and determining relative representation of the guide RNAs present in each group, and genomic sites associated with the change in phenotype are determined by the representation of guide RNAs present in each group. In particular embodiments, the different groups will correspond to different expression levels of the gene of interest, such as a high expression group and a low expression group.

In particular embodiments, the methods may further comprise confirming the alteration of the genomic site in a cell by sequencing the region comprising the genomic site or by whole genome sequencing. The methods provided herein may additionally comprise further validating the genomic site by specifically altering the genomic site and checking whether the phenotypic change is confirmed. Specific alteration of a genomic site can be achieved by different methods such as by CRISPR/Cas system mediated DNA targeting.

The application further relates to screening methods for identifying regulatory elements in the non-coding genome, more particularly using the libraries described herein, whereby the genomic region of interest is a region of the non-coding genome. Accordingly, the methods envisage targeting Cas9 to intergenic regions surrounding single genes. In particular embodiments the method will comprise generating a library which flanks 100 kb upstream and downstream of target gene with sgRNAs. Optionally Off-target scoring can be used to minimize sequences with many off-targets.

Regulatory elements may be further defined using chromosome conformation capture (3C) technology, which provides a tool to study the structural organization of a genomic region. 3C technology involves quantitative PCR-analysis of cross-linking frequencies between two given DNA restriction fragments, which gives a measure of their proximity in the nuclear space. Originally developed to analyze the conformation of chromosomes in yeast (Dekker et al., 2002), this technology has been adapted to investigate the relationship between gene expression and chromatin folding at intricate mammalian gene clusters (see, for example, Tolhuis et al., 2002; Palstra et al., 2003; and Drissen et al., 2004). Briefly, 3C technology involves in vivo formaldehyde cross-linking of cells and nuclear digestion of chromatin with a restriction enzyme, followed by ligation of DNA fragments that were cross-linked into one complex. Ligation products are then quantified by PCR. The PCR amplification step requires the knowledge of the sequence information for each of the DNA fragments that are to be amplified. Thus, 3C technology provides a measure of interaction frequencies between selected DNA fragments.

3C technology has been developed to identify interacting elements between selected parts of the genome and both techniques require the design of primers for all restriction fragments analyzed. Recently, new strategies have been developed that allow screening the entire genome in an unbiased manner for DNA segments that physically interact with a DNA fragment of choice. They are based on 3C technology and are collectively referred to as '4C technology'. 4C technology allows the screening of the entire genome in an unbiased manner for DNA segments that physically interact with a DNA fragment of choice. 4C technology depends on the selective ligation of cross-linked DNA fragments to a restriction fragment of choice (the 'bait'). In 4C technology, all the DNA fragments captured by the bait in the population of cells are simultaneously amplified via inverse PCR, using two bait-specific primers that amplify from circularized ligation products.

Essentially two strategies can be pursued to obtain these DNA circles. One strategy relies on the formation of circles during the standard 3C ligation step, i.e. while the DNA is still cross-linked (Zhao et al. (2006) *Nat Genet* 38, 1341-7). Here, circle formation requires both ends of the bait fragment to be ligated to both ends of a captured restriction fragment. If multiple restriction fragments are cross-linked together, circles may still be formed but they can contain more than one captured fragment and will therefore be larger. After de-crosslinking, captured DNA fragments are directly amplified by inverse PCR, using bait-specific primers facing outwards. Restriction enzymes recognizing four or six base pairs can be used in this set up. Four-cutters are preferred in this method though, since they produce smaller restriction fragments (average size 256 bp, versus ~4 kb for six-cutters) and linear PCR amplification of the captured DNA fragments requires that the average product size is small. Essentially, this method therefore comprises the steps of: (a) providing a sample of cross-linked DNA; (b) digesting the cross-linked DNA with a primary restriction enzyme—such as a 4 bp or a 5 bp cutter; (c) ligating the cross-linked nucleotide sequences; (d) reversing the cross linking and (e) amplifying the one or more nucleotide sequences of interest using at least two oligonucleotide primers, wherein each primer hybridizes to the DNA sequences that flank the nucleotide sequences of interest. The amplified sequence(s) can be hybridized to an array in order to assist in determining the frequency of interaction between the DNA sequences.

The second strategy advantageously relies on the formation of DNA circles after the chromatin has been de-cross-linked as is described in U.S. Pat. No. 8,642,295, incorporated herein by reference in its entirety. As described, 4C technology allows an unbiased genome-wide search for DNA fragments that interact with a locus of choice. Briefly, 3C analysis is performed as usual, but omitting the PCR step. The 3C template contains a target sequence or 'bait' (eg. a restriction fragment of choice that encompasses a selected gene) ligated to many different nucleotide sequences of interest (representing this gene's genomic environment). The template is cleaved by another, secondary, restriction enzyme and subsequently religated to form small DNA circles. Advantageously, the one or more nucleotide sequences of interest that are ligated to the target nucleotide sequence are amplified using at least two oligonucleotide primers, wherein at least one primer hybridises to the target sequence. The second primer preferably also hybridizes to the target sequence, such that both primers flank the nucleotide of interest. Alternatively, the second primer hybridizes to an adapter sequence that is ligated to the secondary restriction site, such that the two primers flank the nucleotide of interest. Typically, this yields a pattern of PCR fragments that is highly reproducible between independent amplification reactions and specific for a given tissue. HindIII and DpnII may be used as primary and secondary restriction enzymes. Next, the amplified fragments may be labeled and optionally hybridized to an array, typically against a control sample containing genomic DNA digested with the same combination of restriction enzymes. 3C technology has therefore been modified such that all nucleotide sequences of interest that interact with a target nucleotide sequence are amplified. Practically this means that instead of performing an amplification reaction with primers that are specific for the fragments that one wishes to analyze, an amplification is performed using oligonucleotide primer(s) which hybridize to a DNA sequence that flanks the nucleotide sequences of interest. Advantageously, 4C is not biased towards the design of PCR primers that are included in the PCR amplification step and can therefore be used to search the complete genome for interacting DNA elements.

In certain example embodiments, the measure of proximity may be determined by a nucleic acid proximity ligation assay. In general, nucleic acids, such as genomic DNA, are fragmented and then ligated. The ligation products are sequence and the frequency which two fragments ligate to one another is a function of the proximity of the two fragments to one another in a sample. In certain example embodiments, the nucleic acid proximity ligation assay may be a DNA-DNA ligation proximity assay. In certain example embodiment the DNA-DNA ligation proximity assay may be a Hi-C or in situ Hi-C method as disclosed in WO 2014/028921 and WO 2016/089920 respectively.

In certain example embodiments, Hi-C comprises providing a sample of one or more cells, nuclear extract, cellular milieu or system of nucleic acids of interest that include nucleic acids. In some embodiments, the spatial relationships in the cell is locked in, for example cross-linked or otherwise stabilized. For example, a sample of cells can be treated with a cross-linker to lock in the spatial information or relationship about the molecules in the cells, such as the DNA in the cell. The nucleic acids present are fragmented to yield nucleic acids with overhanging ends, such as a 5' overhanging end. The overhanging ends are then filled in, for example using a DNA polymerase, such as available from a commercial source. The filled in nucleic acid fragments are thus blunt ended at the end filled 5' end. The fragments are then end joined at the filled in end, for example, by ligation using a commercially available nucleic acid ligase, or otherwise attached to another fragment that is in close physical proximity. The ligation, or other attachment procedure, for example nick translation or strand displacement, creates one or more end joined nucleic acid fragments having a junction, for example a ligation junction, wherein the site of the junction, or at least within a few bases, includes one or more labeled nucleic acids, for example, one or more fragmented nucleic acids that have had their overhanging ends filled and joined together. While this step typically involves a ligase, it is contemplated that any means of joining the fragments can be used, for example any chemical or enzymatic means. Further, it is not necessary that the ends be joined in a typical 3'-5' ligation.

To identify the created ligation junction a labeled nucleotide is used. In one example embodiment, one or more labeled nucleotides are incorporated into the ligated junction. For example, the overhanging ends may be filled in using a DNA polymerase that incorporates one or more labeled nucleotides during the filling in step described above.

In some embodiments the nucleic acids are cross-linked, either directly, or indirectly, and the information about spatial relationships between the different DNA fragments in the cell, or cells, is maintained during this joining step, and substantially all of the end joined nucleic acid fragments formed at this step were in spatial proximity in the cell prior to the crosslinking step. Therefore, at this point the information about which sequences were in spatial proximity to other sequences in the cell is locked into the end joined fragments. It has been found however, that in some situations, it is not necessary to hold the nucleic acids in place using a chemical fixative or crosslinking agent. Thus in some embodiments, no crosslinking agent is used. In still other embodiments, the nucleic acids are held in position relative to each other by the application of non-crosslinking means, such as by using agar or other polymer to hold the nucleic acids in position.

The labeled nucleotide is present in the junction is used to isolate the one or more end joined nucleic acid fragments using the labeled nucleotide. The sequence is determined at the junction of the one or more end joined nucleic acid fragments, thereby detecting spatial proximity relationships between nucleic acid sequences in a cell. In some embodiments, such as for genome assembly, essentially all of the sequence of the end joined fragments is determined. In some embodiments, determining the sequence of the junction of the one or more end joined nucleic acid fragments includes nucleic acid sequencing. In some embodiments, determining the sequence of the junction of the one or more end joined nucleic acid fragments includes using a probe that specifically hybridizes to the nucleic acid sequences both 5' and 3' of the junction of the one or more end joined nucleic acid fragments, for example using an RNA probe, a DNA probe, a locked nucleic acid (LNA) probe, a peptide nucleic acid (PNA) probe, or a hybrid RNA-DNA probe. In exemplary embodiments of the disclosed method, the location is determined or identified for nucleic acid sequences both 5' and 3' of the ligation junction of the one or more end joined nucleic acid fragments relative to source genome and/or chromosome. In some embodiments, the junction identified is correlated with a disease state. In some embodiments, the junction identified is correlated with an environmental condition. In some embodiments, the sequenced end joined fragments are assembled to create an assembled genome or portion thereof, such as a chromosome or sub-fraction thereof. In some embodiments, information from one or more ligation junctions derived from a sample consisting of a mixture of cells from different organisms, such as mixture of microbes, is used to identify the organisms present in the sample and their relative proportions. In some example, the sample is derived from patient samples.

Typically, the end joined fragments are desired to be between about 100 and about 1000 bases in length, although longer and shorter fragments are contemplated. In some embodiments, the nucleic acid fragments are between about 100 and about 1000 bases in length, such as about 100, about 150, about 200, about 250, about 300, about 350, about 400, about 450, about 500, about 550, about 600, about 650, about 700, about 750, about 800, about 850, about 900, about 950 or about 1000 bases in length, for example form about 100 to about 1000, about 200 to about 800, about 500 to about 850, about 100 to about 500 and about 300 to about 775 base pairs in length and the like. In specific examples, end joined fragments are selected for sequence determination that are between about 300 and 500 base pairs in length.

In some embodiments, in order to create discrete portions of nucleic acid that can be joined together in subsequent steps of the methods, the nucleic acids present in the cells, such as cross-linked cells, are fragmented. The fragmentation can be done by a variety of methods, such as enzymatic and chemical cleavage. For example, DNA can be fragmented using an endonuclease that cuts a specific sequence of DNA and leaves behind a DNA fragment with a 5' overhang, thereby yielding fragmented DNA. In other examples an endonuclease can be selected that cuts the DNA at random spots and yields overhangs or blunt ends. In some embodiments, fragmenting the nucleic acid present in the one or more cells comprises enzymatic digestion with an endonuclease that leaves 5' overhanging ends. Enzymes that fragment, or cut, nucleic acids and yield an overhanging sequence are known in the art and can be obtained from such commercial sources as New England BioLabs® and Promega®. One of ordinary skill in the art can choose the restriction enzyme without undue experimentation. One of ordinary skill in the art will appreciate that using different fragmentation techniques, such as different enzymes with different sequence requirements, will yield different fragmentation patterns and therefore different nucleic acid ends. The process of fragmenting the sample can yield ends that are capable of being joined.

In some embodiments, the end joined DNA that includes a labeled nucleotide is captured with a specific binding agent that specifically binds a capture moiety, such as biotin, on the labeled nucleotide. In some embodiments, the capture moiety is adsorbed or otherwise captured on a surface. In specific embodiments, the end target joined DNA is labeled with biotin, for instance by incorporation of biotin-14-CTP or other biotinylated nucleotide during the filling in of the 5' overhang, for example with a DNA polymerase, allowing capture by streptavidin. Other means for labeling, capturing, and detecting nucleic acid probes include: incorporation of aminoallyl-labeled nucleotides, incorporation of sulfhydryl-labeled nucleotides, incorporation of allyl- or azide-containing nucleotides, and many other methods described in *Bioconjugate Techniques* ($2^{nd}$ Ed), Greg T. Hermanson, Elsevier (2008), which is specifically incorporated herein by reference. In some embodiments the specific binding agent has been immobilized for example on a solid support, thereby isolating the target nucleic molecule of interest. By "solid support or carrier" is intended any support capable of binding a targeting nucleic acid. Well-known supports or carriers include glass, polystyrene, polypropylene, polyethylene, dextran, nylon, amylases, natural and modified celluloses, polyacrylamides, agarose, gabbros and magnetite. The nature of the carrier can be either soluble to some extent or insoluble for the purposes of the present disclosure. The support material may have virtually any possible structural configuration so long as the coupled molecule is capable of binding to targeting probe. Thus, the support configuration may be spherical, as in a bead, or cylindrical, as in the inside surface of a test tube, or the external surface of a rod. Alternatively, the surface may be flat such as a sheet or test strip. After capture, these end joined nucleic acid fragments are available for further analysis, for example to determine the sequences that contributed to the information encoded by the ligation junction, which can be used to determine which DNA sequences are close in spatial proximity in the cell, for example to map the three dimensional structure of DNA in a cell such as genomic and/or chromatin bound DNA. In some embodiments, the sequence is determined by PCR, hybridization of a probe and/or sequencing, for example by sequencing using high-throughput paired end sequencing. In some embodiments determining the sequence at the one or more junctions of the one or more end joined nucleic acid fragments comprises nucleic acid sequencing, such as short-read sequencing technologies or long-read sequencing technologies. In some embodiments, nucleic acid sequencing is used to determine two or more junctions within an end-joined concatemer simultaneously.

In some embodiments, determining the sequence of a junction includes using a probe that specifically binds to the junction at the site of the two joined nucleic acid fragments. In particular embodiments, the probe specifically hybridizes to the junction both 5' and 3' of the site of the join and spans the site of the join. A probe that specifically binds to the junction at the site of the join can be selected based on known interactions, for example in a diagnostic setting where the presence of a particular target junction, or set of target junctions, has been correlated with a particular disease or condition. It is further contemplated that once a target junction is known, a probe for that target junction can be synthesized.

In some embodiments, the end joined nucleic acids are selectively amplified. In some examples, to selectively amplify the end joined nucleic acids, a 3' DNA adaptor and a 5' RNA, or conversely a 5' DNA adaptor and a 3' RNA adaptor can be ligated to the ends of the molecules can be used to mark the end joined nucleic acids. Using primers specific for these adaptors only end joined nucleic acids will be amplified during an amplification procedure such as PCR. In some embodiments, the target end joined nucleic acid is amplified using primers that specifically hybridize to the adaptor nucleic acid sequences present at the 3' and 5' ends of the end joined nucleic acids. In some embodiments, the non-ligated ends of the nucleic acids are end repaired. In some embodiments attaching sequencing adapters to the ends of the end ligated nucleic acid fragments.

In some embodiments, the cells are lysed to release the cellular contents, for example after crosslinking. In some examples the nuclei are lysed as well, while in other examples, the nuclei are maintained intact, which can then be isolated and optionally lysed, for example using an reagent that selectively targets the nuclei or other separation technique known in the art. In some examples, the sample is a sample of permeabilized nuclei, multiple nuclei, isolated nuclei, synchronized cells, (such at various points in the cell cycle, for example metaphase) or acellular. In some embodiments, the nucleic acids present in the sample are purified, for example using ethanol precipitation. In example embodiments of the disclosed method the cells and/or cell nuclei are not subjected to mechanical lysis. In some example embodiments, the sample is not subjected to RNA degradation. In specific embodiments, the sample is not contacted with an exonuclease to remove of biotin from un-ligated ends. In some embodiments, the sample is not subjected to phenol/chloroform extraction.

In some embodiments of the disclosed method the nucleic acids present in the cell or cells are fixed in position relative to each other by chemical crosslinking, for example by contacting the cells with one or more chemical cross linkers. This treatment locks in the spatial relationships between portions of nucleic acids in a cell. Any method of fixing the nucleic acids in their positions can be used. In some embodiments, the cells are fixed, for example with a fixative, such as an aldehyde, for example formaldehyde or glutaraldehyde. In some embodiments, a sample of one or more cells is cross-linked with a cross-linker to maintain the spatial relationships in the cell. For example, a sample of cells can be treated with a cross-linker to lock in the spatial information or relationship about the molecules in the cells, such as the DNA and RNA in the cell. In other embodiments, the relative positions of the nucleic acid can be maintained without using crosslinking agents. For example the nucleic acids can be stabilized using spermine and spermidine (see Cullen et al., Science 261, 203 (1993), which is specifically incorporated herein by reference in its entirety). Other methods of maintaining the positional relationships of nucleic acids are known in the art. In some embodiments, nuclei are stabilized by embedding in a polymer such as agarose. In some embodiments, the cross-linker is a reversible cross-linker. In some embodiments, the cross-linker is reversed, for example after the fragments are joined. In specific examples, the nucleic acids are released from the cross-linked three-dimensional matrix by treatment with an agent, such as a proteinase, that degrade the proteinaceous material form the sample, thereby releasing the end ligated nucleic acids for further analysis, such as determination of the nucleic acid sequence. In specific embodiments, the sample is contacted with a proteinase, such as Proteinase K. In some embodiments of the disclosed methods, the cells are contacted with a crosslinking agent to provide the cross-linked cells. In some examples, the cells are contacted with a protein-nucleic acid crosslinking agent, a nucleic acid-nucleic acid crosslinking agent, a protein-protein crosslinking agent or any combination thereof. By this method, the nucleic acids present in the sample become resistant to special rearrangement and the spatial information about the relative locations of nucleic acids in the cell is maintained. In some examples, a cross-linker is a reversible-, such that the cross-linked molecules can be easily separated in subsequent steps of the method. In some examples, a cross-linker is a non-reversible cross-linker, such that the cross-linked molecules cannot be easily separated. In some examples, a cross-linker is light, such as UV light. In some examples, across linker is light activated. These cross-linkers include formaldehyde, disuccinimidyl glutarate, UV light, psoralens and their derivatives such as aminomethyl-trioxsalen, glutaraldehyde, ethylene glycol bis[succinim-idylsuccinate], bissulfosuccinimidyl suberate, 1-Ethyl-3-[3-dimethylaminopropyl]carbodiimide (EDC) bis [sulfosuccinimidyl] suberate ($BS^3$) and other compounds known to those skilled in the art, including those described in the *Thermo Scientific Pierce Crosslinking Technical Handbook*, Thermo Scientific (2009).

Adoptive Cell Therapies

The present invention also contemplates use of modified cells in which one or more enhancers listed in Table 3 (Enhancer Nos. 219-299) have been mutated, deleted, repressed or inhibited through genome or epigenome editing for adoptive therapies. Aspects of the invention accordingly involve the adoptive transfer of immune system cells, such as T cells, specific for selected antigens, such as tumor associated antigens (see Maus et al., 2014, Adoptive Immunotherapy for Cancer or Viruses, Annual Review of Immunology, Vol. 32: 189-225; Rosenberg and Restifo, 2015, Adoptive cell transfer as personalized immunotherapy for human cancer, Science Vol. 348 no. 6230 pp. 62-68; and, Restifo et al., 2015, Adoptive immunotherapy for cancer: harnessing the T cell response. Nat. Rev. Immunol. 12(4): 269-281; and Jenson and Riddell, 2014, Design and implementation of adoptive therapy with chimeric antigen receptor-modified T cells. Immunol Rev. 257(1): 127-144). Various strategies may for example be employed to genetically modify T cells by altering the specificity of the T cell receptor (TCR) for example by introducing new TCR a and R chains with selected peptide specificity (see U.S. Pat. No. 8,697,854; PCT Patent Publications: WO2003020763, WO2004033685, WO2004044004, WO2005114215, WO2006000830, WO2008038002, WO2008039818, WO2004074322, WO2005113595, WO2006125962, WO2013166321, WO2013039889, WO2014018863, WO2014083173; U.S. Pat. No. 8,088,379).

As an alternative to, or addition to, TCR modifications, chimeric antigen receptors (CARs) may be used in order to generate immunoresponsive cells, such as T cells, specific for selected targets, such as malignant cells, with a wide variety of receptor chimera constructs having been described (see U.S. Pat. Nos. 5,843,728; 5,851,828; 5,912,170; 6,004,811; 6,284,240; 6,392,013; 6,410,014; 6,753,162; 8,211,422; and, PCT Publication WO9215322). Alternative CAR constructs may be characterized as belonging to successive generations. First-generation CARs typically consist of a single-chain variable fragment of an antibody specific for an antigen, for example comprising a VL linked to a VH of a specific antibody, linked by a flexible linker, for example by a CD8α hinge domain and a CD8α transmembrane domain, to the transmembrane and intracellular signaling domains of either CD3ζ or FcRγ (scFv-CD3ζ or scFv-FcRγ; see U.S. Pat. Nos. 7,741,465; 5,912,172; 5,906,936). Second-generation CARs incorporate the intracellular domains of one or more costimulatory molecules, such as CD28, OX40 (CD134), or 4-1BB (CD137) within the endodomain (for example scFv-CD28/OX40/4-1BB-CD3ζ; see U.S. Pat. Nos. 8,911,993; 8,916,381; 8,975,071; 9,101,584; 9,102,760; 9,102,761). Third-generation CARs include a combination of costimulatory endodomains, such a CD3ζ-chain, CD97, GDI1a-CD18, CD2, ICOS, CD27, CD154, CDS, OX40, 4-1BB, or CD28 signaling domains (for example scFv-CD28-4-1BB-CD3ζ or scFv-CD28-OX40-CD3ζ; see U.S. Pat. Nos. 8,906,682; 8,399,645; 5,686,281; PCT Publication No. WO2014134165; PCT Publication No. WO2012079000). Alternatively, costimulation may be orchestrated by expressing CARs in antigen-specific T cells, chosen so as to be activated and expanded following engagement of their native αβTCR, for example by antigen on professional antigen-presenting cells, with attendant costimulation. In addition, additional engineered receptors may be provided on the immunoresponsive cells, for example to improve targeting of a T cell attack and/or minimize side effects.

Alternative techniques may be used to transform target immunoresponsive cells, such as protoplast fusion, lipofection, transfection or electroporation. A wide variety of vectors may be used, such as retroviral vectors, lentiviral vectors, adenoviral vectors, adeno-associated viral vectors, plasmids or transposons, such as a Sleeping Beauty transposon (see U.S. Pat. Nos. 6,489,458; 7,148,203; 7,160,682; 7,985,739; 8,227,432), may be used to introduce CARs, for example using 2nd generation antigen-specific CARs signaling through CD3ζ and either CD28 or CD137. Viral vectors may for example include vectors based on HIV, SV40, EBV, HSV or BPV.

Cells that are targeted for transformation may for example include T cells, Natural Killer (NK) cells, cytotoxic T lymphocytes (CTL), regulatory T cells, human embryonic stem cells, tumor-infiltrating lymphocytes (TIL) or a pluripotent stem cell from which lymphoid cells may be differentiated. T cells expressing a desired CAR may for example be selected through co-culture with γ-irradiated activating and propagating cells (AaPC), which co-express the cancer antigen and co-stimulatory molecules. The engineered CAR T cells may be expanded, for example by co-culture on AaPC in presence of soluble factors, such as IL-2 and IL-21. This expansion may for example be carried out so as to provide memory CAR+ T cells (which may for example be assayed by non-enzymatic digital array and/or multi-panel flow cytometry). In this way, CAR T cells may be provided that have specific cytotoxic activity against antigen-bearing tumors (optionally in conjunction with production of desired chemokines such as interferon-γ). CAR T cells of this kind may for example be used in animal models, for example to threat tumor xenografts.

Approaches such as the foregoing may be adapted to provide methods of treating and/or increasing survival of a subject having a disease, such as a neoplasia, for example by administering an effective amount of an immunoresponsive cell comprising an antigen recognizing receptor that binds a selected antigen, wherein the binding activates the immunoreponsive cell, thereby treating or preventing the disease (such as a neoplasia, a pathogen infection, an autoimmune disorder, or an allogeneic transplant reaction). Dosing in CAR T cell therapies may for example involve administration of from 106 to 109 cells/kg, with or without a course of lymphodepletion, for example with cyclophosphamide.

In one embodiment, the treatment can be administrated into patients undergoing an immunosuppressive treatment. The cells or population of cells, may be made resistant to at least one immunosuppressive agent due to the inactivation of a gene encoding a receptor for such immunosuppressive agent. Not being bound by a theory, the immunosuppressive treatment should help the selection and expansion of the immunoresponsive or T cells according to the invention within the patient.

The administration of the cells or population of cells according to the present invention may be carried out in any convenient manner, including by aerosol inhalation, injection, ingestion, transfusion, implantation or transplantation. The cells or population of cells may be administered to a patient subcutaneously, intradermally, intratumorally, intranodally, intramedullary, intramuscularly, by intravenous or intralymphatic injection, or intraperitoneally. In one embodiment, the cell compositions of the present invention are preferably administered by intravenous injection.

The administration of the cells or population of cells can consist of the administration of 104-109 cells per kg body weight, preferably 105 to 106 cells/kg body weight including all integer values of cell numbers within those ranges. Dosing in CAR T cell therapies may for example involve administration of from 106 to 109 cells/kg, with or without a course of lymphodepletion, for example with cyclophosphamide. The cells or population of cells can be administrated in one or more doses. In another embodiment, the effective amount of cells are administrated as a single dose. In another embodiment, the effective amount of cells are administrated as more than one dose over a period time. Timing of administration is within the judgment of managing physician and depends on the clinical condition of the patient. The cells or population of cells may be obtained from any source, such as a blood bank or a donor. While individual needs vary, determination of optimal ranges of effective amounts of a given cell type for a particular disease or conditions are within the skill of one in the art. An effective amount means an amount which provides a therapeutic or prophylactic benefit. The dosage administrated will be dependent upon the age, health and weight of the recipient, kind of concurrent treatment, if any, frequency of treatment and the nature of the effect desired.

In another embodiment, the effective amount of cells or composition comprising those cells are administrated parenterally. The administration can be an intravenous administration. The administration can be directly done by injection within a tumor.

To guard against possible adverse reactions, engineered immunoresponsive cells may be equipped with a transgenic safety switch, in the form of a transgene that renders the cells vulnerable to exposure to a specific signal. For example, the herpes simplex viral thymidine kinase (TK) gene may be used in this way, for example by introduction into allogeneic T lymphocytes used as donor lymphocyte infusions following stem cell transplantation (Greco, et al., Improving the safety of cell therapy with the TK-suicide gene. Front. Pharmacol. 2015; 6: 95). In such cells, administration of a nucleoside prodrug such as ganciclovir or acyclovir causes cell death. Alternative safety switch constructs include inducible caspase 9, for example triggered by administration of a small-molecule dimerizer that brings together two nonfunctional icasp9 molecules to form the active enzyme. A wide variety of alternative approaches to implementing cellular proliferation controls have been described (see U.S. Patent Publication No. 20130071414; PCT Patent Publication WO2011146862; PCT Patent Publication WO2014011987; PCT Patent Publication WO2013040371; Zhou et al. BLOOD, 2014, 123/25:3895-3905; Di Stasi et al., The New England Journal of Medicine 2011; 365:1673-1683; Sadelain M, The New England Journal of Medicine 2011; 365:1735-173; Ramos et al., Stem Cells 28(6):1107-15 (2010)).

In a further refinement of adoptive therapies, modified cells in which one or more enhancers listed in Table 3 have been mutated, deleted, repressed or inhibited through genome or epigenome editing may be further tailored to alternative implementations, for example providing edited CAR T cells (see Poirot et al., 2015, Multiplex genome edited T-cell manufacturing platform for "off-the-shelf" adoptive T-cell immunotherapies, Cancer Res 75 (18): 3853). For example, immunoresponsive cells may be edited to delete expression of some or all of the class of HLA type II and/or type I molecules, or to knockout selected genes that may inhibit the desired immune response, such as the PD1 gene.

Cells may be edited using the CRISPR system as described herein. The CRISPR systems may be delivered to an immune cell by any method described herein. In preferred embodiments, cells are edited ex vivo and transferred to a subject in need thereof. Immunoresponsive cells, CAR-T cells or any cells used for adoptive cell transfer may be edited. Editing may be performed to eliminate potential alloreactive T cell receptors (TCR), disrupt the target of a chemotherapeutic agent, block an immune checkpoint, activate a T cell, and/or increase the differentiation and/or proliferation of functionally exhausted or dysfunctional CD8+ T cells (see PCT Patent Publications: WO2013176915, WO2014059173, WO2014172606, WO2014184744, and WO2014191128). Editing may result in inactivation of a gene.

T cell receptors (TCR) are cell surface receptors that participate in the activation of T cells in response to the presentation of antigen. The TCR is generally made from two chains, α and β, which assemble to form a heterodimer and associates with the CD3-transducing subunits to form the T cell receptor complex present on the cell surface. Each α and β chain of the TCR consists of an immunoglobulin-like N-terminal variable (V) and constant (C) region, a hydrophobic transmembrane domain, and a short cytoplasmic region. As for immunoglobulin molecules, the variable region of the α and β chains are generated by V(D)J recombination, creating a large diversity of antigen specificities within the population of T cells. However, in contrast to immunoglobulins that recognize intact antigen, T cells are activated by processed peptide fragments in association with an MHC molecule, introducing an extra dimension to antigen recognition by T cells, known as MHC restriction. Recognition of MHC disparities between the donor and recipient through the T cell receptor leads to T cell proliferation and the potential development of graft versus host disease (GVHD). The inactivation of TCRα or TCRβ can result in the elimination of the TCR from the surface of T cells preventing recognition of alloantigen and thus GVHD. However, TCR disruption generally results in the elimination of the CD3 signaling component and alters the means of further T cell expansion.

Allogeneic cells are rapidly rejected by the host immune system. It has been demonstrated that, allogeneic leukocytes present in non-irradiated blood products will persist for no more than 5 to 6 days (Boni, Muranski et al. 2008 Blood 1; 112(12):4746-54). Thus, to prevent rejection of allogeneic cells, the host's immune system usually has to be suppressed to some extent. However, in the case of adoptive cell transfer the use of immunosuppressive drugs also have a detrimental effect on the introduced therapeutic T cells. Therefore, to effectively use an adoptive immunotherapy approach in these conditions, the introduced cells would need to be resistant to the immunosuppressive treatment. Thus, in a particular embodiment, the present invention further comprises a step of modifying T cells to make them resistant to an immunosuppressive agent, preferably by inactivating at least one gene encoding a target for an immunosuppressive agent. An immunosuppressive agent is an agent that suppresses immune function by one of several mechanisms of action. An immunosuppressive agent can be, but is not limited to a calcineurin inhibitor, a target of rapamycin, an interleukin-2 receptor α-chain blocker, an inhibitor of inosine monophosphate dehydrogenase, an inhibitor of dihydrofolic acid reductase, a corticosteroid or an immunosuppressive antimetabolite. The present invention allows conferring immunosuppressive resistance to T cells for immunotherapy by inactivating the target of the immunosuppressive agent in T cells. As non-limiting examples, targets for an immunosuppressive agent can be a receptor for an immunosuppressive agent such as: CD52, glucocorticoid receptor (GR), a FKBP family gene member and a cyclophilin family gene member.

Immune checkpoints are inhibitory pathways that slow down or stop immune reactions and prevent excessive tissue damage from uncontrolled activity of immune cells. In certain embodiments, the immune checkpoint targeted is the programmed death-1 (PD-1 or CD279) gene (PDCD1). In other embodiments, the immune checkpoint targeted is cytotoxic T-lymphocyte-associated antigen (CTLA-4). In additional embodiments, the immune checkpoint targeted is another member of the CD28 and CTLA4 Ig superfamily such as BTLA, LAG3, ICOS, PDL1 or KIR. In further additional embodiments, the immune checkpoint targeted is a member of the TNFR superfamily such as CD40, OX40, CD137, GITR, CD27 or TIM-3.

Additional immune checkpoints include Src homology 2 domain-containing protein tyrosine phosphatase 1 (SHP-1) (Watson H A, et al., SHP-1: the next checkpoint target for cancer immunotherapy? Biochem Soc Trans. 2016 Apr. 15; 44(2):356-62). SHP-1 is a widely expressed inhibitory protein tyrosine phosphatase (PTP). In T cells, it is a negative regulator of antigen-dependent activation and proliferation. It is a cytosolic protein, and therefore not amenable to antibody-mediated therapies, but its role in activation and proliferation makes it an attractive target for genetic manipulation in adoptive transfer strategies, such as chimeric antigen receptor (CAR) T cells. Immune checkpoints may also include T cell immunoreceptor with Ig and ITIM domains (TIGIT/Vstm3/WUCAM/VSIG9) and VISTA (Le Mercier I, et al., (2015) Beyond CTLA-4 and PD-1, the generation Z of negative checkpoint regulators. Front. Immunol. 6:418).

WO2014172606 relates to the use of MT1 and/or MT1 inhibitors to increase proliferation and/or activity of exhausted CD8+ T cells and to decrease CD8+ T cell exhaustion (e.g., decrease functionally exhausted or unresponsive CD8+ immune cells). In certain embodiments, metallothioneins are targeted by gene editing in adoptively transferred T cells.

In certain embodiments, targets of gene editing may be at least one targeted locus involved in the expression of an immune checkpoint protein. Such targets may include, but are not limited to CTLA4, PPP2CA, PPP2CB, PTPN6, PTPN22, PDCD1, ICOS (CD278), PDL1, KIR, LAG3, HAVCR2, BTLA, CD160, TIGIT, CD96, CRTAM, LAIR1, SIGLEC7, SIGLEC9, CD244 (2B4), TNFRSF10B, TNFRSF10A, CASP8, CASP10, CASP3, CASP6, CASP7, FADD, FAS, TGFBRII, TGFBRI, SMAD2, SMAD3, SMAD4, SMAD10, SKI, SKIL, TGIF1, IL10RA, IL10RB, HMOX2, IL6R, IL6ST, EIF2AK4, CSK, PAG1, SIT1, FOXP3, PRDM1, BATF, VISTA, GUCY1A2, GUCY1A3, GUCY1B2, GUCY1B3, MT1, MT2, CD40, OX40, CD137, GITR, CD27, SHP-1 or TIM-3. In preferred embodiments, the gene locus involved in the expression of PD-1 or CTLA-4 genes is targeted. In other preferred embodiments, combinations of genes are targeted, such as but not limited to PD-1 and TIGIT.

In other embodiments, at least two genes are edited. Pairs of genes may include, but are not limited to PD1 and TCRα, PD1 and TCRβ, CTLA-4 and TCRα, CTLA-4 and TCRβ, LAG3 and TCRα, LAG3 and TCRβ, Tim3 and TCRα, Tim3 and TCRβ, BTLA and TCRα, BTLA and TCRβ, BY55 and TCRα, BY55 and TCRβ, TIGIT and TCRα, TIGIT and TCRβ, B7H5 and TCRα, B7H5 and TCRβ, LAIR1 and TCRα, LAIR1 and TCRβ, SIGLEC10 and TCRα, SIGLEC10 and TCRβ, 2B4 and TCRα, 2B4 and TCRβ.

Whether prior to or after genetic modification of the T cells, the T cells can be activated and expanded generally using methods as described, for example, in U.S. Pat. Nos. 6,352,694; 6,534,055; 6,905,680; 5,858,358; 6,887,466; 6,905,681; 7,144,575; 7,232,566; 7,175,843; 5,883,223; 6,905,874; 6,797,514; 6,867,041; and 7,572,631. T cells can be expanded in vitro or in vivo.

The practice of the present invention employs techniques known in the field of immunology, biochemistry, chemistry, molecular biology, microbiology, cell biology, genomics and recombinant DNA, which are within the skill of the art. See MOLECULAR CLONING: A LABORATORY MANUAL, 2nd edition (1989) (Sambrook, Fritsch and Maniatis); MOLECULAR CLONING: A LABORATORY MANUAL, 4th edition (2012) (Green and Sambrook); CURRENT PROTOCOLS IN MOLECULAR BIOLOGY (1987) (F. M. Ausubel, et al. eds.); the series METHODS IN ENZYMOLOGY (Academic Press, Inc.); PCR 2: A PRACTICAL APPROACH (1995) (M. J. MacPherson, B. D. Hames and G. R. Taylor eds.); ANTIBODIES, A LABORATORY MANUAL (1988) (Harlow and Lane, eds.); ANTIBODIES A LABORATORY MANUAL, 2nd edition (2013) (E. A. Greenfield ed.); and ANIMAL CELL CULTURE (1987) (R. I. Freshney, ed.).

Inflammatory Disease of the Gut

In yet other embodiments, the invention disclosed herein relates to a method for treating an inflammatory disease of the gut, such as inflammatory bowel disease (IBD) or graft-versus-host disease (GVHD), comprising administering to a subject in need thereof a pharmaceutical composition effective for reducing expression of a gene selected from IL6R, IL23R, IL12RB1, IL12RB2, and SMAD7 in a subject in need thereof, by mutating, deleting, repressing or inhibiting one or more enhancers listed in Table 4. Such treatment may be supplemented with other known treatments, such as surgery on the subject. In certain embodiments, the surgery is strictureplasty, resection (e.g., bowel resection, colon resection), colectomy, surgery for abscesses and fistulas, proctocolectomy, restorative proctocolectomy, vaginal surgery, cataract surgery, or a combination thereof.

Inflammatory bowel disease (IBD) is a group of inflammatory conditions of the colon and small intestine, principally including Crohn's disease and ulcerative colitis, with other forms of IBD representing far fewer cases (e.g., collagenous colitis, lymphocytic colitis, diversion colitis, Behget's disease and indeterminate colitis). Pathologically, Crohn's disease affects the full thickness of the bowel wall (e.g., transmural lesions) and can affect any part of the gastrointestinal tract, while ulcerative colitis is restricted to the mucosa (epithelial lining) of the colon and rectum.

Graft-versus-host disease (GVHD) is an immune-related disease that can occur following an allogeneic tissue transplant. It is commonly associated with stem cell or bone marrow transplants, but GVHD also applies to other forms of tissue graft. In GVHD immune cells of the tissue graft recognize the recipient host as foreign and attack the host's cells.

It has long been recognized that IBD and GVHD are diseases associated with increased immune activity. The causes of IBD, while not well understood, may be related to an aberrant immune response to the microbiota in genetically susceptible individuals. IBD affects over 1.4 million people in the United States and over 2.2 million in Europe and is on the increase. With both environmental and genetic factors playing a role in the development and progression of IBD, response to current treatments (e.g., anti-inflammatory drugs, immune system suppressors, antibiotics, surgery, and other symptom specific medications) are unpredictable.

Similarly, a fundamental feature of GVHD is increased immune activity. As yet, the pathophysiology underlying GVHD is not well understood. It is a significant cause of morbidity and mortality following allogenic haematopoietic stem-cell transplantation and thus the focus of much ongoing research. Despite the advances in understanding the pathophysiology (e.g., predisposing factors), a standardized therapeutic strategy is still lacking. Currently both acute and chronic forms of GVHD are treated using corticosteroids (e.g., anti-inflammatory treatments). There is a need for new approaches to treating IBD and GVHD.

Some of the genetic factors predisposing one to IBD are known, as explored in Daniel B. Graham and Ramnik J. Xavier "From Genetics of Inflammatory Bowel Disease Towards Mechanistic Insights" *Trends Immunol.* 2013 August; 34(8): 371-378 (incorporated herein). This disclosure provides a rationale for modulating intestinal epithelial cell balance, function, differentiation and/or activity for the treatment of both IBD and GVHD, and other disorders.

In certain embodiments, the IBD is Crohn's disease or ulcerative colitis. In certain embodiments, the IBD is collagenous colitis, lymphocytic colitis, diversion colitis, Behget's disease, or indeterminate colitis.

In other embodiments, the GVHD is acute graft-versus-host disease (aGVHD) or chronic graft-versus-host disease (cGVHD).

Delivery of the CRISPR Effector Protein Complex or Components Thereof

Through this disclosure and the knowledge in the art, TALEs, CRISPR-Cas systems, or components thereof or nucleic acid molecules thereof or nucleic acid molecules encoding or providing components thereof may be delivered by a delivery system herein described both generally and in detail.

Vector delivery, e.g., plasmid, viral delivery: The CRISPR enzyme (e.g., a Type-II CRISPR effector protein such as Cas9, a Type-V CRISPR effector protein such as Cpf1, or a Type-VI CRISPR effector protein such as C2c2 and Cas13b), and/or any of the present RNAs, for instance a guide RNA, can be delivered using any suitable vector, e.g., plasmid or viral vectors, such as adeno associated virus (AAV), lentivirus, adenovirus or other viral vector types, or combinations thereof. Effector proteins and one or more guide RNAs can be packaged into one or more vectors, e.g., plasmid or viral vectors. In some embodiments, the vector, e.g., plasmid or viral vector is delivered to the tissue of interest by, for example, an intramuscular injection, while other times the delivery is via intravenous, transdermal, intranasal, oral, mucosal, or other delivery methods. Such delivery may be either via a single dose, or multiple doses. One skilled in the art understands that the actual dosage to be delivered herein may vary greatly depending upon a variety of factors, such as the vector choice, the target cell, organism, or tissue, the general condition of the subject to be treated, the degree of transformation/modification sought, the administration route, the administration mode, the type of transformation/modification sought, etc.

Such a dosage may further contain, for example, a carrier (water, saline, ethanol, glycerol, lactose, sucrose, calcium phosphate, gelatin, dextran, agar, pectin, peanut oil, sesame oil, etc.), a diluent, a pharmaceutically acceptable carrier (e.g., phosphate-buffered saline), a pharmaceutically acceptable excipient, and/or other compounds known in the art. The dosage may further contain one or more pharmaceutically acceptable salts such as, for example, a mineral acid salt such as a hydrochloride, a hydrobromide, a phosphate, a sulfate, etc.; and the salts of organic acids such as acetates, propionates, malonates, benzoates, etc. Additionally, auxiliary substances, such as wetting or emulsifying agents, pH buffering substances, gels or gelling materials, flavorings, colorants, microspheres, polymers, suspension agents, etc. may also be present herein. In addition, one or more other conventional pharmaceutical ingredients, such as preservatives, humectants, suspending agents, surfactants, antioxidants, anticaking agents, fillers, chelating agents, coating agents, chemical stabilizers, etc. may also be present, especially if the dosage form is a reconstitutable form. Suitable exemplary ingredients include microcrystalline cellulose, carboxymethylcellulose sodium, polysorbate 80, phenylethyl alcohol, chlorobutanol, potassium sorbate, sorbic acid, sulfur dioxide, propyl gallate, the parabens, ethyl vanillin, glycerin, phenol, parachlorophenol, gelatin, albumin and a combination thereof. A thorough discussion of pharmaceutically acceptable excipients is available in REMINGTON'S PHARMACEUTICAL SCIENCES (Mack Pub. Co., N.J. 1991) which is incorporated by reference herein.

In an embodiment herein the delivery is via an adenovirus, which may be at a single booster dose containing at least $1 \times 10^5$ particles (also referred to as particle units, pu) of adenoviral vector. In an embodiment herein, the dose preferably is at least about $1 \times 10^6$ particles (for example, about $1 \times 10^6 - 1 \times 10^{12}$ particles), more preferably at least about $1 \times 10^7$ particles, more preferably at least about $1 \times 10^8$ particles (e.g., about $1 \times 10^8 - 1 \times 10^{11}$ particles or about $1 \times 10^8 - 1 \times 10^{12}$ particles), and most preferably at least about $1 \times 10^{100}$ particles (e.g., about $1 \times 10^9 - 1 \times 10^{10}$ particles or about $1 \times 10^9 - 1 \times 10^{12}$ particles), or even at least about $1 \times 10^{10}$ particles (e.g., about $1 \times 10^{10} - 1 \times 10^{12}$ particles) of the adenoviral vector. Alternatively, the dose comprises no more than about $1 \times 10^{14}$ particles, preferably no more than about $1 \times 10^{13}$ particles, even more preferably no more than about $1 \times 10^{12}$ particles, even more preferably no more than about $1 \times 10^{11}$ particles, and most preferably no more than about $1 \times 10^{10}$ particles (e.g., no more than about $1 \times 10^9$ articles). Thus, the dose may contain a single dose of adenoviral vector with, for example, about $1 \times 10^6$ particle units (pu), about 2×106 pu, about 4×106 pu, about 1×107 pu, about 2×107 pu, about 4×107 pu, about 1×108 pu, about 2×108 pu, about 4×108 pu, about 1×109 pu, about 2×109 pu, about 4×109 pu, about 1×1010 pu, about 2×1010 pu, about 4×1010 pu, about 1×1011 pu, about 2×1011 pu, about 4×1011 pu, about 1×1012 pu, about 2×1012 pu, or about 4×1012 pu of adenoviral vector. See, for example, the adenoviral vectors in U.S. Pat. No. 8,454,972 B2 to Nabel, et. al., granted on Jun. 4, 2013; incorporated by reference herein, and the dosages at col 29, lines 36-58 thereof. Inan embodiment herein, the adenovirus is delivered via multiple doses.

In an embodiment herein, the delivery is via an AAV. A therapeutically effective dosage for in vivo delivery of the AAV to a human is believed to be in the range of from about 20 to about 50 ml of saline solution containing from about 1×1010 to about 1×1010 functional AAV/ml solution. The dosage may be adjusted to balance the therapeutic benefit against any side effects. In an embodiment herein, the AAV dose is generally in the range of concentrations of from about 1×105 to 1×1050 genomes AAV, from about 1×108 to 1×1020 genomes AAV, from about 1×1010 to about 1×1016 genomes, or about 1×1011 to about 1×1016 genomes AAV. A human dosage may be about 1×1013 genomes AAV. Such concentrations may be delivered in from about 0.001 ml to about 100 ml, about 0.05 to about 50 ml, or about 10 to about 25 ml of a carrier solution. Other effective dosages can be readily established by one of ordinary skill in the art through routine trials establishing dose response curves. See, for example, U.S. Pat. No. 8,404,658 B2 to Hajjar, et al., granted on Mar. 26, 2013, at col. 27, lines 45-60.

In an embodiment herein the delivery is via a plasmid. In such plasmid compositions, the dosage should be a sufficient amount of plasmid to elicit a response. For instance, suitable quantities of plasmid DNA in plasmid compositions can be from about 0.1 to about 2 mg, or from about 1 µg to about 10 µg per 70 kg individual. Plasmids of the invention will generally comprise (i) a promoter; (ii) a sequence encoding an nucleic acid-targeting CRISPR enzyme, operably linked to said promoter; (iii) a selectable marker; (iv) an origin of replication; and (v) a transcription terminator downstream of and operably linked to (ii). The plasmid can also encode the RNA components of a CRISPR complex, but one or more of these may instead be encoded on a different vector.

The doses herein are based on an average 70 kg individual. The frequency of administration is within the ambit of the medical or veterinary practitioner (e.g., physician, veterinarian), or scientist skilled in the art. It is also noted that mice used in experiments are typically about 20 g and from mice experiments one can scale up to a 70 kg individual.

In some embodiments the RNA molecules of the invention are delivered in liposome or lipofectin formulations and the like and can be prepared by methods well known to those skilled in the art. Such methods are described, for example, in U.S. Pat. Nos. 5,593,972, 5,589,466, and 5,580,859, which are herein incorporated by reference. Delivery systems aimed specifically at the enhanced and improved delivery of siRNA into mammalian cells have been developed, (see, for example, Shen et al FEBS Let. 2003, 539: 111-114; Xia et al., Nat. Biotech. 2002, 20:1006-1010; Reich et al., Mol. Vision. 2003, 9: 210-216; Sorensen et al., J. Mol. Biol. 2003, 327: 761-766; Lewis et al., Nat. Gen. 2002, 32: 107-108 and Simeoni et al., NAR 2003, 31, 11: 2717-2724) and may be applied to the present invention. siRNA has recently been successfully used for inhibition of gene expression in primates (see for example. Tolentino et al., Retina 24(4):660 which may also be applied to the present invention.

Indeed, RNA delivery is a useful method of in vivo delivery. It is possible to deliver nucleic acid-targeting Cas protein Cas9 and guide RNA gRNA (and, for instance, HR repair template) into cells using liposomes or particles. Thus delivery of the nucleic acid-targeting Cas protein/CRISPR enzyme, such as a Cas9 and/or delivery of the guide RNAs of the invention may be in RNA form and via microvesicles, liposomes or particles. For example, Cas mRNA and guide RNA can be packaged into liposomal particles for delivery in vivo. Liposomal transfection reagents such as lipofectamine from Life Technologies and other reagents on the market can effectively deliver RNA molecules into the liver.

Means of delivery of RNA also preferred include delivery of RNA via nanoparticles (Cho, S., Goldberg, M., Son, S., Xu, Q., Yang, F., Mei, Y., Bogatyrev, S., Langer, R. and Anderson, D., Lipid-like nanoparticles for small interfering RNA delivery to endothelial cells, Advanced Functional Materials, 19: 3112-3118, 2010) or exosomes (Schroeder, A., Levins, C., Cortez, C., Langer, R., and Anderson, D., Lipid-based nanotherapeutics for siRNA delivery, Journal of Internal Medicine, 267: 9-21, 2010, PMID: 20059641). Indeed, exosomes have been shown to be particularly useful in delivery siRNA, a system with some parallels to the RNA-targeting system. For instance, El-Andaloussi S, et al. ("Exosome-mediated delivery of siRNA in vitro and in vivo." Nat Protoc. 2012 December; 7(12):2112-26. doi: 10.1038/nprot.2012.131. Epub 2012 Nov. 15.) describe how exosomes are promising tools for drug delivery across different biological barriers and can be harnessed for delivery of siRNA in vitro and in vivo. Their approach is to generate targeted exosomes through transfection of an expression vector, comprising an exosomal protein fused with a peptide ligand. The exosomes are then purify and characterized from transfected cell supernatant, then RNA is loaded into the exosomes. Delivery or administration according to the invention can be performed with exosomes, in particular but not limited to the brain. Vitamin E (α-tocopherol) may be conjugated with nucleic acid-targeting Cas protein and delivered to the brain along with high density lipoprotein (HDL), for example in a similar manner as was done by Uno et al. (HUMAN GENE THERAPY 22:711-719 (June 2011)) for delivering short-interfering RNA (siRNA) to the brain. Mice were infused viaOsmotic minipumps (model 1007D; Alzet, Cupertino, CA) filled with phosphate-buffered saline (PBS) or free TocsiBACE or Toc-siBACE/HDL and connected with Brain Infusion Kit 3 (Alzet). A brain-infusion cannula was placed about 0.5 mm posterior to the bregma at midline for infusion into the dorsal third ventricle. Uno et al. found that as little as 3 nmol of Toc-siRNA with HDL could induce a target reduction in comparable degree by the same ICV infusion method. A similar dosage of nucleic acid-targeting effector protein conjugated to α-tocopherol and co-administered with HDL targeted to the brain may be contemplated for humans in the present invention, for example, about 3 nmol to about 3 µmol of nucleic acid-targeting effector protein targeted to the brain may be contemplated. Zou et al. ((HUMAN GENE THERAPY 22:465-475 (April 2011)) describes a method of lentiviral-mediated delivery of short-hairpin RNAs targeting PKCγ for in vivo gene silencing in the spinal cord of rats. Zou et al. administered about 10 µl of a recombinant lentivirus having a titer of 1×109 transducing units (TU)/ml by an intrathecal catheter. A similar dosage of nucleic acid-targeting effector protein expressed in a lentiviral vector targeted to the brain may be contemplated for humans in the present invention, for example, about 10-50 ml of nucleic acid-targeting effector protein targeted to the brain in a lentivirus having a titer of 1×109 transducing units (TU)/ml may be contemplated.

In terms of local delivery to the brain, this can be achieved in various ways. For instance, material can be delivered intrastriatally e.g., by injection. Injection can be performed stereotactically via a craniotomy.

Packaging and Promoters Generally

Ways to package nucleic acid-targeting effector coding nucleic acid molecules, e.g., DNA, into vectors, e.g., viral vectors, to mediate genome modification in vivo include:

To achieve NHEJ-mediated gene knockout:
Single virus vector:
Vector containing two or more expression cassettes:
Promoter-nucleic acid-targeting effector protein coding nucleic acid molecule-terminator
Promoter-guide RNA1-terminator
Promoter-guide RNA (N)-terminator (up to size limit of vector)
Double virus vector:
Vector 1 containing one expression cassette for driving the expression of nucleic acid-targeting effector protein
Promoter-nucleic acid-targeting effector protein coding nucleic acid molecule-terminator
Vector 2 containing one more expression cassettes for driving the expression of one or more guideRNAs
Promoter-guide RNA1-terminator
Promoter-guide RNA1 (N)-terminator (up to size limit of vector)
To mediate homology-directed repair.
In addition to the single and double virus vector approaches described above, an additional vector is used to deliver a homology-direct repair template.

The promoter used to drive nucleic acid-targeting effector protein coding nucleic acid molecule expression can include:

AAV ITR can serve as a promoter: this is advantageous for eliminating the need for an additional promoter element (which can take up space in the vector). The additional space freed up can be used to drive the expression of additional elements (gRNA, etc.). Also, ITR activity is relatively weaker, so can be used to reduce potential toxicity due to over expression of nucleic acid-targeting effector protein.

For ubiquitous expression, can use promoters: CMV, CAG, CBh, PGK, SV40, Ferritin heavy or light chains, etc.

For brain or other CNS expression, can use promoters: SynapsinI for all neurons, CaMKIIalpha for excitatory neurons, GAD67 or GAD65 or VGAT for GABAergic neurons, etc.

For liver expression, can use Albumin promoter.
For lung expression, can use SP-B.
For endothelial cells, can use ICAM.
For hematopoietic cells can use IFNbeta or CD45.
For Osteoblasts can use OG-2.
The promoter used to drive guide RNA can include:
Pol III promoters such as U6 or H1
Use of Pol II promoter and intronic cassettes to express guide RNA Adeno associated virus (AAV)

nucleic acid-targeting effector protein and one or more guide RNA can be delivered using adeno associated virus (AAV), lentivirus, adenovirus or other plasmid or viral vector types, in particular, using formulations and doses from, for example, U.S. Pat. No. 8,454,972 (formulations, doses for adenovirus), U.S. Pat. No. 8,404,658 (formulations, doses for AAV) and U.S. Pat. No. 5,846,946 (formulations, doses for DNA plasmids) and from clinical trials and publications regarding the clinical trials involving lentivirus, AAV and adenovirus. For examples, for AAV, the route of administration, formulation and dose can be as in U.S. Pat. No. 8,454,972 and as in clinical trials involving AAV. For Adenovirus, the route of administration, formulation and dose can be as in U.S. Pat. No. 8,404,658 and as in clinical trials involving adenovirus. For plasmid delivery, the route of administration, formulation and dose can be as in U.S. Pat. No. 5,846,946 and as in clinical studies involving plasmids. Doses may be based on or extrapolated to an average 70 kg individual (e.g., a male adult human), and can be adjusted for patients, subjects, mammals of different weight and species. Frequency of administration is within the ambit of the medical or veterinary practitioner (e.g., physician, veterinarian), depending on usual factors including the age, sex, general health, other conditions of the patient or subject and the particular condition or symptoms being addressed. The viral vectors can be injected into the tissue of interest. For cell-type specific genome/transcriptome modification, the expression of nucleic acid-targeting effector protein can be driven by a cell-type specific promoter. For example, liver-specific expression might use the Albumin promoter and neuron-specific expression (e.g., for targeting CNS disorders) might use the Synapsin I promoter.

In terms of in vivo delivery, AAV is advantageous over other viral vectors for a couple of reasons:

Low toxicity (this may be due to the purification method not requiring ultra centrifugation of cell particles that can activate the immune response) and Low probability of causing insertional mutagenesis because it doesn't integrate into the host genome.

AAV has a packaging limit of 4.5 or 4.75 Kb. This means that nucleic acid-targeting effector protein (e.g., a Type-II CRISPR effector protein such as Cas9, a Type-V CRISPR effector protein such as Cpf1, or a Type-VI CRISPR effector protein such as C2c2 and Cas13b) as well as a promoter and transcription terminator have to be all fit into the same viral vector. Therefore embodiments of the invention include utilizing homologs of nucleic acid-targeting effector protein that are shorter.

As to AAV, the AAV can be AAV1, AAV2, AAV5 or any combination thereof. One can select the AAV of the AAV with regard to the cells to be targeted; e.g., one can select AAV serotypes 1, 2, 5 or a hybrid capsid AAV1, AAV2, AAV5 or any combination thereof for targeting brain or neuronal cells; and one can select AAV4 for targeting cardiac tissue. AAV8 is useful for delivery to the liver. The herein promoters and vectors are preferred individually. A tabulation of certain AAV serotypes as to these cells (see Grimm, D. et al, J. Virol. 82: 5887-5911 (2008)) is as follows:

| Cell Line | AAV-1 | AAV-2 | AAV-3 | AAV-4 | AAV-5 | AAV-6 | AAV-8 | AAV-9 |
|---|---|---|---|---|---|---|---|---|
| Huh-7 | 13 | 100 | 2.5 | 0.0 | 0.1 | 10 | 0.7 | 0.0 |
| HEK293 | 25 | 100 | 2.5 | 0.1 | 0.1 | 5 | 0.7 | 0.1 |

-continued

| Cell Line | AAV-1 | AAV-2 | AAV-3 | AAV-4 | AAV-5 | AAV-6 | AAV-8 | AAV-9 |
|---|---|---|---|---|---|---|---|---|
| HeLa | 3 | 100 | 2.0 | 0.1 | 6.7 | 1 | 0.2 | 0.1 |
| HepG2 | 3 | 100 | 16.7 | 0.3 | 1.7 | 5 | 0.3 | ND |
| Hep1A | 20 | 100 | 0.2 | 1.0 | 0.1 | 1 | 0.2 | 0.0 |
| 911 | 17 | 100 | 11 | 0.2 | 0.1 | 17 | 0.1 | ND |
| CHO | 100 | 100 | 14 | 1.4 | 333 | 50 | 10 | 1.0 |
| COS | 33 | 100 | 33 | 3.3 | 5.0 | 14 | 2.0 | 0.5 |
| MeWo | 10 | 100 | 20 | 0.3 | 6.7 | 10 | 1.0 | 0.2 |
| NIH3T3 | 10 | 100 | 2.9 | 2.9 | 0.3 | 10 | 0.3 | ND |
| A549 | 14 | 100 | 20 | ND | 0.5 | 10 | 0.5 | 0.1 |
| HT1180 | 20 | 100 | 10 | 0.1 | 0.3 | 33 | 0.5 | 0.1 |
| Monocytes | 1111 | 100 | ND | ND | 125 | 1429 | ND | ND |
| Immature DC | 2500 | 100 | ND | ND | 222 | 2857 | ND | ND |
| Mature DC | 2222 | 100 | ND | ND | 333 | 3333 | ND | ND |

Lentivirus

Lentiviruses are complex retroviruses that have the ability to infect and express their genes in both mitotic and post-mitotic cells. The most commonly known lentivirus is the human immunodeficiency virus (HIV), which uses the envelope glycoproteins of other viruses to target a broad range of cell types.

Lentiviruses may be prepared as follows. After cloning pCasES10 (which contains a lentiviral transfer plasmid backbone), HEK293FT at low passage (p=5) were seeded in a T-75 flask to 50% confluence the day before transfection in DMEM with 10% fetal bovine serum and without antibiotics. After 20 hours, media was changed to OptiMEM (serum-free) media and transfection was done 4 hours later. Cells were transfected with 10 μg of lentiviral transfer plasmid (pCasES10) and the following packaging plasmids: 5 μg of pMD2.G (VSV-g pseudotype), and 7.5 ug of psPAX2 (gag/pol/rev/tat). Transfection was done in 4 mL OptiMEM with a cationic lipid delivery agent (50 uL Lipofectamine 2000 and 100 ul Plus reagent). After 6 hours, the media was changed to antibiotic-free DMEM with 10% fetal bovine serum. These methods use serum during cell culture, but serum-free methods are preferred.

Lentivirus may be purified as follows. Viral supernatants were harvested after 48 hours. Supernatants were first cleared of debris and filtered through a 0.45 um low protein binding (PVDF) filter. They were then spun in a ultracentrifuge for 2 hours at 24,000 rpm. Viral pellets were resuspended in 50 ul of DMEM overnight at 4C. They were then aliquoted and immediately frozen at −80° C.

In another embodiment, minimal non-primate lentiviral vectors based on the equine infectious anemia virus (EIAV) are also contemplated, especially for ocular gene therapy (see, e.g., Balagaan, J Gene Med 2006; 8: 275-285). In another embodiment, RetinoStat®, an equine infectious anemia virus-based lentiviral gene therapy vector that expresses angiostatic proteins endostatin and angiostatin that is delivered via a subretinal injection for the treatment of the web form of age-related macular degeneration is also contemplated (see, e.g., Binley et al., HUMAN GENE THERAPY 23:980-991 (September 2012)) and this vector may be modified for the nucleic acid-targeting system of the present invention.

In another embodiment, self-inactivating lentiviral vectors with an siRNA targeting a common exon shared by HIV tat/rev, a nucleolar-localizing TAR decoy, and an anti-CCR5-specific hammerhead ribozyme (see, e.g., DiGiusto et al. (2010) Sci Transl Med 2:36ra43) may be used/and or adapted to the nucleic acid-targeting system of the present invention. A minimum of 2.5×106 CD34+ cells per kilogram patient weight may be collected and prestimulated for 16 to 20 hours in X-VIVO 15 medium (Lonza) containing 2 μmol/L-glutamine, stem cell factor (100 ng/ml), Flt-3 ligand (Flt-3L) (100 ng/ml), and thrombopoietin (10 ng/ml) (CellGenix) at a density of 2×106 cells/ml. Prestimulated cells may be transduced with lentiviral at a multiplicity of infection of 5 for 16 to 24 hours in 75-cm2 tissue culture flasks coated with fibronectin (25 mg/cm2) (RetroNectin, Takara Bio Inc.).

Lentiviral vectors have been disclosed as in the treatment for Parkinson's Disease, see, e.g., US Patent Publication No. 20120295960 and U.S. Pat. Nos. 7,303,910 and 7,351,585. Lentiviral vectors have also been disclosed for the treatment of ocular diseases, see e.g., US Patent Publication Nos. 20060281180, 20090007284, US20110117189; US20090017543; US20070054961, US20100317109. Lentiviral vectors have also been disclosed for delivery to the brain, see, e.g., US Patent Publication Nos. US20110293571; US20110293571, US20040013648, US20070025970, US20090111106 and U.S. Pat. No. 7,259,015.

RNA Delivery

RNA delivery: The nucleic acid-targeting Cas protein (e.g., a Type-II CRISPR effector protein such as Cas9, a Type-V CRISPR effector protein such as Cpf1, or a Type-VI CRISPR effector protein such as C2c2 and Cas13b), and/or guide RNA, can also be delivered in the form of RNA. Nucleic acid-targeting Cas protein (e.g., a Type-II CRISPR effector protein such as Cas9, a Type-V CRISPR effector protein such as Cpf1, or a Type-VI CRISPR effector protein such as C2c2 and Cas13b) mRNA can be generated using in vitro transcription. For example, nucleic acid-targeting effector protein (e.g., a Type-II CRISPR effector protein such as Cas9, a Type-V CRISPR effector protein such as Cpf1, or a Type-VI CRISPR effector protein such as C2c2 and Cas13b) mRNA can be synthesized using a PCR cassette containing the following elements: T7_promoter-kozak sequence (GCCACC)-effector protein-3' UTR from beta globin-polyA tail (a string of 120 or more adenines). The cassette can be used for transcription by T7 polymerase. Guide RNAs can also be transcribed using in vitro transcription from a cassette containing T7_promoter-GG-guide RNA sequence.

To enhance expression and reduce possible toxicity, the nucleic acid-targeting effector protein coding sequence and/or the guide RNA can be modified to include one or more modified nucleoside e.g., using pseudo-U or 5-Methyl-C.

mRNA delivery methods are especially promising for liver delivery currently.

Much clinical work on RNA delivery has focused on RNAi or antisense, but these systems can be adapted for delivery of RNA for implementing the present invention. References below to RNAi etc. should be read accordingly.

Particle delivery systems and/or formulations:

Several types of particle delivery systems and/or formulations are known to be useful in a diverse spectrum of biomedical applications. In general, a particle is defined as a small object that behaves as a whole unit with respect to its transport and properties. Particles are further classified according to diameter. Coarse particles cover a range between 2,500 and 10,000 nanometers. Fine particles are sized between 100 and 2,500 nanometers. Ultrafine particles, or nanoparticles, are generally between 1 and 100 nanometers in size. The basis of the 100-nm limit is the fact that novel properties that differentiate particles from the bulk material typically develop at a critical length scale of under 100 nm.

As used herein, a particle delivery system/formulation is defined as any biological delivery system/formulation which includes a particle in accordance with the present invention. A particle in accordance with the present invention is any entity having a greatest dimension (e.g. diameter) of less than 100 microns (lm). In some embodiments, inventive particles have a greatest dimension of less than 10 lm. In some embodiments, inventive particles have a greatest dimension of less than 2000 nanometers (nm). In some embodiments, inventive particles have a greatest dimension of less than 1000 nanometers (nm). In some embodiments, inventive particles have a greatest dimension of less than 900 nm, 800 nm, 700 nm, 600 nm, 500 nm, 400 nm, 300 nm, 200 nm, or 100 nm. Typically, inventive particles have a greatest dimension (e.g., diameter) of 500 nm or less. In some embodiments, inventive particles have a greatest dimension (e.g., diameter) of 250 nm or less. In some embodiments, inventive particles have a greatest dimension (e.g., diameter) of 200 nm or less. In some embodiments, inventive particles have a greatest dimension (e.g., diameter) of 150 nm or less. In some embodiments, inventive particles have a greatest dimension (e.g., diameter) of 100 nm or less. Smaller particles, e.g., having a greatest dimension of 50 nm or less are used in some embodiments of the invention. In some embodiments, inventive particles have a greatest dimension ranging between 25 nm and 200 nm. Particle characterization (including e.g., characterizing morphology, dimension, etc.) is done using a variety of different techniques. Common techniques are electron microscopy (TEM, SEM), atomic force microscopy (AFM), dynamic light scattering (DLS), X-ray photoelectron spectroscopy (XPS), powder X-ray diffraction (XRD), Fourier transform infrared spectroscopy (FTIR), matrix-assisted laser desorption/ionization time-of-flight mass spectrometry (MALDI-TOF), ultraviolet-visible spectroscopy, dual polarisation interferometry and nuclear magnetic resonance (NMR). Characterization (dimension measurements) may be made as to native particles (i.e., preloading) or after loading of the cargo (herein cargo refers to e.g., one or more components of CRISPR-Cas system e.g., CRISPR enzyme or mRNA or guide RNA, or any combination thereof, and may include additional carriers and/or excipients) to provide particles of an optimal size for delivery for any in vitro, ex vivo and/or in vivo application of the present invention. In certain preferred embodiments, particle dimension (e.g., diameter) characterization is based on measurements using dynamic laser scattering (DLS). Mention is made of U.S. Pat. Nos. 8,709,843; 6,007,845; 5,855,913; 5,985,309; 5,543,158; and the publication by James E. Dahlman and Carmen Barnes et al. Nature Nanotechnology (2014) published online 11 May 2014, doi:10.1038/nnano.2014.84, concerning particles, methods of making and using them and measurements thereof.

Particles delivery systems within the scope of the present invention may be provided in any form, including but not limited to solid, semi-solid, emulsion, or colloidal particles. As such any of the delivery systems described herein, including but not limited to, e.g., lipid-based systems, liposomes, micelles, microvesicles, exosomes, or gene gun may be provided as particle delivery systems within the scope of the present invention.

Particles

CRISPR enzyme mRNA and guide RNA may be delivered simultaneously using particles or lipid envelopes; for instance, CRISPR enzyme and RNA of the invention, e.g., as a complex, can be delivered via a particle as in Dahlman et al., WO2015089419 A2 and documents cited therein, such as 7C1 (see, e.g., James E. Dahlman and Carmen Barnes et al. Nature Nanotechnology (2014) published online 11 May 2014, doi:10.1038/nnano.2014.84), e.g., delivery particle comprising lipid or lipidoid and hydrophilic polymer, e.g., cationic lipid and hydrophilic polymer, for instance wherein the cationic lipid comprises 1,2-dioleoyl-3-trimethylammonium-propane (DOTAP) or 1,2-ditetradecanoyl-sn-glycero-3-phosphocholine (DMPC) and/or wherein the hydrophilic polymer comprises ethylene glycol or polyethylene glycol (PEG); and/or wherein the particle further comprises cholesterol (e.g., particle from formulation 1=DOTAP 100, DMPC 0, PEG 0, Cholesterol 0; formulation number 2=DOTAP 90, DMPC 0, PEG 10, Cholesterol 0; formulation number 3=DOTAP 90, DMPC 0, PEG 5, Cholesterol 5), wherein particles are formed using an efficient, multistep process wherein first, effector protein and RNA are mixed together, e.g., at a 1:1 molar ratio, e.g., at room temperature, e.g., for 30 minutes, e.g., in sterile, nuclease free 1×PBS; and separately, DOTAP, DMPC, PEG, and cholesterol as applicable for the formulation are dissolved in alcohol, e.g., 100% ethanol; and, the two solutions are mixed together to form particles containing the complexes).

Nucleic acid-targeting effector proteins (e.g., a Type-II CRISPR effector protein such as Cas9, a Type-V CRISPR effector protein such as Cpf1, or a Type-VI CRISPR effector protein such as C2c2 and Cas13b) mRNA and guide RNA may be delivered simultaneously using particles or lipid envelopes.

For example, Su X, Fricke J, Kavanagh D G, Irvine D J ("In vitro and in vivo mRNA delivery using lipid-enveloped pH-responsive polymer nanoparticles" Mol Pharm. 2011 Jun. 6; 8(3):774-87. doi: 10.1021/mp100390w. Epub 2011 Apr. 1) describes biodegradable core-shell structured particles with a poly(β-amino ester) (PBAE) core enveloped by a phospholipid bilayer shell. These were developed for in vivo mRNA delivery. The pH-responsive PBAE component was chosen to promote endosome disruption, while the lipid surface layer was selected to minimize toxicity of the polycation core. Such are, therefore, preferred for delivering RNA of the present invention.

In one embodiment, particles based on self-assembling bioadhesive polymers are contemplated, which may be applied to oral delivery of peptides, intravenous delivery of peptides and nasal delivery of peptides, all to the brain. Other embodiments, such as oral absorption and ocular delivery of hydrophobic drugs are also contemplated. The molecular envelope technology involves an engineered polymer envelope which is protected and delivered to the site of the disease (see, e.g., Mazza, M. et al. ACSNano, 2013. 7(2): 1016-1026; Siew, A., et al. Mol Pharm, 2012. 9(1):14-28; Lalatsa, A., et al. J Contr Rel, 2012. 161(2):523-36; Lalatsa, A., et al., Mol Pharm, 2012. 9(6):1665-80; Lalatsa, A., et al. Mol Pharm, 2012. 9(6):1764-74; Garrett, N. L., et al. J Biophotonics, 2012. 5(5-6):458-68; Garrett, N. L., et al. J Raman Spect, 2012. 43(5):681-688; Ahmad, S., et al. J Royal Soc Interface 2010. 7:S423-33; Uchegbu, I. F. Expert Opin Drug Deliv, 2006. 3(5):629-40; Qu, X., et al. Biomacromolecules, 2006. 7(12):3452-9 and Uchegbu, I. F., et al. Int J Pharm, 2001.224:185-199). Doses of about 5 mg/kg are contemplated, with single or multiple doses, depending on the target tissue.

In one embodiment, particles that can deliver RNA to a cancer cell to stop tumor growth developed by Dan Anderson's lab at MIT may be used/and or adapted to the nucleic acid-targeting system of the present invention. In particular, the Anderson lab developed fully automated, combinatorial systems for the synthesis, purification, characterization, and formulation of new biomaterials and nanoformulations. See, e.g., Alabi et al., Proc Natl Acad Sci USA. 2013 Aug. 6; 110(32):12881-6; Zhang et al., Adv Mater. 2013 Sep. 6; 25(33):4641-5;

Jiang et al., Nano Lett. 2013 Mar. 13; 13(3):1059-64; Karagiannis et al., ACS Nano. 2012 Oct. 23; 6(10):8484-7; Whitehead et al., ACS Nano. 2012 Aug. 28; 6(8):6922-9 and Lee et al., Nat Nanotechnol. 2012 Jun. 3; 7(6):389-93.

US patent application 20110293703 relates to lipidoid compounds are also particularly useful in the administration of polynucleotides, which may be applied to deliver the nucleic acid-targeting system of the present invention. In one aspect, the aminoalcohol lipidoid compounds are combined with an agent to be delivered to a cell or a subject to form microparticles, nanoparticles, liposomes, or micelles. The agent to be delivered by the particles, liposomes, or micelles may be in the form of a gas, liquid, or solid, and the agent may be a polynucleotide, protein, peptide, or small molecule. The aminoalcohol lipidoid compounds may be combined with other aminoalcohol lipidoid compounds, polymers (synthetic or natural), surfactants, cholesterol, carbohydrates, proteins, lipids, etc. to form the particles. These particles may then optionally be combined with a pharmaceutical excipient to form a pharmaceutical composition.

US Patent Publication No. 20110293703 also provides methods of preparing the aminoalcohol lipidoid compounds. One or more equivalents of an amine are allowed to react with one or more equivalents of an epoxide-terminated compound under suitable conditions to form an aminoalcohol lipidoid compound of the present invention. In certain embodiments, all the amino groups of the amine are fully reacted with the epoxide-terminated compound to form tertiary amines. In other embodiments, all the amino groups of the amine are not fully reacted with the epoxide-terminated compound to form tertiary amines thereby resulting in primary or secondary amines in the aminoalcohol lipidoid compound. These primary or secondary amines are left as is or may be reacted with another electrophile such as a different epoxide-terminated compound. As will be appreciated by one skilled in the art, reacting an amine with less than excess of epoxide-terminated compound will result in a plurality of different aminoalcohol lipidoid compounds with various numbers of tails. Certain amines may be fully functionalized with two epoxide-derived compound tails while other molecules will not be completely functionalized with epoxide-derived compound tails. For example, a diamine or polyamine may include one, two, three, or four epoxide-derived compound tails off the various amino moieties of the molecule resulting in primary, secondary, and tertiary amines. In certain embodiments, all the amino groups are not fully functionalized. In certain embodiments, two of the same types of epoxide-terminated compounds are used. In other embodiments, two or more different epoxide-terminated compounds are used. The synthesis of the aminoalcohol lipidoid compounds is performed with or without solvent, and the synthesis may be performed at higher temperatures ranging from 30-100° C., preferably at approximately 50-90° C. The prepared aminoalcohol lipidoid compounds may be optionally purified. For example, the mixture of aminoalcohol lipidoid compounds may be purified to yield an aminoalcohol lipidoid compound with a particular number of epoxide-derived compound tails. Or the mixture may be purified to yield a particular stereo- or regioisomer. The aminoalcohol lipidoid compounds may also be alkylated using an alkyl halide (e.g., methyl iodide) or other alkylating agent, and/or they may be acylated.

US Patent Publication No. 20110293703 also provides libraries of aminoalcohol lipidoid compounds prepared by the inventive methods. These aminoalcohol lipidoid compounds may be prepared and/or screened using high-throughput techniques involving liquid handlers, robots, microtiter plates, computers, etc. In certain embodiments, the aminoalcohol lipidoid compounds are screened for their ability to transfect polynucleotides or other agents (e.g., proteins, peptides, small molecules) into the cell.

US Patent Publication No. 20130302401 relates to a class of poly(beta-amino alcohols) (PBAAs) has been prepared using combinatorial polymerization. The inventive PBAAs may be used in biotechnology and biomedical applications as coatings (such as coatings of films or multilayer films for medical devices or implants), additives, materials, excipients, non-biofouling agents, micropatterning agents, and cellular encapsulation agents. When used as surface coatings, these PBAAs elicited different levels of inflammation, both in vitro and in vivo, depending on their chemical structures. The large chemical diversity of this class of materials allowed us to identify polymer coatings that inhibit macrophage activation in vitro. Furthermore, these coatings reduce the recruitment of inflammatory cells, and reduce fibrosis, following the subcutaneous implantation of carboxylated polystyrene microparticles. These polymers may be used to form polyelectrolyte complex capsules for cell encapsulation. The invention may also have many other biological applications such as antimicrobial coatings, DNA or siRNA delivery, and stem cell tissue engineering. The teachings of US Patent Publication No. 20130302401 may be applied to the nucleic acid-targeting system of the present invention.

In another embodiment, lipid nanoparticles (LNPs) are contemplated. An antitransthyretin small interfering RNA has been encapsulated in lipid nanoparticles and delivered to humans (see, e.g., Coelho et al., N Engl J Med 2013; 369:819-29), and such a system may be adapted and applied to the nucleic acid-targeting system of the present invention. Doses of about 0.01 to about 1 mg per kg of body weight administered intravenously are contemplated. Medications to reduce the risk of infusion-related reactions are contemplated, such as dexamethasone, acetaminophen, diphenhydramine or cetirizine, and ranitidine are contemplated. Multiple doses of about 0.3 mg per kilogram every 4 weeks for five doses are also contemplated.

LNPs have been shown to be highly effective in delivering siRNAs to the liver (see, e.g., Tabernero et al., Cancer Discovery, April 2013, Vol. 3, No. 4, pages 363-470) and are therefore contemplated for delivering RNA encoding nucleic acid-targeting effector protein to the liver. A dosage of about four doses of 6 mg/kg of the LNP every two weeks may be contemplated. Tabernero et al. demonstrated that tumor regression was observed after the first 2 cycles of LNPs dosed at 0.7 mg/kg, and by the end of 6 cycles the patient had achieved a partial response with complete regression of the lymph node metastasis and substantial shrinkage of the liver tumors. A complete response was obtained after 40 doses in this patient, who has remained in remission and completed treatment after receiving doses over 26 months. Two patients with RCC and extrahepatic sites of disease including kidney, lung, and lymph nodes that were progressing following prior therapy with VEGF pathway inhibitors had stable disease at all sites for approximately 8 to 12 months, and a patient with PNET and liver metastases continued on the extension study for 18 months (36 doses) with stable disease.

However, the charge of the LNP must be taken into consideration. As cationic lipids combined with negatively charged lipids to induce nonbilayer structures that facilitate intracellular delivery. Because charged LNPs are rapidly cleared from circulation following intravenous injection, ionizable cationic lipids with pKa values below 7 were developed (see, e.g., Rosin et al, Molecular Therapy, vol. 19, no. 12, pages 1286-2200, December 2011). Negatively charged polymers such as RNA may be loaded into LNPs at low pH values (e.g., pH 4) where the ionizable lipids display a positive charge. However, at physiological pH values, the LNPs exhibit a low surface charge compatible with longer circulation times. Four species of ionizable cationic lipids have been focused upon, namely 1,2-dilinoleoyl-3-dimethylammonium-propane (DLinDAP), 1,2-dilinoleyloxy-3-N,N-dimethylaminopropane (DLinDMA), 1,2-dilinoleyloxyketo-N,N-dimethyl-3-aminopropane (DLinKDMA), and 1,2-dilinoleyl-4-(2-dimethylaminoethyl)-[1,3]-dioxolane (DLinKC2-DMA). It has been shown that LNP siRNA systems containing these lipids exhibit remarkably different gene silencing properties in hepatocytes in vivo, with potencies varying according to the series DLinKC2-DMA>DLinKDMA>DLinDMA>>DLinDAP employing a Factor VII gene silencing model (see, e.g., Rosin et al, Molecular Therapy, vol. 19, no. 12, pages 1286-2200, December 2011). A dosage of 1 µg/ml of LNP or CRISPR-Cas RNA in or associated with the LNP may be contemplated, especially for a formulation containing DLinKC2-DMA.

Preparation of LNPs and CRISPR-Cas encapsulation may be used/and or adapted from Rosin et al, Molecular Therapy, vol. 19, no. 12, pages 1286-2200, December 2011). The cationic lipids 1,2-dilinoleoyl-3-dimethylammonium-propane (DLinDAP), 1,2-dilinoleyloxy-3-N,N-dimethylaminopropane (DLinDMA), 1,2-dilinoleyloxyketo-N,N-dimethyl-3-aminopropane (DLinK-DMA), 1,2-dilinoleyl-4-(2-dimethylaminoethyl)-[1,3]-dioxolane (DLinKC2-DMA), (3-o-[2"-(methoxypolyethyleneglycol 2000) succinoyl]-1,2-dimyristoyl-sn-glycol (PEG-S-DMG), and R-3-[(ω-methoxy-poly(ethylene glycol)2000) carbamoyl]-1,2-dimyristyloxypropyl-3-amine (PEG-C-DOMG) may be provided by Tekmira Pharmaceuticals (Vancouver, Canada) or synthesized. Cholesterol may be purchased from Sigma (St Louis, MO). The specific nucleic acid-targeting complex (CRISPR-Cas) RNA may be encapsulated in LNPs containing DLinDAP, DLinDMA, DLinK-DMA, and DLinKC2-DMA (cationic lipid:DSPC:CHOL: PEGS-DMG or PEG-C-DOMG at 40:10:40:10 molar ratios). When required, 0.2% SP-DiOC18 (Invitrogen, Burlington, Canada) may be incorporated to assess cellular uptake, intracellular delivery, and biodistribution. Encapsulation may be performed by dissolving lipid mixtures comprised of cationic lipid:DSPC: cholesterol:PEG-c-DOMG (40:10:40:10 molar ratio) in ethanol to a final lipid concentration of 10 mmol/l. This ethanol solution of lipid may be added drop-wise to 50 mmol/l citrate, pH 4.0 to form multilamellar vesicles to produce a final concentration of 30% ethanol vol/vol. Large unilamellar vesicles may be formed following extrusion of multilamellar vesicles through two stacked 80 nm Nuclepore polycarbonate filters using the Extruder (Northern Lipids, Vancouver, Canada). Encapsulation may be achieved by adding RNA dissolved at 2 mg/ml in 50 mmol/l citrate, pH 4.0 containing 30% ethanol vol/vol drop-wise to extruded preformed large unilamellar vesicles and incubation at 31° C. for 30 minutes with constant mixing to a final RNA/lipid weight ratio of 0.06/1 wt/wt. Removal of ethanol and neutralization of formulation buffer were performed by dialysis against phosphate-buffered saline (PBS), pH 7.4 for 16 hours using Spectra/Por 2 regenerated cellulose dialysis membranes. Particle size distribution may be determined by dynamic light scattering using a NICOMP 370 particle sizer, the vesicle/intensity modes, and Gaussian fitting (Nicomp Particle Sizing, Santa Barbara, CA). The particle size for all three LNP systems may be ~70 nm in diameter. RNA encapsulation efficiency may be determined by removal of free RNA using VivaPureD MiniH columns (Sartorius Stedim Biotech) from samples collected before and after dialysis. The encapsulated RNA may be extracted from the eluted particles and quantified at 260 nm. RNA to lipid ratio was determined by measurement of cholesterol content in vesicles using the Cholesterol E enzymatic assay from Wako Chemicals USA (Richmond, VA). In conjunction with the herein discussion of LNPs and PEG lipids, PEGylated liposomes or LNPs are likewise suitable for delivery of a nucleic acid-targeting system or components thereof.

Preparation of large LNPs may be used/and or adapted from Rosin et al, Molecular Therapy, vol. 19, no. 12, pages 1286-2200, December 2011. A lipid premix solution (20.4 mg/ml total lipid concentration) may be prepared in ethanol containing DLinKC2-DMA, DSPC, and cholesterol at 50:10:38.5 molar ratios. Sodium acetate may be added to the lipid premix at a molar ratio of 0.75:1 (sodium acetate: DLinKC2-DMA). The lipids may be subsequently hydrated by combining the mixture with 1.85 volumes of citrate buffer (10 mmol/l, pH 3.0) with vigorous stirring, resulting in spontaneous liposome formation in aqueous buffer containing 35% ethanol. The liposome solution may be incubated at 37° C. to allow for time-dependent increase in particle size. Aliquots may be removed at various times during incubation to investigate changes in liposome size by dynamic light scattering (Zetasizer Nano ZS, Malvern Instruments, Worcestershire, UK). Once the desired particle size is achieved, an aqueous PEG lipid solution (stock=10 mg/ml PEG-DMG in 35% (vol/vol) ethanol) may be added to the liposome mixture to yield a final PEG molar concentration of 3.5% of total lipid. Upon addition of PEG-lipids, the liposomes should their size, effectively quenching further growth. RNA may then be added to the empty liposomes at a RNA to total lipid ratio of approximately 1:10 (wt:wt), followed by incubation for 30 minutes at 37° C. to form loaded LNPs. The mixture may be subsequently dialyzed overnight in PBS and filtered with a 0.45-µm syringe filter.

Spherical Nucleic Acid (SNA™) constructs and other particles (particularly gold particles) are also contemplated as a means to delivery nucleic acid-targeting system to intended targets. Significant data show that AuraSense Therapeutics' Spherical Nucleic Acid (SNA™) constructs, based upon nucleic acid-functionalized gold particles, are useful.

Literature that may be employed in conjunction with herein teachings include: Cutler et al., J. Am. Chem. Soc. 2011 133:9254-9257, Hao et al., Small. 2011 7:3158-3162, Zhang et al., ACS Nano. 2011 5:6962-6970, Cutler et al., J. Am. Chem. Soc. 2012 134:1376-1391, Young et al., Nano Lett. 2012 12:3867-71, Zheng et al., Proc. Natl. Acad. Sci. USA. 2012 109:11975-80, Mirkin, Nanomedicine 2012 7:635-638 Zhang et al., J. Am. Chem. Soc. 2012 134:16488-1691, Weintraub, Nature 2013 495:S14-S16, Choi et al., Proc. Natl. Acad. Sci. USA. 2013 110(19):7625-7630, Jensen et al., Sci. Transl. Med. 5, 209ra152 (2013) and Mirkin, et al., Small, 10:186-192.

Self-assembling particles with RNA may be constructed with polyethyleneimine (PEI) that is PEGylated with an Arg-Gly-Asp (RGD) peptide ligand attached at the distal end of the polyethylene glycol (PEG). This system has been used, for example, as a means to target tumor neovasculature expressing integrins and deliver siRNA inhibiting vascular endothelial growth factor receptor-2 (VEGF R2) expression and thereby achieve tumor angiogenesis (see, e.g., Schiffelers et al., Nucleic Acids Research, 2004, Vol. 32, No. 19). Nanoplexes may be prepared by mixing equal volumes of aqueous solutions of cationic polymer and nucleic acid to give a net molar excess of ionizable nitrogen (polymer) to phosphate (nucleic acid) over the range of 2 to 6. The electrostatic interactions between cationic polymers and nucleic acid resulted in the formation of polyplexes with average particle size distribution of about 100 nm, hence referred to here as nanoplexes. A dosage of about 100 to 200 mg of nucleic acid-targeting complex RNA is envisioned for delivery in the self-assembling particles of Schiffelers et al.

The nanoplexes of Bartlett et al. (PNAS, Sep. 25, 2007, vol. 104, no. 39) may also be applied to the present invention. The nanoplexes of Bartlett et al. are prepared by mixing equal volumes of aqueous solutions of cationic polymer and nucleic acid to give a net molar excess of ionizable nitrogen (polymer) to phosphate (nucleic acid) over the range of 2 to 6. The electrostatic interactions between cationic polymers and nucleic acid resulted in the formation of polyplexes with average particle size distribution of about 100 nm, hence referred to here as nanoplexes. The DOTA-siRNA of Bartlett et al. was synthesized as follows: 1,4,7,10-tetraazacyclodo-decane-1,4,7,10-tetraacetic acid mono(N-hydroxysuccinimide ester) (DOTA-NHSester) was ordered from Macrocyclics (Dallas, TX). The amine modified RNA sense strand with a 100-fold molar excess of DOTA-NHS-ester in carbonate buffer (pH 9) was added to a microcentrifuge tube. The contents were reacted by stirring for 4 h at room temperature. The DOTA-RNAsense conjugate was ethanol-precipitated, resuspended in water, and annealed to the unmodified antisense strand to yield DOTA-siRNA. All liquids were pretreated with Chelex-100 (Bio-Rad, Hercules, CA) to remove trace metal contaminants. Tf-targeted and nontargeted siRNA particles may be formed by using cyclodextrin-containing polycations. Typically, particles were formed in water at a charge ratio of 3 (+/−) and an siRNA concentration of 0.5 g/liter. One percent of the adamantane-PEG molecules on the surface of the targeted particles were modified with Tf (adamantane-PEG-Tf). The particles were suspended in a 5% (wt/vol) glucose carrier solution for injection.

Davis et al. (Nature, Vol 464, 15 Apr. 2010) conducts a RNA clinical trial that uses a targeted particle-delivery system (clinical trial registration number NCT00689065). Patients with solid cancers refractory to standard-of-care therapies are administered doses of targeted particles on days 1, 3, 8 and 10 of a 21-day cycle by a 30-min intravenous infusion. The particles comprise, consist essentially of, or consist of a synthetic delivery system containing: (1) a linear, cyclodextrin-based polymer (CDP), (2) a human transferrin protein (TF) targeting ligand displayed on the exterior of the nanoparticle to engage TF receptors (TFR) on the surface of the cancer cells, (3) a hydrophilic polymer (polyethylene glycol (PEG) used to promote nanoparticle stability in biological fluids), and (4) siRNA designed to reduce the expression of the RRM2 (sequence used in the clinic was previously denoted siR2B+5). The TFR has long been known to be upregulated in malignant cells, and RRM2 is an established anti-cancer target. These particles (clinical version denoted as CALAA-01) have been shown to be well tolerated in multi-dosing studies in non-human primates. Although a single patient with chronic myeloid leukaemia has been administered siRNA by liposomal delivery, Davis et al.'s clinical trial is the initial human trial to systemically deliver siRNA with a targeted delivery system and to treat patients with solid cancer. To ascertain whether the targeted delivery system can provide effective delivery of functional siRNA to human tumours, Davis et al. investigated biopsies from three patients from three different dosing cohorts; patients A, B and C, all of whom had metastatic melanoma and received CALAA-01 doses of 18, 24 and 30 mg m-2 siRNA, respectively. Similar doses may also be contemplated for the nucleic acid-targeting system of the present invention. The delivery of the invention may be achieved with particles containing a linear, cyclodextrin-based polymer (CDP), a human transferrin protein (TF) targeting ligand displayed on the exterior of the particle to engage TF receptors (TFR) on the surface of the cancer cells and/or a hydrophilic polymer (for example, polyethylene glycol (PEG) used to promote particle stability in biological fluids).

In terms of this invention, it is preferred to have one or more components of nucleic acid-targeting complex, e.g., nucleic acid-targeting effector protein or mRNA, or guide RNA delivered using particles or lipid envelopes. Other delivery systems or vectors are may be used in conjunction with the particle aspects of the invention.

In general, a "nanoparticle" refers to any particle having a diameter of less than 1000 nm. In certain preferred embodiments, nanoparticles of the invention have a greatest dimension (e.g., diameter) of 500 nm or less. In other preferred embodiments, nanoparticles of the invention have a greatest dimension ranging between 25 nm and 200 nm. In other preferred embodiments, particles of the invention have a greatest dimension of 100 nm or less. In other preferred embodiments, nanoparticles of the invention have a greatest dimension ranging between 35 nm and 60 nm.

Particles encompassed in the present invention may be provided in different forms, e.g., as solid particles (e.g., metal such as silver, gold, iron, titanium), non-metal, lipid-based solids, polymers), suspensions of particles, or combinations thereof. Metal, dielectric, and semiconductor particles may be prepared, as well as hybrid structures (e.g., core-shell particles). Particles made of semiconducting material may also be labeled quantum dots if they are small enough (typically sub 10 nm) that quantization of electronic energy levels occurs. Such nanoscale particles are used in biomedical applications as drug carriers or imaging agents and may be adapted for similar purposes in the present invention.

Semi-solid and soft particles have been manufactured, and are within the scope of the present invention. A prototype particle of semi-solid nature is the liposome. Various types of liposome particles are currently used clinically as delivery systems for anticancer drugs and vaccines. Particles with one half hydrophilic and the other half hydrophobic are termed Janus particles and are particularly effective for stabilizing emulsions. They can self-assemble at water/oil interfaces and act as solid surfactants.

U.S. Pat. No. 8,709,843, incorporated herein by reference, provides a drug delivery system for targeted delivery of therapeutic agent-containing particles to tissues, cells, and intracellular compartments. The invention provides targeted particles comprising polymer conjugated to a surfactant, hydrophilic polymer or lipid.

U.S. Pat. No. 6,007,845, incorporated herein by reference, provides particles which have a core of a multiblock copolymer formed by covalently linking a multifunctional compound with one or more hydrophobic polymers and one or more hydrophilic polymers, and contain a biologically active material.

U.S. Pat. No. 5,855,913, incorporated herein by reference, provides a particulate composition having aerodynamically light particles having a tap density of less than 0.4 g/cm3 with a mean diameter of between 5 µm and 30 µm, incorporating a surfactant on the surface thereof for drug delivery to the pulmonary system.

U.S. Pat. No. 5,985,309, incorporated herein by reference, provides particles incorporating a surfactant and/or a hydrophilic or hydrophobic complex of a positively or negatively charged therapeutic or diagnostic agent and a charged molecule of opposite charge for delivery to the pulmonary system.

U.S. Pat. No. 5,543,158, incorporated herein by reference, provides biodegradable injectable particles having a biodegradable solid core containing a biologically active material and poly(alkylene glycol) moieties on the surface.

WO2012135025 (also published as US20120251560), incorporated herein by reference, describes conjugated polyethyleneimine (PEI) polymers and conjugated aza-macrocycles (collectively referred to as "conjugated lipomer" or "lipomers"). In certain embodiments, it can be envisioned that such methods and materials of herein-cited documents, e.g., conjugated lipomers can be used in the context of the nucleic acid-targeting system to achieve in vitro, ex vivo and in vivo genomic perturbations to modify gene expression, including modulation of protein expression.

In one embodiment, the particle may be epoxide-modified lipid-polymer, advantageously 7C1 (see, e.g., James E. Dahlman and Carmen Barnes et al. Nature Nanotechnology (2014) published online 11 May 2014, doi:10.1038/nnano.2014.84). C71 was synthesized by reacting C15 epoxide-terminated lipids with PEI600 at a 14:1 molar ratio, and was formulated with C14PEG2000 to produce particles (diameter between 35 and 60 nm) that were stable in PBS solution for at least 40 days.

An epoxide-modified lipid-polymer may be utilized to deliver the nucleic acid-targeting system of the present invention to pulmonary, cardiovascular or renal cells, however, one of skill in the art may adapt the system to deliver to other target organs. Dosage ranging from about 0.05 to about 0.6 mg/kg are envisioned. Dosages over several days or weeks are also envisioned, with a total dosage of about 2 mg/kg.

Exosomes

Exosomes are endogenous nano-vesicles that transport RNAs and proteins, and which can deliver RNA to the brain and other target organs. To reduce immunogenicity, Alvarez-Erviti et al. (2011, Nat Biotechnol 29: 341) used self-derived dendritic cells for exosome production. Targeting to the brain was achieved by engineering the dendritic cells to express Lamp2b, an exosomal membrane protein, fused to the neuron-specific RVG peptide. Purified exosomes were loaded with exogenous RNA by electroporation. Intravenously injected RVG-targeted exosomes delivered GAPDH siRNA specifically to neurons, microglia, oligodendrocytes in the brain, resulting in a specific gene knockdown. Pre-exposure to RVG exosomes did not attenuate knockdown, and non-specific uptake in other tissues was not observed. The therapeutic potential of exosome-mediated siRNA delivery was demonstrated by the strong mRNA (60%) and protein (62%) knockdown of BACE1, a therapeutic target in Alzheimer's disease.

To obtain a pool of immunologically inert exosomes, Alvarez-Erviti et al. harvested bone marrow from inbred C57BL/6 mice with a homogenous major histocompatibility complex (MHC) haplotype. As immature dendritic cells produce large quantities of exosomes devoid of T cell activators such as MHC-II and CD86, Alvarez-Erviti et al. selected for dendritic cells with granulocyte/macrophage-colony stimulating factor (GM-CSF) for 7 d. Exosomes were purified from the culture supernatant the following day using well-established ultracentrifugation protocols. The exosomes produced were physically homogenous, with a size distribution peaking at 80 nm in diameter as determined by particle tracking analysis (NTA) and electron microscopy. Alvarez-Erviti et al. obtained 6-12 µg of exosomes (measured based on protein concentration) per 106 cells.

Next, Alvarez-Erviti et al. investigated the possibility of loading modified exosomes with exogenous cargoes using electroporation protocols adapted for nanoscale applications. As electroporation for membrane particles at the nanometer scale is not well-characterized, nonspecific Cy5-labeled RNA was used for the empirical optimization of the electroporation protocol. The amount of encapsulated RNA was assayed after ultracentrifugation and lysis of exosomes. Electroporation at 400 V and 125 µF resulted in the greatest retention of RNA and was used for all subsequent experiments.

Alvarez-Erviti et al. administered 150 µg of each BACE1 siRNA encapsulated in 150 µg of RVG exosomes to normal C57BL/6 mice and compared the knockdown efficiency to four controls: untreated mice, mice injected with RVG exosomes only, mice injected with BACE1 siRNA complexed to an in vivo cationic liposome reagent and mice injected with BACE1 siRNA complexed to RVG-9R, the RVG peptide conjugated to 9 D-arginines that electrostatically binds to the siRNA. Cortical tissue samples were analyzed 3 d after administration and a significant protein knockdown (45%, P<0.05, versus 62%, P<0.01) in both siRNA-RVG-9R-treated and siRNA-RVG exosome-treated mice was observed, resulting from a significant decrease in BACE1 mRNA levels (66% [+ or −] 15%, P<0.001 and 61% [+ or −]13% respectively, P<0.01). Moreover, Applicants demonstrated a significant decrease (55%, P<0.05) in the total [beta]-amyloid 1-42 levels, a main component of the amyloid plaques in Alzheimer's pathology, in the RVG-exosome-treated animals. The decrease observed was greater than the β-amyloid 1-40 decrease demonstrated in normal mice after intraventricular injection of BACE1 inhibitors. Alvarez-Erviti et al. carried out 5'-rapid amplification of cDNA ends (RACE) on BACE1 cleavage product, which provided evidence of RNAi-mediated knockdown by the siRNA.

Finally, Alvarez-Erviti et al. investigated whether RNA-RVG exosomes induced immune responses in vivo by assessing IL-6, IP-10, TNFα and IFN-α serum concentrations. Following exosome treatment, nonsignificant changes in all cytokines were registered similar to siRNA-transfection reagent treatment in contrast to siRNA-RVG-9R, which potently stimulated IL-6 secretion, confirming the immunologically inert profile of the exosome treatment. Given that exosomes encapsulate only 20% of siRNA, delivery with RVG-exosome appears to be more efficient than RVG-9R delivery as comparable mRNA knockdown and greater protein knockdown was achieved with fivefold less siRNA without the corresponding level of immune stimulation. This experiment demonstrated the therapeutic potential of RVG-exosome technology, which is potentially suited for long-term silencing of genes related to neurodegenerative diseases. The exosome delivery system of Alvarez-Erviti et al. may be applied to deliver the nucleic acid-targeting system of the present invention to therapeutic targets, especially neurodegenerative diseases. A dosage of about 100 to 1000 mg of nucleic acid-targeting system encapsulated in about 100 to 1000 mg of RVG exosomes may be contemplated for the present invention.

El-Andaloussi et al. (Nature Protocols 7,2112-2126 (2012)) discloses how exosomes derived from cultured cells can be harnessed for delivery of RNA in vitro and in vivo. This protocol first describes the generation of targeted exosomes through transfection of an expression vector, comprising an exosomal protein fused with a peptide ligand. Next, El-Andaloussi et al. explain how to purify and characterize exosomes from transfected cell supernatant. Next, El-Andaloussi et al. detail crucial steps for loading RNA into exosomes. Finally, El-Andaloussi et al. outline how to use exosomes to efficiently deliver RNA in vitro and in vivo in mouse brain. Examples of anticipated results in which exosome-mediated RNA delivery is evaluated by functional assays and imaging are also provided. The entire protocol takes ~3 weeks. Delivery or administration according to the invention may be performed using exosomes produced from self-derived dendritic cells. From the herein teachings, this can be employed in the practice of the invention In another embodiment, the plasma exosomes of Wahlgren et al. (Nucleic Acids Research, 2012, Vol. 40, No. 17 e130) are contemplated. Exosomes are nano-sized vesicles (30-90 nm in size) produced by many cell types, including dendritic cells (DC), B cells, T cells, mast cells, epithelial cells and tumor cells. These vesicles are formed by inward budding of late endosomes and are then released to the extracellular environment upon fusion with the plasma membrane. Because exosomes naturally carry RNA between cells, this property may be useful in gene therapy, and from this disclosure can be employed in the practice of the instant invention.

Exosomes from plasma can be prepared by centrifugation of buffy coat at 900 g for 20 min to isolate the plasma followed by harvesting cell supernatants, centrifuging at 300 g for 10 min to eliminate cells and at 16 500 g for 30 min followed by filtration through a 0.22 mm filter. Exosomes are pelleted by ultracentrifugation at 120 000 g for 70 min. Chemical transfection of siRNA into exosomes is carried out according to the manufacturer's instructions in RNAi Human/Mouse Starter Kit (Quiagen, Hilden, Germany). siRNA is added to 100 ml PBS at a final concentration of 2 mmol/ml. After adding HiPerFect transfection reagent, the mixture is incubated for 10 min at RT. In order to remove the excess of micelles, the exosomes are re-isolated using aldehyde/sulfate latex beads. The chemical transfection of nucleic acid-targeting system into exosomes may be conducted similarly to siRNA. The exosomes may be co-cultured with monocytes and lymphocytes isolated from the peripheral blood of healthy donors. Therefore, it may be contemplated that exosomes containing nucleic acid-targeting system may be introduced to monocytes and lymphocytes of and autologously reintroduced into a human. Accordingly, delivery or administration according to the invention may be performed using plasma exosomes.

Liposomes

Delivery or administration according to the invention can be performed with liposomes. Liposomes are spherical vesicle structures composed of a uni- or multilamellar lipid bilayer surrounding internal aqueous compartments and a relatively impermeable outer lipophilic phospholipid bilayer. Liposomes have gained considerable attention as drug delivery carriers because they are biocompatible, nontoxic, can deliver both hydrophilic and lipophilic drug molecules, protect their cargo from degradation by plasma enzymes, and transport their load across biological membranes and the blood brain barrier (BBB) (see, e.g., Spuch and Navarro, Journal of Drug Delivery, vol. 2011, Article ID 469679, 12 pages, 2011. doi:10.1155/2011/469679 for review).

Liposomes can be made from several different types of lipids; however, phospholipids are most commonly used to generate liposomes as drug carriers. Although liposome formation is spontaneous when a lipid film is mixed with an aqueous solution, it can also be expedited by applying force in the form of shaking by using a homogenizer, sonicator, or an extrusion apparatus (see, e.g., Spuch and Navarro, Journal of Drug Delivery, vol. 2011, Article ID 469679, 12 pages, 2011. doi:10.1155/2011/469679 for review).

Several other additives may be added to liposomes in order to modify their structure and properties. For instance, either cholesterol or sphingomyelin may be added to the liposomal mixture in order to help stabilize the liposomal structure and to prevent the leakage of the liposomal inner cargo. Further, liposomes are prepared from hydrogenated egg phosphatidylcholine or egg phosphatidylcholine, cholesterol, and diacetyl phosphate, and their mean vesicle sizes were adjusted to about 50 and 100 nm. (see, e.g., Spuch and Navarro, Journal of Drug Delivery, vol. 2011, Article ID 469679, 12 pages, 2011. doi:10.1155/2011/469679 for review).

A liposome formulation may be mainly comprised of natural phospholipids and lipids such as 1,2-distearoyl-sn-glycero-3-phosphatidyl choline (DSPC), sphingomyelin, egg phosphatidylcholines and monosialoganglioside. Since this formulation is made up of phospholipids only, liposomal formulations have encountered many challenges, one of the ones being the instability in plasma. Several attempts to overcome these challenges have been made, specifically in the manipulation of the lipid membrane. One of these attempts focused on the manipulation of cholesterol. Addition of cholesterol to conventional formulations reduces rapid release of the encapsulated bioactive compound into the plasma or 1,2-dioleoyl-sn-glycero-3-phosphoethanolamine (DOPE) increases the stability (see, e.g., Spuch and Navarro, Journal of Drug Delivery, vol. 2011, Article ID 469679, 12 pages, 2011. doi:10.1155/2011/469679 for review).

In a particularly advantageous embodiment, Trojan Horse liposomes (also known as Molecular Trojan Horses) are desirable and protocols may be found at cshprotocols.cshlp.org/content/2010/4/pdb.prot5407.long. These particles allow delivery of a transgene to the entire brain after an intravascular injection. Without being bound by limitation, it is believed that neutral lipid particles with specific antibodies conjugated to surface allow crossing of the blood brain barrier via endocytosis. Applicant postulates utilizing Trojan Horse Liposomes to deliver the CRISPR family of nucleases to the brain via an intravascular injection, which would allow whole brain transgenic animals without the need for embryonic manipulation. About 1-5 g of DNA or RNA may be contemplated for in vivo administration in liposomes.

In another embodiment, the nucleic acid-targeting system or components thereof may be administered in liposomes, such as a stable nucleic-acid-lipid particle (SNALP) (see, e.g., Morrissey et al., Nature Biotechnology, Vol. 23, No. 8, August 2005). Daily intravenous injections of about 1, 3 or 5 mg/kg/day of a specific nucleic acid-targeting system targeted in a SNALP are contemplated. The daily treatment may be over about three days and then weekly for about five weeks. In another embodiment, a specific nucleic acid-targeting system encapsulated SNALP) administered by intravenous injection to at doses of about 1 or 2.5 mg/kg are also contemplated (see, e.g., Zimmerman et al., Nature Letters, Vol. 441, 4 May 2006). The SNALP formulation may contain the lipids 3-N-[(w-methoxypoly(ethylene glycol) 2000) carbamoyl]-1,2-dimyristyloxy-propylamine (PEG-C-DMA), 1,2-dilinoleyloxy-N,N-dimethyl-3-aminopropane (DLinDMA), 1,2-distearoyl-sn-glycero-3-phosphocholine (DSPC) and cholesterol, in a 2:40:10:48 molar percent ratio (see, e.g., Zimmerman et al., Nature Letters, Vol. 441, 4 May 2006).

In another embodiment, stable nucleic-acid-lipid particles (SNALPs) have proven to be effective delivery molecules to highly vascularized HepG2-derived liver tumors but not in poorly vascularized HCT-116 derived liver tumors (see, e.g., Li, Gene Therapy (2012) 19, 775-780). The SNALP liposomes may be prepared by formulating D-Lin-DMA and PEG-C-DMA with distearoylphosphatidylcholine (DSPC), Cholesterol and siRNA using a 25:1 lipid/siRNA ratio and a 48/40/10/2 molar ratio of Cholesterol/D-Lin-DMA/DSPC/PEG-C-DMA. The resulted SNALP liposomes are about 80-100 nm in size.

In yet another embodiment, a SNALP may comprise synthetic cholesterol (Sigma-Aldrich, St Louis, MO, USA), dipalmitoylphosphatidylcholine (Avanti Polar Lipids, Alabaster, AL, USA), 3-N-[(w-methoxy poly(ethylene glycol) 2000)carbamoyl]-1,2-dimyristyloxypropylamine, and cationic 1,2-dilinoleyloxy-3-N,Ndimethylaminopropane (see, e.g., Geisbert et al., Lancet 2010; 375: 1896-905). A dosage of about 2 mg/kg total nucleic acid-targeting system per dose administered as, for example, a bolus intravenous infusion may be contemplated.

In yet another embodiment, a SNALP may comprise synthetic cholesterol (Sigma-Aldrich), 1,2-distearoyl-sn-glycero-3-phosphocholine (DSPC; Avanti Polar Lipids Inc.), PEG-cDMA, and 1,2-dilinoleyloxy-3-(N; N-dimethyl)aminopropane (DLinDMA) (see, e.g., Judge, J. Clin. Invest. 119:661-673 (2009)). Formulations used for in vivo studies may comprise a final lipid/RNA mass ratio of about 9:1.

The safety profile of RNAi nanomedicines has been reviewed by Barros and Gollobof Alnylam Pharmaceuticals (see, e.g., Advanced Drug Delivery Reviews 64 (2012) 1730-1737). The stable nucleic acid lipid particle (SNALP) is comprised of four different lipids an ionizable lipid (DLinDMA) that is cationic at low pH, a neutral helper lipid, cholesterol, and a diffusible polyethylene glycol (PEG)-lipid. The particle is approximately 80 nm in diameter and is charge-neutral at physiologic pH. During formulation, the ionizable lipid serves to condense lipid with the anionic RNA during particle formation. When positively charged under increasingly acidic endosomal conditions, the ioniz-able lipid also mediates the fusion of SNALP with the endosomal membrane enabling release of RNA into the cytoplasm. The PEG-lipid stabilizes the particle and reduces aggregation during formulation, and subsequently provides a neutral hydrophilic exterior that improves pharmacokinetic properties.

To date, two clinical programs have been initiated using SNALP formulations with RNA. Tekmira Pharmaceuticals recently completed a phase I single-dose study of SNALP-ApoB in adult volunteers with elevated LDL cholesterol. ApoB is predominantly expressed in the liver and jejunum and is essential for the assembly and secretion of VLDL and LDL. Seventeen subjects received a single dose of SNALP-ApoB (dose escalation across 7 dose levels). There was no evidence of liver toxicity (anticipated as the potential dose-limiting toxicity based on preclinical studies). One (of two) subjects at the highest dose experienced flu-like symptoms consistent with immune system stimulation, and the decision was made to conclude the trial.

Alnylam Pharmaceuticals has similarly advanced ALN-TTR01, which employs the SNALP technology described above and targets hepatocyte production of both mutant and wild-type TTR to treat TTR amyloidosis (ATTR). Three ATTR syndromes have been described: familial amyloidotic polyneuropathy (FAP) and familial amyloidotic cardiomyopathy (FAC)—both caused by autosomal dominant mutations in TTR; and senile systemic amyloidosis (SSA) cause by wildtype TTR. A placebo-controlled, single dose-escalation phase I trial of ALN-TTR01 was recently completed in patients with ATTR. ALN-TTR01 was administered as a 15-minute IV infusion to 31 patients (23 with study drug and 8 with placebo) within a dose range of 0.01 to 1.0 mg/kg (based on siRNA). Treatment was well tolerated with no significant increases in liver function tests. Infusion-related reactions were noted in 3 of 23 patients at ≥0.4 mg/kg; all responded to slowing of the infusion rate and all continued on study. Minimal and transient elevations of serum cytokines IL-6, IP-10 and IL-1ra were noted in two patients at the highest dose of 1 mg/kg (as anticipated from preclinical and NHP studies). Lowering of serum TTR, the expected pharmacodynamics effect of ALN-TTR01, was observed at 1 mg/kg.

In yet another embodiment, a SNALP may be made by solubilizing a cationic lipid, DSPC, cholesterol and PEG-lipid e.g., in ethanol, e.g., at a molar ratio of 40:10:40:10, respectively (see, Semple et al., Nature Biotechnology, Volume 28 Number 2 Feb. 2010, pp. 172-177). The lipid mixture was added to an aqueous buffer (50 mM citrate, pH 4) with mixing to a final ethanol and lipid concentration of 30% (vol/vol) and 6.1 mg/ml, respectively, and allowed to equilibrate at 22° C. for 2 min before extrusion. The hydrated lipids were extruded through two stacked 80 nm pore-sized filters (Nuclepore) at 22° C. using a Lipex Extruder (Northern Lipids) until a vesicle diameter of 70-90 nm, as determined by dynamic light scattering analysis, was obtained. This generally required 1-3 passes. The siRNA (solubilized in a 50 mM citrate, pH 4 aqueous solution containing 30% ethanol) was added to the pre-equilibrated (35° C.) vesicles at a rate of ~5 ml/min with mixing. After a final target siRNA/lipid ratio of 0.06 (wt/wt) was reached, the mixture was incubated for a further 30 min at 35° C. to allow vesicle reorganization and encapsulation of the siRNA. The ethanol was then removed and the external buffer replaced with PBS (155 mM NaCl, 3 mM Na2HPO4, 1 mM KH2PO4, pH 7.5) by either dialysis or tangential flow diafiltration. siRNA were encapsulated in SNALP using a controlled step-wise dilution method process. The lipid constituents of KC2-SNALP were DLin-KC2-DMA (cationic lipid), dipalmitoylphosphatidylcholine (DPPC; Avanti Polar Lipids), synthetic cholesterol (Sigma) and PEG-C-DMA used at a molar ratio of 57.1:7.1:34.3:1.4. Upon formation of the loaded particles, SNALP were dialyzed against PBS and filter sterilized through a 0.2 µm filter before use. Mean particle sizes were 75-85 nm and 90-95% of the siRNA was encapsulated within the lipid particles. The final siRNA/lipid ratio in formulations used for in vivo testing was ~0.15 (wt/wt). LNP-siRNA systems containing Factor VII siRNA were diluted to the appropriate concentrations in sterile PBS immediately before use and the formulations were administered intravenously through the lateral tail vein in a total volume of 10 ml/kg. This method and these delivery systems may be extrapolated to the nucleic acid-targeting system of the present invention.

Other Lipids

Other cationic lipids, such as amino lipid 2,2-dilinoleyl-4-dimethylaminoethyl-[1,3]-dioxolane (DLin-KC2-DMA) may be utilized to encapsulate nucleic acid-targeting system or components thereof or nucleic acid molecule(s) coding therefor e.g., similar to SiRNA (see, e.g., Jayaraman, Angew. Chem. Int. Ed. 2012, 51, 8529-8533), and hence may be employed in the practice of the invention. A preformed vesicle with the following lipid composition may be contemplated: amino lipid, distearoylphosphatidylcholine (DSPC), cholesterol and (R)-2,3-bis(octadecyloxy) propyl-1-(methoxy poly(ethylene glycol)2000)propylcarbamate (PEG-lipid) in the molar ratio 40/10/40/10, respectively, and a FVII siRNA/total lipid ratio of approximately 0.05 (w/w). To ensure a narrow particle size distribution in the range of 70-90 nm and a low polydispersity index of 0.11+0.04 (n=56), the particles may be extruded up to three times through 80 nm membranes prior to adding the guide RNA. Particles containing the highly potent amino lipid 16 may be used, in which the molar ratio of the four lipid components 16, DSPC, cholesterol and PEG-lipid (50/10/38.5/1.5) which may be further optimized to enhance in vivo activity.

Michael S D Kormann et al. ("Expression of therapeutic proteins after delivery of chemically modified mRNA in mice: Nature Biotechnology, Volume:29, Pages: 154-157 (2011)) describes the use of lipid envelopes to deliver RNA. Use of lipid envelopes is also preferred in the present invention.

In another embodiment, lipids may be formulated with the nucleic acid-targeting system of the present invention or component(s) thereof or nucleic acid molecule(s) coding therefor to form lipid nanoparticles (LNPs). Lipids include, but are not limited to, DLin-KC2-DMA4, C12-200 and colipids distearoylphosphatidyl choline, cholesterol, and PEG-DMG may be formulated with RNA-targeting system instead of siRNA (see, e.g., Novobrantseva, Molecular Therapy-Nucleic Acids (2012) 1, e4; doi:10.1038/mtna.2011.3) using a spontaneous vesicle formation procedure. The component molar ratio may be about 50/10/38.5/1.5 (DLin-KC2-DMA or C12-200/distearoylphosphatidyl choline/cholesterol/PEG-DMG). The final lipid:siRNA weight ratio may be ~12:1 and 9:1 in the case of DLin-KC2-DMA and C12-200 lipid particles (LNPs), respectively. The formulations may have mean particle diameters of ~80 nm with >90% entrapment efficiency. A 3 mg/kg dose may be contemplated.

Tekmira has a portfolio of approximately 95 patent families, in the U.S. and abroad, that are directed to various aspects of LNPs and LNP formulations (see, e.g., U.S. Pat. Nos. 7,982,027; 7,799,565; 8,058,069; 8,283,333; 7,901,708; 7,745,651; 7,803,397; 8,101,741; 8,188,263; 7,915, 399; 8,236,943 and 7,838,658 and European Pat. Nos 1766035; 1519714; 1781593 and 1664316), all of which may be used and/or adapted to the present invention.

The nucleic acid-targeting system or components thereof or nucleic acid molecule(s)coding therefor may be delivered encapsulated in PLGA Microspheres such as that further described in US published applications 20130252281 and 20130245107 and 20130244279 (assigned to Moderna Therapeutics) which relate to aspects of formulation of compositions comprising modified nucleic acid molecules which may encode a protein, a protein precursor, or a partially or fully processed form of the protein or a protein precursor. The formulation may have a molar ratio 50:10:38.5:1.5-3.0 (cationic lipid:fusogenic lipid:cholesterol:PEG lipid). The PEG lipid may be selected from, but is not limited to PEG-c-DOMG, PEG-DMG. The fusogenic Lipid may be DSPC. See also, Schrum et al., Delivery and Formulation of Engineered Nucleic Acids, US published application 20120251618.

Nanomerics' technology addresses bioavailability challenges for a broad range of therapeutics, including low molecular weight hydrophobic drugs, peptides, and nucleic acid based therapeutics (plasmid, siRNA, miRNA). Specific administration routes for which the technology has demonstrated clear advantages include the oral route, transport across the blood-brain-barrier, delivery to solid tumours, as well as to the eye. See, e.g., Mazza et al., 2013, ACS Nano. 2013 Feb. 26; 7(2):1016-26; Uchegbu and Siew, 2013, J Pharm Sci. 102(2):305-10 and Lalatsa et al., 2012, J Control Release. 2012 Jul. 20; 161(2):523-36.

US Patent Publication No. 20050019923 describes cationic dendrimers for delivering bioactive molecules, such as polynucleotide molecules, peptides and polypeptides and/or pharmaceutical agents, to a mammalian body. The dendrimers are suitable for targeting the delivery of the bioactive molecules to, for example, the liver, spleen, lung, kidney or heart (or even the brain). Dendrimers are synthetic 3-dimensional macromolecules that are prepared in a step-wise fashion from simple branched monomer units, the nature and functionality of which can be easily controlled and varied. Dendrimers are synthesized from the repeated addition of building blocks to a multifunctional core (divergent approach to synthesis), or towards a multifunctional core (convergent approach to synthesis) and each addition of a 3-dimensional shell of building blocks leads to the formation of a higher generation of the dendrimers. Polypropylenimine dendrimers start from a diaminobutane core to which is added twice the number of amino groups by a double Michael addition of acrylonitrile to the primary amines followed by the hydrogenation of the nitriles. This results in a doubling of the amino groups. Polypropylenimine dendrimers contain 100% protonable nitrogens and up to 64 terminal amino groups (generation 5, DAB 64). Protonable groups are usually amine groups which are able to accept protons at neutral pH. The use of dendrimers as gene delivery agents has largely focused on the use of the polyamidoamine. and phosphorous containing compounds with a mixture of amine/amide or N—P(O2)S as the conjugating units respectively with no work being reported on the use of the lower generation polypropylenimine dendrimers for gene delivery. Polypropylenimine dendrimers have also been studied as pH sensitive controlled release systems for drug delivery and for their encapsulation of guest molecules when chemically modified by peripheral amino acid groups. The cytotoxicity and interaction of polypropylenimine dendrimers with DNA as well as the transfection efficacy of DAB 64 has also been studied.

US Patent Publication No. 20050019923 is based upon the observation that, contrary to earlier reports, cationic dendrimers, such as polypropylenimine dendrimers, display suitable properties, such as specific targeting and low toxicity, for use in the targeted delivery of bioactive molecules, such as genetic material. In addition, derivatives of the cationic dendrimer also display suitable properties for the targeted delivery of bioactive molecules. See also, Bioactive Polymers, US published application 20080267903, which discloses "Various polymers, including cationic polyamine polymers and dendrimeric polymers, are shown to possess anti-proliferative activity, and may therefore be useful for treatment of disorders characterised by undesirable cellular proliferation such as neoplasms and tumours, inflammatory disorders (including autoimmune disorders), psoriasis and atherosclerosis. The polymers may be used alone as active agents, or as delivery vehicles for other therapeutic agents, such as drug molecules or nucleic acids for gene therapy. In such cases, the polymers' own intrinsic anti-tumour activity may complement the activity of the agent to be delivered." The disclosures of these patent publications may be employed in conjunction with herein teachings for delivery of nucleic acid-targeting system(s) or component(s) thereof or nucleic acid molecule(s) coding therefor.

Supercharged Proteins

Supercharged proteins are a class of engineered or naturally occurring proteins with unusually high positive or negative net theoretical charge and may be employed in delivery of nucleic acid-targeting system(s) or component(s) thereof or nucleic acid molecule(s) coding therefor. Both supernegatively and superpositively charged proteins exhibit a remarkable ability to withstand thermally or chemically induced aggregation. Superpositively charged proteins are also able to penetrate mammalian cells. Associating cargo with these proteins, such as plasmid DNA, RNA, or other proteins, can enable the functional delivery of these macromolecules into mammalian cells both in vitro and in vivo. David Liu's lab reported the creation and characterization of supercharged proteins in 2007 (Lawrence et al., 2007, Journal of the American Chemical Society 129, 10110-10112).

The nonviral delivery of RNA and plasmid DNA into mammalian cells are valuable both for research and therapeutic applications (Akinc et al., 2010, Nat. Biotech. 26, 561-569). Purified+36 GFP protein (or other superpositively charged protein) is mixed with RNAs in the appropriate serum-free media and allowed to complex prior addition to cells. Inclusion of serum at this stage inhibits formation of the supercharged protein-RNA complexes and reduces the effectiveness of the treatment. The following protocol has been found to be effective for a variety of cell lines (McNaughton et al., 2009, Proc. Natl. Acad. Sci. USA 106, 6111-6116). However, pilot experiments varying the dose of protein and RNA should be performed to optimize the procedure for specific cell lines.

(1) One day before treatment, plate 1×105 cells per well in a 48-well plate.

(2) On the day of treatment, dilute purified +36 GFP protein in serum free media to a final concentration 200 nM. Add RNA to a final concentration of 50 nM. Vortex to mix and incubate at room temperature for 10 min.

(3) During incubation, aspirate media from cells and wash once with PBS.

(4) Following incubation of +36 GFP and RNA, add the protein-RNA complexes to cells.

(5) Incubate cells with complexes at 37° C. for 4 h.

(6) Following incubation, aspirate the media and wash three times with 20 U/mL heparin PBS. Incubate cells with serum-containing media for a further 48 h or longer depending upon the assay for activity.

(7) Analyze cells by immunoblot, qPCR, phenotypic assay, or other appropriate method.

David Liu's lab has further found +36 GFP to be an effective plasmid delivery reagent in a range of cells. As plasmid DNA is a larger cargo than siRNA, proportionately more +36 GFP protein is required to effectively complex plasmids. For effective plasmid delivery Applicants have developed a variant of +36 GFP bearing a C-terminal HA2 peptide tag, a known endosome-disrupting peptide derived from the influenza virus hemagglutinin protein. The following protocol has been effective in a variety of cells, but as above it is advised that plasmid DNA and supercharged protein doses be optimized for specific cell lines and delivery applications.

(1) One day before treatment, plate 1×105 per well in a 48-well plate.

(2) On the day of treatment, dilute purified þ 36 GFP protein in serum free media to a final concentration 2 mM. Add 1 mg of plasmid DNA. Vortex to mix and incubate at room temperature for 10 min.

(3) During incubation, aspirate media from cells and wash once with PBS.

(4) Following incubation of þ 36 GFP and plasmid DNA, gently add the protein-DNA complexes to cells.

(5) Incubate cells with complexes at 37 C for 4 h.

(6) Following incubation, aspirate the media and wash with PBS. Incubate cells in serum-containing media and incubate for a further 24-48 h.

(7) Analyze plasmid delivery (e.g., by plasmid-driven gene expression) as appropriate.

See also, e.g., McNaughton et al., Proc. Natl. Acad. Sci. USA 106, 6111-6116 (2009); Cronican et al., ACS Chemical Biology 5, 747-752 (2010); Cronican et al., Chemistry & Biology 18, 833-838 (2011); Thompson et al., Methods in Enzymology 503, 293-319 (2012); Thompson, D. B., et al., Chemistry & Biology 19 (7), 831-843 (2012). The methods of the super charged proteins may be used and/or adapted for delivery of the nucleic acid-targeting system of the present invention. These systems of Dr. Lui and documents herein in conjunction with herein teachings can be employed in the delivery of nucleic acid-targeting system(s) or component(s) thereof or nucleic acid molecule(s) coding therefor.

Cell Penetrating Peptides (CPPs)

In yet another embodiment, cell penetrating peptides (CPPs) are contemplated for the delivery of the CRISPR Cas system. CPPs are short peptides that facilitate cellular uptake of various molecular cargo (from nanosize particles to small chemical molecules and large fragments of DNA). The term "cargo" as used herein includes but is not limited to the group consisting of therapeutic agents, diagnostic probes, peptides, nucleic acids, antisense oligonucleotides, plasmids, proteins, particles including nanoparticles, liposomes, chromophores, small molecules and radioactive materials. In aspects of the invention, the cargo may also comprise any component of the CRISPR Cas system or the entire functional CRISPR Cas system. Aspects of the present invention further provide methods for delivering a desired cargo into a subject comprising: (a) preparing a complex comprising the cell penetrating peptide of the present invention and a desired cargo, and (b) orally, intraarticularly, intraperitoneally, intrathecally, intraarterially, intranasally, intraparenchymally, subcutaneously, intramuscularly, intravenously, dermally, intrarectally, or topically administering the complex to a subject. The cargo is associated with the peptides either through chemical linkage via covalent bonds or through non-covalent interactions.

The function of the CPPs are to deliver the cargo into cells, a process that commonly occurs through endocytosis with the cargo delivered to the endosomes of living mammalian cells. Cell-penetrating peptides are of different sizes, amino acid sequences, and charges but all CPPs have one distinct characteristic, which is the ability to translocate the plasma membrane and facilitate the delivery of various molecular cargoes to the cytoplasm or an organelle. CPP translocation may be classified into three main entry mechanisms: direct penetration in the membrane, endocytosis-mediated entry, and translocation through the formation of a transitory structure. CPPs have found numerous applications in medicine as drug delivery agents in the treatment of different diseases including cancer and virus inhibitors, as well as contrast agents for cell labeling. Examples of the latter include acting as a carrier for GFP, MRI contrast agents, or quantum dots. CPPs hold great potential as in vitro and in vivo delivery vectors for use in research and medicine. CPPs typically have an amino acid composition that either contains a high relative abundance of positively charged amino acids such as lysine or arginine or has sequences that contain an alternating pattern of polar/charged amino acids and non-polar, hydrophobic amino acids. These two types of structures are referred to as polycationic or amphipathic, respectively. A third class of CPPs are the hydrophobic peptides, containing only apolar residues, with low net charge or have hydrophobic amino acid groups that are crucial for cellular uptake. One of the initial CPPs discovered was the trans-activating transcriptional activator (Tat) from Human Immunodeficiency Virus 1 (HIV-1) which was found to be efficiently taken up from the surrounding media by numerous cell types in culture. Since then, the number of known CPPs has expanded considerably and small molecule synthetic analogues with more effective protein transduction properties have been generated. CPPs include but are not limited to Penetratin, Tat (48-60), Transportan, and (R-AhX-R)4 (SEQ ID NO: 36) (Ahx=aminohexanoyl).

U.S. Pat. No. 8,372,951, provides a CPP derived from eosinophil cationic protein (ECP) which exhibits highly cell-penetrating efficiency and low toxicity. Aspects of delivering the CPP with its cargo into a vertebrate subject are also provided. Further aspects of CPPs and their delivery are described in U.S. Pat. Nos. 8,575,305; 8,614,194 and 8,044,019. CPPs can be used to deliver the CRISPR-Cas system or components thereof. That CPPs can be employed to deliver the CRISPR-Cas system or components thereof is also provided in the manuscript "Gene disruption by cell-penetrating peptide-mediated delivery of Cas9 protein and guide RNA", by Suresh Ramakrishna, Abu-Bonsrah Kwaku Dad, Jagadish Beloor, et al. Genome Res. 2014 Apr. 2. [Epub ahead of print], incorporated by reference in its entirety, wherein it is demonstrated that treatment with CPP-conjugated recombinant Cas9 protein and CPP-complexed guide RNAs lead to endogenous gene disruptions in human cell lines. In the paper the Cas9 protein was conjugated to CPP via a thioether bond, whereas the guide RNA was complexed with CPP, forming condensed, positively charged particles. It was shown that simultaneous and sequential treatment of human cells, including embryonic stem cells, dermal fibroblasts, HEK293T cells, HeLa cells, and embryonic carcinoma cells, with the modified Cas9 and guide RNA led to efficient gene disruptions with reduced off-target mutations relative to plasmid transfections.

Implantable Devices

In another embodiment, implantable devices are also contemplated for delivery of the nucleic acid-targeting system or component(s) thereof or nucleic acid molecule(s) coding therefor. For example, US Patent Publication 20110195123 discloses an implantable medical device which elutes a drug locally and in prolonged period is provided, including several types of such a device, the treatment modes of implementation and methods of implantation. The device comprising of polymeric substrate, such as a matrix for example, that is used as the device body, and drugs, and in some cases additional scaffolding materials, such as metals or additional polymers, and materials to enhance visibility and imaging. An implantable delivery device can be advantageous in providing release locally and over a prolonged period, where drug is released directly to the extracellular matrix (ECM) of the diseased area such as tumor, inflammation, degeneration or for symptomatic objectives, or to injured smooth muscle cells, or for prevention. One kind of drug is RNA, as disclosed above, and this system may be used/and or adapted to the nucleic acid-targeting system of the present invention. The modes of implantation in some embodiments are existing implantation procedures that are developed and used today for other treatments, including brachytherapy and needle biopsy. In such cases the dimensions of the new implant described in this invention are similar to the original implant. Typically a few devices are implanted during the same treatment procedure.

US Patent Publication 20110195123, provides a drug delivery implantable or insertable system, including systems applicable to a cavity such as the abdominal cavity and/or any other type of administration in which the drug delivery system is not anchored or attached, comprising a biostable and/or degradable and/or bioabsorbable polymeric substrate, which may for example optionally be a matrix. It should be noted that the term "insertion" also includes implantation. The drug delivery system is preferably implemented as a "Loder" as described in US Patent Publication 20110195123.

The polymer or plurality of polymers are biocompatible, incorporating an agent and/or plurality of agents, enabling the release of agent at a controlled rate, wherein the total volume of the polymeric substrate, such as a matrix for example, in some embodiments is optionally and preferably no greater than a maximum volume that permits a therapeutic level of the agent to be reached. As a non-limiting example, such a volume is preferably within the range of 0.1 m3 to 1000 mm3, as required by the volume for the agent load. The Loder may optionally be larger, for example when incorporated with a device whose size is determined by functionality, for example and without limitation, a knee joint, an intra-uterine or cervical ring and the like.

The drug delivery system (for delivering the composition) is designed in some embodiments to preferably employ degradable polymers, wherein the main release mechanism is bulk erosion; or in some embodiments, non degradable, or slowly degraded polymers are used, wherein the main release mechanism is diffusion rather than bulk erosion, so that the outer part functions as membrane, and its internal part functions as a drug reservoir, which practically is not affected by the surroundings for an extended period (for example from about a week to about a few months). Combinations of different polymers with different release mechanisms may also optionally be used. The concentration gradient at the surface is preferably maintained effectively constant during a significant period of the total drug releasing period, and therefore the diffusion rate is effectively constant (termed "zero mode" diffusion). By the term "constant" it is meant a diffusion rate that is preferably maintained above the lower threshold of therapeutic effectiveness, but which may still optionally feature an initial burst and/or may fluctuate, for example increasing and decreasing to a certain degree. The diffusion rate is preferably so maintained for a prolonged period, and it can be considered constant to a certain level to optimize the therapeutically effective period, for example the effective silencing period.

The drug delivery system optionally and preferably is designed to shield the nucleotide based therapeutic agent from degradation, whether chemical in nature or due to attack from enzymes and other factors in the body of the subject.

The drug delivery system of US Patent Publication 20110195123 is optionally associated with sensing and/or activation appliances that are operated at and/or after implantation of the device, by non and/or minimally invasive methods of activation and/or acceleration/deceleration, for example optionally including but not limited to thermal heating and cooling, laser beams, and ultrasonic, including focused ultrasound and/or RF (radiofrequency) methods or devices.

According to some embodiments of US Patent Publication 20110195123, the site for local delivery may optionally include target sites characterized by high abnormal proliferation of cells, and suppressed apoptosis, including tumors, active and/or chronic inflammation and infection including autoimmune diseases states, degenerating tissue including muscle and nervous tissue, chronic pain, degenerative sites, and location of bone fractures and other wound locations for enhancement of regeneration of tissue, and injured cardiac, smooth and striated muscle.

The site for implantation of the composition, or target site, preferably features a radius, area and/or volume that is sufficiently small for targeted local delivery. For example, the target site optionally has a diameter in a range of from about 0.1 mm to about 5 cm.

The location of the target site is preferably selected for maximum therapeutic efficacy. For example, the composition of the drug delivery system (optionally with a device for implantation as described above) is optionally and preferably implanted within or in the proximity of a tumor environment, or the blood supply associated thereof.

For example the composition (optionally with the device) is optionally implanted within or in the proximity to pancreas, prostate, breast, liver, via the nipple, within the vascular system and so forth.

The target location is optionally selected from the group comprising, consisting essentially of, or consisting of (as non-limiting examples only, as optionally any site within the body may be suitable for implanting a Loder): 1. brain at degenerative sites like in Parkinson or Alzheimer disease at the basal ganglia, white and gray matter; 2. spine as in the case of amyotrophic lateral sclerosis (ALS); 3. uterine cervix to prevent HPV infection; 4. active and chronic inflammatory joints; 5. dermis as in the case of psoriasis; 6. sympathetic and sensoric nervous sites for analgesic effect; 7. Intra osseous implantation; 8. acute and chronic infection sites; 9. Intra vaginal; 10. Inner ear-auditory system, labyrinth of the inner ear, vestibular system; 11. Intra tracheal; 12. Intra-cardiac; coronary, epicardiac; 13. urinary bladder; 14. biliary system; 15. parenchymal tissue including and not limited to the kidney, liver, spleen; 16. lymph nodes; 17. salivary glands; 18. dental gums; 19. Intra-articular (into joints); 20. Intra-ocular; 21. Brain tissue; 22. Brain ventricles; 23. Cavities, including abdominal cavity (for example but without limitation, for ovary cancer); 24. Intra esophageal and 25. Intra rectal.

Optionally insertion of the system (for example a device containing the composition) is associated with injection of material to the ECM at the target site and the vicinity of that site to affect local pH and/or temperature and/or other biological factors affecting the diffusion of the drug and/or drug kinetics in the ECM, of the target site and the vicinity of such a site.

Optionally, according to some embodiments, the release of said agent could be associated with sensing and/or activation appliances that are operated prior and/or at and/or after insertion, by non and/or minimally invasive and/or else methods of activation and/or acceleration/deceleration, including laser beam, radiation, thermal heating and cooling, and ultrasonic, including focused ultrasound and/or RF (radiofrequency) methods or devices, and chemical activators.

According to other embodiments of US Patent Publication 20110195123, the drug preferably comprises a RNA, for example for localized cancer cases in breast, pancreas, brain, kidney, bladder, lung, and prostate as described below. Although exemplified with RNAi, many drugs are applicable to be encapsulated in Loder, and can be used in association with this invention, as long as such drugs can be encapsulated with the Loder substrate, such as a matrix for example, and this system may be used and/or adapted to deliver the nucleic acid-targeting system of the present invention.

As another example of a specific application, neuro and muscular degenerative diseases develop due to abnormal gene expression. Local delivery of RNAs may have therapeutic properties for interfering with such abnormal gene expression. Local delivery of anti apoptotic, anti inflammatory and anti degenerative drugs including small drugs and macromolecules may also optionally be therapeutic. In such cases the Loder is applied for prolonged release at constant rate and/or through a dedicated device that is implanted separately. All of this may be used and/or adapted to the nucleic acid-targeting system of the present invention.

As yet another example of a specific application, psychiatric and cognitive disorders are treated with gene modifiers. Gene knockdown is a treatment option. Loders locally delivering agents to central nervous system sites are therapeutic options for psychiatric and cognitive disorders including but not limited to psychosis, bi-polar diseases, neurotic disorders and behavioral maladies. The Loders could also deliver locally drugs including small drugs and macromolecules upon implantation at specific brain sites. All of this may be used and/or adapted to the nucleic acid-targeting system of the present invention.

As another example of a specific application, silencing of innate and/or adaptive immune mediators at local sites enables the prevention of organ transplant rejection. Local delivery of RNAs and immunomodulating reagents with the Loder implanted into the transplanted organ and/or the implanted site renders local immune suppression by repelling immune cells such as CD8 activated against the transplanted organ. All of this may be used/and or adapted to the nucleic acid-targeting system of the present invention.

As another example of a specific application, vascular growth factors including VEGFs and angiogenin and others are essential for neovascularization. Local delivery of the factors, peptides, peptidomimetics, or suppressing their repressors is an important therapeutic modality; silencing the repressors and local delivery of the factors, peptides, macromolecules and small drugs stimulating angiogenesis with the Loder is therapeutic for peripheral, systemic and cardiac vascular disease.

The method of insertion, such as implantation, may optionally already be used for other types of tissue implantation and/or for insertions and/or for sampling tissues, optionally without modifications, or alternatively optionally only with non-major modifications in such methods. Such methods optionally include but are not limited to brachytherapy methods, biopsy, endoscopy with and/or without ultrasound, such as ERCP, stereotactic methods into the brain tissue, Laparoscopy, including implantation with a laparoscope into joints, abdominal organs, the bladder wall and body cavities.

Implantable device technology herein discussed can be employed with herein teachings and hence by this disclosure and the knowledge in the art, CRISPR-Cas system or components thereof or nucleic acid molecules thereof or encoding or providing components may be delivered via an implantable device.

CRISPR Effector Protein mRNA and Guide RNA

CRISPR effector protein mRNA and guide RNA might also be delivered separately. CRISPR effector protein mRNA can be delivered prior to the guide RNA to give time for CRISPR effector protein to be expressed. CRISPR effector protein mRNA might be administered 1-12 hours (preferably around 2-6 hours) prior to the administration of guide RNA.

Alternatively, CRISPR effector protein mRNA and guide RNA can be administered together. Advantageously, a second booster dose of guide RNA can be administered 1-12 hours (preferably around 2-6 hours) after the initial administration of CRISPR effector protein mRNA+guide RNA.

The CRISPR effector protein of the present invention is sometimes referred to herein as a CRISPR Enzyme. However, it will also be appreciated that the effector protein may, as required in some embodiments, have DNA or RNA binding, but not necessarily cutting or nicking, activity, including a dead-Cas effector protein function.

Additional administrations of CRISPR effector protein mRNA and/or guide RNA might be useful to achieve the most efficient levels of genome modification. In some embodiments, phenotypic alteration is preferably the result of genome modification when a genetic disease is targeted, especially in methods of therapy and preferably where a repair template is provided to correct or alter the phenotype.

For minimization of toxicity and off-target effect, it will be important to control the concentration of CRISPR effector protein mRNA and guide RNA delivered. Optimal concentrations of CRISPR effector protein mRNA and guide RNA can be determined by testing different concentrations in a cellular or animal model and using deep sequencing the analyze the extent of modification at potential off-target genomic loci. For example, for the guide sequence targeting 5'-GAGTCCGAGCAGAAGAAGAA-3' (SEQ ID NO: 37) in the EMX1 gene of the human genome, deep sequencing can be used to assess the level of modification at the following two off-target loci, 1: 5'-GAGTCCTAGCAGGAGAAGAA-3' (SEQ ID NO: 38) and 2: 5'-GAGTCTAAGCAGAAGAAGAA-3' (SEQ ID NO: 39). The concentration that gives the highest level of on-target modification while minimizing the level of off-target modification should be chosen for in vivo delivery.

Inducible Systems

In some embodiments, a CRISPR effector protein may form a component of an inducible system. The inducible nature of the system would allow for spatiotemporal control of gene editing or gene expression using a form of energy. The form of energy may include but is not limited to electromagnetic radiation, sound energy, chemical energy and thermal energy. Examples of inducible system include tetracycline inducible promoters (Tet-On or Tet-Off), small molecule two-hybrid transcription activations systems (FKBP, ABA, etc), or light inducible systems (Phytochrome, LOV domains, or cryptochrome). In one embodiment, the CRISPR effector protein may be a part of a Light Inducible Transcriptional Effector (LITE) to direct changes in transcriptional activity in a sequence-specific manner. The components of a light may include a CRISPR effector protein, a light-responsive cytochrome heterodimer (e.g. from *Arabidopsis thaliana*), and a transcriptional activation/repression domain. Further examples of inducible DNA binding proteins and methods for their use are provided in U.S. 61/736,465 and U.S. 61/721,283, and WO 2014018423 A2 which is hereby incorporated by reference in its entirety.

Application of CRISPR-Cas systems to plants and yeast

In one aspect, the invention provides for a method for identifying a putative regulatory element that regulates a gene associated with an agricultural trait of interest in plants, comprising:
  obtaining a measure of intrinsic activity of a plurality of genomic elements;
  obtaining a measure of proximity between each of the genomic elements and the gene;
  scoring a predicted impact of each of the genomic elements on the gene as a function of the measure of intrinsic activity and the measure of proximity, wherein a plurality of predicted impacts scored are ranked to identify at least one genomic element as a putative regulatory element that regulates the gene.

In another aspect, the invention provides for a method for identifying a plant gene as regulated by a putative regulatory element, comprising:
  obtaining a measure of intrinsic activity of the putative regulatory element;
  obtaining a measure of proximity between the putative regulatory element and a plurality of genes; and
  scoring a predicted impact of the putative regulatory element on each of the genes as a function of the measure of intrinsic activity and the measure of proximity, wherein a plurality of predicted impacts scored are ranked to identify at least one gene as regulated by the putative regulatory element.

In a further aspect, the invention provides for a method for providing perturbation data for use in training, optimizing, and/or validating the scoring of predicted impact, comprising:
  introducing a library of guide RNAs into a population of cells, wherein the cells are plant cells or plant protoplasts and either expressing an RNA-guided DNA binding protein or having the RNA-guided DNA binding protein or a coding sequence thereof introduced simultaneously or sequentially with the guide RNAs, wherein the guide RNAs target different non-coding genomic sequences within at least one genomic region;
  selecting cells based on a phenotype; and
  determining (i) relative representation of the guide RNAs present in the selected cells or (ii) deletion of genomic sequence targeted by pairs of the guide RNAs from the selected cells, wherein (i) the relative representation of the guide RNAs or (ii) the deletion of genomic sequence indicates the targeted genomic sequence as a regulatory element of a gene associated with the phenotype.

In a further aspect, the invention provides for a method for identifying an enhancer or repressor that regulates a gene associated with an agricultural trait of interest in plants, comprising:

introducing a library of guide RNAs into a population of cells, wherein the cells are plant cells or plant protoplasts and either expressing an RNA-guided DNA binding protein or having the RNA-guided DNA binding protein or a coding sequence thereof introduced simultaneously or sequentially with the guide RNAs, wherein the guide RNAs target different non-coding genomic sequences within at least one genomic region;

selecting cells based on a phenotype associated with reduced or increased expression of the gene; and determining (i) relative representation of the guide RNAs present in the selected cells or (ii) deletion of genomic sequence targeted by pairs of the guide RNAs from the selected cells, wherein (i) the relative representation of the guide RNAs or (ii) the deletion of genomic sequence indicates the targeted genomic sequence as an enhancer or repressor for the gene.

In an additional aspect, the invention provides for a composition comprising a population of plant cells or plant protoplasts obtainable or obtained by:

(a) introducing a library of guide RNAs into cells at an average ratio of no more than one guide RNA per cell, said cells either expressing a modified CRISPR effector protein that is not catalytically competent or having the modified CRISPR effector protein or a coding sequence thereof introduced simultaneously or sequentially with the guide RNAs, wherein the guide RNAs target different non-coding genomic sequences within at least one genomic region for transcriptional repression, or (b) introducing a library of pairs of guide RNAs into cells at an average ratio of no more than one pair of guide RNAs per cell, said cells either expressing a catalytically active CRISPR effector protein or having the catalytically active CRISPR effector protein or a coding sequence thereof introduced simultaneously or sequentially with the guide RNAs, wherein the pairs of guide RNAs target different non-coding genomic sequences located in one or more genomic regions for deletion.

In some embodiments, the population of plant cells or plant protoplasts comprises at least 100, at least 200, at least 500, at least 1,000, at least 2,000, at least 5,000, or at least 10,000 plant cells or plant protoplasts, each comprising a different CRISPR guide targeting a non-coding genomic sequences. In some embodiments, one or more CRISPR guides target a cytoplasmic DNA sequence, or a mitochondrial DNA sequence.

In an additional aspect, the invention provides for a method for identifying a transcriptional enhancer or repressor associated with a desirable plant genotype or phenotype, comprising:

introducing a library of guide RNAs into a population of cells, wherein the cells are plant cells or plant protoplasts and either expressing an RNA-guided DNA binding protein or having the RNA-guided DNA binding protein or a coding sequence thereof introduced simultaneously or sequentially with the guide RNAs, wherein the guide RNAs target different non-coding genomic sequences within at least one genomic region;

selecting cells based on a desirable plant genotype or phenotype; and determining (i) relative representation of the guide RNAs present in the selected cells or (ii) deletion of genomic sequence targeted by pairs of the guide RNAs from the selected cells, wherein (i) the relative representation of the guide RNAs or (ii) the deletion of genomic sequence indicates the targeted genomic sequence as a transcriptional enhancer or repressor for the gene.

In some embodiments, the desirable plant genotype is increased or decreased expression of a gene of interest, wherein the method comprises quantitatively labeling single cells using fluorescence in situ hybridization (FISH) according to expression of an mRNA of interest and sorting labeled cells into a plurality of bins based on the expression of the mRNA of interest, and determining in each of the bins (i) relative representation of the guide RNAs present in the labeled cells or (ii) deletion of genomic sequence targeted by pairs of the guide RNAs from the labeled cells to identify a transcriptional enhancer or repressor regulating the gene encoding the mRNA of interest.

In some embodiments, the desirable plant phenotype is selected from the group consisting of increased yield, increased abiotic stress tolerance, increased drought tolerance, increased flood tolerance, increased heat tolerance, increased cold and frost tolerance, increased salt tolerance, increased heavy metal tolerance, increased low-nitrogen tolerance, increased disease resistance, increased pest resistance, increased herbicide resistance, increased biomass production, and a combination thereof. In this regard, the method can comprise exposing the plant cells or plant protoplasts to a stress condition selected from the group consisting of abiotic stress, drought stress, flood stress, heat stress, cold and frost stress, salt stress, heavy metal stress, low-nitrogen stress, disease stress, pest stress, herbicide stress, or a combination thereof, and selecting plant cells, plant protoplasts, or tissues or plants derived therefrom based on increased tolerance or resistance to the stress condition.

In some embodiments, the plant cells or plant protoplasts can be derived from a monocotyledonous plant, such as wheat, turf, turf grass, cereal, maize, rice, oat, wheat, barley, sorghum, orchid, iris, lily, onion, banana, sugarcane, sorghum, palm, and setaria. In some embodiments, the plant cells or plant protoplasts can be derived from a dicotyledonous plant, such as avocado, potato, tobacco, tomato, eggplant, sugarbeet, broccoli, cassava, sweet potato, pepper, cotton, poinsettia, legumes, alfalfa, soybean, carrot, strawberry, lettuce, oak, maple, walnut, rose, mint, squash, daisy, and *arabidopsis*.

In certain aspects and embodiments, the CRISPR-Cas systems as referred to herein can be used in plants/algae or yeasts. By means of example, and without limitation, the CRISPR-Cas systems as defined herein can be used in the screening methods as described herein in plants/algae (or plant cells or plant organs) or yeasts, such as the methods for identifying an transcriptional enhancer or repressor associated with a desirable genotype or phenotype. In further aspects and embodiments, the invention relates to methods for altering expression or otherwise modulating a transcriptional enhancer or repressor in plants/algae (or plant cells or plant organs) or yeasts. In further aspects and embodiments, the invention relates to plants/algae (or plant cells or plant organs) or yeasts obtained or obtainable by such methods.

Engineering of plant genome using CRISPR-Cas9 and CRISPR-Cpf1 systems have been described. See Li et al., Nat. Biotechnol. 31(8): 688-691 (2013); Nekrasov et al., Nat. Biotechnol. 31(8): 691-693 (2013); Bortesi et al., Biotechnology Advances 33(1):41-52 (2015); Belhaj et al., Current Opinion in Biotechnology, 32:76-84 (2015); Endo et al., Scientific Reports 6:38169 (2016); Wang et al., Mol. Plant 10(7):1011-1013 (2017); Xu et al., Plant Biotechnol. J., 16(6):713-717 (2017), and European patent publication no. 2970997A1, each of which is incorporated by reference in its entirety.

In general, the term "plant" relates to any various photosynthetic, eukaryotic, unicellular or multicellular organism of the kingdom Plantae characteristically growing by cell division, containing chloroplasts, and having cell walls comprised of cellulose. The term plant encompasses monocotyledonous and dicotyledonous plants. Specifically, the plants are intended to comprise without limitation angiosperm and gymnosperm plants such as acacia, alfalfa, amaranth, apple, apricot, artichoke, ash tree, asparagus, avocado, banana, barley, beans, beet, birch, beech, blackberry, blueberry, broccoli, Brussel's sprouts, cabbage, canola, cantaloupe, carrot, cassava, cauliflower, cedar, a cereal, celery, chestnut, cherry, Chinese cabbage, citrus, clementine, clover, coffee, corn, cotton, cowpea, cucumber, cypress, eggplant, elm, endive, eucalyptus, fennel, figs, fir, geranium, grape, grapefruit, groundnuts, ground cherry, gum hemlock, hickory, kale, kiwifruit, kohlrabi, larch, lettuce, leek, lemon, lime, locust, pine, maidenhair, maize, mango, maple, melon, millet, mushroom, mustard, nuts, oak, oats, oil palm, okra, onion, orange, an ornamental plant or flower or tree, papaya, palm, parsley, parsnip, pea, peach, peanut, pear, peat, pepper, persimmon, pigeon pea, pine, pineapple, plantain, plum, pomegranate, potato, pumpkin, radicchio, radish, rapeseed, raspberry, rice, rye, sorghum, safflower, sallow, soybean, spinach, spruce, squash, strawberry, sugar beet, sugarcane, sunflower, sweet potato, sweet corn, tangerine, tea, tobacco, tomato, trees, triticale, turf grasses, turnips, vine, walnut, watercress, watermelon, wheat, yams, yew, and zucchini. The term plant also encompasses Algae, which are mainly photoautotrophs unified primarily by their lack of roots, leaves and other organs that characterize higher plants.

The methods as described herein, such as for genome editing or transcriptional modulation using the CRISPR-Cas system as described herein can be used to identify and/or confer desired traits on essentially any plant. A wide variety of plants and plant cell systems maybe engineered for the desired physiological and agronomic characteristics described herein using the nucleic acid constructs of the present disclosure and the various transformation methods mentioned above. In preferred embodiments, target plants and plant cells for engineering include, but are not limited to, those monocotyledonous and dicotyledonous plants, such as crops including grain crops (e.g., wheat, maize, rice, millet, barley), fruit crops (e.g., tomato, apple, pear, strawberry, orange), forage crops (e.g., alfalfa), root vegetable crops (e.g., carrot, potato, sugar beets, yam), leafy vegetable crops (e.g., lettuce, spinach); flowering plants (e.g., petunia, rose, chrysanthemum), conifers and pine trees (e.g., pine fir, spruce); plants used in phytoremediation (e.g., heavy metal accumulating plants); oil crops (e.g., sunflower, rape seed) and plants used for experimental purposes (e.g., *Arabidopsis*). Thus, the methods and CRISPR-Cas systems can be used over a broad range of plants, such as for example with dicotyledonous plants belonging to the orders Magnoliales, Illiciales, Laurales, Piperales, Aristochiales, Nymphaeales, Ranunculales, Papeverales, Sarraceniaceae, Trochodendrales, Hamamelidales, Eucomiales, Leitneriales, Myricales, Fagales, Casuarinales, Caryophyllales, Batales, Polygonales, Plumbaginales, Dilleniales, Theales, Malvales, Urticales, Lecythidales, Violales, Salicales, Capparales, Ericales, Diapensales, Ebenales, Primulales, Rosales, Fabales, Podostemales, Haloragales, Myrtales, Cornales, Proteales, San tales, Rafflesiales, Celastrales, Euphorbiales, Rhamnales, Sapindales, Juglandales, Geraniales, Polygalales, Umbellales, Gentianales, Polemoniales, Lamiales, Plantaginales, Scrophulariales, Campanulales, Rubiales, Dipsacales, and Asterales; the methods and CRISPR-Cas systems can be used with monocotyledonous plants such as those belonging to the orders Alismatales, Hydrocharitales, Najadales, Triuridales, Commelinales, Eriocaulales, Restionales, Poales, Juncales, Cyperales, Typhales, Bromeliales, Zingiberales, Arecales, Cyclanthales, Pandanales, Arales, Lilliales, and Orchid ales, or with plants belonging to Gymnospermae, e.g those belonging to the orders Pinales, Ginkgoales, Cycadales, Araucariales, Cupressales and Gnetales.

The CRISPR-Cas systems and methods of use described herein can be used over a broad range of plant species, included in the non-limitative list of dicot, monocot or gymnosperm genera hereunder: *Atropa, Alseodaphne, Anacardium, Arachis, Beilschmiedia, Brassica, Carthamus, Cocculus, Croton, Cucumis, Citrus, Citrullus, Capsicum, Catharanthus, Cocos, Coffea, Cucurbita, Daucus, Duguetia, Eschscholzia, Ficus, Fragaria, Glaucium, Glycine, Gossypium, Helianthus, Hevea, Hyoscyamus, Lactuca, Landolphia, Linum, Litsea, Lycopersicon, Lupinus, Manihot, Majorana, Malus, Medicago, Nicotiana, Olea, Parthenium, Papaver, Persea, Phaseolus, Pistacia, Pisum, Pyrus, Prunus, Raphanus, Ricinus, Senecio, Sinomenium, Stephania, Sinapis, Solanum, Theobroma, Trifolium, Trigonella, Vicia, Vinca, Vilis,* and *Vigna*; and the genera *Allium, Andropogon, Eragrostis, Asparagus, Avena, Cynodon, Elaeis, Festuca, Festulolium, Hemerocallis, Hordeum, Lemna, Lolium, Mus*a, *Oryza, Panicum, Pennisetum, Phleum, Poa, Secale, Sorghum, Triticum, Zea, Abies, Cunninghamia, Ephedra, Picea, Pinus,* and *Pseudotsuga*.

The CRISPR-Cas systems and methods of use can also be used over a broad range of "algae" or "algae cells"; including for example algea selected from several eukaryotic phyla, including the Rhodophyta (red algae), Chlorophyta (green algae), Phaeophyta (brown algae), Bacillariophyta (diatoms), Eustigmatophyta and dinoflagellates as well as the prokaryotic phylum Cyanobacteria (blue-green algae). The term "algae" includes for example algae selected from: *Amphora, Anabaena, Ankistrodesmus, Botryococcus, Chaetoceros, Chlamydomonas, Chlorella, Chlorococcum, Cyclotella, Cylindrotheca, Dunaliella, Emiliana, Euglena, Hematococcus, Isochrysis, Monochrysis, Monoraphidium, Nannochloris, Nannochloropsis, Navicula, Nephrochloris, Nephroselmis, Nitzschia, Nodularia, Nostoc, Oochromonas, Oocystis, Ochromonas, Pavlova, Phaeodactylum, Playtmonas, Pleurochrysis, Porphyra, Pseudoanabaena, Pyramimonas, Stichococcus, Synechococcus, Synechocystis, Tetraselmis, Thalassiosira,* and *Trichodesmium*.

A part of a plant, i.e., a "plant tissue" may be treated according to the methods of the present invention to produce an improved or modified plant. Plant tissue also encompasses plant cells. The term "plant cell" as used herein refers to individual units of a living plant, either in an intact whole plant or in an isolated form grown in in vitro tissue cultures, on media or agar, in suspension in a growth media or buffer or as a part of higher organized unites, such as, for example, plant tissue, a plant organ, or a whole plant.

A "protoplast" refers to a plant cell that has had its protective cell wall completely or partially removed using, for example, mechanical or enzymatic means resulting in an intact biochemical competent unit of living plant that can reform their cell wall, proliferate and regenerate grow into a whole plant under proper growing conditions.

The term "transformation" broadly refers to the process by which a plant host is genetically modified by the introduction of DNA by means of Agrobacteria or one of a variety of chemical or physical methods. As used herein, the term "plant host" refers to plants, including any cells, tissues, organs, or progeny of the plants. Many suitable plant tissues or plant cells can be transformed and include, but are not limited to, protoplasts, somatic embryos, pollen, leaves, seedlings, stems, calli, stolons, microtubers, and shoots. A plant tissue also refers to any clone of such a plant, seed, progeny, propagule whether generated sexually or asexually, and descendents of any of these, such as cuttings or seed.

The term "transformed" as used herein, refers to a cell, tissue, organ, or organism into which a foreign DNA molecule, such as a construct, has been introduced. The introduced DNA molecule may be integrated into the genomic DNA of the recipient cell, tissue, organ, or organism such that the introduced DNA molecule is transmitted to the subsequent progeny. In these embodiments, the "transformed" or "transgenic" cell or plant may also include progeny of the cell or plant and progeny produced from a breeding program employing such a transformed plant as a parent in a cross and exhibiting an altered phenotype resulting from the presence of the introduced DNA molecule. Preferably, the transgenic plant is fertile and capable of transmitting the introduced DNA to progeny through sexual reproduction. In some embodiments, the transgenic plant is male sterile or capable of producing male sterile non-transgenic seeds.

The term "progeny", such as the progeny of a transgenic plant, is one that is born of, begotten by, or derived from a plant or the transgenic plant. The introduced DNA molecule may also be transiently introduced into the recipient cell such that the introduced DNA molecule is not inherited by subsequent progeny and thus not considered "transgenic". Accordingly, as used herein, a "non-transgenic" plant or plant cell is a plant which does not contain a foreign DNA stably integrated into its genome.

The term "plant promoter" as used herein is a promoter capable of initiating transcription in plant cells, whether or not its origin is a plant cell. Exemplary suitable plant promoters include, but are not limited to, those that are obtained from plants, plant viruses, and bacteria such as *Agrobacterium* or *Rhizobium* which comprise genes expressed in plant cells.

As used herein, a "fungal cell" refers to any type of eukaryotic cell within the kingdom of fungi. Phyla within the kingdom of fungi include Ascomycota, Basidiomycota, Blastocladiomycota, Chytridiomycota, Glomeromycota, Microsporidia, and Neocallimastigomycota. Fungal cells may include yeasts, molds, and filamentous fungi. In some embodiments, the fungal cell is a yeast cell.

As used herein, the term "yeast cell" refers to any fungal cell within the phyla Ascomycota and Basidiomycota. Yeast cells may include budding yeast cells, fission yeast cells, and mold cells. Without being limited to these organisms, many types of yeast used in laboratory and industrial settings are part of the phylum Ascomycota. In some embodiments, the yeast cell is an *S. cerevisiae, Kluyveromyces marxianus*, or *Issatchenkia orientalis* cell. Other yeast cells may include without limitation *Candida* spp. (e.g., *Candida albicans*), *Yarrowia* spp. (e.g., *Yarrowia lipolytica*), *Pichia* spp. (e.g., *Pichia pastoris*), *Kluyveromyces* spp. (e.g., *Kluyveromyces lactis* and *Kluyveromyces marxianus*), *Neurospora* spp. (e.g., *Neurospora crassa*), *Fusarium* spp. (e.g., *Fusarium oxysporum*), and *Issatchenkia* spp. (e.g., *Issatchenkia orientalis*, a.k.a. *Pichia kudriavzevii* and *Candida acidothermophilum*). In some embodiments, the fungal cell is a filamentous fungal cell. As used herein, the term "filamentous fungal cell" refers to any type of fungal cell that grows in filaments, i.e., hyphae or mycelia. Examples of filamentous fungal cells may include without limitation *Aspergillus* spp. (e.g., *Aspergillus niger*), *Trichoderma* spp. (e.g., *Trichoderma reesei*), *Rhizopus* spp. (e.g., *Rhizopus oryzae*), and *Mortierella* spp. (e.g., *Mortierella isabellina*).

In some embodiments, the fungal cell is an industrial strain. As used herein, "industrial strain" refers to any strain of fungal cell used in or isolated from an industrial process, e.g., production of a product on a commercial or industrial scale. Industrial strain may refer to a fungal species that is typically used in an industrial process, or it may refer to an isolate of a fungal species that may be also used for non-industrial purposes (e.g., laboratory research). Examples of industrial processes may include fermentation (e.g., in production of food or beverage products), distillation, biofuel production, production of a compound, and production of a polypeptide. Examples of industrial strains may include, without limitation, JAY270 and ATCC4124.

In some embodiments, the fungal cell is a polyploid cell. As used herein, a "polyploid" cell may refer to any cell whose genome is present in more than one copy. A polyploid cell may refer to a type of cell that is naturally found in a polyploid state, or it may refer to a cell that has been induced to exist in a polyploid state (e.g., through specific regulation, alteration, inactivation, activation, or modification of meiosis, cytokinesis, or DNA replication). A polyploid cell may refer to a cell whose entire genome is polyploid, or it may refer to a cell that is polyploid in a particular genomic locus of interest. Without wishing to be bound to theory, it is thought that the abundance of guideRNA may more often be a rate-limiting component in genome engineering of polyploid cells than in haploid cells, and thus the methods using the CRISPR-Cas CRISPR system described herein may take advantage of using a certain fungal cell type.

In some embodiments, the fungal cell is a diploid cell. As used herein, a "diploid" cell may refer to any cell whose genome is present in two copies. A diploid cell may refer to a type of cell that is naturally found in a diploid state, or it may refer to a cell that has been induced to exist in a diploid state (e.g., through specific regulation, alteration, inactivation, activation, or modification of meiosis, cytokinesis, or DNA replication). For example, the *S. cerevisiae* strain S228C may be maintained in a haploid or diploid state. A diploid cell may refer to a cell whose entire genome is diploid, or it may refer to a cell that is diploid in a particular genomic locus of interest. In some embodiments, the fungal cell is a haploid cell. As used herein, a "haploid" cell may refer to any cell whose genome is present in one copy. A haploid cell may refer to a type of cell that is naturally found in a haploid state, or it may refer to a cell that has been induced to exist in a haploid state (e.g., through specific regulation, alteration, inactivation, activation, or modification of meiosis, cytokinesis, or DNA replication). For example, the *S. cerevisiae* strain S228C may be maintained in a haploid or diploid state. A haploid cell may refer to a cell whose entire genome is haploid, or it may refer to a cell that is haploid in a particular genomic locus of interest.

As used herein, a "yeast expression vector" refers to a nucleic acid that contains one or more sequences encoding an RNA and/or polypeptide and may further contain any desired elements that control the expression of the nucleic acid(s), as well as any elements that enable the replication and maintenance of the expression vector inside the yeast cell. Many suitable yeast expression vectors and features thereof are known in the art; for example, various vectors and techniques are illustrated in Yeast Protocols, 2nd edition, Xiao, W., ed. (Humana Press, New York, 2007) and Buckholz, R. G. and Gleeson, M. A. (1991) Biotechnology (NY) 9(11): 1067-72. Yeast vectors may contain, without limitation, a centromeric (CEN) sequence, an autonomous replication sequence (ARS), a promoter, such as an RNA Polymerase III promoter, operably linked to a sequence or gene of interest, a terminator such as an RNA polymerase III terminator, an origin of replication, and a marker gene (e.g., auxotrophic, antibiotic, or other selectable markers). Examples of expression vectors for use in yeast may include plasmids, yeast artificial chromosomes, 2µ plasmids, yeast integrative plasmids, yeast replicative plasmids, shuttle vectors, and episomal plasmids.

Stable Integration of CRISPR-Cas System Components in the Genome of Plants and Plant Cells, or Algae or Yeasts In particular embodiments, it is envisaged that the polynucleotides encoding the components of the CRISPR-Cas system are introduced for stable integration into the genome of a plant cell, algae cell, or yeast cell. In these embodiments, the design of the transformation vector or the expression system can be adjusted depending on for when, where and under what conditions the guide RNA and/or the CRISPR protein gene are expressed.

In particular embodiments, it is envisaged to introduce the components of the CRISPR-Cas system stably into the genomic DNA of a plant cell. Additionally or alternatively, itis envisaged to introduce the components of the CRISPR-Cas system for stable integration into the DNA of a plant organelle such as, but not limited to a plastid, a mitochondrion or a chloroplast.

The expression system for stable integration into the genome of a plant cell may contain one or more of the following elements: a promoter element that can be used to express the RNA and/or CRISPR-Cas enzyme in a plant cell; a 5' untranslated region to enhance expression; an intron element to further enhance expression in certain cells, such as monocot cells; a multiple-cloning site to provide convenient restriction sites for inserting the guide RNA and/or the CRISPR-Cas gene sequences and other desired elements; and a 3' untranslated region to provide for efficient termination of the expressed transcript.

The elements of the expression system may be on one or more expression constructs which are either circular such as a plasmid or transformation vector, or non-circular such as linear double stranded DNA.

In a particular embodiment, a CRISPR-Cas expression system comprises at least: a nucleotide sequence encoding a guide RNA (gRNA) that hybridizes with a target sequence in a plant, and wherein the guide RNA comprises a guide sequence and a direct repeat sequence, and a nucleotide sequence encoding a CRISPR-Cas protein, wherein components (a) or (b) are located on the same or on different constructs, and whereby the different nucleotide sequences can be under control of the same or a different regulatory element operable in a plant cell. The skilled person will understand that if and when needed a tracr sequence may be included as well.

DNA construct(s) containing the components of the CRISPR-Cas system, and, where applicable, template sequence may be introduced into the genome of a plant, plant part, or plant cell by a variety of conventional techniques. The process generally comprises the steps of selecting a suitable host cell or host tissue, introducing the construct(s) into the host cell or host tissue, and regenerating plant cells or plants therefrom.

In particular embodiments, the DNA construct may be introduced into the plant cell using techniques such as but not limited to electroporation, microinjection, aerosol beam injection of plant cell protoplasts, or the DNA constructs can be introduced directly to plant tissue using biolistic methods, such as DNA particle bombardment (see also Fu et al., TransgenicRes. 2000 February; 9(1):11-9). The basis of particle bombardment is the acceleration of particles coated with gene/s of interest toward cells, resulting in the penetration of the protoplasm by the particles and typically stable integration into the genome. (see e.g. Klein et al, Nature (1987), Klein et ah, Bio/Technology (1992), Casas et ah, Proc. Natl. Acad. Sci. USA (1993)).

In particular embodiments, the DNA constructs containing components of the CRISPR-Cas system may be introduced into the plant by *Agrobacterium*-mediated transformation. The DNA constructs may be combined with suitable T-DNA flanking regions and introduced into a conventional *Agrobacterium tumefaciens* host vector. The foreign DNA can be incorporated into the genome of plants by infecting the plants or by incubating plant protoplasts with *Agrobacterium* bacteria, containing one or more Ti (tumor-inducing) plasmids. (see e.g. Fraley et al., (1985), Rogers et al., (1987) and U.S. Pat. No. 5,563,055).

Plant Promoters

In order to ensure appropriate expression in a plant cell, the components of the CRISPR-Cas system described herein are typically placed under control of a plant promoter, i.e. a promoter operable in plant cells. The use of different types of promoters is envisaged.

A constitutive plant promoter is a promoter that is able to express the open reading frame (ORF) that it controls in all or nearly all of the plant tissues during all or nearly all developmental stages of the plant (referred to as "constitutive expression"). One non-limiting example of a constitutive promoter is the cauliflower mosaic virus 35S promoter. "Regulated promoter" refers to promoters that direct gene expression not constitutively, but in a temporally- and/or spatially-regulated manner, and includes tissue-specific, tissue-preferred and inducible promoters. Different promoters may direct the expression of a gene in different tissues or cell types, or at different stages of development, or in response to different environmental conditions. In particular embodiments, one or more of the CRISPR-Cas components are expressed under the control of a constitutive promoter, such as the cauliflower mosaic virus 35S promoter issue-preferred promoters can be utilized to target enhanced expression in certain cell types within a particular plant tissue, for instance vascular cells in leaves or roots or in specific cells of the seed. Examples of particular promoters for use in the CRISPR-Cas system are found in Kawamata et al., (1997) Plant Cell Physiol 38:792-803; Yamamoto et al., (1997) Plant J 12:255-65; Hire et al, (1992) Plant Mol Biol 20:207-18, Kuster et al, (1995) Plant Mol Biol 29:759-72, and Capana et al., (1994) Plant Mol Biol 25:681-91.

Examples of promoters that are inducible and that allow for spatiotemporal control of gene editing or gene expression may use a form of energy. The form of energy may include but is not limited to sound energy, electromagnetic radiation, chemical energy and/or thermal energy. Examples of inducible systems include tetracycline inducible promoters (Tet-On or Tet-Off), small molecule two-hybrid transcription activations systems (FKBP, ABA, etc), or light inducible systems (Phytochrome, LOV domains, or cryptochrome), such as a Light Inducible Transcriptional Effector (LITE) that direct changes in transcriptional activity in a sequence-specific manner. The components of a light inducible system may include a CRISPR-Cas enzyme, a light-responsive cytochrome heterodimer (e.g. from *Arabidopsis thaliana*), and a transcriptional activation/repression domain. Further examples of inducible DNA binding proteins and methods for their use are provided in U.S. 61/736,465 and U.S. 61/721,283, which is hereby incorporated by reference in its entirety.

In particular embodiments, transient or inducible expression can be achieved by using, for example, chemical-regulated promotors, i.e. whereby the application of an exogenous chemical induces gene expression. Modulating of gene expression can also be obtained by a chemical-repressible promoter, where application of the chemical represses gene expression. Chemical-inducible promoters include, but are not limited to, the maize ln2-2 promoter, activated by benzene sulfonamide herbicide safeners (De Veylder et al., (1997) Plant CellPhysiol 38:568-77), the maize GST promoter (GST-ll-27, WO93/01294), activated by hydrophobic electrophilic compounds used as pre-emergent herbicides, and the tobacco PR-1 a promoter (Ono et al., (2004) Biosci Biotechnol Biochem 68:803-7) activated by salicylic acid. Promoters which are regulated by antibiotics, such as tetracycline-inducible and tetracycline-repressible promoters (Gatz et al., (1991) Mol Gen Genet 227: 229-37; U.S. Pat. Nos. 5,814,618 and 5,789,156) can also be used herein.

Translocation to and/or Expression in Specific Plant Organelles

The expression system may comprise elements for translocation to and/or expression in a specific plant organelle.

Chloroplast Targeting

In particular embodiments, it is envisaged that the CRISPR-Cas system is used to specifically modify chloroplast genes or to ensure expression in the chloroplast. For this purpose use is made of chloroplast transformation methods or compartmentalization of the CRISPR-Cas components to the chloroplast. For instance, the introduction of genetic modifications in the plastid genome can reduce biosafety issues such as gene flow through pollen.

Methods of chloroplast transformation are known in the art and include Particle bombardment, PEG treatment, and microinjection. Additionally, methods involving the translocation of transformation cassettes from the nuclear genome to the plastid can be used as described in WO2010061186.

Alternatively, it is envisaged to target one or more of the CRISPR-Cas components to the plant chloroplast. This is achieved by incorporating in the expression construct a sequence encoding a chloroplast transit peptide (CTP) or plastid transit peptide, operably linked to the 5' region of the sequence encoding the CRISPR-Cas protein. The CTP is removed in a processing step during translocation into the chloroplast. Chloroplast targeting of expressed proteins is well known to the skilled artisan (see for instance Protein Transport into Chloroplasts, 2010, Annual Review of Plant Biology, Vol. 61: 157-180). In such embodiments it is also desired to target the guide RNA to the plant chloroplast. Methods and constructs which can be used for translocating guide RNA into the chloroplast by means of a chloroplast localization sequence are described, for instance, in US 20040142476, incorporated herein by reference. Such variations of constructs can be incorporated into the expression systems of the invention to efficiently translocate the CRISPR-Cas-guide RNA.

Mitochondrion Targeting

Mitochondrial gene expression has been linked to desirable plant phenotypes such as male sterility. Bosacchi et al., Plant Physiology 169:2129-2137 (2015), which is incorporated by reference in its entirety. In particular embodiments, it is envisaged that the CRISPR-Cas system is used to specifically modify mitochondrial DNA or to ensure expression thereof in the mitochondrion. Jo et al., Biomed Research International 2015:305716 (2015), which is incorporated by reference in its entirety. For this purpose use is made of mitochondrion transformation methods or compartmentalization of the CRISPR-Cas components to the mitochondrion.

Targeting to plant mitochondria can occur in different ways in nature. The most common is through the presence of an N-terminal presequence, the actual sequence of which varies but which generally has a number of conserved features. The mitochondrial targeting sequences of plants are generally about 40 amino acids in length, they have a net positive charge (rich in arginine and poor in acidic amino acids), contain many aliphatic residues (mainly leucine and alanine), and are particularly rich in serine residues (Peeters et al. 2001, BBA-Mol. Cell Res. 1541: 54-63).

Examples of mitochondrial targeting sequences that have been shown to be suitable for targeting heterologous proteins to the mitochondria include the mitochondrial-targeting sequence derived from atp2-1 (Yang et al. 2010, BMC Plant Biology 10:231) and the presequence of the yeast cytochrome C oxidase subunit IV (Chuah et al. 2015, Scientific Reports 5:7751).

Introduction of polynucleotides encoding the CRISPR-Cas system in Algal cells.

Transgenic algae (or other plants such as rape) may be particularly useful in the production of vegetable oils or biofuels such as alcohols (especially methanol and ethanol) or other products. These may be engineered to express or overexpress high levels of oil or alcohols for use in the oil or biofuel industries.

U.S. Pat. No. 8,945,839 describes a method for engineering Micro-Algae (*Chlamydomonas reinhardtii* cells) species) using CRISPR/Cas. Using similar tools, the methods of the CRISPR-Cas system described herein can be applied on *Chlamydomonas* species and other algae. In particular embodiments, CRISPR protein and guide RNA are introduced in algae expressed using a vector that expresses CRISPR protein under the control of a constitutive promoter such as Hsp70A-Rbc S2 or Beta2-tubulin. Guide RNA is optionally delivered using a vector containing T7 promoter. Alternatively, CRISPR protein mRNA and in vitro transcribed guide RNA can be delivered to algal cells. Electroporation protocols are available to the skilled person such as the standard recommended protocol from the GeneArt *Chlamydomonas* Engineering kit.

In particular embodiments, the endonuclease used herein is a Split CRISPR protein. Split CRISPR proteins are preferentially used in Algae for targeted genome modification as has been described for Cas9 in WO 2015086795. Use of the CRISPR protein split system is particularly suitable for an inducible method of genome targeting and avoids the potential toxic effect of the CRISPR protein overexpression within the algae cell. In particular embodiments, Said CRISPR protein split domains (e.g. RuvC and HNH domains for Cas9) can be simultaneously or sequentially introduced into the cell such that said split CRISPR protein domain(s) process the target nucleic acid sequence in the algae cell. The reduced size of the split CRISPR protein compared to the wild type CRISPR protein allows other methods of delivery of the CRISPR system to the cells, such as the use of Cell Penetrating Peptides as described herein. This method is of particular interest for generating genetically modified algae.

Introduction of Polynucleotides Encoding CRISPR-Cas Components in Yeast Cells

In particular embodiments, the invention relates to the use of the CRISPR-Cas system for genome editing of yeast cells. Methods for transforming yeast cells which can be used to introduce polynucleotides encoding the CRISPR-Cas system components are well known to the artisan and are reviewed by Kawai et al., 2010, Bioeng Bugs. 2010 November-December; 1(6): 395-403). Non-limiting examples include transformation of yeast cells by lithium acetate treatment (which may further include carrier DNA and PEG treatment), bombardment or by electroporation.

Transient Expression of CRISPR-Cas System Components in Plants and Plant Cell

In particular embodiments, it is envisaged that the guide RNA and/or CRISPR protein gene are transiently expressed in the plant cell. In these embodiments, the CRISPR-Cas system can ensure modification of a target gene only when both the guide RNA and the CRISPR protein is present in a cell, such that genomic modification can further be controlled. As the expression of the CRISPR protein is transient, plants regenerated from such plant cells typically contain no foreign DNA. In particular embodiments the CRISPR protein is stably expressed by the plant cell and the guide sequence is transiently expressed.

In particular embodiments, the CRISPR-Cas system components can be introduced in the plant cells using a plant viral vector (Scholthof et al. 1996, Annu Rev Phytopathol. 1996; 34:299-323). In further particular embodiments, said viral vector is a vector from a DNA virus. For example, geminivirus (e.g., cabbage leaf curl virus, bean yellow dwarf virus, wheat dwarf virus, tomato leaf curl virus, maize streak virus, tobacco leaf curl virus, or tomato golden mosaic virus) or nanovirus (e.g., Faba bean necrotic yellow virus). In other particular embodiments, said viral vector is a vector from an RNA virus. For example, tobravirus (e.g., tobacco rattle virus, tobacco mosaic virus), potexvirus (e.g., potato virus X), or hordeivirus (e.g., barley stripe mosaic virus). The replicating genomes of plant viruses are non-integrative vectors.

In particular embodiments, the vector used for transient expression of CRISPR-Cas constructs is for instance a pEAQ vector, which is tailored for *Agrobacterium*-mediated transient expression (Sainsbury F. et al., Plant Biotechnol J. 2009 September; 7(7):682-93) in the protoplast. Precise targeting of genomic locations was demonstrated using a modified Cabbage Leaf Curl virus (CaLCuV) vector to express gRNAs in stable transgenic plants expressing a CRISPR enzyme (Scientific Reports 5, Article number: 14926 (2015), doi:10.1038/srep14926).

In particular embodiments, double-stranded DNA fragments encoding the guide RNA and/or the CRISPR protein gene can be transiently introduced into the plant cell. In such embodiments, the introduced double-stranded DNA fragments are provided in sufficient quantity to modify the cell but do not persist after a contemplated period of time has passed or after one or more cell divisions. Methods for direct DNA transfer in plants are known by the skilled artisan (see for instance Davey et al. Plant Mol Biol. 1989 September; 13(3):273-85.)

In other embodiments, an RNA polynucleotide encoding the CRISPR protein is introduced into the plant cell, which is then translated and processed by the host cell generating the protein in sufficient quantity to modify the cell (in the presence of at least one guide RNA) but which does not persist after a contemplated period of time has passed or after one or more cell divisions. Methods for introducing mRNA to plant protoplasts for transient expression are known by the skilled artisan (see for instance in Gallie, Plant Cell Reports (1993), 13; 119-122).

Combinations of the different methods described above are also envisaged.

Delivery of CRISPR-Cas Components to the Plant Cell

In particular embodiments, it is of interest to deliver one or more components of the CRISPR-Cas system directly to the plant cell. This is of interest, inter alia, for the generation of non-transgenic plants (see below). In particular embodiments, one or more of the components is prepared outside the plant or plant cell and delivered to the cell. For instance in particular embodiments, the CRISPR protein is prepared in vitro prior to introduction to the plant cell. CRISPR protein can be prepared by various methods known by one of skill in the art and include recombinant production. After expression, the CRISPR protein is isolated, refolded if needed, purified and optionally treated to remove any purification tags, such as a His-tag. Once crude, partially purified, or more completely purified CRISPR protein is obtained, the protein may be introduced to the plant cell.

In particular embodiments, the CRISPR protein is mixed with guide RNA targeting the gene of interest to form a pre-assembled ribonucleoprotein.

The individual components or pre-assembled ribonucleoprotein can be introduced into the plant cell via electroporation, by bombardment with CRISPR protein-associated gene product coated particles, by chemical transfection or by some other means of transport across a cell membrane. For instance, transfection of a plant protoplast with a pre-assembled CRISPR ribonucleoprotein has been demonstrated to ensure targeted modification of the plant genome (as described by Woo et al. Nature Biotechnology, 2015; DOI: 10.1038/nbt.3389).

In particular embodiments, the CRISPR-Cas system components are introduced into the plant cells using nanoparticles. The components, either as protein or nucleic acid or in a combination thereof, can be uploaded onto or packaged in nanoparticles and applied to the plants (such as for instance described in WO 2008042156 and US 20130185823). In particular, embodiments of the invention comprise nanoparticles uploaded with or packed with DNA molecule(s) encoding the CRISPR protein, DNA molecules encoding the guide RNA and/or isolated guide RNA as described in WO2015089419.

Further means of introducing one or more components of the CRISPR-Cas system to the plant cell is by using cell penetrating peptides (CPP). Accordingly, in particular, embodiments the invention comprises compositions comprising a cell penetrating peptide linked to the CRISPR protein. In particular embodiments of the present invention, the CRISPR protein and/or guide RNA is coupled to one or more CPPs to effectively transport them inside plant protoplasts; see also Ramakrishna (20140Genome Res. 2014 June; 24(6):1020-7 for Cas9 in human cells). In other embodiments, the CRISPR protein gene and/or guide RNA are encoded by one or more circular or non-circular DNA molecule(s) which are coupled to one or more CPPs for plant protoplast delivery. The plant protoplasts are then regenerated to plant cells and further to plants. CPPs are generally described as short peptides of fewer than 35 amino acids either derived from proteins or from chimeric sequences which are capable of transporting biomolecules across cell membrane in a receptor independent manner. CPP can be cationic peptides, peptides having hydrophobic sequences, amphipathic peptides, peptides having proline-rich and antimicrobial sequence, and chimeric or bipartite peptides (Pooga and Langel 2005).

CPPs are able to penetrate biological membranes and as such trigger the movement of various biomolecules across cell membranes into the cytoplasm and to improve their intracellular routing, and hence facilitate interaction of the biomolecule with the target. Examples of CPP include amongst others: Tat, a nuclear transcriptional activator protein required for viral replication by HIV type1, penetratin, Kaposi fibroblast growth factor (FGF) signal peptide sequence, integrin β3 signal peptide sequence; polyarginine peptide Args sequence, Guanine rich-molecular transporters, sweet arrow peptide, etc.

Use of the CRISPR-Cas System to Make Genetically Modified Non-Transgenic Plants

In particular embodiments, the methods described herein are used to modify endogenous genes or to modify their expression without the permanent introduction into the genome of the plant of any foreign gene, including those encoding CRISPR components, so as to avoid the presence of foreign DNA in the genome of the plant. This can be of interest as the regulatory requirements for non-transgenic plants are less rigorous.

In particular embodiments, this is ensured by transient expression of the CRISPR-Cas components. In particular embodiments one or more of the CRISPR components are expressed on one or more viral vectors which produce sufficient CRISPR protein and guide RNA to consistently steadily ensure modification of a gene of interest according to a method described herein.

In particular embodiments, transient expression of CRISPR-Cas constructs is ensured in plant protoplasts and thus not integrated into the genome. The limited window of expression can be sufficient to allow the CRISPR-Cas system to ensure modification of a target gene as described herein.

In particular embodiments, the different components of the CRISPR-Cas system are introduced in the plant cell, protoplast or plant tissue either separately or in mixture, with the aid of particulate delivering molecules such as nanoparticles or CPP molecules as described herein above.

The expression of the CRISPR-Cas components can induce targeted modification of the genome, either by direct activity of the CRISPR protein nuclease and optionally introduction of template DNA or by modification of genes targeted using the CRISPR-Cas system as described herein. The different strategies described herein above allow CRISPR protein-mediated targeted genome editing without requiring the introduction of the CRISPR-Cas components into the plant genome. Components which are transiently introduced into the plant cell are typically removed upon crossing.

Detecting Modifications in the Plant Genome-Selectable Markers

In particular embodiments, where the method involves detection/identification and/or modification of an endogeneous target gene of the plant genome, any suitable method can be used to determine, after the plant, plant part or plant cell is infected or transfected with the CRISPR-Cas system, whether gene targeting or targeted mutagenesis has occurred at the target site. Where the method involves introduction of a transgene, a transformed plant cell, callus, tissue or plant may be identified and isolated by selecting or screening the engineered plant material for the presence of the transgene or for traits encoded by the transgene. Physical and biochemical methods may be used to identify plant or plant cell transformants containing inserted gene constructs or an endogenous DNA modification. These methods include but are not limited to: 1) Southern analysis or PCR amplification for detecting and determining the structure of the recombinant DNA insert or modified endogenous genes; 2) Northern blot, S1 RNase protection, primer-extension or reverse transcriptase-PCR amplification for detecting and examining RNA transcripts of the gene constructs; 3) enzymatic assays for detecting enzyme or ribozyme activity, where such gene products are encoded by the gene construct or expression is affected by the genetic modification; 4) protein gel electrophoresis, Western blot techniques, immunoprecipitation, or enzyme-linked immunoassays, where the gene construct or endogenous gene products are proteins. Additional techniques, such as in situ hybridization, enzyme staining, and immunostaining, also may be used to detect the presence or expression of the recombinant construct or detect a modification of endogenous gene in specific plant organs and tissues. The methods for doing all these assays are well known to those skilled in the art.

Additionally (or alternatively), the expression system encoding the CRISPR-Cas components is typically designed to comprise one or more selectable or detectable markers that provide a means to isolate or efficiently select cells that contain and/or have been modified by the CRISPR-Cas system at an early stage and on a large scale.

In the case of *Agrobacterium*-mediated transformation, the marker cassette may be adjacent to or between flanking T-DNA borders and contained within a binary vector. In another embodiment, the marker cassette may be outside of the T-DNA. A selectable marker cassette may also be within or adjacent to the same T-DNA borders as the expression cassette or may be somewhere else within a second T-DNA on the binary vector (e.g., a 2 T-DNA system).

For particle bombardment or with protoplast transformation, the expression system can comprise one or more isolated linear fragments or may be part of a larger construct that might contain bacterial replication elements, bacterial selectable markers or other detectable elements. The expression cassette(s) comprising the polynucleotides encoding the guide and/or CRISPR protein may be physically linked to a marker cassette or may be mixed with a second nucleic acid molecule encoding a marker cassette. The marker cassette is comprised of necessary elements to express a detectable or selectable marker that allows for efficient selection of transformed cells.

The selection procedure for the cells based on the selectable marker will depend on the nature of the marker gene. In particular embodiments, use is made of a selectable marker, i.e. a marker which allows a direct selection of the cells based on the expression of the marker. A selectable marker can confer positive or negative selection and is conditional or non-conditional on the presence of external substrates (Miki et al. 2004, 107(3): 193-232). Most commonly, antibiotic or herbicide resistance genes are used as a marker, whereby selection is be performed by growing the engineered plant material on media containing an inhibitory amount of the antibiotic or herbicide to which the marker gene confers resistance. Examples of such genes are genes that confer resistance to antibiotics, such as hygromycin (hpt) and kanamycin (nptII), and genes that confer resistance to herbicides, such as phosphinothricin (bar) and chlorsulfuron (als).

Transformed plants and plant cells may also be identified by screening for the activities of a visible marker, typically an enzyme capable of processing a colored substrate (e.g., the β-glucuronidase, luciferase, B or C1 genes). Such selection and screening methodologies are well known to those skilled in the art.

Plant Cultures and Regeneration

In particular embodiments, plant cells which have a modified genome and that are produced or obtained by any of the methods described herein, can be cultured to regenerate a whole plant which possesses the transformed or modified genotype and thus the desired phenotype. Conventional regeneration techniques are well known to those skilled in the art. Particular examples of such regeneration techniques rely on manipulation of certain phytohormones in a tissue culture growth medium, and typically relying on a biocide and/or herbicide marker which has been introduced together with the desired nucleotide sequences. In further particular embodiments, plant regeneration is obtained from cultured protoplasts, plant callus, explants, organs, pollens, embryos or parts thereof (see e.g. Evans et al. (1983), Handbook of Plant Cell Culture, Klee et al (1987) Ann. Rev. of Plant Phys.).

In particular embodiments, transformed or improved plants as described herein can be self-pollinated to provide seed for homozygous improved plants of the invention (homozygous for the DNA modification) or crossed with non-transgenic plants or different improved plants to provide seed for heterozygous plants. Where a recombinant DNA was introduced into the plant cell, the resulting plant of such a crossing is a plant which is heterozygous for the recombinant DNA molecule. Both such homozygous and heterozygous plants obtained by crossing from the improved plants and comprising the genetic modification (which can be a recombinant DNA) are referred to herein as "progeny". Progeny plants are plants descended from the original transgenic plant and containing the genome modification or recombinant DNA molecule introduced by the methods provided herein. Alternatively, genetically modified plants can be obtained by one of the methods described supra using the Cas9 or Cfp1 enzyme whereby no foreign DNA is incorporated into the genome. Progeny of such plants, obtained by further breeding may also contain the genetic modification. Breedings are performed by any breeding methods that are commonly used for different crops (e.g., Allard, Principles of Plant Breeding, John Wiley & Sons, NY, U. of CA, Davis, CA, 50-98 (1960).

Generation or Identification of Plants with Enhanced Agronomic Traits

The CRISPR protein based CRISPR systems provided herein can be used to introduce targeted double-strand or single-strand breaks and/or to introduce gene activator and/or repressor systems and without being limitative, can be used for gene targeting, gene replacement, targeted mutagenesis, targeted deletions or insertions, targeted inversions and/or targeted translocations. By co-expression of multiple targeting RNAs directed to achieve multiple modifications in a single cell, multiplexed genome modification can be ensured. This technology can be used to high-precision engineering of plants with improved characteristics, including enhanced nutritional quality, increased resistance to diseases and resistance to biotic and abiotic stress, and increased production of commercially valuable plant products or heterologous compounds.

In particular embodiments, the CRISPR-Cas system as described herein is used to detect and/or introduce targeted double-strand breaks (DSB) in an endogenous DNA sequence. The DSB activates cellular DNA repair pathways, which can be harnessed to achieve desired DNA sequence modifications near the break site. This is of interest where the inactivation of endogenous genes can confer or contribute to a desired trait. In particular embodiments, homologous recombination with a template sequence is promoted at the site of the DSB, in order to introduce a gene of interest.

In particular embodiments, the CRISPR-Cas system may be used as a generic nucleic acid binding protein with fusion to or being operably linked to a functional domain for activation and/or repression of endogenous plant genes. Exemplary functional domains may include but are not limited to translational initiator, translational activator, translational repressor, nucleases, in particular ribonucleases, a spliceosome, beads, a light inducible/controllable domain or a chemically inducible/controllable domain. Typically in these embodiments, the CRISPR protein comprises at least one mutation, such that it has no more than 5% of the activity of the CRISPR protein not having the at least one mutation; the guide RNA comprises a guide sequence capable of hybridizing to a target sequence.

The methods described herein generally result in the generation of "improved plants" in that they have one or more desirable traits compared to the wildtype plant. In particular embodiments, the plants, plant cells or plant parts obtained are transgenic plants, comprising an exogenous DNA sequence incorporated into the genome of all or part of the cells of the plant. In particular embodiments, non-transgenic genetically modified plants, plant parts or cells are obtained, in that no exogenous DNA sequence is incorporated into the genome of any of the plant cells of the plant. In such embodiments, the improved plants are non-transgenic. Where only the modification of an endogenous gene is ensured and no foreign genes are introduced or maintained in the plant genome, the resulting genetically modified crops contain no foreign genes and can thus basically be considered non-transgenic. The different applications of the CRISPR-Cas system for plant genome editing are described more in detail below:

a) Introduction of One or More Foreign Genes to Identify or Confer an Agricultural Trait of Interest The invention provides methods of genome editing or modifying sequences associated with or at a target locus of interest wherein the method comprises introducing a CRISPR effector protein complex into a plant cell, whereby the CRISPR effector protein complex effectively functions to integrate a DNA insert, e.g. encoding a foreign gene of interest, into the genome of the plant cell. In preferred embodiments the integration of the DNA insert is facilitated by HR with an exogenously introduced DNA template or repair template. Typically, the exogenously introduced DNA template or repair template is delivered together with the CRISPR effector protein complex or one component or a polynucleotide vector for expression of a component of the complex.

The CRISPR-Cas systems provided herein allow for targeted gene delivery. It has become increasingly clear that the efficiency of expressing a gene of interest is to a great extent determined by the location of integration into the genome. The present methods allow for targeted integration of the foreign gene into a desired location in the genome. The location can be selected based on information of previously generated events or can be selected by methods disclosed elsewhere herein.

In particular embodiments, the methods provided herein include (a) introducing into the cell a CRISPR-Cas complex comprising a guide RNA, comprising a direct repeat and a guide sequence, wherein the guide sequence hybridizes to a target sequence that is endogenous to the plant cell; (b) introducing into the plant cell a CRISPR effector molecule which complexes with the guide RNA when the guide sequence hybridizes to the target sequence and induces a double strand break at or near the sequence to which the guide sequence is targeted; and (c) introducing into the cell a nucleotide sequence encoding an HDR repair template which encodes the gene of interest and which is introduced into the location of the DS break as a result of HDR. In particular embodiments, the step of introducing can include delivering to the plant cell one or more polynucleotides encoding CRISPR effector protein, the guide RNA and the repair template. In particular embodiments, the polynucleotides are delivered into the cell by a DNA virus (e.g., a geminivirus) or an RNA virus (e.g., a tobravirus). In particular embodiments, the introducing steps include delivering to the plant cell a T-DNA containing one or more polynucleotide sequences encoding the CRISPR effector protein, the guide RNA and the repair template, where the delivering is via *Agrobacterium*. The nucleic acid sequence encoding the CRISPR effector protein can be operably linked to a promoter, such as a constitutive promoter (e.g., a cauliflower mosaic virus 35S promoter), or a cell specific or inducible promoter. In particular embodiments, the polynucleotide is introduced by microprojectile bombardment. In particular embodiments, the method further includes screening the plant cell after the introducing steps to determine whether the repair template i.e. the gene of interest has been introduced. In particular embodiments, the methods include the step of regenerating a plant from the plant cell. In further embodiments, the methods include cross breeding the plant to obtain a genetically desired plant lineage. Examples of foreign genes encoding a trait of interest are listed below.

b) Editing of Endogenous Genes to Identify or Confer an Agricultural Trait of Interest The invention provides methods of genome editing or modifying sequences associated with or at a target locus of interest wherein the method comprises introducing a CRISPR effector protein complex into a plant cell, whereby the CRISPR-Cas complex modifies the expression of an endogenous gene of the plant. This can be achieved in different ways, in particular embodiments, the elimination of expression of an endogenous gene is desirable and the CRISPR-Cas complex is used to target and cleave an endogenous gene so as to modify gene expression. In these embodiments, the methods provided herein include (a) introducing into the plant cell a CRISPR-Cas complex comprising a guide RNA, comprising a direct repeat and a guide sequence, wherein the guide sequence hybridizes to a target sequence within a gene of interest in the genome of the plant cell; and (b) introducing into the cell a CRISPR effector protein, which upon binding to the guide RNA comprises a guide sequence that is hybridized to the target sequence, ensures a double strand break at or near the sequence to which the guide sequence is targeted; In particular embodiments, the step of introducing can include delivering to the plant cell one or more polynucleotides encoding CRISPR effector protein and the guideRNA.

In particular embodiments, the polynucleotides are delivered into the cell by a DNA virus (e.g., a geminivirus) or an RNA virus (e.g., a tobravirus). In particular embodiments, the introducing steps include delivering to the plant cell a T-DNA containing one or more polynucleotide sequences encoding the CRISPR effector protein and the guide RNA, where the delivering is via *Agrobacterium*. The polynucleotide sequence encoding the components of the CRISPR-Cas system can be operably linked to a promoter, such as a constitutive promoter (e.g., a cauliflower mosaic virus 35S promoter), or a cell specific or inducible promoter. In particular embodiments, the polynucleotide is introduced by microprojectile bombardment. In particular embodiments, the method further includes screening the plant cell after the introducing steps to determine whether the expression of the gene of interest has been modified. In particular embodiments, the methods include the step of regenerating a plant from the plant cell. In further embodiments, the methods include cross breeding the plant to obtain a genetically desired plant lineage.

In particular embodiments of the methods described above, disease resistant crops are obtained by targeted mutation of disease susceptibility genes or genes encoding negative regulators (e.g. Mlo gene) of plant defense genes. In a particular embodiment, herbicide-tolerant crops are generated by targeted substitution of specific nucleotides in plant genes such as those encoding acetolactate synthase (ALS) and protoporphyrinogen oxidase (PPO). In particular embodiments drought and salt tolerant crops by targeted mutation of genes encoding negative regulators of abiotic stress tolerance, low amylose grains by targeted mutation of Waxy gene, rice or other grains with reduced rancidity by targeted mutation of major lipase genes in aleurone Layer, etc. In particular embodiments. A more extensive list of endogenous genes encoding a traits of interest are listed below.

c) Modulating of Endogenous Genes by the CRISPR-Cas System to Identify or Confer an Agricultural Trait of Interest Also provided herein are methods for modulating (i.e. activating or repressing) endogenous gene expression using the CRISPR protein provided herein. Such methods make use of distinct RNA sequence(s) which are targeted to the plant genome by the CRISPR-Cas complex. More particularly the distinct RNA sequence(s) bind to two or more adaptor proteins (e.g. aptamers) whereby each adaptor protein is associated with one or more functional domains and wherein at least one of the one or more functional domains associated with the adaptor protein have one or more activities comprising methylase activity, demethylase activity, transcription activation activity, transcription repression activity, transcription release factor activity, histone modification activity, DNA integration activity RNA cleavage activity, DNA cleavage activity or nucleic acid binding activity; The functional domains are used to modulate expression of an endogenous plant gene so as to obtain the desired trait. Typically, in these embodiments, the CRISPR effector protein has one or more mutations such that it has no more than 5% of the nuclease activity of the CRISPR effector protein not having the at least one mutation.

In particular embodiments, the methods provided herein include the steps of (a) introducing into the cell a CRISPR-Cas complex comprising a guide RNA, comprising a direct repeat and a guide sequence, wherein the guide sequence hybridizes to a target sequence that is endogenous to the plant cell; (b) introducing into the plant cell a CRISPR effector molecule which complexes with the guide RNA when the guide sequence hybridizes to the target sequence; and wherein either the guide RNA is modified to comprise a distinct RNA sequence (aptamer) binding to a functional domain and/or the CRISPR effector protein is modified in that it is linked to a functional domain. In particular embodiments, the step of introducing can include delivering to the plant cell one or more polynucleotides encoding the (modified) CRISPR effector protein and the (modified) guide RNA. The details the components of the CRISPR-Cas system for use in these methods are described elsewhere herein.

In particular embodiments, the polynucleotides are delivered into the cell by a DNA virus (e.g., a geminivirus) or an RNA virus (e.g., a tobravirus). In particular embodiments, the introducing steps include delivering to the plant cell a T-DNA containing one or more polynucleotide sequences encoding the CRISPR effector protein and the guide RNA, where the delivering is via *Agrobacterium*. The nucleic acid sequence encoding the one or more components of the CRISPR-Cas system can be operably linked to a promoter, such as a constitutive promoter (e.g., a cauliflower mosaic virus 35S promoter), or a cell specific or inducible promoter. In particular embodiments, the polynucleotide is introduced by microprojectile bombardment. In particular embodiments, the method further includes screening the plant cell after the introducing steps to determine whether the expression of the gene of interest has been modified. In particular embodiments, the methods include the step of regenerating a plant from the plant cell. In further embodiments, the methods include cross breeding the plant to obtain a genetically desired plant lineage. A more extensive list of endogenous genes encoding a traits of interest are listed below.

Use of CRISPR/Cas to Identify or Modify Polyploid Plants

Many plants are polyploid, which means they carry duplicate copies of their genomes—sometimes as many as six, as in wheat. The methods according to the present invention, which make use of the CRISPR-Cas effector protein can be "multiplexed" to affect all copies of a gene, or to target dozens of genes at once. For instance, in particular embodiments, the methods of the present invention are used to simultaneously ensure a loss of function mutation in different genes responsible for suppressing defences against a disease. In particular embodiments, the methods of the present invention are used to simultaneously suppress the expression of the TaMLO-A1, TaMLO-B1 and TaMLO-D1 nucleic acid sequence in a wheat plant cell and regenerating a wheat plant therefrom, in order to ensure that the wheat plant is resistant to powdery mildew (see also WO2015109752).

Exemplary Genes Conferring Agronomic Traits

In particular embodiments relating to screening and identification of transcriptional enhancer or repressor associated with desirable plant genotypes or phenotypes, said desirable plant genotypes or phenotypes can be or can be linked to increased or decreased expression level of one or more genes discussed below:

1. Genes that Confer Resistance to Pests or Diseases:

Plant disease resistance genes. A plant can be transformed with cloned resistance genes to engineer plants that are resistant to specific pathogen strains. See, e.g., Jones et al., Science 266:789 (1994) (cloning of the tomato Cf-9 gene for resistance to *Cladosporium fulvum*); Martin et al., Science 262:1432 (1993) (tomato Pto gene for resistance to *Pseudomonas syringae* pv. tomato encodes a protein kinase); Mindrinos et al., Cell 78:1089 (1994) (Arabidops may be RSP2 gene for resistance to *Pseudomonas syringae*). A plant gene that is upregulated or down regulated during pathogen infection can be engineered for pathogen resistance. See, e.g., Thomazella et al., bioRxiv 064824; doi: doi.org/10.1101/064824 Epub. Jul. 23, 2016 (tomato plants with deletions in the SlDMR6-1 which is normally upregulated during pathogen infection).

Genes conferring resistance to a pest, such as soybean cyst nematode. See e.g., PCT Application WO 96/30517; PCT Application WO 93/19181.

*Bacillus thuringiensis* proteins see, e.g., Geiser et al., Gene 48:109 (1986).

Lectins, see, for example, Van Damme et al., Plant Molec. Biol. 24:25 (1994).

Vitamin-binding protein, such as avidin, see PCT application US93/06487, teaching the use of avidin and avidin homologues as larvicides against insect pests.

Enzyme inhibitors such as protease or proteinase inhibitors or amylase inhibitors. See, e.g., Abe et al., J. Biol. Chem. 262:16793 (1987), Huub et al., Plant Molec. Biol. 21:985 (1993)), Sumitani et al., Biosci. Biotech. Biochem. 57:1243 (1993) and U.S. Pat. No. 5,494,813.

Insect-specific hormones or pheromones such as ecdysteroid or juvenile hormone, a variant thereof, a mimetic based thereon, or an antagonist or agonist thereof. See, for example Hammock et al., Nature 344:458 (1990).

Insect-specific peptides or neuropeptides which, upon expression, disrupts the physiology of the affected pest. For example Regan, J. Biol. Chem. 269:9 (1994) and Pratt et al., Biochem. Biophys. Res. Comm. 163:1243 (1989). See also U.S. Pat. No. 5,266,317.

Insect-specific venom produced in nature by a snake, a wasp, or any other organism. For example, see Pang et al., Gene 116: 165 (1992).

Enzymes responsible for a hyperaccumulation of a monoterpene, a sesquiterpene, a steroid, hydroxamic acid, a phenylpropanoid derivative or another nonprotein molecule with insecticidal activity.

Enzymes involved in the modification, including the post-translational modification, of a biologically active molecule; for example, a glycolytic enzyme, a proteolytic enzyme, a lipolytic enzyme, a nuclease, a cyclase, a transaminase, an esterase, a hydrolase, a phosphatase, akinase, a phosphorylase, a polymerase, an elastase, a chitinase and a glucanase, whether natural or synthetic. See PCT application WO93/02197, Kramer et al., Insect Biochem. Molec. Biol. 23:691 (1993) and Kawalleck et al., Plant Molec. Biol. 21:673 (1993).

Molecules that stimulates signal transduction. For example, see Botella et al., Plant Molec. Biol. 24:757 (1994), and Griess et al., Plant Physiol. 104:1467 (1994).

Viral-invasive proteins or a complex toxin derived therefrom. See Beachy et al., Ann. rev. Phytopathol. 28:451 (1990).

Developmental-arrestive proteins produced in nature by a pathogen or a parasite. See Lamb et al., Bio/Technology 10:1436 (1992) and Toubart et al., Plant J. 2:367 (1992).

A developmental-arrestive protein produced in nature by a plant. For example, Logemann et al., Bio/Technology 10:305 (1992).

In plants, pathogens are often host-specific. For example, some *Fusarium* species will causes tomato wilt but attacks only tomato, and other *Fusarium* species attack only wheat. Plants have existing and induced defenses to resist most pathogens. Mutations and recombination events across plant generations lead to genetic variability that gives rise to susceptibility, especially as pathogens reproduce with more frequency than plants. In plants there can be non-host resistance, e.g., the host and pathogen are incompatible or there can be partial resistance against all races of a pathogen, typically controlled by many genes and/or also complete resistance to some races of a pathogen but not to other races. Such resistance is typically controlled by a few genes. Using methods and components of the CRISP-Cas system, a new tool now exists to induce specific mutations in anticipation hereon. Accordingly, one can analyze the genome of sources of resistance genes, and in plants having desired characteristics or traits, use the method and components of the CRISPR-Cas system to induce the rise of resistance genes.

The present systems can do so with more precision than previous mutagenic agents and hence accelerate and improve plant breeding programs.

2. Genes Involved in Plant Diseases, Such as Those Listed in WO 2013046247:

Rice diseases: *Magnaporthe grisea, Cochliobolus miyabeanus, Rhizoctonia solani, Gibberella fujikuroi*; Wheat diseases: *Erysiphe graminis, Fusarium graminearum, F. avenaceum, F. culmorum, Microdochium nivale, Puccinia striiformis, P. graminis, P. recondita, Micronectriella nivale, Typhula* sp., *Ustilago tritici, Tilletia caries, Pseudocercosporella herpotrichoides, Mycosphaerella graminicola, Stagonospora nodorum, Pyrenophora tritici-repentis*; Barley diseases: *Erysiphe graminis, Fusarium graminearum, F. avenaceum, F. culmorum, Microdochium nivale, Puccinia striiformis, P. graminis, P. hordei, Ustilago nuda, Rhynchosporium secalis, Pyrenophora teres, Cochliobolus sativus, Pyrenophora graminea, Rhizoctonia solani*; Maize diseases: *Ustilago maydis, Cochliobolus heterostrophus, Gloeocercospora sorghi, Puccinia polysora, Cercospora zeae-maydis, Rhizoctonia solani*;

Citrus diseases: *Diaporthe citri, Elsinoe fawcetti, Penicillium digitatum, P. italicum, Phytophthora parasitica, Phytophthora citrophthora*; Apple diseases: *Monilinia mali, Valsa ceratosperma, Podosphaera leucotricha, Alternaria alternata* apple pathotype, *Venturia inaequalis, Colletotrichum acutatum, phytophthora cactorum*;

Pear diseases: *Venturia nashicola, V. pirina, Alternaria alternata* Japanese pear pathotype, *Gymnosporangium haraeanum, phytophthora cactorum*;

Peach diseases: *Monilinia fructicola, Cladosporium carpophilum, Phomopsis* sp.;

Grape diseases: *Elsinoe ampelina, Glomerella cingulata, Uncinula necator, Phakopsoraampelopsidis, Guignardia bidwellii, Plasmopara viticola*;

Persimmon diseases: *Gloeosporium kaki, Cercospora kaki, Mycosphaerella nawae*;

Gourd diseases: *Colletotrichum lagenarium, Sphaerotheca fuliginea, Mycosphaerella melonis, Fusarium oxysporum, Pseudoperonospora cubensis, Phytophthora* sp., *Pythium* sp.;

Tomato diseases: *Alternaria solani, Cladosporium fulvum, Phytophthora infestans; Pseudomonas syringae* pv. *Tomato; Phytophthora capsici; Xanthomonas*;

Eggplant diseases: *Phomopsis vexans, Erysiphe cichoracearum*; Brassicaceous vegetable diseases: *Alternaria japonica, Cercosporella brassicae, Plasmodiophora brassicae, Peronospora parasitica*;

Welsh onion diseases: *Puccinia allii, Peronospora destructor*;

Soybean diseases: *Cercospora kikuchii, Elsinoe glycines, Diaporthe phaseolorum* var. *sojae, Septoria glycines, Cercospora sojina, Phakopsora pachyrhizi, Phytophthora sojae, Rhizoctonia solani, Corynespora cassiicola, Sclerotinia sclerotiorum*;

Kidney bean diseases: *Colletotrichum lindemuthianum*;

Peanut diseases: *Cercospora personata, Cercospora arachidicola, Sclerotium rolfsii*;

Pea diseases pea: *Erysiphe pisi*;

Potato diseases: *Alternaria solani, Phytophthora infestans, Phytophthora erythroseptica, Spongospora subterranean*, f. sp. *Subterranean*;

Strawberry diseases: *Sphaerotheca humuli, Glomerella cingulata*;

Tea diseases: *Exobasidium reticulatum, Elsinoe leucospila, Pestalotiopsis* sp., *Colletotrichum theae-sinensis*;

Tobacco diseases: *Alternaria longipes, Erysiphe cichoracearum, Colletotrichum tabacum, Peronospora tabacina, Phytophthora nicotianae*;

Rapeseed diseases: *Sclerotinia sclerotiorum, Rhizoctonia solani*;

Cotton diseases: *Rhizoctonia solani*;

Beet diseases: *Cercospora beticola, Thanatephorus cucumeris, Thanatephorus cucumeris, Aphanomyces cochlioides*;

Rose diseases: *Diplocarpon rosae, Sphaerotheca pannosa, Peronospora sparsa*;

Diseases of chrysanthemum and asteraceae: *Bremia lactuca, Septoria chrysanthemi-indici, Puccinia horiana*;

Diseases of various plants: *Pythium aphanidermatum, Pythium debarianum, Pythium graminicola, Pythium irregulare, Pythium ultimum, Botrytis cinerea, Sclerotinia sclerotiorum*;

Radish diseases: *Alternaria brassicicola*;

Zoysia diseases: *Sclerotinia homoeocarpa, Rhizoctonia solani*;

Banana diseases: *Mycosphaerella fijiensis, Mycosphaerella musicola*;

Sunflower diseases: *Plasmopara halstedii*;

Seed diseases or diseases in the initial stage of growth of various plants caused by *Aspergillus* spp., *Penicillium* spp., *Fusarium* spp., *Gibberella* spp., *Trichoderma* spp., *Thielaviopsis* spp., *Rhizopus* spp., *Mucor* spp., *Corticium* spp., *Rhoma* spp., *Rhizoctonia* spp., *Diplodia* spp., or the like;

Virus diseases of various plants mediated by *Polymyxa* spp., *Olpidium* spp., or the like.

3. Examples of Genes that Confer Resistance to Herbicides:

Resistance to herbicides that inhibit the growing point or meristem, such as an imidazolinone or a sulfonylurea, for example, by Lee et al., EMBO J. 7:1241 (1988), and Miki et al., Theor. Appl. Genet. 80:449 (1990), respectively.

Glyphosate tolerance (resistance conferred by, e.g., mutant 5-enolpyruvylshikimate-3-phosphate synthase (EPSPs) genes, aroA genes and glyphosate acetyl transferase (GAT) genes, respectively), or resistance to other phosphono compounds such as by glufosinate (phosphinothricin acetyl transferase (PAT) genes from *Streptomyces* species, including *Streptomyces hygroscopicus* and *Streptomyces viridochromogenes*), and to pyridinoxy or phenoxy propionic acids and cyclohexones by ACCase inhibitor-encoding genes. See, for example, U.S. Pat. Nos. 4,940,835 and 6,248,876, 4,769,061, EP No. 0 333 033 and U.S. Pat. No. 4,975,374. See also EP No. 0242246, DeGreef et al., Bio/Technology 7:61 (1989), Marshall et al., Theor. Appl. Genet. 83:435 (1992), WO 2005012515 to Castle et. al. and WO 2005107437.

Resistance to herbicides that inhibit photosynthesis, such as a triazine (psbA and gs+ genes) or a benzonitrile (nitrilase gene), and glutathione S-transferase in Przibila et al., Plant Cell 3:169 (1991), U.S. Pat. No. 4,810,648, and Hayes et al., Biochem. J. 285: 173 (1992).

Genes encoding Enzymes detoxifying the herbicide or a mutant glutamine synthase enzyme that is resistant to inhibition, e.g. n U.S. patent application Ser. No. 11/760,602. Or a detoxifying enzyme is an enzyme encoding a phosphinothricin acetyltransferase (such as the bar or pat protein from *Streptomyces* species). Phosphinothricin acetyltransferases are for example described in U.S. Pat. Nos. 5,561,236;

5,648,477; 5,646,024; 5,273,894; 5,637,489; 5,276,268; 5,739,082; 5,908,810 and 7,112,665.

Hydroxyphenylpyruvate dioxygenases (HPPD) inhibitors, i.e. naturally occurring HPPD resistant enzymes, or genes encoding a mutated or chimeric HPPD enzyme as described in WO 96/38567, WO 99/24585, and WO 99/24586, WO 2009/144079, WO 2002/046387, or U.S. Pat. No. 6,768,044.

4. Examples of Genes Involved in Abiotic Stress Tolerance:

Transgene capable of reducing the expression and/or the activity of poly(ADP-ribose) polymerase (PARP) gene in the plant cells or plants as described in WO 00/04173 or, WO/2006/045633.

Transgenes capable of reducing the expression and/or the activity of the PARG encoding genes of the plants or plants cells, as described e.g. in WO 2004/090140.

Transgenes coding for a plant-functional enzyme of the nicotineamide adenine dinucleotide salvage synthesis pathway including nicotinamidase, nicotinate phosphoribosyltransferase, nicotinic acid mononucleotide adenyl transferase, nicotinamide adenine dinucleotide synthetase or nicotine amide phosphoribosyltransferase as described e.g. in EP 04077624.7, WO 2006/133827, PCT/EP07/002,433, EP 1999263, or WO 2007/107326.

Enzymes involved in carbohydrate biosynthesis include those described in e.g. EP 0571427, WO 95/04826, EP 0719338, WO 96/15248, WO 96/19581, WO 96/27674, WO 97/11188, WO 97/26362, WO 97/32985, WO 97/42328, WO 97/44472, WO 97/45545, WO 98/27212, WO 98/40503, WO99/58688, WO 99/58690, WO 99/58654, WO 00/08184, WO 00/08185, WO 00/08175, WO 00/28052, WO 00/77229, WO 01/12782, WO 01/12826, WO 02/101059, WO 03/071860, WO 2004/056999, WO 2005/030942, WO 2005/030941, WO 2005/095632, WO 2005/095617, WO 2005/095619, WO 2005/095618, WO 2005/123927, WO 2006/018319, WO 2006/103107, WO 2006/108702, WO 2007/009823, WO 00/22140, WO 2006/063862, WO 2006/072603, WO 02/034923, EP 06090134.5, EP 06090228.5, EP 06090227.7, EP 07090007.1, EP 07090009.7, WO 01/14569, WO 02/79410, WO 03/33540, WO 2004/078983, WO 01/19975, WO 95/26407, WO 96/34968, WO 98/20145, WO 99/12950, WO 99/66050, WO 99/53072, U.S. Pat. No. 6,734,341, WO 00/11192, WO 98/22604, WO 98/32326, WO 01/98509, WO 01/98509, WO 2005/002359, U.S. Pat. Nos. 5,824,790, 6,013,861, WO 94/04693, WO 94/09144, WO 94/11520, WO 95/35026 or WO 97/20936 or enzymes involved in the production of polyfructose, especially of the inulin and levan-type, as disclosed in EP 0663956, WO 96/01904, WO 96/21023, WO 98/39460, and WO 99/24593, the production of alpha-1,4-glucans as disclosed in WO 95/31553, US 2002031826, U.S. Pat. Nos. 6,284,479, 5,712,107, WO 97/47806, WO 97/47807, WO 97/47808 and WO 00/14249, the production of alpha-1,6 branched alpha-1,4-glucans, as disclosed in WO 00/73422, the production of alternan, as disclosed in e.g. WO 00/47727, WO 00/73422, EP 06077301.7, U.S. Pat. No. 5,908,975 and EP 0728213, the production of hyaluronan, as for example disclosed in WO 2006/032538, WO 2007/039314, WO 2007/039315, WO 2007/039316, JP 2006304779, and WO 2005/012529.

Genes that improve drought resistance. For example, WO 2013122472 discloses that the absence or reduced level of functional Ubiquitin Protein Ligase protein (UPL) protein, more specifically, UPL3, leads to a decreased need for water or improved resistance to drought of said plant. Other examples of transgenic plants with increased drought tolerance are disclosed in, for example, US 2009/0144850, US 2007/0266453, and WO 2002/083911. US2009/0144850 describes a plant displaying a drought tolerance phenotype due to altered expression of a DR02 nucleic acid. US 2007/0266453 describes a plant displaying a drought tolerance phenotype due to altered expression of a DRO3 nucleic acid and WO 2002/083911 describes a plant having an increased tolerance to drought stress due to a reduced activity of an ABC transporter which is expressed in guard cells. Another example is the work by Kasuga and co-authors (1999), who describe that overexpression of cDNA encoding DREB1 A in transgenic plants activated the expression of many stress tolerance genes under normal growing conditions and resulted in improved tolerance to drought, salt loading, and freezing. However, the expression of DREB1A also resulted in severe growth retardation under normal growing conditions (Kasuga (1999) Nat Biotechnol 17(3) 287-291).

In further particular embodiments, crop plants can be improved by influencing specific plant traits. For example, by developing pesticide-resistant plants, improving disease resistance in plants, improving plant insect and nematode resistance, improving plant resistance against parasitic weeds, improving plant drought tolerance, improving plant nutritional value, improving plant stress tolerance, avoiding self-pollination, plant forage digestibility biomass, grain yield etc. A few specific non-limiting examples are provided herein below.

In addition to targeted mutation of single genes, CRISPR/Cas complexes can be designed to allow targeted mutation of multiple genes, deletion of chromosomal fragment, site-specific integration of transgene, site-directed mutagenesis in vivo, and precise gene replacement or allele swapping in plants. Therefore, the methods described herein have broad applications in gene discovery and validation, mutational and cisgenic breeding, and hybrid breeding. These applications facilitate the production of a new generation of genetically modified crops with various improved agronomic traits such as herbicide resistance, disease resistance, abiotic stress tolerance, high yield, and superior quality.

Use of CRISPR/Cas to Identify or Create Male Sterile Plants

Hybrid plants typically have advantageous agronomic traits compared to inbred plants. However, for self-pollinating plants, the generation of hybrids can be challenging. In different plant types, genes have been identified which are important for plant fertility, more particularly male fertility. For instance, in maize, at least two genes have been identified which are important in fertility (Amitabh Mohanty International Conference on New Plant Breeding Molecular Technologies Technology Development And Regulation, Oct. 9-10, 2014, Jaipur, India; Svitashev et al. Plant Physiol. 2015 October; 169(2):931-45; Djukanovic et al. Plant J. 2013 December; 76(5):888-99). The methods provided herein can be used to screen and identification of a transcriptional enhancer or repressor associated with desirable plant genotypes or phenotypes, such as expression of target genes required for male fertility so as to generate male sterile plants which can easily be crossed to generate hybrids. In particular embodiments, the CRISPR-Cas system provided herein is used for targeted modulation of a transcriptional enhancer or repressor regulating expression of the cytochrome P450-like gene (MS26) or the meganuclease gene (MS45) thereby conferring male sterility to the maize plant. Maize plants which are as such genetically altered can be used in hybrid breeding programs.

Increasing the Fertility Stage in Plants

In particular embodiments, the methods provided herein are used to prolong the fertility stage of a plant such as of a rice plant or to identify genes involved in such process. For instance, a rice fertility stage gene such as Ehd3 or a transcriptional enhancer or repressor regulating said gene can be targeted in order to modulate expression in the gene and plantlets can be selected for a prolonged regeneration plant fertility stage (as described in CN 104004782).

Use of CRISPR/Cas to Identify or Generate Genetic Variation in a Crop of Interest The availability of wild germplasm and genetic variations in crop plants is the key to crop improvement programs, but the available diversity in germplasms from crop plants is limited. The present invention envisages methods for generating a diversity of genetic variations in a germplasm of interest. In this application of the CRISPR-Cas system a library of guide RNAs targeting different locations in the plant genome is provided and is introduced into plant cells together with the CRISPR effector protein. In this way a collection of genome-scale transcriptional modulation, point mutations and gene knock-outs can be generated. In particular embodiments, the methods comprise generating a plant part or plant from the cells so obtained and screening the cells for a trait of interest. The target genes can include both coding and non-coding regions. In particular embodiments, the trait is stress tolerance and the method is a method for the generation of stress-tolerant crop varieties.

Use of CRISPR/Cas to Affect or Identify Genes Involved in Fruit-Ripening

Ripening is a normal phase in the maturation process of fruits and vegetables. Only a few days after it starts it renders a fruit or vegetable inedible. This process brings significant losses to both farmers and consumers. In particular embodiments, the methods of the present invention are used to reduce ethylene production. This is ensured by ensuring one or more of the following: a. Suppression of ACC synthase gene expression. ACC (1-aminocyclopropane-1-carboxylic acid) synthase is the enzyme responsible for the conversion of S-adenosylmethionine (SAM) to ACC; the second to the last step in ethylene biosynthesis. Enzyme expression is hindered when an antisense ("mirror-image") or truncated copy of the synthase gene is inserted into the plant's genome; b. Insertion of the ACC deaminase gene. The gene coding for the enzyme is obtained from *Pseudomonas chlororaphis*, a common nonpathogenic soil bacterium. It converts ACC to a different compound thereby reducing the amount of ACC available for ethylene production; c. Insertion of the SAM hydrolase gene. This approach is similar to ACC deaminase wherein ethylene production is hindered when the amount of its precursor metabolite is reduced; in this case SAM is converted to homoserine. The gene coding for the enzyme is obtained from *E. coli* T3 bacteriophage and d. Suppression of ACC oxidase gene expression. ACC oxidase is the enzyme which catalyzes the oxidation of ACC to ethylene, the last step in the ethylene biosynthetic pathway. Using the methods described herein, down regulation of the ACC oxidase gene results in the suppression of ethylene production, thereby delaying fruit ripening. In particular embodiments, additionally or alternatively to the modifications described above, the methods described herein are used to modify ethylene receptors, so as to interfere with ethylene signals obtained by the fruit. In particular embodiments, expression of the ETR1 gene, encoding an ethylene binding protein is modified, more particularly suppressed. In particular embodiments, additionally or alternatively to the modifications described above, the methods described herein are used to modify expression of the gene encoding Polygalacturonase (PG), which is the enzyme responsible for the breakdown of pectin, the substance that maintains the integrity of plant cell walls. Pectin breakdown occurs at the start of the ripening process resulting in the softening of the fruit. Accordingly, in particular embodiments, the methods described herein are used to introduce a mutation in the PG gene or to suppress activation of the PG gene in order to reduce the amount of PG enzyme produced thereby delaying pectin degradation.

Thus in particular embodiments, the methods comprise the use of the CRISPR-Cas system to identify or ensure one or more modifications of the genome of a plant cell such as described above, and regenerating a plant therefrom. In particular embodiments, the plant is a tomato plant.

Increasing Storage Life of Plants

In particular embodiments, the methods of the present invention are used to identify or modify genes involved in the production of compounds which affect storage life of the plant or plant part. More particularly, the modification is in a gene that prevents the accumulation of reducing sugars in potato tubers. Upon high-temperature processing, these reducing sugars react with free amino acids, resulting in brown, bitter-tasting products and elevated levels of acrylamide, which is a potential carcinogen. In particular embodiments, the methods provided herein are used to reduce or inhibit expression of the vacuolar invertase gene (VInv), which encodes a protein that breaks down sucrose to glucose and fructose (Clasen et al. DOI: 10.1111/pbi.12370).

The Use of the CRISPR-Cas System to Identify or Ensure a Value Added Trait

In particular embodiments the CRISPR-Cas system is used to identify or produce nutritionally improved agricultural crops. In particular embodiments, the methods provided herein are adapted to generate "functional foods", i.e. a modified food or food ingredient that may provide a health benefit beyond the traditional nutrients it contains and/or "nutraceutical", i.e. substances that may be considered a food or part of a food and provides health benefits, including the prevention and treatment of disease. In particular embodiments, the nutraceutical is useful in the prevention and/or treatment of one or more of cancer, diabetes, cardiovascular disease, and hypertension.

Examples of nutritionally improved crops include (Newell-Mcloughlin, Plant Physiology, July 2008, Vol. 147, pp. 939-953):

Modified protein quality, content and/or amino acid composition, such as have been described for Bahiagrass (Luciani et al. 2005, Florida Genetics Conference Poster), Canola (Roesler et al., 1997, Plant Physiol 113 75-81), Maize (Cromwell et al, 1967, 1969 J Anim Sci 26 1325-1331, O'Quin et al. 2000 J Anim Sci 78 2144-2149, Yang et al. 2002, Transgenic Res 11 11-20, Young et al. 2004, Plant J 38 910-922), Potato (Yu J and Ao, 1997 Acta Bot Sin 39 329-334; Chakraborty et al. 2000, Proc Natl Acad Sci USA 97 3724-3729; Li et al. 2001) Chin Sci Bull 46 482-484, Rice (Katsube et al. 1999, Plant Physiol 120 1063-1074), Soybean (Dinkins et al. 2001, Rapp 2002, In Vitro Cell Dev Biol Plant 37 742-747), Sweet Potato (Egnin and Prakash 1997, In Vitro Cell Dev Biol 33 52A);

Essential amino acid content, such as has been described for Canola (Falco et al. 1995, Bio/Technology 13 577-582), Lupin (White et al. 2001, J Sci Food Agric 81 147-154), Maize (Lai and Messing, 2002, Agbios 2008 GM crop database (Mar. 11, 2008)), Potato (Zehet al. 2001, Plant Physiol 127 792-802), Sorghum (Zhao et al. 2003, Kluwer Academic Publishers, Dordrecht, The Netherlands, pp 413-416), Soybean (Falco et al. 1995 Bio/Technology 13 577-582; Galili et al. 2002 Crit Rev Plant Sci 21 167-204);

Oils and Fatty acids such as for Canola (Dehesh et al. (1996) Plant J 9 167-172 [PubMed]; Del Vecchio (1996) INFORM International News on Fats, Oils and Related Materials 7 230-243; Roesler et al. (1997) Plant Physiol 113 75-81 [PMC free article] [PubMed]; Froman and Ursin (2002, 2003) Abstracts of Papers of the American Chemical Society 223 U35; James et al. (2003) Am J Clin Nutr 77 1140-1145 [PubMed]; Agbios (2008, above); cotton (Chapman et al. (2001). J Am Oil Chem Soc 78 941-947; Liu et al. (2002) J Am Coll Nutr 21 205S-211S [PubMed]; O'Neill (2007) Australian Life Scientist. www.biotechnews.com.au/index.php/id;866694817;fp;4;fpid;2 (Jun. 17, 2008), Linseed (Abbadi et al., 2004, Plant Cell 16: 2734-2748), Maize (Young et al., 2004, Plant J 38 910-922), oil palm (Jalani et al. 1997, J Am Oil Chem Soc 74 1451-1455; Parveez, 2003, AgBiotechNet 113 1-8), Rice (Anai et al., 2003, Plant Cell Rep 21 988-992), Soybean (Reddy and Thomas, 1996, Nat Biotechnol 14 639-642; Kinney and Kwolton, 1998, Blackie Academic and Professional, London, pp 193-213), Sunflower (Arcadia, Biosciences 2008);

Carbohydrates, such as Fructans described for Chicory (Smeekens (1997) Trends Plant Sci 2 286-287, Sprenger et al. (1997) FEBS Lett 400 355-358, Sévenier et al. (1998) Nat Biotechnol 16 843-846), Maize (Caimi et al. (1996) Plant Physiol 110 355-363), Potato (Hellwege et al., 1997 Plant J 12 1057-1065), Sugar Beet (Smeekens et al. 1997, above), Inulin, such as described for Potato (Hellewege et al. 2000, Proc Natl Acad Sci USA 97 8699-8704), Starch, such as described for Rice (Schwall et al. (2000) Nat Biotechnol 18 551-554, Chiang et al. (2005) Mol Breed 15 125-143);

Vitamins and carotenoids, such as described for Canola (Shintani and DellaPenna (1998) Science 282 2098-2100), Maize (Rocheford et al. (2002). J Am Coll Nutr 21 191S-198S, Cahoon et al. (2003) Nat Biotechnol 21 1082-1087, Chen et al. (2003) Proc Natl Acad Sci USA 100 3525-3530), Mustardseed (Shewmaker et al. (1999) Plant J 20 401-412, Potato (Ducreux et al., 2005, J Exp Bot 56 81-89), Rice (Ye et al. (2000) Science 287 303-305, Strawberry (Agius et al. (2003), Nat Biotechnol 21 177-181), Tomato (Rosati et al. (2000) Plant J 24 413-419, Fraser et al. (2001) J Sci Food Agric 81 822-827, Mehta et al. (2002) Nat Biotechnol 20 613-618, Diaz de la Garza et al. (2004) Proc Natl Acad Sci USA 101 13720-13725, Enfissi et al. (2005) Plant Biotechnol J 3 17-27, DellaPenna (2007) Proc Natl Acad Sci USA 104 3675-3676;

Functional secondary metabolites, such as described for Apple (stilbenes, Szankowskiet al. (2003) Plant Cell Rep 22: 141-149), Alfalfa (resveratrol, Hipskind and Paiva (2000) Mol Plant Microbe Interact 13 551-562), Kiwi (resveratrol, Kobayashi et al. (2000) Plant Cell Rep 19904-910), Maize and Soybean (flavonoids, Yu et al. (2000) Plant Physiol 124 781-794), Potato (anthocyanin and alkaloid glycoside, Lukaszewicz et al. (2004) J Agric Food Chem 52 1526-1533), Rice (flavonoids & resveratrol, Stark-Lorenzen et al. (1997) Plant Cell Rep 16 668-673, Shin et al. (2006) Plant Biotechnol J 4 303-315), Tomato (+resveratrol, chlorogenic acid, flavonoids, stilbene; Rosati et al. (2000) above, Muir et al. (2001) Nature 19 470-474, Niggeweg et al. (2004) Nat Biotechnol 22 746-754, Giovinazzo et al. (2005) Plant Biotechnol J 3 57-69), wheat (caffeic and ferulic acids, resveratrol; United Press International (2002)); and Mineral availabilities such as described for Alfalfa (phytase, Austin-Phillips et al. (1999) www.molecularfarming.com/nonmedical.html), Lettuce (iron, Goto et al. (2000) Theor Appl Genet 100 658-664), Rice (iron, Lucca et al. (2002) J Am Coll Nutr 21 184S-190S), Maize, Soybean and wheat (phytase, Drakakaki et al. (2005) Plant Mol Biol 59 869-880, Denbow et al. (1998) Poult Sci 77 878-881, Brinch-Pedersen et al. (2000) Mol Breed 6 195-206).

In particular embodiments, the value-added trait is related to the envisaged health benefits of the compounds present in the plant. For instance, in particular embodiments, the value-added crop is obtained by applying the methods of the invention to ensure the modification of or induce/increase the synthesis of one or more of the following compounds:

Carotenoids, such as α-Carotene present in carrots which Neutralizes free radicals that may cause damage to cells or β-Carotene present in various fruits and vegetables which neutralizes free radicals;

Lutein present in green vegetables which contributes to maintenance of healthy vision;

Lycopene present in tomato and tomato products, which is believed to reduce the risk of prostate cancer;

Zeaxanthin, present in citrus and maize, which contributes to maintenance of healthy vision;

Dietary fiber such as insoluble fiber present in wheat bran which may reduce the risk of breast and/or colon cancer and β-Glucan present in oat, soluble fiber present in *Psyllium* and whole cereal grains which may reduce the risk of cardiovascular disease (CVD);

Fatty acids, such as ω-3 fatty acids which may reduce the risk of CVD and improve mental and visual functions, Conjugated linoleic acid, which may improve body composition, may decrease risk of certain cancers and GLA which may reduce inflammation risk of cancer and CVD, may improve body composition;

Flavonoids such as Hydroxycinnamates, present in wheat which have Antioxidant-like activities, may reduce risk of degenerative diseases, flavonols, catechins and tannins present in fruits and vegetables which neutralize free radicals and may reduce risk of cancer;

Glucosinolates, indoles, isothiocyanates, such as Sulforaphane, present in Cruciferous vegetables (broccoli, kale), horseradish, which neutralize free radicals, may reduce risk of cancer;

Phenolics, such as stilbenes present in grape which May reduce risk of degenerative diseases, heart disease, and cancer, may have longevity effect and caffeic acid and ferulic acid present in vegetables and citrus which have Antioxidant-like activities, may reduce risk of degenerative diseases, heart disease, and eye disease, and epicatechin present in cacao which has Antioxidant-like activities, may reduce risk of degenerative diseases and heart disease;

Plant stanols/sterols present in maize, soy, wheat and wooden oils which May reduce risk of coronary heart disease by lowering blood cholesterol levels;

Fructans, inulins, fructo-oligosaccharides present in Jerusalem artichoke, shallot, onion powder which may improve gastrointestinal health;

Saponins present in soybean, which may lower LDL cholesterol;

Soybean protein present in soybean which may reduce risk of heart disease;

Phytoestrogens such as isoflavones present in soybean which may reduce menopause symptoms, such as hot flashes, may reduce osteoporosis and CVD and lignans present in flax, rye and vegetables, which May protect against heart disease and some cancers, may lower LDL cholesterol, total cholesterol;

Sulfides and thiols such as diallyl sulphide present in onion, garlic, olive, leek and scallion and Allyl methyl trisulfide, dithiolthiones present in cruciferous vegetables which may lower LDL cholesterol, helps to maintain healthy immune system; and Tannins, such as proanthocyanidins, present in cranberry, cocoa, which may improve urinary tract health, may reduce risk of CVD and high blood pressure.

In addition, the methods of the present invention also envisage modifying protein/starch functionality, shelf life, taste/aesthetics, fiber quality, and allergen, antinutrient, and toxin reduction traits.

Accordingly, the invention encompasses methods for identifying or producing plants with nutritional added value, said methods comprising modulating expression of or introducing into a plant cell a gene encoding an enzyme involved in the production of a component of added nutritional value, or a transcriptional enhancer or repressor regulating expression of said gene, using the CRISPR-Cas system as described herein and regenerating a plant from said plant cell, said plant characterized in an increase expression of said component of added nutritional value. In particular embodiments, the CRISPR-Cas system is used to modify the endogenous synthesis of these compounds indirectly, e.g. by modifying one or more transcription factors that controls the metabolism of this compound. Methods for introducing a gene of interest into a plant cell and/or modifying an endogenous gene using the CRISPR-Cas system are described herein above.

Some specific examples of modifications in plants that have been modified to confer value-added traits are: plants with modified fatty acid metabolism, for example, by transforming a plant with an antisense gene of stearyl-ACP desaturase to increase stearic acid content of the plant. See Knultzon et al., Proc. Natl. Acad. Sci. U.S.A. 89:2624 (1992). Another example involves decreasing phytate content, for example by cloning and then reintroducing DNA associated with the single allele which may be responsible for maize mutants characterized by low levels of phytic acid. See Raboy et al, Maydica 35:383 (1990).

Similarly, expression of the maize (*Zea mays*) Tfs C1 and R, which regulate the production of flavonoids in maize aleurone layers under the control of a strong promoter, resulted in a high accumulation rate of anthocyanins in *Arabidopsis* (*Arabidopsis thaliana*), presumably by activating the entire pathway (Bruce et al., 2000, Plant Cell 12:65-80). DellaPenna (Welsch et al., 2007 Annu Rev Plant Biol 57: 711-738) found that Tf RAP2.2 and its interacting partner SINAT2 increased carotenogenesis in *Arabidopsis* leaves. Expressing the Tf Dof1 induced the up-regulation of genes encoding enzymes for carbon skeleton production, a marked increase of amino acid content, and a reduction of the Glc level in transgenic *Arabidopsis* (Yanagisawa, 2004 Plant Cell Physiol 45: 386-391), and the DOF Tf AtDof1.1 (OBP2) up-regulated all steps in the glucosinolate biosynthetic pathway in *Arabidopsis* (Skirycz et al., 2006 Plant J 47: 10-24).

Reducing Allergen in Plants

In particular embodiments the methods provided herein are used to identify or generate plants with a reduced level of allergens, making them safer for the consumer. In particular embodiments, the methods comprise modifying expression of one or more genes responsible for the production of plant allergens or a transcriptional enhancer or repressor regulating said genes. For instance, in particular embodiments, the methods comprise down-regulating expression of a Lol p5 gene in a plant cell, such as a ryegrass plant cell and regenerating a plant therefrom so as to reduce allergenicity of the pollen of said plant (Bhalla et al. 1999, Proc. Natl. Acad. Sci. USA Vol. 96: 11676-11680).

Peanut allergies and allergies to legumes generally are a real and serious health concern. The CRISPR effector protein system of the present invention can be used to identify and then edit or silence genes encoding allergenic proteins of such legumes or a transcriptional enhancer or repressor regulating expression of said protein coding genes. Without limitation as to such genes and proteins, Nicolaou et al. identifies allergenic proteins in peanuts, soybeans, lentils, peas, lupin, green beans, and mung beans. See, Nicolaou et al., Current Opinion in Allergy and Clinical Immunology 2011; 11(3):222).

Screening Methods for Endogenous Genes of Interest

The methods provided herein further allow the identification of transcriptional enhancers or repressors, involved in the production of a component of added nutritional value or generally genes affecting agronomic traits of interest, across species, phyla, and plant kingdom. By selectively targeting e.g. genes encoding enzymes of metabolic pathways in plants using the CRISPR-Cas system as described herein, the genes responsible for certain nutritional aspects of a plant can be identified. Similarly, by selectively targeting genes which may affect a desirable agronomic trait, the relevant genes can be identified. Accordingly, the present invention encompasses screening methods for genes involved in the production of compounds with a particular nutritional value and/or agronomic traits.

Use of CRISPR-Cas System in Biofuel Production

The term "biofuel" as used herein is an alternative fuel made from plant and plant-derived resources. Renewable biofuels can be extracted from organic matter whose energy has been obtained through a process of carbon fixation or are made through the use or conversion of biomass. This biomass can be used directly for biofuels or can be converted to convenient energy containing substances by thermal conversion, chemical conversion, and biochemical conversion. This biomass conversion can result in fuel in solid, liquid, or gas form. There are two types of biofuels: bioethanol and biodiesel. Bioethanol is mainly produced by the sugar fermentation process of cellulose (starch), which is mostly derived from maize and sugar cane. Biodiesel on the other hand is mainly produced from oil crops such as rapeseed, palm, and soybean. Biofuels are used mainly for transportation. The CRISPR system described herein can be used to identify transcriptional enhancers or repressors associated with desirable genotypes or phenotypes linked to increased biofuel production in plant or yeast.

Enhancing Plant Properties for Biofuel Production

In particular embodiments, the methods using the CRISPR-Cas system as described herein are used to alter the properties of the cell wall in order to facilitate access by key hydrolysing agents for a more efficient release of sugars for fermentation. In particular embodiments, the biosynthesis of cellulose and/or lignin are modified. Cellulose is the major component of the cell wall. The biosynthesis of cellulose and lignin are co-regulated. By reducing the proportion of lignin in a plant the proportion of cellulose can be increased. In particular embodiments, the methods described herein are used to downregulate lignin biosynthesis in the plant so as to increase fermentable carbohydrates. More particularly, the methods described herein are used to downregulate at least a first lignin biosynthesis gene selected from the group consisting of 4-coumarate 3-hydroxylase (C3H), phenylalanine ammonia-lyase (PAL), cinnamate 4-hydroxylase (C4H), hydroxycinnamoyl transferase (HCT), caffeic acid O-methyltransferase (COMT), caffeoyl CoA 3-O-methyltransferase (CCoAOMT), ferulate 5-hydroxylase (F5H), cinnamyl alcohol dehydrogenase (CAD), cinnamoyl CoA-reductase (CCR), 4-coumarate-CoA ligase (4CL), monolignol-lignin-specific glycosyltransferase, and aldehyde dehydrogenase (ALDH) as disclosed in WO 2008064289 A2.

In particular embodiments, the methods described herein are used to produce plant mass that produces lower levels of acetic acid during fermentation (see also WO 2010096488). More particularly, the methods disclosed herein are used to generate mutations in homologs to CaslL to reduce polysaccharide acetylation.

Modifying Yeast for Biofuel Production

In particular embodiments, the CRISPR protein provided herein is used for bioethanol production by recombinant micro-organisms. For instance, CRISPR protein can be used to engineer micro-organisms, such as yeast, to generate biofuel or biopolymers from fermentable sugars and optionally to be able to degrade plant-derived lignocellulose derived from agricultural waste as a source of fermentable sugars. More particularly, the invention provides methods whereby the CRISPR-Cas complex is used to introduce foreign genes required for biofuel production into micro-organisms and/or to modify endogenous genes why may interfere with the biofuel synthesis. More particularly the methods involve introducing into a micro-organism such as a yeast one or more nucleotide sequence encoding enzymes involved in the conversion of pyruvate to ethanol or another product of interest. In particular embodiments the methods ensure the introduction of one or more enzymes which allows the micro-organism to degrade cellulose, such as a cellulase. In yet further embodiments, the CRISPR-Cas complex is used to modify endogenous metabolic pathways which compete with the biofuel production pathway.

Accordingly, in more particular embodiments, the methods described herein are used to modify a micro-organism as follows:

To introduce at least one heterologous nucleic acid or increase expression of at least one endogenous nucleic acid encoding a plant cell wall degrading enzyme, such that said micro-organism is capable of expressing said nucleic acid and of producing and secreting said plant cell wall degrading enzyme;

To introduce at least one heterologous nucleic acid or increase expression of at least one endogenous nucleic acid encoding an enzyme that converts pyruvate to acetaldehyde optionally combined with at least one heterologous nucleic acid encoding an enzyme that converts acetaldehyde to ethanol such that said host cell is capable of expressing said nucleic acid; and/or To modify at least one nucleic acid encoding for an enzyme in a metabolic pathway in said host cell, wherein said pathway produces a metabolite other than acetaldehyde from pyruvate or ethanol from acetaldehyde, and wherein said modification results in a reduced production of said metabolite, or to introduce at least one nucleic acid encoding for an inhibitor of said enzyme.

Modifying Algae and Plants for Production of Vegetable Oils or Biofuels

Transgenic algae or other plants such as rape may be particularly useful in the production of vegetable oils or biofuels such as alcohols (especially methanol and ethanol), for instance. These may be engineered to express or overexpress high levels of oil or alcohols for use in the oil or biofuel industries.

According to particular embodiments of the invention, the CRISPR-Cas system is used to generate lipid-rich diatoms which are useful in biofuel production.

In particular embodiments it is envisaged to specifically modify genes that are involved in the modification of the quantity of lipids and/or the quality of the lipids produced by the algal cell. Examples of genes encoding enzymes involved in the pathways of fatty acid synthesis can encode proteins having for instance acetyl-CoA carboxylase, fatty acid synthase, 3-ketoacyl-acyl carrier protein synthase III, glycerol-3-phosphate dehydrogenase (G3PDH), Enoyl-acyl carrier protein reductase (Enoyl-ACP-reductase), glycerol-3-phosphate acyltransferase, lysophosphatidic acyl transferase or diacylglycerol acyltransferase, phospholipid:diacylglycerol acyltransferase, phosphatidate phosphatase, fatty acid thioesterase such as palmitoyl protein thioesterase, or malic enzyme activities. In further embodiments it is envisaged to generate diatoms that have increased lipid accumulation. This can be achieved by targeting genes that decrease lipid catabolisation. Of particular interest for use in the methods of the present invention are genes involved in the activation of both triacylglycerol and free fatty acids, as well as genes directly involved in β-oxidation of fatty acids, such as acyl-CoA synthetase, 3-ketoacyl-CoA thiolase, acyl-CoA oxidase activity and phosphoglucomutase. The CRISPR-Cas system and methods described herein can be used to specifically activate such genes in diatoms as to increase their lipid content.

Organisms such as microalgae are widely used for synthetic biology. Stovicek et al. (Metab. Eng. Comm., 2015; 2:13 describes genome editing of industrial yeast, for example, *Saccharomyces cerevisiae*, to efficiently produce robust strains for industrial production. Stovicek used a CRISPR-Cas system codon-optimized for yeast to simultaneously disrupt both alleles of an endogenous gene and knock in a heterologous gene. CRISPR protein and gRNA were expressed from genomic or episomal 2μ-based vector locations. The authors also showed that gene disruption efficiency could be improved by optimization of the levels of CRISPR protein and gRNA expression. Hlavová et al. (Biotechnol. Adv. 2015) discusses development of species or strains of microalgae using techniques such as CRISPR to target nuclear and chloroplast genes for insertional mutagenesis and screening. The methods of Stovicek and Hlavová may be applied to the CRISPR effector protein system of the present invention.

U.S. Pat. No. 8,945,839 describes a method for engineering Micro-Algae (*Chlamydomonas reinhardtii* cells) species) using Cas9. Using similar tools, the methods of the CRISPR-Cas system described herein can be applied on *Chlamydomonas* species and other algae. In particular embodiments, CRISPR protein and guide RNA are introduced in algae expressed using a vector that expresses CRISPR protein under the control of a constitutive promoter such as Hsp70A-Rbc S2 or Beta2-tubulin. Guide RNA will be delivered using a vector containing T7 promoter. Alternatively, CRISPR protein mRNA and in vitro transcribed guide RNA can be delivered to algal cells. Electroporation protocol follows standard recommended protocol from the GeneArt *Chlamydomonas* Engineering kit.

The use of CRISPR/Cas in the generation of micro-organisms capable of fatty acid production.

In particular embodiments, the methods of the invention are used for the generation of genetically engineered micro-organisms capable of the production of fatty esters, such as fatty acid methyl esters ("FAME") and fatty acid ethyl esters ("FAEE").

Typically, host cells can be engineered to produce fatty esters from a carbon source, such as an alcohol, present in the medium, by expression or overexpression of a gene encoding a thioesterase, a gene encoding an acyl-CoA synthase, and a gene encoding an ester synthase. Accordingly, the methods provided herein are used to modify a micro-organisms so as to overexpress or introduce a thioesterase gene, a gene encoding an acyl-CoA synthase, and a gene encoding an ester synthase. In particular embodiments, the thioesterase gene is selected from tesA, 'tesA, tesB, fatB, fatB2, fatB3, fatA1, or fatA. In particular embodiments, the gene encoding an acyl-CoA synthase is selected from fadDJadK, BH3103, pfl-4354, EAV15023, fadD1, fadD2, RPC_4074, fadDD35, fadDD22, faa39, or an identified gene encoding an enzyme having the same properties. In particular embodiments, the gene encoding an ester synthase is a gene encoding a synthase/acyl-CoA:diacylglyceryl acyltransferase from *Simmondsia chinensis, Acinetobacter* sp. ADP, *Alcanivorax borkumensis, Pseudomonas aeruginosa, Fundibacter jadensis, Arabidopsis thaliana*, or *Alkaligenes eutrophus*, or a variant thereof. Additionally or alternatively, the methods provided herein are used to decrease expression in saidmicro-organism of at least one of a gene encoding an acyl-CoA dehydrogenase, a gene encoding an outer membrane protein receptor, and a gene encoding a transcriptional regulator of fatty acid biosynthesis. In particular embodiments one or more of these genes is inactivated, such as by introduction of a mutation. In particular embodiments, the gene encoding an acyl-CoA dehydrogenase is fadE. In particular embodiments, the gene encoding a transcriptional regulator of fatty acid biosynthesis encodes a DNA transcription repressor, for example, fabR.

Additionally or alternatively, said micro-organism is modified to reduce expression of at least one of a gene encoding a pyruvate formate lyase, a gene encoding a lactate dehydrogenase, or both. In particular embodiments, the gene encoding a pyruvate formate lyaseis pflB. In particular embodiments, the gene encoding a lactate dehydrogenase is IdhA. In particular embodiments one or more of these genes is inactivated, such as by introduction of a mutation therein.

In particular embodiments, the micro-organism is selected from the genus *Escherichia, Bacillus, Lactobacillus, Rhodococcus, Synechococcus, Synechocystis, Pseudomonas, Aspergillus, Trichoderma, Neurospora, Fusarium, Humicola, Rhizomucor, Kluyveromyces, Pichia, Mucor, Myceliophthora, Penicillium, Phanerochaete, Pleurotus, Trametes, Chrysosporium, Saccharomyces, Stenotrophomonas, Schizosaccharomyces, Yarrowia*, or *Streptomyces*.

The Use of CRISPR-Cas in the Generation of Micro-Organisms Capable of Organic Acid Production The methods provided herein are further used to engineer micro-organisms capable of organic acid production, more particularly from pentose or hexose sugars. In particular embodiments, the methods comprise introducing into a micro-organism an exogenous LDH gene. In particular embodiments, the organic acid production in said micro-organisms is additionally or alternatively increased by inactivating endogenous genes encoding proteins involved in an endogenous metabolic pathway which produces a metabolite other than the organic acid of interest and/or wherein the endogenous metabolic pathway consumes the organic acid. In particular embodiments, the modification ensures that the production of the metabolite other than the organic acid of interest is reduced. According to particular embodiments, the methods are used to introduce at least one engineered gene deletion and/or inactivation of an endogenous pathway in which the organic acid is consumed or a gene encoding a product involved in an endogenous pathway which produces a metabolite other than the organic acid of interest. In particular embodiments, the at least one engineered gene deletion or inactivation is in one or more gene encoding an enzyme selected from the group consisting of pyruvate decarboxylase (pdc), fumarate reductase, alcohol dehydrogenase (adh), acetaldehyde dehydrogenase, phosphoenolpyruvate carboxylase (ppc), D-lactate dehydrogenase (d-ldh), L-lactate dehydrogenase (1-ldh), lactate 2-monooxygenase. In further embodiments the at least one engineered gene deletion and/or inactivation is in an endogenous gene encoding pyruvate decarboxylase (pdc).

In further embodiments, the micro-organism is engineered to produce lactic acid and the at least one engineered gene deletion and/or inactivation is in an endogenous gene encoding lactate dehydrogenase. Additionally or alternatively, the micro-organism comprises at least one engineered gene deletion or inactivation of an endogenous gene encoding a cytochrome-dependent lactate dehydrogenase, such as a cytochrome B2-dependent L-lactate dehydrogenase.

The Use of CRISPR/Cas in the Generation of Improved Xylose or Cellobiose Utilizing Yeasts Strains In particular embodiments, the CRISPR-Cas system may be applied to select for improved xylose or cellobiose utilizing yeast strains. Error-prone PCR can be used to amplify one (or more) genes involved in the xylose utilization or cellobiose utilization pathways. Examples of genes involved in xylose utilization pathways and cellobiose utilization pathways may include, without limitation, those described in Ha, S. J., et al. (2011) Proc. Natl. Acad. Sci. USA 108(2):504-9 and Galazka, J. M., et al. (2010) Science 330(6000):84-6. Resulting libraries of double-stranded DNA molecules, each comprising a random mutation in such a selected gene could be co-transformed with the components of the CRISPR-Cas system into a yeast strain (for instance S288C) and strains can be selected with enhanced xylose or cellobiose utilization capacity, as described in WO2015138855.

The Use of CRISPR/Cas in the Generation of Improved Yeasts Strains for Use in Isoprenoid Biosynthesis Tadas Jakočiūnas et al. described the successful application of a multiplex CRISPR/Cas system for genome engineering of up to 5 different genomic loci in one transformation step in baker's yeast *Saccharomyces cerevisiae* (Metabolic Engineering Volume 28, March 2015, Pages 213-222) resulting in strains with high mevalonate production, a key intermediate for the industrially important isoprenoid biosynthesis pathway. In particular embodiments, the CRISPR-Cas system may be applied in a multiplex genome engineering method as described herein for identifying additional high producing yeast strains for use in isoprenoid synthesis.

The Use of CRISPR/Cas in the Generation of Lactic Acid Producing Yeasts Strains

In another embodiment, successful application of a multiplex CRISPR-Cas system is encompassed. In analogy with Vratislav Stovicek et al. (Metabolic Engineering Communications, Volume 2, December 2015, Pages 13-22), improved lactic acid-producing strains can be designed and obtained in a single transformation event. In a particular embodiment, the CRISPR-Cas system is used for simultaneously inserting the heterologous lactate dehydrogenase gene and disruption of two endogenous genes PDC1 and PDC5 genes.

Further Applications of the CRISPR-Cas System in Plants

In particular embodiments, the CRISPR system, and preferably the CRISPR-Cas system described herein, can be used for visualization of genetic element dynamics. For example, CRISPR imaging can visualize either repetitive or non-repetitive genomic sequences, report telomere length change and telomere movements and monitor the dynamics of gene loci throughout the cell cycle (Chen et al., Cell, 2013). These methods may also be applied to plants.

Other applications of the CRISPR system, and preferably the CRISPR-Cas system described herein, is the targeted gene disruption positive-selection screening in vitro and in vivo (Malina et al., Genes and Development, 2013). These methods may also be applied to plants.

In particular embodiments, fusion of inactive CRISPR protein endonucleases with histone-modifying enzymes can introduce custom changes in the complex epigenome (Rusk et al., Nature Methods, 2014). These methods may also be applied to plants.

In particular embodiments, the CRISPR system, and preferably the CRISPR-Cas system described herein, can be used to purify a specific portion of the chromatin and identify the associated proteins, thus elucidating their regulatory roles in transcription (Waldrip et al., Epigenetics, 2014). These methods may also be applied to plants.

In particular embodiments, present invention can be used as a therapy for virus removal in plant systems as it is able to cleave both viral DNA and RNA. Previous studies in human systems have demonstrated the success of utilizing CRISPR in targeting the single strand RNA virus, hepatitis C (A. Price, et al., Proc. Natl. Acad. Sci, 2015) as well as the double stranded DNA virus, hepatitis B (V. Ramanan, et al., Sci. Rep, 2015). These methods may also be adapted for using the CRISPR-Cas system in plants.

In particular embodiments, present invention could be used to alter genome complexity. In further particular embodiment, the CRISPR system, and preferably the CRISPR-Cas system described herein, can be used to disrupt or alter chromosome number and generate haploid plants, which only contain chromosomes from one parent. Such plants can be induced to undergo chromosome duplication and converted into diploid plants containing only homozygous alleles (Karimi-Ashtiyani et al., PNAS, 2015; Anton et al., Nucleus, 2014). These methods may also be applied to plants.

In particular embodiments, the CRISPR-Cas system described herein, can be used for self-cleavage. In these embodiments, the promotor of the CRISPR protein and gRNA can be a constitutive promotor and a second gRNA is introduced in the same transformation cassette, but controlled by an inducible promoter. This second gRNA can be designated to induce site-specific cleavage in the CRISPR protein gene in order to create a non-functional CRISPR protein. In a further particular embodiment, the second gRNA induces cleavage on both ends of the transformation cassette, resulting in the removal of the cassette from the host genome. This system offers a controlled duration of cellular exposure to the Cas enzyme and further minimizes off-target editing. Furthermore, cleavage of both ends of a CRISPR/Cas cassette can be used to generate transgene-free TO plants with bi-allelic mutations (as described for Cas9 e.g. Moore et al., Nucleic Acids Research, 2014; Schaeffer et al., Plant Science, 2015). The methods of Moore et al. may be applied to the CRISPR-Cas systems described herein.

Sugano et al. (Plant Cell Physiol. 2014 March; 55(3):475-81. doi: 10.1093/pcp/pcu014. Epub 2014 Jan. 18) reports the application of CRISPR-Cas9 to targeted mutagenesis in the liverwort Marchantia polymorpha L., which has emerged as a model species for studying land plant evolution. The U6 promoter of M. polymorpha was identified and cloned to express the gRNA. The target sequence of the gRNA was designed to disrupt the gene encoding auxin response factor 1 (ARF1) in M. polymorpha. Using Agrobacterium-mediated transformation, Sugano et al. isolated stable mutants in the gametophyte generation of M. polymorpha. CRISPR-Cas-based site-directed mutagenesis in vivo was achieved using either the Cauliflower mosaic virus 35S or M. polymorpha EF1α promoter to express CRISPR protein. Isolated mutant individuals showing an auxin-resistant phenotype were not chimeric. Moreover, stable mutants were produced by asexual reproduction of T1 plants. Multiple arf1 alleles were easily established using CRISPR-Cas-based targeted mutagenesis. The methods of Sugano et al. may be applied to the CRISPR effector protein system of the present invention.

Kabadi et al. (Nucleic Acids Res. 2014 Oct. 29; 42(19): e147. doi: 10.1093/nar/gku749. Epub 2014 Aug. 13) developed a single lentiviral system to express a Cas9 variant, a reporter gene and up to four sgRNAs from independent RNA polymerase III promoters that are incorporated into the vector by a convenient Golden Gate cloning method. Each sgRNA was efficiently expressed and can mediate multiplex gene editing and sustained transcriptional activation in immortalized and primary human cells. The methods of Kabadi et al. may be applied to the CRISPR effector protein system of the present invention.

Ling et al. (BMC Plant Biology 2014, 14:327) developed a CRISPR-Cas9 binary vector set based on the pGreen or pCAMBIA backbone, as well as a gRNA This toolkit requires no restriction enzymes besides BsaI to generate final constructs harboring maize-codon-optimized CRISPR protein and one or more gRNAs with high efficiency in as little as one cloning step. The toolkit was validated using maize protoplasts, transgenic maize lines, and transgenic Arabidopsis lines and was shown to exhibit high efficiency and specificity. More importantly, using this toolkit, targeted mutations of three Arabidopsis genes were detected in transgenic seedlings of the T1 generation. Moreover, the multiple-gene mutations could be inherited by the next generation. (guide RNA) module vector set, as a toolkit for multiplex genome editing in plants. The toolbox of Lin et al. may be applied to the CRISPR effector protein system of the present invention.

Protocols for targeted plant genome editing via CRISPR-Cas are also available based on those disclosed for the CRISPR-Cas9 system in volume 1284 of the series Methods in Molecular Biology pp 239-255 10 Feb. 2015. A detailed procedure to design, construct, and evaluate dual gRNAs for plant codon-optimized Cas9 (pcoCas9) mediated genome editing using Arabidopsis thaliana and Nicotiana benthamiana protoplasts s model cellular systems are described. Strategies to apply the CRISPR-Cas system to generating targeted genome modifications in whole plants are also discussed. The protocols described in the chapter may be applied to the CRISPR effector protein system of the present invention.

Ma et al. (Mol Plant. 2015 Aug. 3; 8(8):1274-84. doi: 10.1016/j.molp.2015.04.007) reports robust CRISPR-Cas9 vector system, utilizing a plant codon-optimized Cas9 gene, for convenient and high-efficiency multiplex genome editing in monocot and dicot plants. Ma et al. designed PCR-based procedures to rapidly generate multiple sgRNA expression cassettes, which can be assembled into the binary CRISPR-Cas9 vectors in one round of cloning by Golden Gate ligation or Gibson Assembly. With this system, Ma et al. edited 46 target sites in rice with an average 85.4% rate of mutation, mostly in biallelic and homozygous status. Ma et al. provide examples of loss-of-function gene mutations in TO rice and T1 Arabidopsis plants by simultaneous targeting of multiple (up to eight) members of a gene family, multiple genes in a biosynthetic pathway, or multiple sites in a single gene. The methods of Ma et al. may be applied to the CRISPR effector protein system of the present invention.

Lowder et al. (Plant Physiol. 2015 Aug. 21. pii: pp. 00636.2015) also developed a CRISPR-Cas9 toolbox enables multiplex genome editing and transcriptional regulation of expressed, silenced or non-coding genes in plants. This toolbox provides researchers with a protocol and reagents to quickly and efficiently assemble functional CRISPR-Cas9 T-DNA constructs for monocots and dicots using Golden Gate and Gateway cloning methods. It comes with a full suite of capabilities, including multiplexed gene editing and transcriptional activation or repression of plant endogenous genes. T-DNA based transformation technology is fundamental to modern plant biotechnology, genetics, molecular biology and physiology. As such, Applicants developed a method for the assembly of Cas9 (WT, nickase or dCas9) and gRNA(s) into a T-DNA destination-vector of interest. The assembly method is based on both Golden Gate assembly and MultiSite Gateway recombination. Three modules are required for assembly. The first module is a Cas9 entry vector, which contains promoterless Cas9 or its derivative genes flanked by attL1 and attR5 sites. The second module is a gRNA entry vector which contains entry gRNA expression cassettes flanked by attL5 and attL2 sites. The third module includes attR1-attR2-containing destination T-DNA vectors that provide promoters of choice for Cas9 expression. The toolbox of Lowder et al. may be applied to the CRISPR effector protein system of the present invention.

Wang et al. (bioRxiv 051342; doi: doi.org/10.1101/051342; Epub. May 12, 2016) demonstrate editing of homoeologous copies of four genes affecting important agronomic traits in hexaploid wheat using a multiplexed gene editing construct with several gRNA-tRNA units under the control of a single promoter.

In an advantageous embodiment, the plant may be a tree. The present invention may also utilize the herein disclosed CRISPR Cas system for herbaceous systems (see, e.g., Belhaj et al., Plant Methods 9: 39 and Harrison et al., Genes & Development 28: 1859-1872). In a particularly advantageous embodiment, the CRISPR Cas system of the present invention may target single nucleotide polymorphisms (SNPs) in trees (see, e.g., Zhou et al., New Phytologist, Volume 208, Issue 2, pages 298-301, October 2015). In the Zhou et al. study, the authors applied a CRISPR Cas system in the woody perennial Populus using the 4-coumarate:CoA ligase (4CL) gene family as a case study and achieved 100% mutational efficiency for two 4CL genes targeted, with every transformant examined carrying biallelic modifications. In the Zhou et al., study, the CRISPR-Cas9 system was highly sensitive to single nucleotide polymorphisms (SNPs), as cleavage for a third 4CL gene was abolished due to SNPs in the target sequence. These methods may be applied to the CRISPR effector protein system of the present invention.

The methods of Zhou et al. (New Phytologist, Volume 208, Issue 2, pages 298-301, October 2015) may be applied to the present invention as follows. Two 4CL genes, 4CL1 and 4CL2, associated with lignin and flavonoid biosynthesis, respectively are targeted for CRISPR-Cas editing. The Populus tremula×alba clone 717-1B4 routinely used for transformation is divergent from the genome-sequenced Populus trichocarpa. Therefore, the 4CL1 and 4CL2 gRNAs designed from the reference genome are interrogated with in-house 717 RNA-Seq data to ensure the absence of SNPs which could limit Cas efficiency. A third gRNA designed for 4CL5, a genome duplicate of 4CL1, is also included. The corresponding 717 sequence harbors one SNP in each allele near/within the PAM, both of which are expected to abolish targeting by the 4CL5-gRNA. All three gRNA target sites are located within the first exon. For 717 transformation, the gRNA is expressed from the Medicago U6.6 promoter, along with a human codon-optimized Cas under control of the CaMV 35S promoter in a binary vector. Transformation with the Cas-only vector can serve as a control. Randomly selected 4CL1 and 4CL2 lines are subjected to amplicon-sequencing. The data is then processed and biallelic mutations are confirmed in all cases. These methods may be applied to the CRISPR effector protein system of the present invention.

In plants, pathogens are often host-specific. For example, Fusarium oxysporum f. sp. lycopersici causes tomato wilt but attacks only tomato, and F. oxysporum f. dianthus Puccinia graminis f. sp. tritici attacks only wheat. Plants have existing and induced defenses to resist most pathogens. Mutations and recombination events across plant generations lead to genetic variability that gives rise to susceptibility, especially as pathogens reproduce with more frequency than plants. In plants there can be non-host resistance, e.g., the host and pathogen are incompatible. There can also be Horizontal Resistance, e.g., partial resistance against all races of a pathogen, typically controlled by many genes and Vertical Resistance, e.g., complete resistance to some races of a pathogen but not to other races, typically controlled by a few genes. In a Gene-for-Gene level, plants and pathogens evolve together, and the genetic changes in one balance changes in other. Accordingly, using Natural Variability, breeders combine most useful genes for Yield, Quality, Uniformity, Hardiness, Resistance. The sources of resistance genes include native or foreign Varieties, Heirloom Varieties, Wild Plant Relatives, and Induced Mutations, e.g., treating plant material with mutagenic agents. Using the present invention, plant breeders are provided with a new tool to conduct genome-wide screening of transcriptional enhancer or repressor. Accordingly, one skilled in the art can analyze the genome of sources of resistance genes, and in Varieties having desired characteristics or traits employ the present invention to induce the rise of resistance genes, with more precision than previous mutagenic agents and hence accelerate and improve plant breeding programs.

The following table provides additional references and related fields for which the CRISPR-Cas complexes, modified effector proteins, systems, and methods of optimization may be used to improve bioproduction.

| | | |
|---|---|---|
| Feb. 17, 2014 | PCT/US15/63434 (WO2016/099887) | Compositions and methods for efficient gene editing in E. coli using guide RNA/Cas endonuclease systems in combination with circular polynucleotide modification templates. |
| Aug. 13, 2014 | PCT/US15/41256 (WO2016/025131) | Genetic targeting in non-conventional yeast using an RNA-guided endonuclease. |
| Nov. 6, 2014 | PCT/US15/58760 (WO2016/073433) | Peptide-mediated delivery of RNA-guided endonuclease into cells. |
| Oct. 12, 2015 | PCT/US16/56404 (WO2017/066175) | Protected DNA templates for gene modification and increased homologous recombination in cells and methods of use. |

| | | |
|---|---|---|
| Dec. 11, 2015 | PCT/US16/65070 (WO2017/100158) | Methods and compositions for enhanced nuclease-mediated genome modification and reduced off-target site effects. |
| Dec. 18, 2015 | PCT/US16/65537 (WO2017/105991) | Methods and compositions for T-RNA based guide RNA expression. |
| Dec. 18, 2015 | PCT/US16/66772 (WO2017/106414) | Methods and compositions for polymerase II (Pol-II) based guide RNA expression. |
| Dec. 16, 2014 | PCT/US15/65693 (WO2016/100272) | Fungal genome modification systems and methods of use. |
| Dec. 16, 2014 | PCT/US15/66195 (WO2016/100571) | Fungal genome modification systems and methods of use |
| Dec. 16, 2014 | PCT/US15/66192 (WO2016/100568) | Fungal genome modification systems and methods of use. |
| Dec. 16, 2014 | PCT/US15/66178 (WO2016/100562) | Use of a helper strain with silenced NHEJ to improve homologous integration of targeted DNA cassettes in *Trichoderma reesei*. |
| Jul. 28, 2015 | PCT/US16/44489 (WO2017/019867) | Genome editing systems and methods of use. |

Improved Plants and Yeast Cells

The present invention also provides plants and yeast cells obtainable and obtained by the methods provided herein. The improved plants obtained by the methods described herein may be useful in food or feed production through expression of genes which, for instance ensure tolerance to plant pests, herbicides, drought, low or high temperatures, excessive water, etc. In some embodiments, the improved plants and yeast cells comprise one or more transcriptional enhancers or repressors mutated, deleted, repressed or inhibited.

The improved plants obtained by the methods described herein, especially crops and algae may be useful in food or feed production through expression of, for instance, higher protein, carbohydrate, nutrient or vitamin levels than would normally be seen in the wildtype. In this regard, improved plants, especially pulses and tubers are preferred.

Improved algae or other plants such as rape may be particularly useful in the production of vegetable oils or biofuels such as alcohols (especially methanol and ethanol), for instance. These may be engineered to express or overexpress high levels of oil or alcohols for use in the oil or biofuel industries.

The invention also provides for improved parts of a plant. Plant parts include, but are not limited to, leaves, stems, roots, tubers, seeds, endosperm, ovule, and pollen. Plant parts as envisaged herein may be viable, nonviable, regeneratable, and/or non-regeneratable.

It is also encompassed herein to provide plant cells and plants generated according to the methods of the invention. Gametes, seeds, embryos, either zygotic or somatic, progeny or hybrids of plants comprising the genetic modification, which are produced by traditional breeding methods, are also included within the scope of the present invention. Such plants may contain a heterologous or foreign DNA sequence inserted at or instead of a target sequence. Alternatively, such plants may contain only an alteration (mutation, deletion, insertion, substitution) in one or more nucleotides. As such, such plants will only be different from their progenitor plants by the presence of the particular modification.

Thus, the invention provides a plant, animal or cell, produced by the present methods, or a progeny thereof. The progeny may be a clone of the produced plant or animal, or may result from sexual reproduction by crossing with other individuals of the same species to introgress further desirable traits into their offspring. The cell may be in vivo or ex vivo in the cases of multicellular organisms, particularly animals or plants.

The methods for genome editing using the CRISPR system as described herein can be used to confer desired traits on essentially any plant, algae, fungus, yeast, etc. A wide variety of plants, algae, fungus, yeast, etc and plant algae, fungus, yeast cell or tissue systems may be engineered for the desired physiological and agronomic characteristics described herein using the nucleic acid constructs of the present disclosure and the various transformation methods mentioned above.

In particular embodiments, the methods described herein are used to modify endogenous genes or to modify their expression without the permanent introduction into the genome of the plant, algae, fungus, yeast, etc of any foreign gene, including those encoding CRISPR components, so as to avoid the presence of foreign DNA in the genome of the plant. This can be of interest as the regulatory requirements for non-transgenic plants are less rigorous.

The CRISPR systems provided herein can be used to introduce targeted double-strand or single-strand breaks and/or to introduce gene activator and/or repressor systems and without being limitative, can be used for gene targeting, gene replacement, targeted mutagenesis, targeted deletions or insertions, targeted inversions and/or targeted translocations. By co-expression of multiple targeting RNAs directed to achieve multiple modifications in a single cell, multiplexed genome modification can be ensured. This technology can be used to high-precision engineering of plants with improved characteristics, including enhanced nutritional quality, increased resistance to diseases and resistance to biotic and abiotic stress, and increased production of commercially valuable plant products or heterologous compounds.

The methods described herein generally result in the identification and/or generation of "improved plants, algae, fungi, yeast, etc" in that they have one or more desirable traits compared to the wildtype plant. In particular embodiments, the plants, algae, fungi, yeast, etc., cells or parts obtained are transgenic plants, comprising an exogenous DNA sequence incorporated into the genome of all or part of the cells. In particular embodiments, non-transgenic genetically modified plants, algae, fungi, yeast, etc., parts or cells are obtained, in that no exogenous DNA sequence is incorporated into the genome of any of the cells of the plant. In such embodiments, the improved plants, algae, fungi, yeast, etc. are non-transgenic. Where only the modification of an endogenous gene is ensured and no foreign genes are introduced or maintained in the plant, algae, fungi, yeast, etc. genome, the resulting genetically modified crops contain no foreign genes and can thus basically be considered non-transgenic. The different applications of the CRISPR-Cas system for plant, algae, fungi, yeast, etc. genome editing include, but are not limited to: introduction of one or more foreign genes to confer an agricultural trait of interest; editing of endogenous genes to confer an agricultural trait of interest; modulating of endogenous genes by the CRISPR-Cas system to confer an agricultural trait of interest. Exemplary genes conferring agronomic traits include, but are not limited to genes that confer resistance to pests or diseases; genes involved in plant diseases, such as those listed in WO 2013046247; genes that confer resistance to herbicides, fungicides, or the like; genes involved in (abiotic) stress tolerance. Other aspects of the use of the CRISPR-Cas system include, but are not limited to: create (male) sterile plants; increasing the fertility stage in plants/algae etc;

generate genetic variation in a crop of interest; affect fruit-ripening; increasing storage life of plants/algae etc; reducing allergen in plants/algae etc; ensure a value added trait (e.g. nutritional improvement); Screening methods for endogenous genes of interest; biofuel, fatty acid, organic acid, etc production.

Although the invention and its advantages have been described in detail, it should be understood that various changes, substitutions and alterations can be made herein without departing from the spirit and scope of the invention as defined in the appended claims.

The invention will be further illustrated in the following Examples which are given for illustration purposes only and are not intended to limit the invention in any way.

WORKING EXAMPLES

Example 1

Gene expression in mammals is regulated by non-coding elements that can impact physiology and disease, yet the functions and target genes of most non-coding elements remain unknown. We present a high-throughput approach that uses CRISPR interference (CRISPRi) to discover regulatory elements and identify their target genes. We assess >1 megabase (Mb) of sequence in the vicinity of 2 essential transcription factors, MYC and GATA1, and identify 9 distal enhancers that control gene expression and cellular proliferation. Quantitative features of chromatin state and chromosome conformation distinguish the 7 enhancers that regulate MYC from other elements that do not, suggesting a strategy for predicting enhancer-promoter connectivity. This CRISPRi-based approach can be applied to dissect transcriptional networks and interpret the contributions of non-coding genetic variation to human disease.

Materials and Methods

Selection of Targets for sgRNA Library.

Figure 4:
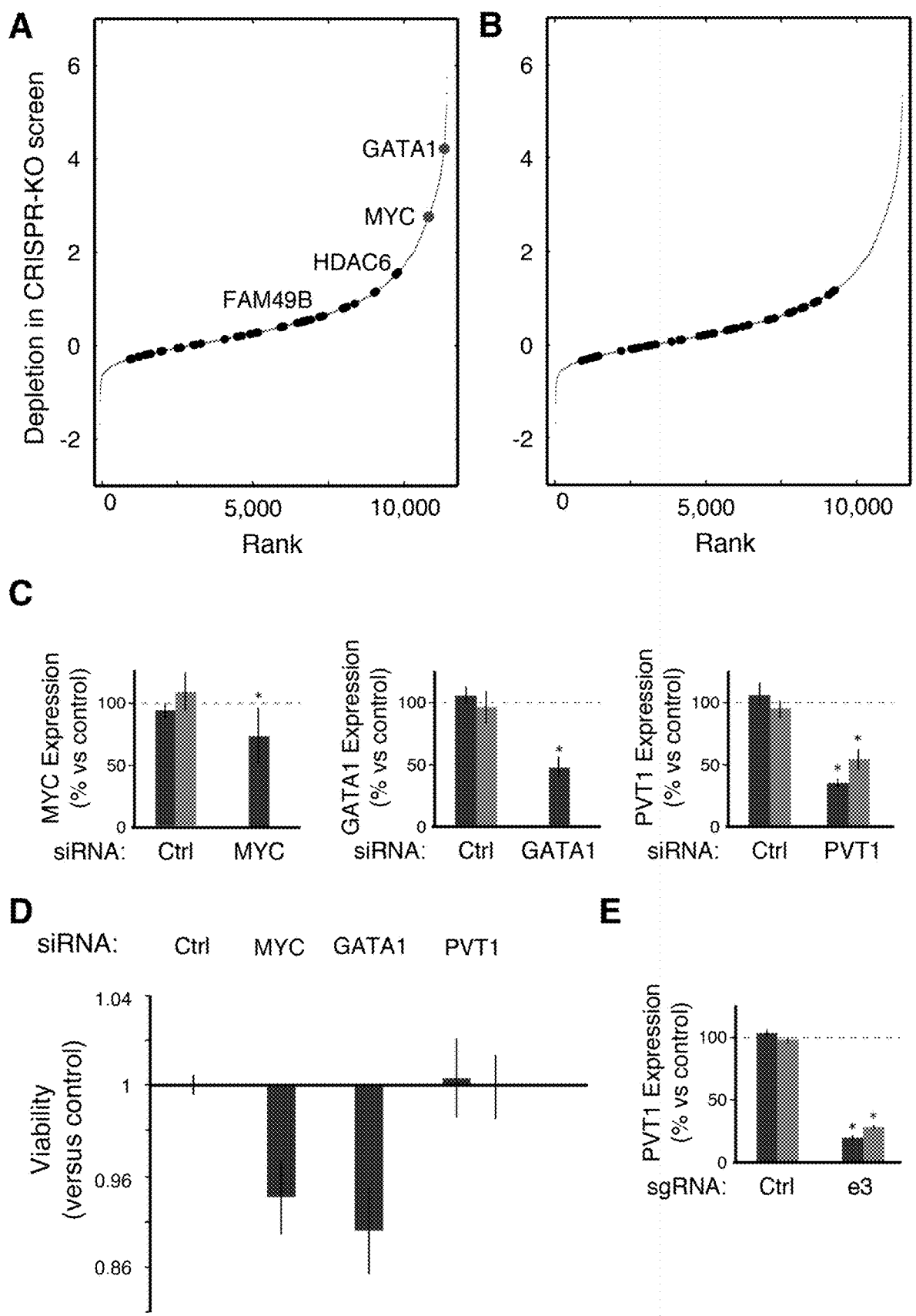
FIG. 4 shows GATA1 and MYC are encoded far from other genes that strongly affect proliferation in K562 cells. (A) Gray: Depletion ($-\log_2$ fold-change after 14 population doublings) in a previous genome-wide CRISPR knockout screen of all genes expressed in K562 cells (26). Higher scores denote stronger effect on proliferation. Black: genes within 500 Kb or in the same topological domain as MYC or GATA1 (highlighted in red). (B) Same for the three tiled negative control regions. (C) Knockdown efficiency for siRNAs targeting MYC, GATA1, and PVT1, as assayed by qPCR compared to siRNAs without an RNA target (Ctrl). Gray bars: two different siRNAs for Ctrl and PVT1. Error bars: 95% confidence intervals (CI) for the mean of four independent transfections. *: $p<0.05$ in T-test versus negative controls. (D) Relative viability of cells in a competitive growth assay (gamma). GFP-expressing cells were transfected with siRNAs against GATA1, MYC, PVT1, or siRNAs without a genomic target (Ctrl) and were mixed with RFP-expressing cells transfected with a Ctrl siRNA and grown for four days before counting. Error bars: 95% confidence intervals (CI) for the mean of 4 independent transfections. Two different sgRNAs for PVT1 were tested. *: $p<0.05$ in T-test versus negative controls. (E) qPCR for PVT1 RNA in cells expressing sgRNAs targeting a TSS of PVT1 (e3) or sgRNAs without a genomic target (Ctrl). KRAB-dCas9 expression was activated with doxycycline for 24 hours before measurement. Gray bars: two different sgRNAs per target. Error bars: 95% confidence intervals (CI) for the mean of 3 independent infections. *: $p<0.05$ in T-test versus negative controls.

To develop this CRISPRi screening approach, we focused on two genes—MYC and GATA1—that play critical roles in human development and disease and that are known to affect cellular proliferation in K562 cells (26). We determined by consulting a genome-wide catalog of gene essentiality in K562 cells (26) as well as Hi-C data in K562 cells (6) that MYC and GATA1 are not located in close linear (500 Kb) or spatial proximity (within the same topological domain) to other genes expressed in K562 cells that strongly affect cell proliferation (FIG. 4). We also examined the potential effects of several non-coding RNAs in the MYC locus on cell proliferation, but determined that none are likely to contribute.

We designed an sgRNA library containing guides targeting several loci as well as internal controls, for a total of 98,599 sgRNAs. We dedicated most of the sgRNAs in the library to studying the MYC locus, due to the apparent complexity of its regulatory architecture (e.g., FIG. 3A) (27) and its importance in many human cancers. To identify the elements that regulate MYC, we examined the 3-Mb topological domain and selected a ~666 Kb region that contained MYC itself, many elements with strong DHS and H3K27ac signal in K562 cells, and all intervening regions. We selected additional regions throughout the domain to cover other strong H3K27ac peaks downstream of MYC (including the regions surrounding e5-e7 that from Hi-C can be observed to form long-range loops to the MYC promoter), as well as additional regions upstream of MYC that are marked by active chromatin in other cell types but not in K562s (e.g., FIG. 3A). In each case, we included at least 5 kb of sequence surrounding the ENCODE "broadPeak" annotations. We note that performing similar experiments with larger libraries for example including all possible sgRNAs in the 3-Mb topological domain containing MYC—is possible and would require increasing the scale of the experiment (number of cells and reads) accordingly.

For GATA1, we tiled a 74 kb region containing the GATA1 gene body as well as several putative enhancer elements nearby, including 17 kb annotated as "weak enhancer" and 19.4 kb annotated as "strong enhancer" by ENCODE ChromHMM (FIG. 1). We note that we do not rule out the possibility that additional regulatory elements beyond this span may regulate GATA1.

We included several additional sets of sgRNAs as internal positive and negative controls for the screen. As negative controls, we included 4,082 scrambled-sequence sgRNAs, selected to include all 20- or 21-nucleotide sgRNAs from the previous genome-wide CRISPRi screening library designed by the Weissman lab (10), subject to the filters described below. We also included sgRNAs targeting the promoters of 600 protein coding genes—including 535 that are expressed in K562 cells (fragments per kilobase per million >1) and 65 that are not expressed—as internal standards in the screen to compare to previous genome-wide screens assessing gene essentiality (10, 26). We selected these genes to span the range of potential effects on cellular proliferation, including the 52 most essential genes reported previously (26).

Finally, because sgRNAs tiling across a non-coding region might be subject to different biases than scrambled-sequence sgRNAs (e.g., due to specific sequence motifs, repetitive regions, or general toxic effects of targeting KRAB-dCas9 to chromatin), we selected additional negative control regions that are not close to genes known to be strongly essential but nonetheless do have putative regulatory elements marked by DHS and H3K27ac. We used these negative control regions (85 kb total) to estimate an empirical false discovery rate for elements in the GATA1 and MYC loci.

sgRNA Design for Tiling Non-Coding Sequences

To design sgRNAs for tiling across non-coding sequences, we generated a list of all possible targeting sites with an NGG PAM. We calculated a specificity score based on potential off-target sites using a previously described algorithm (28), and removed guides with specificity scores <20. We note that this means that certain non-coding regions, including regions containing repetitive elements, are not tested by this screen. For cloning sgRNAs into sgOpti, we added a "G" base to the beginning of the 20-nucleotide sequence if the first base was not already a "G". We applied additional filters to the sgRNAs considered during analysis of the screen.

sgRNA Design for Targeting Promoters

Because CRISPRi has a ~200-bp window of efficacy surrounding the TSS (29), we used capped analysis of gene expression (CAGE) data from K562 cells (30) to precisely define TSS locations (10-bp resolution) and designed sgRNAs targeting the regions immediately proximal to this site. In cases where genes showed multiple TSSs (as judged by the second-strongest TSS having >20% of the CAGE signal of the stronger TSS), we designed sgRNAs against both of these TSSs. To design sgRNAs targeting these sites, we used an algorithm based on a previous approach (10). We first generated all possible guides of length 18-24 where the first position in the genome corresponds to a "G", filtering out those with potential for off-target effects based on their specificity score. We defined prioritized windows around the TSS corresponding to (−30 to +45 bp), (−30 to +95 bp), and (−200 to +200 bp). We selected sgRNAs from these regions in order until we obtained 20 sgRNAs per promoter. For each window, we chose as many sgRNAs as possible that were spaced at least 5 bp apart, and then moved to the next priority window.

Tissue Culture

We maintained K562 (ATCC) cells a density between 100K and 1M per mL in RPMI-1640 (Thermo Fisher Scientific, Waltham, MA) with 10% heat-inactivated FBS (HIFBS, (Thermo Fisher Scientific), 2 mM L-glutamine, and 100 units/ml streptomycin and 100 mg/ml penicillin. We maintained HEK293 Ts between 20 and 80% confluence in DMEM with 1 mM Sodium Pyruvate, 25 mM Glucose (Thermo Fisher Scientific) and 10% HIFBS unless otherwise noted.

Constructs for CRISPRi

We expressed sgRNAs from sgOpti, a modification of pLenti-sgRNA (Addgene #71409) with the sgRNA scaffold replaced with the sgRNA-(F+E)-combined optimized scaffold previously described (31). We generated constructs expressing inducible KRAB-dCas9 by replacing the SFFV promoter with a TRE3G promoter and the P2A-mCherry cassette with an IRES-GFP or IRES-BFP cassette in pHR-SFFV-KRAB-dCas9-P2A-mCherry (Addgene #60954)(10).

CRISPRi Line Generation

We generated the inducible CRISPRi cells lines by (i) transducing K562 cells with a construct expressing rtTA linked by IRES to a neomycin resistance cassette expressed from an EF1α promoter (ClonTech, Mountain View, CA) and selecting with 200 µg/mL G418 (Thermo Fisher), then (ii) transducing these rtTA-expressing K562 cells with one of the KRAB-dCas9 constructs described in the section above. We selected for cells expressing GFP or BFP by fluorescence activated cell sorting (FACS).

sgRNA Library Cloning

We synthesized an oligo pool corresponding to the sgRNA library with PCR tags (purchased from CustomArray, Bothell, WA). We amplified the pool by PCR with primers sgRNA Library Fwd/Rev to add homology arms for Gibson assembly (Table 1), and purified the product with an equal volume (1×) AMPure XP SPRI beads (Beckman Coulter, Danvers, MA).

We prepared the vector backbone by digesting sgOpti with BsmBI (New England Biolabs (NEB), Ipswich, MA) followed by purification with 0.75×AMPure XP SPRI. We assembled 70 ng amplified library into 500 ng digested vector in a 50 µL Gibson reaction (NEB), cleaned these by 0.75×AMPure XP SPRI, eluted in 15 µL H$_2$O and electroporated the entire volume into Endura competent cells (Lucigen, Middleton, WI). We expanded the cells in liquid culture for 18 hours at 30° C. and purified the pooled library plasmid with the Endotoxin-Free Plasmid Maxiprep Kit (Qiagen, Hilden, Germany).

Lentivirus Production

We plated 700,000 HEK293T cells on 6-well plates (Corning, Corning, NY) and 24 hours later transfected with 1 µg dVPR, 300 ng VSVG, and 1.2 µg transfer plasmid using XtremeGene9 (Roche Diagnostics, Indianapolis, IN). For pooled screens, the cell number and plasmid mass were scaled proportionally to 14 million cells on a 15 cm plate (Corning). 16 hours post-transfection we changed media to DMEM with 20% HIFBS. At 48 hours post-transfection, we harvested viral supernatants and filtered them through a 0.45 µM syringe filter before use.

Pooled CRISPRi Screens for Essentiality

We transduced K562 harboring a doxycycline-inducible KRAB-dCas9 at an multiplicity of infection (MOI) of 0.3 at a coverage of 1,000 transduced cells per sgRNA as previously described (26). Starting 36 hours after transduction, we selected for successfully transduced cells with 1 µg/mL puromycin for 72 hours and collected 150 million cells as a reference sample. After maintaining cells at 1,000× coverage in 0.2 µg/mL puromycin and 0.5 µg/mL doxycycline for 14 population doublings, we collected 150 million cells of the final cell population. We extracted genomic DNA from both the reference and final cell populations using the QIAamp DNA Blood Maxi kit (Qiagen) according to the manufacturer's instructions. We amplified sgRNAs integrations from 900 µg genomic DNA by PCR with indexed sgRNA sequencing library primers containing Illumina adaptors (Table 1) and sequenced them on a HiSeq 2500 using custom Illumina sequencing and index primers (Table 1) to an average depth of >350 reads per sgRNA. We used Bowtie (32) to align the resulting sequences to the sgRNA library allowing perfect matches only.

Analysis of sgRNA Depletion in Proliferation-Based Screen

To evaluate the potential of off-target sgRNA-mediated toxicity to affect cellular proliferation, we inspected the depletion of the set of sgRNAs in the tiled negative control regions (where we expect no on-target sgRNA depletion) and noted that the frequency of sgRNAs more than 2-fold depleted across the screen is higher (2-proportion Z-test $p<0.0001$) in sgRNAs with specificity scores below 50 (9%) than those with a score of 50 or above (5%). We considered only the sgRNAs with specificity scores >50 in the subsequent analysis. We also ignored sgRNAs with more than 10 "G" bases in the targeting sequence, which also lead to an increased frequency of off-target toxicity based on analysis of the negative control sgRNAs. These filters retain >90% of sgRNAs. To ensure robust calculation of sgRNA scores, we examined only sgRNAs with at least 50 raw reads in the initial timepoints for both replicates (retains 98% of sgRNAs). We assessed the depletion of the remaining sgRNAs as described below.

CRISPRi Score

Figure 5:
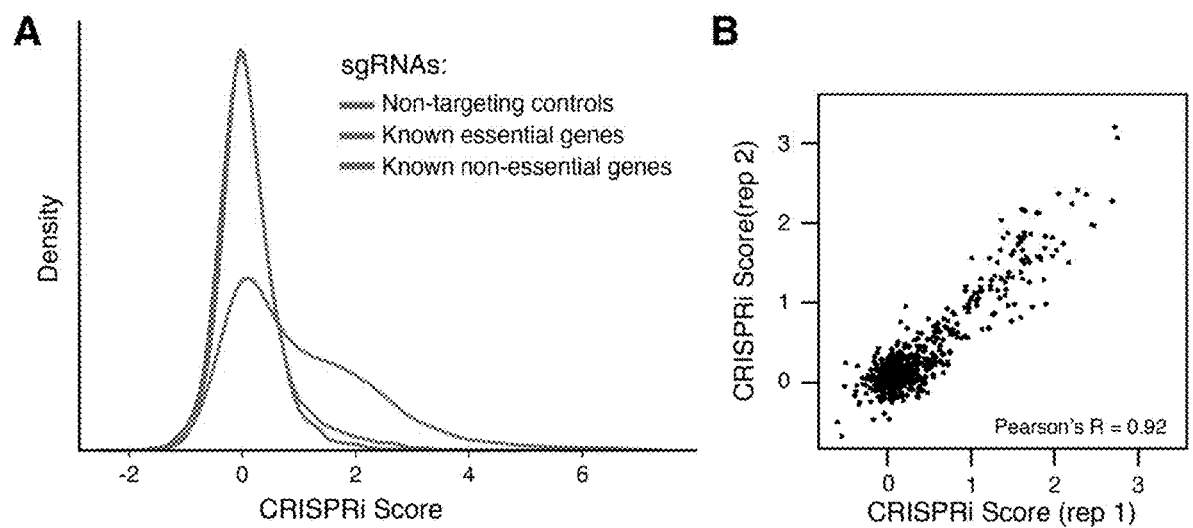
FIG. 5 shows CRISPRi screen reproducibly depletes sgRNAs targeting promoters of essential genes. (A) Distributions of CRISPRi scores for sgRNAs targeting the promoters of genes previously identified as essential or nonessential based on a genome-wide CRISPR knockout screen (26) and for sgRNAs with no genomic target (control sequences). A higher CRISPRi score indicates stronger depletion over the course of the screen. (B) Average CRISPRi scores for 600 protein coding gene promoters in replicate screens.

The "CRISPRi score" represents the $-\log_2$ depletion between the beginning and end of the proliferation screen (14 doublings). We calculated the CRISPRi score for each of two replicates and report the mean of these scores as the CRISPRi score for each sgRNA. To identify significant regions by integrating information from multiple sgRNAs, we used a sliding window approach, averaging the mean CRISPRi score across N consecutive guides. To choose N, we compared the correlation of the window CRISPRi scores between the two replicates as a function of N (FIG. 5A). We found that using N=20 yielded a Pearson's correlation of 0.80 between the two replicates (FIG. 5B). As the sgRNAs were spaced on average every ~16 bp (FIG. 5C), windows of 20 consecutive sgRNAs spanned on average 314 bp (median=237 bp, FIG. 5D). We note that this resolution is on the same order as the size of scoring regions in our CRISPRi screen (hundreds of bp), indicating that choosing a smaller window size would not necessarily increase the resolution of the approach. Because some regions are covered sparsely due to repetitive sequence, we considered windows only if they contained 20 guides within a span of 1000 bp (FIG. 5D). The enhancers we identified (e-GATA1, e-HDAC6, e1-e7) are robust to the precise choice of window size.

To identify significant windows, we required first that the CRISPRi score for the window had an irreproducible discovery rate <0.05 (33) when comparing the two replicate screens. Second, we tested whether the mean of the sgRNAs in each window deviated significantly from the mean of the negative controls, using sgRNA CRISPRi scores averaged across duplicate screens. Specifically, we calculated a T-test statistic by comparing the CRISPRi scores of the 20-sgRNAs with those of the scrambled-sequence, negative control sgRNAs. We assessed the empirical false discovery rate (FDR) of windows in the GATA1 and MYC loci by comparing these T statistics to those generated from sliding windows across three negative control regions that are located far from known essential genes expressed in K562 (see Selection of targets for sgRNA library), and selected a threshold based on a FDR of 0.05. This threshold corresponded to a Benjamini-Hochberg-corrected T-test p-value of 0.032. We considered significant elements with an absolute effect size of >25%.

The final reported CRISPRi scores for 20-sgRNA windows in figures represent the average of the two replicate screens normalized to the average of the scrambled-sequence negative control sgRNAs.

Sources for Epigenomics Data

We downloaded data generated by the ENCODE Project Consortium (4) in K562 cells corresponding to DNase I hypersensitivity sequencing (DHS-seq); H3K27ac, GATA1, and CTCF chromatin immunoprecipitation sequencing (ChIP-seq); the chromatin state hidden Markov model (ChromHMM); and RNA Pol II ChIA-PET (3). To examine transcription factor occupancy at various enhancers, we downloaded the genome-wide binding sites of 100 transcription factors based on ChIP-Seq in K562 cells (wgEncodeRegTfbsClustered track from UCSC Genome Browser). We obtained sequence conservation from the UCSC Genome Browser corresponding to the phastCons 100-mammal multiple alignment (34). CTCF motifs were identified using FIMO (35) to search for the "V_CTCF_01" and "V_CTCF_02" position weight matrices from TRANSFAC (36). We obtained in situ Hi-C data for multiple cell types and used 5-Kb resolution KL-normalized observed matrix for all plots and analyses (6).

Cloning Individual sgRNAs

For each of the selected enhancers (e-GATA1, e-HDAC6, e1-e7), and promoters (GATA1 and MYC) that scored in the screen, we selected 2 non-overlapping sgRNAs with a preference for sgRNAs with high specificity and CRISPRi scores and sgRNAs that overlap the peak of DNase hypersensitivity. For regions that did not score (NS1, HDAC6 promoter), we selected sgRNAs based on the same criteria, although because these sgRNAs were not high scoring, we also preferred guides predicted to have high efficacy (37). As negative controls, we selected 5 sgRNAs from the set without genomic targets. We cloned these sgRNAs as previously described (38) into sgOpti.

Generating sgRNA-Expressing Stable Cell Lines

We generated stable cell lines expressing single sgRNAs by lentiviral transduction in 8 µg/ml polybrene by centrifugation at 1400×g for 45 minutes with one million cells per well in 24 well plates. After 24 hours, we selected for transduction with 1 µg/ml puromycin (Gibco) for 72 hours then maintained cells in 0.2 µg/ml puromycin. For each sgRNA, we generated three independent polyclonal cell populations through triplicate infections.

Single sgRNA Knockdown

We plated sgRNA-expressing stable cell lines at 200,000 cells/ml in 0.5 µg/ml doxycycline and harvested cells 24 hours later by lysing in Buffer RLT (Qiagen).

RNA Extraction and Quantitative RT-PCR

We extracted RNA from 20,000-50,000 cells per experiment in Buffer RLT (Qiagen) using Dynabeads MyOne Silane beads (Thermo Fisher), treated samples with TURBO DNase (Thermo Fisher), and cleaned again with Dynabeads MyOne Silane beads. We used Affinity Script reverse transcriptase (Agilent Technologies, Lexington, MA) and random nonamer primers to convert RNA to cDNA. We performed qPCR using SYBR Green I Master Mix (Roche) and calculated differences using the $\Delta\Delta CT$ method versus GAPDH (see Table 1 for primer sequences).

To achieve power to detect small effects in gene expression, we performed 3 technical qPCR replicates (from the same cDNA) and took the median value for further analysis. We also included many biological replicates. Specifically, we derived 3 independent lines for each sgRNA and assayed each once as a biological replicate in GATA1 locus experiments (for a total of 3 replicates) and 4 times for experiments in the MYC locus (for a total of 12 biological replicates).

RNA Sequencing and Analysis

To examine the transcriptional changes resulting from inhibition of a GATA1 enhancer, we performed RNA-sequencing on cell lines expressing individual sgRNAs targeting the GATA1 TSS (2 different sgRNAs), e-HDAC6 (2 different sgRNAs), and non-targeting, negative controls (4 different sgRNAs). We generated RNA sequencing libraries from 3 biological replicates for each sgRNA and processed the data as previously described (39). We identified differentially expressed genes (q<0.05, fold-change >2) with DESeq2 (version 1.6.3) (40) and found a significant overlap in the sets of differentially expressed genes between GATA1 TSS and e-HDAC6 targeting sgRNAs (FIG. 7B), suggesting that e-HDAC6 leads to downstream transcriptional changes consistent with direct regulation of GATA1.

Single sgRNA Competitive Growth Assays

For competition experiments we pooled the indicated K562 cells expressing an individual sgRNA and KRAB-dCas9-IRES-BFP with K562s expressing either GFP or RFP (control cells) in 0.5 µg/mL doxycycline. We measured the fractions of CRISPRi and control cells by flow cytometry after 24 hours and again after 7 additional days. We performed each experiment in six replicates including competitions against both the GFP- and RFP-expressing control lines. We quantified the growth phenotype gamma as previously described (10).

Luciferase Reporter Assays for Enhancer Activity on a Plasmid

To test the functions of each putative regulatory element in a classic reporter-based enhancer assay, we created a reporter plasmid derived from pGL4.23 (Promega, Madison, WI) where firefly luciferase is expressed from a 180-bp fragment of the MYC promoter (hg19 coordinates: chr8: 128748316-128748495). We designed an insertion site ~2 kb upstream of the MYC promoter for inserting each candidate enhancer sequence, and we flanked this region with polyadenylation signals in either direction to avoid measuring luciferase activity driven from transcripts initiating from the enhancer elements themselves. Primers for each element tested are listed in Table 1. The negative control sequence corresponded to a kanamycin resistance cassette.

For each construct, we transfected 500,000 K562 cells using the Lonza (Cologne, Germany) Amaxa 96-well Shuttle according to the manufacturer's instructions for this cell type (except transfecting all 500,000 cells in a single well) with 250 ng of reporter plasmid plus 250 ng of a plasmid expressing *Renilla* luciferase. We harvested cells 48 hours after transfection by spinning once, washing with PBS, and resuspending in 40 µl Passive Lysis Buffer (Promega). We performed the Dual-Luciferase Reporter Assay according to the manufacturer's protocol (Promega). Bar-plots report firefly luciferase activity normalized to *Renilla* luciferase activity and to the negative control construct for 3 replicate transfections.

Chromatin Immunoprecipitation for H3K27Ac

We performed ChIP for H3K27ac as previously described, with modifications (41). We grew K562 cells expressing individual sgRNAs targeting MYC enhancers or negative controls in the presence of doxycycline for 48 hours. We harvested cells, washed once in cold PBS, and crosslinked with 1% formaldehyde in PBS for 10 minutes at 37° C. followed by quenching with glycine for 5 minutes at 37° C. We washed cells twice in ice cold PBS with 1×protease inhibitor (Roche). We flash froze the pellets and stored at −80° C. until sonication, at which time we thawed the pellets on ice and lysed cells in ChIP Lysis Buffer (1% SDS, 10 mM EDTA, 50 mM Tris-HCl pH 8.0) on ice for 10 minutes. We sonicated batches of 3 million cells in 100 μL using a Q800R2 Sonicator (QSonica, Newtown, CT) at 50% amplitude, 30 s on/30 s off, for 7.5 minutes to obtain fragment sizes between 150 and 700 bp.

We diluted 100 μL lysate from 1 millions cells in 660 μL ChIP Dilution Buffer (0.01% SDS, 1.1% Triton X-100, 1.12 mM EDTA, 16.7 mM Tris-HCl pH 8.0), and saved an aliquot for whole-cell extract. For immunoprecipitation of H3K27ac (using antibody 39685 from Active Motif, Carlsbad, CA), we incubated 5 μl of antibody with Protein A/G beads (Thermo Fisher) in Blocking Buffer (500 mM Tween-20, 500 mM BSA in 1×PBS) for 2 hours at 4° C. We then washed the beads once in Blocking Buffer, resuspended the beads in 55 μL Blocking Buffer, and added it to the DNA samples. We incubated the antibody-bead-lysate mixture overnight at 4° C. rotating end over end. Next day, we washed the samples as follows: four times with 200 μL of RIPA Buffer (0.1% Na-deoxycholate, 0.1% SDS, 1% Triton X-100, 100 mM NaCl, 1 mM EDTA, 10 mM Tris-HCl pH 8.0), twice with 100 uL RIPA High Salt Buffer (0.1% Na-deoxycholate, 0.1% SDS, 1% Triton X-100, 500 mM NaCl, 1 mM EDTA, 10 mM Tris-HCl pH 8.0), twice with LiCl Wash Buffer (250 mM LiCl, 0.5% NP-40, 0.5% Na-deoxycholate, 1 mM EDTA, 10 mM Tris-HCl pH 8.0), and twice with 1×TE. Following the washes, we resuspended beads in Elution Buffer (10 mM Tris-HCl pH 8.0, 5 mM EDTA, 300 mM NaCl, 0.1% SDS) and incubated the resuspended beads at 65° C. for 10 minutes. Following this first brief reverse crosslinking step, we added 5 μL RNase Cocktail (Thermo Fisher) and incubated at 37° C. for 30 minutes, and then added 5 μl Proteinase K (NEB) and incubated at 65° C. for 2 hours. Samples were cooled on ice. DNA was extracted using Agencourt XP (SPRI) beads (Beckman Coulter) at 2× sample volume, followed by elution in 10 mM Tris-HCl pH 8.0. We performed quantitative PCR using Roche 2×SYBR Green Master Mix on a Roche LightCycler 480. We calculated enrichment compared to 5 positive control primers designed against H3K27ac peaks outside of the MYC region. Primer sequences are listed in Table 1.

siRNA-Mediated Knockdown of MYC, GATA1, and PVT1

We transfected 200,000 cells with 10 nM siRNAs obtained from GE Dharmacon (Lafayette, CO) in quadruplicate using the Neon transfection system (Thermo Fisher, settings: 1,450 V, 10 ms width, 3 pulses). We harvested cells in Buffer RLT (Qiagen) 24 hours after knockdown and estimated target gene expression relative to cells transfected with non-targeting siRNAs by quantitative PCR as described above. For competition experiments we transfected fluorescently labeled cells (GFP or RFP) with indicated siRNAs at 10 nM following the described procedure. We pooled cells such that cells transfected with siRNAs targeting PVT1, MYC or GATA1 were matched with differently labeled cells transfected with non-targeting control siRNAs. We measured the GFP and RFP fractions immediately following transfection and again after 4 days by flow cytometry. Each experiment was carried out in quadruplicates and included a label-swap experiment.

Strategy for Genetic Deletions of Enhancers in the MYC Locus

To test the effects of enhancers on MYC expression through genetic manipulations, one straightforward experiment would be to use CRISPR/Cas9 to generate clonal cell lines containing homozygous knockouts of each putative enhancer and measure the effects on MYC using the qPCR assays described above. However, there are several reasons why this experiment is not ideal in our system. First, we observe significant biological variation in MYC expression between clonal cell lines. Second, MYC affects cellular proliferation and thus cells lacking one of these enhancers may be outcompeted. Finally, K562 cells are triploid, making it difficult to obtain cell lines where an enhancer is removed on all 3 alleles.

Figure 10:
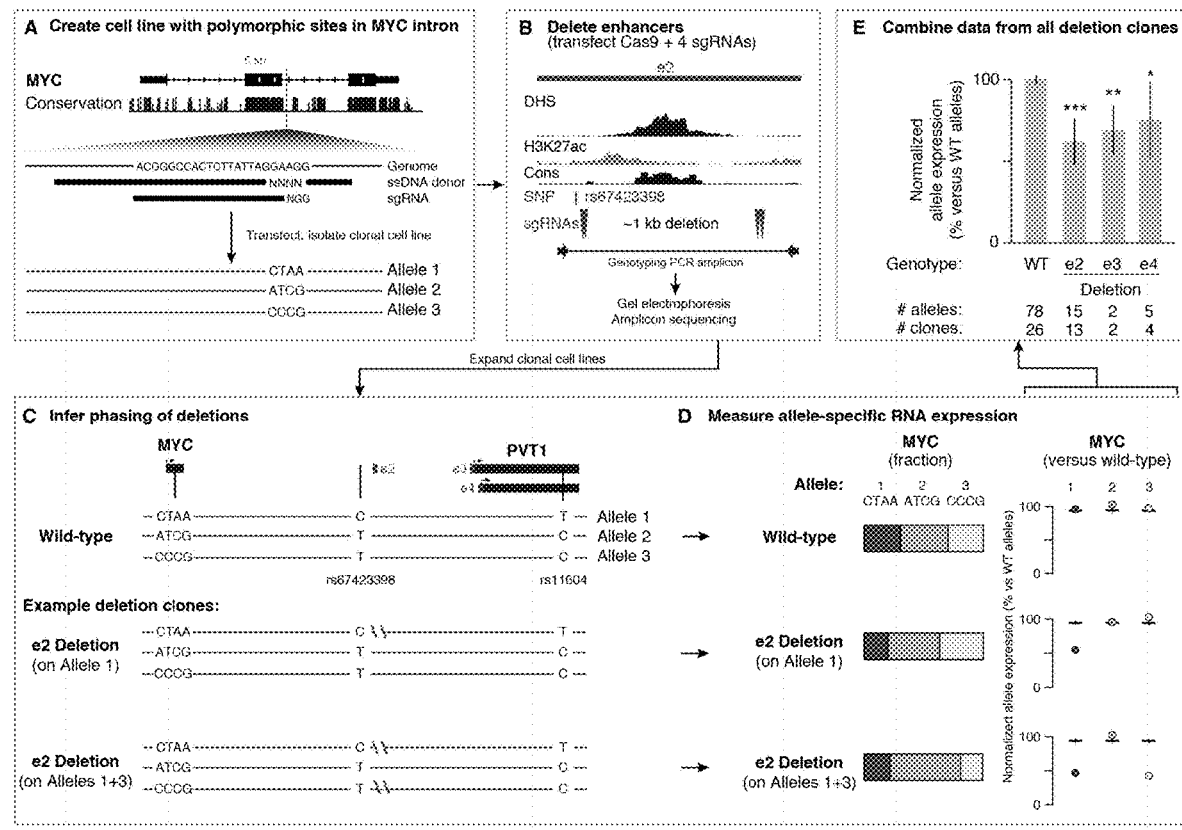
FIG. 10 shows genetic deletions of enhancers in the MYC locus. (A) Strategy for generating a cell line containing polymorphic sites on each allele of MYC. CRISPR/Cas9 was used to knock in a random 4-mer sequence into an intronic site in the MYC locus that was not conserved across mammals (red line). We co-transfected a plasmid expressing Cas9 (SEQ ID NO: 167), a ssDNA oligo donor, and an sgRNA, picked clonal cell lines, genotyped by amplicon sequencing, and isolated a clone with three unique alleles. (B) Strategy for deleting enhancers, showing e2 as an example. To delete each enhancer, we designed 4 sgRNAs flanking the DHS peak in the center of each element, two on each side. We co-transfected these 4 sgRNAs and isolated clones containing deletions on 1 or 2 of the 3 alleles. The rs67423398 SNP was contained in the genotyping PCR amplicon and was used to determine which allele of e2 was deleted. (C) Overview of sites relevant to enhancer deletions in the MYC locus, including inferred phasing of polymorphic sites. Bottom: Genotypes for example deletion clones. (D) Allele-specific RNA measurements for representative clones. For each clone, we determined the fraction of RNA molecules carrying each of the MYC alleles using ddPCR (bar plots). We calculated a fold-change for each allele in deletions versus controls and normalized this to the highest of these three values within each clone. This yielded the "normalized allele expression" (right). Dots: values for one clone. Horizontal bars: mean with 95% confidence interval for 26 wild type clones. (E) Deletions of e2, e3, and e4 led to a 30-40% decrease in the expression of MYC on the corresponding allele compared to wild type alleles in the same cells. We compared normalized allele expression values between wild type and deletion alleles using a Wilcoxon rank-sum test. *: $P<0.05$. : $P<0.01$. *: $P<10'$.

Accordingly, we developed an alternative strategy (FIG. 10). We used CRISPR/Cas9 to generate clonal cell lines carrying heterozygous genetic deletions (on 1 or 2 of the 3 homologous chromosomes) and compared the expression of MYC on the modified and unmodified homologous chromosomes in the same cells. We expect that if the enhancer in fact regulates MYC, MYC expression from the modified allele should be reduced compared to the wild type allele. This approach is identical in concept to classical cis-trans tests. This allele-specific approach can demonstrate that regulation of MYC is a direct, cis effect of the enhancer rather than an indirect effect (for example, due to the enhancer regulating another gene that in turn regulates MYC).

To implement this strategy, we first generated a cell line containing polymorphic sites on each allele of MYC. Because K562 cells do not contain polymorphisms in the MYC transcript, we knocked in polymorphic tags using CRISPR/Cas9 and homologous recombination. We first chose a targeting site in a MYC intron in a region that did not show sequence conservation across mammals. We reasoned that editing such a site would not likely affect the regulation of MYC. We designed an sgRNA targeting this site as well as a ssDNA oligo to use as a donor for homologous recombination (FIG. 10A). This oligo contained four random nucleotides (NNNN), allowing us to generate cell lines containing unique polymorphic on each of the 3 alleles. We co-transfected these sgRNAs, Cas9, and the donor oligo in K562 cells, isolated clonal cell lines through serial dilution, and genotyped this intronic site by PCR and sequencing (for genotyping primers see Table 1). We identified a clonal cell line containing 3 distinct variants (CTAA, CCCG, and ATCG) in the targeted location. We expanded this cell line (K562-MYC-Tag) and used it for the second round of transfections.

To delete MYC enhancers, we designed sets of 4 sgRNAs flanking each element, with 2 sgRNAs on each side. These sgRNAs were designed to delete ~1 kb regions containing the DHS site in the middle of the element. For e3 and e4, we designed the sgRNAs to cut outside of the exons and splice sites of PVT1. We co-transfected the K562-MYC-Tag cell line with Cas9 and sets of 4 sgRNAs, generated clonal cell lines through serial dilution, and genotyped each clone (FIG. 10B). We expanded clones containing deletions on 1 or 2 of the 3 alleles.

For each deletion clone and for 26 wild type control clones, we use a droplet digital PCR (ddPCR) hydrolysis assay to measure the allele-specific expression of MYC and PVT1. We used this data, in combination with the genotyping amplicon sequencing, to infer partial phasing of the alleles relative to the polymorphic tags in the MYC intron (FIG. 10C). We performed these experiments for e2, e3, and e4 because these loci had SNPs that allowed us to determine which allele was deleted (see below). We compared the allele-specific expression between wild type and deletion clones to determine how deleting MYC enhancers affected MYC expression (FIG. 10D,E). Additional technical details for each of these steps are included below.

CRISPR Cas9 Transfections and Clonal Cell Line Selection

To delete specific sequences, we co-transfected 600 ng of Cas9-expressing plasmids ("PX330-NoGuide"), 300 ng of a pool of sgRNA-expressing plasmids ("pZB-Sg3"), and 600 ng of a plasmid expressing EGFP and a puromycin selectable marker from a CAG promoter (pS-pp7-GFPiP). To create PX330-NoGuide, we modified PX330 (Addgene plasmid #44230) (42) to remove the sgRNA expression cassette. To generate pZB-Sg3, we cloned a human U6 promoter and optimized sgRNA scaffold sequence (31) into a minimal vector with an ampicillin-selectable marker and a ColE1 replication origin. We transfected batches of 250,000 human cancer cells using the Neon Transfection System (Invitrogen), using 3 pulses of 10 milliseconds at 1450 V and plated them into a 96-well plate in 200 µl media. As an internal control for each set of transfections, we performed a transfection using a pool of 4 sgRNAs with no predicted target sites in the human genome. To knock in polymorphic tags into the MYC locus, we included 200 ng of ssDNA oligo in the transfection.

We verified efficient transfection by examining GFP expression after 24 hours. To select for transfected cells, we replaced the media 24 hours after transfection with 200 µl media+4 µg/ml puromycin. One day later, we split the cells into a 6-well plate with 2 ml of 4 µg/ml puromycin. One day later, we replaced the media with 2 ml of media with no puromycin. We allowed cells to grow for 7-8 days, replacing the media every 2-3 days. Once the cells could be reliably counted, we plated 8 96-well round-bottom plates at a dilution of 0.4 cells/well. We grew these plates in 200 ul of 20% FBS media, doing partial media changes every 3-4 days, for 12-16 days. Clonal cell lines were split into multiple copies and grown for 2-14 days before harvesting for biological replicates. We harvested cells for DNA and RNA extraction by removing most of the media and adding 3.5× volume Buffer RLT (Qiagen).

Genotyping Deletion Clones by PCR and Sequencing

To genotype K562 clones, we isolated genomic DNA using Silane beads.

For genotyping MYC-Tag insertion clones (FIG. 10A), we performed PCR using primers (Table 1) surrounding the site followed by a second round of PCR to add a different barcode to each sample and sequenced the amplicons on an Illumina MiSeq (Illumina, San Diego, CA).

For genotyping deletion clones, we performed a first round of PCR using primers spanning the deleted region (FIG. 10B) and examined this PCR product using gel electrophoresis. Both wild type and deletion-sized bands were visible and were used to prioritize clones for further analysis. We next performed a second nested PCR on this product to add sequencing tags and clone-specific barcodes for high-throughput sequencing (primers in Table 1). We sequenced these products to span the deletion junction; the number of unique amplicons in each clone was used to determine the number of deleted alleles. This number is technically a lower bound, because in rare cases multiple alleles could be deleted and repaired in the same fashion. Finally, we counter-screened deletion clones for inversions, which can occur when Cas9-mediated cuts occur on both sides of the region, but the cuts are repaired with an inversion of the intervening sequence. We sought to eliminate clones that showed evidence of inversions, which could confound later analysis. For e2, we used primers spanning one side of the intended junction (Table 1) and eliminated clones that showed evidence of an amplicon corresponding to an inverted sequence. For e3 and e4, we were unable to obtain satisfactory PCR primers and so used a restriction digest approach that could distinguish whether the internal sequence was inverted or not. For e3, we digested PCR amplicons with AvrII and PsiI; for e4, we digested with NdeI and BglII (all enzymes from NEB).

Measuring Allele-Specific MYC and PVT1 Expression in Deletion Clones

We designed and validated ddPCR assays to measure the allele-specific expression of MYC and PVT1. We first cloned the polymorphic regions of MYC and PVT1 from K562-MYC-Tag using the ddPCR-MYCIntron Fwd/Rev and ddPCR-PVT1 Fwd/Rev PCR primers (Table 1) to generate separate plasmid vectors containing each allele of each amplicon. We generated synthetic standard curves by mixing these vectors in specified ratios: 100:0, 90:10, 50:50, 10:90, and 0:100. Each standard curve was generated and quantified in duplicate to confirm that the assays were specific and quantitative.

To perform the ddPCR assay, each 20 µl reaction contained 1×ddPCR Supermix for Probes—no dUTP (BioRad, Hercules, CA), 450 nM each of forward and reverse primer, and 500 nM probe. To measure the relative expression of the 3 MYC alleles (FIG. 10C), we used MYCIntron Fwd and Rev (Table 1) along with a FAM-conjugated CTAA or ATCG probe and a HEX-conjugated CCCG probe in two separate assays, then merged the results by comparing to the constant CCCG probe. To measure the relative expression of the 2 PVT1 polymorphisms (FIG. 10C), we used PVT1 Fwd and Rev and probes against T and C alleles in a single assay (Table 1). Probes were purchased as Custom ZEN Double-Quenched Probes (IDT). Following droplet generation on a QX200 droplet generator (BioRad), we performed 40 cycles of PCR with a 10 minute 55° C. combined and melting extension step. We counted droplets using the QX200 Droplet Reader (BioRad) and determined allele-specific expression by the ratio of FAM and HEX positive droplets.

To measure the allele-specific expression of each deletion clone, we generated cDNA from cells as described above and performed ddPCR using 1000 cell-equivalents of cDNA for MYC and 100 for PVT1. We measured each clone using 2 or 3 technical replicates and averaged the ratios between these measurements for further analysis.

Analysis of Allele-Specific Expression Data for Deletion Clones

To analyze the allele-specific ddPCR data for the deletion clones, we first inferred the phasing of the deletions relative to the polymorphic tags in MYC. We identified known polymorphisms near the deleted enhancers that would allow us to phase the deletions by examining DNA sequencing experiments from multiple types of ENCODE experiments (e.g., ChIP-Seq, DHS sequencing). We identified rs67423398 (C/T/T in triploid K562 cells) just outside of the sgRNAs designed at e2 (FIG. 10B), allowing us to directly genotype the deletion bands by amplicon sequencing. For e3 and e4, there were no SNPs in the vicinity of the deletions themselves, but, because each acts as a promoter for PVT1, we were able to use a SNP in a downstream PVT1 exon (rs 11604, T/C/C in K562 cells) that allowed us to determine the allele of the deletions by examining which allele of PVT1 RNA was decreased (FIG. 10C). Accordingly, for each e2 clone we performed amplicon sequencing as described in the previous section and determined on which allele(s) the deletion occurred, and for each e3 and e4 clone we performed ddPCR to read out the allele-specific RNA expression of PVT1. This allowed us to determine whether the deletion occurred on the unique allele (C for rs67423398 or T for rs11604, C-T) or the ambiguous allele (T for rs67423398 or C for rs11604).

We next phased these polymorphisms based on the unique allele to the polymorphic tags in MYC. To do so, we first examined clones that carried deletions on the unique allele and examined their allele-specific expression of MYC. For e2, for example, we had 6 independent clones carrying such deletions, and these showed a consistent decrease in MYC expression on the CTAA allele (e.g., FIG. 10D). We similarly linked the PVT1 unique allele to CTAA (FIG. 10C). By this strategy, we were able to phase some of the deletions to a unique MYC polymorphism (CTAA-C-T allele, FIG. 10C), and the remaining deletions to one of the other two alleles.

For each clone, we then calculated the change in expression of each MYC allele relative to 26 wild type control clones. We first calculated the average expression of each allele in the control clones, which was approximately balanced (31% CTAA, 39% ATCG, 30% CCCG, FIG. 10D). For each clone, we compared the allelic expression fraction to the control clones to determine a fold-change for each allele. We then normalized these fold-changes to maximum of the 3 alleles, assuming that this represents a wild type allele (e.g., FIG. 10D, right), and termed this the "normalized allele expression". We performed a similar computation on each wild type clone. Finally, we compared the normalized allele expression between wild type and deletion clones. For the unique allele (CTAA-C-T), we directly used the MYC normalized allele expression. For the remaining alleles (ATCG-T-C and CCCG-T-C), we chose the one of the two alleles with the lowest normalized allele expression, assuming that this was the deletion allele, and similarly generated a distribution of control values by performing a similar procedure on wild type clones. We combined these comparisons across alleles and compared deletion to control clones using a Wilcoxon rank sum test (FIG. 10E).

Comparison to Previous Enhancer-Promoter Predictions

Given our functional mapping of enhancers that regulate MYC, we compared our list of true MYC enhancers to existing methods for predicting or inferring enhancer-promoter connections. We found that none of these strategies specifically identified more than 2 of the 7 MYC enhancers and correctly distinguished the 2 GATA1 enhancers from neighboring elements that do not affect GATA1 expression. We describe each of these approaches below.

1. One commonly used strategy for connecting enhancers with target promoters is to assign an enhancer to its nearest gene. It is clear that this does not accurately capture the complexity of enhancer-promoter connections (8), but lacking clear alternatives this approach is frequently used to assess which gene an enhancer might regulate. For GATA1, this approach does not accurately capture how both e-GATA1 and e-HDAC6, which are closest to GATA1 and HDAC6, respectively, in fact regulate both genes. For MYC, e1-e4 would be assigned as regulators of PVT1, while e5-e7 would be assigned to the CCDC26 pseudogene.

Several methods for predicting enhancer-promoter connections are based on correlations in chromatin state across cell types.

2. One such method is based on correlation in histone modification profiles between candidate enhancer-promoter pairs within 125 kb across nine cell types, including K562 cells (43). Because of this distance restriction, this method does not make any predictions for MYC. For GATA1, this strategy misses both e-GATA1 and e-HDAC6, and makes dozens of incorrect predictions.

3. A second method based solely on correlation predicts enhancer-promoter pairs using correlation in DHS for all candidate pairs within 500 kb of one another across 125 cell types, including K562 cells (44). For GATA1, this method correctly identifies both e-GATA1 ande-HDAC6 but also incorrectly assigns two additional distal enhancers in the regions tested in our screen. For MYC, this approach correctly identifies only one of the K562 enhancers (e4) and makes dozens of other predictions that do not overlap e1-e7. (The published catalog from this study does not report which cell type each prediction refers to, and thus some of these additional predicted enhancers may represent regions that regulate one of the target genes in another cell type.)

4. A third correlation-based method (PreSTIGE) predicts enhancer-promoter pairs by pairing cell-type-specific H3K4me1 signals with cell-type specific gene expression across 12 cell types, using a 100 kb distance plus a subset of CTCF sites to set domain boundaries (45). In the GATA1 locus, PreSTIGE reports that 29 kb of the 74 kb covered by our screen is an enhancer for GATA1, including both e-GATA1 and e-HDAC6 but incorrectly reporting many kilobases of additional sequence. In the MYC locus, PreSTIGE predicts a single region to be an enhancer; this region does not correspond to any of the enhancers we identify.

In addition to methods based on correlations in chromatin state across cell types, a second category of approaches for inferring enhancer-promoter functional connections is based on measuring their physical interactions with methods based on chromosome conformation capture. Physical contacts between enhancers and promoters correlate with gene activation (1, 6, 46, 47), and in a few cases increasing the frequency of enhancer-promoter contact has been shown to activate gene expression (48, 49). However, long-distance chromatin loops can form without regulatory effects on gene expression (e.g., when a promoter forms a loop with a region that is not an enhancer), and the abilities of various features of chromosome conformation data to predict functional interactions remains unclear (47). Accordingly, we examined several features previously noted to correlate with enhancer-promoter connections to determine if they might correctly identify enhancers in the MYC locus.

5. We first examined loops as defined by in situ Hi-C (6). In a Hi-C map of K562 cells at 5 kb resolution, five focal loops involving the MYC promoter were reported. Of the five, one corresponds to the long-range loop with e6/e7, one corresponds to NS1, and the other three correspond to CTCF-bound sites that do not overlap MYC enhancers. Thus, at the reported significance thresholds and with the available resolution, these calls do not correspond with the enhancers that regulate MYC. Nonetheless, Hi-C data shows that these sites frequently contact MYC (FIG. 2A), and higher resolution maps may allow identification of focal loops to these sites. Regardless of the specific loop calls, we find that incorporating this information into our approach helps to rank enhancers likely to regulate MYC.

6. RNA Pol II ChIA-PET has been proposed as a proximity interaction method that enriches for enhancer-promoter interactions (3). ChIA-PET in K562 cells (wgEncodeGisChiaPetK562Pol2InteractionsRep1) identifies many interactions between MYC and sites throughout the adjacent contact domain (FIG. 2A). Notably, these do include all 7 of the MYC enhancers in K562, but also include dozens of other sites with equal or higher interaction frequencies (FIG. 2A). Furthermore, ChIA-PET in K562 cells does not detect interactions between GATA1/HDAC6 and either of their enhancers.

7. Various methods developed to predict enhancer-promoter interactions have been developed and trained based on interactions identified in chromosome conformation capture experiments. Consistent with the poor positive predictive value of chromosome conformation capture data as described above, methods trained on this data (e.g., (50, 51)) also do not correctly identify MYC or GATA1 enhancers.

Together, these observations highlight the importance of direct functional mapping of regulatory elements. Furthermore, they underscore the opportunity for new models that integrate these two classes of approaches based on chromatin state and proximity interactions in the context of appropriate training data generated through CRISPRi-based mapping of regulatory elements.

Calculating Predicted Impact of MYC Enhancers in K562 Cells

To rank the relative importance of putative activating elements near MYC in K562 cells, we first created a list of putative regulatory elements in the locus. We downloaded DHS peak calls from ENCODE (narrowPeak files corresponded to both replicates in K562 cells), expanded these peaks by 500 bp, and merged overlapping peaks. For each of these merged peaks, we calculated normalized read count (reads per million, RPM; not normalized to length of the element) from H3K27ac and DHS measurements in K562 cells, and retained windows in the top 50% percentile with respect to H3K27ac signal, yielding 93 putative regulatory elements. For each element, we calculated the normalized contact frequency to the MYC promoter by consulting KL-normalized observed contact matrices at 5-kb resolution generated by in situ Hi-C(6). We calculated relative impact by the following formula: Predicted impact=$\log_2$(H3K27ac RPM×DHS RPM×Hi-C contact×Hi-C contact), thereby weighting "activity" and "proximity" approximately equally. Each element was ranked according to this score. In FIG. 2E, peaks overlapping the MYC enhancers were colored red and plotted versus their CRISPRi score, defined by the maximum CRISPRi score in a window overlapping the element.

Figure 11:
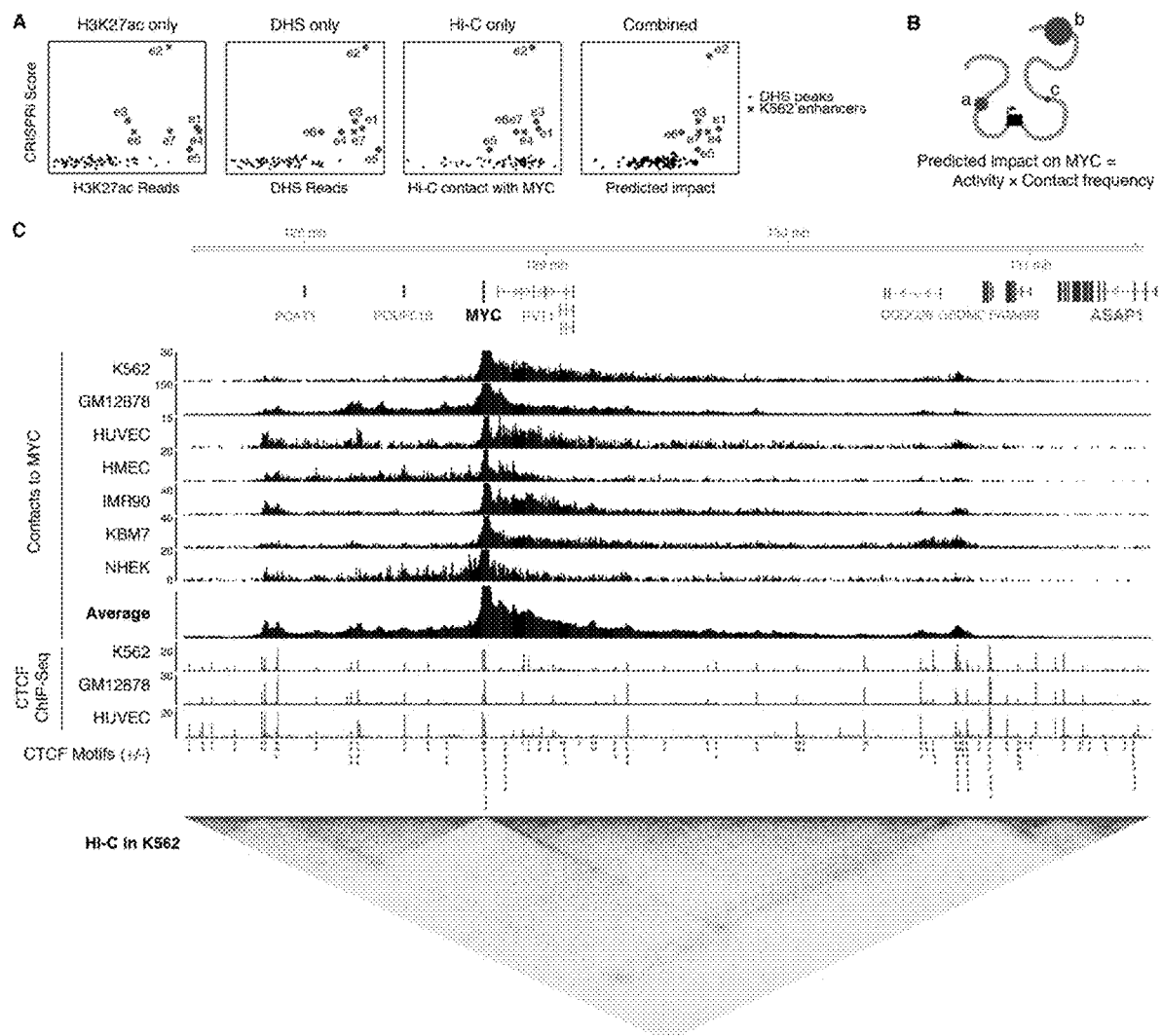
FIG. 11 shows a model for predicting enhancer function in the MYC locus. (A) Comparison of models using H3K27ac only, DHS only, Hi-C only, or a combination of all three (Predicted Impact, same as FIG. 2E). This ranking is applied to 93 elements selected based on DHS and H3K27ac signal, and thus provides an optimistic estimate of the power of each individual source of information for predicting MYC enhancers. (B) Framework for predicting the relative impact of regulatory elements on MYC expression. Impact depends on activity (estimated by quantitative H3K27ac and DHS signal, represented by size of red dot) and the frequency with which it contacts the MYC promoter (estimated based on Hi-C, represented by distance from gene). For the three example enhancers, their relative impact would be a=b>c. (C) Comparison of Hi-C and CTCF ChIP-Seq signal in the MYC locus across cell types. Contact frequency with the MYC promoter is derived from in situ Hi-C maps at 5-kb resolution across 7 cell types (KL-normalized observed matrix) (6). Y-axis differs between cell types according to the depth of sequencing. The average contact profile used in our enhancer ranking calculations across cell types was created by averaging the normalized contact frequencies from these 7 cell types. CTCF motifs are colored according to their orientation: red=positive strand, blue=negative strand.

To compare the performance of this approach with simpler models, we calculated rankings based on H3K27ac ChIP-Seq RPM only, DHS RPM only, and Hi-C contacts only for the same set of 93 putative regulatory elements (FIG. 11A). We note that because these 93 elements were selected based on DHS and H3K27ac signal as described above, this may be an optimistic estimate of the value of each dataset alone.

Additional experimental data will be required to further refine this model and determine whether it is applicable to different gene loci.

Calculating Enhancer Ranks Across Cell Types

To expand this approach across additional cell types, we downloaded DHS and H3K27ac ChIP-seq data for diverse cell lines and primary tissues from the Roadmap Epigenomics Project (5), ENCODE (4), and others (52, 53). While these data are available across a wide range of cell types (235 samples total), proximity interactions maps are available in a very limited number of cell types. Accordingly, we explored to what extent the topological architecture of the MYC locus changes across 7 human cell types previously mapped using in situ Hi-C(6, 54). We found that key features of the proximity contacts of the MYC promoter appeared consistent across cell types, including the long-range contacts to the edges of the topological domain as well as several distinct peaks within these domains (FIG. 11C). These cell-type invariant long-range loops typically corresponded to sites bound by CTCF across multiple cell types, consistent with previous reports (6). Beyond these long-range loops, the quantitative interactions of the MYC promoter did change somewhat across different cell types, with elevated contact frequency coinciding with the presence of strong H3K27ac occupancy in a given cell type. To capture the features consistent across cell types, we generated a generic proximity profile for the MYC locus by averaging the proximity interactions across these 7 cell types, normalizing the absolute magnitude of interactions in each cell type by the signal at the MYC promoter itself. This generic profile accurately captured the cell-invariant long-range interactions (FIG. 11C), providing a reasonable template for weighting the contributions of different enhancers in the MYC locus across cell types.

To rank elements across the entire domain, we calculated the predicted impact score as described above in 400-bp windows tiled every 100-bp across chr8:127000000-131500000. DHS and H3K27ac were not always available for each of the 235 different samples accordingly, we used both datasets where available, or calculated an alternative ranking using one or the other dataset (e.g., DHS or H3K27ac normalized read count×normalized Hi-C signal). Given the varying patterns of DHS and H3K27ac signal around a regulatory element (DHS is strong at the center of the element while H3K27ac is depleted in the nucleosome-free region but strong just outside), we smoothed these scores at 2-kb resolution to better compare models generated from DHS or H3K27ac alone. To collapse neighboring windows with strong scores yet retain resolution for the strongest local maximum (e.g., corresponding to the center of the regulatory element), we removed windows that had an overlapping window with a higher score. Finally, we assigned a rank to these remaining windows, and focused on the top 10 elements in each cell type.

Analysis of Enhancers Known to Regulate MYC

Figure 3:
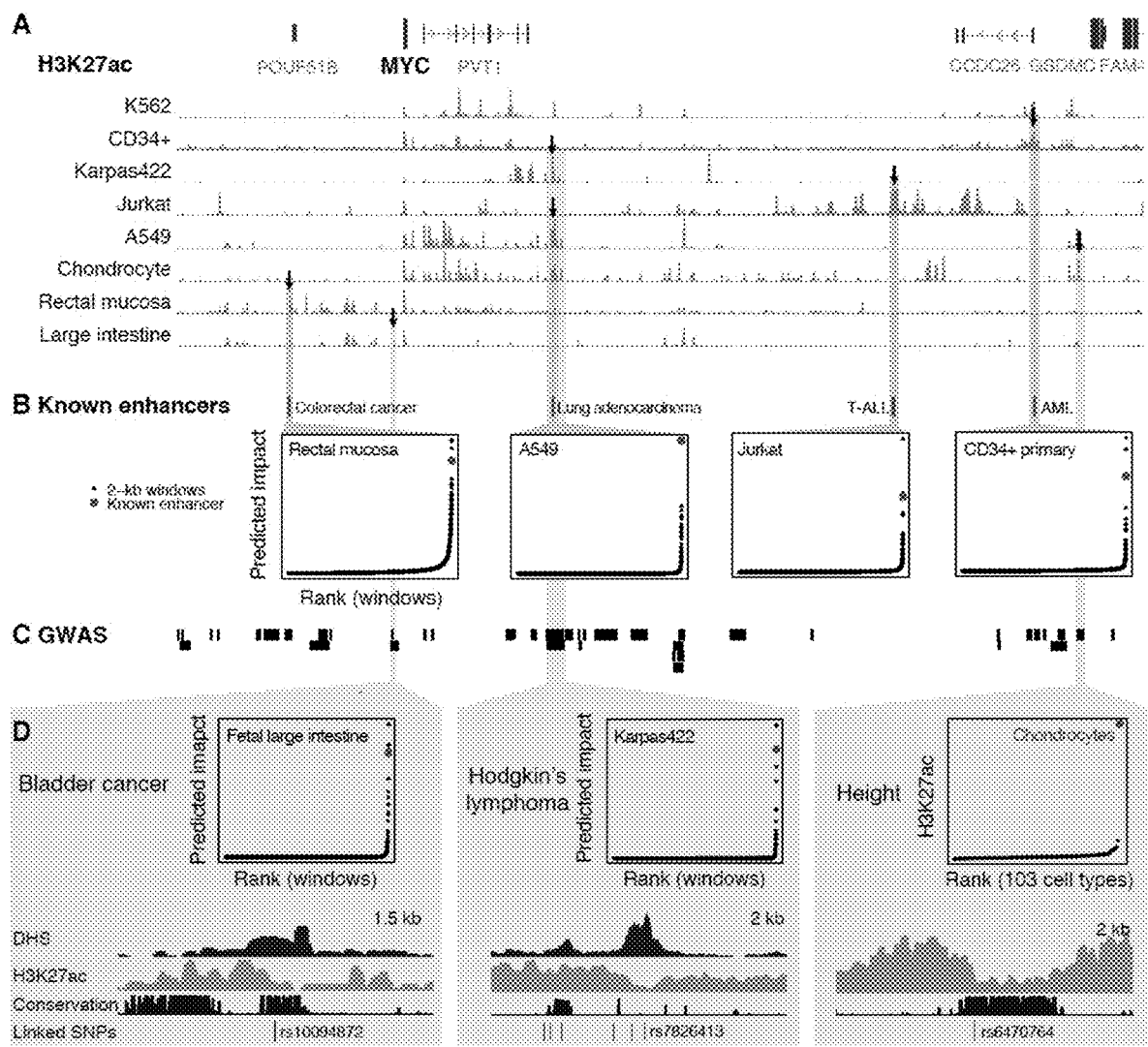
FIG. 3 shows a model predicts disease-associated MYC enhancers across cell types. (A) H3K27ac occupancy around MYC varies among 8 cell types and primary tissues. Black arrows: elements highlighted in panels below. (B) Locations of 4 enhancers previously shown to regulate MYC expression in other cell types and their predicted impact in a corresponding cell type. Points show predicted impact of 2-kb windows tiled in 100-bp increments across the MYC locus (13). T-ALL: T-cell acute lymphoblastic leukemia. AML: Acute myeloid leukemia. For each cell type, predicted impact is calculated based on available data (13). (C) Haplotype blocks of SNPs linked to human diseases and phenotypes ($R^2>0.8$ with index SNP in genome-wide association study). (D) SNPs associated with bladder cancer and Hodgkin's lymphoma overlap regulatory elements predicted by our metric to regulate MYC in a corresponding cell type or tissue. A SNP associated with height overlaps a conserved element that is active only in chondrocytes. Karpas422: diffuse large B cell lymphoma cell line.

We curated a list of enhancers that have been shown to regulate MYC in their endogenous genomic contexts. (i) An enhancer implicated in MYC regulation in the context of colorectal cancer ("Myc-335") was identified based on an association rs6983267 and risk for colorectal cancer (55, 56). Genetic knockout of this enhancer in mice leads to an ~40% reduction in Myc RNA expression in the colon, and confers resistance to intestinal tumorigenesis in an APC−/− background (57). (ii) An enhancer implicated in MYC regulation in the context of lung adenocarcinoma (LUAD) was identified based on a focal amplification of a non-coding region in multiple primary LUAD tumors (22). Genetic knockout of this enhancer in a LUAD cell line led to a ~30% reduction in MYC expression (22) and defects in cellular proliferation. (iii) An enhancer implicated in T-ALL was identified based on focal amplifications of a non-coding region ~1.47 Mb downstream of MYC (58). This enhancer contacts the MYC promoter as assayed by chromosome conformation capture, and a mouse knockout of this element leads to defects in thymocyte development and improved survival in the context of NOTCH1-induced leukemogenesis (58, 59). (iv) An enhancer implicated in AML was identified on the basis of strong occupancy by Brg1 in a murine leukemia cell line, and is focally amplified in ~3% of human AMLs. This enhancer (E3) was shown to loop to the MYC promoter, and knockdown of Brg1 led to dramatic loss of MYC expression (60). We extracted coordinates from these previous studies and overlapped these coordinates with highly ranked enhancers in relevant cell types (FIG. 3B).

Analysis of GWAS Variants Near MYC

We downloaded a list of variants associated with human phenotypes from the GWAS Catalog at EBI. 121 associations are reported in chr8:127900000-131000000. We used HaploReg v4.1 (61) to identify SNPs linked to the GWAS index SNP with $r^2 >= 0.8$ in the European population. The black boxes in FIG. 3C represent the span of all such SNPs for each variant, collapsed by phenotype to yield 66 unique associations between a human disease or trait and a genetic haplotype. We highlight three examples where these SNPs overlap elements predicted to regulate MYC. (i) A SNP linked to increased risk of Hodgkin's lymphoma, which has previously been noted to overlap with B-cell specific H3K27ac signals (52), overlaps an element that our approach predicts to be quantitatively among the most important for regulating MYC in B cell lymphoma cells (FIG. 3D). (ii) A SNP associated with bladder cancer risk is located in a conserved DHS element active in multiple gastrointestinal tissues, and thus may regulate MYC in bladder epithelial cells, for which chromatin data is not available (FIG. 3D). (iii) A SNP associated with height overlaps a glucocorticoid receptor motif in a conserved H3K27ac-marked element active only in chondrocytes (FIG. 3D). (DHS data from chondrocytes was not available). Although this SNP is located >1.9 Mb from MYC, it resides at the anchor of the long-range chromatin loop near e7 (FIG. 2A), suggesting that this SNP may affect height by altering the regulation of MYC in a chondrocyte-related cell type. Dozens of other predicted regulatory elements overlap disease-associated genetic variants near MYC.

Software for Data Analysis and Graphical Plots

We used the following software for data analysis and graphical plots: R Bioconductor (version 3.0) (62), Gviz (version 1.10.11), gplots (version 2.17.0), GenomicRanges (version 1.18.4) (63), rtracklayer (version 1.26.3) (64), BEDTools (65), Integrative Genomics Viewer (version 2.3.26) (66), Pandas (version 0.12.0), Matplotlib (version 1.3.0), Biopython (version 1.61) (67), and SciPy (version 0.12.0).

Genome Build

All coordinates are reported in human genome build hg19.

Results

We developed a high-throughput approach that utilizes the programmable properties of CRISPR/Cas9 to characterize the regulatory functions of non-coding elements in their native contexts. We use pooled CRISPR screens in combination with CRISPR interference (CRISPRi)—which alters chromatin state at targeted loci through recruitment of a KRAB effector domain fused to catalytically dead Cas9 (dCas9) (9-12)—to simultaneously characterize the regulatory effects of up to 1 Mb of sequence on a gene of interest (FIG. 1A) (13).

We studied two gene loci, GATA1 and MYC, that affect proliferation of K562 erythroleukemia cells in a dose-dependent manner (FIG. 4). This allowed us to search for regulatory elements that quantitatively tune GATA1 or MYC expression using a proliferation-based pooled assay (FIG. 1A). Importantly, GATA1 and MYC are not located near other strongly essential genes (FIG. 4); thus, proliferation defects caused by sgRNAs targeted to sequences near these genes can be attributed to elements regulating GATA1 or MYC. We designed a library containing 98,000 sgRNAs tiling across a total of 1.29 Mb of genomic sequence around GATA1 and MYC as well as 85 kb of control non-coding regions (13). We infected K562 cells expressing KRAB-dCas9 under a doxycycline-inducible promoter with a lentiviral sgRNA library and sequenced the representation of sgRNAs before and after growing cells in doxycycline for 14 population doublings (FIG. 1A). As expected, internal control sgRNAs targeting the promoters of known essential genes (10) were depleted (FIG. 5A) and correlated across biological replicates (R=0.91, FIG. 5B).

Figure 6:
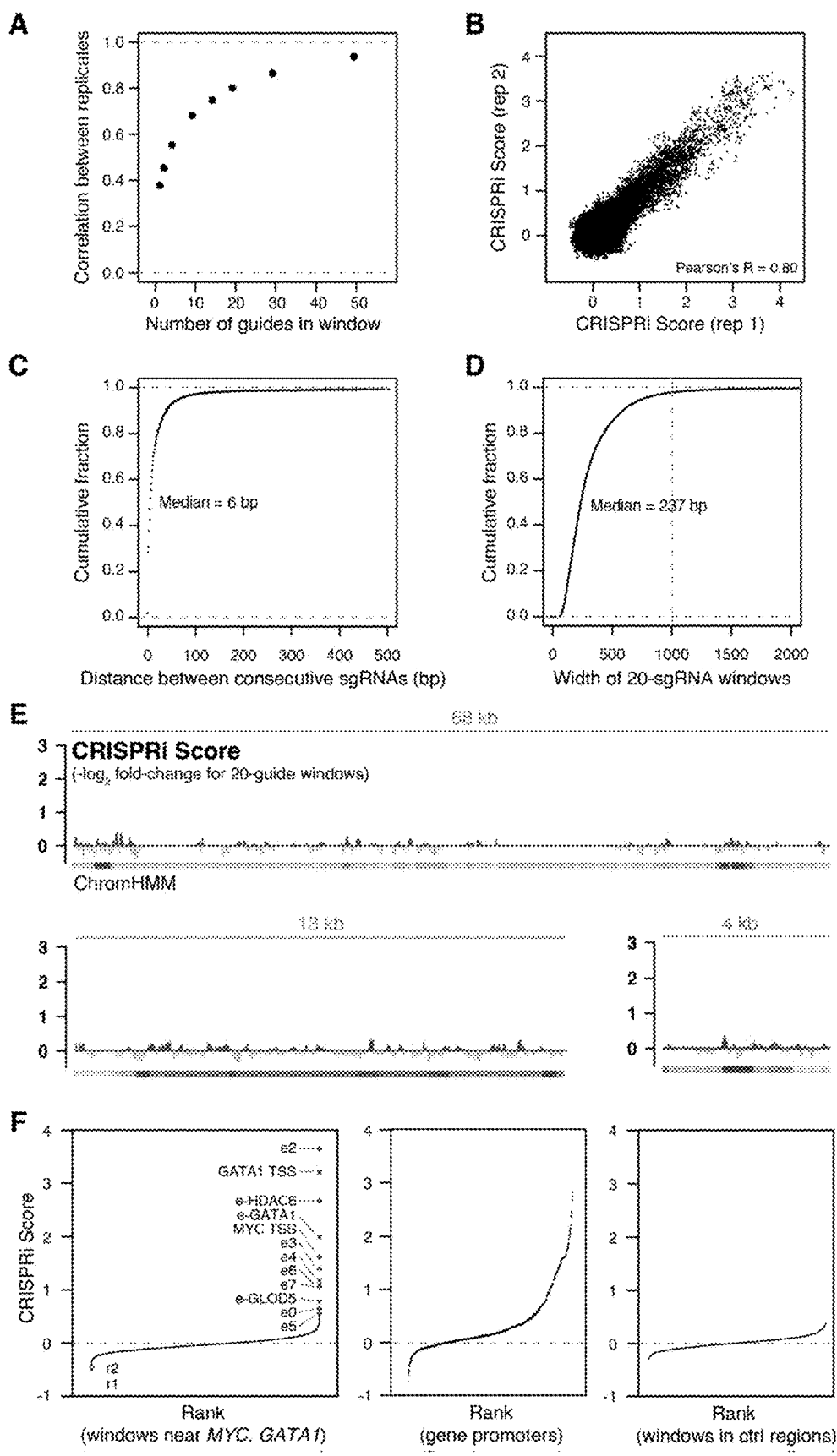
FIG. 6 shows sliding window approach for analyzing CRISPRi screens. (A) Pearson correlation between the two replicate screens for CRISPRi scores averaged across windows of different sizes (2, 3, 5, 10, 15, 20, 30, or 50 consecutive sgRNAs). (B) CRISPRi scores for all windows of 20 consecutive guides in the replicate screens. (C) Cumulative density plot of the distance between consecutive sgRNAs. Distribution extends beyond the x-axis limits. (D) Cumulative density plot for the span of 20-sgRNA windows. Windows spanning greater than 1 kb were not considered. Distribution extends beyond the x-axis limits. (E) CRISPRi scores in 20-sgRNA windows for three negative control regions that are located far from known essential genes. These regions show a lack of strong signal as compared with the GATA1 and MYC loci and were used to calculate an empirical false discovery rate for the CRISPRi score. (F) Gray: CRISPRi score in 20-sgRNA windows for tiled MYC and GATA1 regions (left, ~60,000 windows), the TSSs of protein coding genes from across a range of essentiality (middle, ~600 genes), or tiling regions far from any essential gene (right, ~5,000 windows). Red dots: Most strongly depleted window within identified enhancers and TSSs (other windows nearby, which are also often strongly depleted, are not shown for visual clarity). Blue: Most strongly enriched window within putative repressive elements.
Figure 7:
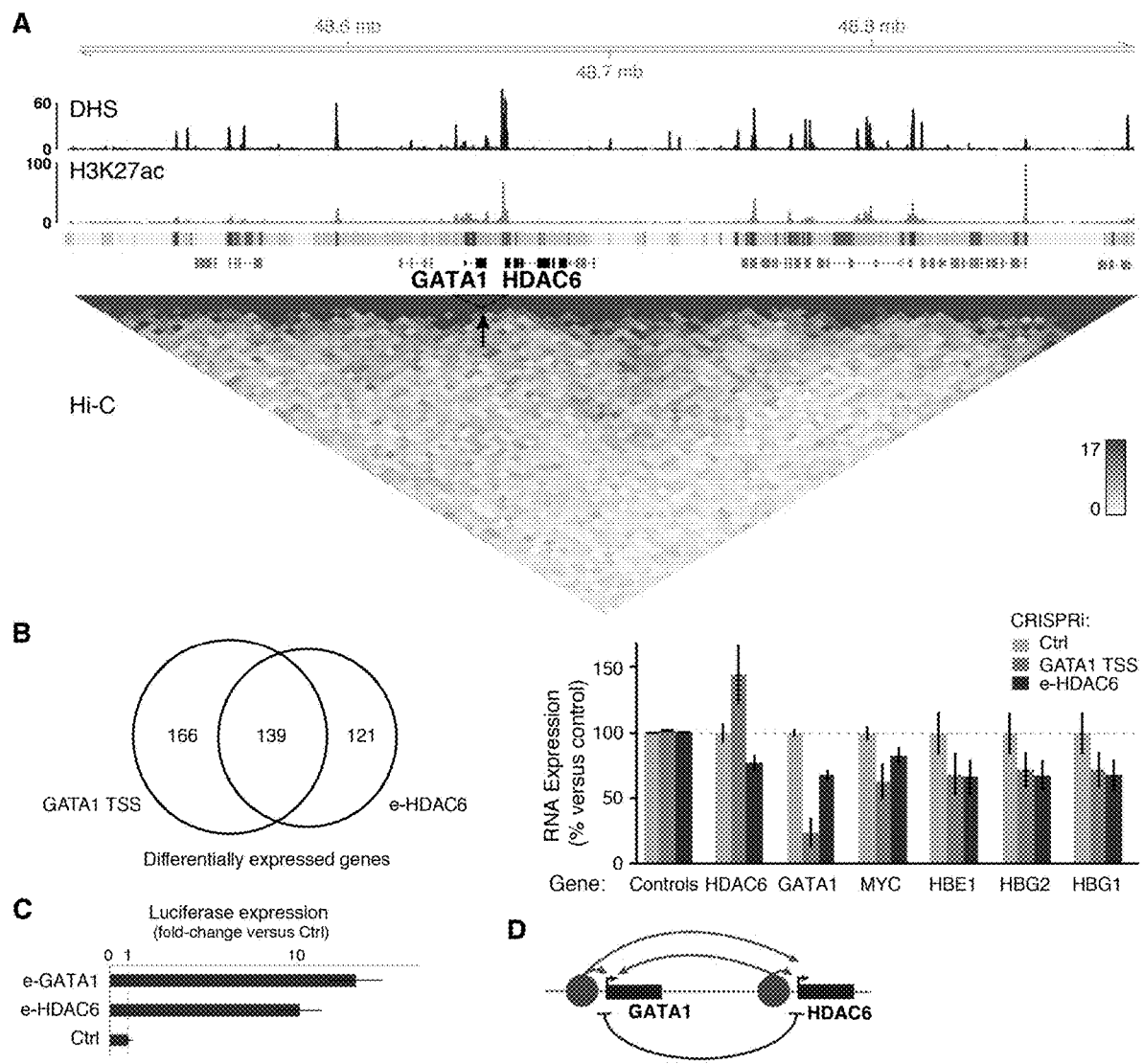
FIG. 7 shows characterization of enhancers at the GATA1 locus. (A) Chromatin state and chromosome conformation in the ~400-Kb topological domain containing GATA1 and HDAC6. K562 DHS, ChIP-Seq data, and chromatin state classifications (ChromHMM) are from ENCODE (4). Contact frequency matrix is derived from in situ Hi-C maps at 5-kb resolution in K562 cells (KL-normalized observed matrix) (6). Black triangle and arrow mark the region of interactions between enhancers (e-GATA1 and e-HDAC6) and the promoters of GATA1 and HDAC6. (B) Effects of inhibiting GATA1 TSS or e-HDAC6 on gene expression of downstream GATA1 target genes. Venn diagram represents differentially expressed genes from RNA sequencing of stable lines expressing the listed sgRNA relative to cells containing negative control sgRNAs (Ctrl). Hypergeometricp-value of overlap $<10^{-163}$. Bar plot shows that known target genes of the GATA1 transcription factor (MYC, HBE1, HBG1, and HBG2) (81-83) are differentially expressed upon inhibition of e-HDAC6. KRAB-dCas9 expression was activated for 24 hours before measurement. Error bars: 95% CI for the mean of 2 sgRNAs with 3 independently derived stable lines each. Controls: all other expressed genes. (C) Expression of firefly luciferase from plasmids containing each enhancer located 2 kb upstream of a MYC promoter fragment. Data is normalized to a random sequence of similar size (Ctrl) and to the internal *Renilla* luciferase control. Error bars: 95% CI for the mean of 3 independent transfections. (D) Regulatory connections in the GATA1/HDAC6 locus: two enhancers (red) regulate both genes, and the promoters appear to repress one another (blue), perhaps by competing for activating signals from the enhancers.

We examined the quantitative depletion of sgRNAs in a 74 kb region surrounding GATA1, which encodes a key erythroid transcription factor (FIG. 1). Because the efficiency of different sgRNAs for CRISPRi can vary dramatically (10), we used a sliding window approach, averaging the scores of 20 consecutive sgRNAs and assessing the false discovery rate (FDR) of this metric through comparison to negative control, non-essential regions (13) (FIG. 6). Because the average spacing between consecutive sgRNAs was 16 bp, the regions targeted by 20 consecutive sgRNA spanned an average of 314 bp (FIG. 6C,D). With this approach, the window with the highest score (strongest depletion) overlapped the GATA1 TSS itself (FIG. 1B, FIG. 6F). In addition, we identified 3 distal elements that significantly affected cellular proliferation (FDR<0.05, FIG. 1B) (13). One such element (e-GATA1) is located ~3.6 kb upstream of GATA1 and corresponds to a DNase I hypersensitive site (DHS) marked by H3K27ac (FIG. 1C); notably, this element shows high sequence conservation among vertebrates, and the syntenic sequence in mouse is required for proper Gata1 expression in murine erythroid progenitor cells (14). The second distal element (e-HDAC6) corresponds to a conserved DHS located ~1.5 kb upstream of HDAC6 (FIG. 1C). A third significant element is located at a DHS near the promoter of GLOD5, which itself is not essential and only weakly expressed in K562 cells. The first two elements overlap GATA1 ChIP-Seq peaks and sequence motifs (FIG. 1C), consistent with known auto-regulatory loops in which GATA1 activates its own expression (15). All three elements reside in close linear and spatial proximity to GATA1 (FIG. 7A). Finally, multiple regions in the gene body of GATA1 scored as significantly depleted in the screen (FIG. 1), but, because recruitment of KRAB-dCas9 to these sites may directly interfere with transcription (9), we focused on distal regulatory elements in subsequent analysis.

To characterize these elements, we measured GATA1 expression using quantitative PCR in cell lines stably expressing individual sgRNAs (13). As expected, targeting KRAB-dCas9 to the GATA1 TSS reduced GATA1 expression (76% reduction, FIG. 1D). sgRNAs targeting e-GATA1 or e-HDAC6 reduced GATA1 expression by 44% and 33%, respectively (FIG. 1D), and affected the expression of genes known to be regulated by the GATA1 transcription factor (FIG. 7B), confirming that these enhancers regulate GATA1. In contrast, sgRNAs targeting the HDAC6 TSS did not reduce GATA1 expression despite reducing HDAC6 expression (FIG. 1D), indicating that (i) the pooled screen accurately predicted that this region does not reduce GATA1 expression and (ii) the effects seen for the e-GATA1 and e-HDAC6 sgRNAs are not due to general effects of targeting KRAB-dCas9 to the gene neighborhood. Additionally, both e-GATA1 and e-HDAC6 can activate the expression of a plasmid-based reporter gene (FIG. 7C) (13). Together, these results support the specificity of this CRISPRi-based approach and demonstrate that e-GATA1 and e-HDAC6 quantitatively control GATA1 expression in K562 cells.

Considering the close proximity of GATA1 to HDAC6 (FIGS. 1B, 7A), we tested whether this pair of enhancers also regulates HDAC6. sgRNAs targeting e-GATA1 and e-HDAC6 reduced HDAC6 expression by 42% and 22%, respectively, comparable to their effects on GATA1 (FIG. 1D). Intriguingly, inhibition of the GATA1 promoter led to an increase in HDAC6 expression (+47%, FIG. 1D), and inhibition of the HDAC6 promoter modestly activated GATA1 (+9%, FIG. 1D); this suggests that GATA1 and HDAC6 may compete for these shared enhancers, similar to observations for other pairs of neighboring genes (16, 17). Interestingly, histone deacetylases are required for erythropoiesis (18) and HDAC6 has been implicated in cellular proliferation in multiple cancers (19). Thus, although HDAC6 does not score as essential in proliferation assays in K562 cells, it is possible that proliferative defects observed upon inhibition of e-GATA1 or e-HDAC6 result from the combined effects on both GATA1 and HDAC6 expression (13), and the genomic proximity of these genes may be important for coordinating their expression in vivo. These observations indicate a complex connectivity between enhancers and promoters in their native genomic contexts (FIG. 7D).

We next investigated the cis regulatory architecture of MYC, a critical transcription factor encoded within a 3-Mb topological domain that contains hundreds of putative enhancers. Several enhancers in this domain regulate MYC in other cell types (13), but chromatin state varies dramatically across cell types and it is unclear which of these elements regulate MYC in a given cell type. Notably, the domain contains over 60 genetic haplotypes associated (through genome-wide association studies) with human phenotypes, including cancer susceptibility (20).

Figure 8:
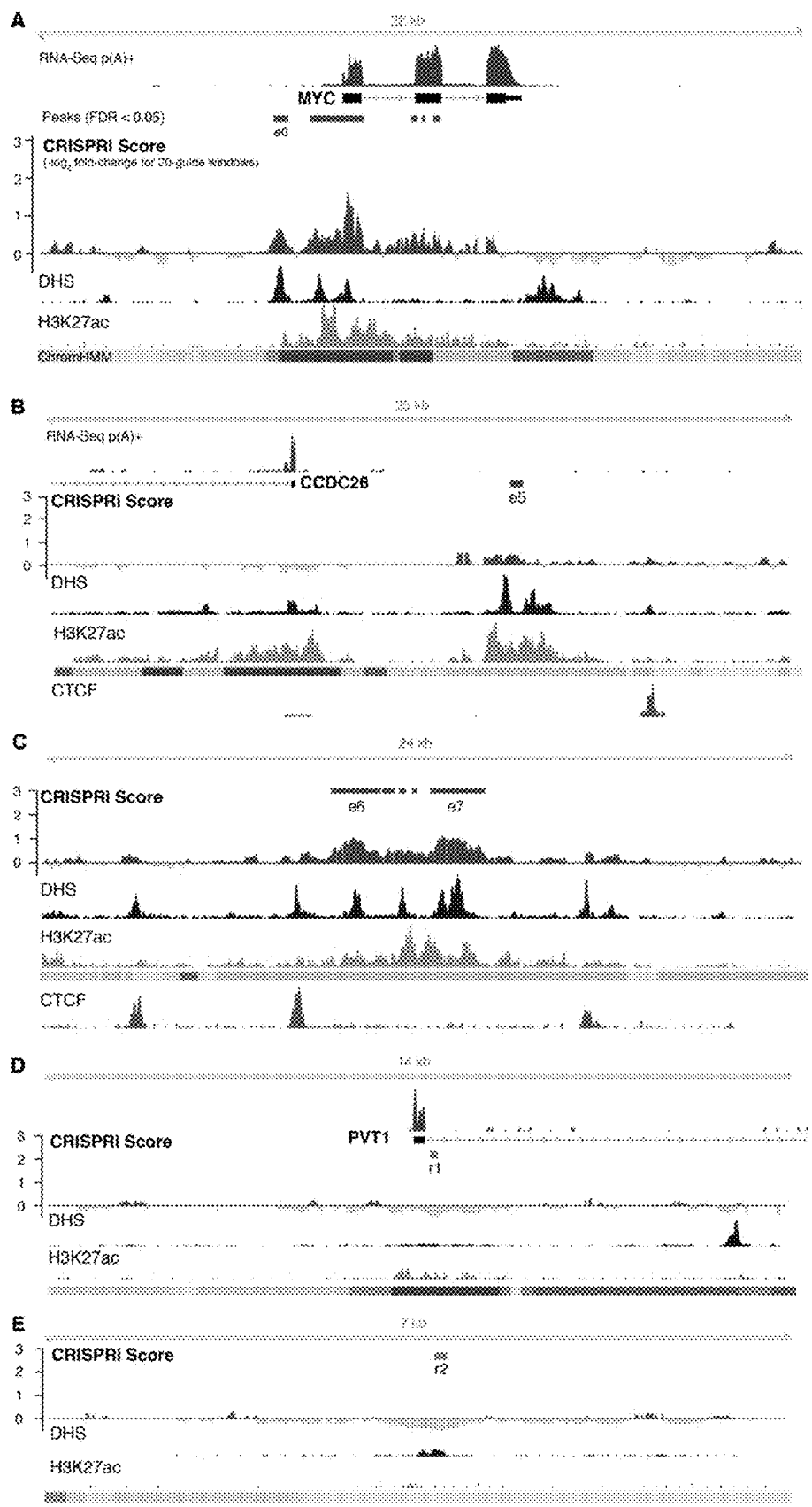
FIG. 8 shows regulatory elements at MYC and downstream enhancers. (A) CRISPRi screen results in MYC gene locus, showing significant peaks at the MYC TSS, at several locations in the gene body, and at a known promoter-proximal regulatory element (e0) (21).K562 DHS, RNA-Seq, ChIP-Seq data, and chromatin state classifications (ChromHMM) are from ENCODE (4). (B) Expanded region around e5 and CCDC26 and (C) e6/e7 showing strong CTCF occupancy at DHS sites close to the elements. Each CTCF peak has a motif oriented in the reverse direction (toward MYC, not pictured). Note that the promoter of CCDC26 does not score as essential, indicating that its expression is not responsible for the proliferative defects observed upon inhibiting e5 or other enhancers. (D) Expanded region around the putative repressive elements r1 and (E) r2. r1 corresponds to the promoter of an alternative isoform of PVT1.

To identify elements that regulate MYC in K562 cells, we tiled sgRNAs across ~1.2 Mb of sequence in this topological domain (FIG. 2A). A sliding window analysis identified several regions whose inhibition reproducibly reduced cellular proliferation, including a known promoter-proximal element located 2 kb upstream of the MYC TSS (FIG. 8A) (21), the transcribed region of the MYC gene body (FIG. 8A), and seven distal regions (labeled e1 through e7) located between 0.16 and 1.9 Mb downstream of MYC (FIGS. 2A, 8B,C). We also identified two regions that significantly increased cell proliferation (r1 and r2), and thus may repress MYC expression (FIG. 2A, FIG. 8D,E) (13).

Each of the seven putative activating elements is marked by high levels of DNase I hypersensitivity (FIG. 2A); is bound by multiple transcription factors (FIG. 9A); and shows patches of sequence conservation across mammals (FIG. 2B). Each enhancer frequently contacts the MYC promoter in three dimensions as assayed by Hi-C and ChIA-PET in K562 cells (FIG. 2A) (3, 6); elements e5 and e6/7 form very long-range (>1.8 Mb) loops to the MYC promoter and are located within 10 kb of CTCF ChIP-Seq peaks with motifs oriented toward MYC (FIG. 9B,C),consistent with the convergent rule for CTCF-mediated chromatin loops (6). Two elements (e3 and e4) correspond to alternative TSSs for the long non-coding RNA PVT1 (FIG. 2A); knockdown experiments indicate that the mature PVT1 RNA transcript itself is likely not essential in K562 cells (FIG. 4) and so e3 and e4 likely affect cellular proliferation through direct regulation of MYC (13).

We experimentally characterized these seven activating elements to test whether they regulate MYC. CRISPRi inhibition of each of these elements with individual sgRNAs led to proliferation defects in a competitive growth assay (FIG. 9B) and led to a 9-62% reduction in MYC expression (FIG. 2C). The magnitude of the change in gene expression correlated with the proliferation defect, consistent with a quantitative relationship between cell growth and precise MYC expression levels (Pearson R=0.92, FIG. 2D). In a plasmid-based reporter assay, each putative regulatory element led to >5-fold up-regulation of a reporter gene relative to a control sequence (FIG. 9C) (13). For a subset of the elements (e2, e3, and e4), we generated clonal cell lines containing genetic deletions on one or two of the three chromosome 8 alleles (K562 cells are triploid) and measured the expression of MYC from each allele (13). For each element, we found that genetic deletions reduced MYC expression from the corresponding allele(s), confirming our CRISPRi results (FIG. 10). Together, these data support the hypothesis that these seven elements, spanning 1.6 Mb of non-coding sequence, act as enhancers to control MYC expression and cellular proliferation.

Figure 9:
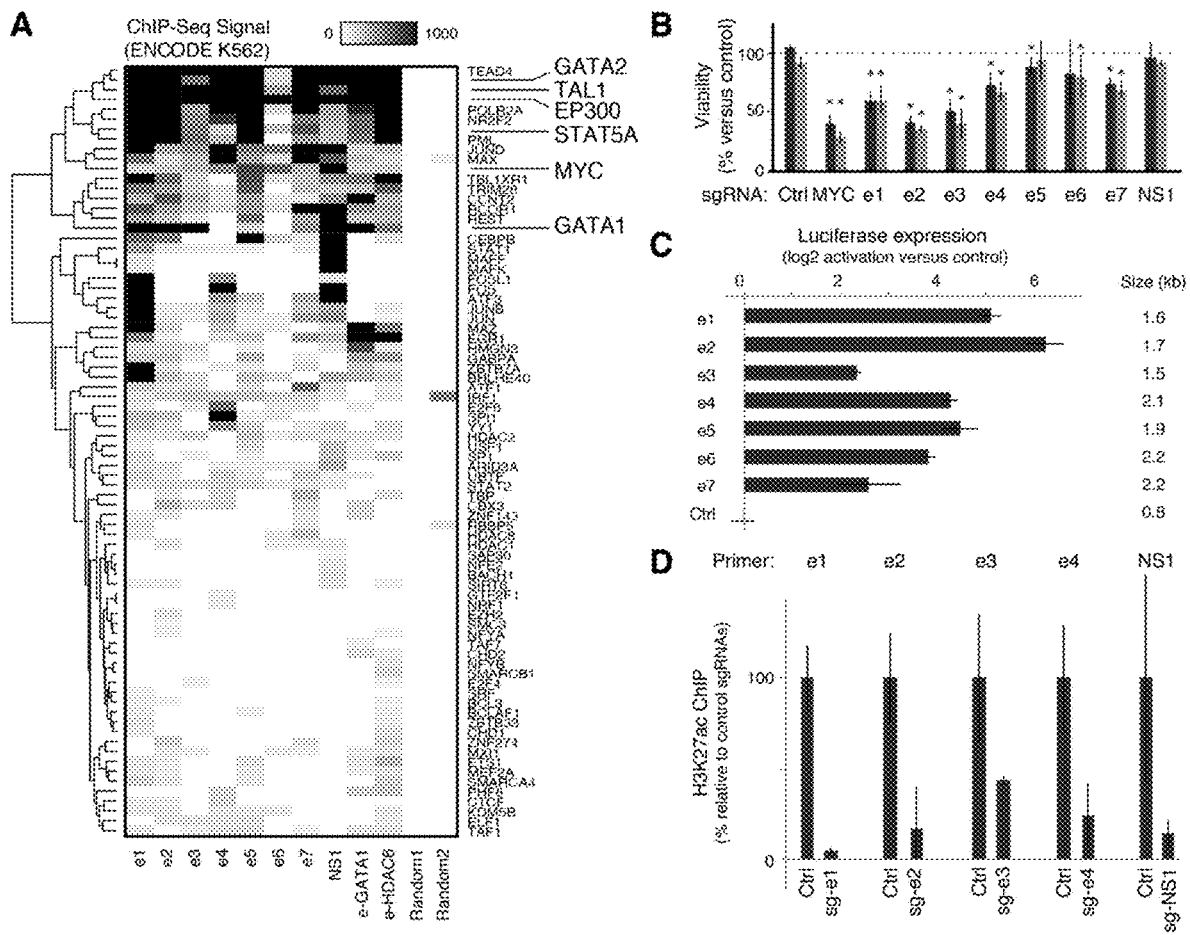
FIG. 9 shows characterization of enhancers at the MYC locus. (A) GATA1 and MYC enhancers bind many activating transcription factors. Transcription factor binding in a 1-kb window centered on each enhancer are shown with their ChIP-Seq signal reported by ENCODE (4), which assigns scores to peaks by multiplying the ChIP-seq signal values by a normalization factor calculated as the ratio of the maximum score value (1000) to the ChIP-seq signal value at one standard deviation from the mean, with values exceeding 1000 capped at 1000. For comparison, two random sites near MYC are shown. (B) Relative viability of cells in a competitive growth assay. Cells expressing the indicated sgRNAs were competed against K562 cells expressing GFP or RFP and grown in doxycycline for 7 days before counting. Gray bars: two different sgRNAs per target. Error bars: 95% CI for the mean of 6 total replicate competition assays using cells from 3 independent infections. *: $p<0.05$ in T-test versus negative controls. (C) Each MYC enhancer can activate a reporter gene driven by a MYC promoter fragment in a plasmid-based luciferase assay. The size of each enhancer sequence is reported on the right. Ctrl: negative control sequence corresponding to a bacterial kanamycin resistance gene. Error bars: 95% CI for the mean based on three replicate transfections. (D) To determine if sgRNAs targeting NS1 successfully affected chromatin state, ChIP for H3K27ac was performed in cells expressing individual sgRNAs targeting e1, e2, e3, e4, or NS1, as well as two non-targeting control sgRNAs. ChIP enrichment was measured by qPCR for 5 positive control loci, 3 negative control loci, and the locus targeted by the sgRNA. Bars represent enrichment of the indicated locus normalized to the non-targeting control sgRNAs. Error bars: 95% CI for the mean for 5 (Ctrl) or 3 (others) biological replicates.

In addition to e1-e7, we characterized one non-coding element (NS1) that did not score in the screen (FIG. 2A). In K562 cells, NS1 displays strong DHS and H3K27ac occupancy, binds to multiple transcription factors (FIG. 9A), and participates in a long-range chromatin loop to the MYC promoter (FIG. 2A). In a lung adenocarcinoma cell line, NS1 regulates MYC as assayed by CRISPRi inhibition with individual sgRNAs (22). Accordingly, we wondered whether NS1 regulates MYC in K562 cells despite not being detected as such in our CRISPRi screen. To explore this possibility, we targeted KRAB-dCas9 to NS1 with individual sgRNAs in K562 cells and found that CRISPRi successfully reduced H3K27ac occupancy to an extent similar to that observed when targeting other MYC enhancers (FIG. 9D). Despite affecting chromatin state at NS1 in K562 cells, these sgRNAs did not substantially impact cellular proliferation or MYC expression (FIG. 2C,D), consistent with the results from the pooled screen. These observations support the ability of the CRISPRi screening approach to distinguish elements that do and do not regulate a given gene. However, we note that some regulatory elements, such as those that act redundantly with others in the locus, may not be discoverable by this method (13).

Figure 2:
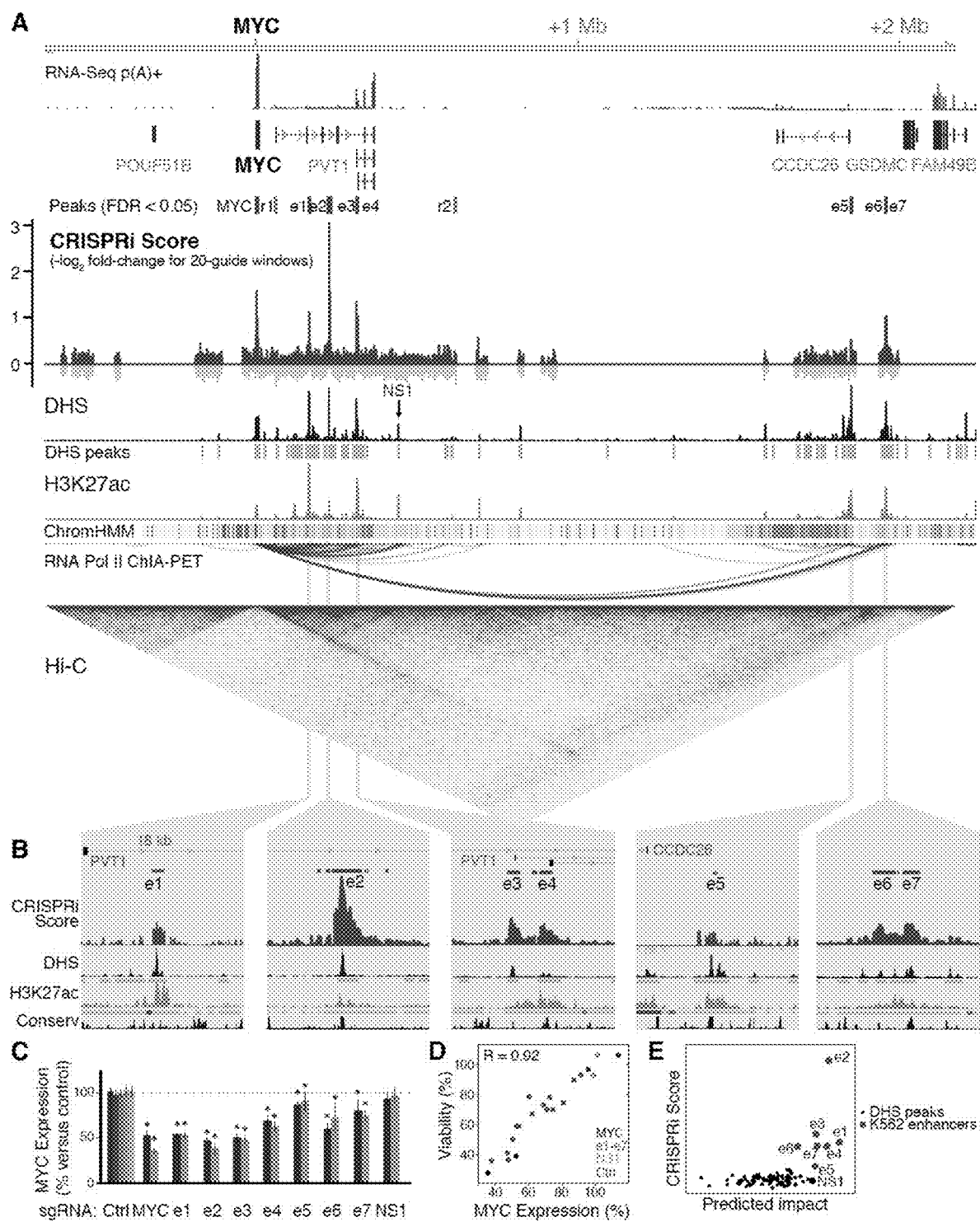
FIG. 2 shows identification and prediction of elements that regulate MYC. (A) CRISPRi screening identifies 7 distal enhancers (e1-e7) that activate MYC and two repressive elements (r1, r2) that may act to repress MYC. NS1: an element that does not score in the screen. (B) 18-kb windows around each of the 7 distal enhancers. Y-axis scales are equivalent between panels. (C) qPCR for MYC mRNA in cells expressing individual sgRNAs 24 hours after KRAB-dCas9 activation. Gray bars: 2 different sgRNAs per target, or 5 for non-targeting controls (Ctrl). Error bars: 95% CI for the mean of 12 biological replicates (13). *: $p<0.05$ in T-test versus negative controls. (D) Correlation between MYC expression and relative cell viability for e1-e7, MYC TSS, NS1, and Ctrl sgRNAs (13). Pearson's R=0.92 includes e1-e7 sgRNAs only; with the others, R=0.95. (E) Predicted impact of DHS elements on MYC expression (a function of quantitative DHS, H3K27ac, and Hi-C signal) versus their experimentally derived CRISPRi scores (13).

The ability to systematically test gene regulatory elements will help to train predictive models of functional enhancer-promoter connectivity. Notably, existing annotations and catalogs of enhancer-promoter predictions performed poorly at distinguishing e1-e7 from enhancers that do not impact MYC expression (13). For example, ENCODE annotates 185 Kb of sequence in this domain as putative "strong enhancer" in K562 cells (FIG. 2A), but only 8% of this sequence, corresponding to e1-e7, appears to regulate MYC. We sought to improve the ability to predict enhancers and connect them with genes that they regulate. When we examined chromatin state maps (including DHS, H3K27ac and Hi-C), we found that quantitative DHS or H3K27ac signal could distinguish most of the seven MYC enhancers but ranked them in the wrong order (FIG. 11A). For example, e5 shows the strongest DHS signal yet has the weakest effect on MYC expression (FIG. 2). Accordingly, we considered a framework (FIG. 11B) wherein the impact of an enhancer on gene expression is determined both by its intrinsic activity level (for which we use quantitative DHS and H3K27ac levels as a proxy) and the frequency at which the enhancer contacts its target promoter (for which we use Hi-C data as a proxy) (13). This metric correctly ranked 6 of the 7 distal enhancers as the most important of 93 DHS elements in K562 cells (FIG. 2E) and provided a reasonable ordering of their relative effects (Spearman correlation=0.79). We note that this approach did not perfectly distinguish between enhancers that do and do not regulate MYC: NS1 was ranked 7 and e6 was ranked 11. Nonetheless, quantitative measures of chromatin state and chromosome conformation are strongly predictive of enhancers that regulate MYC in K562 cells.

To determine whether this approach might be applicable in other cellular contexts, we examined 4 MYC enhancers identified in other cell types (FIG. 3A,B) (13). In each case our metric ranked these known elements among the 3 most important in the corresponding cell type (FIG. 3B). We also identified multiple instances where elements predicted to regulate MYC in one or more cell types harbor single nucleotide polymorphisms (SNPs) associated with human traits including cancer susceptibility and height (FIG. 3C,D). Additional CRISPRi-based functional mapping in other cell types and gene loci might allow the derivation of general models to predict functional enhancer-promoter connections and help to understand non-coding genetic variation.

In summary, CRISPRi screens can accurately identify and characterize the regulatory functions and connectivity of non-coding elements. In the MYC and GATA1 loci, CRISPRi reveals complex and non-obvious dependencies between multiple genes and enhancers, including relationships that suggest regulation of multiple genes by the same enhancer, coordinated activity of multiple enhancers to control a single gene, and competition between neighboring promoters. Thus, learning the principles and connectivity of transcriptional networks requires dissecting putative regulatory elements in their native genomic contexts.

While we used cellular proliferation as a readout to investigate 2 essential genes, this CRISPRi approach can be applied to identify regulatory elements that control an arbitrary gene or phenotype of interest through alternative assays, for example by tagging an endogenous gene locus with green fluorescent protein (GFP) and sorting cells by GFP expression (23).

Together with complementary methods using catalytically active Cas9 (13, 23-25), CRISPRi-based functional mapping provides a broadly applicable approach (13) to dissect transcriptional networks and interpret the contributions of non-coding genetic variation in gene regulatory elements to human disease.

Discussions

A Generalizable Method to Discover and Characterize Gene Regulatory Elements

We set out to develop an approach to identify non-coding elements that regulate a given gene in its endogenous genomic context. A method to accomplish this would need to be able to (i) survey the regulatory function of many thousands of kilobases of genomic sequence, including regions not predicted to have regulatory function; (ii) sensitively identify and robustly quantify the effects of non-coding elements, and (iii) be generally applicable to study any gene of interest.

We designed our CRISPRi-based screening approach to address these goals. Our results in the GATA1 and MYC loci demonstrate that this approach is scalable, sensitive, and specific. In the following sections we describe the conceptual and technical features that enable these characteristics and compare this method to similar approaches that use catalytically active Cas9 (23-25).

CRISPRi Enables Scalable Functional Characterization of Gene Regulatory Elements.

Because non-coding regulatory elements can be located far from their target genes and a gene might be controlled by multiple elements (7, 8, 47), a method to dissect the regulatory architecture of a given gene must be able to interrogate, through loss-of-function experiments, large regions of genomic sequence. To develop a scalable method, we exploited the programmable CRISPR system in the setting of a pooled screen to simultaneously interrogate the functions of many non-coding regions. In this method, we synthesize a library of sgRNAs targeting non-coding regions of interest; generate a lentiviral library containing each of these sgRNAs; and establish a population of cells in which each cell expresses doxycycline-inducible KRAB-dCas9 and a single sgRNA. The effects of each sgRNA can be identified by using high-throughput sequencing to characterize the representation of sgRNAs in the cell population before and after a phenotypic selection (68, 69). This approach enables high-throughput interrogation of non-coding elements: in this study, we assay 1.29 Mb of sequence around GATA1 and MYC in a single pooled experiment.

CRISPRi Robustly Identifies Gene Regulatory Elements.

A method for characterizing the regulatory network for a given gene needs to be able to robustly identify regulatory elements, even when their effects on gene expression are relatively small in magnitude. Several features of our approach help to provide high sensitivity and specificity for regulatory elements.

First, the pooled screening format provides numerous advantages that help to identify small effects. Specifically, pooled screens include contributions of many individual cells for each sgRNA; assess the functions of different sgRNAs in the same experimental context (in the same plate); and measure changes in sgRNA representation using count-based statistics.

Second, the use of the KRAB-dCas9 system enables independent assessments of the function of the same regulatory element with multiple adjacent sgRNAs. This property stems from the fact that KRAB-dCas9 appears to disrupt the functions of regulatory elements across distances on the order of hundreds of base-pairs (12), such that in the MYC and GATA1 loci we observe regions where dozens of sgRNAs are consistently depleted (FIGS. 1B, 2A). This is advantageous for quantifying the impact of an element because the efficacy of individual sgRNAs varies for reasons inherent to the CRISPR system, such as the effect of the targeting sequence on sgRNA transcription or stability (68). Thus, the degree to which an individual sgRNA affects gene expression reflects not only the importance of the disrupted element but also the potency of the sgRNA itself. To address this issue, we average the scores across multiple consecutive sgRNAs, providing a more robust estimate of the effect of an individual element. We note that this property appears to differ qualitatively from previous approaches using catalytically active Cas9 to perform mutagenesis of non-coding regions (23-25). Cas9-mediated mutagenesis relies on non-homologous end-joining to disrupt critical sequence motifs, and so—because the resulting indels are on the order of tens of bases or smaller—only the few sgRNAs very close to critical sequence motifs appear to disrupt the function of any given regulatory element (23-25). These properties may be important in determining the power of screens using each approach and may have different trade-offs for positive versus negative selection screens.

Supporting the specificity and sensitivity of this approach, we find that each of the elements identified by our CRISPRi screens (e-GATA1, e-HDAC6, and e1-e7), do in fact affect the expression of the intended gene, including effects on gene expression as small as 10%. We note that the sensitivity of this approach for even smaller effects might be accomplished by assaying more cells per sgRNA.

CRISPRi-Based Screening is General and can be Applied to Study Other Genes or Phenotypes.

A general method for identifying gene regulatory elements should be applicable to any gene of interest. While we looked for effects on survival and proliferation in K562 cells in order to characterize multiple gene loci in a single screen, we note that this CRISPRi-based approach could be applied to study an arbitrary gene of interest through fluorescence-based readouts of cells with a gene tagged in its endogenous locus with GFP (23). This strategy for mapping regulatory elements can also be applied in the context of other functional readouts, including other FACS-based assays (24, 70) or drug or toxin resistance phenotypes (10, 69).

Together, these properties provide a scalable, sensitive, and general method for mapping the functions of gene regulatory elements. This CRISPRi-based approach appears to have complementary properties to Cas9-mediated mutagenesis approaches (23-25): CRISPRi can robustly identify gene regulatory elements and provides non-mutagenic inhibition that is consistent across individual alleles and cells, while mutagenesis-based approaches appear to provide high resolution for identifying specific motifs. Further work will be required to determine how to best leverage these complementary features to dissect the networks of non-coding elements controlling gene expression.

Essentiality of Non-Coding RNAs in the MYC Locus.

Previous CRISPR screens have established that the protein coding genes expressed in the vicinity of MYC are not essential in K562 cells (FIG. 4). We further considered whether non-coding RNA genes in this region including PVT1, CCDC26, and 5 microRNAs are also essential and thus might explain the effects on cell proliferation conferred by the enhancers we discover in the MYC locus. In each case, we found that these non-coding RNAs either do not affect cell proliferation in K562 cells (PVT1 and CCDC26) or are not detectably expressed (microRNAs) and thus that e1-e7 likely control cell proliferation through regulation of MYC.

Two of the MYC enhancers we identified (e3 and e4) correspond to promoters that produce short alternative isoforms of the long non-coding RNA (lncRNA) PVT1 (FIG. 2A). Because PVT1 has previously been reported to affect cellular proliferation in trans based on siRNA-mediated knockdown experiments in mammary and ovarian cell lines (71, 72), we investigated whether a trans function of the PVT1 transcript could be responsible for its promoters affecting cellular proliferation in K562 cells. We performed competition assays between K562 cells transfected with control siRNAs and cells transfected with siRNAs against PVT1 or, as positive controls, MYC or GATA1. Knockdown of MYC or GATA1 (27% or 52% reduction, respectively) led to a reduction in cellular proliferation relative to cells transfected with control siRNAs, as expected (FIG. 4C,D). In contrast, knockdown of PVT1 (66% reduction for the best siRNA) did not lead to detectable changes in proliferation (FIG. 4C,D). This indicates that reduction of the mature PVT1 lncRNA does not affect the proliferation of K562 cells.

In contrast, we found that CRISPRi targeting e3 (corresponding to a TSS of PVT1), which led to a ~77% reduction in PVT1 RNA levels (FIG. 4E), did affect cellular proliferation in competition assays (FIG. 2C). Thus, the proliferative defect observed upon inhibition of these elements in K562 cells appears to reflect their functions in the cis regulation of MYC rather than previously reported trans functions of the PVT1 RNA transcript itself. This is consistent with previous findings that gene promoters (including promoters of lncRNAs) can act as enhancers for neighboring genes (73, 74). Indeed, we show that both e3 and e4 activate expression of a plasmid-based reporter gene (FIG. 8B), indicating that these elements can act as enhancers. There is a possibility that other mechanisms associated with PVT1 transcription might also quantitatively contribute to controlling MYC expression in cis.

In addition to PVT1, the MYC region also contains the lncRNA CCDC26 (a pseudogene), which is expressed from a TSS 7.2 Kb distal to e5. Although e5 scored in our screen and affected MYC expression, we did not observe depletion of sgRNAs targeting the CCDC26 TSS or promoter despite an abundance of sgRNAs in these regions (FIG. 8B). Thus, e5 and other enhancers likely affect cell proliferation through regulation of MYC rather than through regulation of CCDC26. We note that it is technically possible that depletion of CCDC26 or PVT1 contributes to affecting cell proliferation in the context of MYC suppression, but our data are inconsistent with them having strong effects on cell proliferation independent of changes in MYC.

The genetic region around also MYC harbors five putative miRNA genes previously described in several cancer cell lines (miR1204-1208). To determine if these miRNAs are expressed in K562s, we inspected ENCODE short RNA sequencing data (wgEncodeCshlShortRnaSeqK562CellShortAln.bam) and found that 0 reads (out of >29 million reads) overlap the RefSeq-annotated putative miRNAs in the region. Because regulation by miRNAs is thought to be highly dependent on miRNA abundance (75), miR1204-1208 do not likely have important functions in K562 cells.

Repressive Elements in the MYC Locus.

We identified 2 elements in the MYC locus (r1 and r2, FIGS. 2A, 8) whose inhibition by CRISPRi led to increased proliferation of K562 cells in our screen, suggesting that these elements may act to repress MYC expression. Both of these elements have smaller absolute effect sizes in the screen data than the weakest detected enhancer (e5, 10% reduction in MYC expression), suggesting that these repressive elements may have even smaller quantitative effects on MYC expression. Interestingly, one of these elements corresponds to the promoter of a minor PVT1 isoform (FIG. 2A), consistent with a model wherein this promoter of PVT1 competes with the MYC promoter for regulatory signals, similar to the phenomenon we observe for GATA1 and HDAC6.

Conceptual Framework for Predicting Enhancer Function.

Our approach for comparing the relative activity of enhancers is based on a classic model in which an enhancer affects gene expression by recruiting transcription factors and activating gene expression upon physical contact ("looping") between the enhancer and a target promoter (1, 46). In this model, the quantitative impact of an enhancer might depend on (i) its intrinsic activity (i.e., the complement of transcription factors recruited to the element and their effects on a target promoter) and (ii) the frequency at which the enhancer physically contacts its target promoter in the nucleus. We note that this model does not represent all of the possible mechanisms by which regulatory elements might regulate their target genes (1), but does provide a simple framework with which to combine these two aspects of enhancer function.

To represent the intrinsic activity of an enhancer, we used quantitative measures of DHS and H3K27ac occupancy based on previous evidence that they correlate with various measures of activity. For example, DHS signal at regulatory elements in the genome correlates with transcription factor occupancy (44, 76) and with the activity of those elements in plasmid-based reporter assays (77). H3K27ac occupancy correlates with expression of neighboring genes across cellular contexts (78, 79) as well as with on-plasmid enhancer activity (77).

To represent the contact frequency between an enhancer and promoter, we used genome-wide measurements based on Hi-C (80), a method that requires physical contact and crosslinking in order to produce a signal linking two regions of genomic DNA. Physical contacts between enhancers and promoters correlate with gene activation (1, 6, 46, 47), and in a few cases increasing the frequency of enhancer-promoter contact has been shown to activate gene expression (48, 49).

These observations provide a conceptual foundation for this approach to comparing the relative impact of enhancers on gene expression. Further work will determine whether this approach reflects the mechanisms by which these enhancers regulate MYC. Regardless of the underlying mechanisms, this approach can distinguish elements that regulate MYC in K562 cells from those that do not and may be more broadly useful for connecting regulatory elements with their target genes.

Guidelines for Design of Additional CRISPRi Screening Libraries.

Figure 12:
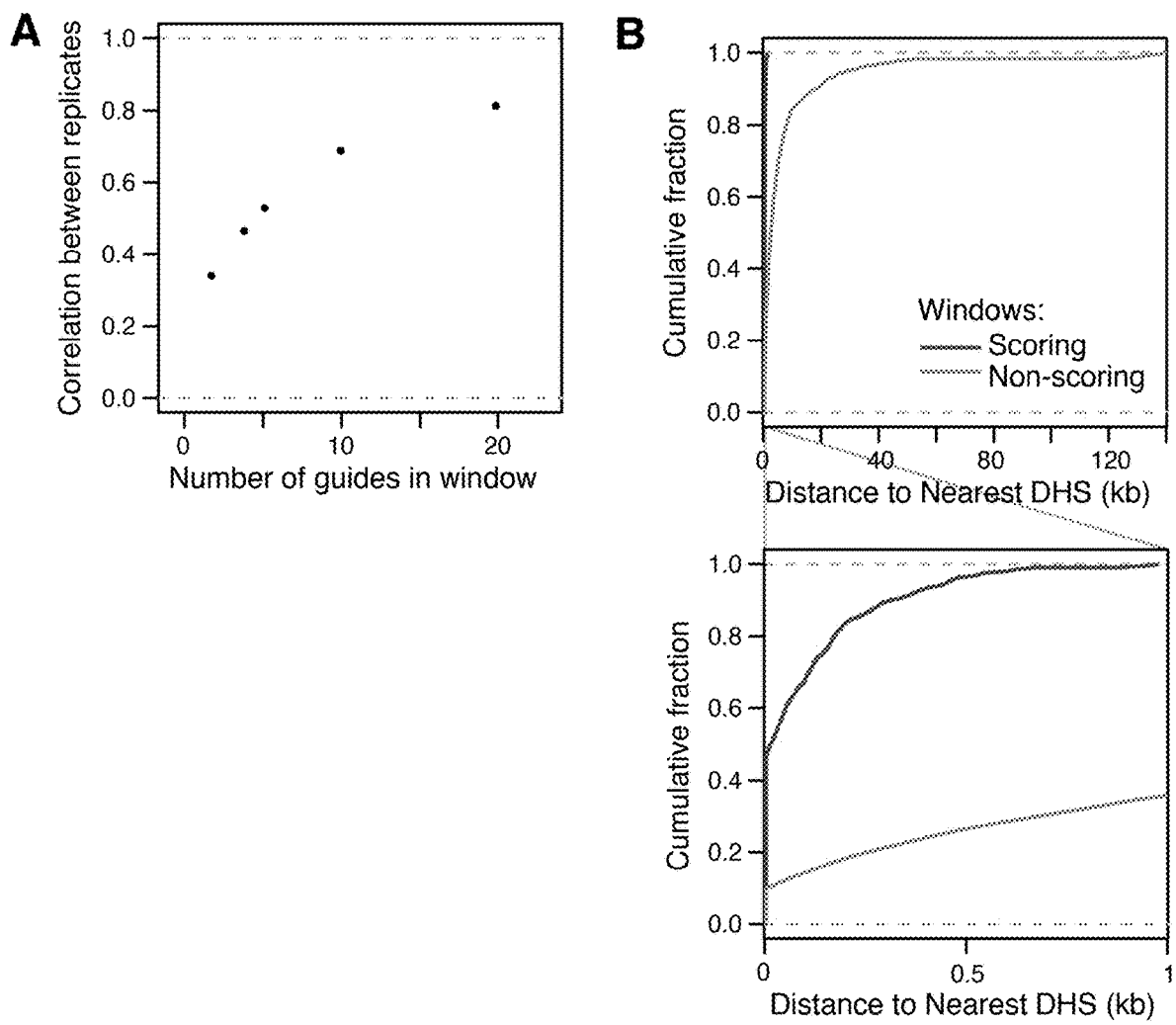
FIG. 12 shows design of new CRISPRi libraries. (A) Pearson correlation between the two replicate screens for CRISPRi scores from windows of different sizes—2, 4, 5, 10, 20 sgRNAs—downsampled by taking every $10^{th}$, $5^{th}$, $4^{th}$, $2^{nd}$, or every sgRNA, respectively. Reducing the density of coverage reduces reproducibility. (B) Cumulative density plot of the distance between 20-sgRNA windows and the nearest DHS peak, with the first kb highlighted below. All significantly enriched or depleted windows (Scoring) are less than 1 kb from a DHS peak, compared to <35% of all other windows (Non-scoring).
Figure 13:
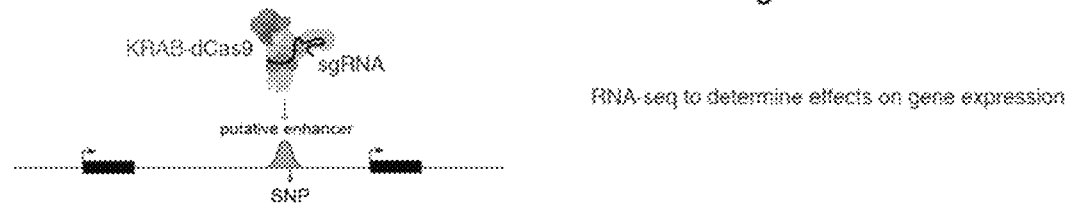
FIG. 13 shows several strategies for screening and mapping of enhancer-gene connections.
Figure 13:
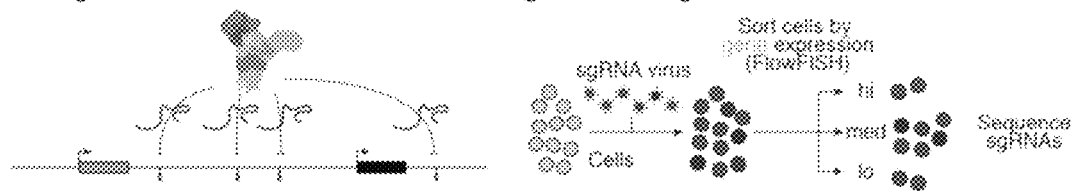
Figure 13:
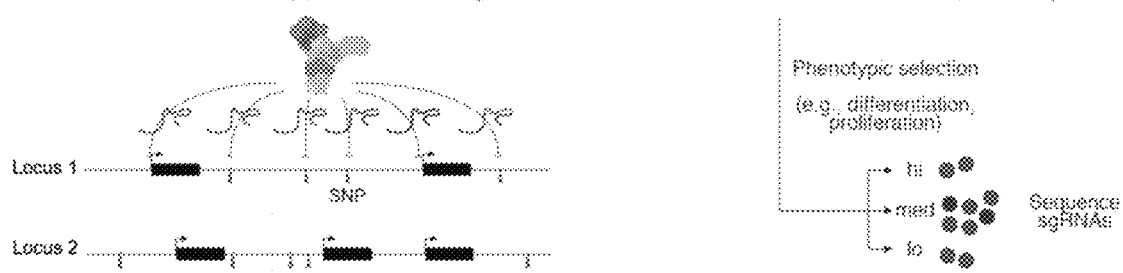

We sought to determine how to best design CRISPRi screening libraries using fewer sgRNAs per gene and thus enabling the interrogation of more genes. We analyzed our data by down-sampling the number of sgRNAs to every $2^{nd}$, $4^{th}$, $5^{th}$, or $10^{th}$ sgRNA with each 20-sgRNA window. We found that, as expected, this reduces the reproducibility of estimates of the quantitative effects of elements and thus reduces power to detect elements with small effects (FIG. 12A).

An alternative strategy for designing smaller libraries is to focus on the subset of regions that are likely to score. All of the elements detected in our screen are centered on DHS sites (FIG. 12B) and every significantly depleted or enriched 20-sgRNA window is located within 1 kb of a DHS peak (the union of wgEncodeUwDnaseK562PkRep1.narrowPeak and wgEncodeUwDnaseK562PkRep2.narrowPeak). Designing a screen against only DHS sites could reduce the size of the library by approximately a factor of 5. However, there may be regulatory elements in other loci that are not DHS sites.

Figure 14:
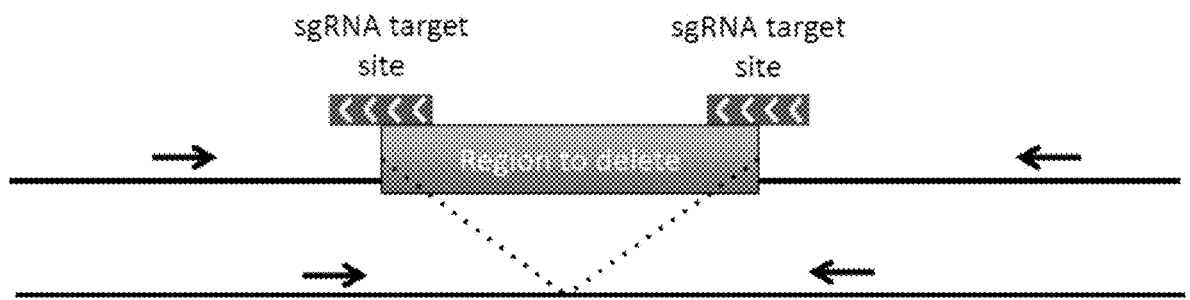
FIG. 14 shows a strategy for deleting non-coding genomic regions with paired sgRNAs. Regions of the genome can be deleted with a lentiviral construct expressing a pair of sgRNAs. This requires a construct that can express two sgRNAs at sufficient levels for deletion (FIG. 15). Readout can be PCR around the deleted region. The deletion shortens the size of the PCR amplicon, so the deletion rate can be estimated from the relative intensities of large (WT) and small (deletion) bands on a gel (FIGS. 16 and 17).
Figure 16:
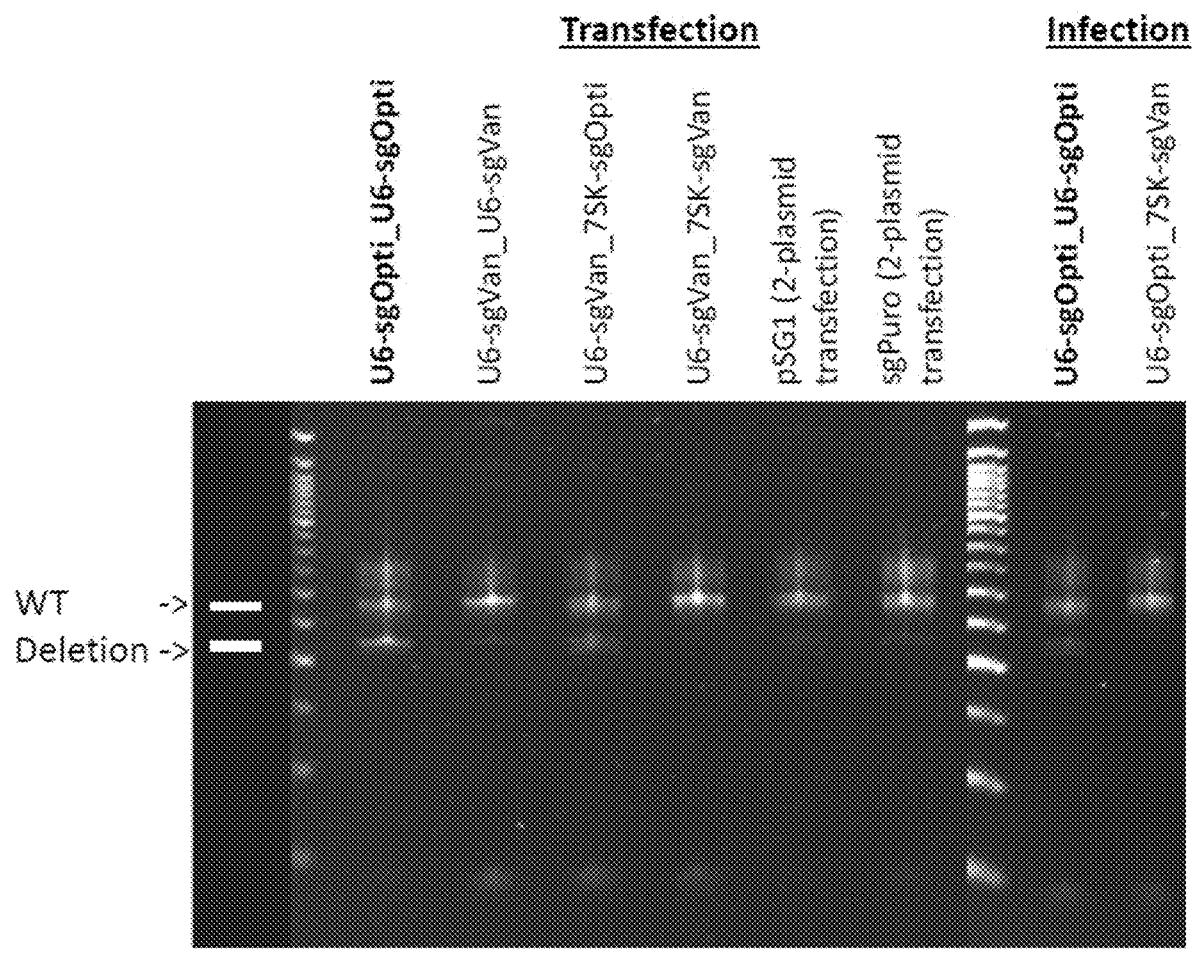
FIG. 16 shows efficient deletion by U6-sgOpti_U6-sgOpti when used in lentiviral infection in mESCs. The genomic region around the intended deletion was amplified by PCR and run on a gel. The deletion is evident by leading to a smaller amplicon. In the schematic lane on the far right, the top band is the size of the WT amplicon and the bottom band is the expected deletion band. The relative intensity of these lanes denotes deletion efficiency.
Figure 17:
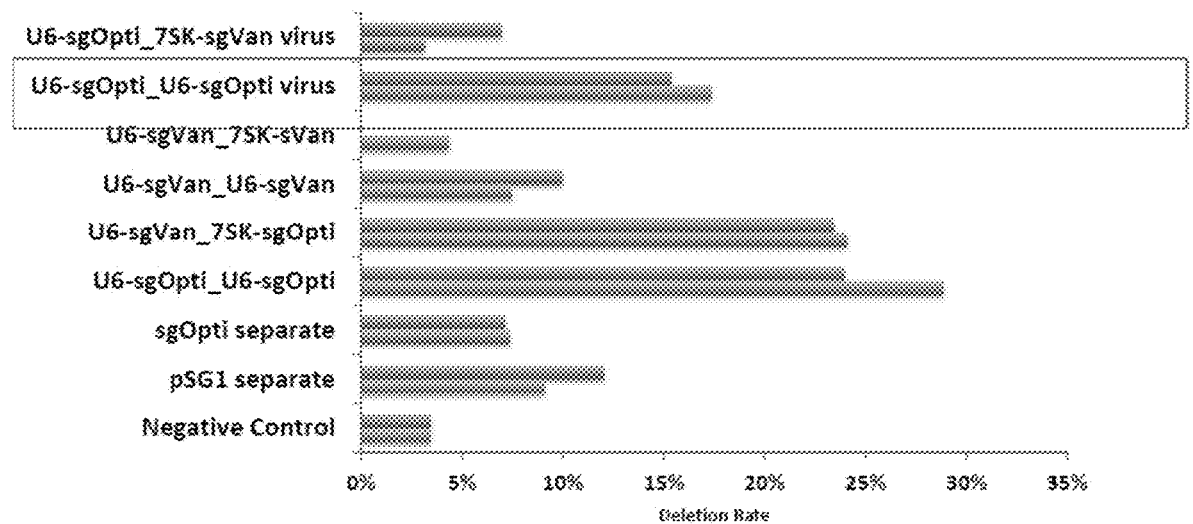
FIG. 17 shows efficient deletion by U6-sgOpti_U6-sgOpti when used in lentiviral infection in mESCs. In cells transduced with the U6-sgOpti_U6-sgOpti dual sgRNA-expressing lentivirus, about 15% of alleles were deleted in two biological replicates, showing that the U6-sgOpti_U6-sgOpti construct deletes efficiently and can be used for screening of non-coding elements.
Figure 18:
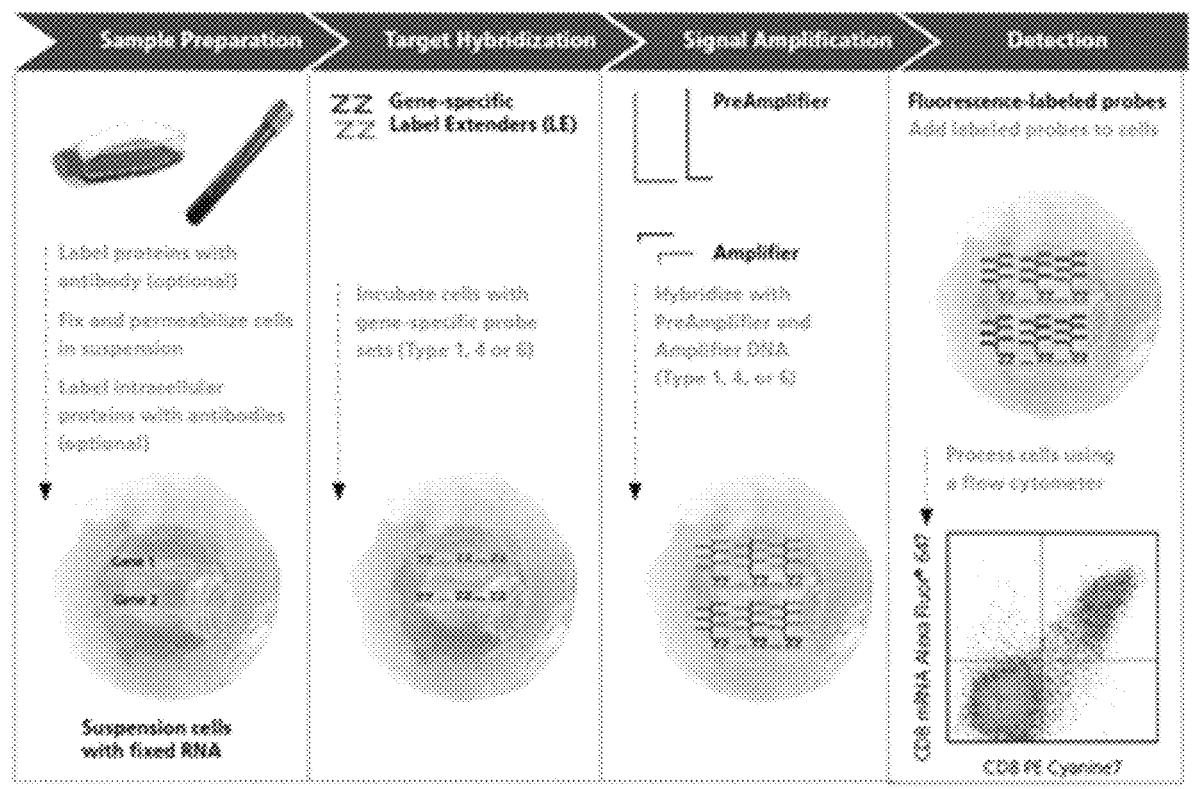
FIG. 18 shows an example FlowFISH protocol.
Figure 19:
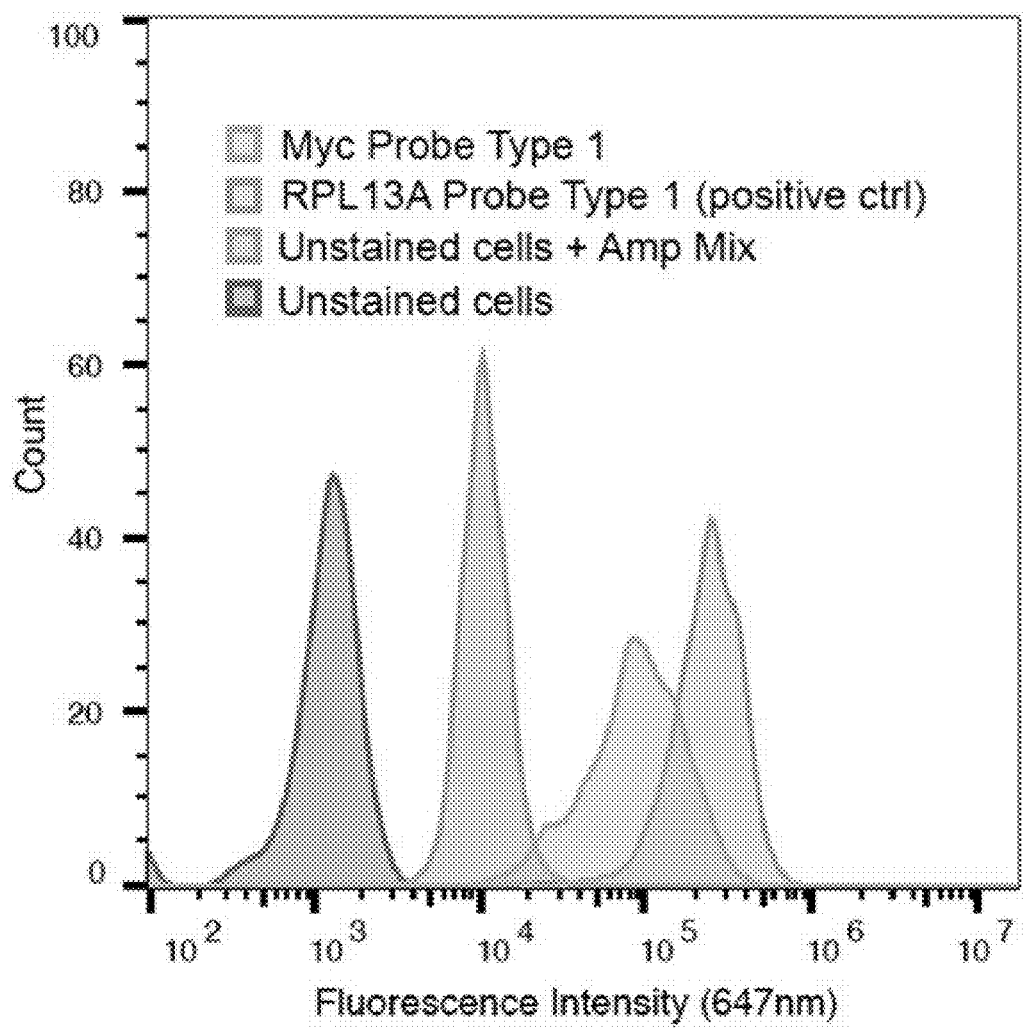
FIG. 19 shows that FlowFISH has high background from non-specific binding. The background florescence from completely unstained cells is much lower than the florescence from cells treated with amplification and label probes but not target-specific probes. Therefore, the appropriate negative control sample is cells treated with amplification and label probes. Additional washes can reduce this non-specific signal (FIG. 20) and the background in a similar microscopy-based assay does not appear to be due to specific off-target binding (FIG. 21).
Figure 20:
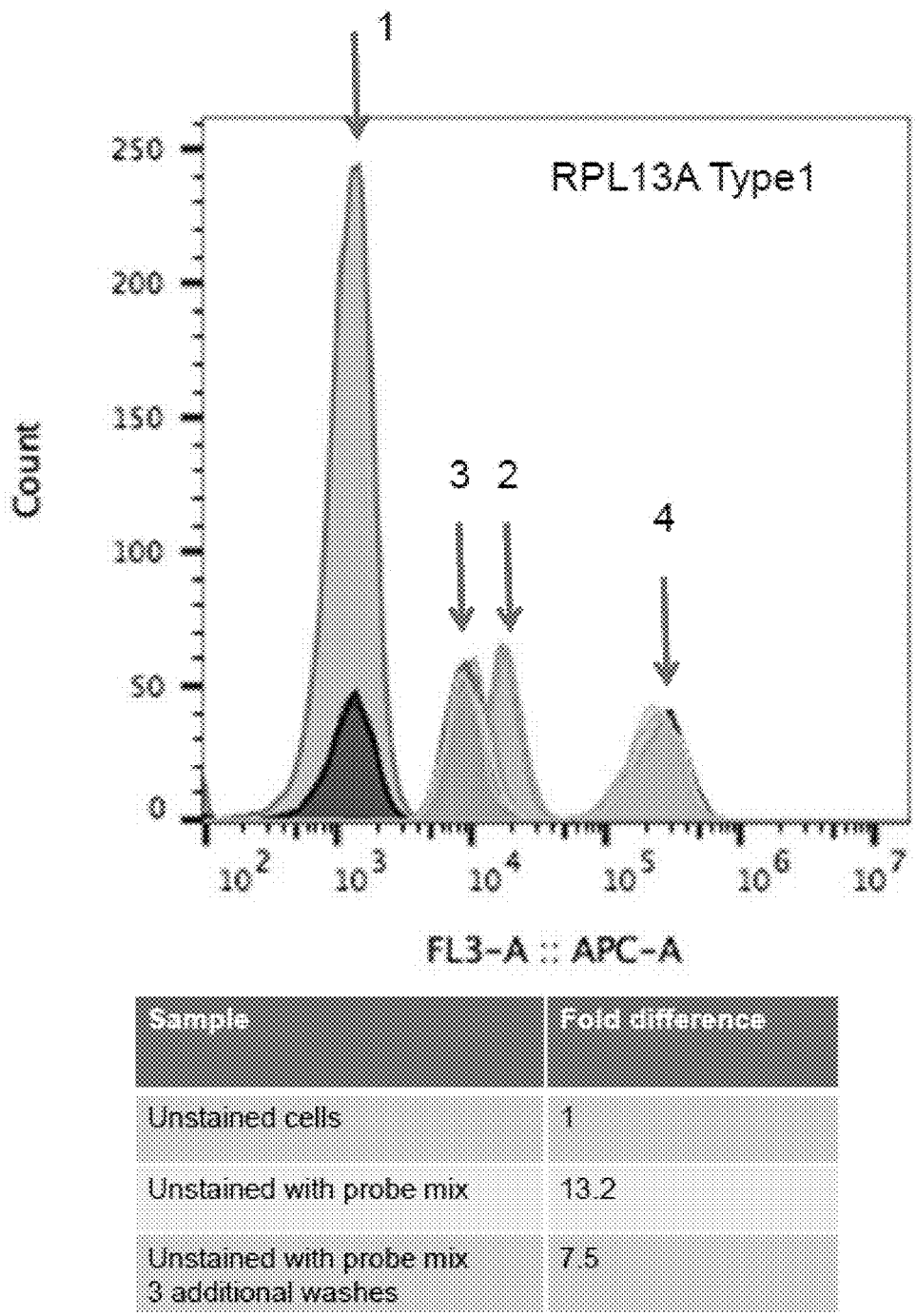
FIG. 20 shows that signal to noise ratio of FlowFISH can be improved by additional washes. Additional washes reduced non-specific staining in samples stained with amplification and label probes but not target-specific probes (peak 3 is lower than peak 2).
Figure 21:
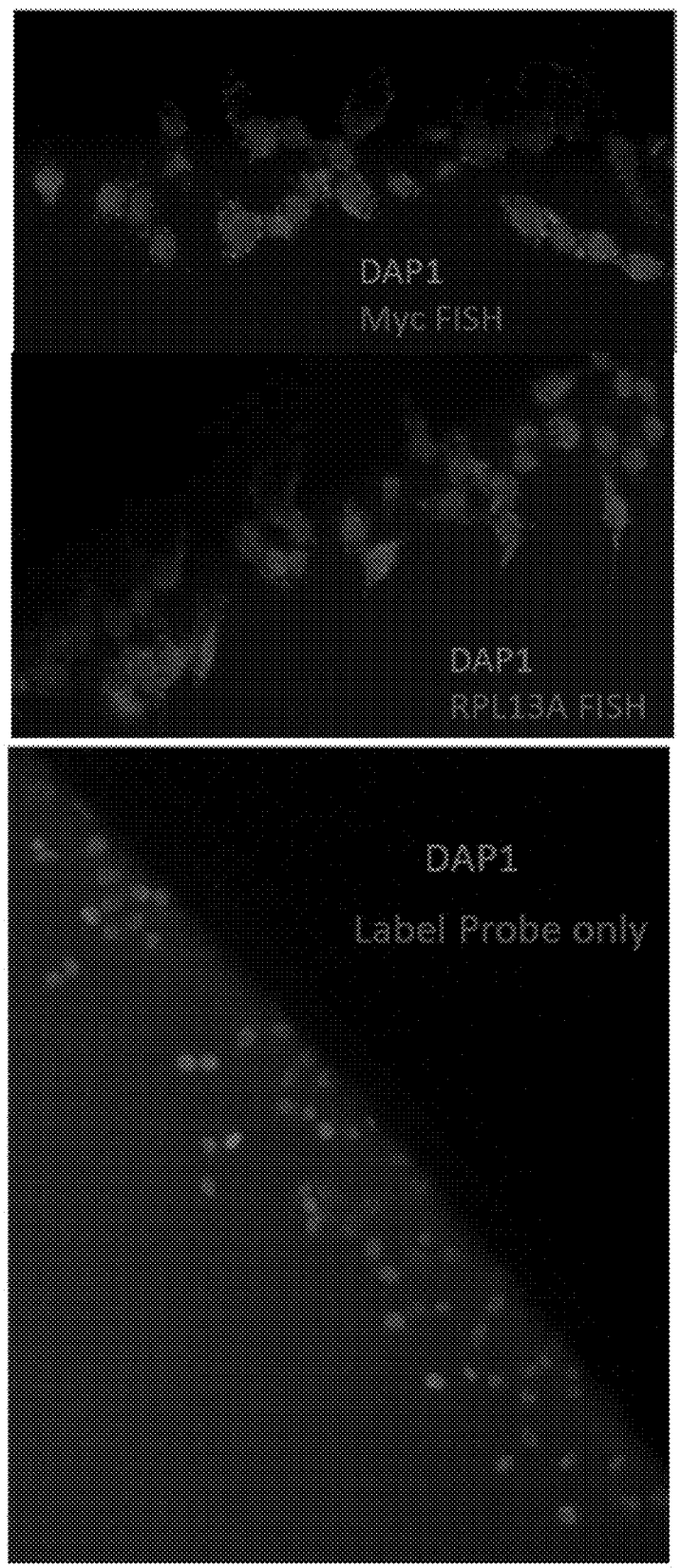
FIG. 21 shows nonspecific signal diffusing in and around nucleus. Nonspecific staining does not arise from probes binding to specific sequences. In similar microscopy-based FISH assay, signal in label probe only (right) is diffuse within cells and does not form puncta associated with binding to specific off-target transcripts.
Figure 22:
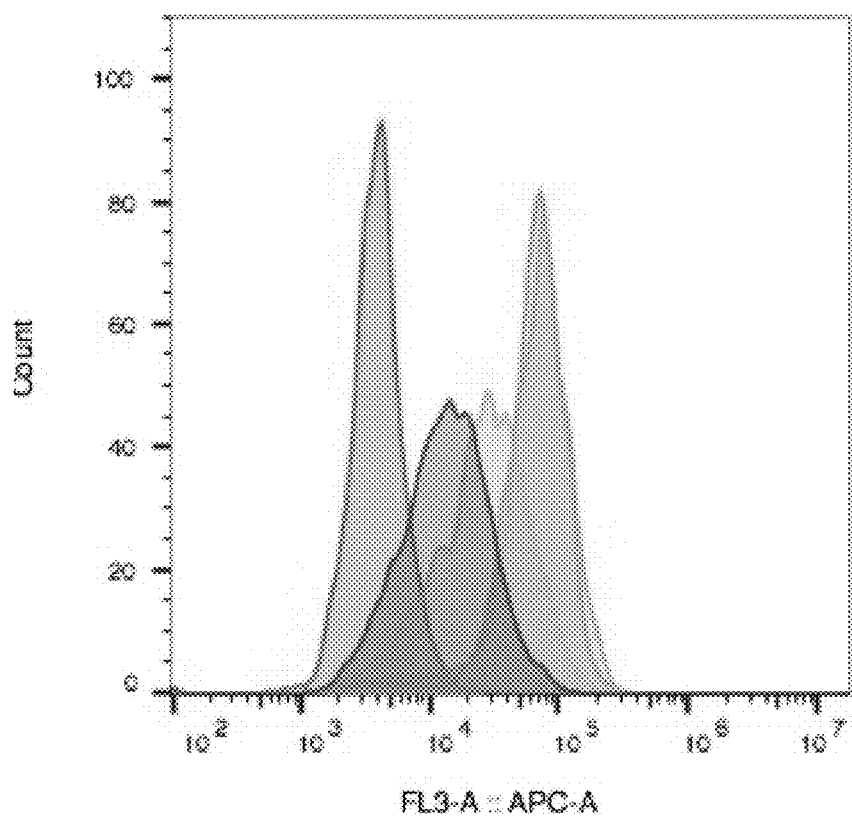
FIG. 22 shows that CRISPRi K562 cell line expressing negative control, non-targeting sgRNAs (NC) appears to express MYC lower than non-engineered, wild type K562s (WT). The fluorescence of cells stained for MYC is higher in WT cells than for NC-sgRNA expressing CRISPRi cells.
Figure 23:
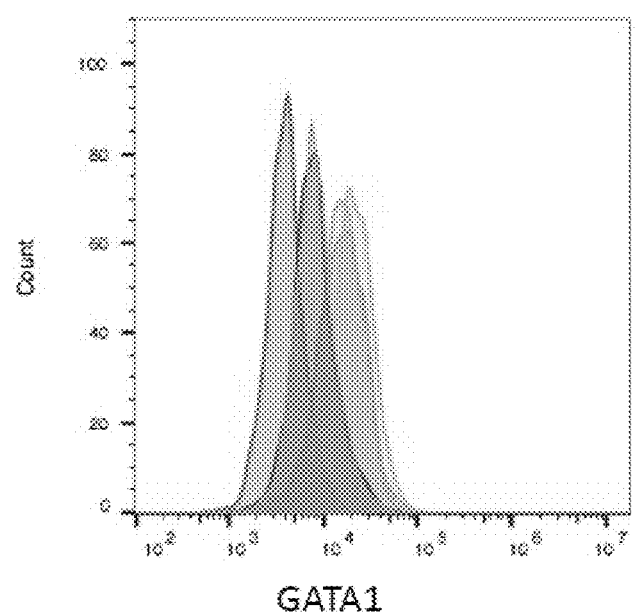
FIG. 23 shows that probes are specific for GATA1 and FlowFISH can detect quantitative changes in transcript abundances. Knockdown of GATA1 by CRISPRi leads to a reduction of GATA1 staining in FlowFISH (left plot: brown and dark green peaks are to the left of the orange and light green). The housekeeping gene RPL13A (right plot) does not change.
Figure 23:
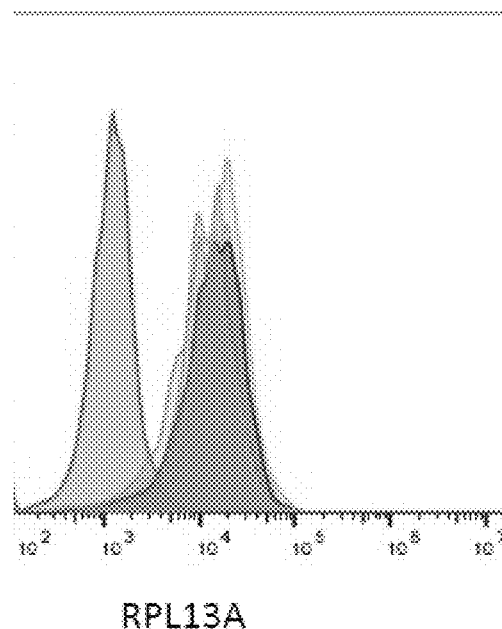
Figure 24:
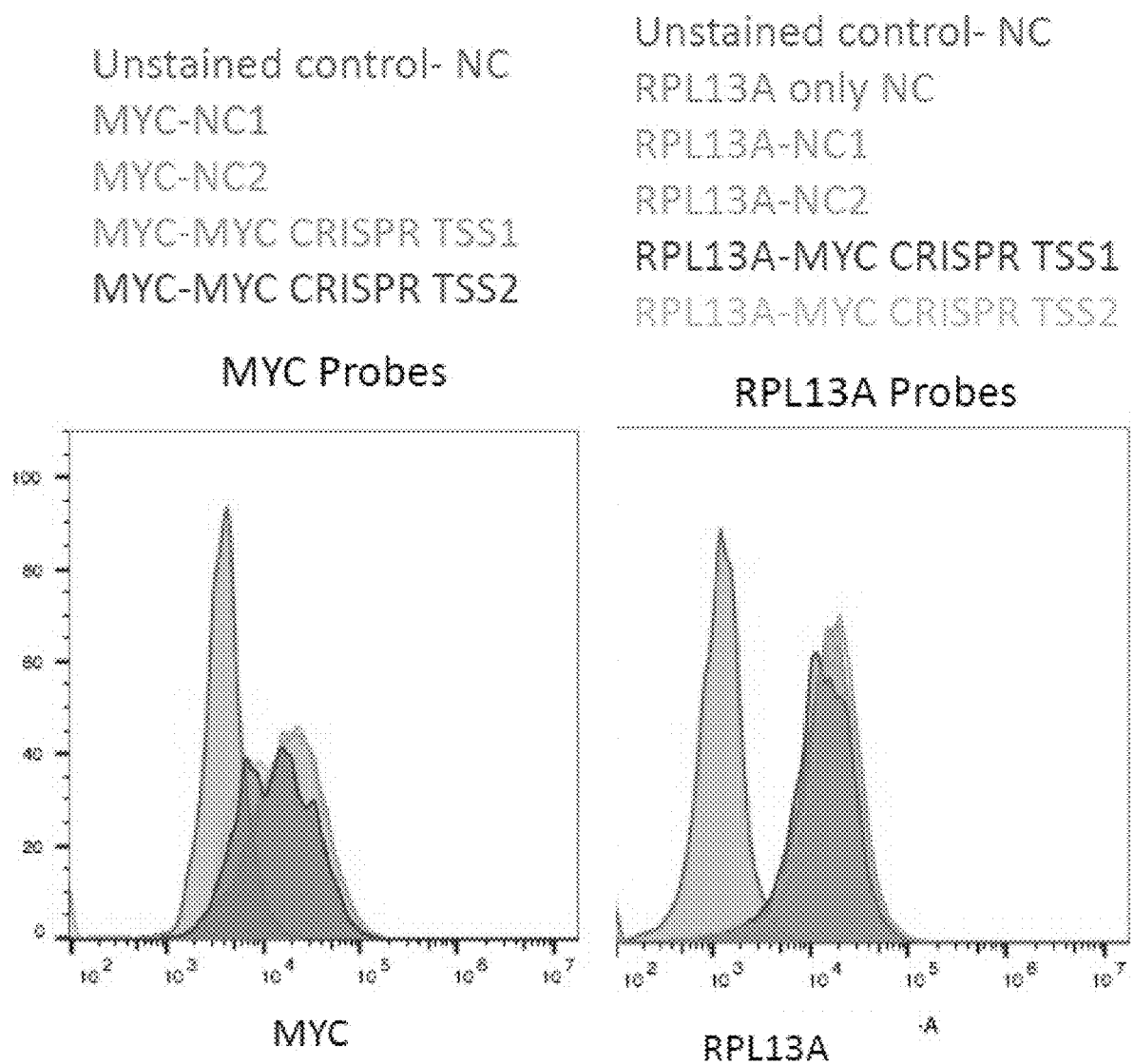
FIG. 24 shows that probes are specific for MYC and FlowFISH can detect quantitative changes in transcript abundances. Knockdown of MYC by CRISPRi leads to a reduction of MYC staining in FlowFISH (left plot: brown and dark green peaks are to the left of the orange and light green). The housekeeping gene RPL13A (right plot) does not change.
Figure 25:
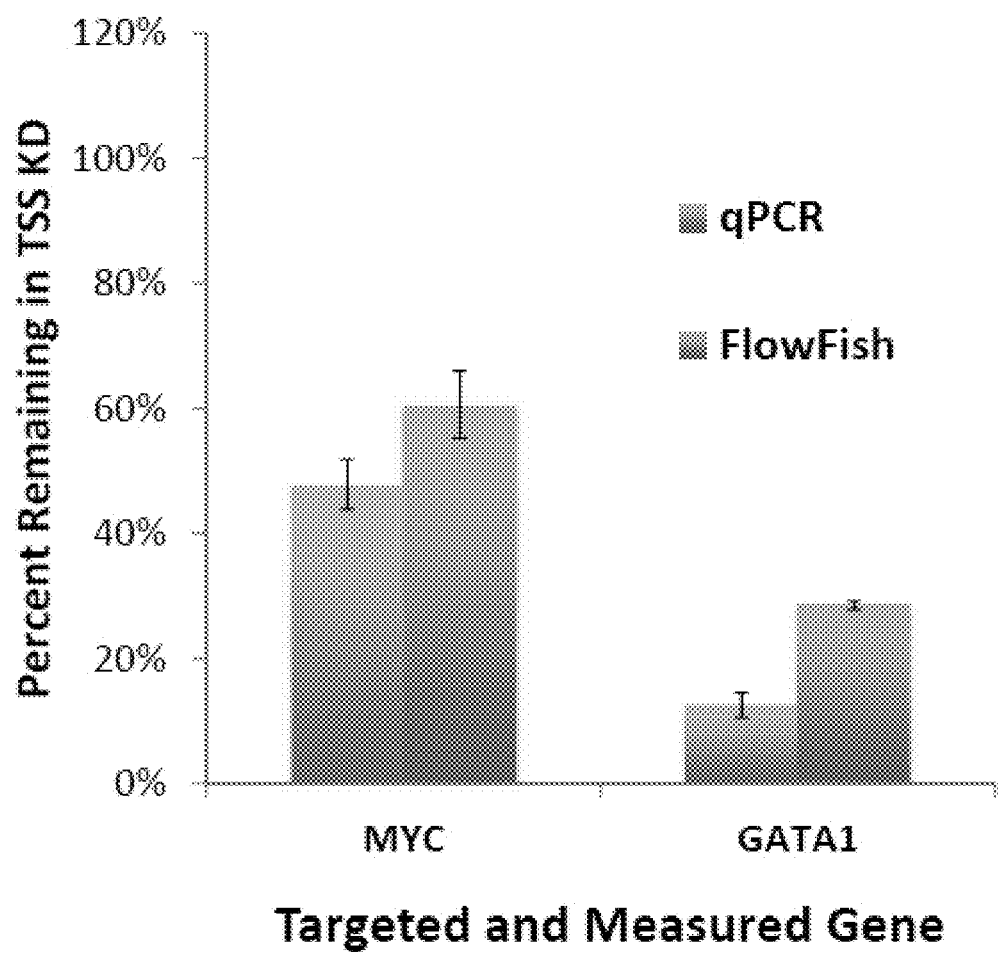
FIG. 25 shows that FlowFISH results correlate with qPCR. Quantifying the data shown in FIGS. 23 and 24, FlowFISH shows a reduction of the CRISPRi-targeted gene (MYC or GATA1) comparable to the reduction measured by qRT-PCR. Bars show percent remaining of the targeted gene in targeted cells relative to cells expressing non-targeting sgRNAs.
Figure 26:
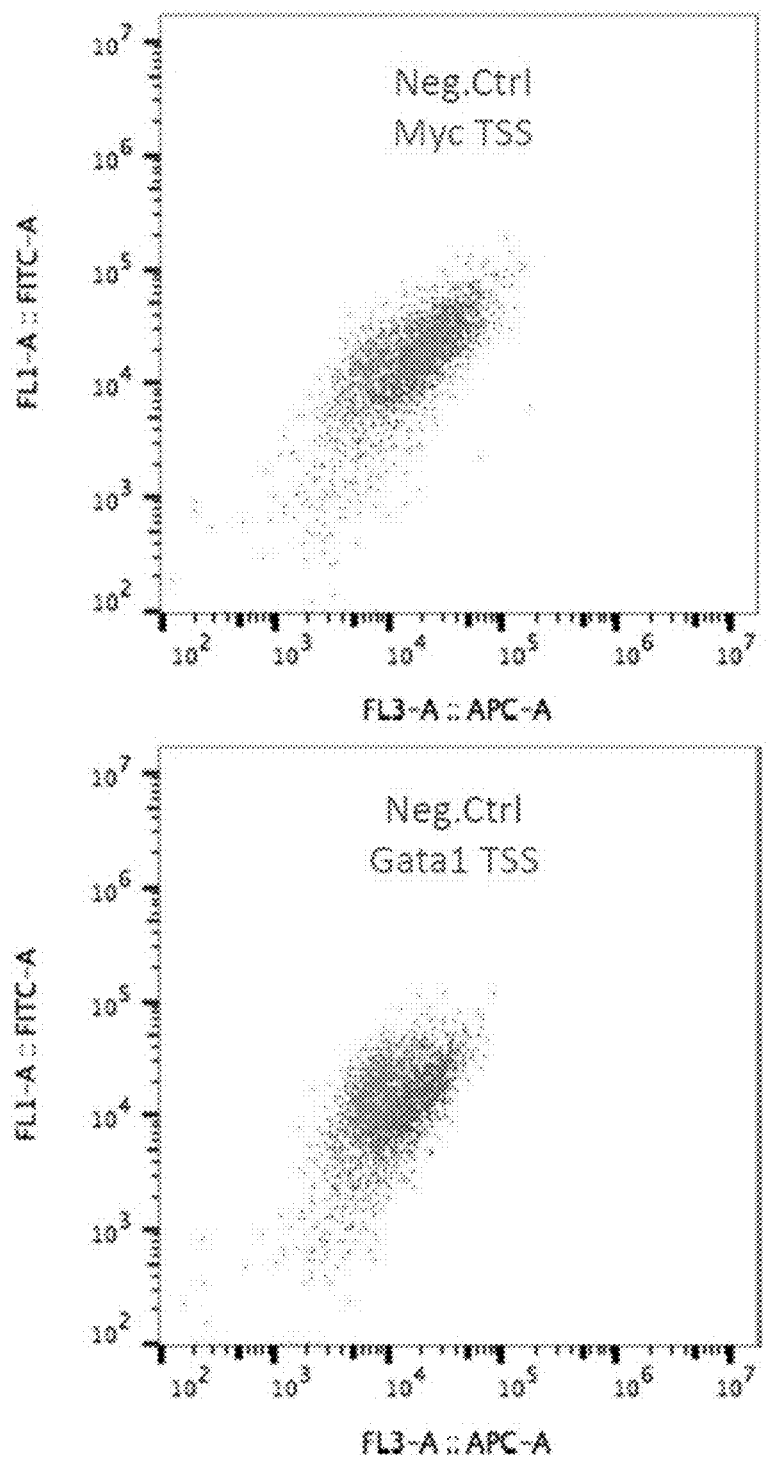
FIG. 26 shows staining is correlated between different transcripts in the same cell.

Example 2—Deleting Genomic Sequences with Paired sgRNA-Expressing Lentiviral Constructs In addition to CRISPR interference, non-coding genomic regions can also be screened by deletion of genomic sequences with paired sgRNA and a catalytically active CRISPR effector protein. For example, FIG. 14 shows a strategy for deleting non-coding genomic regions with paired sgRNAs. Regions of the genome can be deleted with a lentiviral construct expressing a pair of sgRNAs. This requires a construct that can express two sgRNAs at sufficient levels for deletion (see FIG. 15). Readout can be PCR around the deleted region. The deletion shortens the size of the PCR amplicon, so the deletion rate can be estimated from the relative intensities of large (WT) and small (deletion) bands on a gel (FIGS. 16 and 17).

Figure 15:
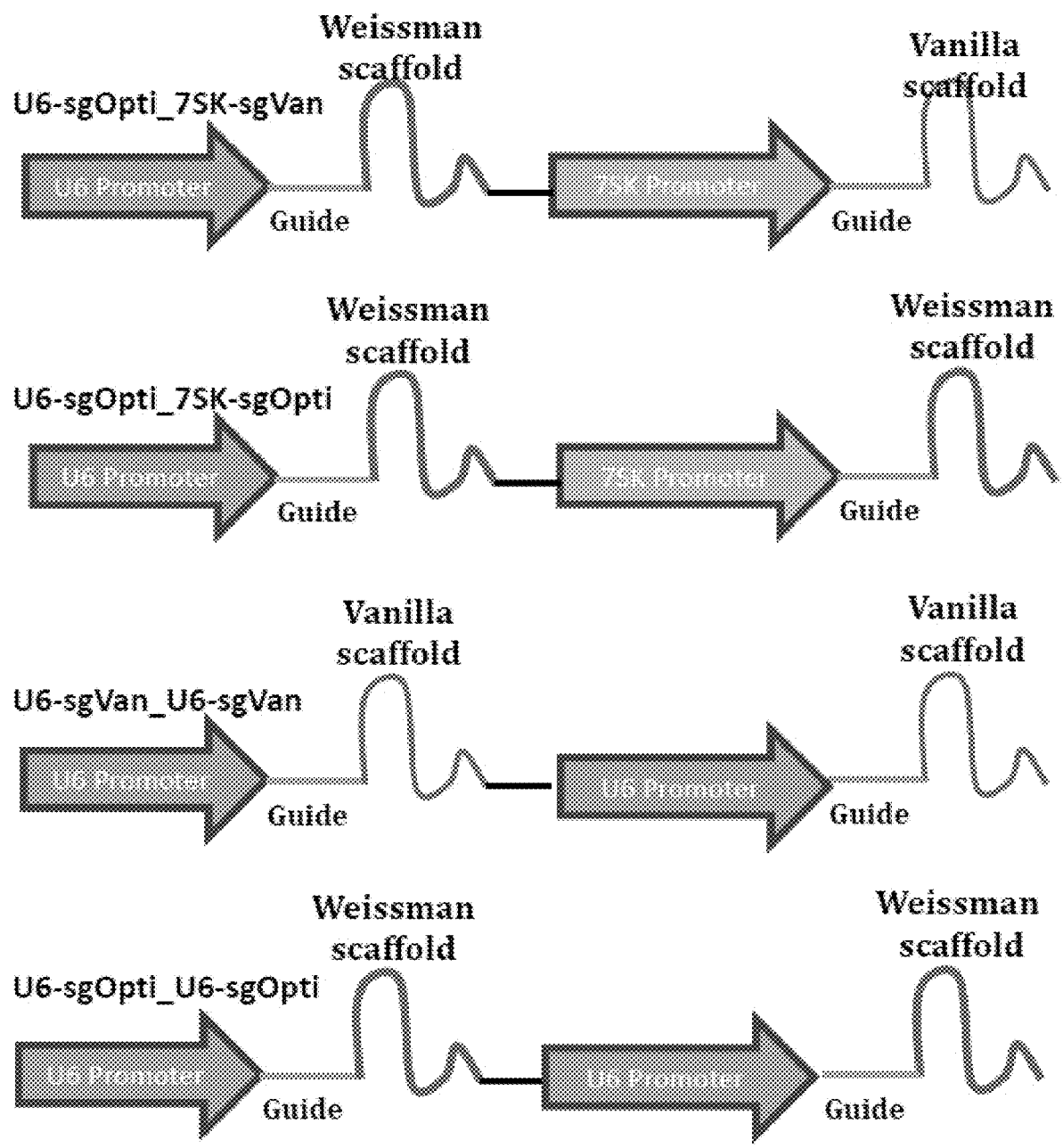
FIG. 15 shows several dual-sgRNA expressing constructs for targeted deletion of genomic sequences. To improve the efficiency of deletion from dual sgRNA-expressing lentiviral constructs, we varied the promoter (human U6 or 7SK) and sgRNA scaffold (Weissman or Vanilla) and compared the deletion efficiency produced by transfection and lentiviral transduction (see FIGS. 16 and 17). The bottom "U6-sgOpti_U6-sgOpti" construct performed the best. The Vanilla scaffold is the commonly used one from Hsu et al., *Nature Biotechnology* 31:827-832 (2013). The Weissman scaffold is optimized to have higher sgRNA expression as described in Chen et al., *Cell* 155:1479-1491 (2013).

Several dual-sgRNA expressing constructs for targeted deletion of genomic sequences are shown in FIG. 15. To improve the efficiency of deletion from dual sgRNA-expressing lentiviral constructs, we varied the promoter (human U6 or 7SK) and sgRNA scaffold (Weissman or Vanilla) and compared the deletion efficiency produced by transfection and lentiviral transduction (FIGS. 16 and 17). The bottom "U6-sgOpti_U6-sgOpti" construct performed the best. The Vanilla scaffold is the commonly used one from Hsu et al., *Nature Biotechnology* 31:827-832 (2013). The Weissman scaffold is optimized to have higher sgRNA expression in B. Chen et al., *Cell* 155:1479-1491 (2013).

Efficient deletion was achieved with U6-sgOpti_U6-sgOpti when used in lentiviral infection in mESCs. The genomic region around the intended deletion was amplified by PCR and run on a gel, as shown in FIG. 16. The deletion is evident by leading to a smaller amplicon. In the schematic lane on the far right, the top band is the size of the WT amplicon and the bottom band is the expected deletion band. The relative intensity of these lanes denotes deletion efficiency. As shown in FIG. 17, in cells transduced with the U6-sgOpti_U6-sgOpti dual sgRNA-expressing lentivirus, about 15% of alleles were deleted in two biological replicates, demonstrating that the U6-sgOpti_U6-sgOpti construct deletes efficiently and can be used for screening of non-coding elements.

The paired-sgRNA cutting strategy can also be combined with FlowFISH to characterize and identify enhancers for any arbitrary gene.

Example 3—FlowFISH-Based Screens Distinguish MYC-Regulatory Elements

Figure 27:
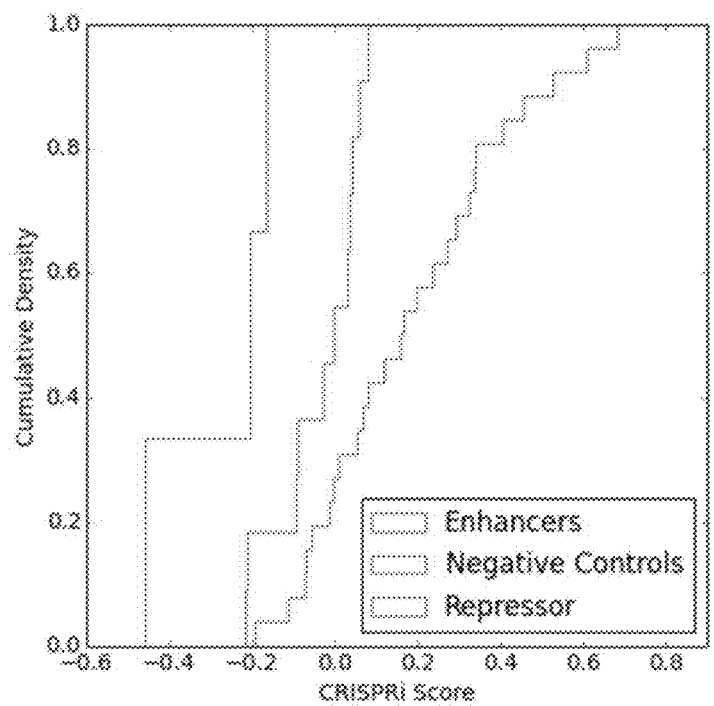
FIG. 27 shows FlowFISH-based screens distinguish MYC-regulatory elements. KRAB-dCas9 expressing K562 cells were infected with sgRNAs against MYC-regulatory elements as well as negative control sgRNAs that target regions near MYC that do not have regulatory function or that have no genomic target. The cells were stained with probes for the MYC transcript, sorted the top and bottom 10% of cells, and sequenced the sgRNAs in these high- and low-MYC populations. The CRISPRi score denotes enrichment of an sgRNA in the low-MYC population. This strategy distinguishes both MYC-expression enhancing elements and MYC-expression repressing elements.

K562 cells expressing KRAB-dCas9 were infected with sgRNAs against MYC-regulatory elements as well as negative control sgRNAs that target regions near MYC that do not have regulatory function or that have no genomic target. We stained the cells with probes for the MYC transcript, sorted the top and bottom 10% of cells, and sequenced the sgRNAs in these high- and low-MYC populations. The CRISPRi score denotes enrichment of an sgRNA in the low-MYC population. This strategy distinguishes both MYC-expression enhancing elements and MYC-expression repressing elements, as shown in FIG. 27.

TABLE 1A

Sequences of qPCR primers.

| Assay | Primer Target | Forward Primer (Fwd) | SEQ ID NO: | Reverse Primer (Rev) | SEQ ID NO: |
|---|---|---|---|---|---|
| ChIP-qPCR | e1 | TGGGGGTACTGGACAGAAAG | 40 | TTCGGTTGGAGCCAGATAAG | 41 |
| ChIP-qPCR | e2 | CCCTTCCTGGAAAGACAACA | 42 | CGCCCAGCCTTATCTGTAAT | 43 |
| ChIP-qPCR | e3 | AACCCAATGCTTTTTCCACA | 44 | CCCTGGATCACTGCTTTTGT | 45 |

TABLE 1A-continued

Sequences of qPCR primers.

| Assay | Primer Target | Forward Primer (Fwd) | SEQ ID NO: | Reverse Primer (Rev) | SEQ ID NO: |
|---|---|---|---|---|---|
| ChIP-qPCR | e4 | GCTCTGCAAGGCTTTCTCAT | 46 | CCCGTCTCCTTGTTTCTCTG | 47 |
| ChIP-qPCR | NS1 | AACCGGTTTTGCGGATAAGT | 48 | ACCAGAGTGGGTGGGAAAG | 49 |
| ChIP-qPCR | SOSTDC1-PosControl1 | TACTGACCCATGAGCACAGC | 50 | CCCCACTGCCATCCTACTTA | 51 |
| ChIP-qPCR | UBC-PosControl2 | CAAACCGAGTTCTCCAG | 52 | GTCTTGAGGCCTTCGCTAAT | 53 |
| ChIP-qPCR | YWHAZ-PosControl3 | GGTTTGAGGGACGTCGTAGT | 54 | CCTTTCTCCTTCCCCTTCTT | 55 |
| ChIP-qPCR | B2M-PosControl4 | GAGGGTCGGGACAAAGTTTA | 56 | CGAAAGAGCGGAAGAGAAAC | 57 |
| ChIP-qPCR | NegControl1 | GGGGGTACAACTGGTTGATG | 58 | GACCTCTGACCCATGAGGAA | 59 |
| ChIP-qPCR | NegControl2 | ATTCAACCCCGAGGAGTTCT | 60 | GGATGTCCGTCTTCACAAGG | 61 |
| RT-qPCR | MYC | TCCCTCCACTCGGAAGGAC | 62 | CTGGTGCATTTTCGGTTGTG | 63 |
| RT-qPCR | PVT1 | GGCTTGTACCCCACAACATC | 64 | GGGTAGATGCAGCTCCTCAG | 65 |
| RT-qPCR | GATA1 | TGCGGCCTCTATCACAAGATG | 66 | CTGCCCGTTTACTGACAATCA | 67 |
| RT-qPCR | HDAC6 | ACACAGTTCACCTTCGACCAG | 68 | CTGTGGTGGACCAGTTAGAGG | 69 |
| RT-qPCR | GAPDH | AGCACATCGCTCAGACAC | 70 | GCCCAATACGACCAAATCC | 71 |
| ddPCR | PVT1 | TTCACAAGCCCCACCA | 72 | CTGGGTCTTCATCCTGA | 73 |
| ddPCR | MYCIntron | GCTTATTTAACGGGCCAC | 74 | TGCAAACATGGGCAGT | 75 |

TABLE 1B

Sequences of sgRNAs.

| Experiment | sgRNA target | sgRNA | sgRNA sequence | SEQ ID NO: |
|---|---|---|---|---|
| CRISPRi | NC | 1 | GATCGCGAGGACCCGTTCCGCC | 76 |
| CRISPRi | NC | 2 | GACTCGTCACATGGGGTTGCGA | 77 |
| CRISPRi | NC | 3 | GACGGAGGAAGTACACAGCT | 78 |
| CRISPRi | NC | 4 | GGAGAGGCCCCTGTCGCGT | 79 |
| CRISPRi | NC | 5 | GATTGGTTAGGAGAGTGTGTAT | 80 |
| CRISPRi | e-GATA1 | 1 | GGGCAGATAAGGGAATCAGT | 81 |
| CRISPRi | e-GATA1 | 2 | GCGCTCAGGAAGAGAAGCCA | 82 |
| CRISPRi | e-HDAC6 | 1 | GCGGAGAGATAAGCAGTCCGG | 83 |
| CRISPRi | e-HDAC6 | 2 | GTATAGCCCGGTAGGAAATGG | 84 |
| CRISPRi | GATA1-TSS | 1 | GGGTAGGGGCAGCAGGCCCA | 85 |
| CRISPRi | GATA1-TSS | 2 | GGTTCGGCCGCCTTGGGGATG | 86 |
| CRISPRi | HDAC6-TSS | 1 | GAGTCCCCTGAGGAGCGGGGC | 87 |
| CRISPRi | HDAC6-TSS | 2 | GTGGAGTCGAAACCGGGGTC | 88 |
| CRISPRi | e1 | 1 | GGAGCCAGATAAGTCAACGG | 89 |
| CRISPRi | e1 | 2 | GTGTGTCCCACCTGATTACT | 90 |
| CRISPRi | e2 | 1 | GGAATCGACCTTCCTTGAGG | 91 |
| CRISPRi | e2 | 2 | GCCTGGAAAGACAACAGCTTG | 92 |
| CRISPRi | e3 | 1 | GACCACGGCAGCCTGCTCTGA | 93 |
| CRISPRi | e3 | 2 | GACAACCGAGCTGCCCTGTA | 94 |
| CRISPRi | e4 | 1 | GAGCTTCCGTGGGCCCCTCC | 95 |
| CRISPRi | e4 | 2 | GCCTTGCCCTGCTTCTATCAG | 96 |
| CRISPRi | e5 | 1 | GCCCATTGGGGTAGAGGCTG | 97 |
| CRISPRi | e5 | 2 | GTGGAAAACCACCGTAAAGGA | 98 |
| CRISPRi | e6 | 1 | GCTGGTGTCAGCCTCACAAC | 99 |

TABLE 1B-continued

Sequences of sgRNAs.

| Experiment | sgRNA target | sgRNA | sgRNA sequence | SEQ ID NO: |
|---|---|---|---|---|
| CRISPRi | e6 | 2 | GCTTGGTGCAGACCGAGACCA | 100 |
| CRISPRi | e7 | 1 | GCGCCCATGAATGTATAGCAG | 101 |
| CRISPRi | e7 | 2 | GCTGGAGTTGAACTTAGCTGA | 102 |
| CRISPRi | MYC-TSS | 1 | GCTGTAGTAATTCCAGCGAG | 103 |
| CRISPRi | MYC-TSS | 2 | GCGCTGCGGGCGTCCTGGGAA | 104 |
| CRISPRi | NS1 | 1 | GACAAGCTGCAAGGTGTAAAT | 105 |
| CRISPRi | NS1 | 2 | GCAGCTGATGGTATCCACTAG | 106 |
| MYC Tag Knock-In | MYC Intron | 1 | GACGGGCCACTCTTATTAGGA | 107 |
| Deletion | e2 | 1 | GATGACAAAACTACGACGTAC | 108 |
| Deletion | e2 | 2 | GTTGTCATCTTCAGGCAACCC | 109 |
| Deletion | e2 | 3 | GGGGCGGGCGGGCACGAAT | 110 |
| Deletion | e2 | 4 | GCTGGGGACACAGGGTGCCAT | 111 |
| Deletion | e3 | 1 | GAAGGCTCACTCCGCACCCTC | 112 |
| Deletion | e3 | 2 | GGTACAAGATTGTAGGAATGC | 113 |
| Deletion | e3 | 3 | GAGGGCAGCTCGGTTGTCACA | 114 |
| Deletion | e3 | 4 | GCGCTCCTCATTACGCCTTAC | 115 |
| Deletion | e4 | 1 | GGAGAGCAGTGAGTGACCTCA | 116 |
| Deletion | e4 | 2 | GGCTCTCCTGGGTACTATCCC | 117 |
| Deletion | e4 | 3 | GCAGCATTCAGGGCAAATGAG | 118 |
| Deletion | e4 | 4 | GGACACTGCTGTATCCCCTGA | 119 |

TABLE 1C

Sequences of siRNAs.

| siRNA | Catalog Number |
|---|---|
| PVT1_siRNA1 | N-029357-09 |
| PVT1_siRNA2 | N-029357-12 |
| MYC_siRNA | J-03282-26 |
| GATA1_siRNA | J-009610-08 |
| Ctrl_siRNA1 | D-001320-01 |
| Ctrl_siRNA2 | D-001320-02 |

TABLE 1D

Sequences of oligos.

| Name | Oligo Sequence | SEQ ID NO: | Note |
|---|---|---|---|
| Custom sgRNA Library Oligonucleotide | TCCAATGTCCCACGACGTATCTTGTGGAAAGG ACGAAACACCGNNNNNNNNNNNNNNNNNNNN NNGTTTAAGAGCTATGCTGGAAACAGCATAGG CCAAAACCCTCCGATG | 120 | NNNNNNNNNNNNN NNNNNNN denotes sgRNA sequence |
| sgRNA Library Fwd | GGCTTTATATATCTTGTGGAAAGGACGAAACA CCG | 121 | |
| sgRNA Library Rev | CTTATTTAAACTTGCTATGCTGTTTCCAGCATAG CTCTTAAAC | 122 | |
| sgRNA Sequencing Library Fwd | AATGATACGGCGACCACCGAGATCTACAC NNNN CGATTTCTTGGCTTTATATATCTTGTG | 123 | NNNN denotes sequencing index |
| sgRNA Sequencing Library Rev | CAAGCAGAAGACGGCATACGAGATNNNNNNN NNCGGTGCCACTTTTTCAAGTTG | 124 | NNNNNNNN denotes sequencing index |
| Illumina Sequencing Primer | CGATTTCTTGGCTTTATATATCTTGTGGAAAGG ACGAAACACCG | 125 | |
| Illumina Index Sequencing Primer | AAGGCTAGTCCGTTATCAACTTGAAAAAGTGG CACCG | 126 | |

TABLE 1E

Sequences of other primers.

| Experiment | Locus | PCR Experiment | Forward Primer (Fwd) | Reverse Primer (Rev) |
|---|---|---|---|---|
| Luciferase Assay | e-GATA1 | Clone from K562 gDNA | caatgtatcttatcatgtctgTGGAAAACG TTTGTTTCTGAGGGCAAACG (SEQ ID NO: 127) | GCTGGCCACGACGGGCGTTCCTT GC CCTGCTGGCACACCATAAAT (SEQ ID NO: 128) |
| Luciferase Assay | e-HDAC6 | Clone from K562 gDNA | caatgtatcttatcatgtctgTGGAAAAC G CAACAGAAAAATGGGCCTTG (SEQ ID NO: 129) | GCTGGCCACGACGGGCGTTCCTT GC CAGGAAACACTGGCCGAATA (SEQ ID NO: 130) |
| Luciferase Assay | e1 | Clone from K562 gDNA | caatgtatcttatcatgtctgTGGAAAAC G TCCTTTGGACCTGAGTGGTG (SEQ ID NO: 131) | GCTGGCCACGACGGGCGTTCCTT GC AATCCTTGGGTGGGAATACG (SEQ ID NO: 132) |
| Luciferase Assay | e2 | Clone from K562 gDNA | caatgtatcttatcatgtctgTGGAAAAC G GAAGGGGTCTCCTGTACGTC (SEQ ID NO: 133) | GCTGGCCACGACGGGCGTTCCTTGC CATCTAAATTCCTCCCCTATTCG (SEQ ID NO: 134) |
| Luciferase Assay | e3 | Clone from K562 gDNA | caatgtatcttatcatgtctgTGGAAAAC G TGTCCCCTTGGTTTCCTCTT (SEQ ID NO: 135) | GCTGGCCACGACGGGCGTTCCTT GC ACCAAGTATGGTGCCTGTGC (SEQ ID NO: 136) |
| Luciferase Assay | e4 | Clone from K562 gDNA | caatgtatcttatcatgtctgTGGAAAAC G GGACAGGGACATGGTCAGAA (SEQ ID NO: 137) | GCTGGCCACGACGGGCGTTCCTT GC GGCACACAATAGGCTTTCCA (SEQ ID NO: 138) |
| Luciferase Assay | e5 | Clone from K562 gDNA | tatcttatcatgtctgTGGAAAACG AGTGGGGACATGATTCCAAA (SEQ ID NO: 139) | GCTGGCCACGACGGGCGTTCCTT GC GCCATGACGGTGTTTATCGT (SEQ ID NO: 140) |
| Luciferase Assay | e6 | Clone from K562 gDNA | caatgtatcttatcatgtctgTGGAAAAC G CCTTGCCATGCTCCAAGTTA (SEQ ID NO: 141) | GCTGGCCACGACGGGCGTTCCTT GC CCAGAAACCTCCACCCTAGC (SEQ ID NO: 142) |
| Luciferase Assay | e7 | Clone from K562 gDNA | caatgtatcttatcatgtctgTGGAAAAC G GTGCCTGTCACCTTCTGCAT (SEQ ID NO: 143) | GCTGGCCACGACGGGCGTTCCTT GC GTTTCACAGCATGTGCTCCA (SEQ ID NO: 144) |
| Genetic Deletions | MYC Intron | PCR to prepare for sequencing | GACGTGTGCTCTTCCGATCT GGCTGGATACCTTTCCCATT (SEQ ID NO: 145) | CACGACGCTCTTCCGATCT CTGCAAACATGGGCAGTCTA (SEQ ID NO: 146) |
| Genetic Deletions | MYC Intron | ssDNA oligo for knocking in tag polymorphisms | GCAGTCTAAGGGGAAGGGATGGGAGGAAACGCTAAAGCCCAAGGTTT CAGAGGTGATGAGCTCCCAAATCTCTCCAGATCTGCTATCTCTCNNNNC TAATAAGAGTGGCCCGTTAAATAAGCTGCCAATGAAAATGGGAAAGGT ATCCAGCCGCCCACTTTTG (SEQ ID NO: 147) | |
| Genetic Deletions | e2 | First genotyping PCR | ATCCCTAATGCCTGCCTTTT (SEQ ID NO: 148) | CTCTCTTGGGTCTCCAGTGC (SEQ ID NO: 149) |
| Genetic Deletions | e2 | Second genotyping PCR (nested) for sequencing | GACGTGTGCTCTTCCGATCT ATCCCTAATGCCTGCCTTTT (SEQ ID NO: 150) | CACGACGCTCTTCCGATCT AAACTCCTTCCTTCCCCTGA (SEQ ID NO: 151) |
| Genetic Deletions | e2 | Screen for inversions | TCAATTTCCTGGACACTTCAAA (SEQ ID NO: 152) | GGAAAGGAGGCAGGAAACAG (SEQ ID NO: 153) |
| Genetic Deletions | e3 | First genotyping PCR | ACCAAGTATGGTGCCTGTGC (SEQ ID NO: 154) | TGTCCCCTTGGTTTCCTCTT (SEQ ID NO: 155) |
| Genetic Deletions | e3 | Second genotyping PCR (nested) for sequencing | GACGTGTGCTCTTCCGATCT CCACTTGTTTGCCCTACTTATCTT (SEQ ID NO: 156) | CACGACGCTCTTCCGATCT GAGCAGCTATGAATCTGAGCAA (SEQ ID NO: 157) |
| Genetic Deletions | e4 | First genotyping PCR | GGCACACAATAGGCTTTCCA (SEQ ID NO: 158) | GGACAGGGACATGGTCAGAA (SEQ ID NO: 159) |
| Genetic Deletions | e4 | Second genotyping PCR (nested) for sequencing | GACGTGTGCTCTTCCGATCT TTGAGCATATGAGGCTGGAA (SEQ ID NO: 160) | CACGACGCTCTTCCGATCT ATCATCGGTCATCTCCTTGC (SEQ ID NO: 161) |

TABLE 1F

Sequences of ddPCR probes.

| Probe | Sequence | SEQ ID NO: | Fluorophore |
|---|---|---|---|
| PVT1-C | TCACCCCAGGAA C GCT | 162 | HEX |
| PVT1-T | ATCACCCCAGGAA T GCTT | 163 | FAM |
| MYCIntron-CTAA | CTTATTAG CTAA GAGAGATAGC | 164 | FAM |
| MYCIntron-CCCG | TATTAG CCCG GAGAGATAG | 165 | HEX |
| MYCIntron-ATCG | TTATTAG ATCG GAGAGATAGC | 166 | FAM |

Example 4—Additional FlowFISH-Based Study

Figure 29:
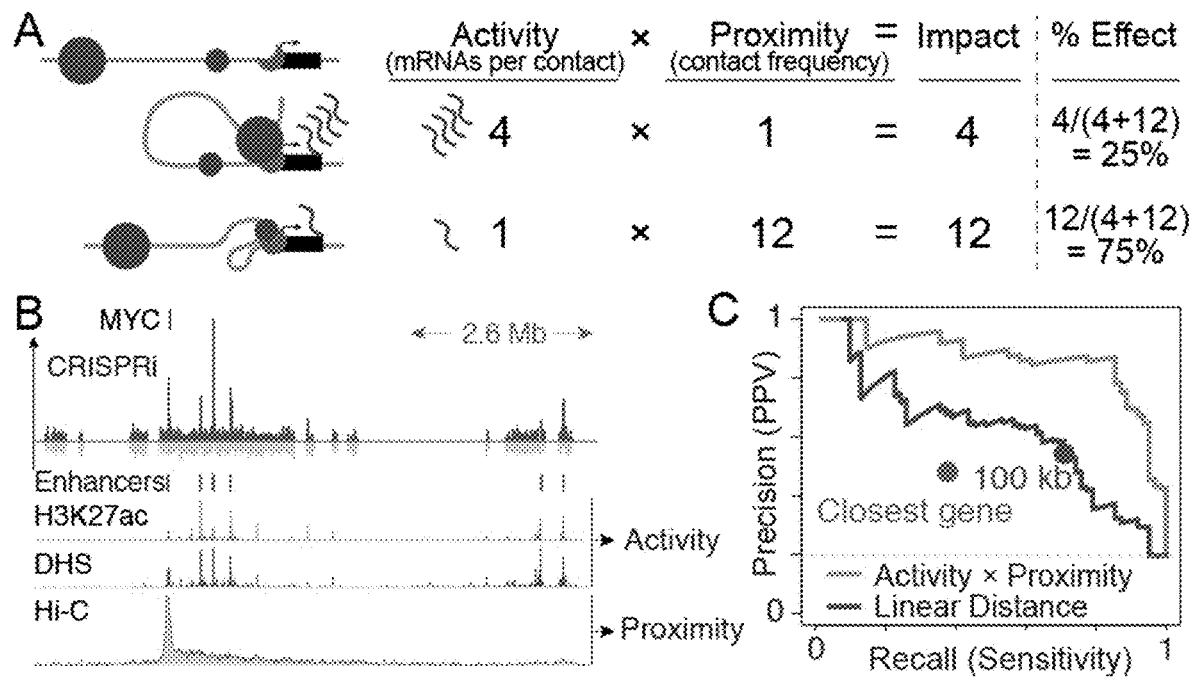
FIG. 29: (A) Example of Activity×Proximity Model in a locus with two enhancers (red dot=enhancer; gray dot=promoter; purple=mRNA). (B) CRISPRi tiling data and chromatin state maps in MYC locus. (C) Precision-recall curve for predicting 318 tested gene-RE connections. For comparison, the performance of alternative predictors is shown assigning enhancers to regulate the closest expressed gene or all expressed genes within 100 kb.

To measure the expression of a gene of interest, the inventors used fluorescence in situ hybridization (FISH) to quantitatively label single cells according to their expression of an RNA of interest; (ii) sorted labeled cells with fluorescence-activated cell sorting (FACS) into 6 bins based on RNA expression; (iii) used high-throughput sequencing to determine the frequency of gRNAs from each bin; and (iv) compared the relative abundance of gRNAs in each bin to infer the effects of gRNAs on RNA expression (FIG. 29A). This approach accurately assessed the effects of gRNAs on gene expression for genes of varying abundance levels, as validated by RT-qPCR in the same cells (FIG. 29B), including GATA1, MYC, and other genes listed below. The inventors have applied this approach at scale to identify all REs within 2 Mb that control GATA1 expression in K562 cells, and found that the results correlated extremely well with previous results using cellular proliferation as a readout (FIG. 29C).

Genes validated with FlowFISH method: GATA1, MYC, SLC38A5, RBM3, NFE2, KLF1, HNRNPA1, PQBP1, EBP, SUV39H1, PIM2, OTUD5, HDAC6, RPL13A, TBP.

Example 5—Identification of Enhancers Relevant for Controlling Lipid Levels and Coronary Artery Disease Risks As a pilot demonstration of the predictive algorithm for identifying enhancer-gene pairs, the inventors generated and curated a list of experimentally measured enhancer-promoter connections; implemented the Activity×Proximity model using this dataset, and applied this model to predict enhancers that regulate genes that control lipid levels and that have been associated through GWAS with coronary artery disease.

To gain insights into global patterns of functional enhancer-promoter connections, the inventors generated and assembled enhancer inhibition experiments in two cell types (K562 erythroleukemia cells and mouse embryonic stem cells (mESCs)). These experiments included:
- (i) 100s of putative regulatory elements that the inventors tested by CRISPRi tiling screens, 12 of which were found to affect MYC, HDAC6, or GATA1 expression. The inventors profiled a subset of these enhancers further here to identify their effects on other nearby genes in addition to MYC and GATA1;
- (ii) 18 knockouts of lncRNA and mRNA promoters in mESCs for which the inventors examined the expression of every gene within 1 Mb, 9 of which were previously found to regulate the expression of a neighboring gene;
- (iii) 2 newly generated knockouts of putative enhancers in mESCs, which regulated 1 or 6 genes within 1 Mb of the deletion; and
- (iv) a collection of other experiments, including both deletions and CRISPRi inhibition of 20 putative regulatory elements in K562s and mESCs, some of which assayed gene expression comprehensively through RNA-seq and others of which used targeted assays to examine the expression of one or several nearby genes.

Altogether, the dataset included 318 experimentally tested enhancer-gene connections.

An example Activity×Proximity Model was built using Hi-C, H3K27ac, and DNase-I hypersensitivity data from K562 and mESC cells. Hi-C data at 5-kb resolution was normalized within each promoter's row so that the bin corresponding to the promoter of the gene itself equaled 100. H3K27ac and DNase I hypersensitivity counts were calculated in 500 bp windows centered on narrowPeaks called by the ENCODE project. The specific form of this example model is:

$$\% \text{ Effect } \Delta X_{e,g} = \frac{A_e \times P_{e,g}}{\sum_e A_e \times P_{e,g}}$$

$$\text{Activity } A_e = \left(\sqrt[i+R]{H3K27ac_e \times DHS_e^R}\right)^y$$

$$\text{Proximity } P_{e,g} = (\max(HiC_{e,g}, HiC\text{Max}) + HiCPseudoCount)^z$$

For each gene g, all enhancers e within 5 Mb of the gene were considered. The model was trained through a gradient descent approach, attempting to maximize the positive predictive value at a sensitivity of 85%. The following parameters were found to give optimal performance:
R=2.053001237994863;
y=2.8001244799459735;
z=2.6847081795050385;
HiCMax=29.82320984443161; and
HiCPseudoCount=3.82659479457259.

Using this model, the inventors incorporated H3K27ac and DHS data from HepG2 (an immortalized liver carcinoma cell line), and used an average Hi-C profile as previously described (Fulco et al., Science 2016) because Hi-C data from HepG2 cells were not available. The inventors predicted enhancer regulation for each gene in the genome, and identified enhancers predicted to regulate genes that play critical roles in coronary artery disease by controlling lipid phenotypes (see Table 2). It is believed that editing these enhancers—either genetically or epigenetically—can modulate the expression of the specified target genes and thus impact coronary artery disease susceptibility.

TABLE 2

Putative Enhancers

| No. | Enhancer Location | | Target Gene |
|---|---|---|---|
| 1 | chr11 | 116679399 116679449 | APOA4 |
| 2 | chr11 | 116679899 116679939 | APOA4 |
| 3 | chr11 | 116679579 116679869 | APOA4 |
| 4 | chr11 | 116678959 116679389 | APOA4 |

TABLE 2-continued

Putative Enhancers

| No. | Enhancer Location | | Target Gene |
|---|---|---|---|
| 5 | chr11 | 116679399 116679449 | APOC3 |
| 6 | chr11 | 116679899 116679939 | APOC3 |
| 7 | chr11 | 116679579 116679869 | APOC3 |
| 8 | chr11 | 116678959 116679389 | APOC3 |
| 9 | chr11 | 116679399 116679449 | APOA5 |
| 10 | chr11 | 116679899 116679939 | APOA5 |
| 11 | chr11 | 116679579 116679869 | APOA5 |
| 12 | chr11 | 116678959 116679389 | APOA5 |
| 13 | chr12 | 123850132 123850212 | RILPL2 |
| 14 | chr12 | 123850432 123850452 | RILPL2 |
| 15 | chr12 | 123850392 123850422 | RILPL2 |
| 16 | chr12 | 123850362 123850382 | RILPL2 |
| 17 | chr12 | 123850282 123850302 | RILPL2 |
| 18 | chr12 | 123848302 123848362 | RILPL2 |
| 19 | chr12 | 123849282 123850112 | RILPL2 |
| 20 | chr12 | 123933912 123933982 | RILPL2 |
| 21 | chr12 | 123934012 123934032 | RILPL2 |
| 22 | chr12 | 123933032 123933222 | RILPL2 |
| 23 | chr1 | 156426285 156426875 | APOA1BP |
| 24 | chr1 | 156426955 156427635 | APOA1BP |
| 25 | chr2 | 21279047 21279547 | APOB |
| 26 | chr9 | 2017334 2017434 | VLDLR |
| 27 | chr9 | 2017534 2017704 | VLDLR |
| 28 | chr9 | 2017074 2017094 | VLDLR |
| 29 | chr9 | 2016564 2016814 | VLDLR |
| 30 | chr9 | 2015964 2016004 | VLDLR |
| 31 | chr9 | 2014844 2015394 | VLDLR |
| 32 | chr9 | 2015444 2015464 | VLDLR |
| 33 | chr9 | 2017444 2017524 | VLDLR |
| 34 | chr9 | 2016854 2017024 | VLDLR |
| 35 | chr9 | 2016024 2016134 | VLDLR |
| 36 | chr9 | 3527090 3527110 | VLDLR |
| 37 | chr9 | 3525520 3525640 | VLDLR |
| 38 | chr9 | 3527120 3527140 | VLDLR |
| 39 | chr9 | 3525750 3525810 | VLDLR |
| 40 | chr9 | 3525820 3526950 | VLDLR |
| 41 | chr13 | 48987233 48987423 | LPAR6 |
| 42 | chr1 | 109841329 109841359 | SORT1 |
| 43 | chr1 | 109841789 109842629 | SORT1 |
| 44 | chr1 | 109841369 109841389 | SORT1 |
| 45 | chr1 | 109841449 109841499 | SORT1 |
| 46 | chr1 | 156629825 156630395 | APOA1BP |
| 47 | chr1 | 156631725 156631945 | APOA1BP |
| 48 | chr1 | 156631495 156631585 | APOA1BP |
| 49 | chr1 | 156631135 156631445 | APOA1BP |
| 50 | chr9 | 683428 683458 | VLDLR |
| 51 | chr9 | 682608 683128 | VLDLR |
| 52 | chr10 | 91011411 91011941 | LIPA |
| 53 | chr11 | 116663111 116663181 | APOA5 |
| 54 | chr11 | 116663201 116663441 | APOA5 |
| 55 | chr11 | 116662371 116662441 | APOA5 |
| 56 | chr11 | 116662051 116662231 | APOA5 |
| 57 | chr11 | 116699717 116700107 | APOC3 |
| 58 | chr11 | 116700227 116700667 | APOC3 |
| 59 | chr11 | 116700147 116700217 | APOC3 |
| 60 | chr11 | 116699717 116700107 | APOA4 |
| 61 | chr11 | 116700227 116700667 | APOA4 |
| 62 | chr11 | 116700147 116700217 | APOA4 |
| 63 | chr11 | 116699717 116700107 | APOA1 |
| 64 | chr11 | 116700227 116700667 | APOA1 |
| 65 | chr11 | 116700147 116700217 | APOA1 |
| 66 | chr11 | 116706696 116706966 | APOA4 |
| 67 | chr11 | 116707066 116707146 | APOA4 |
| 68 | chr11 | 116708126 116708826 | APOA4 |
| 69 | chr11 | 116703086 116703286 | APOA4 |
| 70 | chr11 | 116704586 116704606 | APOA4 |
| 71 | chr11 | 116706056 116706076 | APOA4 |
| 72 | chr11 | 116706696 116706966 | APOC3 |
| 73 | chr11 | 116707066 116707146 | APOC3 |
| 74 | chr11 | 116708126 116708826 | APOC3 |
| 75 | chr11 | 116703086 116703286 | APOC3 |
| 76 | chr11 | 116704586 116704606 | APOC3 |
| 77 | chr11 | 116706056 116706076 | APOC3 |
| 78 | chr11 | 116706696 116706966 | APOA5 |
| 79 | chr11 | 116707066 116707146 | APOA5 |
| 80 | chr11 | 116708126 116708826 | APOA5 |
| 81 | chr11 | 116703086 116703286 | APOA5 |
| 82 | chr11 | 116704586 116704606 | APOA5 |
| 83 | chr11 | 116706056 116706076 | APOA5 |
| 84 | chr11 | 116706696 116706966 | APOA1 |
| 85 | chr11 | 116707066 116707146 | APOA1 |
| 86 | chr11 | 116708126 116708826 | APOA1 |
| 87 | chr11 | 116703086 116703286 | APOA1 |
| 88 | chr11 | 116704586 116704606 | APOA1 |
| 89 | chr11 | 116706056 116706076 | APOA1 |
| 90 | chr12 | 123920763 123920843 | RILPL2 |
| 91 | chr12 | 123921043 123921403 | RILPL2 |
| 92 | chr12 | 123920993 123921023 | RILPL2 |
| 93 | chr12 | 123942587 123943147 | RILPL2 |
| 94 | chr12 | 124018497 124018977 | RILPL1 |
| 95 | chr12 | 124018297 124018447 | RILPL1 |
| 96 | chr12 | 124017747 124018077 | RILPL1 |
| 97 | chr12 | 124068803 124069193 | RILPL1 |
| 98 | chr12 | 124069463 124069483 | RILPL1 |
| 99 | chr12 | 124069263 124069363 | RILPL1 |
| 100 | chr19 | 11199377 11199397 | LDLR |
| 101 | chr19 | 11200027 11200247 | LDLR |
| 102 | chr19 | 11203397 11203427 | LDLR |
| 103 | chr19 | 11202777 11202827 | LDLR |
| 104 | chr19 | 11203067 11203137 | LDLR |
| 105 | chr19 | 11200827 11201477 | LDLR |
| 106 | chr19 | 11202517 11202757 | LDLR |
| 107 | chr19 | 11202927 11203057 | LDLR |
| 108 | chr19 | 11199707 11199727 | LDLR |
| 109 | chr19 | 11199407 11199527 | LDLR |
| 110 | chr19 | 11203487 11203587 | LDLR |
| 111 | chr19 | 45393632 45394602 | APOE |
| 112 | chr19 | 45407467 45407487 | APOE |
| 113 | chr19 | 45407587 45407647 | APOE |
| 114 | chr19 | 45408737 45408767 | APOE |
| 115 | chr19 | 45409457 45409527 | APOE |
| 116 | chr19 | 45406957 45407387 | APOE |
| 117 | chr19 | 45409747 45409887 | APOE |
| 118 | chr19 | 45409167 45409187 | APOE |
| 119 | chr19 | 45409557 45409577 | APOE |
| 120 | chr19 | 45407517 45407577 | APOE |
| 121 | chr19 | 45408807 45409097 | APOE |
| 122 | chr19 | 45409217 45409237 | APOE |
| 123 | chr19 | 45408647 45408717 | APOE |
| 124 | chr19 | 8454796 8455346 | ANGPTL4 |
| 125 | chr19 | 8455456 8455916 | ANGPTL4 |
| 126 | chr1 | 109825563 109825653 | SORT1 |
| 127 | chr1 | 109825703 109826173 | SORT1 |
| 128 | chr1 | 109940467 109940947 | SORT1 |
| 129 | chr1 | 109942097 109942177 | SORT1 |
| 130 | chr1 | 156561707 156561877 | APOA1BP |
| 131 | chr1 | 156561437 156561697 | APOA1BP |
| 132 | chr1 | 156561287 156561347 | APOA1BP |
| 133 | chr1 | 25757792 25757882 | LDLRAP1 |
| 134 | chr1 | 25757922 25757972 | LDLRAP1 |
| 135 | chr1 | 25756602 25757002 | LDLRAP1 |
| 136 | chr1 | 25757162 25757632 | LDLRAP1 |
| 137 | chr1 | 25757712 25757762 | LDLRAP1 |
| 138 | chr1 | 26147034 26147054 | LDLRAP1 |
| 139 | chr1 | 26147244 26147314 | LDLRAP1 |
| 140 | chr1 | 26147084 26147154 | LDLRAP1 |
| 141 | chr1 | 26146214 26146714 | LDLRAP1 |
| 142 | chr1 | 26146154 26146174 | LDLRAP1 |
| 143 | chr1 | 26146764 26146964 | LDLRAP1 |
| 144 | chr1 | 55352728 55353328 | PCSK9 |
| 145 | chr1 | 55353898 55354398 | PCSK9 |
| 146 | chr1 | 55354608 55354638 | PCSK9 |
| 147 | chr1 | 55505134 55505304 | PCSK9 |
| 148 | chr1 | 55505404 55505484 | PCSK9 |
| 149 | chr22 | 39150157 39150227 | APOBEC3F |
| 150 | chr22 | 39150527 39150687 | APOBEC3F |
| 151 | chr22 | 39150037 39150117 | APOBEC3F |
| 152 | chr22 | 39151387 39151757 | APOBEC3F |
| 153 | chr22 | 39151947 39152207 | APOBEC3F |
| 154 | chr22 | 39150157 39150227 | APOBEC3B |
| 155 | chr22 | 39150527 39150687 | APOBEC3B |
| 156 | chr22 | 39150037 39150117 | APOBEC3B |

TABLE 2-continued

Putative Enhancers

| No. | Enhancer Location | | | Target Gene |
|---|---|---|---|---|
| 157 | chr22 | 39151387 | 39151757 | APOBEC3B |
| 158 | chr22 | 39151947 | 39152207 | APOBEC3B |
| 159 | chr22 | 39716380 | 39716400 | APOBEC3F |
| 160 | chr22 | 39716100 | 39716360 | APOBEC3F |
| 161 | chr22 | 39715350 | 39715990 | APOBEC3F |
| 162 | chr22 | 39716380 | 39716400 | APOBEC3B |
| 163 | chr22 | 39716100 | 39716360 | APOBEC3B |
| 164 | chr22 | 39715350 | 39715990 | APOBEC3B |
| 165 | chr2 | 21267245 | 21267305 | APOB |
| 166 | chr2 | 21265795 | 21266425 | APOB |
| 167 | chr2 | 21266795 | 21267185 | APOB |
| 168 | chr2 | 21264995 | 21265315 | APOB |
| 169 | chr2 | 44066383 | 44066443 | ABCG5 |
| 170 | chr2 | 44066293 | 44066373 | ABCG5 |
| 171 | chr2 | 44066033 | 44066283 | ABCG5 |
| 172 | chr2 | 44065943 | 44065973 | ABCG5 |
| 173 | chr2 | 44066383 | 44066443 | ABCG8 |
| 174 | chr2 | 44066293 | 44066373 | ABCG8 |
| 175 | chr2 | 44066033 | 44066283 | ABCG8 |
| 176 | chr2 | 44065943 | 44065973 | ABCG8 |
| 177 | chr6 | 160113691 | 160113821 | LPA |
| 178 | chr6 | 160112501 | 160112521 | LPA |
| 179 | chr6 | 160114051 | 160114961 | LPA |
| 180 | chr6 | 160115141 | 160115171 | LPA |
| 181 | chr6 | 160112341 | 160112491 | LPA |
| 182 | chr6 | 160115181 | 160115201 | LPA |
| 183 | chr6 | 160115411 | 160115491 | LPA |
| 184 | chr6 | 160113901 | 160113971 | LPA |
| 185 | chr6 | 160113841 | 160113891 | LPA |
| 186 | chr6 | 160115031 | 160115081 | LPA |
| 187 | chr6 | 160182791 | 160183961 | LPA |
| 188 | chr6 | 160182691 | 160182781 | LPA |
| 189 | chr6 | 160209879 | 160209949 | LPA |
| 190 | chr6 | 160210419 | 160211799 | LPA |
| 191 | chr8 | 126444350 | 126444500 | TRIB1 |
| 192 | chr8 | 126441430 | 126442760 | TRIB1 |
| 193 | chr9 | 2843876 | 2843936 | VLDLR |
| 194 | chr9 | 2843956 | 2844386 | VLDLR |
| 195 | chr1 | 25869917 | 25870146 | LDLRAP1 |
| 196 | chr1 | 55505012 | 55505241 | PC SK9 |
| 197 | chr1 | 109940507 | 109940736 | SORT1 |
| 198 | chr1 | 156561367 | 156561596 | APOA1BP |
| 199 | chr10 | 91011506 | 91011735 | LIPA |
| 200 | chr11 | 116663078 | 116663307 | APOA5 |
| 201 | chr11 | 116693999 | 116694228 | APOA4 |
| 202 | chr11 | 116700416 | 116700645 | APOC3 |
| 203 | chr11 | 116708314 | 116708543 | APOA1 |
| 204 | chr12 | 123921013 | 123921242 | RILPL2 |
| 205 | chr12 | 124018238 | 124018467 | RILPL1 |
| 206 | chr13 | 48987226 | 48987455 | LPAR6 |
| 207 | chr19 | 8439008 | 8439237 | ANGPTL4 |
| 208 | chr19 | 11199934 | 11200163 | LDLR |
| 209 | chr19 | 45408846 | 45409075 | APOE |
| 210 | chr2 | 21224314 | 21224543 | APOB |
| 211 | chr2 | 44065905 | 44066134 | ABCG8 |
| 212 | chr2 | 44066369 | 44066598 | ABCG5 |
| 213 | chr22 | 39378148 | 39378377 | APOBEC3B |
| 214 | chr22 | 39410060 | 39410289 | APOBEC3C |
| 215 | chr22 | 39436453 | 39436682 | APOBEC3F |
| 216 | chr6 | 161085231 | 161085460 | LPA |
| 217 | chr8 | 126442398 | 126442627 | TRIB1 |
| 218 | chr9 | 2621583 | 2621812 | VLDLR |

Example 6—Systematic Mapping and Prediction of Gene-Enhancer Connections

Genome-wide association studies (GWAS) have identified thousands of loci associated with dozens of common diseases. A major challenge in modern biology is to understand the molecular mechanisms underlying these associations, including determining which of the multiple variants in linkage disequilibrium with one another in each locus are causally involved in disease. Most causal variants are thought to occur in the non-coding genome, presumably by affecting the functions of non-coding cis regulatory elements (REs) such as enhancers that quantitatively tune gene expression. However, interpreting the functions of these non-coding variants is challenging because of the lack of tools to systematically test or predict which regions of the genome act as REs and which genes they regulate ("gene-RE connectivity").

The major challenge in understanding gene-RE connectivity is that the current technologies for studying and perturbing these connections have not been able to handle the massive scale of the problem. The human genome is thought to contain >1 million REs, each of which might control one or more nearby genes, and genes appear to be regulated by different REs in different cell types. For decades, scientists have investigated these connections one at a time, for example by knocking out individual REs and measuring the effects on gene expression. These studies have revealed that REs recruit specific transcription factors (TFs), are often marked by specific histone modifications, and can loop in 3D space to physically contact and regulate the promoter of nearby genes. However, the massive perturbation-based datasets required to determine if these or other yet unknown features broadly specify gene-RE connectivity were lacking.

Recent technological advances make it possible to address this problem in a systematic way. First, the CRISPR/Cas9 system allows massively parallel perturbations of REsin their native locations in the genome. Second, major projects (ENCODE, Roadmap) have produced chromatin state maps in many cell types, providing the data needed to identify and evaluate which epigenomic features can predict gene-RE connections. Together, these advances enable studies to (1) perturb many REs and observe the effects on gene expression; (2) compare these data to genome-wide maps of chromatin state to identify features that specify and predict gene-RE connections; and (3) apply these predictions across many cell types to interpret human genetic variation.

The inventors developed the tools needed to realize this strategy (Fulco et al., Science 2016). The inventors first developed CRISPRi tiling, a method that uses catalytically dead Cas9 (dCas9) fused to the KRAB repressive domain to inhibit thousands of putative REs in a single experiment to determine their quantitative effects on gene expression. CRISPRi tiling was applied to identify all of the REs that regulate two genes in a single cell type, and, based on this data, a computational approach (Activity×Proximity Model) was developed that could identify enhancers that regulate one of these genes (MYC) in different cell types based on chromatin state maps. This model also correctly identified GWAS variants previously demonstrated to regulate MYC in specific cell types. This study provides a proof-of-principle for expanding this approach to additional genes and cell types to interpret genetic variation associated with human diseases.

Building on this work, these tools can be applied to understand gene regulation in loci associated with immune diseases. Immune cells are an ideal system to for studying the dynamics of gene-RE connections across cell types. Experimental access to cell lines representing three developmental lineages that are relevant to immune diseases (T cells, B cells, and monocytes) is available, allowing systematic studies to compare cells of varying relatedness and activation states. Chromatin state maps have been generated, providing the data needed to understand the molecular basis of gene-RE connections. GWAS has been performed in >20 immune diseases, providing dense maps relating gene loci to immune cell function.

Recently, the inventors developed methods to programmatically perturb REs in their endogenous locations in the genome at massive scale (CRISPRi tiling+FlowFISH) and predict functional gene-RE connections based on genome-wide measurements of chromatin state (Activity×Proximity Model).

First, CRISPRi tiling in combination with FlowFISH was found to enable mapping the REs that control any gene. CRISPRi tiling uses pooled CRISPR screens in combination with CRISPR interference (CRISPRi)—which alters chromatin state at targeted loci through recruitment of a KRAB effector domain fused to catalytically dead Cas9 (dCas9)—to simultaneously characterize the gene regulatory effects of up to 1 Mb of sequence in a single experiment. Initially, the inventors developed the CRISPRi tiling approach in the context of identifying REs that regulate genes whose expression is quantitatively tied to cell growth. Subsequently, the inventors extended this method to examine any gene of interest by combining CRISPRi tiling with measurements of a specific RNA transcript ("FlowFISH").

Figure 28:
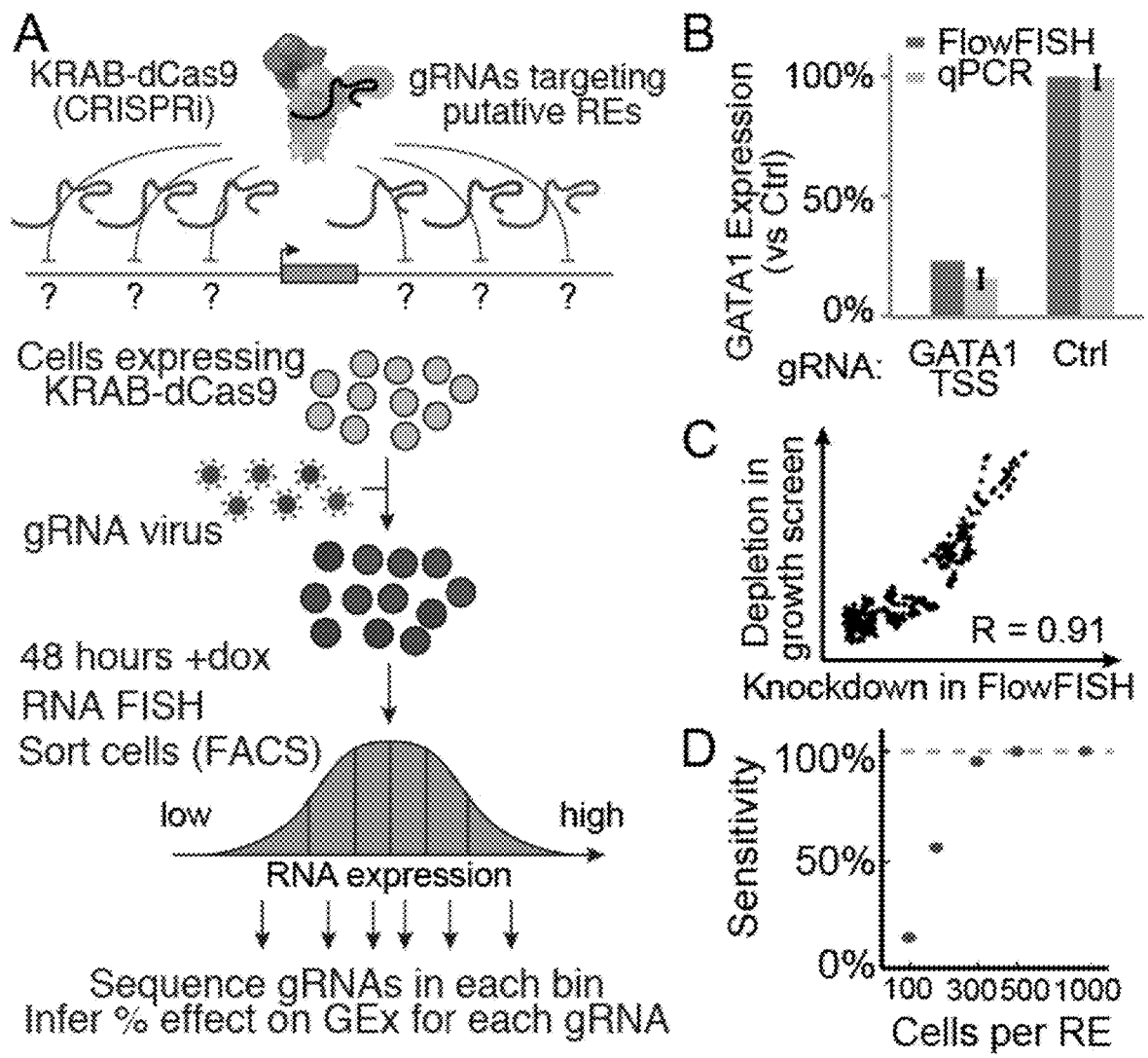
FIG. 28: (A) CRISPRi+FlowFISH workflow. (B) GATA1 knockdown measured by qPCR or by FlowFISH. (C) Correlation between 20-guide windows in GATA1 FlowFISH vs published cellular growth screen. (D) Sensitivity for detecting REs with effect sizes of 10%.

In this FlowFISH approach (FIG. 28A), a library of gRNAs targeting all accessible elements within 2 Mb of the target gene were design. This approach started with a population of cells each expressing KRAB-dCas9 from a doxycycline-inducible promoter. Cells were infected with a pool of gRNA virus (1 gRNA per cell), and KRAB-dCas9 expression was activated with doxycycline for 48 hours. Then, the inventors used fluorescence in situ hybridization (FISH, Affymetrix PrimeFlow assay) to quantitatively label single cells according to their expression of an RNA of interest; sorted labeled cells with fluorescence-activated cell sorting (FACS) into 6 bins based on RNA expression; used high-throughput sequencing to determine the frequency of gRNAs from each bin; and compared the relative abundance of gRNAs in each bin to infer the effects of gRNAs on RNA expression. This approach accurately assessed the effects of gRNAs on gene expression, as validated by RT-qPCR in the same cells (FIG. 28B). In preliminary work, this approach has been applied at scale to identify all REs within 2 Mb that control GATA1 expression in K562 cells, and found that the results correlated extremely well published results using cellular proliferation as a readout (FIG. 28C). CRISPRi tiling identified many types of REs, including both enhancers and CTCF binding sites, and the inventors have validated their effects on gene expression through genetic deletions. Epigenetic repression by KRAB has a ~500 bp impact-range and therefore allows multiple independent measurements from adjacent gRNAs, providing robust statistics and allowing sensitivity for changes in gene expression down to 10% (FIG. 28D). Thus, the combination of CRISPRi tiling and FlowFISH provides the capability to perturb hundreds of putative REs and determine the quantitative effects of each perturbed element on the expression of a gene of interest.

Second, functional gene-enhancer connections can be predicted from chromatin state measurements. Using the data from the initial studies in the MYC locus, the inventors sought to determine whether the quantitative effects of REs on MYC expression could be predicted from genomic or epigenomic features. Although there are multiple types of REs, the focus was those that act as enhancers. An "Activity×Proximity Model" was formulated (FIG. 29A), wherein the effect of an enhancer on gene expression is determined both by the frequency at which the enhancer contacts its target promoter (Proximity) and its intrinsic Activity, a theoretical quantity describing how many RNA transcripts are produced per enhancer-promoter contact. Proximity was estimated using Hi-C data and Activity using DNase I hypersensitivity sequencing (DHS) and H3K27ac ChIP-sequencing signals (FIG. 29B). This model outperformed 7 other prediction methods at identifying enhancers that regulate MYC. The inventors have since evaluated this Activity×Proximity Model on additional perturbation datasets, and found that it accurately predicts enhancer-gene connections across multiple gene loci (FIG. 29C).

Third, the Activity×Proximity Model for predicting gene-enhancer connections can be generalized across cell types. Because this model incorporates cell-type specific maps of chromatin state (DHS, H3K27ac, and Hi-C), it can be applied to other cell types to produce context-specific predictions. The inventors trained an Activity×Proximity Model based on CRISPRi tiling data from K562 cells, and showed that this same model, when fed new data corresponding to a different cell type, accurately identified 4 of 4 enhancers previously shown to regulate MYC in other cell types. This leads to a strategy to deeply map gene-RE connections in a limited number of cell types, train a model, and apply the model to predict gene-RE connections in other cell types based on chromatin state maps.

Figure 30:
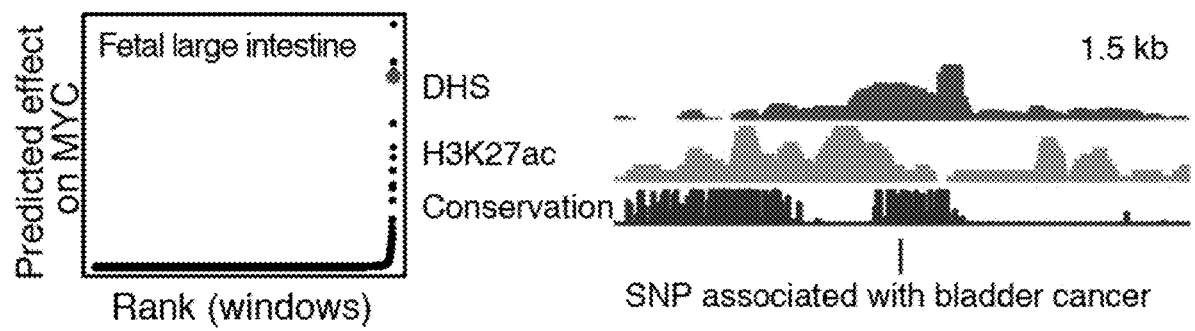
FIG. 30: A SNP associated with bladder cancer risk overlaps an enhancer predicted to regulate MYC in fetal large intestine (red dot), the most closely related tissue included in the analysis.

Fourth, gene-enhancer predictions can help to interpret human genetic variation. As a proof-of-concept analysis, the inventors evaluated the ability of the Activity×Proximity Model to help interpret disease-associated haplotypes located in the vicinity of MYC. It was found several cases where such haplotypes harbored variants overlapping cell-type specific enhancers that the model predicted to regulate MYC (FIG. 30). This suggests that regulatory maps of gene-RE connections can aid in interpreting genetic variation associated with disease.

Leveraging these capabilities, this approach can be expanded to map gene-RE connections for many genes in multiple cell types, use these data to understand and predict gene-RE connections, and apply insights to interpret non-coding genetic variation associated with common diseases.

A. Identify all REs that control 20 genes in 6 cell states.

Figure 31:
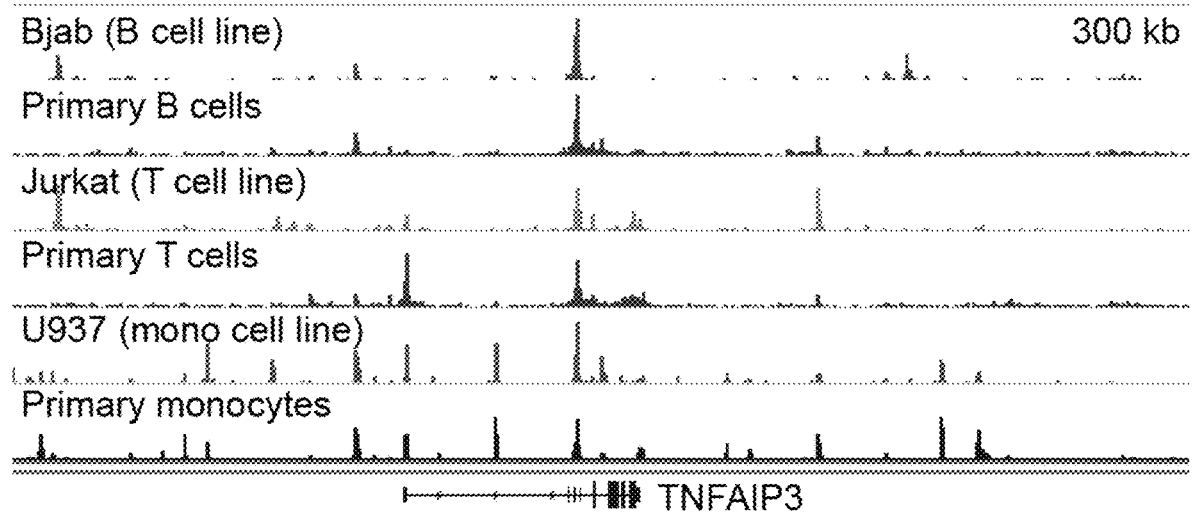
FIG. 31: ATAC-Seq profiles at a representative gene locus for immune cell lines and primary cells.

Immune cell lines as model system. To explore how gene-RE connections vary across cell types, these connections can be mapped in 3 immortalized immune cell lines, representing 3 developmental lineages: T cells (Jurkat cell line), B cells (Bjab), and monocytes (U-937). For each cell type, gene-RE connections can be examined in resting and activated states, corresponding to stimulation of cells with appropriate immune ligands. The inventors have developed and characterized these three cell lines because these three developmental lineages are implicated by GWAS in immune disease biology (based on enrichment of SNPs in accessible chromatin). For each cell line, the inventors have measured chromatin accessibility with ATAC-Seq and found that they are highly similar to ATAC-Seq profiles of primary immune cells (e.g., FIG. 31). Although these cell lines are not expected to perfectly model the in vivo functions and regulatory states of human immune cells, the general principles of gene-RE connections learned in these cell lines (e.g., roles of chromosome conformation and chromatin state) can be applied to interpret chromatin state maps from in vivo primary cells. Importantly, these cell lines are easily expanded and transduced for CRISPRi tiling experiments, which require ~1 million cells per screen. The inventors have already generated polyclonal cell lines expressing the CRISPRi machinery (KRAB-dCas9) from a dox-inducible promoter and validated their function in gene knockdown.

Select 20 genes in loci associated with immune diseases. The CRISPRi tiling+FlowFISH approach can be applied to systematically map all of the REs that control 20 genes, selected from loci associated with two or more autoimmune diseases in a compendium of GWAS data. To prioritize loci and genes, genetic fine-mapping were performed to identify 90% credible sets for SNPs in each locus. The inventors have focused on loci where the credible set (i) contains at least one variant within 500 bp of an accessible site in at least one ATAC-Seq dataset in immune cell lines or primary cells; (ii) does not contain a coding or splice site variant; and (iii) less than 10 variants total. 5 loci were chosen where these credible set SNPs occur near a key immune gene that is suspected or known to have a role in immune disease (A, B, C, D, and E). Also, 3 loci were chosen where there is not a strong hypothesis about the gene involved. In each of these loci, 5 genes were selected that are (i) located in the same topological associated domain (TAD) as the SNPs, and (ii) are expressed in at least 1 of the 3 selected cell lines. Thus, a total of 20 genes were chosen from 8 loci.

Perform CRISPRi tiling+FlowFISH for each gene. For each of our 20 genes, libraries of gRNAs are designed according to rules suggested by the inventors' previous CRISPRi tiling experiment. Each accessible site (putative RE) that is (i) within 1 Mb of a gene in the locus; (ii) within 20 Kb of a boundary of a TAD containing the target gene; or (iii) within 20 Kb of a Hi-C loop to a target gene, is targeted. Up to 30 gRNAs per putative RE (~100 per locus) and 500 negative control gRNAs are included, leading to a library of ~3,500 gRNAs per locus. gRNAs are synthesized en masse through oligonucleotide array-based synthesis, and a separate virus pool is cloned for each locus. Duplicate FlowFISH CRISPRi tiling screens can be performed using Affymetrix PrimeFlow probesets for each gene (FIG. 28A). To identify significant REs, the effects of 20 adjacent gRNAs are averaged and compared to negative control gRNAs. For each RE, the (i) significance, (ii) effect size, and (iii) confidence interval on estimated effect size are analyzed, all of which are considered in the subsequent modeling and analysis. A subset of REs identified can be validated with this approach by transducing cells with individual gRNAs and measuring gene expression by RT-qPCR, as previously described.

B. Evaluate hypotheses regarding mechanisms that specify gene-RE connections.

Two leading theories for how enhancers achieve specificity for target genes are: (i) combinations of TFs at enhancer and promoters mediate specific connections; and (ii) features of 3D chromosome conformation—such as TADs or loops—guide and specify enhancer-gene regulation. The success of the "Activity×Proximity Model" (FIG. 29B), which does not require information about specific TFs, supports the latter hypothesis and suggests that the quantitative effects of enhancers on gene expression depend on the frequency of contacts between an enhancer and promoter and the intrinsic activity of the enhancer (FIG. 29A).

Refine Activity×Proximity Model for predicting enhancer-gene connectivity. The experimentally tested gene-RE connections are used to train and optimize an extended Activity×Proximity Model (FIG. 29A). Inputs to the model include ATAC-Seq, H3K27ac ChIP-Seq, and promoter-capture Hi-C data from each of the 6 cell states. For each gene-RE pair, the quantitative effect of the RE (i.e., % change in gene expression upon RE inhibition) can be predicted, evaluating model performance based on the residual sum of squares weighted by the experimental variance of the estimate of the effect. To enable comparisons between enhancers regulating different genes, the effect of each enhancer is normalized by the sum of the predicted effects of all other enhancers in the region.

$$\% \text{ Effect } \Delta G_E = \frac{A_E \times P_{E,G}}{\sum_{E,G} A_E \times P_{E,G}}$$

$$\text{Activity } A_E = \text{logistic}\left(\sqrt[i+R]{H3K27ac_E \times DHS_E^R}\right)$$

$$\text{Proximity } P_{E,G} = \text{logistic}(HiC_{E,G})$$

A gradient descent approach can be used to tune free parameters, including the relative importance of ATAC vs. H3K27ac signal in estimating Activity and logistic functions for Activity and Proximity. To enable the model to generalize to new contexts, withholding data from one cell type or from a subset of gene loci can trained and cross-validated. These analyses can reveal what fraction of quantitative enhancer activity can be explained by an Activity×Proximity Model of gene-enhancer interactions.

C. Genome editing to validate regulatory functions of variants and enhancers.

Two experimental validations can be used to determine the relevance and utility of these data for interpreting non-coding genetic variants. First, additional genome editing experiments can be performed to validate REs in primary immune cells, focusing on CD4+ T cells, which are implicated in the pathogenesis of many immune diseases. Second, prioritized GWAS variants can be knocked-in into the Jurkat T cell line and determine their effects on gene expression.

While genome editing studies of non-coding variants are challenging, the suite of genome editing and allele-specific RNA analysis tools the inventors have utilized and developed during have provided optimized methods and workflows for these studies. Supporting the application of these methods to T cells, the inventors have developed protocols for genome editing in the Jurkat T cell line as well as in primary CD4+ T cells. The FlowFISH protocol described above supports a convenient approach for editing primary cells and determining effects on gene expression.

10 candidate enhancers containing GWAS variants for experimental dissection. SNPs that are located in or within 100 bp of REs that (i) are experimentally identified to regulate gene expression in the Jurkat cell line; and (ii) are predicted to regulate the same gene in primary human T cells, are used first. For gene-RE predictions in primary cells, ATAC-Seq data from primary cells and Hi-C data from the Jurkat cell line can be used. The inventors have previously shown that Hi-C data from a similar cell type is sufficient for accurate predictions because ATAC-Seq contain much of the cell-type specific information. Some of the chosen variants may be located near the same gene but from different haplotypes associated with different autoimmune diseases.

Figure 32:
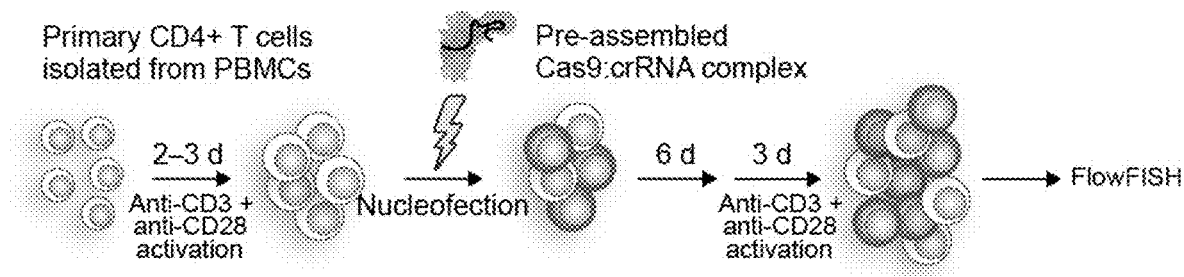
FIG. 32: Genome editing in ex vivo primary CD4+ T cells using pre-assembled Cas9:crRNA complexes.
Figure 33:
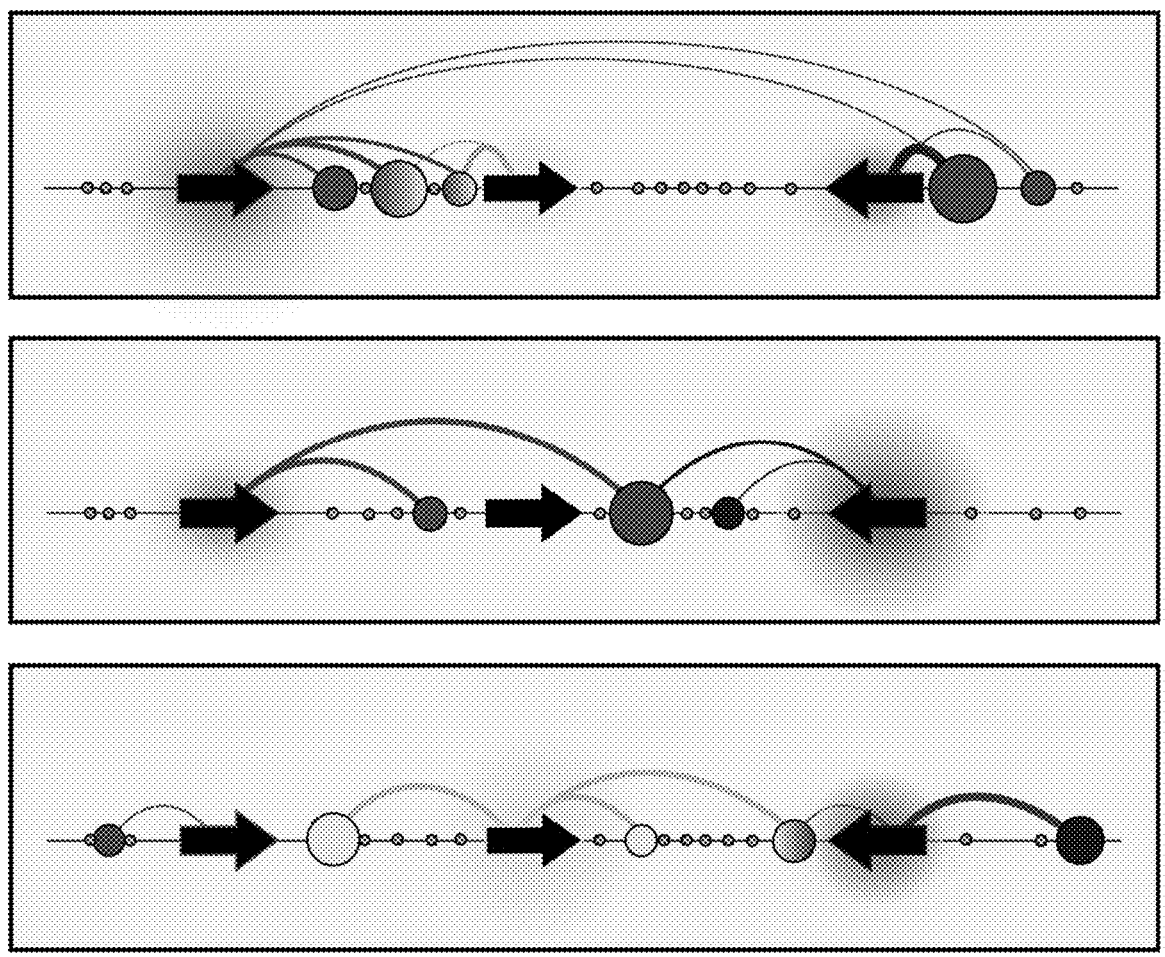
FIG. 33 shows that gene-RE connection patterns can differ among cell types.
Figure 34:
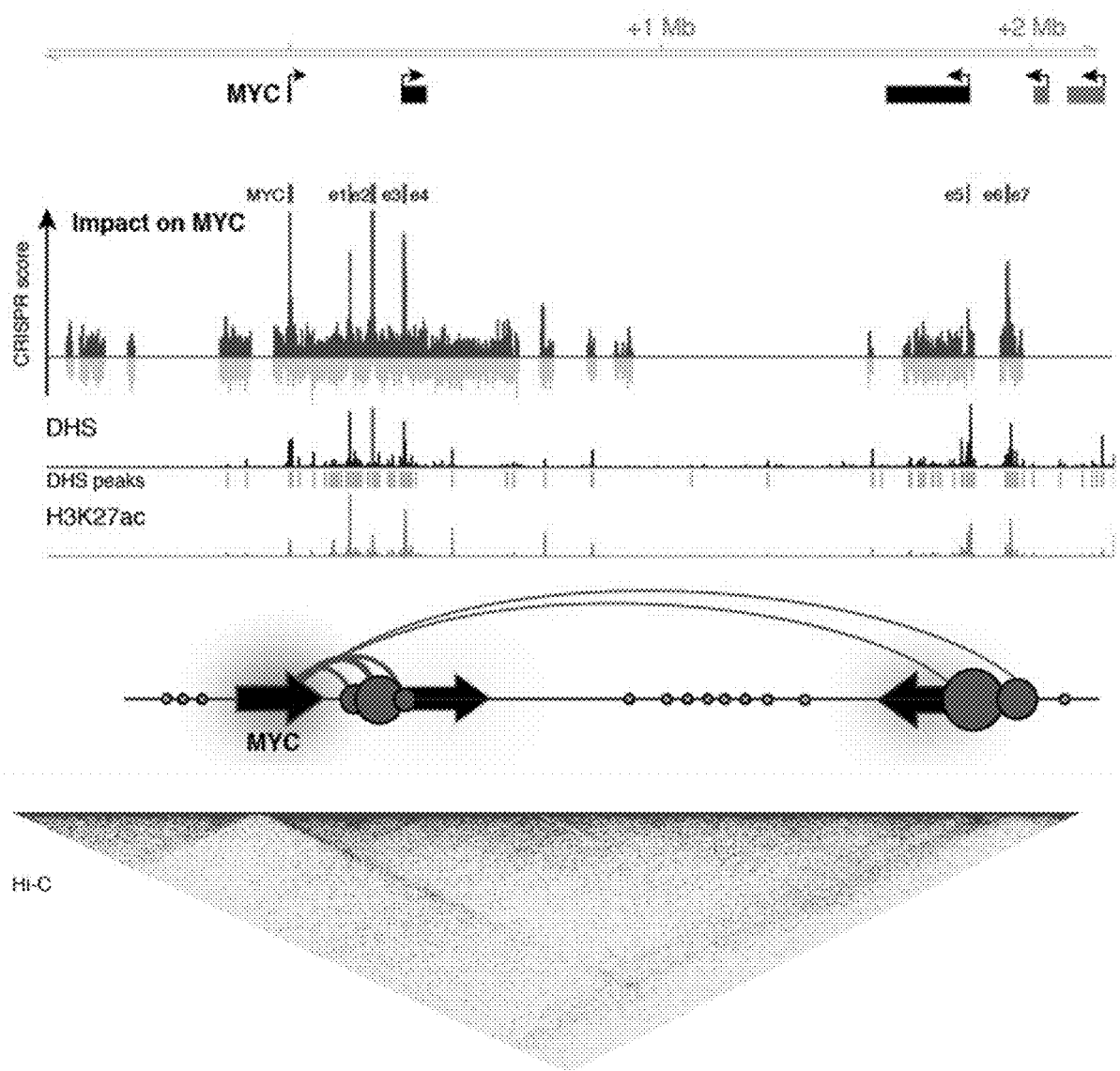
FIG. 34 shows putative enhancers identified according to one embodiment of the invention.
Figure 35:
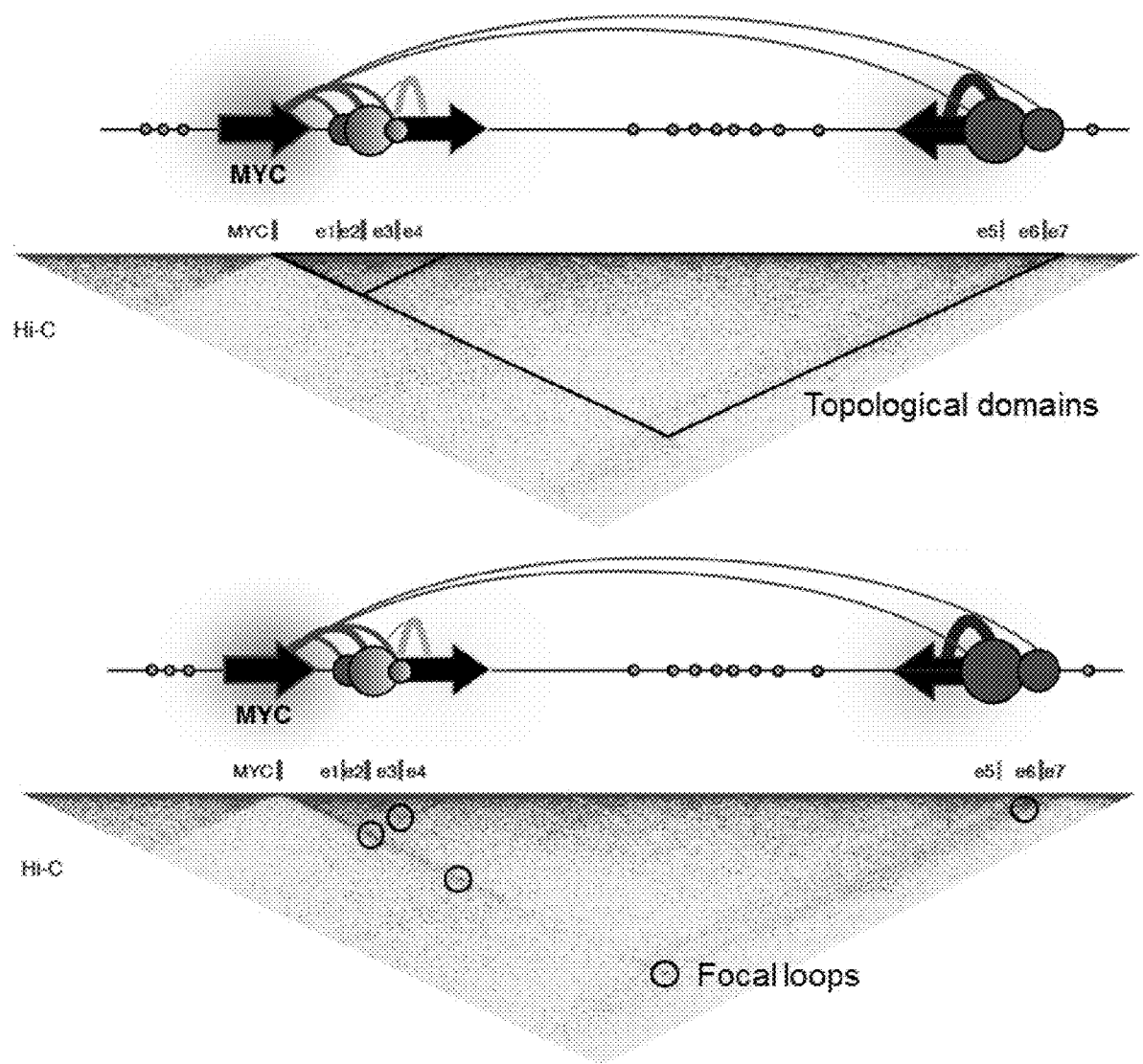
FIG. 35 shows that gene-RE connection patterns cannot be readily explained by topological domains and focal groups.
Figure 36:
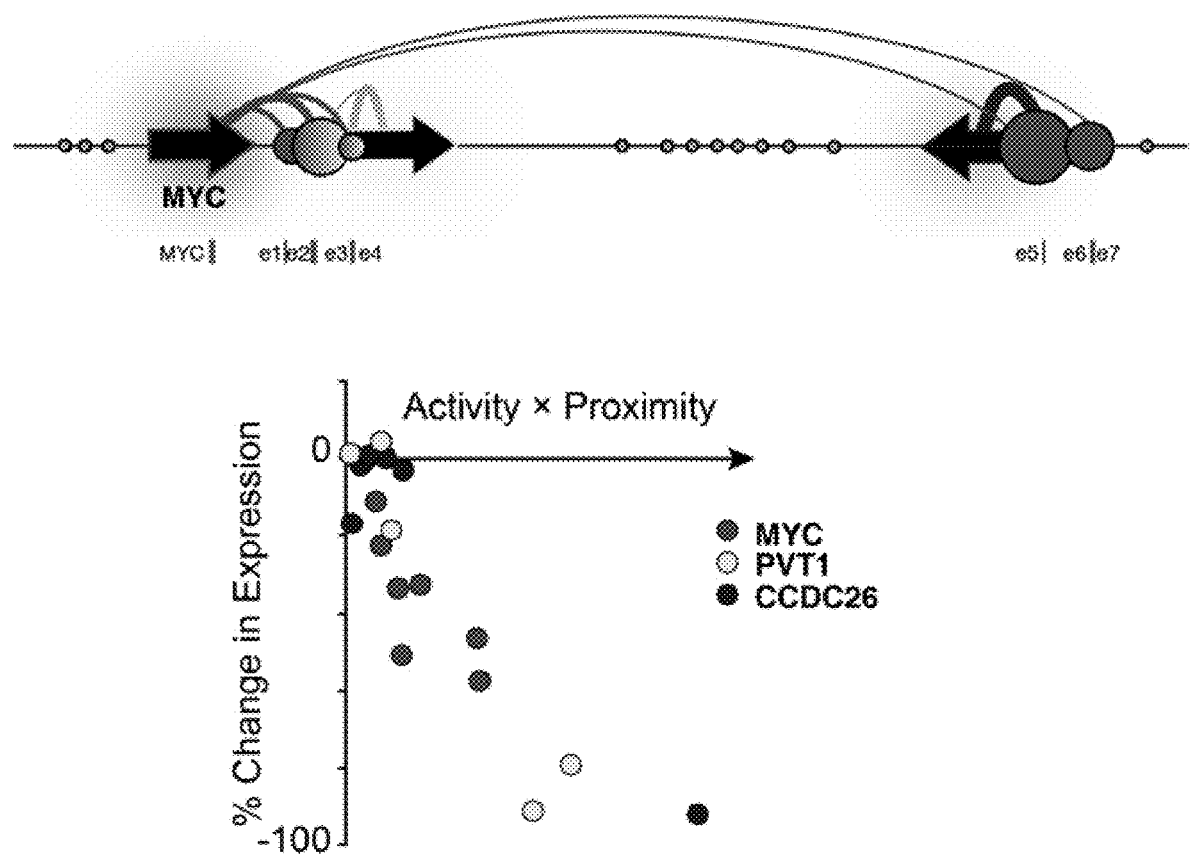
FIG. 36 shows that the quantitative effects of enhancers on gene expression can be predicted using the Activity× Proximity model.
Figure 37:
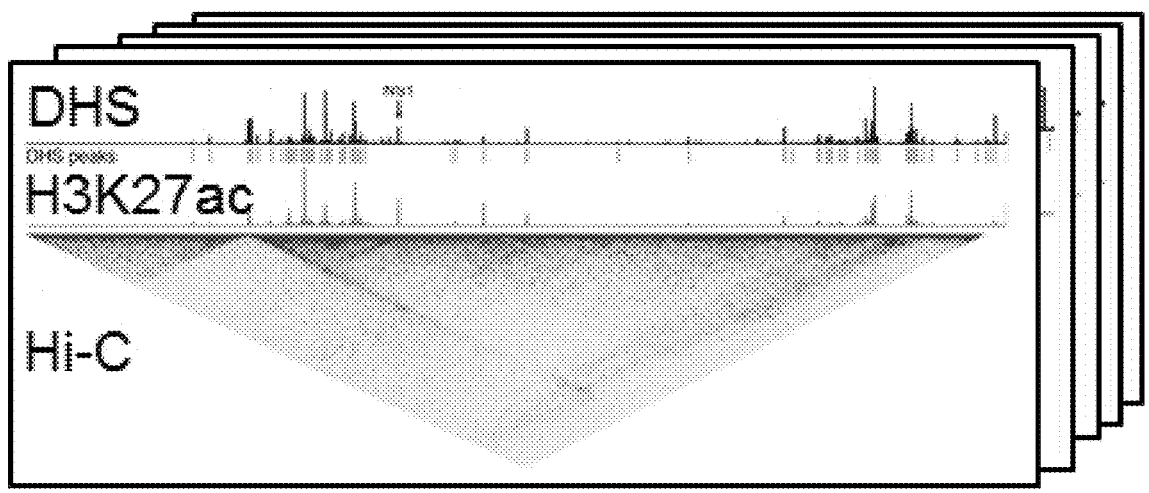
FIG. 37 shows one embodiment of the invention wherein reliable predictive accuracy has been achieved in identifying enhancer-gene pairs where the enhancer regulates the gene by >20%.
Figure 37:
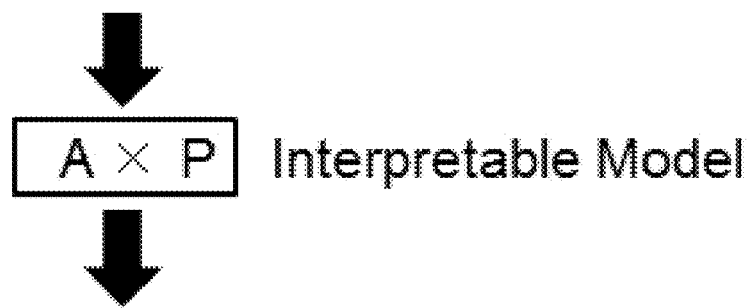
Figure 37:
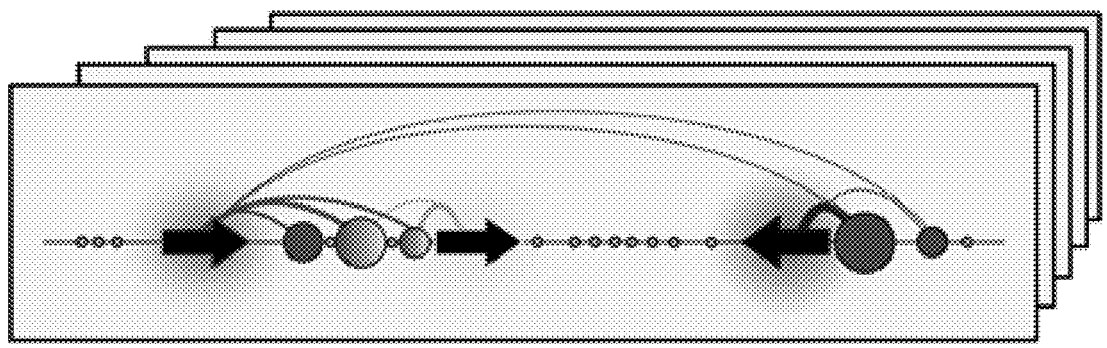
Figure 38:
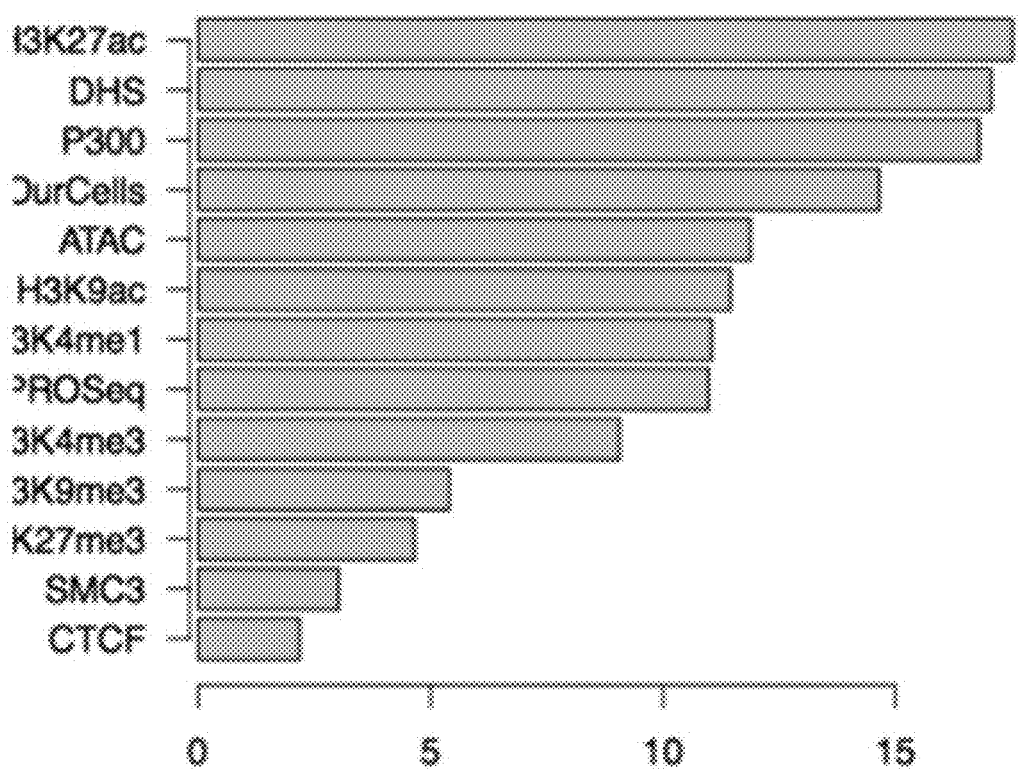
FIG. 38 shows enrichment of enhancers in various experimental marks from the same cell type. Enhancers are those derived from 738 experimentally tested putative element-gene pairs of which 89 elements detectably regulated the gene.
Figure 39:
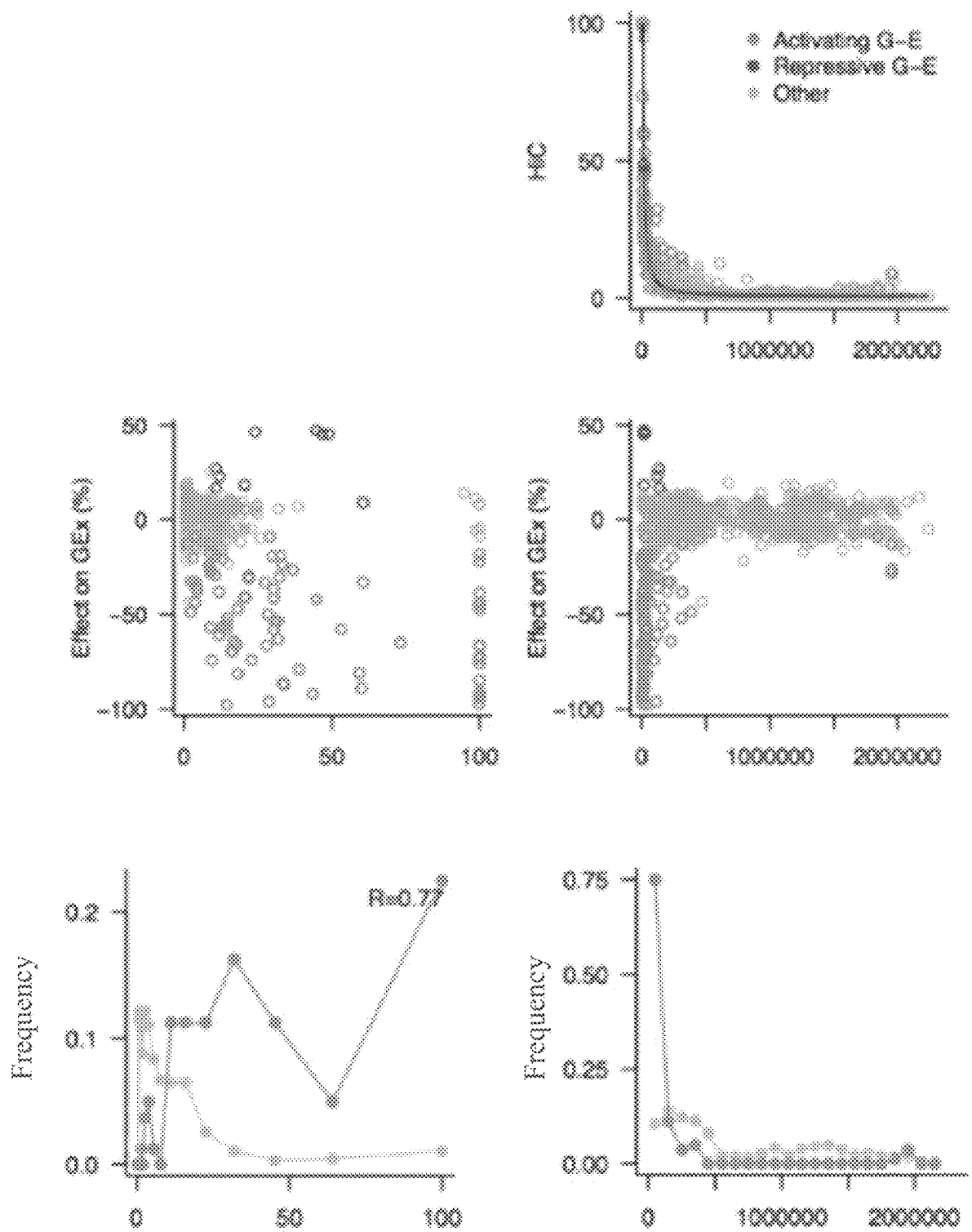
FIG. 39 shows correlation between gene-enhancer (G-E) linear distance (right) or Hi-C signal (left) with the magnitude of enhancer effect on gene expression (GEx) or frequency of tested elements having an effect on gene expression.
Figure 40:
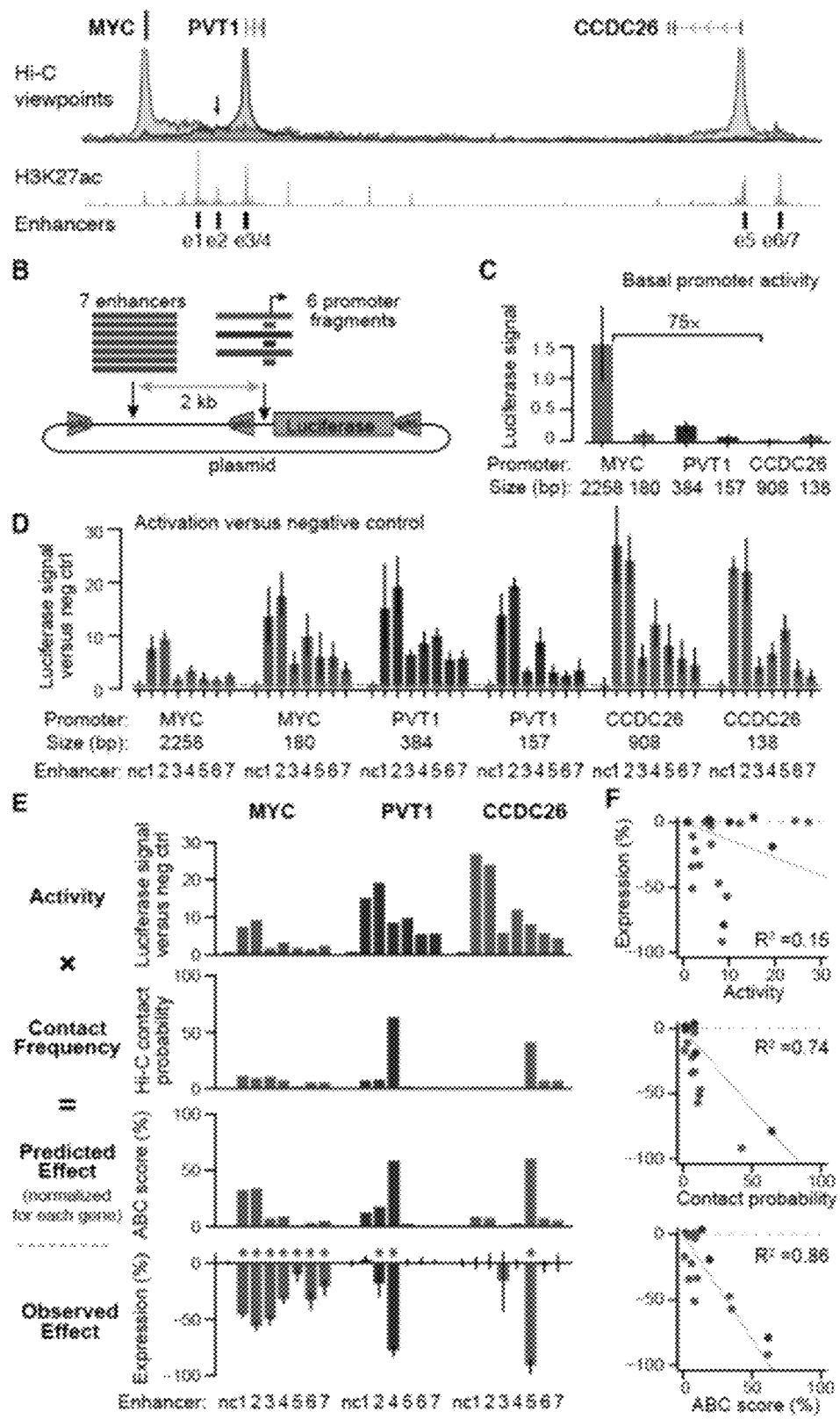
FIG. 40 shows Activity×Proximity (contact frequency) model predicts the quantitative effects of enhancers on gene expression. (A) Diagram of MYC locus in K562 cells. (B) Overview of reporter assay testing 7 MYC enhancers with 6 promoter fragments. (C) Basal promoter activity of 6 promoter fragments. (D) Luciferase reporter activity for 48 enhancer-promoter fragment pairs. (E) Activity×Contact Frequency model for MYC, PVT1, and CCDC26. (F) Correlation between A×C prediction and real effect on gene expression, showing performance of 3 different models.
Figure 41:
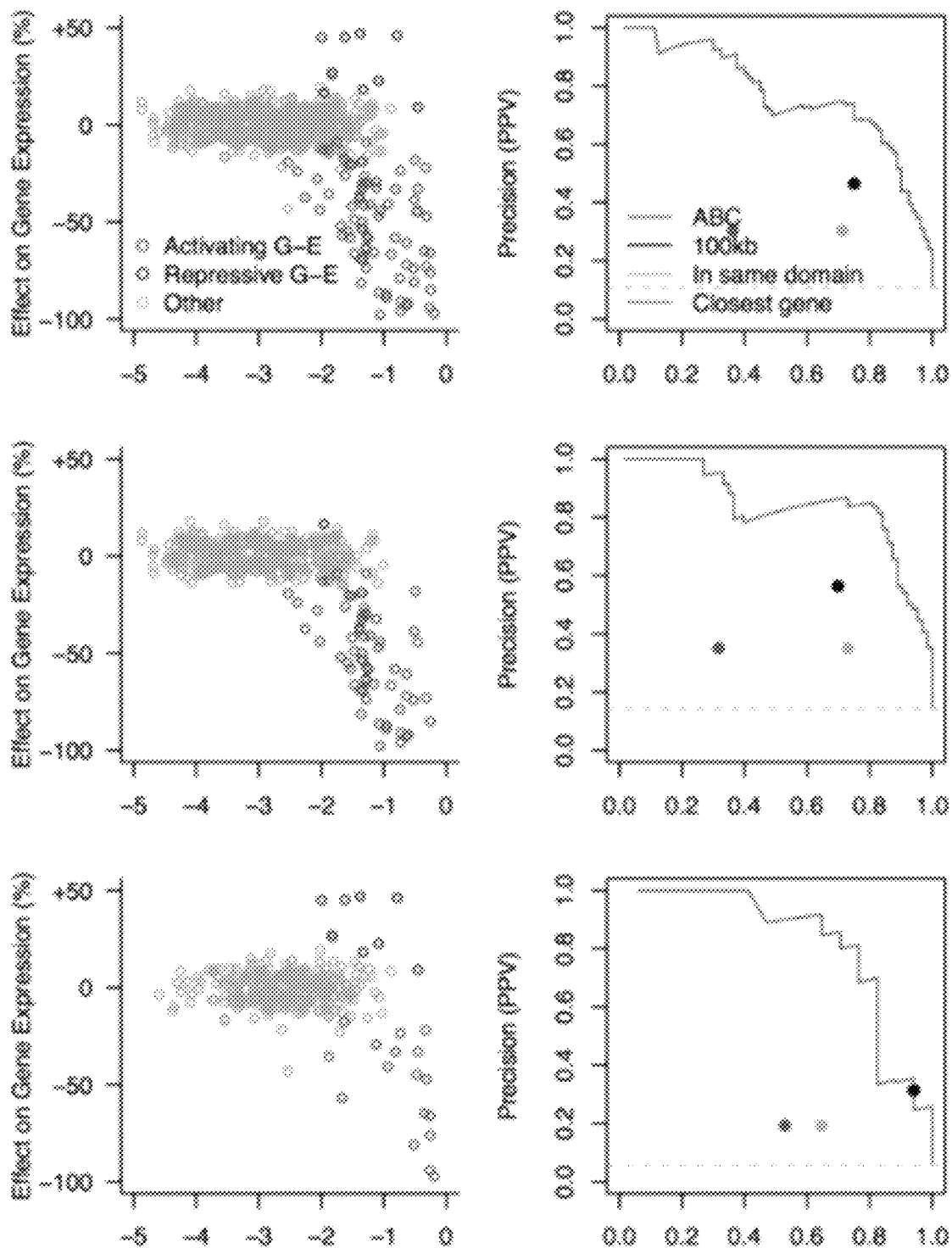
FIG. 41 shows performance of A×C model in predicting quantitative effects of putative enhancers on gene expression (left) and classifying putative enhancers as having a detectable effect on gene expression (right). Top row: All tested G-E pairs where E is a distal element. Middle row: G-E pairs where E is a distal element that is not also a promoter for another gene. Bottom row: G-E pairs where E is a distal element that is also a promoter for another gene. Performance of the A×C(=ABC) model on right is compared to other predictions: assigning each enhancer to all expressed genes within 100 kb; assigning each enhancer to all expressed genes in the same contact domain; or assigning each enhancer to the closest expressed gene.

Knock out enhancers and test effects on gene expression in primary human T cells. A key hypothesis is enhancers across cell types can be accurately identified based on chromatin state maps. To directly test this, genome-editing experiments are performed to delete enhancers predicted to be shared by Jurkat and in primary T cells. The FlowFISH approach is used to perform these experiments in primary CD4+ cells, where clonal selection is not possible (FIG. 32). For each enhancer, the experimental procedures includes: (i)

separately nucleofector cells with Cas9 protein complexed to one of 5 different gRNAs targeting the enhancer or a control gRNA (FIG. 32); (ii) apply FlowFISH for the target gene; (iii) sort cells into bins based on their expression of the gene; (iv) perform targeted PCR and sequencing of the enhancer sequence; and (v) compare the distribution of mutant alleles between bins to determine whether mutations in the enhancer lead to reduced expression of the gene. This pooled Cas9 deletion approach has been applied with alternative sorting procedures (i.e., antibody against a surface marker). As an alternative approach, nucleofection of KRAB-dCas9/gRNA can be performed in primary T cells (CRISPRi).

Knock in GWAS variants and test effects on gene expression in Jurkat cell line. Effects of variants on gene expression can be directly tested by engineering isogenic cell lines containing the target SNP. To do so, a workflow previously developed can be applied, in which the allele-specific effects on gene expression in heterozygotes are examined to compare wild-type and modified alleles in the same cells. First, to enable allele-specific measurements, an existing SNP in the target gene (from RNA-Seq data) is identified, or, if none is available, a SNP is engineered into an intron or 3'UTR of the gene using CRISPR/Cas9, as previously done for MYC. The subsequent experimental procedures include: knock in specific variants with CRISPR Through base-excision editing or homologous recombination with a ssDNA donor; expand clonal cell lines; genotype by PCR and high-throughput sequencing to determine the sequence of each allele in each clone; phase the modifications using droplet digital PCR; and characterize the effects on gene expression for clones containing heterozygous and homozygous insertions using allele-specific droplet digital PCR assays. This approach has been validated in the Jurkat cell line on 5 variants, which has demonstrated single-cell cloning as well as efficient CRISPR/Cas9 editing on >50% of alleles, with ~3% of alleles carrying the intended variant.

REFERENCES

1. M. Bulger, M. Groudine, Functional and mechanistic diversity of distal transcription enhancers. *Cell.* 144, 327-339 (2011).
2. F. Spitz, E. E. M. Furlong, Transcription factors: from enhancer binding to developmental control. *Nat Rev Genet.* 13, 613-626 (2012).
3. G. Li et al., Extensive promoter-centered chromatin interactions provide a topological basis for transcription regulation. *Cell.* 148, 84-98 (2012).
4. ENCODE Project Consortium, An integrated encyclopedia of DNA elements in the human genome. *Nature.* 489, 57-74 (2012).
5. Roadmap Epigenomics Consortium et al., Integrative analysis of 111 reference human epigenomes. *Nature.* 518, 317-330 (2015).
6. S. S. P. Rao et al., A 3D map of the human genome at kilobase resolution reveals principles of chromatin looping. *Cell.* 159, 1665-1680 (2014).
7. D. Shlyueva, G. Stampfel, A. Stark, Transcriptional enhancers: from properties to genome-wide predictions. *Nat Rev Genet.* 15, 272-286 (2014).
8. J. van Arensbergen, B. van Steensel, H. J. Bussemaker, In search of the determinants of enhancer-promoter interaction specificity. 24, 695-702 (2014).
9. L. A. Gilbert et al., CRISPR-mediated modular RNA-guided regulation of transcription in eukaryotes. *Cell.* 154, 442-451 (2013).
10. L. A. Gilbert et al., Genome-Scale CRISPR-Mediated Control of Gene Repression and Activation. *Cell.* 159, 647-661 (2014).
11. N. A. Kearns et al., Cas9 effector-mediated regulation of transcription and differentiation in human pluripotent stem cells. *Development.* 141, 219-223 (2014).
12. P. I. Thakore et al., Highly specific epigenome editing by CRISPR-Cas9 repressors for silencing of distal regulatory elements. *Nat Methods* (2015), doi:10.1038/nmeth.3630.
13. See Discussions in Example 1.
14. M. Suzuki, T. Moriguchi, K. Ohneda, M. Yamamoto, Differential contribution of the Gata1 gene hematopoietic enhancer to erythroid differentiation. *Mol Cell Biol.* 29, 1163-1175 (2009).
15. S. Nishimura et al., A GATA box in the GATA-1 gene hematopoietic enhancer is a critical element in the network of GATA factors and sites that regulate this gene. *Mol Cell Biol.* 20, 713-723 (2000).
16. O. R. Choi, J. D. Engel, Developmental regulation of beta-globin gene switching. *Cell.* 55, 17-26 (1988).
17. S. Ohtsuki, M. Levine, H. N. Cai, Different core promoters possess distinct regulatory activities in the *Drosophila* embryo. *Genes Dev.* 12, 547-556 (1998).
18. A. Fujieda et al., A putative role for histone deacetylase in the differentiation of human erythroid cells. *Int J Oncol.* 27, 743-748 (2005).
19. K. J. Falkenberg, R. W. Johnstone, Histone deacetylases and their inhibitors in cancer, neurological diseases and immune disorders. *Nat Rev Drug Discov.* 14, 219-219 (2015).
20. T. Burdett et al., The NHGRI-EBI Catalog of published genome-wide association studies, (available at www.ebi.ac.uk/gwas).
21. W. M. Gombert, A. Krumm, Targeted deletion of multiple CTCF-binding elements in the human C-MYC gene reveals a requirement for CTCF in C-MYC expression. *PLoS One.* 4, e6109 (2009).
22. X. Zhang et al., Identification of focally amplified lineage-specific super-enhancers in human epithelial cancers. *Nat Genet.* 48, 176-182 (2015).
23. N. Rajagopal et al., High-throughput mapping of regulatory DNA. *Nat Biotechnol.* 34, 167-174 (2016).
24. M. C. Canver et al., BCL11A enhancer dissection by Cas9-mediated in situ saturating mutagenesis. *Nature* (2015), doi:10.1038/nature15521.
25. G. Korkmaz et al., Functional genetic screens for enhancer elements in the human genome using CRISPR-Cas9. *Nat Biotechnol* (2016), doi:10.1038/nbt.3450.
26. T. Wang et al., Identification and characterization of essential genes in the human genome. *Science.* 350, 1096-1101 (2015).
27. D. Levens, You Don't Muck with MYC. *Genes Cancer.* 1, 547-554 (2010).
28. P. D. Hsu et al., DNA targeting specificity of RNA-guided Cas9 nucleases. *Nat Biotechnol.* 31, 827-832 (2013).
29. M. A. Horlbeck et al., Nucleosomes impede Cas9 access to DNA in vivo and in vitro. *Elife.* 5, 2767 (2016).
30. S. Djebali et al., Landscape of transcription in human cells. *Nature.* 489, 101-108 (2012).
31. B. Chen et al., Dynamic imaging of genomic loci in living human cells by an optimized CRISPR/Cas system. *Cell.* 155, 1479-1491 (2013).

32. B. Langmead, C. Trapnell, M. Pop, S. L. Salzberg, Ultrafast and memory-efficient alignment of short DNA sequences to the human genome. *Genome Biol.* 10, R25 (2009).
33. Q. Li, J. B. Brown, H. Huang, P. J. Bickel, Measuring reproducibility of high-throughput experiments. *arXiv. stat.AP* (2011), pp. 1752-1779.
34. W. J. Kent et al., The human genome browser at UCSC. *Genome Res.* 12, 996-1006 (2002).
35. C. E. Grant, T. L. Bailey, W. S. Noble, FIMO: scanning for occurrences of a given motif. *Bioinformatics.* 27, 1017-1018 (2011).
36. V. Matys et al., TRANSFAC and its module TRANSCompel: transcriptional gene regulation in eukaryotes. *Nucleic Acids Res.* 34, D108-10 (2006).
37. H. Xu et al., Sequence determinants of improved CRISPR sgRNA design. *Genome Res.* 25, 1147-1157 (2015).
38. N. E. Sanjana, O. Shalem, F. Zhang, Improved vectors and genome-wide libraries for CRISPR screening. *Nat Methods.* 11, 783-784 (2014).
39. J. M. Engreitz et al., RNA-RNA interactions enable specific targeting of noncoding RNAs to nascent Pre-mRNAs and chromatin sites. *Cell.* 159, 188-199 (2014).
40. M. I. Love, W. Huber, S. Anders, Moderated estimation of fold change and dispersion for RNA-seq data with DESeq2. *Genome Biol.* 15, 550 (2014).
41. M. Garber et al., A high-throughput chromatin immunoprecipitation approach reveals principles of dynamic gene regulation in mammals. *Mol Cell.* 47, 810-822 (2012).
42. L. Cong et al., Multiplex genome engineering using CRISPR/Cas systems. *Science.* 339, 819-823 (2013).
43. J. Ernst et al., Mapping and analysis of chromatin state dynamics in nine human cell types. *Nature.* 473, 43-49 (2011).
44. R. E. Thurman et al., The accessible chromatin landscape of the human genome. *Nature.* 489, 75-82 (2012).
45. O. Corradin et al., Combinatorial effects of multiple enhancer variants in linkage disequilibrium dictate levels of gene expression to confer susceptibility to common traits. *Genome Res.* 24, 1-13 (2014).
46. B. Tolhuis, R. J. Palstra, E. Splinter, F. Grosveld, W. de Laat, Looping and interaction between hypersensitive sites in the active beta-globin locus. *Mol Cell.* 10, 1453-1465 (2002).
47. J. Dekker, T. Misteli, Long-Range Chromatin Interactions. *Cold Spring Harb Perspect Biol.* 7, a019356 (2015).
48. W. Deng et al., Controlling long-range genomic interactions at a native locus by targeted tethering of a looping factor. *Cell.* 149, 1233-1244 (2012).
49. W. Deng et al., Reactivation of developmentally silenced globin genes by forced chromatin looping. *Cell.* 158, 849-860 (2014).
50. B. He, C. Chen, L. Teng, K. Tan, Global view of enhancer-promoter interactome in human cells. *Proc Natl Acad Sci USA.* 111, E2191-9 (2014).
51. S. Whalen, R. M. Truty, K. S. Pollard, Enhancer-promoter interactions are encoded by complex genomic signatures on looping chromatin. *Nat Genet* (2016), doi: 10.1038/ng.3539.
52. R. J. H. Ryan et al., Detection of Enhancer-Associated Rearrangements Reveals Mechanisms of Oncogene Dysregulation in B-cell Lymphoma. *Cancer Discov.* 5, 1058-1071 (2015).
53. J. Huang et al., Dynamic Control of Enhancer Repertoires Drives Lineage and Stage-Specific Transcription during Hematopoiesis. *Dev Cell.* 36, 9-23 (2016).
54. J. R. Dixon et al., Chromatin architecture reorganization during stem cell differentiation. *Nature.* 518, 331-336 (2015).
55. S. Tuupanen et al., The common colorectal cancer predisposition SNP rs6983267 at chromosome 8q24 confers potential to enhanced Wnt signaling. *Nat Genet.* 41, 885-890 (2009).
56. J. B. Wright, S. J. Brown, M. D. Cole, Upregulation of c-MYC in cis through a large chromatin loop linked to a cancer risk-associated single-nucleotide polymorphism in colorectal cancer cells. *Mol Cell Biol.* 30, 1411-1420 (2010).
57. I. K. Sur et al., Mice lacking a Myc enhancer that includes human SNP rs6983267 are resistant to intestinal tumors. *Science.* 338, 1360-1363 (2012).
58. D. Herranz et al., A NOTCH1-driven MYC enhancer promotes T cell development, transformation and acute lymphoblastic leukemia. *Nat Med.* 20, 1130-1137 (2014).
59. Y. Yashiro-Ohtani et al., Long-range enhancer activity determines Myc sensitivity to Notch inhibitors in T cell leukemia. *Proc Natl Acad Sci U S A.* 111, E4946-53 (2014).
60. J. Shi et al., Role of SWI/SNF in acute leukemia maintenance and enhancer-mediated Myc regulation. *Genes Dev.* 27, 2648-2662 (2013).
61. L. D. Ward, M. Kellis, HaploReg: a resource for exploring chromatin states, conservation, and regulatory motif alterations within sets of genetically linked variants. *Nucleic Acids Res.* 40, D930-4 (2012).
62. R. C. Gentleman et al., Bioconductor: open software development for computational biology and bioinformatics. *Genome Biol.* 5, R80 (2004).
63. M. Lawrence et al., Software for computing and annotating genomic ranges. *PLoS Comput Biol.* 9, e1003118 (2013).
64. M. Lawrence, R. Gentleman, V. Carey, rtracklayer: an R package for interfacing with genome browsers. *Bioinformatics.* 25, 1841-1842 (2009).
65. A. R. Quinlan, I. M. Hall, BEDTools: a flexible suite of utilities for comparing genomic features. *Bioinformatics.* 26, 841-842 (2010).
66. J. T. Robinson et al., Integrative genomics viewer. *Nat Biotechnol.* 29, 24-26 (2011).
67. P. J. A. Cock et al., Biopython: freely available Python tools for computational molecular biology and bioinformatics. *Bioinformatics.* 25, 1422-1423 (2009).
68. T. Wang, J. J. Wei, D. M. Sabatini, E. S. Lander, Genetic screens in human cells using the CRISPR-Cas9 system. *Science.* 343, 80-84 (2014).
69. O. Shalem et al., Genome-scale CRISPR-Cas9 knockout screening in human cells. *Science.* 343, 84-87 (2014).
70. O. Parnas et al., A Genome-wide CRISPR Screen in Primary Immune Cells to Dissect Regulatory Networks. *Cell.* 162, 675-686 (2015).
71. Y. Guan et al., Amplification of PVT1 contributes to the pathophysiology of ovarian and breast cancer. *Clin Cancer Res.* 13, 5745-5755 (2007).
72. Y.-Y. Tseng et al., PVT1 dependence in cancer with MYC copy-number increase. *Nature.* 512, 82-86 (2014).
73. J. M. Engreitz et al., Neighborhood regulation by lncRNA promoters, transcription, and splicing. *bioRxiv,* 050948 (2016).
74. V. R. Paralkar et al., Unlinking an lncRNA from Its Associated cis Element. *Mol Cell.* 62, 104-110 (2016).

75. S. L. Ameres, P. D. Zamore, Diversifying microRNA sequence and function. *Nat. Rev. Mol. Cell Biol.* 14, 475-488 (2013).
76. M. J. Guertin, A. L. Martins, A. Siepel, J. T. Lis, Accurate prediction of inducible transcription factor binding intensities in vivo. *PLoS Genet.* 8, e1002610 (2012).
77. C. D. Arnold et al., Genome-wide quantitative enhancer activity maps identified by STARR-seq. *Science.* 339, 1074-1077 (2013).
78. M. P. Creyghton et al., Histone H3K27ac separates active from poised enhancers and predicts developmental state. *Proc Natl Acad Sci USA.* 107, 21931-21936 (2010).
79. S. Bonn et al., Tissue-specific analysis of chromatin state identifies temporal signatures of enhancer activity during embryonic development. *Nat Genet.* 44, 148-156 (2012).
80. E. Lieberman-Aiden et al., Comprehensive mapping of long-range interactions reveals folding principles of the human genome. *Science.* 326, 289-293 (2009).
81. M. Rylski et al., GATA-1-mediated proliferation arrest during erythroid maturation. *Mol Cell Biol.* 23, 5031-5042 (2003).
82. Y. Woon Kim, S. Kim, C. Geun Kim, A. Kim, The distinctive roles of erythroid specific activator GATA-1 and NF-E2 in transcription of the human fetal γ-globin genes. *Nucleic Acids Res.* 39, 6944-6955 (2011).
83. Q. Gong, A. Dean, Enhancer-dependent transcription of the epsilon-globin promoter requires promoter-bound GATA-1 and enhancer-bound AP-1/NF-E2. *Mol Cell Biol.* 13, 911-917 (1993).

Example 7—Identification of Enhancers Relevant for T Cell Dysfunction in Cancer and Inflammatory Bowel Disease The following enhancer/gene pairs in Table 3 are selected based on these regions being predicted to regulate target genes in T cells. The genes are selected based on known positive role in leading to T cell dysfunction in cancer. Therefore, inhibiting these genomic regions through genome or epigenome editing in T cells (e.g., in adoptive T cell transfer therapies) is expected to increase efficacy of these therapies in treating cancer.

TABLE 3

Putative Enhancers

| No. | Enhancer Location | | Target Gene |
|---|---|---|---|
| 219 | chr2 | 204725444 | 204726765 | CTLA4 |
| 220 | chr2 | 204722534 | 204724891 | CTLA4 |
| 221 | chr2 | 204733568 | 204735425 | CTLA4 |
| 222 | chr2 | 204731747 | 204733182 | CTLA4 |
| 223 | chr2 | 204723399 | 204724933 | CTLA4 |
| 224 | chr2 | 204733569 | 204735406 | CTLA4 |
| 225 | chr2 | 204735803 | 204737012 | CTLA4 |
| 226 | chr2 | 204731740 | 204733158 | CTLA4 |
| 227 | chr3 | 32725642 | 32727639 | CMTM6 |
| 228 | chr3 | 32542850 | 32544996 | CMTM6 |
| 229 | chr3 | 32725639 | 32727696 | CMTM6 |
| 230 | chr3 | 32542849 | 32545071 | CMTM6 |
| 231 | chr16 | 66582644 | 66587357 | CMTM4 |
| 232 | chr16 | 66637152 | 66639600 | CMTM4 |
| 233 | chr16 | 66729528 | 66731692 | CMTM4 |
| 234 | chr16 | 66784886 | 66786448 | CMTM4 |
| 235 | chr16 | 66637174 | 66639881 | CMTM4 |
| 236 | chr16 | 66729478 | 66731808 | CMTM4 |
| 237 | chr16 | 66784837 | 66786479 | CMTM4 |
| 238 | chr12 | 6874982 | 6876886 | LAG3 |
| 239 | chr12 | 6959964 | 6962476 | LAG3 |
| 240 | chr12 | 6898081 | 6899300 | LAG3 |

TABLE 3-continued

Putative Enhancers

| No. | Enhancer Location | | Target Gene |
|---|---|---|---|
| 241 | chr12 | 6861501 | 6863544 | LAG3 |
| 242 | chr12 | 6895177 | 6896807 | LAG3 |
| 243 | chr12 | 6881169 | 6882169 | LAG3 |
| 244 | chr12 | 6901530 | 6902915 | LAG3 |
| 245 | chr12 | 6861461 | 6863550 | LAG3 |
| 246 | chr12 | 6883319 | 6884808 | LAG3 |
| 247 | chr12 | 6959963 | 6962488 | LAG3 |
| 248 | chr12 | 6874982 | 6876894 | LAG3 |
| 249 | chr3 | 112279521 | 112281967 | BTLA |
| 250 | chr3 | 112209329 | 112210678 | BTLA |
| 251 | chr3 | 112214786 | 112216091 | BTLA |
| 252 | chr3 | 112217144 | 112219282 | BTLA |
| 253 | chr3 | 112279530 | 112281982 | BTLA |
| 254 | chr3 | 112181667 | 112184001 | BTLA |
| 255 | chr3 | 112217224 | 112219100 | BTLA |
| 256 | chr14 | 52818058 | 52820114 | PTGER2 |
| 257 | chr14 | 52765927 | 52767232 | PTGER2 |
| 258 | chr14 | 52780157 | 52782937 | PTGER2 |
| 259 | chr14 | 53018303 | 53021334 | PTGER2 |
| 260 | chr14 | 52791285 | 52792826 | PTGER2 |
| 261 | chr14 | 52765934 | 52767270 | PTGER2 |
| 262 | chr14 | 52780175 | 52782803 | PTGER2 |
| 263 | chr1 | 145715139 | 145716139 | CD160 |
| 264 | chr1 | 145610242 | 145611866 | CD160 |
| 265 | chr1 | 145743529 | 145745048 | CD160 |
| 266 | chr1 | 145476246 | 145478219 | CD160 |
| 267 | chr1 | 145436026 | 145439037 | CD160 |
| 268 | chr1 | 145727165 | 145728165 | CD160 |
| 269 | chr1 | 145715064 | 145716238 | CD160 |
| 270 | chr1 | 145717489 | 145718860 | CD160 |
| 271 | chr1 | 145743505 | 145745146 | CD160 |
| 272 | chr1 | 145713044 | 145714626 | CD160 |
| 273 | chr12 | 9176913 | 9178755 | KLRG1 |
| 274 | chr12 | 9105894 | 9107580 | KLRG1 |
| 275 | chr12 | 9101535 | 9103605 | KLRG1 |
| 276 | chr12 | 9101490 | 9103512 | KLRG1 |
| 277 | chr12 | 9103986 | 9105202 | KLRG1 |
| 278 | chr12 | 9105929 | 9107514 | KLRG1 |
| 279 | chr18 | 60984838 | 60988226 | BCL2 |
| 280 | chr18 | 60821769 | 60823518 | BCL2 |
| 281 | chr18 | 60976289 | 60977573 | BCL2 |
| 282 | chr18 | 60827756 | 60829875 | BCL2 |
| 283 | chr18 | 60976293 | 60977509 | BCL2 |
| 284 | chr18 | 60821706 | 60823541 | BCL2 |
| 285 | chr18 | 60984814 | 60988351 | BCL2 |
| 286 | chr18 | 60827768 | 60829935 | BCL2 |
| 287 | chr5 | 35856261 | 35857674 | IL7R |
| 288 | chr5 | 35853270 | 35855335 | IL7R |
| 289 | chr5 | 35810255 | 35812316 | IL7R |
| 290 | chr5 | 35829977 | 35831710 | IL7R |
| 291 | chr5 | 35858656 | 35860141 | IL7R |
| 292 | chr5 | 35858580 | 35860191 | IL7R |
| 293 | chr5 | 35810239 | 35812310 | IL7R |
| 294 | chr5 | 35821912 | 35823489 | IL7R |
| 295 | chr5 | 35856259 | 35857700 | IL7R |
| 296 | chr5 | 35853190 | 35855316 | IL7R |
| 297 | chr12 | 10605288 | 10606622 | KLRC1 |
| 298 | chr12 | 10705219 | 10708444 | KLRC1 |
| 299 | chr12 | 10546642 | 10548945 | KLRC1 |

The following enhancer/gene pairs in Table 4 are selected based on these regions being predicted to regulate target genes in T cells. The genes are selected based on known positive role in inflammatory bowel disease (IBD). Therefore, inhibiting these genomic regions in T cells is expected to decrease target gene expression and ameliorate IBD.

TABLE 4

| No. | Enhancer Location | | Target Gene |
|---|---|---|---|
| \multicolumn{4}{c}{Putative Enhancers} |

| No. | Enhancer Location | | Target Gene |
|---|---|---|---|
| 300 | chr1 | 154375591 154376756 | IL6R |
| 301 | chr1 | 154376773 154378555 | IL6R |
| 302 | chr1 | 154357573 154360198 | IL6R |
| 303 | chr1 | 154379852 154381033 | IL6R |
| 304 | chr1 | 154314806 154316467 | IL6R |
| 305 | chr1 | 154357586 154360023 | IL6R |
| 306 | chr1 | 154375253 154378530 | IL6R |
| 307 | chr1 | 67518440 67520755 | IL23R |
| 308 | chr1 | 67631668 67632668 | IL23R |
| 309 | chr1 | 67635924 67638565 | IL23R |
| 310 | chr1 | 67389672 67391864 | IL23R |
| 311 | chr1 | 67894148 67897439 | IL23R |
| 312 | chr1 | 67659550 67661359 | IL23R |
| 313 | chr1 | 67518252 67520753 | IL23R |
| 314 | chr1 | 67631457 67632675 | IL23R |
| 315 | chr1 | 67894105 67897475 | IL23R |
| 316 | chr1 | 67389667 67391855 | IL23R |
| 317 | chr1 | 67635924 67638566 | IL23R |
| 318 | chr19 | 18207886 18209471 | IL12RB1 |
| 319 | chr19 | 18133953 18135529 | IL12RB1 |
| 320 | chr19 | 18124636 18125932 | IL12RB1 |
| 321 | chr19 | 18197061 18198479 | IL12RB1 |
| 322 | chr19 | 18111051 18112850 | IL12RB1 |
| 323 | chr19 | 18131608 18133672 | IL12RB1 |
| 324 | chr19 | 18117272 18119499 | IL12RB1 |
| 325 | chr19 | 18199440 18200655 | IL12RB1 |
| 326 | chr19 | 18201486 18202932 | IL12RB1 |
| 327 | chr19 | 18207870 18209231 | IL12RB1 |
| 328 | chr19 | 18262628 18264782 | IL12RB1 |

TABLE 4-continued

| No. | Enhancer Location | | Target Gene |
|---|---|---|---|
| 329 | chr19 | 18201462 18202886 | IL12RB1 |
| 330 | chr19 | 18111062 18113132 | IL12RB1 |
| 331 | chr19 | 18197076 18198456 | IL12RB1 |
| 332 | chr19 | 18199296 18200727 | IL12RB1 |
| 333 | chr1 | 67801401 67803362 | IL12RB2 |
| 334 | chr1 | 67798158 67799669 | IL12RB2 |
| 335 | chr1 | 67772393 67774183 | IL12RB2 |
| 336 | chr1 | 67779772 67781238 | IL12RB2 |
| 337 | chr1 | 67894148 67897439 | IL12RB2 |
| 338 | chr1 | 67788301 67789664 | IL12RB2 |
| 339 | chr1 | 67751268 67752629 | IL12RB2 |
| 340 | chr1 | 67772393 67774222 | IL12RB2 |
| 341 | chr1 | 67801467 67803370 | IL12RB2 |
| 342 | chr1 | 67798036 67799718 | IL12RB2 |
| 343 | chr1 | 67894105 67897475 | IL12RB2 |
| 344 | chr18 | 46466541 46468178 | SMAD7 |
| 345 | chr18 | 46474457 46480133 | SMAD7 |
| 346 | chr18 | 46466485 46468176 | SMAD7 |
| 347 | chr18 | 46454687 46456196 | SMAD7 |
| 348 | chr18 | 46474380 46480101 | SMAD7 |

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A method for identifying a noncoding putative regulatory element that regulates a gene, comprising:
   (a) performing a chromatin accessibility assay, a DNA-associated protein binding assay, an enhancer activity assay, or a combination thereof and obtaining a measure of intrinsic activity of a plurality of genomic elements;
   (b) performing a proximity ligation assay and obtaining a measure of proximity between each of the genomic elements and the gene;
   (c) identifying noncoding putative regulatory elements that regulate the gene using an Activity×Proximity model based on the measure of intrinsic activity obtained in (a) and the measure of proximity obtained in (b) as input;
   (d) altering a noncoding putative regulatory element identified in (c) in a population of T cells when the noncoding putative regulatory element identified in (c) is an enhancer associated with T cell dysfunction; and
   (e) administering the population of T cells of (d) to a subject having T cell dysfunction.

2. The method of claim 1, further comprising training, optimizing, and/or validating the Activity×Proximity model using experimental or computational data describing functional interactions between the putative regulatory elements and the gene or using perturbation date obtained from a perturbation-based screening.

3. The method of claim 2, wherein said perturbation-based screening is carried out using a DNA binding protein.

4. The method of claim 3, wherein the DNA binding protein is selected from a Cas protein, a zinc finger, a zinc finger nuclease (ZFN), a transcription activator-like effector (TALE), a transcription activator-like effector nuclease (TALEN), a meganuclease, or a modified version thereof.

5. The method of claim 2, wherein the perturbation-based screening comprises:
   introducing a library of guide RNAs into a population of cells, said cells either expressing an RNA-guided DNA binding protein or having the RNA-guided DNA binding protein or a coding sequence thereof introduced simultaneously or sequentially with the guide RNAs, wherein the guide RNAs target different non-coding genomic sequences within at least one genomic region;
   selecting cells based on a phenotype; and
   determining (i) relative representation of the guide RNAs present in the selected cells or (ii) deletion of a genomic sequence targeted by pairs of the guide RNAs from the selected cells, wherein (i) the relative representation of the guide RNAs or (ii) the deletion of the genomic sequence indicates the targeted genomic sequence as a regulatory element of a gene associated with the phenotype.

6. The method of claim 5, wherein the RNA-guided DNA binding protein is a CRISPR effector protein.

7. The method of claim 6, wherein the CRISPR effector protein is a catalytically active Cas protein, and wherein the guide RNAs are introduced as pairs of guide RNAs, each pair designed for targeted deletion of the non-coding genomic sequence.

8. The method of claim 7, wherein each pair of guide RNAs target 20-5,000 bp of the genomic sequence for deletion.

9. The method of claim 6, wherein the CRISPR effector protein is a modified Cas protein.

10. The method of claim 9, wherein the modified Cas protein comprises one or more mutations compared to a wild-type Cas protein, and wherein the modified Cas protein is not catalytically competent.

11. The method of claim 10, wherein the modified Cas protein is a modified Cas9 or Cpf1.

12. The method of claim 9, wherein the guide RNAs are introduced using a vector encoding two or more guide RNAs, wherein each of said guide RNAs targets a different non-coding genomic sequence for multiplex perturbation.

13. The method of claim 9, wherein the modified Cas is fused to a transcriptional repressor domain or a transcriptional activator domain.

14. The method of claim 13, wherein the transcriptional repressor domain is a KRAB domain, a NuE domain, NcoR domain, SID domain, or a SID4X domain, or a DMNT domain (DNA methylation).

15. The method of claim 9, wherein at least one of the guide RNAs comprises a loop modified by insertion of at least one distinct aptamer RNA sequence adapted to bind to an adaptor protein that comprises a transcriptional repressor domain.

16. The method of claim 1, wherein the chromatin accessibility assay consists of one or more of DNase I hypersensitivity, ATAC-Seq, FAIRE-Seq, or NOMe-Seq; wherein the DNA-associated protein binding assay consists of H3K27ac ChIP-Seq, histone modification ChIP-seq, transcription factor ChIP-seq, or p300 ChIP-Seq; or wherein the enhancer activity assay consists of MPRA or STARR-Seq.

17. The method of claim 1, wherein the measure of proximity is further determined using one of or a function of genomic distance between a regulatory element and its target promoter.

18. The method of claim 1, wherein the Activity×Proximity model uses:
 a function of quantitative DHS, H3K27ac, and Hi-C values, or
 $\log_2$(H3K27ac RPM×DHS RPM×Hi-C contact×Hi-C contact).

19. The method of claim 1, wherein the gene is associated with a disease phenotype in mammals.

20. The method of claim 1, wherein the Activity×Proximity model is further weighted by one or more factors related to a local regulatory landscape.

21. The method of claim 20, wherein the factors related to the local regulatory landscape are selected from gene density, enhancer density, presence of promoter-proximal regulatory elements, and rank thereof.

22. The method of claim 1, wherein the regulatory elements that regulate expression of the gene are selected from the group consisting of CTLA4, CMTM6, CMTM4, LAG3, BTLA, PTGER2, CD160, KLRG1, BCL2, IL7R, and KLRC1.

23. The method of claim 1, wherein the T cells are chimeric antigen receptor (CAR) expressing T cells or T-cell receptor (TCR) modified T cells.

24. A method for identifying a noncoding putative regulatory element that regulates an immune regulatory gene, comprising:
 (a) performing a chromatin accessibility assay, a DNA-associated protein binding assay, an enhancer activity assay, or a combination thereof and obtaining a measure of intrinsic activity of a plurality of genomic elements;
 (b) performing a proximity ligation assay and obtaining a measure of proximity between each of the genomic elements and the immune regulatory gene;
 (c) identifying noncoding putative regulatory elements that regulate the immune regulatory gene using an Activity×Proximity model based on the measure of intrinsic activity obtained in (a) and the measure of proximity obtained in (b) as input;
 (d) altering a noncoding putative regulatory element identified in (c) in a population of T cells; and
 (e) administering the population of T cells of (d) to a subject having T cell dysfunction.

25. The method of claim 24, further comprising training, optimizing, and/or validating the Activity×Proximity model using experimental or computational data describing functional interactions between the putative regulatory elements and the gene or using perturbation data obtained from a perturbation-based screening.

26. The method of claim 25, wherein said perturbation-based screening is carried out using a DNA binding protein.

27. The method of claim 26, wherein the DNA binding protein is selected from a Cas protein, a zinc finger, a zinc finger nuclease (ZFN), a transcription activator-like effector (TALE), a transcription activator-like effector nuclease (TALEN), a meganuclease, or a modified version thereof.

28. The method of claim 25, wherein the perturbation-based screening comprises:
 introducing a library of guide RNAs into a population of cells, said cells either expressing an RNA-guided DNA binding protein or having the RNA-guided DNA binding protein or a coding sequence thereof introduced simultaneously or sequentially with the guide RNAs, wherein the guide RNAs target different non-coding genomic sequences within at least one genomic region;
 selecting cells based on a phenotype; and
 determining (i) relative representation of the guide RNAs present in the selected cells or (ii) deletion of a genomic sequence targeted by pairs of the guide RNAs from the selected cells, wherein (i) the relative representation of the guide RNAs or (ii) the deletion of the genomic sequence indicates the targeted genomic sequence as a regulatory element of a gene associated with the phenotype.

29. The method of claim 28, wherein the RNA-guided DNA binding protein is a CRISPR effector protein.

30. The method of claim 29, wherein the CRISPR effector protein is a catalytically active Cas protein, and wherein the guide RNAs are introduced as pairs of guide RNAs, each pair designed for targeted deletion of the non-coding genomic sequence.

31. The method of claim 30, wherein each pair of guide RNAs target 20-5,000 bp of the genomic sequence for deletion.

32. The method of claim 29, wherein the CRISPR effector protein is a modified Cas protein.

33. The method of claim 32, wherein the modified Cas protein comprises one or more mutations compared to a wild-type Cas protein, and wherein the modified Cas protein is not catalytically competent.

34. The method of claim 33, wherein the modified Cas protein is a modified Cas9 or Cpf1.

35. The method of claim 32, wherein the guide RNAs are introduced using a vector encoding two or more guide RNAs, wherein each of said guide RNAs targets a different non-coding genomic sequence for multiplex perturbation.

36. The method of claim 32, wherein the modified Cas is fused to a transcriptional repressor domain or a transcriptional activator domain.

37. The method of claim 36, wherein the transcriptional repressor domain is a KRAB domain, a NuE domain, NcoR domain, SID domain, or a SID4X domain, or a DMNT domain (DNA methylation).

38. The method of claim 32, wherein at least one of the guide RNAs comprises a loop modified by insertion of at least one distinct aptamer RNA sequence adapted to bind to an adaptor protein that comprises a transcriptional repressor domain.

39. The method of claim 24, wherein the chromatin accessibility assay consists of one or more of DNase I hypersensitivity, ATAC-Seq, FAIRE-Seq, or NOMe-Seq; wherein the DNA-associated protein binding assay consists of H3K27ac ChIP-Seq, histone modification ChIP-seq, transcription factor ChIP-seq, or p300 ChIP-Seq; or wherein the enhancer activity assay consists of MPRA or STARR-Seq.

40. The method of claim 24, wherein the measure of proximity is further determined using one of or a function of genomic distance between a regulatory element and its target promoter.

41. The method of claim 24, wherein the Activity× Proximity model uses:
a function of quantitative DHS, H3K27ac, and Hi-C values, or
$\log_2$(H3K27ac RPM×DHS RPM×Hi-C contact×Hi-C contact).

42. The method of claim 24, wherein the gene is associated with a disease phenotype in mammals.

43. The method of claim 24, wherein the Activity× Proximity model is further weighted by one or more factors related to a local regulatory landscape.

44. The method of claim 43, wherein the factors related to the local regulatory landscape are selected from gene density, enhancer density, presence of promoter-proximal regulatory elements, and rank thereof.

45. The method of claim 24, wherein the regulatory elements that regulate expression of the gene are selected from the group consisting of CTLA4, CMTM6, CMTM4, LAG3, BTLA, PTGER2, CD160, KLRG1, BCL2, IL7R, and KLRC1.

46. The method of claim 24, wherein the T cells are chimeric antigen receptor (CAR) expressing T cells or T-cell receptor (TCR) modified T cells.

* * * * *